United States Patent
Pizzirani et al.

(10) Patent No.: US 12,479,826 B2
(45) Date of Patent: Nov. 25, 2025

(54) PYRIDAZINYL AMINO DERIVATIVES AS ALK5 INHIBITORS

(71) Applicant: CHIESI FARMACEUTICI S.P.A., Parma (IT)

(72) Inventors: Daniela Pizzirani, Parma (IT); Matteo Biagetti, Parma (IT); Paolo Ronchi, Parma (IT); Paolo Bruno, Parma (IT); Sara Guariento, Parma (IT); Barbara Bertani, Parma (IT); Daniele Pala, Parma (IT); Alessio Barilli, Parma (IT)

(73) Assignee: CHIESI FARMACEUTICI S.P.A., Parma (IT)

( * ) Notice: Subject to any disclaimer, the term of this patent is extended or adjusted under 35 U.S.C. 154(b) by 500 days.

(21) Appl. No.: 18/014,764

(22) PCT Filed: Jul. 14, 2021

(86) PCT No.: PCT/EP2021/069649
§ 371 (c)(1),
(2) Date: Jan. 6, 2023

(87) PCT Pub. No.: WO2022/013307
PCT Pub. Date: Jan. 20, 2022

(65) Prior Publication Data
US 2024/0018122 A1  Jan. 18, 2024

(30) Foreign Application Priority Data
Jul. 15, 2020  (EP) .................................... 20185890

(51) Int. Cl.
*C07D 401/14* (2006.01)
*C07D 401/12* (2006.01)
*C07D 405/14* (2006.01)
*C07D 471/04* (2006.01)
*C07D 487/04* (2006.01)

(52) U.S. Cl.
CPC ......... *C07D 401/14* (2013.01); *C07D 401/12* (2013.01); *C07D 405/14* (2013.01); *C07D 471/04* (2013.01); *C07D 487/04* (2013.01)

(58) Field of Classification Search
CPC .. C07D 401/14; C07D 405/14; C07D 409/14; C07D 413/14; A61K 31/501
See application file for complete search history.

(56) References Cited

FOREIGN PATENT DOCUMENTS

| WO | WO-2005033105 A2 | 4/2005 |
| WO | WO-2009087212 A2 | 7/2009 |
| WO | WO-2020012357 A1 | 1/2020 |

OTHER PUBLICATIONS

European Search Report issued Oct. 27, 2020 in EP Application No. EP20185890.9, 2 pages.
International Search Report issued Oct. 14, 2021 in PCT/EP2021/069649, 2 pages.

*Primary Examiner* — Clinton A Brooks
*Assistant Examiner* — Jerica Katlynn Wilson
(74) *Attorney, Agent, or Firm* — Element IP, PLC

(57) ABSTRACT

The present invention relates to a compound of general formula (I) inhibiting the transforming growth factor-β (TGF-β) type I receptor (ALK5), methods of preparing such compounds, pharmaceutical compositions containing them and therapeutic use thereof. The compounds of the invention may be useful in the treatment of diseases or conditions associated with a dysregulation of ALK5 signaling pathway in a mammal.

14 Claims, No Drawings

PYRIDAZINYL AMINO DERIVATIVES AS ALK5 INHIBITORS

FIELD OF THE INVENTION

The present invention generally relates to compounds inhibiting the transforming growth factor β (TGF β) type I receptor (ALK5) (hereinafter ALK5 inhibitors), methods of preparing such compounds, pharmaceutical compositions containing them and therapeutic use thereof.

The compounds of the invention may be useful for instance in the treatment of many disease, disorder, or condition associated with ALK5 signaling pathway.

BACKGROUND OF THE INVENTION

The Transforming Growth Factor β (TGF β) is a protein belonging to the TGF β superfamily.

It is involved in several processes, both cellular, such as proliferation, migration and differentiation, and biological, including wound healing, immunosuppression, cancerogenesis and extracellular matrix production.

The TGF β superfamily also includes, among others, other members known as activins (Acts) (see e.g. Hinck A P, FEBS Letters 586 (2012); 1860-1870).

The binding of the peptide initiates the TGF β signalling cascade through the formation of a heterotetrameric complex composed of two different serine/threonine kinases receptors: type 1 (TGFβR1/ALK5) and type 2 (TGFβR2).

TGFβR1/ALK5 is recruited and activated through the phosphorylation of its intracellular domain by TGFβR2, leading in turn to the phosphorylation of the receptor-activated (R)-Smad family, resulting in the activation of target gene transcription (see e.g. Sheppard D., Proc Am Thorac Soc. (2006); (3):413-417).

Similarly to the TGF β signaling, the type I receptor for activin, ALK4, leads to the activation of target gene transcription (see e.g. Heldin C H et al., Cold Spring Harb Perspect Biol. (2016) Aug. 1; 8(8)).

Several studies have linked an excessive and/or dysregulated TGF β activity with many diseases including cancer and fibrosis (see e.g. Syed V, J Cell Biochem. (2016) June; 117(6):1279-87; Jakowlew S B. Cancer Metastasis Rev. (2006) September; 25(3):435-57). Among fibrotic disorders, a crucial role of TGFβ has been shown in organs such as lung, heart, liver, and kidney (see e.g. Alhamad E H, J Thorac Dis. (2015); 7(3):386-93). In particular, TGFβ expression is increased in fibrotic lung diseases, such as idiopathic pulmonary fibrosis (IPF), and in chronic inflammatory conditions, such as chronic obstructive pulmonary disease and asthma (see e.g. Thomas B J et al., Am J Respir Cell Mol Biol. (2016); (55):759-766).

In lung, TGFβ is expressed in several cell types, like epithelial cells, endothelial cells, connective tissue cells, macrophages and fibroblasts.

These cell populations may produce excess of TGFβ in IPF human lung tissue. Moreover, high levels of TGFβ have been detected in lung tissue and BAL of IPF patients (see e.g. Bergeron A et al., Eur Respir J (2003); 22:69-76).

TGFβ gene expression and TGFβ protein production have been observed to increase in a variety of animal models of pulmonary fibrosis caused by bleomycin, silica, asbestos, and radiation (see e.g. Wei F et al., Int Immunopharmacol. (2017) July; 48:67-75; Choe J Y et al., Inflamm Res. (2010) March; 59(3):177-88; Wang X et al., Respir Res (2009); 10, 36) and it has also been reported how the TGFβ expression is sufficient to induce progressive fibrosis in rodents (see e.g. Sime P J et al., J Clin Invest (1997); 100:768-776; Kim K K et al.).

Contrarily, TGFβ signalling inhibition obtained by employing knockout (KO) animals can inhibit fibrosis development through TGFβ-linked mechanisms (see e.g. Bonniaud P et al., Am J Respir Crit Care Med (2005); 171:889-898; 34).

Similar results have been achieved with inhibition of TGFβR1 in mouse bleomycin disease model (see e.g. Wei Y et al., J Clin Invest. (2017); 127(10):3675-3688).

Activin signalling dysregulation, similarly to TGFβ, is associated to fibroblasts proliferation, myofibroblasts differentiation and accumulation of extracellular matrix (ECM) (see e.g. Yamashita et al., J. Am. Soc. Nephrol. (2004) 15, 91-101). Moreover, overexpression of activin has been linked to pathological conditions and fibrosis development in different organs, such as liver (see e.g. Patella et al., Am. J. Physiol. Gastrointest. Liver Physiol. (2006) 290, G137-G144), kidney (see e.g. Agapova et al., Kidney Int. (2016) 89, 1231-1243), heart (see e.g. Yndestad et al., Circulation (2004) 109, 1379-1385), and lung (see e.g. de Kretser et al., Crit.Care (2013) 17:R263).

Taken together these data suggest the importance of targeting ALK5 to treat pharmacologically the aforementioned diseases, linked to the dysregulated TGF signaling pathway.

The TGFβ signaling is strongly involved in the cardiovascular homeostasis (see e.g. van Meeteren L A et al., Springer (2013)). Several studies in humans and mice have shown the main role of TGFβ in angiogenesis and vascular morphogenesis. Moreover, TGFβ plays a key role in the development and functionality of cardiac valves. It is therefore clear the importance of a selective regulation of TGFβ pathway to target the pathological effects avoiding the suppression of the signaling needed for a correct homeostasis.

The answer to this crucial point could be addressed by using the inhalation route to deliver an antiTGFβ drug.

The inhalatory route would allow the treatment of the affected lung compartment bypassing the issue of the heart exposure.

Various compounds have been described in the literature as ALK5 and/or ALK4 receptor inhibitors.

WO2008/006583, WO2009/087212, WO2009/087224, WO2009/087225, WO2009/133070, WO2009/013335 and WO2009/050183 (Novartis) disclose respectively pyrimidine, pyridine, imidazo pyridine, pyrrolo pyrimidine and pyrrolo pyridine, imidazo pyridazine, imidazo pyridine derivatives useful for the treatment of ALK4- or ALK5-mediated diseases such as inflammatory or obstructive airways diseases, pulmonary hypertension and pulmonary fibrosis.

WO00/61576 and US2003/0149277 (Smithkline Beecham Corp) disclose triarylimidazole derivatives as ALK5 inhibitors useful for the treatment of, among others, renal disease, wound healing, kidney disease, congestive heart failure, ulcers, impaired neurological function and any disease wherein fibrosis is a major component.

WO01/62756 (Smithkline Beecham P.L.C.) discloses pyridinylimidazole derivatives as ALK5 inhibitors useful for the treatment of, among others, renal disease, wound healing, kidney disease, congestive heart failure, ulcers, impaired neurological function and any disease wherein fibrosis is a major component.

WO03/087304 (Biogen Inc.) discloses tri-substituted heteroaryls as ALK5 and/or ALK4 inhibitors useful for the treatment of, among others, idiopathic pulmonary fibrosis, diabetic nephropathy, hepatic fibrosis, pulmonary fibrosis, acute lung injury, post-infarction cardiac fibrosis, fibrotic cancers and fibroma.

WO2013/009140 (SK Chemicals Co) discloses 2-pyridyl substituted imidazole derivatives as ALK5 and/or ALK4 receptors inhibitors useful for the treatment of, among others, renal, liver or pulmonary fibrosis.

Pyridazinyl amino derivatives have been disclosed in the literature, but not as ALK5 inhibitors.

WO2005/033105 (Amgen) discloses, among other compounds, pyridazinyl amino derivatives as vanilloid receptor ligands, for the treatment of a large number of diseases and disordes, not including fibrosis.

WO2002/022605 and WO2002/022602 (Vertex) describe, among others, pyridazine compounds as protein kinase inhibitors useful for the treatment of cancer, diabetes, Alzheimer's disease and schizophrenia.

WO02/24681 (Ortho-McNeil Pharmaceutical Inc.) describes pyridazine compounds as tyrosine kinase inhibitors useful as anti-tumor agents, and to treat diabetic retinopathy, rheumatoid arthritis, endometriosis and psoriasis.

Of note, inhibition of ALK5 receptor may be useful for the treatment of fibrosis and disease, disorder and conditions that result from fibrosis.

Several efforts have been done in the past years to develop novel ALK5 receptor inhibitors useful for the treatment of several diseases and some of those compounds have shown efficacy also in humans.

However, there remains a potential for developing inhibitors of receptors ALK5 characterized by good potency, useful for the treatment of diseases or conditions associated with a dysregulation of ALK5 signaling pathway, in particular fibrosis.

In particular, there remains a potential for developing inhibitors of receptors ALK5 useful for the treatment of diseases or conditions associated with a dysregulation of ALK5 signaling in the respiratory field, in particular idiopathic pulmonary fibrosis (IPF), to be administered by the inhalation route and characterized by a good inhalatory profile, that corresponds to a good activity on the lung, a good lung retention and to a low metabolic stability in order to minimize the systemic exposure and correlated safety issues.

In this direction, we have surprisingly found a new series of compounds of general formula (I) that solves the problem of providing potent inhibitors of ALK5 receptor for administration by inhalation, that shows, at the same time, a good inhalatory profile, low metabolic stability, low systemic exposure, improved safety and tolerability, and a good selectivity across the kinome.

SUMMARY OF THE INVENTION

In a first aspect the present invention relates to compounds of formula (I)

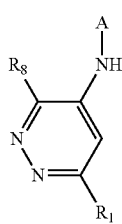

wherein
$R_1$ is aryl optionally substituted by one or more groups selected from halogen atoms, —$(C_1$-$C_6)$alkyl and —$(C_1$-$C_6)$haloalkyl;
A is selected from the groups consisting of A1, A2 and A3

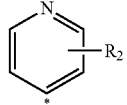

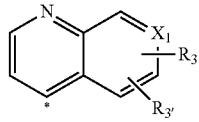

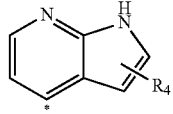

$R_2$ is selected from the group consisting of —$NR_5C(O)R_6$ and —$NR_5R_6$;
$X_1$ is C, CH or N;
$R_3$ is selected from the group consisting of —$C(O)NR_5R_7$, —$C(O)OR_7$, —$OC(O)R_7$, —$OR_7$, —$NR_5C(O)R_7$ and —$OC(O)NR_5R_7$;
$R_{3'}$ is H or is selected from the group consisting of —$(C_1$-$C_6)$alkoxy, —OH, —$C(O)O$—$(C_1$-$C_6)$alkyl and —$C(O)NH$-heterocycloalkyl, wherein said heterocycloalkyl is substituted by one —$(C_1$-$C_6)$alkyl;
$R_4$ is selected from the group consisting of —$C(O)NR_5R_7$ and —$C(O)$heterocycloalkyl, wherein said heterocycloalkyl is optionally substituted by one or more —$(C_1$-$C_6)$alkyl;
$R_5$ is H or —$(C_1$-$C_6)$alkyl;
$R_6$ is selected from the group consisting of —$(C_1$-$C_6)$alkylene-$NR_AR_B$; —NH—$(C_1$-$C_6)$alkylene-heterocycloalkyl, wherein said heterocycloalkyl is optionally substituted by one or more —$(C_1$-$C_6)$alkyl; heteroaryl optionally substituted by one or more groups selected from —$(C_1$-$C_6)$alkylene-$NR_AR_C$ and —$(C_1$-$C_6)$alkylene-heterocycloalkyl, wherein said heterocycloalkyl is optionally substituted by one or more —$(C_1$-$C_6)$alkyl; —$(C_1$-$C_6)$alkylene-$NR_C$—$(C_1$-$C_6)$alkylene-$NR_AR_C$; —$(C_1$-$C_6)$alkylene-$NR_A$—$C(O)O$—$(C_1$-$C_6)$alkyl; cycloalkyl optionally substituted by a heterocycloalkyl, wherein said heterocycloalkyl is optionally substituted by one or more —$(C_1$-$C_6)$alkyl; heterocycloalkyl optionally substituted by one or more —$(C_1$-$C_6)$alkyl; —$(C_1$-$C_6)$alkylene-N-oxide-heterocycloalkyl; and —$(C_1$-$C_6)$alkylene-heterocycloalkyl, wherein said heterocycloalkyl is optionally substituted by one or more groups selected from —OH, halogen, —$(C_1$-$C_6)$alkyl, —$(C_1$-$C_6)$alkoxy, —$(C_1$-$C_6)$alkylene-OH, —$(C_1$-$C_6)$alkylene-CN, —$(C_1$-$C_6)$haloalkyl, —$C(O)$—$(C_1$-$C_6)$alkyl, —$C(O)OH$, —$C(O)O(C_1$-$C_6)$alkyl, —$C(O)O$-cycloalkyl, —$C(O)O$-heterocycloalkyl, —$(C_1$-$C_6)$alkylene-$C(O)O$—$R_C$, —$(C_1$-$C_6)$alkylene-$NR_C$—$C(O)O$—$(C_1$-$C_6)$alkyl, —$SO_2$—$(C_1$-$C_6)$alkyl, —$(C_1$-$C_6)$alkylene-$NH_2$, —$(C_1$-$C_6)$alkylene-$NR_AR_C$, —$(C_1$-$C_6)$alkylene-$SO_2$—$(C_1$-$C_6)$ alkyl, —($C_1$-$C_6$)alkylene-NHSO$_2$—($C_1$-$C_6$)alkyl, —SO$_2$—($C_1$-$C_6$)alkyl and oxo;

$R_7$ is selected from the group consisting of:
($C_1$-$C_6$)alkylene-NR$_A$R$_B$;
heterocycloalkyl optionally substituted by one or more groups selected from —($C_1$-$C_6$)alkyl, —($C_1$-$C_6$)alkylene-SO$_2$—($C_1$-$C_6$)alkyl, —($C_1$-$C_6$)alkylene-OH, —($C_1$-$C_6$)alkylene-NR$_A$R$_C$, heterocycloalkyl, —C(O)O-heterocycloalkyl, —($C_1$-$C_6$)alkylene-heterocycloalkyl, wherein each of said heterocycloalkyl is optionally substituted by one or more —($C_1$-$C_6$)alkyl;
—($C_1$-$C_6$)alkylene-C(O)-heterocycloalkyl, wherein said heterocycloalkyl is optionally substituted by one or more —($C_1$-$C_6$)alkyl;
and
—($C_1$-$C_6$)alkylene-heterocycloalkyl, wherein said heterocycloalkyl is optionally substituted by one or more groups selected from —($C_1$-$C_6$)alkyl, —($C_1$-$C_6$)alkoxy, —($C_1$-$C_6$)alkylene-OH, —($C_1$-$C_6$)alkylene-CN, —($C_1$-$C_6$)haloalkyl, —C(O)—($C_1$-$C_6$)alkyl, —($C_1$-$C_6$)alkylene-C(O)O—($C_1$-$C_6$)alkyl, —C(O)O—($C_1$-$C_6$)alkyl, —($C_1$-$C_6$)alkylene-NH$_2$, —($C_1$-$C_6$)alkylene-NR$_A$R$_C$, —($C_1$-$C_6$)alkylene-CONR$_A$R$_C$, —($C_1$-$C_6$)alkylene-NR$_C$—CO—($C_1$-$C_6$)alkyl, —($C_1$-$C_6$)alkylene-NR$_C$—C(O)O—($C_1$-$C_6$)alkyl, —($C_1$-$C_6$)alkylene-NHSO$_2$—($C_1$-$C_6$)alkyl, —SO$_2$—($C_1$-$C_6$)alkyl and —($C_1$-$C_6$)alkylene-SO$_2$—($C_1$-$C_6$)alkyl;

$R_A$ is selected from the group consisting of —($C_1$-$C_6$)alkyl and —($C_1$-$C_6$)alkylene-OH;

$R_B$ is heterocycloalkyl;

$R_c$ is H or selected from the group consisting of —($C_1$-$C_6$)alkyl and —($C_1$-$C_6$)alkylene-OH;

$R_8$ is H or is selected from the group consisting of —($C_1$-$C_6$)alkyl, cycloalkyl, —($C_1$-$C_6$)alkylene-OH, —($C_1$-$C_6$)alkylene-C(O)O—($C_1$-$C_6$)alkyl, -cycloalkyl-C(O)O—($C_1$-$C_6$)alkyl and —($C_1$-$C_6$)haloalkyl;

and pharmaceutically acceptable salts thereof.

In a second aspect, the invention refers to a pharmaceutical composition comprising a compound of formula (I) and pharmaceutically acceptable salts thereof in admixture with one or more pharmaceutically acceptable carrier or excipient.

In a third aspect, the invention refers to a compound of formula (I) and pharmaceutically acceptable salts thereof or to a pharmaceutical composition comprising a compound of formula (I) and pharmaceutically acceptable salts thereof for use as a medicament.

In a further aspect, the invention refers to a compound of formula (I) and pharmaceutically acceptable salts thereof or to a pharmaceutical composition comprising a compound of formula (I) and pharmaceutically acceptable salts thereof for use in preventing and/or treating a disease, disorder or condition mediated by ALK5 receptor in a mammal.

In a further aspect, the invention refers to a compound of formula (I) and pharmaceutically acceptable salts thereof or to a pharmaceutical composition comprising a compound of formula (I) and pharmaceutically acceptable salts thereof for use in the prevention and/or treatment of fibrosis and/or diseases, disorders, or conditions that involve fibrosis.

In a further aspect, the invention refers to a compound of formula (I) and pharmaceutically acceptable salts thereof or to a pharmaceutical composition comprising a compound of formula (I) and pharmaceutically acceptable salts thereof for use in the prevention and/or treatment idiopathic pulmonary fibrosis (IPF).

DETAILED DESCRIPTION OF THE INVENTION

Definitions

Unless otherwise specified, the compound of formula (I) of the present invention is intended to include also stereoisomer, tautomer or pharmaceutically acceptable salt or solvate thereof.

The term "pharmaceutically acceptable salts", as used herein, refers to derivatives of compounds of formula (I) wherein the parent compound is suitably modified by converting any of the free acid or basic group, if present, into the corresponding addition salt with any base or acid conventionally intended as being pharmaceutically acceptable.

Suitable examples of said salts may thus include mineral or organic acid addition salts of basic residues such as amino groups, as well as mineral or organic basic addition salts of acid residues such as carboxylic groups.

Cations of inorganic bases which can be suitably used to prepare salts comprise ions of alkali or alkaline earth metals such as potassium, sodium, calcium or magnesium.

Those obtained by reacting the main compound, functioning as a base, with an inorganic or organic acid to form a salt comprise, for example, salts of hydrochloric acid, hydrobromic acid, sulfuric acid, phosphoric acid, methane sulfonic acid, camphor sulfonic acid, acetic acid, oxalic acid, maleic acid, fumaric acid, succinic acid and citric acid.

The term "solvate" means a physical association of a compound of this invention with one or more solvent molecules, whether organic or inorganic. This physical association includes hydrogen bonding. In certain instances, the solvate will be capable of isolation, for example, when one or more solvent molecules are incorporated in the crystal lattice of the crystalline solid. The solvate may comprise either a stoichiometric or nonstoichiometric amount of the solvent molecules.

The term "stereoisomer" refers to isomers of identical constitution that differ in the arrangement of their atoms in space. Enantiomers and diastereomers are examples of stereoisomers.

The term "enantiomer" refers to one of a pair of molecular species that are mirror images of each other and are not superimposable.

The term "diastereomer" refers to stereoisomers that are not mirror images.

The term "racemate" or "racemic mixture" refers to a composition composed of equimolar quantities of two enantiomeric species, wherein the composition is devoid of optical activity.

The symbols "R" and "S" represent the configuration of substituents around a chiral carbon atom(s). The isomeric descriptors "R" and "S" are used as described herein for indicating atom configuration(s) relative to a core molecule and are intended to be used as defined in the literature (IUPAC Recommendations 1996, Pure and Applied Chemistry, 68:2193-2222 (1996)).

The term "tautomer" refers to each of two or more isomers of a compound that exist together in equilibrium and are readily interchanged by migration of an atom or group within the molecule.

The term "halogen" or "halogen atoms" or "halo" as used herein includes fluorine, chlorine, bromine, and iodine atom.

The term "($C_x$-$C_y$)alkyl" wherein x and y are integers, refers to a straight or branched chain alkyl group having from x to y carbon atoms. Thus, when x is 1 and y is 6, for example, the term includes methyl, ethyl, N-propyl, isopropyl, N-butyl, isobutyl, sec-butyl, t-butyl, N-pentyl and N-hexyl.

The term "$(C_x-C_y)$alkoxy" wherein x and y are integers, refers to a straight or branched hydrocarbon of the indicated number of carbons, linked to the rest of the molecule through an oxygen bridge.

The term "$(C_x-C_y)$alkylene" wherein x and y are integers, refers to a $C_x-C_y$alkyl radical having in total two unsatisfied valencies, such as a divalent methylene radical.

The expressions "$(C_x-C_y)$haloalkyl" wherein x and y are integers, refer to the above defined "$C_x-C_y$alkyl" groups wherein one or more hydrogen atoms are replaced by one or more halogen atoms, which can be the same or different.

Examples of said "$(C_x-C_y)$haloalkyl" groups may thus include halogenated, poly-halogenated and fully halogenated alkyl groups wherein all hydrogen atoms are replaced by halogen atoms, e.g. trifluoromethyl.

The term "$(C_x-C_x)$cycloalkyl" wherein x and y are integers, refers to saturated cyclic hydrocarbon groups containing the indicated number of ring carbon atoms. Examples include cyclopropyl, cyclobutyl, cyclopentyl, cyclohexyl, cycloheptyl.

The term "aryl" refers to mono cyclic carbon ring systems which have 6 ring atoms wherein the ring is aromatic. Examples of suitable aryl monocyclic ring systems include, for instance, phenyl.

The term "heteroaryl" refers to a mono- or bi-cyclic aromatic group containing one or more heteroatoms selected from S, N and O, and includes groups having two such monocyclic rings, or one such monocyclic ring and one monocyclic aryl ring, which are fused through a common bond.

The term "$(C_x-C_y)$heterocycloalkyl" wherein x and y are integers, refers to saturated or partially unsaturated monocyclic or bicyclic $(C_x-C_y)$cycloalkyl groups in which at least one ring carbon atom is replaced by at least one heteroatom (e.g. N, S or O) or may bear an -oxo (=O) substituent group. Said heterocycloalkyl may be further optionally substituted on the available positions in the ring, namely on a carbon atom, or on a heteroatom available for substitution. Substitution may be on a carbon atom including spiro disubstitution, forming bicyclic system where two heterocyclic rings or a heterocycloalkyl and a cycloalkyl ring are connected through a single carbon atom. Subtitution may also be on two adjacent carbon atoms forming an additional condensed 5 to 6 membered heterocycloalkyl ring. Moreover, said heterocycloalkyl may be a diazabicyclo ring.

The term "—$(C_x-C_y)$alkylene-heterocycloalkyl" refers to an heterocycloalkyl ring linked to a —$(C_x-C_y)$alkylene group, both as defined above.

The term "N-oxide-heterocycloalkyl" refers to a heterocycloalkyl containing one nitrogen atom which has an oxygen atom as substituent.

Throughout the specification the use of an asterisk "*" in the definition of a structural formula, indicates the point of attachment for the radical group to the rest of the molecule.

A dash ("-") that is not between two letters or symbols is meant to represent the point of attachment for a sub substituent.

The carbonyl group is herein preferably represented as —C(O)— as an alternative to the other common representations such as —CO—, —(CO)— or —C(=O)—

In general, the bracketed group is a lateral group, not included into the chain, and brackets are used, when deemed useful, to help disambiguating linear chemical formulas; e.g.

the sulfonyl group —$SO_2$— might be also represented as —$S(O)_2$— to disambiguate e.g. with respect to the sulfinic group —S(O)O—.

The present invention relates to novel compounds differing from the structures disclosed in the art at least for a common new core scaffold. In fact the invention relates to compounds that are [pyridazin-4-yl]amino derivatives, which are inhibitors of receptor ALK5 that have therapeutically desirable characteristics, particularly promising for some fibrosis, including idiopathic pulmonary fibrosis (IPF).

The compounds of the invention are active as inhibitors of ALK5 receptor, they are potent and show improved properties such as a good inhalatory profile, a low metabolic stability, a low systemic exposure, improved safety and tolerability, and a good selectivity across the kinome.

In this respect, the state of the art does not describe or suggest pyridazinyl amino derivatives of general formula (I) of the present invention having an inhibitory activity on receptor ALK5 which represents a solution to the aforementioned need.

Amgen discloses, among other compounds, pyridazinyl amino derivatives. The compounds of formula (I) of the present invention differ from the Amgen ones at least for the substituents on rings A1, A2 and A3. Amgen discloses compounds as vanilloid receptor ligands for the treatment of a large number of diseases and disordes. Amgen neither discloses compounds as ALK5 inhibitors, nor compounds for the treatment of fibrosis.

Vertex describes, among others, pyridazine derivatives. The compounds of formula (I) of the present invention differ from the Vertex ones at least for the presence of a pyridyl or pyridyl condensed group linked to the amino linker bearing the pyridazine ring, instead of a triazole group. Vertex compounds are described as protein kinase inhibitors useful for the treatment of cancer, diabetes, Alzheimer's disease and schizophrenia. Vertex neither describes compounds as ALK5 inhibitors, nor for the treatment of fibrosis.

Ortho-McNeil describes pyridazine compounds. The compounds of formula (I) of the present invention differ from the Ortho-McNeil ones at least for the position of the two nitrogen atoms in the pyridazine ring. Ortho-McNeil compounds are described as tyrosine kinase inhibitors useful as anti-tumor agents, and to treat diabetic retinopathy, rheumatoid arthritis, endometriosis and psoriasis. Ortho-McNeil neither discloses compounds as ALK5 inhibitors, nor compounds for the treatment of fibrosis.

In more details, the present invention refers to a series of compounds represented by the general formula (I) as herein below described in details, which are endowed with an inhibitory activity on receptor ALK5.

Advantageously, the inhibitory action on receptor ALK5 can be effective in the treatment of those diseases where these receptors play a relevant role in the pathogenesis such as fibrosis and disease, disorder and condition from fibrosis.

Differently from similar compounds of the prior art, the compounds of formula (I) of the present invention are able to act as antagonists of ALK5 receptor, particularly appreciated by the skilled person when looking at a suitable and efficacious compounds useful for the treatment of fibrosis, in particular idiopathic pulmonary fibrosis.

As indicated in the experimental part, in particular in Table 4, the compounds of formula (I) of the present invention show a notable potency with respect to their inhibitory activity on receptor ALK5, below about 10 nM, confirming that they are able to inhibit the ALK5 receptor involved in fibrosis and diseases that result from fibrosis.

As indicated in the experimental part, comparative examples, in particular in Table 4, it is shown that, conversely to the compounds C1 and C2 characterized by lacking a pyridinyl or a pyridinyl condensed group linked to the amino group bearing the pyridazine ring, the presence of a pyridinyl or a pyridinyl condensed group linked to the amino group bearing the pyridazine ring in the present invention compounds unexpectedly and remarkably determines a relevant increase in the inhibitory activity on the ALK5 receptor.

Moreover, as indicated in the same Table 4, conversely to the compound C3 characterized by a NH₂ group on the pyridine ring and falling within the scope of Amgen's general formula, the presence of the particular substituents on the pyridine ring described in the present invention unexpectedly and exceptionally determines a relevant increase in the inhibitory activity on the ALK5 receptor.

Advantageously, the compounds of the present invention are endowed by a very high potency, they could be administered in human at a lower dosage respect to the compounds of the prior art, thus reducing the adverse events that typically occur administering higher dosages of drug.

In addition to being notably potent with respect to their inhibitory activity on receptor ALK5, the compounds of the present invention are also characterized by a good inhalatory profile, that permits to act effectively on the lung compartment and have, at the same time, a low metabolic stability, that allows to minimize the drawbacks associated with the systemic exposure, such as safety and tolerability issues.

Therefore, the compounds of the present invention are particularly appreciated by the skilled person when looking at a suitable and efficacious compounds useful for the treatment of fibrosis, in particular idiopathic pulmonary fibrosis, administered by the inhalation route and characterized by a good inhalatory profile, that corresponds to a good activity on the lung, a good lung retention and to a low metabolic stability, that minimizes the systemic exposure and correlated safety issues.

Thus, in one aspect the present invention relates to a compound of general formula (I)

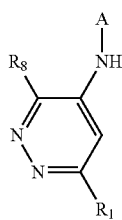

(I)

wherein
R₁ is aryl optionally substituted by one or more groups selected from halogen atoms, —(C₁-C₆)alkyl and —(C₁-C₆)haloalkyl;
A is selected from the groups consisting of A1, A2 and A3

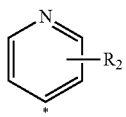

A1

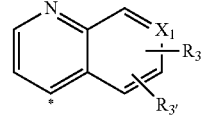

A2

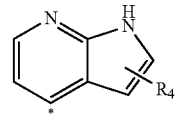

A3

R₂ is selected from the group consisting of —NR₅C(O)R₆ and —NR₅R₆;
X₁ is C, CH or N;
R₃ is selected from the group consisting of —C(O)NR₅R₇, —C(O)OR₇, —OC(O)R₇, —OR₇, —NR₅C(O)R₇ and —OC(O)NR₅R₇;
R₃' is H or is selected from the group consisting of —(C₁-C₆)alkoxy, —OH, —C(O)O—(C₁-C₆)alkyl and —C(O)NH-heterocycloalkyl, wherein said heterocycloalkyl is substituted by one —(C₁-C₆)alkyl;
R₄ is selected from the group consisting of —C(O)NR₅R₇ and —C(O)heterocycloalkyl, wherein said heterocycloalkyl is optionally substituted by one or more —(C₁-C₆)alkyl;
R₅ is H or —(C₁-C₆)alkyl;
R₆ is selected from the group consisting of —(C₁-C₆)alkylene-NR_AR_B; —NH—(C₁-C₆)alkylene-heterocycloalkyl, wherein said heterocycloalkyl is optionally substituted by one or more —(C₁-C₆)alkyl; heteroaryl optionally substituted by one or more groups selected from —(C₁-C₆)alkylene-NR_AR_C and —(C₁-C₆)alkylene-heterocycloalkyl, wherein said heterocycloalkyl is optionally substituted by one or more —(C₁-C₆)alkyl; —(C₁-C₆)alkylene-NR_C—(C₁-C₆)alkylene-NR_AR_C; —(C₁-C₆)alkylene-NR_A—C(O)O—(C₁-C₆)alkyl; cycloalkyl optionally substituted by a heterocycloalkyl, wherein said heterocycloalkyl is optionally substituted by one or more —(C₁-C₆)alkyl; heterocycloalkyl optionally substituted by one or more —(C₁-C6)alkyl; —(C₁-C₆)alkylene-N-oxide-heterocycloalkyl; and —(C₁-C₆)alkylene-heterocycloalkyl, wherein said heterocycloalkyl is optionally substituted by one or more groups selected from —OH, halogen, —(C₁-C₆)alkyl, —(C₁-C₆)alkoxy, —(C₁-C₆)alkylene-OH, —(C₁-C₆)alkylene-CN, —(C₁-C₆)haloalkyl, —C(O)—(C₁-C₆)alkyl, —C(O)OH, —C(O)O(C₁-C₆)alkyl, —C(O)O-cycloalkyl, —C(O)O-heterocycloalkyl, —(C₁-C₆)alkylene-C(O)O—R_C, —(C₁-C₆)alkylene-NR_C—C(O)O—(C₁-C₆)alkyl, —SO₂—(C₁-C₆)alkyl, —(C₁-C₆)alkylene-NH₂, —(C₁-C₆)alkylene-NR_AR_C, —(C₁-C₆)alkylene-SO₂—(C₁-C₆)alkyl, —(C₁-C₆)alkylene-NHSO₂—(C₁-C₆)alkyl, —SO₂—(C₁-C₆)alkyl and oxo;
R₇ is selected from the group consisting of:
(C₁-C₆)alkylene-NR_AR_B;
heterocycloalkyl optionally substituted by one or more groups selected from —(C₁-C₆)alkyl, —(C₁-C₆)alkylene-SO₂—(C₁-C₆)alkyl, —(C₁-C₆)alkylene-OH, —(C₁-C₆)alkylene-NR_AR_C, heterocycloalkyl, —C(O)O-heterocycloalkyl, —(C₁-C₆)alkylene-heterocycloalkyl, wherein each of said heterocycloalkyl is optionally substituted by one or more —(C₁-C₆)alkyl;

—(C$_1$-C$_6$)alkylene-C(O)-heterocycloalkyl, wherein said heterocycloalkyl is optionally substituted by one or more —(C$_1$-C$_6$)alkyl;
and
—(C$_1$-C$_6$)alkylene-heterocycloalkyl, wherein said heterocycloalkyl is optionally substituted by one or more groups selected from —(C$_1$-C$_6$)alkyl, —(C$_1$-C$_6$)alkoxy, —(C$_1$-C$_6$)alkylene-OH, —(C$_1$-C$_6$)alkylene-CN, —(C$_1$-C$_6$)haloalkyl, —C(O)—(C$_1$-C$_6$)alkyl, —(C$_1$-C$_6$)alkylene-C(O)O—(C$_1$-C$_6$)alkyl, —C(O)O—(C$_1$-C$_6$)alkyl, —(C$_1$-C$_6$)alkylene-NH$_2$, —(C$_1$-C$_6$)alkylene-NR$_A$R$_C$, —(C$_1$-C$_6$)alkylene-CONR$_A$R$_C$, —(C$_1$-C$_6$)alkylene-NR$_C$—CO—(C$_1$-C$_6$)alkyl, —(C$_1$-C$_6$)alkylene-NR$_C$—C(O)O—(C$_1$-C$_6$)alkyl, —(C$_1$-C$_6$)alkylene-NHSO$_2$—(C$_1$-C$_6$)alkyl, —SO$_2$—(C$_1$-C$_6$)alkyl and —(C$_1$-C$_6$)alkylene-SO$_2$—(C$_1$-C$_6$)alkyl;

R$_A$ is selected from the group consisting of —(C$_1$-C$_6$)alkyl and —(C$_1$-C$_6$)alkylene-OH;
R$_B$ is heterocycloalkyl;
R$_C$ is H or selected from the group consisting of —(C$_1$-C$_6$)alkyl and —(C$_1$-C$_6$)alkylene-OH;
R$_8$ is H or is selected from the group consisting of —(C$_1$-C$_6$)alkyl, cycloalkyl, —(C$_1$-C$_6$)alkylene-OH, —(C$_1$-C$_6$)alkylene-C(O)O—(C$_1$-C$_6$)alkyl, -cycloalkyl-C(O)O—(C$_1$-C$_6$)alkyl and —(C$_1$-C$_6$)haloalkyl;
and pharmaceutically acceptable salts thereof.

In another aspect the present invention relates to a compound of general formula (I)

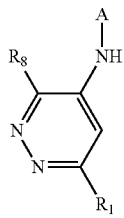

(I)

wherein
R$_1$ is aryl optionally substituted by one or more halogen atoms;
A is selected from the groups consisting of A1, A2 and A3

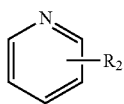

A1

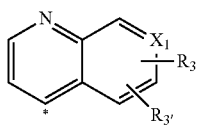

A2

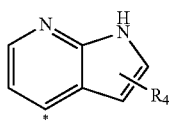

A3

R$_2$ is selected from the group consisting of —NR$_5$C(O)R$_6$ and —NR$_5$R$_6$;
X$_1$ is C, CH or N;
R$_3$ is selected from the group consisting of —C(O)NR$_5$R$_7$, —C(O)OR$_7$, —OC(O)R$_7$, —OR$_7$, —NR$_5$C(O)R$_7$ and —OC(O)NR$_5$R$_7$;
R$_4$ is selected from the group consisting of —C(O)NR$_5$R$_7$ and —C(O)heterocycloalkyl, wherein said heterocycloalkyl is optionally substituted by one or more —(C$_1$-C$_6$)alkyl;
R$_5$ is H or —(C$_1$-C$_6$)alkyl;
R$_6$ is selected from the group consisting of —(C$_1$-C$_6$)alkylene-NR$_A$R$_B$, cycloalkyl, heterocycloalkyl substituted by one or more —(C$_1$-C$_6$)alkyl, and —(C$_1$-C$_6$)alkylene-heterocycloalkyl, wherein said heterocycloalkyl is optionally substituted by one or more groups selected from —(C$_1$-C$_6$)alkyl, —(C$_1$-C$_6$)haloalkyl, —C(O)—(C$_1$-C$_6$)alkyl, —SO$_2$—(C$_1$-C$_6$)alkyl and oxo;
R$_7$ is selected from the group consisting of:
(C$_1$-C$_6$)alkylene-NR$_A$R$_B$,
heterocycloalkyl substituted by one or more —(C$_1$-C$_6$)alkyl,
—(C$_1$-C$_6$)alkylene-C(O)-heterocycloalkyl, wherein said heterocycloalkyl is optionally substituted by one or more —(C$_1$-C$_6$)alkyl and
—(C$_1$-C$_6$)alkylene-heterocycloalkyl, wherein said heterocycloalkyl is optionally substituted by one or more groups selected from —(C$_1$-C$_6$)alkyl, —(C$_1$-C$_6$)haloalkyl and —C(O)—(C$_1$-C$_6$)alkyl;
R$_A$ is —(C$_1$-C$_6$)alkyl;
R$_B$ is heterocycloalkyl;
R$_8$ is H or —(C$_1$-C$_6$)alkyl;
and pharmaceutically acceptable salts thereof.

In a more preferred embodiment the present invention refers to a compound of formula (I) wherein R$_1$ is phenyl substituted by one or more groups selected from fluorine, chlorine, CHF$_2$ and propan-2-yl.

In another preferred embodiment, R$_5$ is H or —CH$_3$.

In a particularly preferred embodiment the present invention refers to a compound of formula (I), wherein A is A1

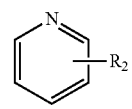

A1 represented by the formula (Ia)

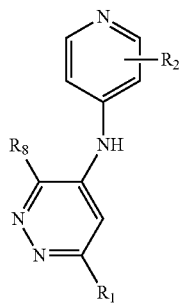

(Ia)

R₁ is aryl optionally substituted by one or more groups selected from halogen atoms, —(C₁-C₆)alkyl and —(C₁-C₆)haloalkyl;

R₂ is selected from the group consisting of —NR₅C(O)R₆ and —NR₅R₆;

R₅ is H or —(C₁-C₆)alkyl;

R₆ is selected from the group consisting of —(C₁-C₆)alkylene-NR_AR_B; —NH—(C₁-C₆)alkylene-heterocycloalkyl, wherein said heterocycloalkyl is optionally substituted by one or more —(C₁-C₆)alkyl, heteroaryl optionally substituted by one or more groups selected from —(C₁-C₆)alkylene-NR_AR_C and —(C₁-C₆)alkylene-heterocycloalkyl, wherein said heterocycloalkyl is optionally substituted by one or more —(C₁-C₆)alkyl; —(C₁-C₆)alkylene-NR_C—(C₁-C₆)alkylene-NR_AR_C, —(C₁-C₆)alkylene-NR_A—C(O)O—(C₁-C₆)alkyl; cycloalkyl optionally substituted by a heterocycloalkyl, wherein said heterocycloalkyl is optionally substituted by one or more —(C₁-C₆)alkyl; heterocycloalkyl optionally substituted by one or more —(C₁-C₆)alkyl; —(C₁-C₆)alkylene-N-oxide-heterocycloalkyl; and —(C₁-C₆)alkylene-heterocycloalkyl, wherein said heterocycloalkyl is optionally substituted by one or more groups selected from —OH, halogen, —(C₁-C₆)alkyl, —(C₁-C₆)alkoxy, —(C₁-C₆)alkylene-OH, —(C₁-C₆)alkylene-CN, —(C₁-C₆)haloalkyl, —C(O)—(C₁-C₆)alkyl, —C(O)OH, —C(O)O—(C₁-C₆)alkyl, —C(O)O-cycloalkyl, —C(O)O-heterocycloalkyl, —(C₁-C₆)alkylene-C(O)O—R_c, —(C₁-C₆)alkylene-NR_C—C(O)O—(C₁-C₆)alkyl, —SO₂—(C₁-C₆)alkyl, —(C₁-C₆)alkylene-NH₂, —(C₁-C₆)alkylene-NR_AR_C, —(C₁-C₆)alkylene-SO₂—(C₁-C₆)alkyl, —(C₁-C₆)alkylene-NHSO₂—(C₁-C₆)alkyl, —SO₂—(C₁-C₆)alkyl and oxo;

R_A is —(C₁-C₆)alkyl;

R_B is heterocycloalkyl;

R_C is H or selected from the group consisting of —(C₁-C₆)alkyl and —(C₁-C₆)alkylene-OH;

R₈ is H or is selected from the group consisting of —(C₁-C₆)alkyl, cycloalkyl, —(C₁-C₆)alkylene-OH, —(C₁-C₆)alkylene-C(O)O—(C₁-C₆)alkyl, -cycloalkyl—C(O)O—(C₁-C₆)alkyl and —(C₁-C₆)haloalkyl;

and pharmaceutically acceptable salts thereof.

In a even more preferred embodiment the present invention refers to a compound of formula (I), wherein A is Ala

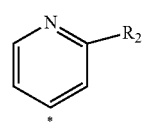

represented by the formula (Iaa)

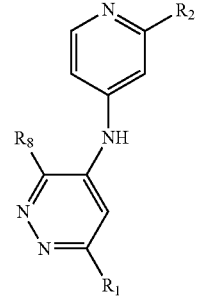

(Iaa)

R₁ is aryl optionally substituted by one or more groups selected from halogen atoms, —(C₁-C₆)alkyl and —(C₁-C₆)haloalkyl;

R₂ is selected from the group consisting of —NR₅C(O)R₆ and —NR₅R₆;

R₅ is H or —(C₁-C₆)alkyl;

R₆ is selected from the group consisting of —(C₁-C₆)alkylene-NR_AR_B; —NH—(C₁-C₆)alkylene-heterocycloalkyl, wherein said heterocycloalkyl is optionally substituted by one or more —(C₁-C₆)alkyl; heteroaryl optionally substituted by one or more groups selected from —(C₁-C₆)alkylene-NR_AR_C and —(C₁-C₆)alkylene-heterocycloalkyl, wherein said heterocycloalkyl is optionally substituted by one or more —(C₁-C₆)alkyl; —(C₁-C₆)alkylene-NR_C—(C₁-C₆)alkylene-NR_AR_C; —(C₁-C₆)alkylene-NR_A—C(O)O—(C₁-C₆)alkyl; cycloalkyl optionally substituted by a heterocycloalkyl, wherein said heterocycloalkyl is optionally substituted by one or more —(C₁-C₆)alkyl; heterocycloalkyl optionally substituted by one or more —(C₁-C₆)alkyl; —(C₁-C₆)alkylene-N-oxide-heterocycloalkyl; and —(C₁-C₆)alkylene-heterocycloalkyl, wherein said heterocycloalkyl is optionally substituted by one or more groups selected from —OH, halogen, —(C₁-C₆)alkyl, —(C₁-C₆)alkoxy, —(C₁-C₆)alkylene-OH, —(C₁-C₆)alkylene-CN, —(C₁-C₆)haloalkyl, —C(O)—(C₁-C₆)alkyl, —C(O)OH, —C(O)O—(C₁-C₆)alkyl, —C(O)O-cycloalkyl, —C(O)O-heterocycloalkyl, —(C₁-C₆)alkylene-C(O)O—R_c, —(C₁-C₆)alkylene-NR_C—C(O)O—(C₁-C₆)alkyl, —SO₂—(C₁-C₆)alkyl, —(C₁-C₆)alkylene-NH₂, —(C₁-C₆)alkylene-NR_AR_C, —(C₁-C₆)alkylene-SO₂—(C₁-C₆)alkyl, —(C₁-C₆)alkylene-NHSO₂—(C₁-C₆)alkyl, —SO₂—(C₁-C₆)alkyl and oxo;

R_A is —(C₁-C₆)alkyl;

R_B is heterocycloalkyl;

R_C is H or selected from the group consisting of —(C₁-C₆)alkyl and —(C₁-C₆)alkylene-OH;

R₈ is H or is selected from the group consisting of —(C₁-C₆)alkyl, cycloalkyl, —(C₁-C₆)alkylene-OH, —(C₁-C₆)alkylene-C(O)O—(C₁-C₆)alkyl, -cycloalkyl-C(O)O—(C₁-C₆)alkyl and —(C₁-C₆)haloalkyl;

and pharmaceutically acceptable salts thereof.

According to a preferred embodiment, the invention refers to at least one of the compounds of Formula (Iaa) listed in the Table 1 below and pharmaceutically acceptable salts thereof.

TABLE 1

List of preferred compounds of Formula (Iaa)

| Example No | Structure | Chemical Name |
|---|---|---|
| 1 | | N-(4-{[6-(5-chloro-2-fluorophenyl)pyridazin-4-yl]amino}pyridin-2-yl)-3-(morpholin-4-yl)propanamide |
| 2 | | N-(4-{[6-(5-chloro-2-fluorophenyl)pyridazin-4-yl]amino}pyridin-2-yl)-3-(piperazin-1-yl)propanamide |
| 7 | | N-(4-{[6-(5-chloro-2-fluorophenyl)pyridazin-4-ylamino}pyridin-2-yl)cyclopropanecarboxamide |
| 8 | | N-(4-{[6-(5-chloro-2-fluorophenyl)pyridazin-4-yl]amino}pyridin-2-yl)-4-(morpholin-4-yl)butanamide |
| 11 | | N-(4-{[6-(5-chloro-2-fluorophenyl)pyridazin-4-yl]amino}pyridin-2-yl)-3-(4-methylpiperazin-1-yl)propanamide |
| 15 | | N-(4-{[6-(5-chloro-2-fluorophenyl)-3-methylpyridazin-4-yl]amino}pyridin-2-yl)cyclopropanecarboxamide |
| 16 | | N-(4-{[6-(5-chloro-2-fluorophenyl)-3-methylpyridazin-4-yl]amino}pyridin-2-yl)-3-(4-methylpiperazin-1-yl)propanamide |
| 18 | | N-(4-{[6-(5-chloro-2-fluorophenyl)pyridazin-4-ylamino}pyridin-2-yl)-3-[methyl(oxetan-3-yl)amino]propanamide |

TABLE 1-continued

List of preferred compounds of Formula (Iaa)

| Example No | Structure | Chemical Name |
|---|---|---|
| 19 | | N-(4-{[6-(5-chloro-2-fluorophenyl)pyridazin-4-yl]amino}pyridin-2-yl)-1-methylpiperidine-4-carboxamide |
| 22 | | N-(4-{[6-(5-chloro-2-fluorophenyl)pyridazin-4-yl]amino}pyridin-2-yl)-3-(4-methyl-2-oxopiperazin-1-yl)propanamide |
| 24 | | N-(4-{[6-(5-chloro-2-fluorophenyl)pyridazin-4-yl]amino}pyridin-2-yl)-3-(4-methyl-3-oxopiperazin-1-yl)propanamide |
| 31 | | 3-(4-acetylpiperazin-1-yl)-N-(4-{[6-(5-chloro-2-fluorophenyl)pyridazin-4-yl]amino}pyridin-2-yl)propanamide |
| 33 | | N-(4-{[6-(5-chloro-2-fluorophenyl)pyridazin-4-yl]amino}pyridin-2-yl)-3-(3-methyl-1,3-diazinan-1-yl)propanamide |
| 34 | | N-(4-{[6-(5-chloro-2-fluorophenyl)pyridazin-4-yl]amino}pyridin-2-yl)-3-(4-methanesulfonylpiperazin-1-yl)propanamide |
| 43 | | 3-(3-acetyl-1,3-diazinan-1-yl)-N-(4-{[6-(5-chloro-2-fluorophenyl)pyridazin-4-yl]amino}pyridin-2-yl)propanamide |
| 44 | | N-(4-{[6-(5-chloro-2-fluorophenyl)pyridazin-4-yl]amino}pyridin-2-yl)-3-(3-methanesulfonyl-1,3-diazinan-1-yl)propanamide |

TABLE 1-continued

List of preferred compounds of Formula (Iaa)

| Example No | Structure | Chemical Name |
| --- | --- | --- |
| 46 | | N-4-[6-(5-chloro-2-fluorophenyl)pyridazin-4-yl]-N2-[3-(4-methylpiperazin-1-yl)propyl]pyridine-2,4-diamine |
| 47 | | N-(4-{[6-(5-chloro-2-fluorophenyl)pyridazin-4-yl]amino}pyridin-2-yl)-3-[4-(2,2,2-trifluoroethyl)piperazin-1-yl]propanamide |
| 59 | | N-(4-{[6-(5-chloro-2-fluorophenyl)pyridazin-4-yl]amino}pyridin-2-yl)-3-[3-(2,2,2-trifluoroethyl)-1,3-diazinan-1-yl]propanamide |
| 65 | | N-(4-{[6-(5-chloro-2-fluorophenyl)-3-methylpyridazin-4-yl]amino}pyridin-2-yl)-4-(4-methylpiperazin-1-yl)butanamide |
| 74 | | N-(4-{[6-(5-chloro-2-fluorophenyl)-3-methylpyridazin-4-yl]amino}pyridin-2-yl)-3-(piperazin-1-yl)propanamide |
| 76 | | 3-[4-(2-aminoethyl)piperazin-1-yl]-N-(4-{[6-(5-chloro-2-fluorophenyl)-3-methylpyridazin-4-yl]amino}pyridin-2-yl)propanamide |
| 78 | | N-(4-{[6-(5-chloro-2-fluorophenyl)-3-methylpyridazin-4-yl]amino}pyridin-2-yl)-3-(morpholin-4-yl)propanamide |

TABLE 1-continued

List of preferred compounds of Formula (Iaa)

| Example No | Structure | Chemical Name |
|---|---|---|
| 79 | | N-(4-{[6-(5-chloro-2-fluorophenyl)-3-methylpyridazin-4-yl]amino}pyridin-2-yl)-3-[3-ethoxy-3-(hydroxymethyl)azetidin-1-yl]propanamide |
| 80 | | N-(4-{[6-(5-chloro-2-fluorophenyl)-3-methylpyridazin-4-yl]amino}pyridin-2-yl)-3-[4-(2-hydroxyethyl)piperazin-1-yl]propanamide |
| 82 | | methyl N-[2-(4-{2-[(4-{[6-(5-chloro-2-fluorophenyl)-3-methylpyridazin-4-yl]amino}pyridin-2-yl)carbamoyl]ethyl}piperazin-1-yl)ethyl]carbamate |
| 83 | | N-(4-{[6-(5-chloro-2-fluorophenyl)-3-methylpyridazin-4-yl]amino}pyridin-2-yl)-3-[4-(2-methanesulfonylethyl)piperazin-1-yl]propanamide |
| 84 | | N-(4-{[6-(5-chloro-2-fluorophenyl)-3-methylpyridazin-4-yl]amino}pyridin-2-yl)-3-[4-(2-cyanoethyl)piperazin-1-yl]propanamide |
| 85 | | N-(4-{[6-(5-chloro-2-fluorophenyl)-3-methylpyridazin-4-yl]amino}pyridin-2-yl)-4-methylpiperazine-1-carboxamide |
| 88 | | N-(4-{[6-(5-chloro-2-fluorophenyl)-3-methylpyridazin-4-yl]amino}pyridin-2-yl)-1-methylpiperidine-4-carboxamide |

TABLE 1-continued

List of preferred compounds of Formula (Iaa)

| Example No | Structure | Chemical Name |
|---|---|---|
| 91 | | methyl 4-{2-[(4-{[6-(5-chloro-2-fluorophenyl)-3-methylpyridazin-4-yl]amino}pyridin-2-yl)carbamoyl]ethyl}piperazine-2-carboxylate |
| 92 | | 4-(3-((4-((6-(5-chloro-2-fluorophenyl)-3-methylpyridazin-4-yl)amino)pyridin-2-yl)amino)-3-oxopropyl)piperazine-2-carboxylic acid |
| 93 | | N-(4-{[6-(5-chloro-2-fluorophenyl)-3-methylpyridazin-4-yl]amino}pyridin-2-yl)-3-{[2-(methylamino)ethyl]amino}propanamide |
| 94 | | methyl 4-{2-[(4-{[6-(5-chloro-2-fluorophenyl)-3-methylpyridazin-4-yl]amino}pyridin-2-yl)carbamoyl]ethyl}-1-methylpiperazine-2-carboxylate |
| 95 | | 4-{2-[(4-{[6-(5-chloro-2-fluorophenyl)-3-methylpyridazin-4-yl]amino}pyridin-2-yl)carbamoyl]ethyl}-1-methylpiperazine-2-carboxylic acid |
| 96 | | methyl 2-(4-{[(4-{[6-(5-chloro-2-fluorophenyl)-3-methylpyridazin-4-yl]amino}pyridin-2-yl)carbamoyl]methyl}piperazin-1-yl)acetate |
| 97 | | methyl 2-(4-{2-[(4-{[6-(5-chloro-2-fluorophenyl)-3-methylpyridazin-4-yl]amino}pyridin-2-yl)carbamoyl]ethyl}piperazin-2-yl)acetate |
| 98 | | methyl 2-(4-{2-[(4-{[6-(5-chloro-2-fluorophenyl)-3-methylpyridazin-4-yl]amino}pyridin-2-yl)carbamoyl]ethyl}-1-methylpiperazin-2-yl)acetate |

TABLE 1-continued

List of preferred compounds of Formula (Iaa)

| Example No | Structure | Chemical Name |
|---|---|---|
| 99 | | methyl 1-{2-[(4-{[6-(5-chloro-2-fluorophenyl)-3-methylpyridazin-4-yl]amino}pyridin-2-yl)carbamoyl]ethyl}-4-methylpiperazine-2-carboxylate |
| 101 | | methyl 2-(1-{2-[(4-{[6-(5-chloro-2-fluorophenyl)-3-methylpyridazin-4-yl]amino}pyridin-2-yl)carbamoyl]ethyl}-4-methylpiperazin-2-yl)acetate |
| 102 | | methyl 2-(1-{2-[(4-{[6-(5-chloro-2-fluorophenyl)-3-methylpyridazin-4-yl]amino}pyridin-2-yl)carbamoyl]ethyl}piperazin-2-yl)acetate |
| 104 | | N-(4-{[6-(5-chloro-2-fluorophenyl)-3-methylpyridazin-4-yl]amino}pyridin-2-yl)-3-{4-[2-(methylamino)ethyl]piperazin-1-yl}propanamide |
| 105 | | methyl N-[2-(4-{2-[(4-{[6-(5-chloro-2-fluorophenyl)-3-methylpyridazin-4-yl]amino}pyridin-2-yl)carbamoyl]ethyl}piperazin-1-yl)ethyl]-N-methylcarbamate |
| 106 | | N-(4-{[6-(5-chloro-2-fluorophenyl)-3-methylpyridazin-4-yl]amino}pyridin-2-yl)-2-{4-[2-(methylamino)ethyl]piperazin-1-yl}acetamide |
| 107 | | methyl N-[2-(4-{[(4-{[6-(5-chloro-2-fluorophenyl)-3-methylpyridazin-4-yl]amino}pyridin-2-yl)carbamoyl]methyl}piperazin-1-yl)ethyl]-N-methylcarbamate |

TABLE 1-continued

List of preferred compounds of Formula (Iaa)

| Example No | Structure | Chemical Name |
|---|---|---|
| 108 | | 2-[4-(2-aminoethyl)piperazin-1-yl]-N-(4-{[6-(5-chloro-2-fluorophenyl)-3-methylpyridazin-4-yl]amino}pyridin-2-yl)acetamide |
| 109 | | methyl N-[2-(4-{[(4-{[6-(5-chloro-2-fluorophenyl)-3-methylpyridazin-4-yl]amino}pyridin-2-yl)carbamoyl]methyl}piperazin-1-yl)ethyl]carbamate |
| 110 | | 4-{2-[(4-{[6-(5-chloro-2-fluorophenyl)-3-methylpyridazin-4-yl]amino}pyridin-2-yl)carbamoyl]ethyl}-1,1-dimethylpiperazin-1-ium hydrochloride chloride |
| 111 | | N-(4-{[6-(5-chloro-2-fluorophenyl)-3-methylpyridazin-4-yl]amino}pyridin-2-yl)-3-[(1S,4S)-5-methyl-2,5-diazabicyclo[2.2.1]heptan-2-yl]propanamide |
| 113 | | methyl 4-{2-[(4-{[6-(5-chloro-2-fluorophenyl)-3-methylpyridazin-4-yl]amino}pyridin-2-yl)carbamoyl]ethyl}-1-(propan-2-yl)piperazine-2-carboxylate |
| 116 | | 2-(4-{2-[(4-{[6-(5-chloro-2-fluorophenyl)-3-methylpyridazin-4-yl]amino}pyridin-2-yl)carbamoyl]ethyl}piperazin-2-yl)acetic acid |
| 117 | | N-(4-{[6-(5-chloro-2-fluorophenyl)-3-methylpyridazin-4-yl]amino}pyridin-2-yl)-2-(morpholin-4-yl)acetamide |
| 120 | | N-(4-{[6-(5-chloro-2-fluorophenyl)-3-methylpyridazin-4-yl]amino}pyridin-2-yl)-3-(thiomorpholin-4-yl)propanamide |

TABLE 1-continued

List of preferred compounds of Formula (Iaa)

| Example No | Structure | Chemical Name |
|---|---|---|
| 121 | | N-(4-{[6-(5-chloro-2-fluorophenyl)-3-methylpyridazin-4-yl]amino}pyridin-2-yl)-3-{5-methyl-2,5-diazabicyclo[2.2.1]heptan-2-yl}propanamide hydrochloride |
| 122 | | ethyl 4-{2-[(4-{[6-(5-chloro-2-fluorophenyl)-3-methylpyridazin-4-yl]amino}pyridin-2-yl)carbamoyl]ethyl}-1-methylpiperazine-2-carboxylate |
| 123 | | 4-{[(4-{[6-(5-chloro-2-fluorophenyl)-3-methylpyridazin-4-yl]amino}pyridin-2-yl)carbamoyl]methyl}morpholin-4-ium-4-olate |
| 124 | | N-(4-{[6-(5-chloro-2-fluorophenyl)-3-methylpyridazin-4-yl]amino}pyridin-2-yl)-3-[4-(2,2,2-trifluoroethyl)piperazin-1-yl]propanamide |
| 126 | | propan-2-yl 4-{2-[(4-{[6-(5-chloro-2-fluorophenyl)-3-methylpyridazin-4-yl]amino}pyridin-2-yl)carbamoyl]ethyl}-1-methylpiperazine-2-carboxylate |
| 127 | | cyclopropyl 4-{2-[(4-{[6-(5-chloro-2-fluorophenyl)-3-methylpyridazin-4-yl]amino}pyridin-2-yl)carbamoyl]ethyl}-1-methylpiperazine-2-carboxylate |
| 129 | | oxetan-3-yl 4-{2-[(4-{[6-(5-chloro-2-fluorophenyl)-3-methylpyridazin-4-yl]amino}pyridin-2-yl)carbamoyl]ethyl}-1-methylpiperazine-2-carboxylate |
| 130 | | N-(4-{[6-(5-chloro-2-fluorophenyl)-3-methylpyridazin-4-yl]amino}pyridin-2-yl)-3-(1-oxo-1λ4-thiomorpholin-4-yl)propanamide |

TABLE 1-continued

List of preferred compounds of Formula (Iaa)

| Example No | Structure | Chemical Name |
|---|---|---|
| 131 | | N-(4-{[6-(5-chloro-2-fluorophenyl)-3-methylpyridazin-4-yl]amino}pyridin-2-yl)-2-[4-(2,2,2-trifluoroethyl)piperazin-1-yl]acetamide |
| 132 | | N-(4-{[6-(5-chloro-2-fluorophenyl)-3-methylpyridazin-4-yl]amino}pyridin-2-yl)-3-(1,1-dioxo-1$\lambda^6$-thiomorpholin-4-yl)propanamide |
| 135 | | N-(4-{[6-(5-chloro-2-fluorophenyl)-3-methylpyridazin-4-yl]amino}pyridin-2-yl)-3-{4-methyl-4,7-diazaspiro[2.5]octan-7-yl}propanamide |
| 136 | | N-(4-{[6-(5-chloro-2-fluorophenyl)-3-methylpyridazin-4-yl]amino}pyridin-2-yl)-3-[4-(2-methanesulfonamidoethyl)piperazin-1-yl]propanamide |
| 138 | | N-(4-{[6-(5-chloro-2-fluorophenyl)-3-methylpyridazin-4-yl]amino}pyridin-2-yl)-3-{6-methyl-2,6-diazaspiro[3.3]heptan-2-yl}propanamide |
| 139 | | N-(4-{[6-(5-chloro-2-fluorophenyl)-3-methylpyridazin-4-yl]amino}pyridin-2-yl)-3-(4,4-difluoropiperidin-1-yl)propanamide |
| 140 | | N-(4-{[6-(5-chloro-2-fluorophenyl)-3-methylpyridazin-4-yl]amino}pyridin-2-yl)-3-(4-hydroxypiperidin-1-yl)propanamide |
| 141 | | 1-(4-{[6-(5-chloro-2-fluorophenyl)-3-methylpyridazin-4-yl]amino}pyridin-2-yl)-3-[2-(4-methylpiperazin-1-yl)ethyl]urea |

TABLE 1-continued

List of preferred compounds of Formula (Iaa)

| Example No | Structure | Chemical Name |
| --- | --- | --- |
| 142 | | 1-(4-((6-(5-chloro-2-fluorophenyl)-3-methylpyridazin-4-yl)amino)pyridin-2-yl)-3-((1-methylpiperidin-4-yl)methyl)urea |
| 143 | | N-(4-{[6-(5-chloro-2-fluorophenyl)-3-methylpyridazin-4-yl]amino}pyridin-2-yl)-2-{6-methyl-2,6-diazaspiro[3.3]heptan-2-yl}acetamide |
| 144 | | N-(4-{[6-(5-chloro-2-fluorophenyl)-3-methylpyridazin-4-yl]amino}pyridin-2-yl)-2-{4-methyl-4,7-diazaspiro[2.5]octan-7-yl}acetamide |
| 145 | | N-(4-{[6-(5-chloro-2-fluorophenyl)-3-methylpyridazin-4-yl]amino}pyridin-2-yl)-3-(3,4-dimethylpiperazin-1-yl)propanamide |
| 146 | | N-(4-{[6-(5-chloro-2-fluorophenyl)-3-methylpyridazin-4-yl]amino}pyridin-2-yl)-3-{6-methyl-3,6-diazabicyclo[3.1.1]heptan-3-yl}propanamide |
| 147 | | N-(4-{[6-(5-chloro-2-fluorophenyl)-3-methylpyridazin-4-yl]amino}pyridin-2-yl)-3-{2-methyl-5-oxa-2,8-diazaspiro[3.5]nonan-8-yl}propanamide |
| 149 | | N-(4-{[6-(5-chloro-2-fluorophenyl)-3-methylpyridazin-4-yl]amino}pyridin-2-yl)-2-methyl-2,7-diazaspiro[3.5]nonane-7-carboxamide |

TABLE 1-continued

List of preferred compounds of Formula (Iaa)

| Example No | Structure | Chemical Name |
|---|---|---|
| 150 |  | N-(4-{[6-(5-chloro-2-fluorophenyl)-3-methylpyridazin-4-yl]amino}pyridin-2-yl)-2-methyl-2,8-diazaspiro[4.5]decane-8-carboxamide |
| 151 |  | N-(4-{[6-(5-chloro-2,4-difluorophenyl)-3-methylpyridazin-4-yl]amino}pyridin-2-yl)-3-(4-methylpiperazin-1-yl)propanamide |
| 154 |  | N-(4-{[6-(5-chloro-2-fluorophenyl)-3-methylpyridazin-4-yl]amino}pyridin-2-yl)-2-(1,4-diazepan-1-yl)acetamide |
| 155 |  | N-(4-{[6-(5-chloro-2-fluorophenyl)-3-methylpyridazin-4-yl]amino}pyridin-2-yl)-1-[2-(methylamino)ethyl]-1H-pyrazole-4-carboxamide |
| 156 |  | N-(4-{[6-(5-chloro-2-fluorophenyl)-3-methylpyridazin-4-yl]amino}pyridin-2-yl)-1-[2-(dimethylamino)ethyl]-1H-pyrazole-4-carboxamide |
| 157 |  | N-(4-{[6-(5-chloro-2-fluorophenyl)-3-methylpyridazin-4-yl]amino}pyridin-2-yl)-2-(1-methylpiperidin-4-yl)acetamide |

TABLE 1-continued

List of preferred compounds of Formula (Iaa)

| Example No | Structure | Chemical Name |
|---|---|---|
| 158 | | N-(4-{[6-(5-chloro-2-fluorophenyl)-3-methylpyridazin-4-yl]amino}pyridin-2-yl)-4-(1,4-diazepan-1-yl)butanamide |
| 161 | | N-(4-{[6-(5-chloro-2-fluorophenyl)-3-methylpyridazin-4-yl]amino}pyridin-2-yl)-4-(4-methyl-1,4-diazepan-1-yl)butanamide |
| 162 | | cis N-(4-{[6-(5-chloro-2-fluorophenyl)-3-methylpyridazin-4-yl]amino}pyridin-2-yl)-3-(4-methylpiperazin-1-yl)cyclobutane-1-carboxamide |
| 163 | | N-(4-{[6-(5-chloro-2-fluorophenyl)-3-methylpyridazin-4-yl]amino}pyridin-2-yl)-3-[2-(hydroxymethyl)-4-methylpiperazin-1-yl]propanamide |
| 164 | | N-(4-{[6-(5-chloro-2-fluorophenyl)-3-methylpyridazin-4-yl]amino}pyridin-2-yl)-2-(piperazin-1-yl)acetamide |
| 166 | | N-(4-{[6-(5-chloro-2-fluorophenyl)-3-methylpyridazin-4-yl]amino}pyridin-2-yl)-2-(4-methyl-1,4-diazepan-1-yl)acetamide |
| 167 | | N-4-[6-(5-chloro-2-fluorophenyl)-3-methylpyridazin-4-yl]-N-2-{1-[2-(4-methylpiperazin-1-yl)ethyl]-1H-pyrazol-3-yl}pyridine-2,4-diamine |
| 170 | | N-(4-{[6-(5-chloro-2-fluorophenyl)-3-methylpyridazin-4-yl]amino}pyridin-2-yl)-3-[3-(hydroxymethyl)-4-methylpiperazin-1-yl]propanamide |

TABLE 1-continued

List of preferred compounds of Formula (Iaa)

| Example No | Structure | Chemical Name |
|---|---|---|
| 172 | | N-(4-{[6-(5-chloro-2-fluorophenyl)-3-methylpyridazin-4-yl]amino}pyridin-2-yl)-2-(4-methylpiperazin-1-yl)acetamide |
| 173 | | N-(4-{[6-(5-chloro-2-fluorophenyl)-3-cyclopropylpyridazin-4-yl]amino}pyridin-2-yl)-3-(4-methylpiperazin-1-yl)propanamide |
| 174 | | N-(4-{[6-(5-chloro-2-fluorophenyl)-3-(hydroxymethyl)pyridazin-4-yl]amino}pyridin-2-yl)-3-(4-methylpiperazin-1-yl)propanamide |
| 175 | | methyl N-[2-(4-{[(4-{[6-(5-chloro-2-fluorophenyl)-3-(hydroxymethyl)pyridazin-4-yl]amino}pyridin-2-yl)carbamoyl]methyl}piperazin-1-yl)ethyl]-N-methylcarbamate |
| 176 | | N-(4-{[6-(5-chloro-2-fluorophenyl)-3-(hydroxymethyl)pyridazin-4-yl]amino}pyridin-2-yl)-2-(4-methylpiperazin-1-yl)acetamide |
| 178 | | N-(4-{[6-(5-chloro-2-fluorophenyl)-3-(hydroxymethyl)pyridazin-4-yl]amino}pyridin-2-yl)-2-(4-methyl-1,4-diazepan-1-yl)acetamide |

TABLE 1-continued

List of preferred compounds of Formula (Iaa)

| Example No | Structure | Chemical Name |
|---|---|---|
| 179 | | N-(4-{[6-(5-chloro-2-fluorophenyl)-3-(hydroxymethyl)pyridazin-4-yl]amino}pyridin-2-yl)-2-{2-methyl-2,7-diazaspiro[3.5]nonan-7-yl}acetamide |
| 182 | | N-(4-((6-(5-chloro-2-fluorophenyl)-3-(trifluoromethyl)pyridazin-4-yl)amino)pyridin-2-yl)-3-(4-methylpiperazin-1-yl)propanamide |
| 184 | | N-(4-{[6-(5-chloro-2-fluorophenyl)-3-(trifluoromethyl)pyridazin-4-yl]amino}pyridin-2-yl)-3-[4-(2-hydroxyethyl)piperazin-1-yl]propanamide |
| 185 | | N-(4-{[6-(5-chloro-2-fluorophenyl)-3-(trifluoromethyl)pyridazin-4-yl]amino}pyridin-2-yl)-3-[4-(2-methanesulfonylethyl)piperazin-1-yl]propanamide |
| 186 | | N-(4-{[6-(5-chloro-2-fluorophenyl)-3-(trifluoromethyl)pyridazin-4-yl]amino}pyridin-2-yl)-3-[4-(2-cyanoethyl)piperazin-1-yl]propanamide |

TABLE 1-continued

List of preferred compounds of Formula (Iaa)

| Example No | Structure | Chemical Name |
|---|---|---|
| 187 | 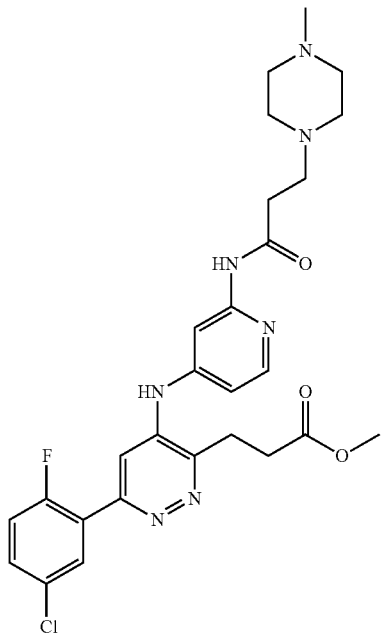 [SMILES: COC(=O)CCc1nnc(-c2cc(Cl)ccc2F)cc1Nc1ccnc(NC(=O)CCN2CCN(C)CC2)c1] | methyl 3-[6-(5-chloro-2-fluorophenyl)-4-({2-[3-(4-methylpiperazin-1-yl)propanamido]pyridin-4-yl}amino)pyridazin-3-yl]propanoate |
| 188 | 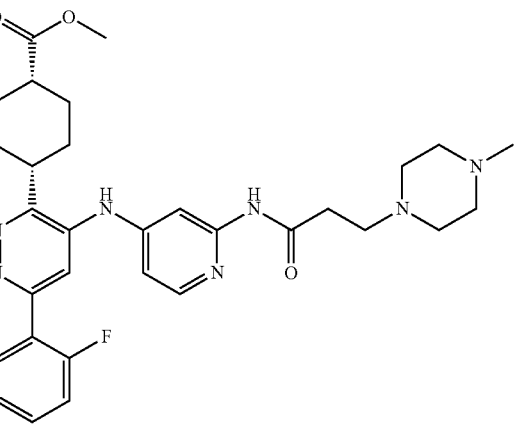 | methyl (1s,4s)-4-(6-(5-chloro-2-fluorophenyl)-4-((2-(3-(4-methylpiperazin-1-yl)propanamido)pyridin-4-yl)amino)pyridazin-3-yl)cyclohexane-1-carboxylate |
| 189 | 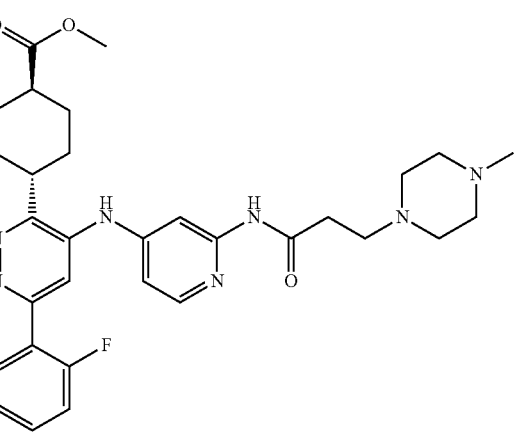 | methyl (1r,4r)-4-(6-(5-chloro-2-fluorophenyl)-4-((2-(3-(4-methylpiperazin-1-yl)propanamido)pyridin-4-yl)amino)pyridazin-3-yl)cyclohexane-1-carboxylate |

TABLE 1-continued

List of preferred compounds of Formula (Iaa)

| Example No | Structure | Chemical Name |
|---|---|---|
| 190 | | N-[4-({6-[5-(difluoromethyl)-2-fluorophenyl]-3-methylpyridazin-4-yl}amino)pyridin-2-yl]-3-(4-methylpiperazin-1-yl)propanamide |
| 191 | | methyl 4-(6-(5-chloro-2-fluorophenyl)-4-((2-(3-(4-methylpiperazin-1-yl)propanamido)pyridin-4-yl)amino)pyridazin-3-yl)butanoate |

In a even more preferred embodiment the present invention refers to a compound of formula (Iaa), wherein $R_2$ is —NHC(O)$R_6$; $R_6$ is selected from the group consisting of cyclopropyl, 1-ethylpiperazine, 4-ethylmorpholine, 1-ethyl-4-methylpiperazine, (4-acetylpiperazin-1-yl)ethyl, 4-propylmorpholine, -(3-methyl-1,3-diazinan-1-yl)ethyl, -(3-methanesulfonyl-1,3-diazinan-1-yl)ethyl, 4-methylmorpholine, N-ethyl-N-methyloxetan-3-amine, 1-methylpiperidine, -1-ethyl-(4-methyl-2-oxopiperazin-1-yl), -4-ethyl-(1-methyl-2-oxopiperazin-1-yl), -(4-methanesulfonylpiperazin-1-yl)ethyl, -(3-acetyl-1,3-diazinan-1-yl)ethyl, -(3-methansulfonyl-1,3-diazinan-1-yl)ethyl, -[4-(2,2,2-trifluoroethyl)piperazin-1-yl]ethyl, -[3-(2,2,2-trifluoroethyl)-1,3-diazinan-1-yl]ethyl, -1-propyl-4-methylpiperazine, -[4-(2-aminoethyl)piperazin-1-yl]ethyl, -[3-ethoxy-3-(hydroxymethyl)azetidin-1-yl]ethyl, -[4-(2-hydroxyethyl)piperazin-1-yl]ethyl, methyl (2-(4-ethylpiperazin-1-yl)ethyl)carbamate, -[4-(2-methanesulfonylethyl)piperazin-1-yl]ethyl, -[4-(2-cyanoethyl)piperazin-1-yl]ethyl, 4-methylpiperazine, methyl 4-ethyl-piperazine-2-carboxylate, 4-ethyl-piperazine-2-carboxylic acid, -[2-(methylamino)ethyl]amino-ethyl, methyl 4-ethyl-1-methylpiperazine-2-carboxylate, 4-ethyl-1-methylpiperazine-2-carboxylic acid, methyl 2-(4-methylpiperazin-1-yl)acetate, methyl 2-(4-ethylpiperazin-2-yl)acetate, methyl 2-(4-ethyl-1-methylpiperazin-2-yl)acetate, methyl 1-ethyl-4-methylpiperazine-2-carboxylate, methyl 2-(1-ethyl-4-methylpiperazin-2-yl)acetate, methyl 2-(1-ethyl-piperazin-2-yl)acetate, -4-[2-(methylamino)ethyl]piperazin-1-yl-ethyl, methyl (2-(4-ethylpiperazin-1-yl)ethyl)-N-methylcarbamate, -4-[2-(methylamino)ethyl]piperazin-1-yl-methyl, methyl (2-(4-methylpiperazin-1-yl)ethyl)-N-methylcarbamate, -[4-(2-aminoethyl)piperazin-1-yl]methyl, methyl (2-(4-methylpiperazin-1-yl)ethyl)carbamate, -4-ethyl 1,1-dimethylpiperazin-1-ium, -[(1S,4S)-5-methyl-2,5-diazabicyclo[2.2.1]heptan-2-yl]-ethyl, methyl 1-isopropyl-4-ethylpiperazine-2-carboxylate, 4-ethylthiomorpholine, -(5-methyl-2,5-diazabicyclo[2.2.1]heptan-2-yl)-ethyl, ethyl 4-ethyl-1-methylpiperazine-2-carboxylate, 4-methylmorpholine 4-oxide, propan-2-yl 4-ethyl-1-methylpiperazine-2-carboxylate, cyclopropyl 4-ethyl-1-methylpiperazine-2-carboxylate, oxetan-3-yl 4-ethyl-1-methylpiperazine-2-carboxylate, -(1-oxo-thiomorpholin-4-yl)ethyl, -[4-(2,2,2-trifluoroethyl)piperazin-1-yl]methyl, -(1,1-dioxo-thiomorpholin-4-yl)ethyl, -(4-methyl-4,7-diazaspiro[2.5]octan-7-yl)ethyl, -[4-(2-methanesulfonamidoethyl)piperazin-1-yl]ethyl, -{6-methyl-2,6-diazaspiro[3.3]heptan-2-yl}ethyl, -(4,4-difluoropiperidin-1-yl) ethyl, -(4-hydroxypiperidin-1-yl)ethyl, -2-(4-methylpiperazin-1-yl)ethan-1-amine, -(1-methylpiperidin-4-yl)methanamine, -{6-methyl-2,6-diazaspiro[3.3]heptan-2-yl}methyl, -(4-methyl-4,7-diazaspiro[2.5]octan-7-yl)methyl, -(3,4-dimethylpiperazin-1-yl)ethyl, -{6-methyl-3,6-diazabicyclo[3.1.1]heptan-3-yl}ethyl, -{2-methyl-5-oxa-2,8-diazaspiro[3.5]nonan-8-yl}ethyl, -2-methyl-2,7-diazaspiro[3.5]nonane, -2-methyl-2,8-diazaspiro[4.5]decane, -2-(1,4-diazepan-1-yl)methyl, -{1-[2-(methylamino)ethyl]-1H-pyrazole}, -{1-[2-(dimethylamino)ethyl]-1H-pyrazole}, -(1-methylpiperidin-4-yl)methyl, -1-propyl-1,4-diazepane, -1-methyl-4-propyl-1,4-diazepane, -[2-(hydroxymethyl)-4-methylpiperazin-1-yl]ethyl, -(4-methylpiperazin-1-yl)cyclobutyl, -2-(piperazin-1-yl)methyl, -1-methyl-4-methyl-1,4-diazepane, -[3-(hydroxymethyl)-4-methylpiperazin-1-yl]ethyl and -1-methyl-4-methylpiperazine.

In a further preferred embodiment the present invention refers to a compound of formula (Iaa), wherein $R_2$ is —$NR_5R_6$; $R_6$ is selected from the group consisting of -4-(1-methylpiperazine)propyl and -[(4-methylpiperazin-1-yl)ethyl]-1H-pyrazol-3-yl.

In a equally preferred embodiment the present invention refers to a compound of formula (I), wherein A is A2

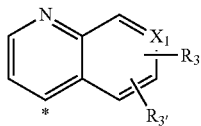

represented by the formula (Ib)

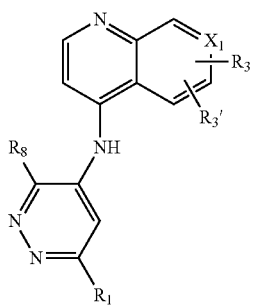

R$_1$ is aryl optionally substituted by one or more groups selected from halogen atoms and —(C$_1$-C$_6$)alkyl;

X$_1$ is C, CH or N;

R$_3$ is selected from the group consisting of —C(O)NR$_5$R$_7$, —C(O)OR$_7$, —OC(O)R$_7$, —OR$_7$, —NR$_5$C(O)R$_7$ and —OC(O)NR$_5$R$_7$;

R$_{3'}$ is H or is selected from the group consisting of —(C$_1$-C$_6$)alkoxy, —OH, —C(O)O—(C$_1$-C$_6$)alkyl and —C(O)NH-heterocycloalkyl, wherein said heterocycloalkyl is substituted by one —(C$_1$-C$_6$)alkyl;

R$_5$ is H or —(C$_1$-C$_6$)alkyl;

R$_7$ is selected from the group consisting of:
(C$_1$-C$_6$)alkylene-NR$_A$R$_B$;
heterocycloalkyl optionally substituted by one or more groups selected from —(C$_1$-C$_6$)alkyl, —(C$_1$-C$_6$)alkylene-SO$_2$—(C$_1$-C$_6$)alkyl, —(C$_1$-C$_6$)alkylene-OH, —(C$_1$-C$_6$)alkylene-NR$_A$R$_C$, heterocycloalkyl, —C(O)O-heterocycloalkyl, —(C$_1$-C$_6$)alkylene-heterocycloalkyl, wherein each of said heterocycloalkyl is optionally substituted by one or more —(C$_1$-C$_6$)alkyl;

—(C$_1$-C$_6$)alkylene-C(O)-heterocycloalkyl, wherein said heterocycloalkyl is optionally substituted by one or more —(C$_1$-C$_6$)alkyl; and —(C$_1$-C$_6$)alkylene-heterocycloalkyl, wherein said heterocycloalkyl is optionally substituted by one or more groups selected from —(C$_1$-C$_6$)alkyl, —(C$_1$-C$_6$)alkoxy, —(C$_1$-C$_6$)alkylene-OH, —(C$_1$-C$_6$)alkylene-CN, —(C$_1$-C$_6$)haloalkyl, —C(O)—(C$_1$-C$_6$)alkyl, —C(O)O(C$_1$-C$_6$)alkyl, —(C$_1$-C$_6$)alkylene-C(O)O—(C$_1$-C$_6$)alkyl, —(C$_1$-C$_6$)alkylene-NH$_2$, —(C$_1$-C$_6$)alkylene-NR$_A$R$_C$, —(C$_1$-C$_6$)alkylene-CONR$_A$R$_C$, —(C$_1$-C$_6$)alkylene-NR$_C$CO—(C$_1$-C$_6$)alkyl, —(C$_1$-C$_6$)alkylene-NR$_C$—C(O)O(C$_1$-C$_6$)alkyl, —(C$_1$-C$_6$)alkylene-NHSO$_2$—(C$_1$-C$_6$)alkyl, —SO$_2$—(C$_1$-C$_6$)alkyl and —(C$_1$-C$_6$)alkylene-SO$_2$—(C$_1$-C$_6$)alkyl;

R$_A$ is selected from the group consisting of —(C$_1$-C$_6$)alkyl and —(C$_1$-C$_6$)alkylene-OH;

R$_B$ is heterocycloalkyl;

R$_C$ is H or selected from the group consisting of —(C$_1$-C$_6$)alkyl and —(C$_1$-C$_6$)alkylene-OH;

R$_8$ is H or selected from the group consisting of —(C$_1$-C$_6$)alkyl, —(C$_1$-C$_6$)alkylene-OH and —(C$_1$-C$_6$)haloalkyl;

and pharmaceutically acceptable salts thereof.

In a more preferred embodiment the present invention refers to a compound of formula (Ib), wherein R$_3$ is —C(O)OR$_7$; R$_{3'}$ is H; R$_7$ is 4-ethylmorpholine; R$_8$ is H or —(C$_1$-C$_6$)alkyl.

According to a preferred embodiment, the invention refers to at least one of the compounds of Formula (Ib) listed in the Table 2 below and pharmaceutically acceptable salts thereof.

TABLE 2

List of preferred compounds of Formula (Ib)

| Example No. | Structure | Chemical Name |
|---|---|---|
| 3 | 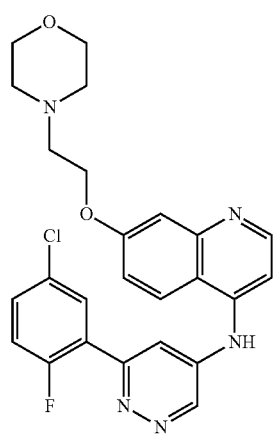 [SMILES: Fc1ccc(Cl)cc1-c1cc(Nc2ccnc3cc(OCCN4CCOCC4)ccc23)cnn1] | N-[6-(5-chloro-2-fluorophenyl)-pyridazin-4-yl]-7-[2-(morpholin-4-yl)ethoxy]quinolin-4-amine |

TABLE 2-continued

List of preferred compounds of Formula (Ib)

| Example No. | Structure | Chemical Name |
|---|---|---|
| 4 | | 4-{[6-(5-chloro-2-fluorophenyl)pyridazin-4-yl]amino}-N-[2-(morpholin-4-yl)ethyl]-quinoline-7-carboxamide |
| 5 | | 2-(morpholin-4-yl)ethyl 4-{[6-(5-chloro-2-fluorophenyl)-pyridazin-4-yl]amino}quinoline-6-carboxylate |
| 6 | | 2-(morpholin-4-yl)ethyl 4-{[6-(5-chloro-2-fluorophenyl)pyridazin-4-yl]amino}quinoline-7-carboxylate |
| 9 | | N-[6-(5-chloro-2-fluorophenyl)pyridazin-4-yl]-7-[2-(piperazin-1-yl)ethoxy]-quinolin-4-amine |
| 10 | | 4-{[6-(5-chloro-2-fluorophenyl)pyridazin-4-yl]amino}-N-[2-(piperazin-1-yl)ethyl]-quinoline-7-carboxamide |
| 12 | | N-[6-(5-chloro-2-fluorophenyl)pyridazin-4-yl]-7-[2-(4-methylpiperazin-1-yl)ethoxy]-quinolin-4-amine |

TABLE 2-continued

List of preferred compounds of Formula (Ib)

| Example No. | Structure | Chemical Name |
|---|---|---|
| 13 | | 4-{[6-(5-chloro-2-fluorophenyl)pyridazin-4-yl]amino}-N-[2-(4-methylpiperazin-1-yl)ethyl]quinoline-7-carboxamide |
| 14 | | 4-{[6-(5-chloro-2-fluorophenyl)pyridazin-4-yl]amino}-N-[2-(1-methylpiperidin-4-yl)ethyl]quinoline-7-carboxamide |
| 17 | | N-[6-(5-chloro-2-fluorophenyl)pyridazin-4-yl]-7-[2-(1-methylpiperidin-4-yl)ethoxy]-quinolin-4-amine |
| 20 | | 1-methylpiperidin-4-yl 4-{[6-(5-chloro-2-fluorophenyl)-pyridazin-4-yl]amino}quinoline-7-carboxylate |
| 23 | | 4-{[6-(5-chloro-2-fluorophenyl)pyridazin-4-yl]amino}-N-(1-methylazetidin-3-yl)-1,7-naphthyridine-6-carboxamide |
| 26 | | 4-{[6-(5-chloro-2-fluorophenyl)pyridazin-4-yl]amino}-N-(1-methylpiperidin-4-yl)-1,7-naphthyridine-6-carboxamide |

TABLE 2-continued

List of preferred compounds of Formula (Ib)

| Example No. | Structure | Chemical Name |
|---|---|---|
| 28 | | 4-{[6-(5-chloro-2-fluorophen-yl)pyridazin-4-yl]amino}-quinolin-7-yl 4-methylpipera-zine-1-carboxylate |
| 29 | | N-[6-(5-chloro-2-fluorophen-yl)pyridazin-4-yl]-7-[3-(4-methylpiperazin-1-yl)prop-oxy]quinolin-4-amine |
| 30 | | N-[6-(5-chloro-2-fluorophen-yl)pyridazin-4-yl]-7-[2-(4-ethylpiperazin-1-yl)ethoxy]-quinolin-4-amine |
| 32 | | N-(4-{[6-(5-chloro-2-fluoro-phenyl)pyridazin-4-yl]amino}-quinolin-7-yl)-3-(4-methyl-piperazin-1-yl)propanamide |
| 35 | | 1-(4-{2-[(4-{[6-(5-chloro-2-fluorophenyl)pyridazin-4-yl]-amino}quinolin-7-yl)oxy]-ethyl}piperazin-1-yl)ethan-1-one |
| 36 | | N-[6-(5-chloro-2-fluorophen-yl)pyridazin-4-yl]-7-[2-(4-methanesulfonylpiperazin-1-yl)ethoxy]quinolin-4-amine |

TABLE 2-continued

List of preferred compounds of Formula (Ib)

| Example No. | Structure | Chemical Name |
|---|---|---|
| 37 | | N-{6-[2-fluoro-5-(propan-2-yl)phenyl]pyridazin-4-yl}-7-[2-(4-methylpiperazin-1-yl)-ethoxy]quinolin-4-amine |
| 39 | | 2-[(4-{[6-(5-chloro-2-fluoro-phenyl)pyridazin-4-yl]amino}-quinolin-7-yl)oxy]-1-(4-methylpiperazin-1-yl)ethan-1-one |
| 41 | | N-[6-(5-chloro-2-fluorophenyl)pyridazin-4-yl]-7-{2-[4-(2,2,2-trifluoroethyl)piperazin-1-yl]ethoxy}quinolin-4-amine |
| 42 | | N-[6-(5-chloro-2-fluorophenyl)pyridazin-4-yl]-7-{2-[methyl(oxetan-3-yl)amino]-ethoxy}quinolin-4-amine |

TABLE 2-continued

List of preferred compounds of Formula (Ib)

| Example No. | Structure | Chemical Name |
|---|---|---|
| 45 | | 4-{[6-(5-chloro-2-fluoro-phenyl)pyridazin-4-yl]amino}-quinolin-7-yl N-methyl-N-[2-(4-methylpiperazin-1-yl)-ethyl]carbamate |
| 48 | | N-[6-(5-chloro-2-fluorophen-yl)-3-methylpyridazin-4-yl]-7-[2-(4-methylpiperazin-1-yl)-ethoxy]quinolin-4-amine |
| 51 | | 4-{[6-(5-chloro-2-fluorophen-yl)pyridazin-4-yl]amino}-quinolin-7-yl N-methyl-N-[2-(1-methylpiperidin-4-yl)-ethyl]carbamate |
| 52 | | N-[6-(5-chloro-2-fluorophen-yl)pyridazin-4-yl]-7-[3-(3-methyl-1,3-diazinan-1-yl)-propoxy]quinolin-4-amine |

TABLE 2-continued

List of preferred compounds of Formula (Ib)

| Example No. | Structure | Chemical Name |
|---|---|---|
| 53 | | 4-{[6-(5-chloro-2-fluorophenyl)pyridazin-4-yl]amino}-quinolin-7-yl 4-(2-methanesulfonylethyl)piperazine-1-carboxylate |
| 54 | | (3R)-1-methylpyrrolidin-3-yl 4-{[6-(5-chloro-2-fluorophenyl)pyridazin-4-yl]amino}-quinoline-7-carboxylate |
| 55 | | N-[6-(5-chloro-2-fluorophenyl)pyridazin-4-yl]-7-(2-{5-methyl-octahydropyrrolo[3,4-c]pyrrol-2-yl}ethoxy)quinolin-4-amine |
| 56 | | 1-(3-{2-[(4-{[6-(5-chloro-2-fluorophenyl)pyridazin-4-yl]amino}quinolin-7-yl)oxy]ethyl}-1,3-diazinan-1-yl)ethan-1-one |
| 57 | | 4-{[6-(5-chloro-2-fluorophenyl)pyridazin-4-yl]amino}-quinolin-7-yl 4-(2-hydroxyethyl)piperazine-1-carboxylate |
| 58 | | (3S)-1-methylpyrrolidin-3-yl 4-{[6-(5-chloro-2-fluorophenyl)pyridazin-4-yl]amino}-quinoline-7-carboxylate |

TABLE 2-continued

List of preferred compounds of Formula (Ib)

| Example No. | Structure | Chemical Name |
|---|---|---|
| 60 | | methyl 3-(4-{2-[(4-{[6-(5-chloro-2-fluorophenyl)-pyridazin-4-yl]amino}-quinolin-7-yl)oxy]ethyl}-piperazin-1-yl)propanoate |
| 61 | | 4-{[6-(5-chloro-2-fluorophen-yl)pyridazin-4-yl]amino}-quinolin-7-yl 4-[2-(dimethyl-amino)ethyl]piperazine-1-carboxylate |
| 62 | | N-[6-(5-chloro-2-fluorophen-yl)pyridazin-4-yl]-7-[2-(3-methyl-1,3-diazinan-1-yl)-ethoxy]quinolin-4-amine |
| 63 | | 3-(4-{2-[(4-{[6-(5-chloro-2-fluorophenyl)pyridazin-4-yl]-amino}quinolin-7-yl)oxy]-ethyl}piperazin-1-yl)-N-methylpropanamide |
| 64 | | 4-{[6-(5-chloro-2-fluorophen-yl)pyridazin-4-yl]amino}-quinolin-7-yl 4-[2-(1-methyl-piperidin-4-yl)ethyl]piper-azine-1-carboxylate |
| 66 | | 7-{2-[4-(2-aminoethyl)piper-azin-1-yl]ethoxy}-N-[6-(5-chloro-2-fluorophenyl)pyrid-azin-4-yl]quinolin-4-amine |
| 67 | | N-[2-(4-{2-[(4-{[6-(5-chloro-2-fluorophenyl)pyridazin-4-yl]amino}quinolin-7-yl)oxy]-ethyl}piperazin-1-yl)ethyl]-methanesulfonamide |

TABLE 2-continued

List of preferred compounds of Formula (Ib)

| Example No. | Structure | Chemical Name |
|---|---|---|
| 68 | | N-[6-(5-chloro-2-fluorophenyl)pyridazin-4-yl]-7-(2-{4-[2-(dimethylamino)ethyl]piperazin-1-yl}ethoxy)quinolin-4-amine |
| 69 | | N-[2-(4-{2-[(4-{[6-(5-chloro-2-fluorophenyl)pyridazin-4-yl]amino}quinolin-7-yl)oxy]ethyl}piperazin-1-yl)ethyl]-acetamide |
| 70 | | 4-{[6-(5-chloro-2-fluorophenyl)pyridazin-4-yl]amino}-quinolin-7-yl 4-[2-(4-methylpiperazin-1-yl)ethyl]piperidine-1-carboxylate |
| 71 | | 3-(4-{2-[(4-{[6-(5-chloro-2-fluorophenyl)pyridazin-4-yl]-amino}quinolin-7-yl)oxy]-ethyl}piperazin-1-yl)propanenitrile |
| 72 | | 2-(4-{2-[(4-{[6-(5-chloro-2-fluorophenyl)pyridazin-4-yl]-amino}quinolin-7-yl)oxy]-ethyl}piperazin-1-yl)ethan-1-ol |
| 73 | | N-[6-(5-chloro-2-fluorophenyl)pyridazin-4-yl]-7-[(1-methylpiperidin-4-yl)oxy]quinolin-4-amine |
| 75 | | 2-{[2-(4-{2-[(4-{[6-(5-chloro-2-fluorophenyl)pyridazin-4-yl]amino}quinolin-7-yl)oxy]-ethyl}piperazin-1-yl)ethyl]-(2-hydroxyethyl)amino}ethan-1-ol |

TABLE 2-continued

List of preferred compounds of Formula (Ib)

| Example No. | Structure | Chemical Name |
|---|---|---|
| 77 | | methyl N-[2-(4-{2-[(4-{[6-(5-chloro-2-fluorophenyl)pyridazin-4-yl]amino}quinolin-7-yl)-oxy]ethyl}piperazin-1-yl)ethyl]carbamate |
| 81 | | 4-{[6-(5-chloro-2-fluorophenyl)-3-methylpyridazin-4-yl]-amino}quinolin-7-yl 4-[2-(1-methylpiperidin-4-yl)ethyl]-piperazine-1-carboxylate |
| 86 | | 3-(4-{2-[(4-{[6-(5-chloro-2-fluorophenyl)pyridazin-4-yl]-amino}quinolin-7-yl)oxy]-ethyl}piperazin-1-yl)pentane-1,5-diol |
| 87 | | N-[6-(5-chloro-2-fluorophenyl)pyridazin-4-yl]-6-methoxy-7-[2-(4-methylpiperazin-1-yl)ethoxy]quinolin-4-amine |

TABLE 2-continued

List of preferred compounds of Formula (Ib)

| Example No. | Structure | Chemical Name |
|---|---|---|
| 89 | | N-[6-(5-chloro-2-fluorophenyl)pyridazin-4-yl]-7-[(1-methylpiperidin-4-yl)methoxy]quinolin-4-amine |
| 90 | | N-[6-(5-chloro-2-fluorophenyl)pyridazin-4-yl]-7-[2-(3-methylimidazolidin-1-yl)ethoxy]quinolin-4-amine |
| 100 | | 4-{[6-(5-chloro-2-fluorophenyl)pyridazin-4-yl]amino}-quinolin-7-yl 4-[(1-methylpiperidin-4-yl)methyl]piperazine-1-carboxylate |
| 103 | | 4-{[6-(5-chloro-2-fluorophenyl)pyridazin-4-yl]amino}-quinolin-7-yl 4-(1-methylpiperidin-4-yl)piperazine-1-carboxylate |
| 112 | | 4-{[6-(5-chloro-2-fluorophenyl)pyridazin-4-yl]amino}-quinolin-7-yl 2,8-diazaspiro[4.5]decane-2-carboxylate |
| 114 | | 4-{[6-(5-chloro-2-fluorophenyl)pyridazin-4-yl]amino}-quinolin-7-yl 2-methyl-2,7-diazaspiro[3.5]nonane-7-carboxylate |

TABLE 2-continued

List of preferred compounds of Formula (Ib)

| Example No. | Structure | Chemical Name |
|---|---|---|
| 115 | 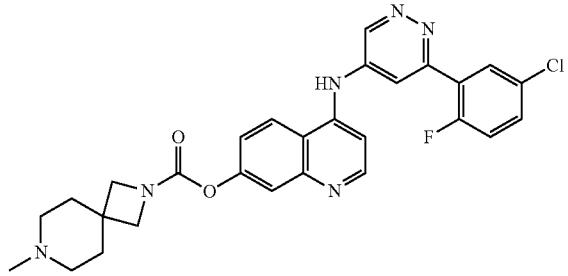 [SMILES: CN1CCC2(CC1)CN(C(=O)Oc1ccc3c(Nc4cnnc(-c5cc(Cl)ccc5F)c4)ccnc3c1)C2] | 4-{[6-(5-chloro-2-fluorophenyl)pyridazin-4-yl]amino}-quinolin-7-yl 7-methyl-2,7-diazaspiro[3.5]nonane-2-carboxylate |
| 118 | 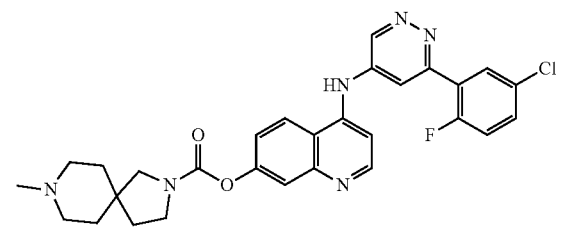 [SMILES: CN1CCC2(CC1)CCN(C(=O)Oc1ccc3c(Nc4cnnc(-c5cc(Cl)ccc5F)c4)ccnc3c1)C2] | 4-{[6-(5-chloro-2-fluorophenyl)pyridazin-4-yl]amino}-quinolin-7-yl 8-methyl-2,8-diazaspiro[4.5]decane-2-carboxylate |
| 119 | 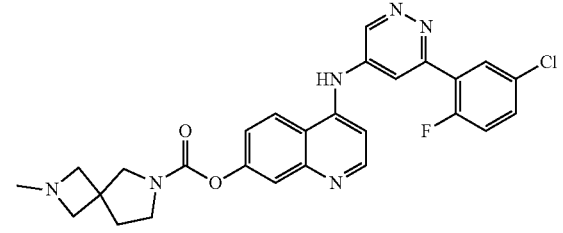 [SMILES: CN1CC2(CCN(C(=O)Oc3ccc4c(Nc5cnnc(-c6cc(Cl)ccc6F)c5)ccnc4c3)C2)C1] | 4-{[6-(5-chloro-2-fluorophenyl)pyridazin-4-yl]amino}-quinolin-7-yl 2-methyl-2,6-diazaspiro[3.4]octane-6-carboxylate |
| 125 | 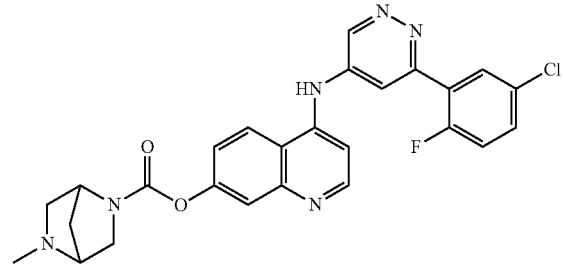 [SMILES: CN1CC2CC1CN2C(=O)Oc1ccc2c(Nc3cnnc(-c4cc(Cl)ccc4F)c3)ccnc2c1] | 4-{[6-(5-chloro-2-fluorophenyl)pyridazin-4-yl]amino}-quinolin-7-yl-(1R,4R)-5-methyl-2,5-diazabicyclo[2.2.1]-heptane-2-carboxylate |
| 128 | 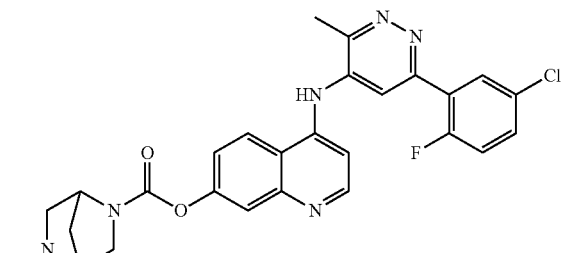 | 4-{[6-(5-chloro-2-fluorophenyl)-3-methylpyridazin-4-yl]-amino}quinolin-7-yl 5-methyl-2,5-diazabicyclo[2.2.1]heptane-2-carboxylate |

TABLE 2-continued

List of preferred compounds of Formula (Ib)

| Example No. | Structure | Chemical Name |
|---|---|---|
| 133 | | 4-{[6-(5-chloro-2-fluorophenyl)pyridazin-4-yl]amino}-quinolin-7-yl 3-(pyrrolidin-1-yl)azetidine-1-carboxylate |
| 134 | | 4-{[6-(5-chloro-2-fluorophenyl)pyridazin-4-yl]amino}-quinolin-7-yl 4-(azetidin-1-yl)piperidine-1-carboxylate |
| 137 | | 4-{[6-(5-chloro-2-fluorophenyl)pyridazin-4-yl]amino}-quinolin-7-yl 5-methyl-2,5-diazabicyclo[2.2.1]heptane-2-carboxylate |
| 148 | | 4-{[6-(5-chloro-2-fluorophenyl)pyridazin-4-yl]amino}-7-[2-(4-methylpiperazin-1-yl)-ethoxy]quinolin-6-ol |
| 152 | | 4-{[6-(5-chloro-2-fluorophenyl)-3-methylpyridazin-4-yl]amino}quinolin-7-yl 3-(pyrrolidin-1-yl)azetidine-1-carboxylate |

TABLE 2-continued

List of preferred compounds of Formula (Ib)

| Example No. | Structure | Chemical Name |
|---|---|---|
| 153 | | 4-{[6-(5-chloro-2-fluorophenyl)-3-methylpyridazin-4-yl]amino}quinolin-7-yl 4-(azetidin-1-yl)piperidine-1-carboxylate |
| 159 | | 4-{[6-(5-chloro-2-fluorophenyl)-3-methylpyridazin-4-yl]amino}quinolin-7-yl-(1R,4R)-5-methyl-2,5-diazabicyclo-[2.2.1]heptane-2-carboxylate |
| 160 | | 4-{[6-(5-chloro-2-fluorophenyl)-3-methylpyridazin-4-yl]amino}quinolin-7-yl-(1S,4S)-5-methyl-2,5-diazabicyclo-[2.2.1]heptane-2-carboxylate |
| 165 | | methyl 4-{[6-(5-chloro-2-fluorophenyl)-3-(hydroxymethyl)pyridazin-4-yl]amino}-7-[2-(4-methylpiperazin-1-yl)ethoxy]quinoline-6-carboxylate |

TABLE 2-continued

List of preferred compounds of Formula (Ib)

| Example No. | Structure | Chemical Name |
|---|---|---|
| 168 | | 1-(4-{[6-(5-chloro-2-fluoro-phenyl)-3-methylpyridazin-4-yl]amino}quinolin-7-yl) 3-oxetan-3-yl 4-[2-(1-methyl-piperidin-4-yl)ethyl]piperazine-1,3-dicarboxylate |
| 169 | | methyl 4-{[6-(5-chloro-2-fluorophenyl)-3-methyl-pyridazin-4-yl]amino}-7-[2-(4-methylpiperazin-1-yl)eth-oxy]quinoline-6-carboxylate |
| 171 | | methyl 4-{[6-(5-chloro-2-fluorophenyl)pyridazin-4-yl]-amino}-7-[2-(4-methyl-piperazin-1-yl)ethoxy]-quinoline-6-carboxylate |
| 177 | | [6-(5-chloro-2-fluorophenyl)-4-({7-[2-(4-methylpiperazin-1-yl)ethoxy]quinolin-4-yl}-amino)pyridazin-3-yl]methanol |
| 183 | | N-[6-(5-chloro-2-fluorophenyl)-3-(trifluoromethyl)pyridazin-4-yl]-7-[2-(4-methylpiperazin-1-yl)ethoxy]quinolin-4-amine |

In a particularly preferred embodiment the present invention refers to a compound of formula (Ib), wherein A is A2a

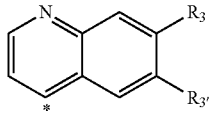

(A2a)

represented by the formula (Iba)

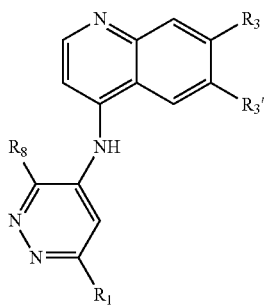

(Iba)

$R_1$ is aryl optionally substituted by one or more groups selected from halogen atoms and —($C_1$-$C_6$)alkyl;

$R_3$ is selected from the group consisting of —C(O)NR$_5$R$_7$, —C(O)OR$_7$, —OC(O)R$_7$, —OR$_7$, —NR$_5$C(O)R$_7$ and —OC(O)NR$_5$R$_7$;

$R_{3+}$ is H or is selected from the group consisting of —($C_1$-$C_6$)alkoxy, —OH and —C(O)O—($C_1$-$C_6$)alkyl;

$R_5$ is H or —($C_1$-$C_6$)alkyl;

$R_7$ is selected from the group consisting of:
($C_1$-$C_6$)alkylene-NR$_A$R$_B$,
heterocycloalkyl optionally substituted by one or more groups selected from —($C_1$-$C_6$)alkyl, —($C_1$-$C_6$)alkylene-SO$_2$—($C_1$-$C_6$)alkyl, —($C_1$-$C_6$)alkylene-OH, —($C_1$-$C_6$)alkylene-NR$_A$R$_C$, heterocycloalkyl, —C(O)O-heterocycloalkyl, —($C_1$-$C_6$)alkylene-heterocycloalkyl, wherein each of said heterocycloalkyl is optionally substituted by one or more —($C_1$-$C_6$)alkyl;
—($C_1$-$C_6$)alkylene-C(O)-heterocycloalkyl, wherein said heterocycloalkyl is optionally substituted by one or more —($C_1$-$C_6$)alkyl and
—($C_1$-$C_6$)alkylene-heterocycloalkyl, wherein said heterocycloalkyl is optionally substituted by one or more groups selected from —($C_1$-$C_6$)alkyl, —($C_1$-$C_6$)alkoxy, —($C_1$-$C_6$)alkylene-OH, —($C_1$-$C_6$)alkylene-CN, —($C_1$-$C_6$)haloalkyl, —C(O)—($C_1$-$C_6$)alkyl-($C_1$-$C_6$)alkylene-C(O)O—($C_1$-$C_6$)alkyl, —C(O)—($C_1$-$C_6$)alkyl, —C(O)O—($C_1$-$C_6$)alkyl, —($C_1$-$C_6$)alkylene-NH$_2$, —($C_1$-$C_6$)alkylene-NR$_A$R$_C$, —($C_1$-$C_6$)alkylene-CONR$_A$R$_C$, —($C_1$-$C_6$)alkylene-NR$_C$CO—($C_1$-$C_6$)alkyl, —($C_1$-$C_6$)alkylene-NR$_C$C(O)O—($C_1$-$C_6$)alkyl, —($C_1$-$C_6$)alkylene-NHSO$_2$—($C_1$-$C_6$)alkyl and —($C_1$-$C_6$)alkylene-SO$_2$—($C_1$-$C_6$)alkyl;

$R_A$ is selected from the group consisting of —($C_1$-$C_6$)alkyl and —($C_1$-$C_6$)alkylene-OH;

$R_B$ is heterocycloalkyl;

$R_C$ is H or selected from the group consisting of —($C_1$-$C_6$)alkyl and —($C_1$-$C_6$)alkylene-OH;

$R_8$ is H or selected from the group consisting of —($C_1$-$C_6$)alkyl, —($C_1$-$C_6$)alkylene-OH and —($C_1$-$C_6$)haloalkyl;

and pharmaceutically acceptable salts thereof.

In a more preferred embodiment the present invention refers to a compound of formula (Iba), wherein $R_3$ is —NHC(O)R$_7$, $R_{3+}$ is H, $R_7$ is 1-ethyl-4-methylpiperazine.

In a particularly preferred embodiment the present invention refers to a compound of formula (Iba), wherein $R_1$ is aryl optionally substituted by one or more halogen atoms; $R_3$ is —C(O)NHR$_7$; $R_{3+}$ is H; $R_7$ is —($C_1$-$C_6$)alkylene-heterocycloalkyl, wherein said heterocycloalkyl is optionally substituted by one or more —($C_1$-$C_6$)alkyl; $R_8$ is H or —($C_1$-$C_6$)alkyl; and pharmaceutically acceptable salts thereof.

In a more preferred embodiment the present invention refers to a compound of formula (Iba), wherein $R_3$ is —C(O)NHR$_7$; $R_{3+}$ is H; $R_7$ is selected from the group consisting of 4-ethylmorpholine, 4-ethylpiperazine, 1-ethyl-4-methylpiperazine and 1-ethyl-4-methylpiperidine; $R_8$ is H or —($C_1$-$C_6$)alkyl.

In a more preferred embodiment the present invention refers to a compound of formula (Iba), wherein $R_3$ is —C(O)OR$_7$; $R_{3+}$ is H; $R_7$ is selected from the group consisting of 4-ethylmorpholine, N-methylpiperidine and N-methyl pyrrolidine; $R_8$ is H or —($C_1$-$C_6$)alkyl.

In a further preferred embodiment the present invention refers to a compound of formula (Iba), wherein $R_3$ is —OC(O)R$_7$; $R_{3+}$ is H; $R_7$ is heterocycloalkyl optionally substituted by one or more groups selected from —($C_1$-$C_6$)alkyl, —($C_1$-$C_6$)alkylene-SO$_2$, ($C_1$-$C_6$)alkyl, —($C_1$-$C_6$)alkylene-OH, —($C_1$-$C_6$)alkylene-NR$_A$R$_C$, heterocycloalkyl, —C(O)O-heterocycloalkyl and —($C_1$-$C_6$)alkylene-heterocycloalkyl, wherein each of said heterocycloalkyl is optionally substituted by one or more —($C_1$-C6)alkyl; $R_A$ is selected from the group consisting of —($C_1$-$C_6$)alkyl and —($C_1$-$C_6$)alkylene-OH; $R_B$ is heterocycloalkyl; $R_C$ is H or selected from the group consisting of —($C_1$-$C_6$)alkyl and —($C_1$-$C_6$)alkylene-OH; $R_8$ is H or —($C_1$-$C_6$)alkyl.

In a more preferred embodiment the present invention refers to a compound of formula (Iba), wherein $R_3$ is —OC(O)R$_7$; $R_{3+}$ is H; $R_7$ is selected from the group consisting of -4-methylpiperazine, —N-methyl-N-[2-(4-methylpiperazin-1-yl)ethyl, —N-methyl-N-[2-(1-methylpiperidin-4-yl)ethyl], -4-(2-methanesulfonylethyl)piperazine, -4-(2-hydroxyethyl)piperazine, -4-[2-(dimethylamino)ethyl]piperazine, -4-[2-(1-methylpiperidin-4-yl)ethyl]piperazine, -4-[2-(4-methylpiperazin-1-yl)ethyl]piperidine, -4-[2-(1-methylpiperidin-4-yl)ethyl]piperazine, -4-[(1-methylpiperidin-4-yl)methyl]piperazine, -4-(1-methylpiperidin-4-yl)piperazine, -2,8-di azaspiro[4.5]decane, -2-methyl-2,7-diazaspiro[3.5]nonane, -7-methyl-2,7-diazaspiro[3.5]nonane, -8-methyl-2,8-diazaspiro[4.5]decane, -2-methyl-2,6-diazaspiro[3.4]octane, -(1R,4R)-5-methyl-2,5-diazabicyclo[2.2.1]heptane, -5-methyl-2,5-diazabicyclo[2.2.1]heptane, -3-(pyrrolidin-1-yl)azetidine, -4-(azetidin-1-yl)piperidine, -(1S,4S)-5-methyl-2,5-diazabicyclo[2.2.1]heptane and -3-oxetan-3-yl 4-[2-(1-methylpiperidin-4-yl)ethyl]piperazine-3-carboxylate; $R_8$ is H or —($C_1$-$C_6$)alkyl.

In a further preferred embodiment the present invention refers to a compound of formula (Iba), wherein $R_3$ is —OR$_7$; $R_{3+}$ is H or is selected from the group consisting of —($C_1$-$C_6$)alkoxy, —OH and —C(O)O—($C_1$-$C_6$)alkyl; R$_7$ is selected from the group consisting of —($C_1$-$C_6$)alkylene-NR$_A$R$_B$; heterocycloalkyl optionally substituted by one or more —($C_1$-$C_6$)alkyl; —($C_1$-$C_6$)alkylene-heterocycloalkyl, wherein said heterocycloalkyl is optionally substituted by one or more groups selected from —($C_1$-$C_6$)alkyl, —($C_1$-

$C_6$)alkoxy, —($C_1$-$C_6$)alkylene-OH, —($C_1$-$C_6$)alkylene-CN, —($C_1$-$C_6$)haloalkyl, —C(O)—($C_1$-$C_6$)alkyl, —($C_1$-$C_6$)alkylene-C(O)O—($C_1$-$C_6$)alkyl, —C(O)O—($C_1$-$C_6$)alkyl, —($C_1$-$C_6$)alkylene-NH$_2$, —($C_1$-$C_6$)alkylene-NR$_4$R$_C$, —($C_1$-$C_6$)alkylene-CONR$_4$R$_C$, —($C_1$-$C_6$)alkylene-NR$_C$CO—($C_1$-$C_6$)alkyl, —($C_1$-$C_6$)alkylene-NR$_C$C(O)O—($C_1$-$C_6$)alkyl, —($C_1$-$C_6$)alkylene-NHSO$_2$—($C_1$-$C_6$)alkyl and —SO$_2$—($C_1$-$C_6$)alkyl; R$_4$ is selected from the group consisting of —($C_1$-$C_6$)alkyl and —($C_1$-$C_6$)alkylene-OH; R$_B$ is heterocycloalkyl; R$_c$ is H or selected from the group consisting of —($C_1$-$C_6$)alkyl and —($C_1$-$C_6$)alkylene-OH; R$_8$ is H or is selected from the group consisting of —($C_1$-$C_6$)alkyl and —($C_1$-$C_6$)alkylene-OH.

In a more preferred embodiment the present invention refers to a compound of formula (Iba), wherein R$_3$ is —OR$_7$; R$_{3'}$ is H or is selected from the group consisting of —OCH$_3$, —OH and —C(O)O—CH$_3$, R$_7$ is selected from the group consisting of -2-(morpholin-4-yl)ethyl, -2-(piperazin-1-yl)ethyl, -2-(4-methylpiperazin-1-yl)ethyl, 2-(1-methylpiperidin-4-yl)ethyl, -3-(4-methylpiperazin-1-yl)propyl, -2-(4-ethylpiperazin-1-yl)ethyl, -4-ethyl-1-(piperazin-1-yl)ethan-1-one, -2-(4-methanesulfonylpiperazin-1-yl)ethyl, -1-(4-methylpiperazin-1-yl)ethan-1-one, -2-[4-(2,2,2-trifluoroethyl)piperazin-1-yl]ethyl, -2-[methyl(oxetan-3-yl)amino]ethyl, -3-(3-methyl-1,3-diazinan-1-yl)propyl, -2-{5-methyl-octahydropyrrolo[3,4-c]pyrrol-2-yl}ethyl, -1-(3-ethyltetrahydropyrimidin-[(2H)-yl)ethan-1-one, methyl-[4-ethyl-(piperazin-1-yl)]propanoate, -2-(3-methyl-1,3-diazinan-1-yl)ethyl, -3-(4-ethylpiperazin-1-yl)-N-methylpropanamide, -2-[4-(2-aminoethyl)piperazin-1-yl]ethyl, -4-ethyl-[(piperazin-1-yl)ethyl]methanesulfonamide, -4-[2-(dimethylamino)ethyl]piperazin-1-yl-ethyl, N-(2-(4-ethylpiperazin-1-yl)ethyl)acetamide, -3-(4-ethylpiperazin-1-yl)propanenitrile, -2-(4-ethylpiperazin-1-yl)ethan-1-ol, 1-methylpiperidin-4-yl, yl)ethyl)azanediyl)bis(ethan-1-01), -2,2'-((2-(4-ethylpiperazin-1-methyl (2-(4-ethylpiperazin-1-yl)ethyl)carbamate, -3-(4-ethylpiperazin-1-yl)pentane-1,5-diol, -(1-methylpiperidin-4-yl)methyl and -2-(3-methylimidazolidin-1-yl)ethyl; R$_8$ is H or selected from the group consisting of methyl, —CF$_3$ and —CH$_2$OH.

According to another preferred embodiment, the present invention refers to a compound of formula (I), wherein A is A2b

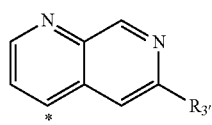

(A2b)

represented by the formula (Ibb)

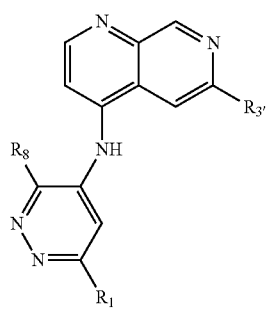

(Ibb)

wherein R$_{3'}$ is -(1-methylazetidin-3-yl)-carboxamide and -(1-methylpiperidin-4-yl)-carboxamide.

According to another preferred embodiment, the present invention refers to a compound of formula (I), wherein A is A3

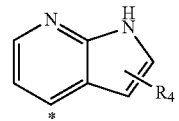

A3 represented by the formula (Ic)

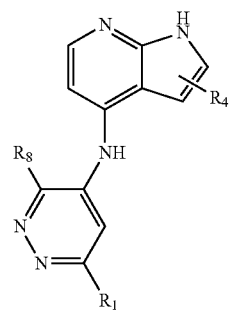

(Ic)

R$_1$ is aryl optionally substituted by one or more halogen atoms;

R$_4$ is selected from the group consisting of —C(O)NR$_5$R$_7$ and —C(O)heterocycloalkyl, wherein said heterocycloalkyl is optionally substituted by one or more —($C_1$-$C_6$)alkyl;

R$_5$ is H or —($C_1$-$C_6$)alkyl;

R$_7$ is selected from the group consisting of heterocycloalkyl substituted by one or more —($C_1$-$C_6$)alkyl and —($C_1$-$C_6$)alkylene-heterocycloalkyl, wherein said heterocycloalkyl is optionally substituted by one or more —($C_1$-$C_6$)alkyl;

R$_8$ is H or —($C_1$-$C_6$)alkyl;

and pharmaceutically acceptable salts thereof.

According to a preferred embodiment, the invention refers to at least one of the compounds of Formula (Ic) listed in the Table 3 below and pharmaceutical acceptable salts thereof.

TABLE 3

List of preferred compounds of Formula (Ic)

| Example No. | Structure | Chemical Name |
|---|---|---|
| 21 | | 4-{[6-(5-chloro-2-fluoro-phenyl)pyridazin-4-yl]-amino}-N-[2-(4-methyl-piperazin-1-yl)ethyl]-1H-pyrrolo[2,3-b]pyridine-3-carboxamide |
| 25 | | 4-{[6-(5-chloro-2-fluoro-phenyl)pyridazin-4-yl]-amino}-N-[2-(4-methyl-piperazin-1-yl)ethyl]-1H-pyrrolo[2,3-b]pyridine-2-carboxamide |
| 27 | | 4-{[6-(5-chloro-2-fluoro-phenyl)pyridazin-4-yl]-amino}-N-[2-(1-methyl-piperidin-4-yl)ethyl]-1H-pyrrolo[2,3-b]pyridine-2-carboxamide |

TABLE 3-continued

List of preferred compounds of Formula (Ic)

| Example No. | Structure | Chemical Name |
|---|---|---|
| 38 | | 6-(5-chloro-2-fluorophenyl)-N-[2-(4-methylpiperazine-1-carbonyl)-1H-pyrrolo[2,3-b]pyridin-4-yl]pyridazin-4-amine |
| 40 | | 4-{[6-(5-chloro-2-fluorophenyl)pyridazin-4-yl]amino}-N-methyl-N-[2-(4-methylpiperazin-1-yl)ethyl]-1H-pyrrolo[2,3-b]-pyridine-2-carboxamide |
| 49 | | 4-{[6-(5-chloro-2-fluorophenyl)-3-methylpyridazin-4-yl]amino}-N-[2-(4-methylpiperazin-1-yl)ethyl]-1H-pyrrolo[2,3-b]-pyridine-2-carboxamide |

TABLE 3-continued

List of preferred compounds of Formula (Ic)

| Example No. | Structure | Chemical Name |
|---|---|---|
| 50 | 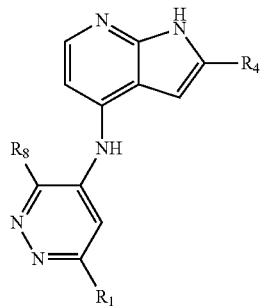 | 4-{[6-(5-chloro-2-fluorophenyl)-3-methylpyridazin-4-yl]amino}-N-methyl-N-[2-(4-methylpiperazin-1-yl)ethyl]-1H-pyrrolo[2,3-b]pyridine-2-carboxamide |

In a particularly preferred embodiment the present invention refers to a compound of formula (Ic), wherein A is A3a

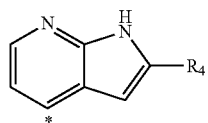

(A3a)

represented by the formula (Ica)

(Ica)

$R_4$ is —C(O)NR$_5$R$_7$;
$R_5$ is H or methyl;
$R_7$ is selected from the group consisting of 1-ethyl-4-methylpiperazine and 1-ethyl-4-methylpiperidine;
$R_8$ is H or methyl.

In a further preferred embodiment the present invention refers to a compound of formula (I), wherein $R_6$ is selected from the group consisting of —(C$_1$-C$_6$)alkylene-NR$_A$R$_B$; —NH—(C$_1$-C$_6$)alkylene-heterocycloalkyl, wherein said heterocycloalkyl is substituted by one or more —(C$_1$-C$_6$)alkyl; heteroaryl substituted by one or more groups selected from —(C$_1$-C$_6$)alkylene-NR$_A$R$_C$ and —(C$_1$-C$_6$)alkylene-heterocycloalkyl, wherein said heterocycloalkyl is substituted by one or more —(C$_1$-C6)alkyl; —(C$_1$-C$_6$)alkylene-NR$_C$—(C$_1$-C$_6$)alkylene-NR$_A$R$_C$; —(C$_1$-C$_6$)alkylene-NR$_A$—C(O)O—(C$_1$-C$_6$)alkyl; cycloalkyl optionally substituted by a heterocycloalkyl, wherein said heterocycloalkyl is substituted by one or more —(C$_1$-C$_6$)alkyl; heterocycloalkyl substituted by one or more —(C$_1$-C$_6$)alkyl; —(C$_1$-C$_6$)alkylene-N-oxide-heterocycloalkyl; and —(C$_1$-C$_6$)alkylene-heterocycloalkyl, wherein said heterocycloalkyl is substituted by one or more groups selected from —OH, halogen, —(C$_1$-C$_6$)alkyl, —(C$_1$-C$_6$)alkoxy, —(C$_1$-C$_6$)alkylene-OH, —(C$_1$-C$_6$)alkylene-CN, —(C$_1$-C$_6$)haloalkyl, —C(O)—(C$_1$-C$_6$)alkyl, —C(O)OH, —C(O)O(C$_1$-C$_6$)alkyl, —C(O)O-cycloalkyl, —C(O)O-heterocycloalkyl, —(C$_1$-C$_6$)alkylene-C(O)O—R$_C$, —(C$_1$-C$_6$)alkylene-NR$_C$—C(O)O—(C$_1$-C$_6$)alkyl, —SO$_2$—(C$_1$-C$_6$)alkyl, —(C$_1$-C$_6$)alkylene-NH$_2$, —(C$_1$-C$_6$)alkylene-NR$_A$R$_C$, —(C$_1$-C$_6$)alkylene-SO$_2$—(C$_1$-C$_6$)alkyl, —(C$_1$-C$_6$)alkylene-NHSO$_2$—(C$_1$-C$_6$)alkyl, —SO$_2$—(C$_1$-C$_6$)alkyl and oxo.

In another preferred embodiment the present invention refers to a compound of formula (I), wherein $R_7$ is selected from the group consisting of:

(C$_1$-C$_6$)alkylene-NR$_A$R$_B$;
heterocycloalkyl substituted by one or more groups selected from —(C$_1$-C$_6$)alkyl, —(C$_1$-C$_6$)alkylene-SO$_2$—(C$_1$-C$_6$)alkyl, —(C$_1$-C$_6$)alkylene-OH, —(C$_1$-C$_6$)alkylene-NR$_A$R$_C$, heterocycloalkyl, —C(O)O-heterocycloalkyl, —(C$_1$-C$_6$)alkylene-heterocycloalkyl, wherein each of said heterocycloalkyl is substituted by one or more —(C$_1$-C$_6$)alkyl;
—(C$_1$-C$_6$)alkylene-C(O)-heterocycloalkyl, wherein said heterocycloalkyl is substituted by one or more —(C$_1$-C$_6$)alkyl;
and
—(C$_1$-C$_6$)alkylene-heterocycloalkyl, wherein said heterocycloalkyl is substituted by one or more groups selected from —(C$_1$-C$_6$)alkyl, —(C$_1$-C$_6$)alkoxy, —(C$_1$-C$_6$)alkylene-OH, —(C$_1$-C$_6$)alkylene-CN, —(C$_1$-C$_6$)haloalkyl, —C(O)—(C$_1$-C$_6$)alkyl, —(C$_1$-C$_6$)alkyl ene-C(O)O—(C$_1$-C$_6$)alkyl, —C(O)O—(C$_1$-C$_6$)alkyl, —(C$_1$-C$_6$)alkylene-NH$_2$, —(C$_1$-C$_6$)alkylene-NR$_A$R$_C$, —(C$_1$-C$_6$)alkylene-CONR$_A$R$_C$, —(C$_1$-C$_6$)alkylene-NR$_C$—CO—(C$_1$-C$_6$)alkyl, —(C$_1$-C$_6$)alkylene-NR$_C$—C(O)O—(C$_1$-C$_6$)alkyl, —(C$_1$-C$_6$)alkylene-NHSO$_2$—(C$_1$-C$_6$)alkyl, —SO$_2$—(C$_1$-C$_6$)alkyl and —(C$_1$-C$_6$)alkylene-SO$_2$—(C$_1$-C$_6$)alkyl.

The compounds of the invention, including all the compounds here above listed, can be prepared from readily available starting materials using the following general methods and procedures or by using slightly modified processes readily available to those of ordinary skill in the art. Although a particular embodiment of the present invention may be shown or described herein, those skilled in the art will recognize that all embodiments or aspects of the present invention can be obtained using the methods described herein or by using other known methods, reagents and starting materials. When typical or preferred process conditions (i.e. reaction temperatures, times, mole ratios of reactants, solvents, pressures, etc.) are given, other process conditions can also be used unless otherwise stated. While the optimum reaction conditions may vary depending on the particular reactants or solvent used, such conditions can be readily determined by those skilled in the art by routine optimization procedures.

Thus, processes described below should not be viewed as limiting the scope of the synthetic methods available for the preparation of the compounds of the invention.

In some cases a step is needed in order to mask or protect sensitive or reactive moieties, generally known protective groups (PG) could be employed, in accordance to general principles of chemistry (Protective group in organic syntheses, 3rd ed. T. W. Greene, P. G. M. Wuts).

The compounds of formula (I) of the present invention have surprisingly been found to effectively inhibit the receptor ALK5. Advantageously, the inhibition of ALK5 may result in efficacious treatment of the diseases or condition wherein the ALK5 receptor is involved.

In this respect, it has now been found that the compounds of formula (I) of the present invention have an inhibitory drug potency expressed as half maximal inhibitory concentration ($IC_{50}$) on ALK5 lower or equal than 10 nM as shown in the present experimental part.

Preferably, the compounds of the present invention have an $IC_{50}$ on ALK5 between 5 and 10 nM.

Even more preferably, the compounds of the present invention have an $IC_{50}$ on ALK5 lower than 1 nM.

In one aspect, the present invention refers to a compound of formula (I) or a pharmaceutically acceptable salt thereof, for use as a medicament. Thus, the invention refers to a compound of formula (I) in the preparation of a medicament, preferably for use in the prevention and/or treatment of a disease, disorder or condition associated with ALK5 signaling pathway.

In a preferred embodiment, the invention refers to a compound of formula (I) or a pharmaceutically acceptable salt thereof, for use in the prevention and/or treatment of a disease, disorder or condition associated with ALK5 signaling pathway.

In one embodiment, the present invention refers to a compound of formula (I) useful for the prevention and/or treatment of fibrosis and/or diseases, disorders, or conditions that involve fibrosis.

The terms "fibrosis" or "fibrosing disorder," as used herein, refers to conditions that are associated with the abnormal accumulation of cells and/or fibronectin and/or collagen and/or increased fibroblast recruitment and include but are not limited to fibrosis of individual organs or tissues such as the heart, kidney, liver, joints, lung, pleural tissue, peritoneal tissue, skin, cornea, retina, musculoskeletal and digestive tract.

Preferably, the compounds of formula (I) of the present invention, or a pharmaceutical composition comprising a compound of formula (I), are useful for the treatment and/or prevention of fibrosis such as pulmonary fibrosis, idiopathic pulmonary fibrosis (IPF), hepatic fibrosis, renal fibrosis, ocular fibrosis, cardiac fibrosis, arterial fibrosis and systemic sclerosis.

More preferably, the compounds of formula (I) of the present invention, or a pharmaceutical composition comprising a compound of formula (I), are useful for the treatment of idiopathic pulmonary fibrosis (IPF).

As used herein, "safe and effective amount" in reference to a compound of formula (I) or a pharmaceutically acceptable salt thereof or other pharmaceutically-active agent means an amount of the compound sufficient to treat the patient's condition but low enough to avoid serious side effects and it can nevertheless be routinely determined by the skilled artisan.

The compounds of formula (I) may be administered once or according to a dosing regimen wherein a number of doses are administered at varying intervals of time for a given period of time. Typical daily dosages may vary depending upon the route of administration chosen.

The present invention also refers to a pharmaceutical composition comprising a compound of formula (I) in admixture with at least one or more pharmaceutically acceptable carrier or excipient.

In one embodiment, the invention refers to a pharmaceutical composition of compounds of formula (I) in admixture with one or more pharmaceutically acceptable carrier or excipient, for example those described in Remington's Pharmaceutical Sciences Handbook, XVII Ed., Mack Pub., N.Y., U.S.A.

Administration of the compounds of the invention and their pharmaceutical compositions may be accomplished according to patient needs, for example, orally, nasally, parenterally (subcutaneously, intravenously, intramuscularly, intrasternally and by infusion) and by inhalation.

Preferably, the compounds of the present invention are administered orally or by inhalation.

More preferably, the compounds of the present invention are administered by inhalation.

In one preferred embodiment, the pharmaceutical composition comprising the compound of formula (I) is a solid oral dosage form such as tablets, gelcaps, capsules, caplets, granules, lozenges and bulk powders.

In one embodiment, the pharmaceutical composition comprising the compound of formula (I) is a tablet.

The compounds of the invention can be administered alone or combined with various pharmaceutically acceptable carriers, diluents (such as sucrose, mannitol, lactose, starches) and known excipients, including suspending agents, solubilizers, buffering agents, binders, disintegrants, preservatives, colorants, flavorants, lubricants and the like.

In a further embodiment, the pharmaceutical composition comprising a compound of formula (I) is a liquid oral dosage forms such as aqueous and non-aqueous solutions, emulsions and suspensions. Such liquid dosage forms can also contain suitable known inert diluents such as water and suitable known excipients such as preservatives, wetting agents, sweeteners, flavorants, as well as agents for emulsifying and/or suspending the compounds of the invention.

In a further embodiment, the pharmaceutical composition comprising the compound of formula (I) is an inhalable preparation such as inhalable powders, propellant-containing metering aerosols or propellant-free inhalable formulations.

For administration as a dry powder, single- or multi-dose inhalers known from the prior art may be utilized. In that case the powder may be filled in gelatine, plastic or other capsules, cartridges or blister packs or in a reservoir.

A diluent or carrier chemically inert to the compounds of the invention, e.g. lactose or any other additive suitable for improving the respirable fraction may be added to the powdered compounds of the invention.

Inhalation aerosols containing propellant gas such as hydrofluoroalkanes may contain the compounds of the invention either in solution or in dispersed form. The propellant-driven formulations may also contain other ingredients such as co-solvents, stabilizers and optionally other excipients.

The propellant-free inhalable formulations comprising the compounds of the invention may be in form of solutions or suspensions in an aqueous, alcoholic or hydroalcoholic medium and they may be delivered by jet or ultrasonic nebulizers known from the prior art or by soft-mist nebulizers.

The compounds of the invention can be administered as the sole active agent or in combination with other pharmaceutical active ingredients.

The dosages of the compounds of the invention depend upon a variety of factors including among others the particular disease to be treated, the severity of the symptoms, the route of administration and the like.

The invention is also directed to a device comprising a pharmaceutical composition comprising a compound of formula (I) according to the invention, in form of a single- or multi-dose dry powder inhaler or a metered dose inhaler.

All preferred groups or embodiments described above for compounds of formula (I) may be combined among each other and apply as well mutatis mutandis.

The compounds of the invention, including all the compounds here above listed, can be prepared from readily available starting materials using the following general methods and procedures or by using slightly modified processes readily available to those of ordinary skill in the art. Although a particular embodiment of the present invention may be shown or described herein, those skilled in the art will recognize that all embodiments or aspects of the present invention can be obtained using the methods described herein or by using other known methods, reagents and starting materials. When typical or preferred process conditions (i.e. reaction temperatures, times, mole ratios of reactants, solvents, pressures, etc.) are given, other process conditions can also be used unless otherwise stated. While the optimum reaction conditions may vary depending on the particular reactants or solvent used, such conditions can be readily determined by those skilled in the art by routine optimization procedures.

Thus, processes described below and reported in the following schemes should not be viewed as limiting the scope of the synthetic methods available for the preparation of the compounds of the invention.

The compounds of formula (I) including all the compounds or at least one of the here above listed can be generally prepared according to the procedure outlined in detail in the Schemes shown below, using generally known methods.

In a first embodiment of the present invention, compounds of formula (I) can be prepared as described in Scheme 1.

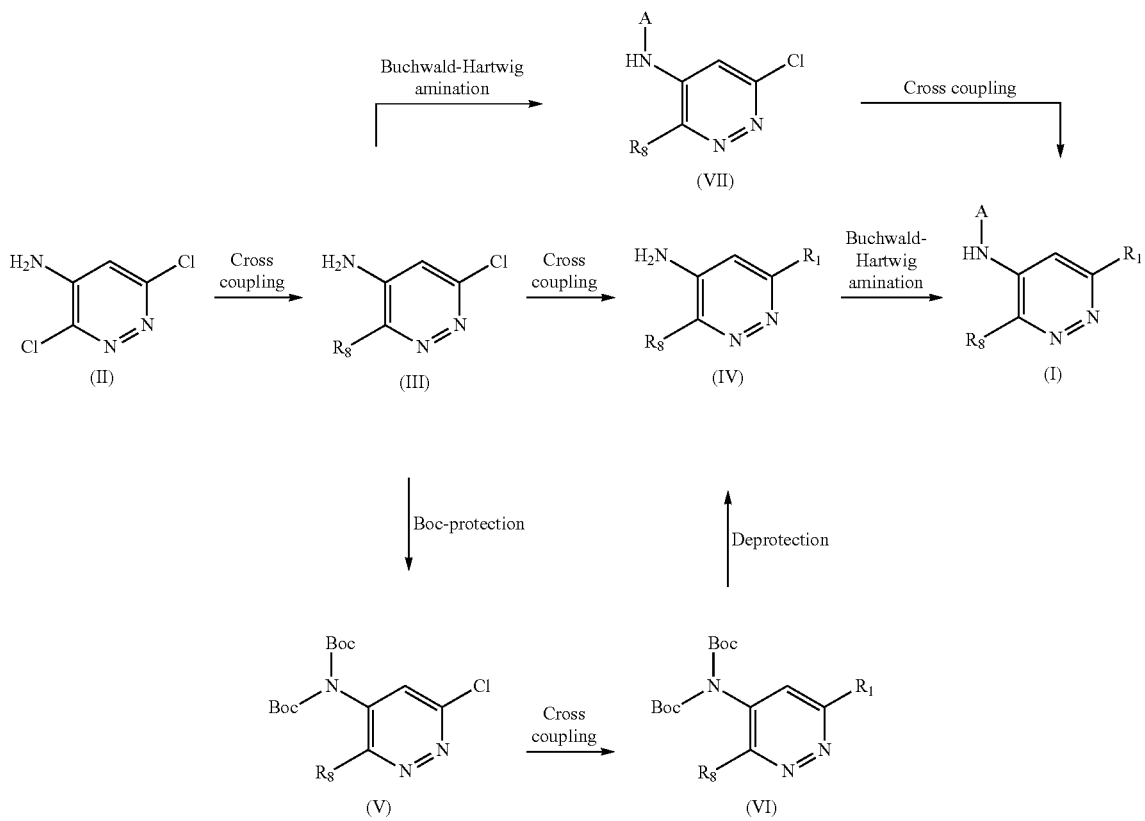

Scheme 1

Scheme 1 provides possible synthetic routes for the preparation of a compound of formula (I), wherein A, $R_1$ and $R_8$ are as defined above.

A compound of formula (III) may be prepared reacting commercially available compound (II) in a cross coupling reaction, such as Suzuki cross couplings in presence of a Pd catalyst. Typical Suzuki conditions to insert $R_8$ group comprise reacting compound (II) with a suitable boronic acid, in the presence of a Pd catalyst, such as Pd(dppf)Cl$_2$ DCM, in a mixture of solvents, such as 1,4 dioxane and water, at an appropriate temperature, such as, for example, 100° C.

Reaction of compound of formula (III) under cross coupling condition, such as Suzuki cross couplings in presence of a Pd catalyst afforded compound (IV). Typical Suzuki conditions to insert $R_1$ group comprise reacting compound (III) with a suitable boronic acid, in the presence of a suitable base such as KF and a Pd catalyst, such as PdCl$_2$(PPh$_3$)$_2$, in a mixture of solvents, such as MeCN and water, at an appropriate temperature, such as, for example, 95° C.

Finally a compound of formula (I) might be obtained by reacting a compound of formula (IV) and a suitable halide under standard Buchwald-Hartwig amination conditions. Typical Buchwald-Hartwig conditions involve the presence of an appropriate base, such as cesium carbonate, a suitable ligand reagent, such as Xantphos, and a suitable catalyst such as Pd(OAc)$_2$, in an appropriate solvent such as 1,4-dioxane and at an appropriate temperature, such as, for example, 100° C.

Alternatively, protection of the nitrogen of a compound of formula (III) as bis tert-butoxy carbonyl (Boc), using di-tert-butyl dicarbonate (Boc anhydride, Boc$_2$O) in the presence of a base, such as triethylamine, in a suitable solvent such as THF, at an appropriate temperature, such as, for example, 70° C. afforded compounds of formula (V). Introduction of $R_1$ to afford compound of formula (VI) may be achieved using, for example, a cross coupling reaction, such as Suzuki cross couplings in presence of a Pd catalyst. Typical Suzuki conditions comprise reacting compound (V) with a suitable boronic acid, in the presence of a Pd catalyst, such as Pd(dppf)Cl$_2$ DCM, with a suitable base such as sodium carbonate, in a mixture of solvents, such as 1,4-dioxane and water, at an appropriate temperature, such as, for example, 100° C.

Removal of the Boc protecting groups under acidic conditions, such as, for example, TFA solution in DCM at room temperature, allowed to obtain compounds of formula (IV).

Finally, reaction of compound (IV) under standard Buchwald-Hartwig amination conditions described above afforded compound (I).

Alternatively, insertion of group A on compound of formula (III) can be achieved by reaction with a suitable halide under standard Buchwald-Hartwig amination conditions to obtain compound of formula (VII). Typical Buchwald-Hartwig conditions involve the presence of an appropriate base, such as sodium tert-butoxide, a suitable ligand reagent, such as Xantphos, and a suitable catalyst such as Pd$_2$(dba)$_3$, in an appropriate solvent such as 1,4-dioxane and at an appropriate temperature, such as, for example, 105° C.

Finally, introduction of $R_1$ can be achieved by reacting compound (VII) under a cross coupling reaction, such as Suzuki cross couplings in presence of a Pd catalyst to afford compound (I). Typical Suzuki conditions comprise reacting compound (VII) with a suitable boronic acid, in the presence of a Pd catalyst, such as Pd(PPh$_3$)$_4$ or Pd(dppf)Cl$_2$ DCM, in presence of a base such as potassium carbonate, in a mixture of solvents, such as 1,2-dimethoxyethane and water, at an appropriate temperature, such as, for example, 90° C.

In another embodiment, compounds of formula (I) can be prepared as described in Scheme 2.

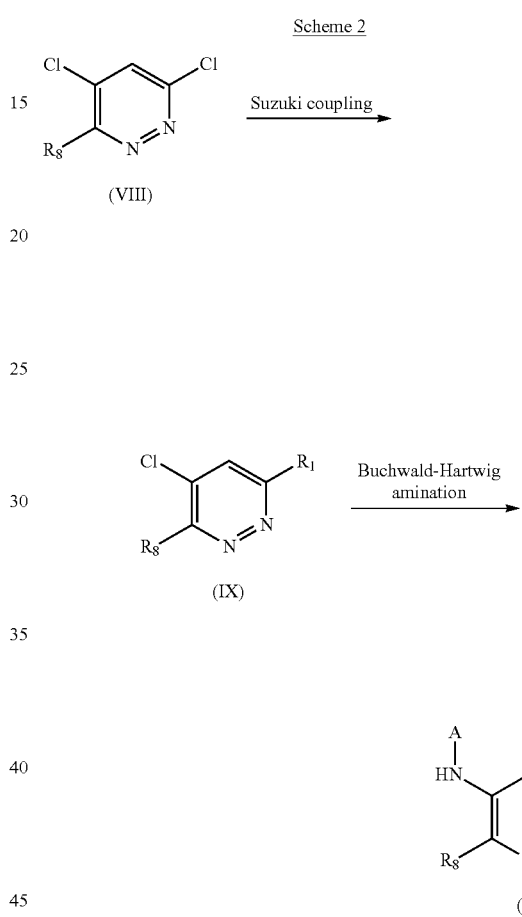

A compound of formula (IX) may be prepared reacting compound (VIII) in a cross coupling reaction, such as Suzuki cross coupling in the presence of a Pd catalyst. Typical Suzuki conditions to insert $R_1$ comprise reacting compound (VIII) with a suitable boronic acid, in the presence of a Pd catalyst, such as Pd(OAc)$_2$, a ligand reagent, such as dppf, in presence of a base, such as cesium carbonate, in a mixture of solvents, such as 1,4-dioxane and water, at an appropriate temperature, such as, for example, 60° C.

Reaction of compound (IX) under Buchwald-Hartwig cross coupling conditions afforded compound (I). Typical Buchwald-Hartwig conditions to insert group A involve the presence of a suitable base, such as cesium carbonate, a suitable ligand reagent, such as Xantphos, and a suitable catalyst such as Pd(OAc)$_2$, in an appropriate solvent such as 1,4-dioxane and at an appropriate temperature, such 110° C.

In another embodiment, compounds of formula (I) can be prepared as described in Scheme 3.

Scheme 3

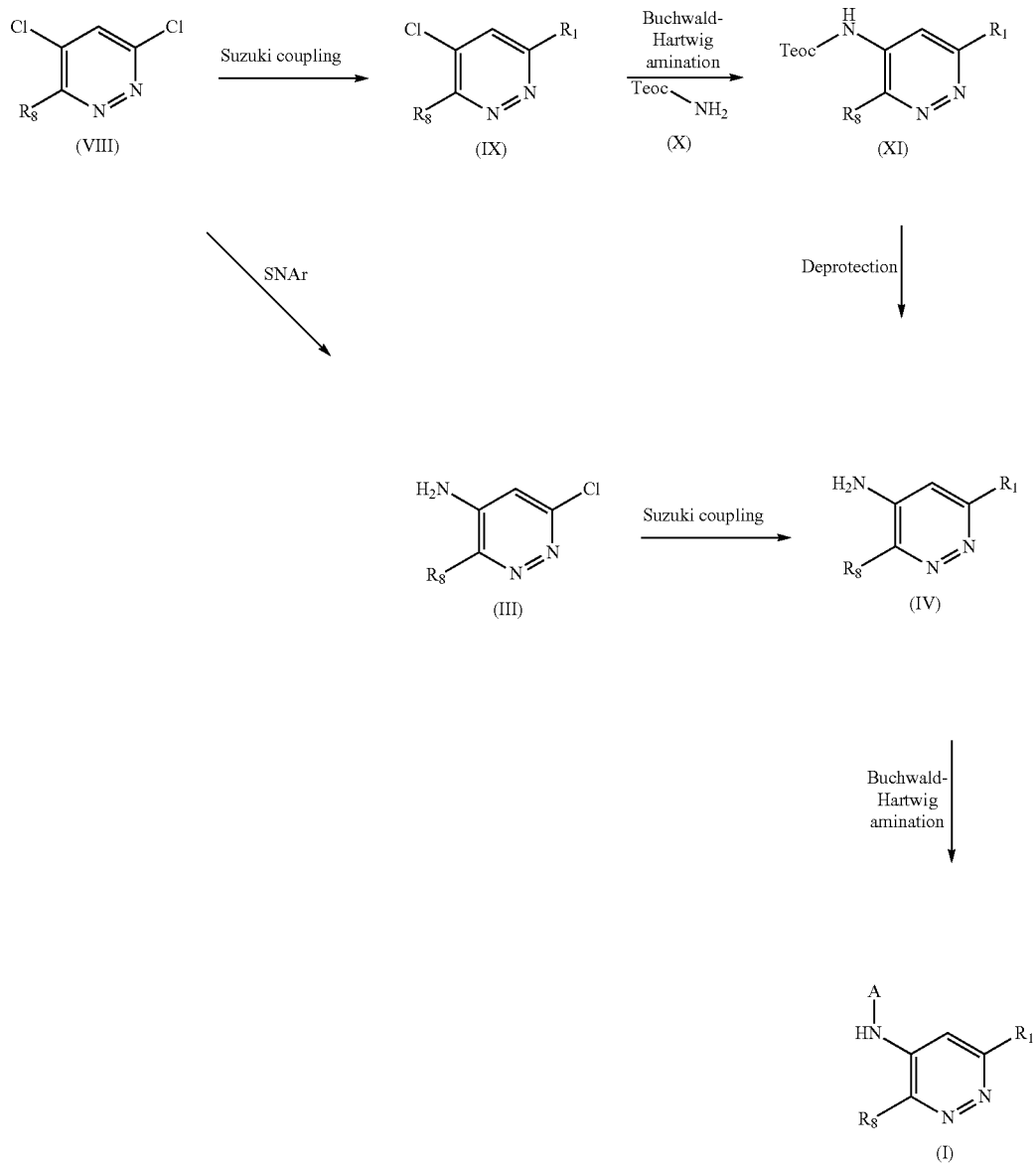

Compound of formula (IX) may be prepared by insertion of $R_1$ group reacting compound (VIII) in a cross coupling reaction, such as Suzuki cross couplings in presence of a Pd catalyst, as described above.

A compound of formula (XI) may be prepared reacting a compound of formula (IX) with Teoc-$NH_2$ (X, 2-(trimethylsilyl)ethylcarbamate) under Buchwald-Hartwig cross coupling conditions. Typical Buchwald-Hartwig conditions involve the presence of a suitable base, such as cesium carbonate, a suitable ligand reagent, such as Xantphos, and a suitable catalyst such as $Pd_2(dba)_3$, in an appropriate solvent such as 1,4-dioxane and at an appropriate temperature, such as 100° C. Cleavage of Teoc (2-(trimethylsilyl)ethoxy carbonyl) using cesium fluoride in DMF afforded compounds (IV).

Finally, reaction of compound (IV) under Buchwald-Hartwig cross coupling conditions afforded compound (I). Typical Buchwald-Hartwig conditions to insert group A comprise reacting compound (IV) with a suitable halide, in the presence of a Pd catalyst, as described above.

A compound of formula (III) may be prepared from compound (VIII) by nucleophilic aromatic substitution with a nucleophile, such as ammonium hydroxide in a suitable solvent, such as in 1,4-dioxane, at an appropriate temperature, such as 90° C.

Compound of formula (IV) may be synthesise reacting compound (III) under Suzuki cross coupling condition. Typical Suzuki conditions to insert $R_1$ comprise reacting compound (III) with a suitable boronic acid, in the presence of a Pd catalyst, as described above.

Finally, reaction of compound (IV) under Buchwald-Hartwig cross coupling conditions afforded compound (I), as described above.

In a specific embodiment of the invention a compound of formula (I) can be prepared as described in Scheme 4.

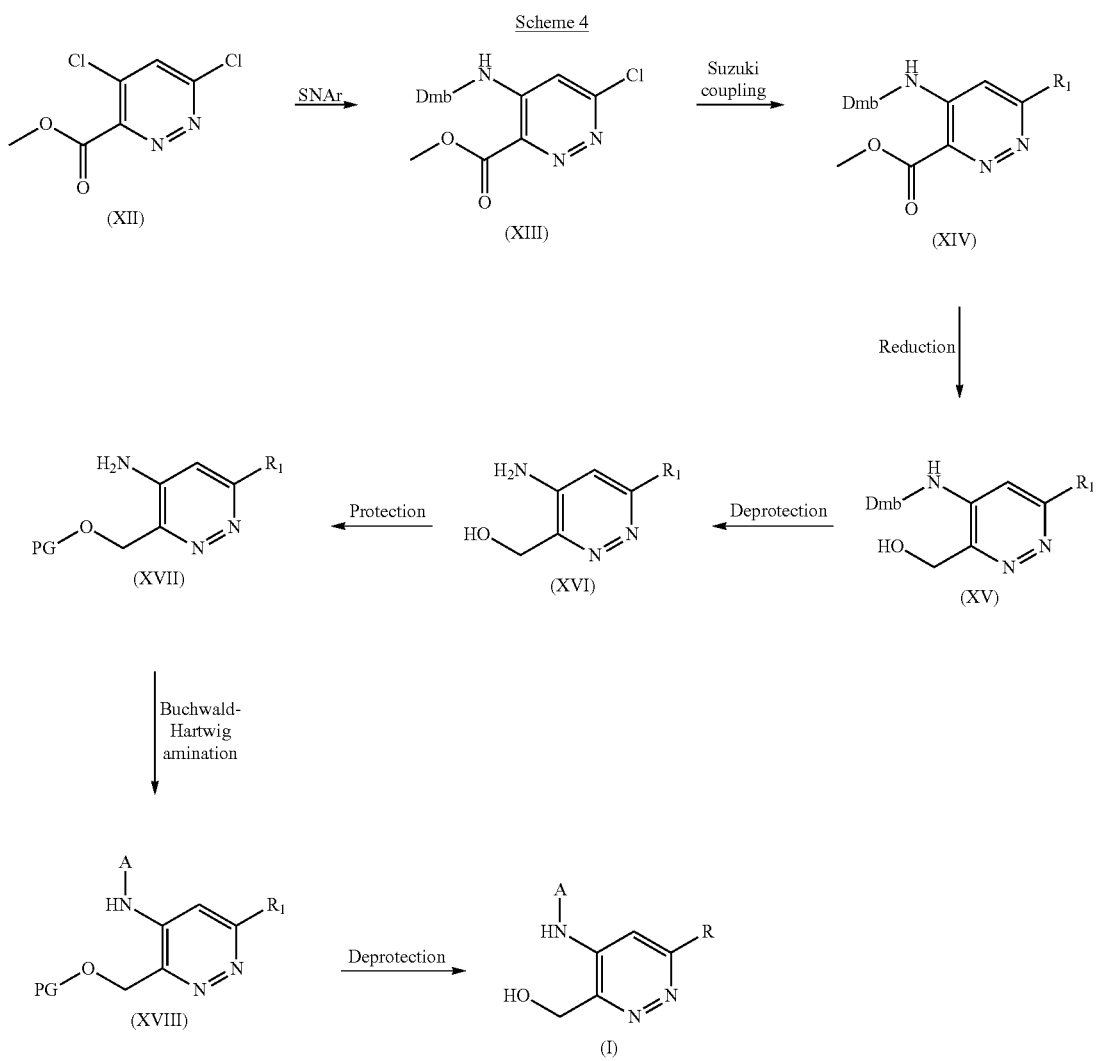

Scheme 4

Scheme 4 provides possible synthetic route for the preparation of a compound of formula (I) with $R_8$ is —($C_1$-$C_6$) alkylene-OH, as for example —$CH_2$OH.

Compound of formula (XIII) may be obtained from commercially available compound (XII) by nucleophilic aromatic substitution (SNAr) with 2,4-dimethoxybenzylamine (dmb) in a suitable solvent, such as MeCN, in presence of a suitable base such as N,N-diisopropylethylamine, typically at room temperature.

Introduction of $R_1$ to afford compound of formula (XIV) may be achieved using, for example, a cross coupling reaction, such as Suzuki cross couplings in presence of a Pd catalyst. Typical Suzuki conditions comprise reacting compound (XIII) with a suitable boronic acid, in the presence of a suitable base such as N,N-diisopropylethylamine and a Pd catalyst, such as Pd(PPh$_3$)$_4$, in a suitable solvents, such as 1,4-dioxane, at an appropriate temperature, such as, for example, 110° C.

Reduction of compound (XIV) with a suitable reducing agent such as lithium aluminum hydride, in a suitable solvent, such as THF, at an appropriate temperature, such as between 0° C. and room temperature, afforded compound (XV).

N-deprotection of compound (XV) under acidic conditions, such as, for example, TFA solution in DCM at room temperature, allowed to obtain compounds of formula (XVI).

Protection of compound (XVI) under standard literature conditions such as by reaction with tert-butyl(chloro)dimethylsilane, in presence of a suitable base such as triethylamine and catalytic amount of DMAP, carrying out the reaction in a suitable solvent, such as DCM at room temperature, afforded compound (XVII).

Reaction of compound (XVII) under Buchwald-Hartwig cross coupling conditions afforded compound (XVIII). Typical Buchwald-Hartwig conditions to insert group A comprise reacting compound (XVII) with a suitable halide, in the presence of a Pd catalyst, as described above.

Finally, deprotection of compound (XVIII) under standard literature conditions such as by reaction with tetrabutyl ammonium fluoride, in a suitable solvent such as THF at an appropriate temperature, such as room temperature, afforded compound (I).

In a specific embodiment of the invention a compound of formula (I) can be prepared as described in Scheme 5.

Scheme 5

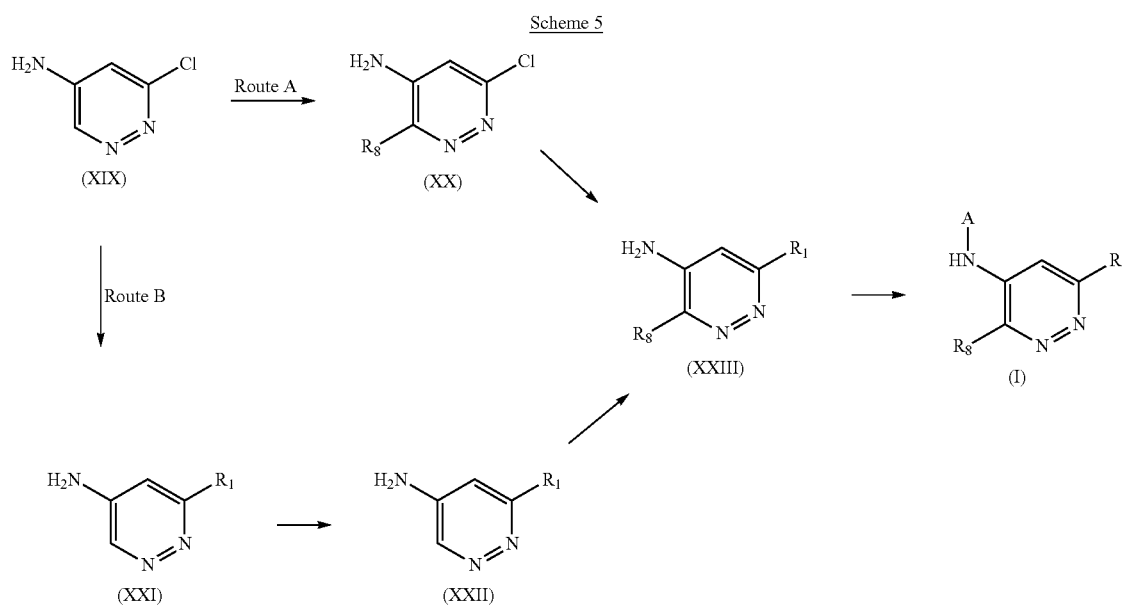

Scheme 5 provides possible synthetic routes for the preparation of a compound of formula (I) wherein $R_8$ is selected from —$(C_1$-$C_6)$haloalkyl, —$(C_1$-$C_6)$alkylene-C(O)O—$(C_1$-$C_6)$alkyl and -cycloalkyl-C(O)O—$(C_1$-$C_6)$alkyl.

Compound of formula (XXIII) may be obtained following two different routes. When $R_8$ is —$(C_1$-$C_6)$haloalkyl, as for example $CF_3$, (Route A), compound (XX) can be prepared starting from commercial available pyridazine (XIX) under Minisci-like reaction condition according to the general procedure reported in the literature (Baran and coworkers, Nature 2012, 95-99) using trifluoromethylsulfinate salt (e.g. zinc) and an oxidant, such as tert-butyl hydroperoxide (TBHP) in a suitable solvent, such as mixture of dichloromethane and water, at an appropriate temperature, typically 60° C.

Compound (XX) can be converted into compound (XXIII) via cross-coupling reaction, such as Suzuki cross coupling reaction, in the presence of a typical Pd catalyst. Typical Suzuki conditions comprise reacting compound (XX) with a suitable boronic acid, in the presence of a suitable base such as potassium carbonate and a Pd catalyst, such as Pd(dppf)Cl$_2$, in suitable solvents, such as 1,4-dioxane and water, at an appropriate temperature, such as, for example, 110° C.

When $R_8$ is —$(C_1$-$C_6)$alkylene-C(O)O—$(C_1$-$C_6)$alkyl or -cycloalkyl —C(O)O—$(C_1$-$C_6)$alkyl, compound (XXIII) can be obtained starting from commercially available compound (XIX) according to Route B. Hence, compound (XIX) is converted into compound (XXI) via Suzuki cross-coupling reaction, under similar conditions as reported above for compound (XXIII). Then, $R_8$ radical can be introduced by Minisci-like reaction involving redox-active esters (RAEs, such as N-Hydroxy Phtalimide Esters NHPI), a suitable photocatalyst, such as 4CzIPN, in a suitable solvent, such as DMSO, under irradiation of an appropriate LED lamp, typically blue, as described in the literature (Dhar and coworkers, J. Org. Chem. 2018, 83, 3000-3012) affording compound (XXIII). Reaction of compound (XXIII) under Buchwald-Hartwig cross coupling conditions afforded compound (I). Typical Buchwald-Hartwig conditions to insert group A comprise reacting compound (XXIII) with a suitable halide, in the presence of a Pd catalyst, as described above.

Preparations of Intermediates and Examples

Chemical Names of the compounds were generated with the Structure To Name Enterprise 10.0 Cambridge Software.

All reagents, for which the synthesis is not described in the experimental part, are either commercially available, or are known compounds or may be formed from known compounds by known methods by a person skilled in the art.

In the procedures that follow, some of the starting materials are identified through an "Intermediate" or "Example" number with indications on step number. This is provided merely for assistance to the skilled chemist.

A "similar" or "analogous" procedure means that such a procedure may involve minor variations, for example reaction temperature, reagent/solvent amount, reaction time, work-up conditions or chromatographic purification conditions.

Abbreviation—Meaning

Boc=tert-Butyloxycarbonyl
cHex=Cyclohexane
Cs$_2$CO$_3$=Cesium carbonate
DIC=N,N'-Diisopropylcarbodiimide
DCM=Dichloromethane
DIPEA=N,N-Diisopropylethylamine
DMAP=4-(Dimethylamino)pyridine
DMF=Dimethylformamide
DMSO=Dimethylsulfoxide
DPPA=Diphenylphosphoryl azide
dppf=1,1-Ferrocenediyl-bis(diphenylphosphine)
EtOAc=Ethyl acetate
HCOOH=Formic acid
h=hour
HATU=1-[Bis(dimethylamino)methylene]-1H-1,2,3-triazolo[4,5-b]pyridinium 3-oxid hexafluorophosphate
HBr=Hydrobromic acid HCl=Hydrochloric acid
H$_2$O=Water
KF=potassium fluoride
K$_3$PO$_4$=Potassium phosphate tribasic
LC-MS=liquid chromatography/mass spectrometry
MeCN=Acetonitrile
MeOH=Methanol
MTBE=tert-Butyl methyl ether
NaI=sodium iodide
NaOH=Sodium hydroxide
Na$_2$SO$_4$=Sodium sulfate
NaHCO$_3$=Sodium bicarbonate
NaHSO$_4$=Sodium hydrogen sulfate
Na$_2$CO$_3$=Sodium carbonate
NH$_3$=Ammonia
NH$_4$Cl=ammonium chloride
Pd/C=Palladium on carbon
PdCl$_2$(PPh$_3$)$_2$=Bis(triphenylphosphine)palladium(II) dichloride
Pd$_2$(dba)$_3$=Tris(dibenzylideneacetone)dipalladium(O)
Pd(dppf)Cl$_2$ DCM=[1,1'-Bis(diphenylphosphino)ferrocene]dichloropalladium(II), complex with dichloromethane
Pd(OAc)$_2$=Palladium(II) acetate
Pd(PPh$_3$)$_4$=Tetrakis(triphenylphosphine)palladium(O)
PL-HCO$_3$=polymer supported hydrogencarbonate
PPh$_3$=Triphenylphosphine
RT=room temperature
SCX=Strong Cation Exchange
SOCl$_2$=Thionyl chloride
s.s.=saturated solution
t-BuOOH=tert-Butyl hydroperoxide
T3P=Propylphosphonic anhydride
TEA=Triethylamine
Teoc=2-(Trimethylsilyl)ethylcarbamate
TFA=Trifluoroacetic acid
TCFH=Chloro-N,N,N',N'-tetramethylformamidinium hexafluorophosphate
THF=Tetrahydrofuran
Xantphos=4,5-Bis(diphenylphosphino)-9,9-dimethylxanthene General Experimental Details and Methods Analytical Method
Instruments, Materials and Methods Employed for Analyses
$^1$H-NMR spectra were performed on a Varian MR-400 spectrometer operating at 400 MHZ (proton frequency), equipped with: a self-shielded Z-gradient coil 5 mm 1H/nX broadband probe head for reverse detection, deuterium digital lock channel unit, quadrature digital detection unit with trans mitter offset frequency shift, or on AgilentVNMRS-500 or on a Bruker Avanice 400 spectrometers. Chemical shift are reported as δ values in ppm relative to trimethylsilane (TMS) as an internal standard. Coupling constants (J values) are given in hertz (Hz) and multiplicities are reported using the following abbreviation (s=singlet, d=doublet, t=triplet, q=quartet, m=multiplet, br. s=broad singlet, nd=not determined, dd=double-doublet, ddd=double-double-doublet, quin=quintuplet, td=triple doublet, tt=triple triplet, qd=quadruple doublet).
LC/UV/MS Analytical Methods
LC/MS retention times are estimated to be affected by an experimental error of ±0.5 min. LCMS may be recorded under the following conditions: diode array DAD chromatographic traces, mass chromatograms and mass spectra may be taken on UPLC/PDA/MS Acquity™ system coupled with Micromass ZQ™ or Waters SQD single quadrupole mass spectrometer operated in positive and/or negative electron spray ES ionization mode and/or Fractionlynx system used in analytical mode coupled with ZQ™ single quadrupole operated in positive and/or negative ES ionisation mode. Quality Control methods used operated under low pH conditions or under high pH conditions:

Method 1, low pH conditions column: Acquity CSH C18 2.1×50 mm 1.7 um, the column temperature was 40° C.; mobile phase solvent A was milliQ water+0.1% HCOOH, mobile phase solvent B MeCN+0.1% HCOOH. The flow rate was 1 mL/min.

The gradient table was t=0 min 97% A 3% B, t=1.5 min 0.1% A 99.9% B, t=1.9 min 0.1% A 99.9% B and t=2 min 97% A 3% B. The UV detection range was 210-350 nm and ES+/ES− range was 100 to 1500 AMU.

Method 2, high pH conditions: column: Acquity Kinetex 1.7 um EVO C18 100A, 2.1×50 mm, the column temperature was 40° C.; mobile phase solvent A was mM aqueous solution of NH$_4$HCO$_3$ adjusted to pH=10 with ammonia, mobile phase solvent B MeCN. The flow rate was 1 mL/min. The gradient table was t=0 min 97% A 3% B, t=1.5 min 0.1% A 99.9% B, t=1.9 min 0.1% A 99.9% B and t=2 min 97% A 3% B. The UV detection range was 210-350 nm and ES+/ES− range was 100 to 1500 AMU.

Preparation of Intermediates

Intermediate 1: Tert-butyl N-[(tert-butoxy)carbonyl]-N-(6-chloropyridazin-4-yl)carbamate 6-chloropyridazin-4-amine (2.0 g, 15.44 mmol) was dissolved in THF (80 mL), TEA (3.12 g, 30.88 mmol) and DMAP (0.09 g, 0.77 mmol) were added followed by di-tert-butyl dicarbonate (11.79 g, 54.03 mmol). The mixture was refluxed for 5 hrs. Then THF was evaporated and the residue partitioned between EtOAc and s.s. of NH$_4$Cl, the organic phase was dried and evaporated, the crude material was purified by flash chromatography on Biotage silica cartridge (from cHex to 30% EtOAc) to afford Intermediate 1 (3.96 g, 12.01 mmol, 78% yield) as white solid.

LC-MS (ESI): m/z (M+1): 330.1 (Method 1)

Intermediate 2: Tert-butyl N-[(tert-butoxy)carbonyl]-N-[6-(5-chloro-2-fluorophenyl)pyridazin-4-yl]carbamate Intermediate 1 (1.0 g, 3.03 mmol), (5-chloro-2-fluorophenyl) boronic acid (0.58 g, 3.34 mmol) and Na$_2$CO$_3$ 2 M (4.55 mL, 9.1 mmol) in 1,4-Dioxane (12 mL) was degassed with N$_2$ for 5 minutes, then Pd(dppf)Cl$_2$ DCM (248 mg, 0.30 mmol) was added. The resulting mixture was heated at 100° C. for 1 h. The reaction was complete, so the mixture was evaporated and the residue was partitioned between EtOAc and water, the organic phase was separated, dried and evaporated. The crude material was purified by flash chromatography on Biotage silica cartridge (from cHex to 30% EtOAc) to afford Intermediate 2 (1.1 g, 2.6 mmol, 86% yield).

LC-MS (ESI): m/z (M+1): 330.1 (Method 1)

Intermediate 3: 6-(5-chloro-2-fluorophenyl)pyridazin-4-amine

Method A

Intermediate 2 (1.1 g, 2.6 mmol) was dissolved in DCM (10 mL) and TFA (3.0 mL, 39.18 mmol), the reaction solution was stirred for 5 hrs, then further 2 mL of TFA were added and the reaction was stirred overnight at RT. The day after volatiles were removed under vacuum, the residue was dissolved in MeOH and charged on SCX cartridge washing with MeOH and eluting with 1 N NH$_3$ in MeOH; basic fractions were collected to afford Intermediate 3 (530 mg, 2.37 mmol, 91% yield) as white solid.

Method B

A mixture of 6-chloropyridazin-4-amine (3.0 g, 23.16 mmol), (5-chloro-2-fluorophenyl) boronic acid (5.25 g, 30.1 mmol) and KF (3.42 g, 57.89 mmol) in MeCN (30 mL)/Water (23.3 mL) was degassed with N$_2$ for 2 minutes, then PdCl$_2$ (PPh$_3$)$_2$ (1.63 g, 2.32 mmol) was added and the mixture was warmed at 95° C. After 7 hrs the conversion was not complete, so more boronic acid (2 g), catalyst (300 mg) and KF (700 mg) were added, and stirred at the same temperature for 24 hrs. After cooling down, the mixture was evaporated to dryness, the residue was taken-up with a large amount of MeOH, some insolubles were filtered off. The methanolic solution was concentrated under vacuum, dissolved with hot EtOAc and allowed to reach RT. Insolubles were discarded, the solution was evaporated to dryness to give a residue that was crystallized from hot EtOAc. After cooling the solid was filtered to afford a first crop of title compound (2.2 g). The mother liquor was evaporated and purified by flash chromatography on Biotage silica NH cartridge (from DCM to 3% MeOH) to give further 500 mg. The two batches were reunited to afford Intermediate 3 (2.7 g, 12.07 mmol, 52% yield).

LC-MS (ESI): m/z (M+1): 224 (Method 2)

Intermediate 4: Methy 4-bromo-1-(2-trimethylsilylethoxymethyl)pyrrolo[2,3-b]pyridine-3-carboxylate Methyl 4-bromo-1H-pyrrolo[2,3-b]pyridine-3-carboxylate (1.5 g, 5.88 mmol) was suspended in THF (20 mL) and cooled with ice bath under N$_2$, then sodium hydride 60% dispersion in oil (0.28 g, 11.76 mmol) was added and stirred for 30 min at the same temperature before adding dropwise 2-(chloromethoxy)ethyl-trimethylsilane (1.35 mL, 7.64 mmol). The reaction mixture was allowed to reach RT and stirred for 3 hrs. Water and EtOAc were added, the product was extracted several times with EtOAc, organic phases were collected, dried and evaporated. The crude material was purified by flash chromatography on Biotage silica cartridge (from DCM to 5% MeOH) to afford Intermediate 4 (1.05 g, 2.72 mmol, 46% yield) as white wax.

LC-MS (ESI): m/z (M+1): 387.0 (Method 1)
$^1$H NMR (400 MHz, Chloroform-d) δ ppm 8.15 (d, J=5.0 Hz, 1H), 8.13 (s, 1H), 7.48 (d, J=5.0 Hz, 1H), 3.92 (s, 3H), 5.70 (s, 2H), 3.56 (dd, J=8.9, 7.8 Hz, 2H), 0.88-1.01 (m, 2H), –0.09-0.01 (m, 9H).

Intermediate 5: Methyl 4-chloro-1-{[2-(trimethylsilyl)ethoxy]methyl}-1H-pyrrolo[2,3-b]pyridine-2-carboxylate To an ice-cooled suspension of methyl 4-chloro-1H-pyrrolo[2,3-b]pyridine-2-carboxylate (1.0 g, 4.75 mmol) in dry THF (35 mL), sodium hydride 60% dispersion in oil (0.28 g, 7.12 mmol) was added and the mixture stirred for 30 min before adding 2-(chloromethoxy)ethyl-trimethylsilane (1.09 mL, 6.17 mmol). The reaction mixture was allowed to reach RT and stirred at RT for 3 hrs. The mixture was quenched with s.s. of NH$_4$Cl, diluted with EtOAc and washed with brine (1×). The organic phase was dried and concentrated under vacuum and left as solid (yellow) at RT, overnight. The day after, the color of the solid was white and UPLC check showed the complete conversion to give the reported regioisomer. The residue was purified by flash chromatography on Biotage silica cartridge (from cHex to 10% EtOAc), to afford Intermediate 5 (820 mg, 2.41 mmol, 51% yield).

LC-MS (ESI): m/z (M+1): 341.1 (Method 1)
$^1$H NMR (500 MHz, Chloroform-d) δ ppm 8.38 (d, J=5.1 Hz, 1H), 7.40 (s, 1H), 7.20 (d, J=5.1 Hz, 1H), 6.14 (s, 2H), 3.97 (s, 3H), 3.52-3.58 (m, 2H), 0.85-0.92 (m, 2H), –0.11--0.05 (m, 9H).

Intermediate 6: Lithium 4-bromo-1-{[2-(trimethylsilyl)ethoxy]methyl}-1H-pyrrolo[2,3-b]pyridine-3-carboxylate Lithium hydroxide hydrate (116 mg, 2.77 mmol) was added to a solution of methyl 4-bromo-1-(2-trimethylsilylethoxymethyl)pyrrolo[2,3-b]pyridine-3-carboxylate (Intermediate 4, 1.0 g, 2.52 mmol) in a mixture of THF (12 mL)/MeOH (2 mL)/Water (2 mL) and stirred at 50° C. overnight. The day after volatiles were removed under vacuum to afford Intermediate 6 (1 g, recovery assumed quantitative) used as such in the next step.

LC-MS (ESI): m/z (M+1): 373.0 (Method 1)

Intermediate 7: 4-bromo-N-[2-(4-methylpiperazin-1-yl)ethyl]-1-{[2-(trimethylsilyl)ethoxy]methyl}-1H-pyrrolo[2,3-b]pyridine-3-carboxamide Intermediate 6 (300 mg, 0.80 mmol) and 1-(2-aminoethyl)-4-methylpiperazine (125 mg, 0.87 mmol) were mixed in MeCN (8 mL), 1-methylimidazole (0.22 mL, 2.78 mmol) was added followed by TCFH (268 mg, 0.95 mmol). The resulting solution was stirred at RT 3 hrs, then at 60° C. overnight. The day after solvent was removed by evaporation, the residue was redissolved with DCM, solids were filtered off, and the liquid was concentrated and purified by flash chromatography on Biotage silica NH cartridge (from DCM to 35% EtOAc) to afford Intermediate 7 (170 mg, 0.34 mmol, 43% yield).

LC-MS (ESI): m/z (M+1): 518.3 (Method 2)

Intermediate 8: 4-{[6-(5-chloro-2-fluorophenyl)pyridazin-4-yl]amino}-N-[2-(4-methylpiperazin-1-yl)ethyl]-1-{[2-(trimethylsilyl)ethoxy]methyl}-1H-pyrrolo[2,3-b]pyridine-3-carboxamide 6-(5-chloro-2-fluorophenyl)pyridazin-4-amine (Intermediate 3, 70 mg, 0.31 mmol), Intermediate 7 (171 mg, 0.34 mmol), Xantphos (27 mg, 0.05 mmol) and K$_3$PO$_4$ (135 mg, 0.63 mmol) were mixed in 1,4-Dioxane (4 mL). The mixture was degassed for 3 min with N$_2$ before adding Pd$_2$(dba)$_3$ (29 mg, 0.03 mmol), the resulting mixture was heated at 100° C. overnight. Solids were filtered off and the residue was concentrated and purified by reverse flash chromatography on Biotage C18 cartridge (from H$_2$O+0.1% NH$_4$OH to MeCN) to afford Intermediate 8 (36 mg, mmol, 18% yield) used as such in the next step.

LC-MS (ESI): m/z (M+1): 639.3 (Method 2)

Intermediate 9: Methyl 4-{[6-(5-chloro-2-fluorophenyl)pyridazin-4-yl]amino}-1-{[2-(trimethylsilyl)ethoxy]methyl}-1H-pyrrolo[2,3-b]pyridine-2-carboxylate Methyl 4-chloro-1-{[2-(trimethylsilyl)ethoxy]methyl}-1H-pyrrolo[2,3-b]pyridine-2-carboxylate (Intermediate 5, 508 mg, 1.48 mmol), Cs$_2$CO$_3$ (880 mg, 2.68 mmol), Xantphos (93 mg, 0.16 mmol) and Intermediate 3 (300 mg, 1.34 mmol) were mixed in 1,4-Dioxane (4 mL) and degassed 5 min with N$_2$, then Pd(OAc)$_2$ (15 mg, 0.07 mmol) was added. The resulting reaction mixture was irradiated with MW at 110° C. for 90 min. Solids were filtered washing with EtOAc, volatiles were removed under vacuum and the residue was purified by flash chromatography on Biotage silica cartridge (from cHex to 45% EtOAc) to afford Intermediate 9 (220 mg, 0.42 mmol, 31% yield) as yellow foam.

LC-MS (ESI): m/z (M): 528.2 (Method 1)

Intermediate 10: Lithium 4-{[6-(5-chloro-2-fluorophenyl)pyridazin-4-yl]amino}-1-{[2-(trimethylsilyl)ethoxy]methyl}-1H-pyrrolo[2,3-b]pyridine-2-carboxylate Intermediate 9 (30 mg, 0.06 mmol) was dissolved in a mixture of THF (1.5 mL)/MeOH (0.50 mL)/H$_2$O (0.50 mL), then lithium hydroxide hydrate (2.62 mg, mmol) was added and stirred at 50° C. for 2 hrs. Volatiles were removed under vacuum to afford Intermediate 10 (29 mg, 0.06 mmol, 98% yield) as yellow solid.

LC-MS (ESI): m/z (M+1): 373.0 (Method 1)

Intermediate 11: 4-{[6-(5-chloro-2-fluorophenyl)pyridazin-4-yl]amino}-N-[2-(4-methylpiperazin-1-yl)ethyl]-1-{[2-(trimethylsilyl)ethoxy]methyl}-1H-pyrrolo[2,3-b]pyridine-2-carboxamide 1-(2-aminoethyl)-4-methylpiperazine (8 mg, 0.06 mmol) was added to a solution of Intermediate 10 (29 mg, 0.06 mmol), HATU (25 mg, 0.07 mmol) and DIPEA (0.02 mL, 0.11 mmol) in DMF (2.5 mL). The mixture was stirred at 50° C. for 2 hrs, then further 1 eq of HATU was added and stirred at 50° C. overnight. The mixture was charged on SCX, washing with MeOH and eluting with 1 N NH3 in MeOH. Basic fractions were collected, dried and purified by flash chromatography on Biotage silica NH cartridge (from 30% cHex to 10% MeOH in EtOAc) to afford Intermediate 11 (25 mg, 0.04 mmol, 70% yield).

LC-MS (ESI): m/z (M+1): 639.2 (Method 1)

Intermediate 12: 4-{[6-(5-chloro-2-fluorophenyl)pyridazin-4-yl]amino}-N-[2-(1-methylpiperidin-4-yl)ethyl]-1-{[2-(trimethylsilyl)ethoxy]methyl}-1H-pyrrolo[2,3-b]pyridine-2-carboxamide Intermediate 12 was prepared following the procedure used for the synthesis of Intermediate 11 starting from Intermediate 10 (29 mg, 0.06 mmol) and 2-(1-methylpiperidin-4-yl)ethan-1-amine (8 mg, 0.06 mmol) to afford title compound (22 mg, 0.03 mmol, 62% yield).

LC-MS (ESI): m/z (M+1): 638.3 (Method 1)

Intermediate 13: Methyl 4-{[6-(5-chloro-2-fluorophenyl)pyridazin-4-yl]amino}quinoline-7-carboxylate A suspension of Intermediate 3 (320 mg, 1.43 mmol), methyl 4-chloroquinoline-7-carboxylate (380 mg, 1.72 mmol) and Cs$_2$CO$_3$ (938 mg, 2.86 mmol) in 1,4-Dioxane (16 mL) was prepared and degassed with N$_2$ for 2 minutes, then Pd(OAc)$_2$ (16 mg, 0.07 mmol) and Xantphos (83 mg, 0.14 mmol) were added and the resulting mixture was irradiated with MW (110° C. for 3 hrs). The mixture was filtered on Celite® pad washing with EtOAc/MeOH, then the organic phase was evaporated under vacuum. The crude material was purified by flash chromatography on Biotage silica cartridge (from DCM to 5% MeOH) to afford Intermediate 13 (360 mg, 0.88 mmol, 62% yield).

LC-MS (ESI): m/z (M+1): 409.1 (Method 2)

Intermediate 14: Lithium 4-{[6-(5-chloro-2-fluorophenyl)pyridazin-4-yl]amino}quinoline-7-carboxylate Intermediate 14 was prepared following the procedure used for the synthesis of Intermediate 6 starting from Intermediate 13 (125 mg, 0.31 mmol) to afford title compound (125 mg, 0.31 mmol, quantitative yield) as yellow solid.

LC-MS (ESI): m/z (M+1): 395.2 (Method 1)

Intermediate 15: 4-{[6-(5-chloro-2-fluorophenyl)pyridazin-4-yl]amino}quinoline-7-carboxylic acid Lithium hydroxide hydrate (78 mg, 1.82 mmol) was added to a stirred mixture of Intermediate 13 (500 mg, 1.02 mmol) in THF (6 mL) and H$_2$O (2 mL) at RT. The reaction was warmed at 70° C. for 6 hrs. After cooling the solvents were removed by reduced pressure. The residue was treated with H$_2$O and NaHSO$_4$ was added until pH 6. The solvent was removed by reduced pressure to afford Intermediate 15 (500 mg, recovery assumed quantitative) used for next step without further purification.

LC-MS (ESI): m/z (M+1): 395.2 (Method 1)

Intermediate 16: Tert-butyl 4-{2-[(4-{[6-(5-chloro-2-fluorophenyl)pyridazin-4-yl]amino}quinolin-7-yl)formamido]ethyl}piperazine-1-carboxylate A mixture of Intermediate 14 (65 mg, 0.16 mmol), tert-butyl 4-(2-aminoethyl)piperazine-1-carboxylate (45 mg, 0.19 mmol), DIPEA (0.11 mL, 0.65 mmol) and HATU (80 mg, 0.21 mmol) in dry DMF (3 mL) was stirred at RT overnight. The mixture was diluted with EtOAc, then washed with water and with brine. The organic phase was dried over Na$_2$SO$_4$, filtered and evaporated to give a yellow oil which was purified by reverse flash chromatography on Biotage C18 cartridge (from H$_2$O+0.1% NH$_4$OH to 55% MeCN) to afford Intermediate 16 (48 mg, 0.08 mmol, 49% yield) as a yellow solid.

LC-MS (ESI): m/z (M+1): 606.4 (Method 1)

Intermediate 17: 4-chloro-7-[2-(morpholin-4-yl)ethoxy]quinoline

A mixture of 4-chloro-7-hydroxyquinoline (175 mg, 0.97 mmol), 4-(2-hydroxyethyl)morpholine (153 mg, 1.17 mmol) and PPh$_3$ (383 mg, 1.46 mmol) in dry THF (12 mL) was stirred under nitrogen for 2 minutes, then a solution of Diisopropyl azodicarboxylate (0.23 mL, 1.17 mmol) in dry THF (3 mL) was added dropwise at 0° C. The resulting mixture was stirred at RT overnight. The mixture was partitioned between EtOAc and brine. The aqueous phase was separated and extracted with more EtOAc. The combined organics were washed with brine, dried over Na$_2$SO$_4$, filtered and evaporated. The residue was dissolved in MeOH and charged on SCX cartridge washing with MeOH and eluting with 1 N NH3 in MeOH; basic fractions were collected to afford Intermediate 17 (376 mg, recovery assumed quantitative) as a reddish solid which was not purified any further.

LC-MS (ESI): m/z (M+1): 293.2 (Method 1)

Intermediate 18: Tert-butyl 4-{2-[(4-chloroquinolin-7-yl)oxy]ethyl}piperazine-1-carboxylate Title compound was prepared following the procedure used for the synthesis of Intermediate 17 starting from 4-chloro-7-hydroxyquinoline (300 mg, 1.67 mmol) and 1-Boc-4-(2-hydroxyethyl)piperazine (423 mg, 1.84 mmol) to afford title compound (700 mg, recovery assumed quantitative).

LC-MS (ESI): m/z (M+1): 392.3 (Method 1)

Intermediate 19: Tert-butyl 4-{2-[(4-{[6-(5-chloro-2-fluorophenyl)pyridazin-4-yl]amino}quinolin-7-yl)oxy]ethyl}piperazine-1-carboxylate Intermediate 19 was prepared following the procedure used for the synthesis of Intermediate 13 starting from Intermediate 18 (159 mg, 0.41 mmol) and Intermediate 3 (70 mg, 0.32 mmol) to afford title compound (30 mg, 0.05 mmol, 17% yield).

LC-MS (ESI): m/z (M+1): 579.3 (Method 2)

Intermediate 20: 4-chloro-7-[3-(4-methylpiperazin-1-yl)propoxy]quinoline

To a stirred mixture of 4-Chloro-7-hydroxyquinoline (150 mg, 0.840 mmol), 3-(4-methylpiperazin-1-yl)propan-1-ol (199 mg, 1.26 mmol) and PPh$_3$ (329 mg, 1.25 mmol) in THF (5 mL), at 0° C. and under a N$_2$ atmosphere, Diisopropyl azodicarboxylate (0.25 mL, 1.27 mmol) was added portionwise then the resulting reaction mixture was heated to 55° C. and stirred for 2 hrs. The mixture was concentrated under reduced pressure and the residue was taken up with EtOAc and a concentrated solution of NH$_4$Cl. The organic phase was washed with water, brine, dried over Na$_2$SO$_4$ and the solvent removed under reduced pressure. The crude material was purified by flash chromatography on Biotage silica NH cartridge (from DCM to 3% MeOH) to afford Intermediate 20 (172 mg, 0.54 mmol, 64% yield) as orange oil.

LC-MS (ESI): m/z (M+1): 320.1 (Method 1)

Intermediate 21: 4-chloro-7-[2-(piperazin-1-yl)ethoxy]quinoline

Intermediate 18 (534 mg, 1.36 mmol) was dissolved in DCM (3.36 mL) and TFA (1.57 mL, 20.44 mmol) was added, then the resulting reaction mixture was stirred at RT for 2 hrs. The mixture was concentrated under reduced pressure, the residue was dissolved in MeOH and charged on SCX cartridge washing with MeOH and eluting with 4 N NH$_3$ in MeOH); basic fractions were collected to afford Intermediate 21 (340 mg, 1.16 mmol, 86% yield) as yellow solid.

LC-MS (ESI): m/z (M+1): 292.1 (Method 1)

Intermediate 22: 4-chloro-7-[2-(4-ethylpiperazin-1-yl)ethoxy]quinoline

To a stirred solution of Intermediate 21 (164 mg, 0.56 mmol) in MeOH (3 mL), at 0° C. and under N$_2$, acetic acid (0.32 mL, 5.62 mmol) and acetaldehyde (0.38 mL, 6.74 mmol) were added subsequently. After 5 min, sodium cyanoborohydride (174 mg, 2.81 mmol) was added portionwise, the ice-bath was removed and the resulting reaction mixture was stirred overnight at RT. The reaction mixture was concentrated under reduced pressure to remove the solvent, then the residue was taken up with DCM and concentrated solution of NaHCO$_3$. The organic phase was dried over Na$_2$SO$_4$ and the solvent was removed under reduced pressure. The crude material was purified by flash chromatography on Biotage silica NH cartridge (from DCM to 4% MeOH) to afford Intermediate 22 (74 mg, 0.23 mmol, 41% yield).

LC-MS (ESI): m/z (M+1): 320.1 (Method 1)

Intermediate 23: 4-chloro-7-[2-(4-methylpiperazin-1-yl)ethoxy]quinoline

Title compound was prepared following the procedure used for the synthesis of Intermediate 17 starting from 4-chloro-7-hydroxyquinoline (300 mg, 1.67 mmol) and 1-(2-Hydroxyethyl)-4-methylpiperazine (265 mg, 1.84 mmol) to afford title compound (200 mg, 0.65 mmol, 39% yield).

LC-MS (ESI): m/z (M+1): 306.1 (Method 1)

Intermediate 24: Tert-butyl 4-{2-[(4-chloroquinolin-7-yl)oxy]ethyl}piperidine-1-carboxylate Intermediate 24 was prepared following the procedure used for the synthesis of Intermediate 17 starting from 4-Chloro-7-hydroxyquinoline (250 mg, 1.39 mmol) and tert-butyl 4-(2-hydroxyethyl)piperidine-1-carboxylate (383 mg, 1.67 mmol) to afford title compound (320 mg, 0.82 mmol, 59% yield).

LC-MS (ESI): m/z (M+1): 391.3 (Method 1)

Intermediate 25: Tert-butyl 4-{2-[(4-{[6-(5-chloro-2-fluorophenyl)pyridazin-4-yl]amino}quinolin-7-yl)oxy]ethyl}piperidine-1-carboxylate Intermediate 25 was prepared following the procedure used for the synthesis of Intermediate 13 starting from tert-butyl 4-{2-[(4-chloroquinolin-7-yl)oxy]ethyl}piperidine-1-carboxylate (Intermediate 24, 273 mg, 0.70 mmol) and 6-(5-chloro-2-fluorophenyl)pyridazin-4-amine (Intermediate 3, 120 mg, 0.54 mmol) to afford title compound (130 mg, 0.22 mmol, 42% yield).

LC-MS (ESI): m/z (M+1): 578.5 (Method 1)

Intermediate 26: N-[6-(5-chloro-2-fluorophenyl)pyridazin-4-yl]-7-[2-(piperidin-4-yl)ethoxy]quinolin-4-amine Intermediate 26 was prepared following the procedure used for the synthesis of Intermediate 21 starting from tert-butyl 4-{2-[(4-{[6-(5-chloro-2-fluorophenyl)pyridazin-4-yl]amino}quinolin-7-yl)oxy]ethyl}piperidine-1-carboxylate (Intermediate 25, 130 mg, 0.22 mmol) to afford title compound (106 mg, 0.22 mmol, 98% yield).

LC-MS (ESI): m/z (M+1): 478.1 (Method 1)

Intermediate 27: N-[6-(5-chloro-2-fluorophenyl)pyridazin-4-yl]-7-methoxyquinolin-4-amine Intermediate 27 was prepared following the procedure used for the synthesis of Intermediate 13 starting from 4-chloro-7-methoxyquinoline (484 mg, 2.5 mmol) and 6-(5- chloro-2-fluorophenyl)pyridazin-4-amine (Intermediate 3, 480 mg, 2.08 mmol) to afford title compound (350 mg, 0.92 mmol, 44% yield).

LC-MS (ESI): m/z (M+1): 381.1 (Method 2)

Intermediate 28: 4-{[6-(5-chloro-2-fluorophenyl)pyridazin-4-yl]amino}quinolin-7-ol HBr 48% in water (4 mL, 0.78 mmol) was added to Intermediate 27 (300 mg, mmol). The vial was closed and the mixture was warmed at 120° C. for 6 hrs. After cooling the solvent was removed by reduced pressure. The residue was treated with water, the solid was filtered and dried under vacuum to afford Intermediate 28 (300 mg, 0.82 mmol, recovery assumed quantitative).

LC-MS (ESI): m/z (M+1): 367.0 (Method 2)

Intermediate 29: N-(4-bromopyridin-2-yl)prop-2-enamide

A mixture of 4-bromo-2-pyridinamine (1.0 g, 5.78 mmol) and TEA (2.42 mL, 17.34 mmol) in dry DCM (30 mL) was stirred under nitrogen at 0° C., then 3-chloropropanoyl chloride (807 mg, 6.36 mmol) was added dropwise. The resulting mixture was stirred at RT for 2 hrs. Water was added and the organic solution was separated and washed with brine, dried over $Na_2SO_4$ and filtered. The solvent was evaporated to give a red oil which was purified by flash chromatography on Biotage silica cartridge (from cHex to 25% EtOAc) to afford Intermediate 29 (990 mg, 4.36 mmol, 75% yield) as a white solid.

LC-MS (ESI): m/z (M+1): 228.9 (Method 1)

Intermediate 30: Tert-butyl 4-{2-[(4-bromopyridin-2-yl)carbamoyl]ethyl}piperazine-1-carboxylate Intermediate 29 (150 mg, 0.66 mmol) was dissolved in THF (5 mL), 1-piperazinecarboxylic acid tert-butyl ester (2701 mg, 1.45 mmol) was added and the reaction solution was stirred at 65° C. for 16 hrs. Volatiles were removed under vacuum and the residue was purified by flash chromatography on Biotage silica cartridge (from cHex to EtOAc) to afford Intermediate 30 (125 mg, 0.30 mmol, 46% yield) as foam.

LC-MS (ESI): m/z (M+1): 415.2 (Method 1)

Intermediate 31: Tert-butyl 4-{2-[(4-{[6-(5-chloro-2-fluorophenyl)pyridazin-4-yl]amino}pyridin-2-yl)carbamoyl]ethyl}piperazine-1-carboxylate Intermediate 30 (126 mg, 0.30 mmol), $Cs_2CO_3$ (200 mg, 0.61 mmol), Xantphos (21 mg, 0.04 mmol) and Intermediate 3 (68 mg, 0.30 mmol) were mixed in 1,4-Dioxane (4 mL) and degassed 5 min with $N_2$, then Pd(OAc)$_2$ (3.44 mg, 0.02 mmol) was added. The resulting reaction mixture was heated at 100° C. for 12 hrs. Solids were filtered, volatiles were removed under vacuum and the residue was purified by reverse flash chromatography on Biotage C18 cartridge (from $H_2O$+0.1% HCOOH to 50% MeCN+0.1% HCOOH) to afford Intermediate 31 (70 mg, 0.13 mmol, 41% yield).

LC-MS (ESI): m/z (M+1): 556.4 (Method 1)

Intermediate 32: N-(4-bromopyridin-2-yl)-3-(4-methylpiperazin-1-yl)propanamide

Intermediate 32 was prepared following the procedure used for the synthesis of Intermediate 30 starting from Intermediate 29 (150 mg, 0.66 mmol) and 1-methylpiperazine (330 mg, 3.30 mmol) to afford title compound (220 mg, 0.67 mmol, quantitative yield).

LC-MS (ESI): m/z (M+1): 327.2 (Method 1)

Intermediate 33: 4-chloro-6-(5-chloro-2-fluorophenyl)-3-methylpyridazine 4,6-dichloro-3-methylpyridazine (630 mg, 3.87 mmol), (5-chloro-2-fluorophenyl) boronic acid (674 mg, 3.87 mmol), $Cs_2CO_3$ (3.17 g, 9.66 mmol) and dppf (110 mg, 0.190 mmol) were mixed in 1,4-Dioxane (15 mL)/Water (5 mL). The mixture was degassed with $N_2$ for 5 min before adding Pd(OAc)$_2$ (44 mg, 0.190 mmol), the resulting dark mixture was heated at 60° C. for 1 h. EtOAc and water were added, the product was extracted with EtOAc several times, organic phases were collected, dried and evaporated. The residue was purified by flash chromatography on Biotage silica cartridge (from cHex to 15% EtOAc) to afford Intermediate 33 (665 mg, 2.59 mmol, 67% yield) as white solid.

LC-MS (ESI): m/z (M+1): 257.1 (Method 1)

Intermediate 34: N-(4-nitropyridin-2-yl)prop-2-enamide

To an ice-cooled solution of 4-nitropyridin-2-amine (300 mg, 2.16 mmol) in dry DCM (12 mL), TEA (0.9 mL, 6.47 mmol) and 2-propenoyl chloride (293 mg, 3.23 mmol) were added. The solution became an orange suspension that was stirred at 0° C. for 30 min. Water was added, the phases were separated and the organic phase was dried and evaporated under vacuum. The crude material was purified by flash chromatography on Biotage silica cartridge (from cHex to 50% EtOAc) to provide Intermediate 34 (150 mg, 0.78 mmol, 36% yield) as a yellow solid.

LC-MS (ESI): m/z (M+1): 194.1 (Method 1)

Intermediate 35: 3-(4-methylpiperazin-1-yl)-N-(4-nitropyridin-2-yl)propanamide

Intermediate 35 was prepared following the procedure used for the synthesis of Intermediate 30 starting from Intermediate 34 (150 mg, 0.78 mmol) and 1-methylpiperazine (172 mg, 1.71 mmol) to afford title compound (220 mg, 0.75 mmol, 97% yield).

LC-MS (ESI): m/z (M+1): 294.1 (Method 1)

Intermediate 36: N-(4-aminopyridin-2-yl)-3-(4-methylpiperazin-1-yl)propanamide

To a mixture of Intermediate 35 (220 mg, 0.75 mmol) and ammonium formate (236 mg, 3.75 mmol) in Ethanol (9 mL), 10% Pd/C (40 mg, 0.04 mmol) was added and the mixture was refluxed for 1 h. The mixture was allowed to cool to RT and filtered through a pad of Celite®. The filtrate was concentrated and the residue was suspended in DCM and filtered. The filtrate was concentrated at reduced pressure and dried under vacuum to afford Intermediate 36 (120 mg, 0.46 mmol, 61% yield) as an off-white solid.

LC-MS (ESI): m/z (M+1): 264.1 (Method 2)

Intermediate 37: N-(4-bromopyridin-2-yl)-3-(morpholin-4-yl)propanamide

Intermediate 37 was prepared following the procedure used for the synthesis of Intermediate 30 starting from Intermediate 29 (60 mg, 0.26 mmol) and morpholine (50 mg, 0.58 mmol) to afford title compound (64 mg, 0.2 mmol, 77% yield).

LC-MS (ESI): m/z (M+1): 314.1 (Method 1)

Intermediate 38: 3-(4-acetylpiperazin-1-yl)-N-(4-bromopyridin-2-yl)propanamide

Intermediate 38 was prepared following the procedure used for the synthesis of Intermediate 30 starting from Intermediate 29 (300 mg, 1.1 mmol) and 1-acetylpiperazine (420 mg, 3.29 mmol) to afford title compound (400 mg, 1.1 mmol, quantitative yield).

LC-MS (ESI): m/z (M+1): 357.0 (Method 1)

Intermediate 39: N-(4-{[6-(5-chloro-2-fluorophenyl)pyridazin-4-yl]amino}pyridin-2-yl)-3-(4-methyl-3-oxopiperazin-1-yl)propanamide Intermediate 39 was prepared following the procedure used for the synthesis of Intermediate 30 starting from Intermediate 29 (250 mg, 1 mmol) and 1-methylpiperazin-2-one (252 mg, 2.2 mmol) to afford title compound (330 mg, 0.97 mmol, 96% yield).

LC-MS (ESI): m/z (M+1): 341.0 (Method 1)

Intermediate 40: N-(4-bromopyridin-2-yl)-3-[methyl(oxetan-3-yl)amino]propanamide Intermediate 40 was prepared following the procedure used for the synthesis of Intermediate 30 starting from Intermediate 29 (150 mg, 0.66 mmol) and N-methyl-3-aminooxetane (173 mg, 1.98 mmol) to afford title compound (205 mg, mmol, 99% yield).

LC-MS (ESI): m/z (M+1): 314.1 (Method 1)

Intermediate 41: N-(4-bromopyridin-2-yl)-4-chlorobutanamide

Intermediate 41 was prepared following the procedure used for the synthesis of Intermediate 29 starting from 4-bromo-2-pyridinamine (150 mg, 0.87 mmol) and 4-chlorobutyryl chloride (0.11 mL, 0.95 mmol) to afford title compound (183 mg, mmol, 76% yield) as a white solid.

LC-MS (ESI): m/z (M+1): 279.1 (Method 1)

Intermediate 42: N-(4-bromopyridin-2-yl)-4-(morpholin-4-yl)butanamide

A mixture of Intermediate 41 (183 mg, 0.65 mmol), morpholine (0.19 mL, 2.22 mmol), TEA (0.16 mL, 1.13 mmol) and NaI (cat. amount) in dry toluene (10 mL) was stirred at reflux overnight. The mixture was evaporated to dryness, then the crude material was partitioned between EtOAc and brine, and the aqueous phase was extracted with more EtOAc. The combined organics were washed with brine, dried over Na$_2$SO$_4$ and filtered. The solvent was evaporated to afford Intermediate 42 (100 mg, 0.30 mmol, 47% yield).

LC-MS (ESI): m/z (M+1): 328.1 (Method 1)

Intermediate 43: N-(4-bromopyridin-2-yl)-3-(4-methyl-2-oxopiperazin-1-yl)propanamide To a solution of Intermediate 29 (140 mg, 0.62 mmol) in THF (7 mL)/DMF (0.80 mL) sodium hydroxide (210 mg, 5.25 mmol) was added at RT followed by 4-methyl-2-piperazinone (196 mg, 1.72 mmol). The reaction mixture was stirred at RT overnight. The reaction was diluted with water and extracted 3 times with EtOAc. Organic layer was dried and evaporated under vacuum, the residue was purified by flash chromatography on Biotage silica NH cartridge (from DCM to 70% EtOAc) to afford Intermediate 43 (96 mg, 0.28 mmol, 71% yield) as white solid.

LC-MS (ESI): m/z (M+1): 342.9 (Method 1)

Intermediate 44: N-(4-bromopyridin-2-yl)cyclopropanecarboxamide 4-bromo-2-pyridinamine (500 mg, 2.89 mmol) was dissolved in DCM (15 mL) and pyridine (0.7 mL, 8.67 mmol), the mixture was stirred at 0° C. under N$_2$ atmosphere, and then cyclopropanecarbonyl chloride (0.31 mL, 3.47 mmol) was added dropwise. The reaction mixture was stirred at the same temperature for 1 h. Water was added and the two phases were separated, the organic one was dried and evaporated. The residue was purified by flash chromatography on Biotage silica cartridge (from DCM to 30% EtOAc) to afford Intermediate 44 (220 mg, 0.91 mmol, 32% yield) as white solid.

LC-MS (ESI): m/z (M+1): 241.2 (Method 1)

Intermediate 45: N-(4-bromopyridin-2-yl)-1-methylpiperidine-4-carboxamide

Intermediate 45 was prepared following the procedure used for the synthesis of Intermediate 7 starting from 4-bromo-2-pyridinamine (150 mg, 0.87 mmol) and 1-methylpiperidine-4-carboxylic acid to afford title compound (118 mg, 0.40 mmol, 46% yield) as white solid.

LC-MS (ESI): m/z (M+1): 300.0 (Method 1)

Intermediate 46: N-(4-nitropyridin-2-yl)cyclopropanecarboxamide

To an ice-cooled solution of 2-amino-4-nitropyridine (0.26 mL, 2.16 mmol) in dry pyridine (2.5 mL), cyclopropanecarbonyl chloride (0.29 mL, 3.23 mmol) was added. The solution was stirred at RT overnight. Water was added, the phases were separated and the organic phase was dried and evaporated under vacuum. The crude material was purified by flash chromatography on Biotage silica NH cartridge (from cHex to 40% EtOAc) to afford Intermediate 46 (125 mg, 0.60 mmol, 28% yield).

LC-MS (ESI): m/z (M+1): 208.1 (Method 1)

Intermediate 47: N-(4-aminopyridin-2-yl)cyclopropanecarboxamide

To a mixture of Intermediate 46 (125 mg, 0.60 mmol) and ammonium formate (190 mg, 3.02 mmol) in Ethanol (5 mL), 10% Pd/C (32 mg, 0.03 mmol) was added and the mixture was stirred refluxed for 30 minutes. The mixture was allowed to cool to RT and filtered through a pad of Celite®. The filtrate was concentrated and the residue was suspended in DCM and filtered. The filtrate was concentrated at reduced pressure and dried under vacuum to afford Intermediate 47 (57 mg, 0.32 mmol, 53% yield) as an off-white solid.

LC-MS (ESI): m/z (M+1): 178.1 (Method 1)

Intermediate 48: Tert-butyl N-(4-{[6-(5-chloro-2-fluorophenyl)pyridazin-4-yl]amino}quinolin-7-yl)carbamate DPPA (369 mg, 1.34 mmol) was added dropwise to a stirred mixture of Intermediate 15 (300 mg, 0.74 mmol) and TEA (196 mg, 1.94 mmol) in tert-butanol (4 mL) at RT under N$_2$. The reaction was warmed at 95° C. for 4 hrs. The solvent was removed by under vacuum, the residue was purified by flash chromatography on Biotage silica cartridge (from DCM to 3% MeOH) to afford Intermediate 48 (60 mg, mmol, 17% yield).

LC-MS (ESI): m/z (M+1): 466.1 (Method 2)

Intermediate 49: N4-[6-(5-chloro-2-fluorophenyl)pyridazin-4-yl]quinoline-4,7-diamine 4 N HCl in dioxane (1.0 mL, 32.91 mmol) was added to a stirred solution of Intermediate 48 (60 mg, 0.13 mmol) in MeOH at RT. After 3 hrs the solvents were removed under vacuum. The residue was treated with water and extracted with EtOAc. Water phase was treated with NH$_4$OH and extracted with DCM. Organic layer was separated, dried and evaporated under vacuum to afford Intermediate 49 (35 mg, 0.1 mmol, 74% yield).

LC-MS (ESI): m/z (M+1): 366.1 (Method 2)

Intermediate 5-{[(2,2-dimethyl-4,6-dioxo-1,3-dioxan-5-ylidene)methyl]amino}pyridine-2-carbonitrile A mixture of 5-amino-2-pyridinecarbonitrile (10 g, 83.95 mmol), 2,2-dimethyl-1,3-dioxane-4,6-dione (12.1 g, 83.95 mmol) and triethyl orthoformate (80.0 mL, 480.97 mmol) was stirred at reflux (145° C., external temperature) for 5 hrs. The mixture was allowed to reach RT and filtered. The solid was washed with EtOH and dried under vacuum to afford Intermediate 50 (16.32 g, 60 mmol, 71% yield) as dark yellow solid that was used as such.

LC-MS (ESI): m/z (M+1): 274.2 (Method 1)

Intermediate 51: 8-oxo-5,8-dihydro-1,5-naphthyridine-2-carbonitrile

In a flask equipped with refrigerant, to Dowtherm A (90.0 mL, 14.35 mmol) at 220° C. under stirring and a N2 atmosphere, Intermediate 50 (4 g, 14.35 mmol) was added portionwise, then the resulting reaction mixture was stirred at the same temperature for 10 min. The mixture was allowed to reach RT then Et$_2$O (80 mL) was added and the mixture so obtained was filtered. The solid was washed with MeOH and filtered. Solid was discarded, the solution was concentrated under vacuum and the crude material was purified by flash chromatography on Biotage silica cartridge (from DCM to 3% MeOH) to afford Intermediate 51 (331 mg, 1.93 mmol, 13% yield).

LC-MS (ESI): m/z (M+1): 172.0 (Method 1)

Intermediate 52: 8-bromo-1,5-naphthyridine-2-carbonitrile

To a stirred solution of Intermediate 51 (425 mg, 2.46 mmol) in DMF (4.52 mL), at 0° C. and under N$_2$, tribromophosphine (0.3 mL, 3.21 mmol) was added dropwise then the ice-bath was removed and the resulting reaction mixture was stirred at RT for 2 hrs. The reaction mixture was cooled at 0° C. and MeOH (2 mL) was slowly added followed by 1 N aqueous NaOH. The mixture pH was then brought at ~8-9 by adding a concentrated solution of NaHCO$_3$. The mixture was concentrated under vacuum in order to remove MeOH, then it was extracted twice with EtOAc. The organic phase was washed with brine, dried over Na$_2$SO$_4$ and the solvent was removed under vacuum. The crude material was purified by flash chromatography on Biotage silica cartridge (from cHex to 60% EtOAc) to afford Intermediate 52 (415 mg, 1.77 mmol, 72% yield) as white solid.

LC-MS (ESI): m/z (M+1): 236.0 (Method 1)

Intermediate 53: 4-{[6-(5-chloro-2-fluorophenyl)pyridazin-4-yl]amino}-1,7-naphthyridine-6-carbonitrile In a suitable vial, to a mixture of Intermediate 3 (340 mg, 1.54 mmol), Intermediate 52 (407 mg, 1.74 mmol), Xantphos (142 mg, 0.24 mmol), Pd$_2$(dba)$_3$ (16 mg, 0.18 mmol) and sodium tert-butoxide (309 mg, 3.2 mmol), 1,4-Dioxane (8.8 mL) was added, the vial was sealed and submitted to MW cycle at 140° C. for 45 min. The reaction mixture was concentrated, triturated with MeOH and filtered, solid was discarded; the methanolic solution was concentrated. The crude material was purified by flash chromatography on Biotage silica cartridge (from DCM to 12% MeOH) to afford Intermediate 53 (203 mg, 0.54 mmol, 35% yield) as yellow solid.

LC-MS (ESI): m/z (M+1): 377.1 (Method 1)

Intermediate 54: 4-{[6-(5-chloro-2-fluorophenyl)pyridazin-4-yl]amino}-1,7-naphthyridine-6-carboxylic acid To a solution of Intermediate 53 (375 mg, 1 mmol) in MeOH (8 mL), at RT, 1 N aqueous NaOH (8 mL, 8 mmol) was added and the resulting reaction mixture was stirred at 70° C. for 5 hrs. The reaction mixture was concentrated under reduced pressure, the residue was taken up with water and 6 N aqueous HCl was added up to pH ~2-3. The mixture was filtered. The solid was dried under vacuum. This material was washed with DCM, the mixture was filtered and the solid was dried under vacuum to afford Intermediate 54 (278 mg, 0.70 mmol, 71% yield) as pale yellow solid that was used as such.

LC-MS (ESI): m/z (M+1): 396.2 (Method 1)

Intermediate 55: Methyl 4-bromoquinoline-6-carboxylate 4-bromoquinoline-6-carboxylic acid (150 mg, 0.60 mmol) was suspended in MeOH (5 mL) and THF (5 mL), then it was cooled with ice bath and (Trimethylsilyl)diazomethane 2 M solution in Et$_2$O (2 mL, 1.19 mmol) was added dropwise. The reaction mixture was stirred at RT for 2 hrs, then volatiles were removed under vacuum to afford Intermediate 55 (170 mg, 0.64 mmol, quantitative yield) that was used as such.

LC-MS (ESI): m/z (M+1): 268.0 (Method 1)

Intermediate 56: Methyl 4-{[6-(5-chloro-2-fluorophenyl)pyridazin-4-yl]amino}quinoline-6-carboxylate Intermediate 56 was prepared following the procedure used for the synthesis of Intermediate 31 starting from Intermediate 55 (171 mg, 0.64 mmol) and Intermediate 3 (120 mg, 0.54 mmol) to afford title compound (90 mg, 0.22 mmol, 41% yield) as yellow solid.

LC-MS (ESI): m/z (M+1): 409.2 (Method 1)

Intermediate 57: Lithium 4-{[6-(5-chloro-2-fluorophenyl)pyridazin-4-yl]amino}quinoline-6-carboxylate Intermediate 57 was prepared following the procedure used for the synthesis of Intermediate 6 starting from Intermediate 56 (50 mg, 0.12 mmol) to afford title compound (50 mg, 0.12 mmol, quantitative yield).

LC-MS (ESI): m/z (M+1): 395.3 (Method 1)

Intermediate 58: Tert-butyl N-[3-({2-[(4-bromopyridin-2-yl)carbamoyl]ethyl}amino)propyl]-N-methylcarbamate Intermediate 58 was prepared following the procedure used for the synthesis of Intermediate 30 starting from Intermediate 29 (300 mg, 1.32 mmol) and 3-(N-Boc-N-methylamino)propylamine (622 mg, 3.3 mmol) to afford title compound (420 mg, 1.0 mmol, 77% yield).

LC-MS (ESI): m/z (M+1): 417.1 (Method 1)

Intermediate 59: Tert-butyl N-[3-({2-[(4-bromopyridin-2-yl)carbamoyl]ethyl}[(tert-butoxy)carbonyl]amino)propyl]-N-methylcarbamate Di-tert-butyl dicarbonate (137 mg, 0.63 mmol) was added to a solution of Intermediate 58 (200 mg, 0.48 mmol) and TEA (0.1 mL, 0.72 mmol) in DCM (5 mL). It was stirred at RT for 4 hrs, then volatiles were removed under vacuum and the residue was purified by flash chromatography on Biotage silica cartridge (from cHex to 45% EtOAc) to afford Intermediate 59 (210 mg, 0.41 mmol, 85% yield) as white foam.

LC-MS (ESI): m/z (M+1): 517.2 (Method 1)

Intermediate 60: Tert-butyl N-(3-{[(tert-butoxy)carbonyl]({2-[(4-{[6-(5-chloro-2-fluorophenyl)pyridazin-4-yl]amino}pyridin-2-yl)carbamoyl]ethyl})amino}propyl)-N-methylcarbamate Intermediate 60 was prepared following the procedure used for the synthesis of Intermediate 31 starting from Intermediate 59 (209 mg, 0.41 mmol) and Intermediate 3 (85 mg, 0.37 mmol) to afford title compound (70 mg, 0.11 mmol, 29% yield).

LC-MS (ESI): m/z (M+1): 659.4 (Method 1)

Intermediate 61: N-(4-{[6-(5-chloro-2-fluorophenyl)pyridazin-4-yl]amino}pyridin-2-yl)-3-{[3-(methylamino)propyl]amino}propanamide Intermediate 61 was prepared following the procedure used for the synthesis of Intermediate 21 starting from tert-butyl N-(3-{[(tert-butoxy)carbonyl]({2-[(4-{[6-(5-chloro-2-fluorophenyl)pyridazin-4-yl]amino}pyridin-2-yl)carbamoyl]ethyl})amino}propyl)-N-methylcarbamate (Intermediate 60, 70 mg, 0.1 mmol) to afford title compound (60 mg, yield assumed quantitative).

LC-MS (ESI): m/z (M+1): 458.1 (Method 1)

Intermediate 62: N-(4-bromopyridin-2-yl)-3-(4-methanesulfonylpiperazin-1-yl)propanamide Intermediate 62 was prepared following the procedure used for the synthesis of Intermediate 30 starting from N-(4-bromopyridin-2-yl)prop-2-enamide (Intermediate 29, 200 mg, 0.88 mmol) and 1-methylsulfonylpiperazine (289 mg, 1.76 mmol) to afford title compound (190 mg, 0.49 mmol, 55% yield).

LC-MS (ESI): m/z (M+1): 393.0 (Method 1)

Intermediate 63: 6-[2-fluoro-5-(propan-2-yl)phenyl]pyridazin-4-amine

A mixture of 6-chloropyridazin-4-amine (200 mg, 1.54 mmol), Pd(dppf)Cl$_2$ DCM (109 mg, 0.15 mmol) and (2-fluoro-5-isopropylphenyl)boronic acid (421 mg, 2.32 mmol) in MeCN (8 mL) and Water (3 mL) was degassed with N$_2$ for 2 minutes, then KF (228 mg, 3.86 mmol) was added and the mixture was irradiated with MW (110° C., 3 hrs). After cooling the mixture was treated with water and extracted with EtOAc. Organic layer was separated, dried over Na$_2$SO$_4$ and evaporated. The residue was purified by flash chromatography on Biotage silica NH cartridge (100% EtOAc) to afford Intermediate 63 (290 mg, 1.25 mmol, 81% yield).

LC-MS (ESI): m/z (M+1): 232 (Method 1)

Intermediate 64: 6-(5-chloro-2-fluorophenyl)-N-[2-(4-methylpiperazine-1-carbonyl)-1-{[2-(trimethylsilyl)ethoxy]methyl}-1H-pyrrolo[2,3-b]pyridin-4-yl]pyridazin-4-amine Intermediate 64 was prepared following the procedure used for the synthesis of Intermediate 11 starting from Intermediate 10 (70 mg, 0.13 mmol) and 1-methylpiperazine (16 mg, 0.16 mmol) to afford title compound (46 mg, 0.08 mmol, 57% yield).

LC-MS (ESI): m/z (M+1): 596.3 (Method 1)

Intermediate 66: 2-hydroxy-1-(4-methylpiperazin-1-yl)ethan-1-one

In a suitable flask, 1-methylpiperazine (2.9 mL, 26.15 mmol) was added to a mixture of 2-hydroxyacetic acid ethyl ester (3.09 mL, 32.66 mmol) in 1,4-Dioxane (5 mL). The flask was sealed and the reaction mixture was stirred overnight at 120° C. The mixture was allowed to reach RT and concentrated under reduced pressure. The crude material was purified by flash chromatography on Biotage silica cartridge (from DCM to 4% MeOH) to afford Intermediate 66 (642 mg, 4.06 mmol, 12% yield) as a thick colorless oil.

$^1$H NMR (400 MHz, Chloroform-d) δ ppm 4.16 (s, 2H), 3.66-3.75 (m, 2H), 3.25-3.34 (m, 2H), 2.41 (q, J=5.06 Hz, 4H), 2.32 (s, 3H).

Intermediate 67: 2-[(4-chloroquinolin-7-yl)oxy]-1-(4-methylpiperazin-1-yl)ethan-1-one Intermediate 67 was prepared following the procedure used for the synthesis of Intermediate 20 starting from 4-chloro-7-hydroxyquinoline (300 mg, 1.67 mmol) and Intermediate 66 (396 mg, 2.5 mmol) to afford title compound (402 mg, 1.26 mmol, 75% yield).

LC-MS (ESI): m/z (M+1): 320.1 (Method 1)

Intermediate 68: 4-{[6-(5-chloro-2-fluorophenyl)pyridazin-4-yl]amino}-N-methyl-N-[2-(4-methylpiperazin-1-yl)ethyl]-1-{[2-(trimethylsilyl)ethoxy]methyl}-1H-pyrrolo[2,3-b]pyridine-2-carboxamide Intermediate 68 was prepared following the procedure used for the synthesis of Intermediate 11 starting from Intermediate 10 (70 mg, 0.13 mmol) and N-methyl-2-(4-methylpiperazin-1-yl)ethanamine (24 mg, 0.15 mmol) to afford title compound (60 mg, 0.09 mmol, 72% yield).

LC-MS (ESI): m/z (M+1): 653.4 (Method 1)

Intermediate 69: 4-chloro-7-{2-[4-(2,2,2-trifluoroethyl)piperazin-1-yl]ethoxy}quinoline In a vial, to a solution of Intermediate 21 (100 mg, 0.34 mmol) in THF (2 mL), at RT, DIPEA (0.18 mL, 1.03 mmol)

was added followed by 2,2,2-Trifluoroethyl trifluoromethanesulfonate (0.07 mL, 0.52 mmol). The vial was sealed and shaken overnight at 50° C. The solvent was removed under reduced pressure and the residue was dissolved with MeOH and charged on SCX washing with MeOH and eluting with 1 N NH3 in MeOH. Basic fractions were collected and evaporated to afford Intermediate 69 (83 mg, 0.22 mmol, 65% yield) as whitish solid that was used as such.

LC-MS (ESI): m/z (M+1): 374.1 (Method 1)

Intermediate 70: Tert-butyl N-{2-[(4-chloroquinolin-7-yl)oxy]ethyl}-N-methylcarbamate Intermediate 70 was prepared following the procedure used for the synthesis of Intermediate 20 starting from 4-chloro-7-hydroxyquinoline (300 mg, 1.67 mmol) and 1,1-dimethylethyl (2-hydroxyethyl)methylcarbamate (450 mg, 2.57 mmol) to afford title compound (653 mg, recovery assumed quantitative).

LC-MS (ESI): m/z (M+1): 337.2 (Method 1)

Intermediate 71: {2-[(4-chloroquinolin-7-yl)oxy]ethyl}(methyl)amine

Intermediate 71 was prepared following the procedure used for the synthesis of Intermediate 21 starting from Intermediate 70 (653 mg, 1.93 mmol) to afford title compound (365 mg, 1.54 mmol, 79% yield).

LC-MS (ESI): m/z (M+1): 237.1 (Method 1)

Intermediate 72: N-{2-[(4-chloroquinolin-7-yl)oxy]ethyl}-N-methyloxetan-3-amine Intermediate 72 was prepared following the procedure used for the synthesis of Intermediate 22 starting from Intermediate 71 (180 mg, 0.76 mmol) and 3-oxetanone (165 mg, 2.29 mmol) to afford title compound (168 mg, 0.57 mmol, 75% yield).

LC-MS (ESI): m/z (M+1): 293.1 (Method 1)

Intermediate 73: Tert-butyl N-(3-acetamidopropyl)carbamate

TEA (0.96 mL, 6.89 mmol) and acetic acid acetyl ester (0.59 mL, 6.31 mmol) were added to a solution of tert-Butyl N-(3-aminopropyl)carbamate (1.0 g, 5.74 mmol) in DCM (28.7 mL). The mixture was stirred for 1 h, then volatiles were removed under vacuum, the residue was partitioned between EtOAc and s.s. of $NH_4Cl$, phases were separated, the organic one was washed with s.s. of $NaHCO_3$, then evaporated to afford tert-butyl N-(3-acetamidopropyl)carbamate (1.1 g, 5.09 mmol, 89% yield).

$^1$H NMR (400 MHz, Chloroform-d) δ ppm 6.24 (br. s., 1H), 4.91 (br. s., 1H), 3.30 (q, J=6.31 Hz, 2H), 3.13-3.24 (m, 2H), 2.01 (s, 3H), 1.63 (quin, J=6.22 Hz, 2H), 1.43-1.46 (s, 9H).

Intermediate 74: N-(3-azaniumylpropyl)acetamide chloride

4 N HCl in 1,4-Dioxane (11.44 mL, 45.77 mmol) was added dropwise to an ice cooled solution of Intermediate 73 (1.1 g, 5.09 mmol) in 1,4-Dioxane (8 mL). The mixture was stirred at RT 72 hrs, then volatiles were removed under vacuum to afford Intermediate 74 (990 mg, recovery assumed quantitative).

$^1$H NMR (400 MHz, DMSO-$d_6$) δ ppm 7.87-8.14 (m, 4H), 3.09 (q, J=6.60 Hz, 2H), 2.71-2.84 (m, 2H), 1.82 (s, 3H), 1.63-1.73 (m, 2H).

Intermediate 75: N-(4-bromopyridin-2-yl)-3-[(3-acetamidopropyl)amino]propanamide Intermediate 75 was prepared following the procedure used for the synthesis of Intermediate 30 starting from Intermediate 29 (250 mg, 1.10 mmol) and Intermediate 74 (168 mg, 1.10 mmol) to afford title compound (150 mg, 0.44 mmol, 40% yield).

LC-MS (ESI): m/z (M+1): 345.0 (Method 1)

Intermediate 76: Tert-butyl N-{2-[(4-bromopyridin-2-yl)carbamoyl]ethyl}-N-(3-acetamidopropyl)carbamate Intermediate 76 was prepared following the procedure used for the synthesis of Intermediate 59 starting from Intermediate 75 (150 mg, 0.44 mmol) to afford title compound (100 mg, 0.23 mmol, 52% yield).

LC-MS (ESI): m/z (M+1): 444.2 (Method 1)

Intermediate 77: Tert-butyl N-{2-[(4-{[6-(5-chloro-2-fluorophenyl)pyridazin-4-yl]amino}pyridin-2-yl)carbamoyl]ethyl}-N-(3-acetamidopropyl)carbamate Intermediate 77 was prepared following the procedure used for the synthesis of Intermediate 31 starting from Intermediate 76 (130 mg, 0.29 mmol) and Intermediate 3 (65 mg, 0.29 mmol) to afford title compound (60 mg, 0.10 mmol, 35% yield).

LC-MS (ESI): m/z (M+1): 588.2 (Method 2)

Intermediate 78: N-(4-{[6-(5-chloro-2-fluorophenyl)pyridazin-4-yl]amino}pyridin-2-yl)-3-[(3-acetamidopropyl)amino]propanamide Intermediate 78 was prepared following the procedure used for the synthesis of Intermediate 21 starting from Intermediate 77 (60 mg, 0.1 mmol) to afford title compound (40 mg, 0.08 mmol, 80% yield).

LC-MS (ESI): m/z (M+1): 486.0 (Method 2)

Intermediate 79: Tert-butyl N-(3-methanesulfonamidopropyl)carbamate tert-Butyl N-(3-aminopropyl)carbamate (1.0 g, 5.74 mmol) was dissolved in THF (20 mL) and cooled with ice bath, TEA (1.6 mL, 11.48 mmol) was added followed by dropwise addiction of methanesulfonyl chloride (0.58 mL, 7.46 mmol). A precipitate was observed. The mixture was allowed to reach RT and stirred for 2 hrs, water and EtOAc were added, phases were separated, the organic one was washed with s.s. of $NH_4Cl$, then with s.s. of $NaHCO_3$, dried and evaporated to afford Intermediate 79 (1.1 g, 4.36 mmol, 76% yield).

$^1$H NMR (400 MHz, Chloroform-d) δ ppm 5.31 (br. s., 1H), 4.74 (br. s., 1H), 3.28 (q, J=6.38 Hz, 2H), 3.15-3.22 (m, 2H), 2.94-2.99 (m, 3H), 1.73 (quin, J=6.11 Hz, 2H), 1.41-1.49 (m, 9H).

Intermediate 80: N-(3-azaniumylpropyl)methanesulfonamide chloride

Intermediate 80 was prepared following the procedure used for the synthesis of Intermediate 74 starting from Intermediate 79 (1.1 g, 4.36 mmol) to afford title compound (910 mg, recovery assumed quantitative).

$^1$H NMR (400 MHz, DMSO-d$_6$) δ ppm 8.07 (br. s., 3H), 7.16 (t, J=6.05 Hz, 1H), 2.97-3.08 (m, 2H), 2.91 (s, 3H), 2.76-2.88 (m, 2H), 1.77 (quin, J=7.21 Hz, 2H)

Intermediate 81: N-(4-bromopyridin-2-yl)-3-[(3-methanesulfonamidopropyl)amino]propanamide Intermediate 81 was prepared following the procedure used for the synthesis of Intermediate 30 starting from Intermediate 29 (250 mg, 1.10 mmol) and Intermediate 80 (312 mg, 1.65 mmol) to afford title compound (400 mg, 1.05 mmol, 95% yield).

LC-MS (ESI): m/z (M+1): 381.0 (Method 1)

Intermediate 82: Tert-butyl N-{2-[(4-bromopyridin-2-yl)carbamoyl]ethyl}-N-(3-methanesulfonamidopropyl)carbamate Intermediate 82 was prepared following the procedure used for the synthesis of Intermediate 59 starting from Intermediate 81 (400 mg, 1.05 mmol) to afford title compound (310 mg, 0.65 mmol, 61% yield).

LC-MS (ESI): m/z (M+1): 481.0 (Method 1)

Intermediate 83: Tert-butyl N-{2-[(4-{[6-(5-chloro-2-fluorophenyl)pyridazin-4-yl]amino}pyridin-2-yl)carbamoyl]ethyl}-N-(3-methanesulfonamidopropyl)carbamate Intermediate 83 was prepared following the procedure used for the synthesis of Intermediate 31 starting from Intermediate 82 (260 mg, 0.54 mmol) and Intermediate 3 (110 mg, 0.49 mmol) to afford title compound (130 mg, 0.21 mmol, 42% yield).

LC-MS (ESI): m/z (M+1): 622.2 (Method 2)

Intermediate 84: N-(4-{[6-(5-chloro-2-fluorophenyl)pyridazin-4-yl]amino}pyridin-2-yl)-3-[(3-methanesulfonamidopropyl)amino]propanamide Intermediate 84 was prepared following the procedure used for the synthesis of Intermediate 21 starting from Intermediate 83 (130 mg, 0.21 mmol) to afford title compound (80 mg, 0.15 mmol, 73% yield).

LC-MS (ESI): m/z (M+1): 522.2 (Method 2)

Intermediate 85: 4-bromo-N-[3-(4-methylpiperazin-1-yl)propyl]pyridin-2-amine

K$_2$CO$_3$ (707 mg, 5.11 mmol) was added to a mixture of 3-(4-methylpiperazin-1-yl)propan-1-amine (0.44 mL, 2.56 mmol) and 4-bromo-2-fluoropyridine (300 mg, 1.7 mmol) in DMSO (3 mL). The resulting mixture was stirred overnight at 90° C. The day after the mixture was allowed to reach RT, solids were filter off and discarded, the crude material was purified by reverse phase flash chromatography on Biotage C18 cartridge (from H$_2$O+0.1% NH$_4$OH to 90% MeCN) to afford Intermediate 85 (320 mg, 1.02 mmol, 60% yield).

LC-MS (ESI): m/z (M+1): 315.2 (Method 2)

Intermediate 86: Tert-butyl N-(4-bromopyridin-2-yl)-N-[3-(4-methylpiperazin-1-yl)propyl]carbamate Lithium bis(trimethylsilyl)amide 1 N solution in THF (1.23 mL, 1.23 mmol) was added dropwise to an ice cooled solution of Intermediate 85 (320 mg, 1.02 mmol) in THF (6 mL) under N$_2$. After 10 min of stirring at the same temperature di-tert-butyl dicarbonate (268 mg, 1.23 mmol) was added and the reaction was allowed to reach RT and stirred for 5 hrs. Conversion was not complete, so further lithium bis(trimethylsilyl)amide 1 N solution in THF (1.23 mL) was added followed by di-tert-butyl dicarbonate (267 mg) after 5 min. The mixture was stirred overnight at RT. The day after the conversion was not complete, further lithium bis(trimethylsilyl)amide 1 N solution in THF (2.46 mL) was added followed by di-tert-butyl dicarbonate (540 mg) after 5 min. The reaction mixture was stirred at RT for 24 hrs. Water and EtOAc were added, the product was extracted with EtOAc (3 times), organic layers were collected, dried and evaporate. The crude material was purified by flash chromatography on Biotage silica NH cartridge (from cHex to 5% MeOH in EtOAc) to afford Intermediate 86 (210 mg, 0.51 mmol, 50% yield).

Intermediate 87: Tert-butyl N-(4-{[6-(5-chloro-2-fluorophenyl)pyridazin-4-yl]amino}pyridin-2-yl)-N-[3-(4-methylpiperazin-1-yl)propyl]carbamate Intermediate 87 was prepared following the procedure used for the synthesis of Intermediate 13 starting from Intermediate 86 (203 mg, 0.49 mmol) and Intermediate 3 (10 mg, 0.45 mmol) to afford title compound (58 mg, 0.10 mmol, 23% yield).

LC-MS (ESI): m/z (M+1): 556.3 (Method 2)

Intermediate 88: N-(4-bromopyridin-2-yl)-3-[4-(2,2,2-trifluoroethyl)piperazin-1-yl]propanamide Intermediate 88 was prepared following the procedure used for the synthesis of Intermediate 30 starting from Intermediate 29 (300 mg, 1.1 mmol) and 1-(2,2,2-trifluoroethyl)piperazine (200 mg, 1.19 mmol) to afford title compound (220 mg, mmol, 63%).

LC-MS (ESI): m/z (M+1): 397.0 (Method 1)

Intermediate 89: 2-(trimethylsilyl)ethylcarbamate 1,1'-Carbonyldiimidazole (9.9 g, 60.9 mmol) was added to a stirred suspension of 2-(trimethylsilyl)ethanol (6.0 g, 50.7 mmol) in dry toluene (50 mL). The reaction was stirred at RT for 5 hrs, before adding ammonium hydroxide solution (28% NH$_4$OH in water, 10 mL). This mixture was vigorously stirred overnight. Phases were separated, the organic phase was washed with brine, then filtered through a phase separator and concentrated under vacuum. The residue was taken-up with EtOAc and washed with brine (5×), then filtered and evaporated to afford Intermediate 89 (7.5 g, 46.5 mmol, 92% yield) as colorless oil, that solidifies upon cooling.

$^1$H NMR (400 MHz, Chloroform-d) δ ppm 4.52 (br. s., 2H), 4.10-4.22 (m, 2H), 0.93-1.07 (m, 2H), 0.05 (s, 9H).

Intermediate 90: 6-(5-chloro-2-fluorophenyl)-3-methylpyridazin-4-amine

Method A

Step 1: 4,6-dichloro-3-methylpyridazine (400 mg, 2.45 mmol) was added to a stirred solution of ammonium hydroxide solution (28% NH$_4$OH in water, 3 mL) in 1,4-dioxane (3 mL) at RT. The vial was closed and the reaction was warmed at 90° C. for 40 hrs. The solvents were removed under reduced pressure, and the residue was purified by flash chromatography on Biotage silica NH cartridge (EtOAc) to afford 6-chloro-3-methylpyridazin-4-amine (210 mg).

Step 2: A mixture of PdCl$_2$(PPh$_3$)$_2$ DCM (50 mg, 0.07 mmo), KF (115 mg, 1.95 mmol) (5-chloro-2-fluorophenyl) boronic acid (170 mg, 0.97 mmol) in MeCN (8 mL) and H$_2$O (2 mL) was degassed with N$_2$ for 2 minutes, then 6-chloro-3-methylpyridazin-4-amine (110 mg, 0.77 mmol) was added and the mixture was irradiated with MW (110° C., 1 h 15 min). After cooling down, the mixture was treated with water and extracted with EtOAc. Organic layer was separated, dried over Na$_2$SO$_4$ and evaporated. The residue was purified by flash chromatography on Biotage silica NH cartridge (from DCM to 3% MeOH) to afford 6-(5-chloro-2-fluorophenyl)-3-methylpyridazin-4-amine (100 mg, 0.42 mmol, 55% yield).

Method B

In a suitable vial, 4-chloro-6-(5-chloro-2-fluorophenyl)-3-methylpyridazine (Intermediate 33 (500 mg, 1.94 mmol), 2-trimethylsilylethylcarbamate (Intermediate 89, 361 mg, 2.24 mmol), Xantphos (171 mg, 0.30 mmol) and K$_3$PO$_4$ (837 mg, 3.89 mmol) were mixed in 1,4-Dioxane (15 mL), N$_2$ was bubbled for 2 min before adding Pd$_2$(dba)$_3$ (184 mg, 0.20 mmol), then the vial was sealed and irradiated with MW at 100° C. for 5 hrs. The reaction mixture was diluted with EtOAc and filtered. The filtrate was concentrated under reduced pressure and the crude material was purified by flash chromatography on Biotage silica NH cartridge (from cHex to 15% EtOAc) to afford the Teoc product intermediate (400 mg) which was mixed with CsF (297 mg, 1.94 mmol) in DMF (5 mL), and heated at 45° C. overnight. It was allowed to reach RT and charged on SCX cartridge (20 g) washing with MeOH and eluting with 1 N NH$_3$ in MeOH. Basic fractions were collected and evaporated, the residue was purified by flash chromatography on Biotage silica NH cartridge (from DCM to 3% MeOH) to afford Intermediate 90 (170 mg, 0.71 mmol, 37% yield).

LC-MS (ESI): m/z (M+1): 228.0 (Method 1)

Intermediate 91: Methyl 4-{[6-(5-chloro-2-fluorophenyl)-3-methylpyridazin-4-yl]amino}-1-{[2-(trimethylsilyl)ethoxy]methyl}-1H-pyrrolo[2,3-b]pyridine-2-carboxylate Intermediate 91 was prepared following the procedure used for the synthesis of Intermediate 9 starting from Intermediate 5 (284 mg, 0.83 mmol) and Intermediate 90 (210 mg, 0.75 mmol) to afford title compound (100 mg, 0.18 mmol, 25% yield).

LC-MS (ESI): m/z (M+1): 542.2 (Method 1)

Intermediate 92: Lithium 4-{[6-(5-chloro-2-fluorophenyl)-3-methylpyridazin-4-yl]amino}-1-{[2-(trimethylsilyl)ethoxy]methyl}-1H-pyrrolo[2,3-b]pyridine-2-carboxylate Intermediate 92 was prepared following the procedure used for the synthesis of Intermediate 10 starting from Intermediate 91 (100 mg, 0.18 mmol) to afford title compound (90 mg, 0.17 mmol, 94% yield).

LC-MS (ESI): m/z (M+1): 528.1 (Method 1)

Intermediate 93: 4-{[6-(5-chloro-2-fluorophenyl)-3-methylpyridazin-4-yl]amino}-N-[2-(4-methylpiperazin-1-yl)ethyl]-1-{[2-(Trimethylsilyl)ethoxy]methyl}-1H-pyrrolo[2,3-b]pyridine-2

Intermediate 93 was prepared following the procedure used for the synthesis of Intermediate 11 starting from Intermediate 92 (45 mg, 0.08 mmol) and 1-(2-aminoethyl)-4-methylpiperazine (16 mg, 0.11 mmol) to afford title compound (40 mg, 0.06 mmol, 73% yield).

LC-MS (ESI): m/z (M+1): 653.3 (Method 2)

Intermediate 94: 4-{[6-(5-chloro-2-fluorophenyl)-3-methylpyridazin-4-yl]amino}-N-methyl-N-[2-(4-methylpiperazin-1-yl)ethyl]-1-{[2-(Trimethylsilyl)ethoxy]methyl}-1H-pyrrolo[2,3-b]pyridine-2-carboxamide Intermediate 94 was prepared following the procedure used for the synthesis of Intermediate 11 starting from Intermediate 92 (45 mg, 0.08 mmol) and N-methyl-2-(4-methylpiperazin-1-yl)ethanamine (17 mg, 0.11 mmol) to afford title compound (60 mg, recovery assumed quantitative).

LC-MS (ESI): m/z (M+1): 667.4 (Method 1)

Intermediates for Comparative Compounds

Intermediate 95: Tert-butyl N-[(tert-butoxy)carbonyl]-N-(4-chloropyrimidin-2-yl)carbamate A mixture of 4-chloro-2-pyrimidinamine (200 mg, 1.54 mmol) with DMAP (38 mg, 0.31 mmol), TEA (0.04 mL, 0.31 mmol) and di-tert-butyl dicarbonate (674 mg, 3.09 mmol) in DCM (8 mL) was stirred at RT for 3 hrs. Volatiles were removed under vacuum and the residue was purified by flash chromatography on Biotage silica cartridge (from cHex to 20% EtOAc) to afford Intermediate 95 (500 mg, 1.52 mmol, 98% yield) as white wax.

LC-MS (ESI): m/z (M+1): 330.3 (Method 1)

Intermediate 96: Tert-butyl N-[(tert-butoxy)carbonyl]-N-(4-{[6-(5-chloro-2-fluorophenyl)pyridazin-4-yl]amino}pyrimidin-2-yl)carbamate Intermediate 96 was prepared following the procedure used for the synthesis of Intermediate 31 starting from Intermediate 95 (113 mg, 0.34 mmol) and Intermediate 3 (70 mg, 0.31 mmol) to afford title compound (30 mg, 0.06 mmol, 18% yield) as white solid.

LC-MS (ESI): m/z (M+1): 517.4 (Method 1)

Intermediate 97: 2-chloro-3-{[2-(trimethylsityl)ethoxy]methyl}-3H-imidazo[4,5-b]pyridine 2-chloro-1H-imidazo[4,5-b]pyridine (200 mg, 1.3 mmol) was suspended in THF (8 mL) under N$_2$ and DIPEA (0.68 mL, 3.91 mmol) was added followed by 2-(chloromethoxy) ethyl-trimethylsilane (0.3 mL, 1.69 mmol). The reaction mixture was stirred at reflux for 4 hrs. Then it was allowed to reach RT, water and EtOAc were added, the product was extracted several times with EtOAc, organic phases were collected, dried and evaporated. The crude material by flash chromatography on Biotage silica cartridge (from cHex to 100% EtOAc) to afford Intermediate 97 (180 mg, 0.63 mmol 49% yield) as oil.

LC-MS (ESI): m/z (M+1): 284. 2 (Method 1)

$^1$H NMR (400 MHz, Chloroform-d) δ ppm 8.40 (dd, J=4.8, 1.3 Hz, 1H), 7.99 (dd, J=8.0, 1.4 Hz, 1H), 7.29 (d, J=5.0 Hz, 1H), 5.71 (s, 2H), 3.61-3.72 (m, 2H), −1.00 (m, 2H), −0.05 (s, 9H).

Intermediate 98: 6-(5-chloro-2-fluorophenyl)-N-(3-{[2-(trimethylsityl)ethoxy]methyl}-3H-imidazo[4,5-b]pyridin-2-yl)pyridazin-4-amine Intermediate 98 was prepared following the procedure used for the synthesis of Intermediate 31 starting from Intermediate 97 (113 mg, 0.40 mmol) and Intermediate 3 (70 mg, 0.31 mmol) to afford title compound (35 mg, 0.07 mmol, 24% yield) as yellow solid.

LC-MS (ESI): m/z (M+1): 471.4 (Method 1)

Intermediate 99: Tert-butyl N-{4-[(6-chloropyridazin-4-yl)amino]pyridin-2-yl}carbamate A mixture of 6-chloropyridazin-4-amine (600 mg, 4.63 mmol), tert-butyl 4-bromopyridin-2-ylcarbamate (1.52 g, 5.56 mmol) and sodium tert-butoxide (0.94 g, 9.73 mmol) in dry 1,4-dioxane (16 mL) was degassed with $N_2$ for 2 minutes, then Xantphos (400 mg, 0.69 mmol) and $Pd_2(dba)_3$ (0.42 mg, 0.46 mmol) were added. The resulting mixture was irradiated MW at 105° C. for 1 h. The conversion was complete, so the mixture was suspended in MeOH and an insoluble solid was filtered off. The solution was evaporated and purified by flash chromatography on Biotage silica NH cartridge (from DCM to 3% MeOH) to afford Intermediate 99 (256 mg, mmol, 17% yield).

LC-MS (ESI): m/z (M+1): 322.2 (Method 1)

Intermediate 100: Methyl 3-{5-[(2-{[(tert-butoxy)carbonyl]amino}pyridin-4-yl)amino]pyridazin-3-yl}-2-fluorobenzoate $K_2CO_3$ (77 mg, 0.56 mmol) was added to a stirred mixture of Intermediate 99 (70 mg, 0.21 mmol), $Pd(PPh_3)_4$ (32.3 mg, 0.030 mmol) and (2-fluoro-3-methoxycarbonylphenyl)boronic acid (83 mg, 0.42 mmol) in 1,2-dimethoxyethane (4 mL)/$H_2O$ (0.500 mL). The mixture was degassed with N2. The vial was closed and warmed at 90° C. for 3 hrs. After cooling the solvent was removed under reduced pressure. The residue was treated with $H_2O$ and extracted with EtOAc. Organic layer was separated, dried and evaporated. The residue was purified by flash chromatography on Biotage silica cartridge (from DCM to 3% MeOH) to afford Intermediate 100 (25 mg, 0.06 mmol, 20% yield).

LC-MS (ESI): m/z (M+1): 440.1 (Method 2)

Intermediate 101: 4-{[6-(5-chloro-2-fluorophenyl)pyridazin-4-yl]amino}quinolin-7-ol hydrobromide HBr 48% in water (10.1 mL, 89.29 mmol) was added to N-[6-(5-chloro-2-fluorophenyl)pyridazin-4-yl]-7-methoxyquinolin-4-amine (Intermediate 27, 850 mg, 2.23 mmol). The vial was closed, and the mixture was stirred at 120° C. for 48 hrs. After cooling the aqueous solution was evaporated to complete dryness, then the residue was suspended in DCM/MeOH and the white solid was collected by filtration to afford a first crop. The mother liquor was evaporated, the residue was triturated with DCM, and filtered again, to afford a second crop that was mixed with the first one to afford 4-{[6-(5-chloro-2-fluorophenyl)pyridazin-4-yl]amino}quinolin-7-ol hydrobromide (785 mg, 1.75 mmol, y=79%).

LC-MS (ESI): m/z (M+1): 367.0 (Method 2)

Intermediate 102: Ethyl N-[2-(1-methylpiperidin-4-yl)ethyl]carbamate

Ethyl chloroformate (470 mg, 4.33 mmol) was added drop wise to a stirred solution of 2-(1-methylpiperidin-4-yl) ethan-1-amine (560 mg, 3.94 mmol) and TEA (0.6 mL, 4.33 mmol) in dry THF (10 mL) at 0° C. under $N_2$. After 20 minutes the reaction was warmed at RT and stirred for 1 hr, then the solvent was removed by reduced pressure. The residue was dissolved in DCM and the organic phase washed with water. Organic layer was separated, dried over $Na_2SO_4$ and evaporated. The residue was purified by flash chromatography on Biotage silica NH cartridge (from DCM to 2% MeOH) to afford ethyl N-[2-(1-methylpiperidin-4-yl)ethyl] carbamate (450 mg, 2.1 mmol, y=53%)

LC-MS (ESI): m/z (M+1): 215.1 (Method 2)

Intermediate 103: Methyl[2-(1-methylpiperidin-4-yl)ethyl]amine

A solution of ethyl N-[2-(1-methylpiperidin-4-yl)ethyl] carbamate (Intermediate 102, 440 mg, 2.05 mmol) in dry THF (10 mL) was added drop wise to a stirred solution of $LiAlH_4$ 2 M in THF (2.57 mL, 5.13 mmol) at RT under $N_2$. The reaction was stirred at reflux for 3 hrs. The mixture was allowed to reach RT, and then it was cooled at 0-5° C. before adding 0.2 ml of water in THF, followed by 0.3 ml of NaOH 15% and 0.2 ml of water in THF. The mixture was warmed at RT and stirred for 30 min, then it was filtered on Celite® pad. The solvent was removed by reduced pressure to afford methyl[2-(1-methylpiperidin-4-yl)ethyl]amine (300 mg, 1.92 mmol, y=93%) that was used for the next step without further purification.

LC-MS (ESI): m/z (M+1): 157.1 (Method 1)

Intermediate 104: Tert-butyl N-[3-(methanesulfonyloxy)propyl]-N-methylcarbamate Intermediate 104 was prepared following the procedure used for the synthesis of Intermediate 79 starting from tert-butyl (3-hydroxypropyl)(methyl)carbamate (1 g, 6.28 mmol) to afford title compound (1.32 g, 4.94 mmol, y=93%).

LC-MS (ESI): m/z (M+1): 268.1 (Method 1)

Intermediate 105: Tert-butyl N-{3-[(3-hydroxypropyl)amino]propyl}-N-methylcarbamate In a vial, to a solution of tert-butyl N-[3-(methanesulfonyloxy)propyl]-N-methylcarbamate (Intermediate 104, 650 mg, 2.43 mmol) in MeCN (5 mL), 3-amino-1-propanol (0.93 mL, 12.16 mmol) was added, the vial was sealed and stirred at 70° C. for 9 hrs. The reaction mixture was concentrated under reduced pressure. The residue was dissolved in DCM and the organic solution was washed with a saturated solution of $NaHCO_3$, water, dried over $Na_2SO_4$ and filtered. The solvent was removed under reduced pressure to afford tert-butyl N-{3-[(3-hydroxypropyl)amino]propyl}-N-methylcarbamate (487 mg, 1.98 mmol, y=81%) as colourless thick oil that was used as such.

LC-MS (ESI): m/z (M+1): 247.5 (Method 1)

Intermediate 106: Tert-butyl N-(3-{[(tert-butoxy)carbonyl](methyl)amino}propyl)-N-(3-hydroxypropyl)carbamate Intermediate 106 was prepared following the procedure used for the synthesis of Intermediate 59 starting from tert-butyl N-{3-[(3-hydroxypropyl)amino]propyl}-N-methylcarbamate (Intermediate 105, 485 mg, 1.97 mmol) to afford title compound (780 mg, recovery assumed quantitative).
LC-MS (ESI): m/z (M+1): 347.3 (Method 1)

Intermediate 107: Tert-butyl N-(3-bromopropyl)-N-(3-{[(tert-butoxy)carbonyl](methyl)amino}propyl)carbamate To a stirred solution of tert-butyl N-(3-{[(tert-butoxy)carbonyl](methyl)amino}propyl)-N-(3-hydroxypropyl)carbamate (Intermediate 106, 380 mg, 1.1 mmol) and PPh$_3$ (433 mg, 1.65 mmol) in DCM (15 mL), a solution of CBr$_4$ (546 mg, 1.65 mmol) in DCM (3 mL) was added portion-wise at 0° C. and under a N$_2$ atmosphere. The resulting reaction mixture was stirred at 0° C. for 1 hr. The mixture was concentrated under reduced pressure and the crude material was purified by flash chromatography on Biotage silica cartridge (from cHex to 30% EtOAc) to afford tert-butyl N-(3-bromopropyl)-N-(3-{[(tert-butoxy)carbonyl](methyl)amino}propyl)carbamate (196 mg, 0.48 mmol, y=44% yield) as colourless thick oil.
$^1$H NMR (400 MHz, Chloroform-d) δ ppm 3.38-3.48 (m, 2H), 3.34 (t, J=6.93 Hz, 2H), 3.22 (d, J=7.04 Hz, 4H), 2.87 (s, 3H), 2.06-2.20 (m, 2H), 1.71-1.85 (m, 2H), 1.43-1.54 (m, 18H).

Intermediate 108: Tert-butyl N-(3-{[(tert-butoxy)carbonyl]({3-[(4-{[6-(5-chloro-2-fluorophenyl)pyridazin-4-yl]amino}quinolin-7-yl)oxy]propyl})amino}propyl)-N-methylcarbamate In a vial, to a mixture of 4-{[6-(5-chloro-2-fluorophenyl)pyridazin-4-yl]amino}quinolin-7-ol (Intermediate 28, 320 mg, 0.87 mmol) and K$_2$CO$_3$ (274 mg, 1.98 mmol) in DMF (8 mL), at RT, tert-butyl N-(3-bromopropyl)-N-(3-{[(tert-butoxy)carbonyl](methyl)amino}propyl)carbamate (Intermediate 107, 321 mg, 0.78 mmol) was added. The vial was sealed and stirred at 50° C. for 3 hrs. The reaction mixture was diluted with EtOAc and filtered. The filtrate was further diluted with EtOAc, washed twice with water, the organic phase was dried over Na$_2$SO$_4$, filtered, and the solvent removed under reduced pressure. The crude material was purified by flash chromatography on Biotage silica cartridge (from DCM to 3% MeOH) to afford tert-butyl N-(3-{[(tert-butoxy)carbonyl]({3-[(4-{[6-(5-chloro-2-fluorophenyl)pyridazin-4-yl]amino}quinolin-7-yl)oxy]propyl})amino}propyl)-N-methylcarbamate(149 mg, 0.21 mmol, y=27%) as pale yellow foam.
LC-MS (ESI): m/z (M+1): 695.3 (Method 1)

Intermediate 109: N-[6-(5-chloro-2-fluorophenyl)pyridazin-4-yl]-7-(3-{[3-(methylamino)propyl]amino}propoxy)quinolin-4-amine Intermediate 109 was prepared following the procedure used for the synthesis of Intermediate 21 starting from tert-butyl N-(3-{[(tert-butoxy)carbonyl]({3-[(4-{[6-(5-chloro-2-fluorophenyl)pyridazin-4-yl]amino}quinolin-7-yl)oxy]propyl})amino}propyl)-N-methylcarbamate (Intermediate 108, 149 mg, 0.21 mmol) to afford title compound (121 mg, recovery assumed quantitative).
LC-MS (ESI): m/z (M+1): 495.2 (Method 2)

Intermediate 110: cis tert-butyl 5-(2-hydroxyethyl)-octahydropyrrolo[3,4-c]pyrrole-2-carboxylate In a vial, to a mixture of cis-2-boc-hexahydropyrrolo[3,4-c]pyrrole (250 mg, 1.18 mmol) and K$_2$CO$_3$ (162.76 mg, 1.18 mmol) in MeCN (3.5 mL), 2-bromoethanol (0.08 mL, 1.18 mmol) was added at RT, the vial was sealed and stirred at 80° C. overnight.
The reaction mixture was filtered washing with EtOAC. The solution was evaporated under vacuum to afford cis tert-butyl 5-(2-hydroxyethyl)-octahydropyrrolo[3,4-c]pyrrole-2-carboxylate (320 mg, recovery assumed quantitative) used as such.
LC-MS (ESI): m/z (M+1): 256.8 (Method 2)

Intermediate 111: cis tert-butyl 5-{2-[(4-chloroquinolin-7-yl)oxy]ethyl}-octahydropyrrolo[3,4-c]pyrrole-2-carboxylate Intermediate 111 was prepared following the procedure used for the synthesis of Intermediate 17 starting from 4-chloro-7-hydroxyquinoline (150 mg, 0.83 mmol) and cis tert-butyl 5-(2-hydroxyethyl)-octahydropyrrolo[3,4-c]pyrrole-2-carboxylate (Intermediate 110, 320 mg, 1.18 mmol) to afford title compound (700 mg, recovery assumed quantitative).
LC-MS (ESI): m/z (M+1): 418.2 (Method 1)

Intermediate 112: cis tert-butyl 5-{2-[(4-{[6-(5-chloro-2-fluorophenyl)pyridazin-4-yl]amino}quinolin-7-yl)oxy]ethyl}-octahydropyrrolo[3,4-c]pyrrole-2-carboxylate In a suitable MW vial, to a mixture of cis tert-butyl 5-{2-[(4-chloroquinolin-7-yl)oxy]ethyl}-octahydropyrrolo[3,4-c]pyrrole-2-carboxylate (Intermediate 111, 560 mg, 0.54 mmol), 6-(5-chloro-2-fluorophenyl)pyridazin-4-amine (Intermediate 3, 120 mg, 0.54 mmol), Cs$_2$CO$_3$ (356 mg, 1.09 mmol), Xantphos (45 mg, 0.08 mmol) and Pd$_2$(dba)$_3$ (54 mg, 0.06 mmol), 1,4-Dioxane (4 mL) was added. The vial was sealed and submitted to MW cycle at 130° C. for 50 min. Solids were filtered washing with EtOAc, the filtrate was evaporated under vacuum and the crude material was purified by reverse phase flash chromatography on Biotage C18 cartridge (from H$_2$O+0.1% NH$_4$OH to 70% MeCN) to afford cis tert-butyl 5-{2-[(4-{[6-(5-chloro-2-fluorophenyl)pyridazin-4-yl]amino}quinolin-7-yl)oxy]ethyl}-octahydropyrrolo[3,4-c]pyrrole-2-carboxylate (90 mg, 0.15 mmol, 28% yield).
LC-MS (ESI): m/z (M+1): 605.3 (Method 2)

Intermediate 113: cis N-[6-(5-chloro-2-fluorophenyl)pyridazin-4-yl]-7-(2-{octahydropyrrolo[3,4-c]pyrrol-2-yl}ethoxy)quinolin-4-amine Intermediate 113 was prepared following the procedure used for the synthesis of Intermediate 21 starting from cis tert-butyl 5-{2-[(4-{[6-(5-chloro-2-fluorophenyl)pyridazin-4-yl]amino}quinolin-7-yl)oxy]ethyl}-octahydropyrrolo[3,4-c]pyrrole-2-carboxylate (Intermediate 112, 90 mg, 0.15 mmol) to afford title compound (45 mg, 0.09 mmol, y=60%).
LC-MS (ESI): m/z (M+1): 505.2 (Method 2)

Intermediate 114: 4-chloro-7-(2-chloroethoxy)quinoline

In a vial, to a mixture of 4-chloro-7-hydroxyquinoline (200 mg, 1.11 mmol) and K$_2$CO$_3$ (308 mg, 2.23 mmol) in DMF (3.5 mL), 1-bromo-2-chloroethane (0.37 mL, 4.45 mmol) was added at RT. The vial was sealed and stirred at 60° C. for 3 hrs. The reaction mixture was diluted with EtOAc and filtered. The filtrate was diluted with water, extracted with EtOAc, the organic phase was washed with water, dried over $Na_2SO_4$ and filtered. The solvent removed under reduced pressure to afford 4-chloro-7-(2-chloroethoxy)quinoline (229 mg, 0.95 mmol, y=85%) as pale yellow solid that was used as such.

LC-MS (ESI): m/z (M+1): 242.0 (Method 1)

Intermediate 115: Tert-butyl N-[3-({2-[(4-chloroquinolin-7-yl)oxy]ethyl}amino)propyl]carbamate In a vial, to a solution of 4-chloro-7-(2-chloroethoxy)quinoline (Intermediate 114, 183 mg, 0.76 mmol) in 1,2-dimethoxyethane (8 mL), N-(3-aminopropyl)carbamic acid tert-butyl ester (1.32 g, 7.58 mmol) was added followed by NaI (114 mg, 0.76 mmol), the vial was sealed and stirred at 85° C. for 24 hrs. The reaction mixture was concentrated under reduced pressure and the residue was purified by flash chromatography on Biotage silica NH cartridge (from cHex to 70% EtOAc). Opportune fractions were purified again by flash chromatography on Biotage silica cartridge (from DCM to 15% MeOH) to afford tert-butyl N-[3-({2-[(4-chloroquinolin-7-yl)oxy]ethyl}amino)propyl]carbamate (222 mg, 0.58 mmol, 77% yield) as light orange oil.

LC-MS (ESI): m/z (M+1): 380.1 (Method 1)

Intermediate 116: (3-aminopropyl)({2-[(4-chloroquinolin-7-yl)oxy]ethyl})amine Intermediate 116 was prepared following the procedure used for the synthesis of Intermediate 21 starting from tert-butyl N-[3-({2-[(4-chloroquinolin-7-yl)oxy]ethyl}amino)propyl]carbamate (Intermediate 115, 222 mg, 0.58 mmol) to afford title compound (132 mg, 0.47 mmol, 81% yield).

LC-MS (ESI): m/z (M+1): 280.0 (Method 2)

Intermediate 117: Tert-butyl N-(3-{[(tert-butoxy)carbonyl]({2-[(4-chloroquinolin-7-yl)oxy]ethyl})amino}propyl)carbamate Intermediate 117 was prepared following the procedure used for the synthesis of Intermediate 59 starting from (3-aminopropyl)({2-[(4-chloroquinolin-7-yl)oxy]ethyl})amine (Intermediate 116, 133 mg, 0.48 mmol) to afford title compound (255 mg, recovery assumed quantitative).

LC-MS (ESI): m/z (M+1): 480.2 (Method 1)

Intermediate 118: Tert-butyl N-(3-{[(tert-butoxy)carbonyl]({2-[(4-{[6-(5-chloro-2-fluorophenyl)pyridazin-4-yl]amino}quinolin-7-yl)oxy]ethyl})amino}propyl)carbamate Intermediate 118 was prepared following the procedure used for the synthesis of Intermediate 112 starting from tert-butyl N-(3-{[(tert-butoxy)carbonyl]({2-[(4-chloroquinolin-7-yl)oxy]ethyl})amino}propyl)carbamate (Intermediate 117, 50 mg, mmol) and 6-(5-chloro-2-fluorophenyl)pyridazin-4-amine (Intermediate 3, 28 mg, 0.12 mmol), to afford title compound (24 mg, 0.04 mmol, y=34%).

LC-MS (ESI): m/z (M+1): 667.3 (Method 1)

Intermediate 119: 7-{2-[(3-aminopropyl)amino]ethoxy}-N-[6-(5-chloro-2-fluorophenyl)pyridazin-4-yl]quinolin-4-amine Intermediate 119 was prepared following the procedure used for the synthesis of Intermediate 21 starting from tert-butyl N-(3-{[(tert-butoxy)carbonyl]({2-[(4-{[6-(5-chloro-2-fluorophenyl)pyridazin-4-yl]amino}quinolin-7-yl)oxy]ethyl})amino}propyl)carbamate (Intermediate 118, 24 mg, 0.04 mmol) to afford title compound (21 mg, recovery assumed quantitative).

LC-MS (ESI): m/z (M+1): 467.2 (Method 2)

Intermediate 120: N-[6-(5-chloro-2-fluorophenyl)pyridazin-4-yl]-7-[2-(1,3-diazinan-1-yl)ethoxy]quinolin-4-amine In a vial, to a solution of 7-{2-[(3-aminopropyl)amino]ethoxy}-N-[6-(5-chloro-2-fluorophenyl)pyridazin-4-yl]quinolin-4-amine (Intermediate 119, 21 mg, mmol) in MeOH (0.8 mL), formaldehyde 37% w/w in water (0.02 mL, 0.22 mmol) was added at RT. The vial was sealed and stirred at 50° C. for 1.5 h. The mixture was concentrated under reduced pressure to afford N-[6-(5-chloro-2-fluorophenyl)pyridazin-4-yl]-7-[2-(1,3-diazinan-1-yl)ethoxy]quinolin-4-amine (22 mg, recovery assumed quantitative) as yellow thick oil that was used as such.

LC-MS (ESI): m/z (M+1): 479.3 (Method 2)

Intermediate 121: 1-{2-[(tert-butyldiphenylsityl)oxy]ethyl}piperazine

A solution of tert-butyl-chloro-diphenylsilane (2.53 g, 9.22 mmol) in DCM (10 mL) was added drop wise to a stirred solution of 2-(1-piperazinyl)ethanol (1.0 g, 7.68 mmol), pyridine (0.93 mL, 11.52 mmol) and DMAP (93.8 mg, 0.77 mmol) in DCM (20 mL) at 5° C. The reaction was warmed at RT and stirred for 10 hrs. The mixture was washed with water, organic layer was separated, dried over $Na_2SO_4$ filtered, and evaporated. The residue was purified by flash chromatography on Biotage silica NH cartridge (from DCM to 3% MeOH) to afford 1-{2-[(tert-butyldiphenylsilyl)oxy]ethyl}piperazine (2.2 g, 5.97 mmol, y=77%)

LC-MS (ESI): m/z (M+1): 368.7 (Method 2)

Intermediate 122: 4-{[6-(5-chloro-2-fluorophenyl)pyridazin-4-yl]amino}quinolin-7-yl 4-{2-[(tert-butyldiphenylsityl)oxy]ethyl}piperazine-1-carboxylate 1-{2-[(tert-butyldiphenylsilyl)oxy]ethyl}piperazine (Intermediate 121, 413 mg, 1.12 mmol) in THF (5.47 mL) was added drop wise to a stirred mixture of triphosgene (334.8 mg, 1.13 mmol) in MTBE (5.47 mL) at 0° C. under $N_2$. After 1 hr the solvents were evaporated. The solid was treated with MTBE and filtered. The solid recovered was quickly added to a mixture of 4-{[6-(5-chloro-2-fluorophenyl)pyridazin-4-yl]amino}quinolin-7-ol hydrobromide (Intermediate 101, 200 mg, 0.45 mmol) and $K_2CO_3$ (317 mg, 2.29 mmol) in dry DMF (4.1 mL). The mixture was stirred at RT overnight. The reaction was poured in ice-cold water and extracted with EtOAc. Organic layer was separated, dried over $Na_2SO_4$ filtered, and evaporated. The residue was purified by flash chromatography on Biotage silica NH cartridge (from DCM to 5% MeOH/0.5% $H_2O$) to afford 4-{[6-(5-chloro-2-fluorophenyl)pyridazin-4-yl]amino}quinolin-7-yl 4-{2-[(tert-butyldiphenylsilyl)oxy]ethyl}piperazine-1-carboxylate (120 mg, 0.16 mmol, y=35%)

LC-MS (ESI): m/z (M+1): 761.5 (Method 2)

Intermediate 123: Tert-butyl N-{3-[(2,2,2-trifluoroethyl)amino]propyl}carbamate Intermediate 123 was prepared following the procedure used for the synthesis of Intermediate 69 starting from tert-butyl N-(3-aminopropyl)carbamate (500 mg, 2.87 mmol) to afford title compound (840 mg, recovery assumed quantitative).

LC-MS (ESI): m/z (M+1): 257.1 (Method 2)

Intermediate 124: Tert-butyl N-{3-[N-(2,2,2-trifluoroethyl)acetamido]propyl}carbamate Intermediate 124 was prepared following the procedure used for the synthesis of Intermediate 73 starting from tert-butyl N-{3-[(2,2,2-trifluoroethyl)amino]propyl}carbamate (Intermediate 123, 2.87 mmol) to afford title compound (810 mg, 2.71 mmol, y=94%).

LC-MS (ESI): m/z (M+1): 299.1 (Method 2)

Intermediate 125: (3-aminopropyl)(2,2,2-trifluoroethyl)amine dihydrochloride

TFA (0.83 mL, 10.86 mmol) was added to a solution of tert-butyl N-{3-[N-(2,2,2-trifluoroethyl)acetamido]propyl}carbamate (Intermediate 124, 450 mg, 1.5 mmol) in DCM (4 mL) and stirred at RT overnight. Volatiles were removed under vacuum to afford a sticky solid. The residue was dissolved with EtOH (5 mL), 6 N HCl (3.0 mL, 18.02 mmol) was added, and the resulting mixture was refluxed for 36 hrs. Volatiles were removed under vacuum, and the residue was dried to afford (3-aminopropyl)(2,2,2-trifluoroethyl)amine dihydrochloride (230 mg, 1 mmol, y=67%).

LC-MS (ESI): m/z (M+1): 157.4 (Method 2)

Intermediate 126: N-(4-bromopyridin-2-yl)-3-({3-[(2,2,2-trifluoroethy)amino]propyl}amino)propanamide Intermediate 126 was prepared following the procedure used for the synthesis of Intermediate 30 starting from N-(4-bromopyridin-2-yl)prop-2-enamide (Intermediate 29, 228 mg, 1 mmol), (3-aminopropyl)(2,2,2-trifluoroethyl)amine dihydrochloride (Intermediate 125, 230 mg, 1 mmol) and TEA (0.7 mL, 5 mmol) to afford title compound (230 mg, 0.6 mmol, 60% yield).

LC-MS (ESI): m/z (M+1): 383.1 (Method 1)

Intermediate 127: Tert-butyl N-{2-[(4-bromopyridin-2-yl)carbamoyl]ethyl}-N-(3-{[(tert-butoxy)carbonyl](2,2,2-Trifluoroethyl)amino}propyl)carbamate Intermediate 127 was prepared following the procedure used for the synthesis of Intermediate 59 starting from N-(4-bromopyridin-2-yl)-3-({3-[(2,2,2-trifluoroethyl)amino]propyl}amino)propanamide (Intermediate 126, 200 mg, 0.52 mmol) to afford title compound (150 mg, 0.26 mmol, 50% yield).

LC-MS (ESI): m/z (M+1): 585.2 (Method 1)

Intermediate 128: Tert-butyl N-(3-{[(tert-butoxy)carbonyl](2,2,2-trifluoroethyl)amino}propyl)-N-{2-[(4-{[6-(5-chloro-2-fluorophenyl)pyridazin-4-yl]amino}pyridin-2-yl)carbamoyl]ethyl}carbamate Intermediate 128 was prepared following the procedure used for the synthesis of Intermediate 31 starting from tert-butyl N-{2-[(4-bromopyridin-2-yl)carbamoyl]ethyl}-N-(3-{[(tert-butoxy)carbonyl](2,2,2-trifluoroethyl)amino}propyl)carbamate (Intermediate 127, 150 mg, 0.26 mmol) and 6-(5-chloro-2-fluorophenyl)pyridazin-4-amine (Intermediate 3, 58 mg, 0.26 mmol) to afford title compound (55 mg, 0.08 mmol, 29% yield).

LC-MS (ESI): m/z (M+1): 726.2 (Method 1)

Intermediate 129: N-(4-{[6-(5-chloro-2-fluorophenyl)pyridazin-4-yl]amino}pyridin-2-yl)-3-({3-[(2,2,2-trifluoroethyl)amino]propyl}amino)propanamide Intermediate 129 was prepared following the procedure used for the synthesis of Intermediate 21 starting from tert-butyl N-(3-{[(tert-butoxy)carbonyl](2,2,2-trifluoroethyl)amino}propyl)-N-{2-[(4-{[6-(5-chloro-2-fluorophenyl)pyridazin-4-yl]amino}pyridin-2-yl)carbamoyl]ethyl}carbamate (Intermediate 128, 55 mg, 0.08 mmol) to afford title compound (40 mg, recovery assumed quantitative).

LC-MS (ESI): m/z (M+1): 526.3 (Method 2)

Intermediate 130: 7-(2-bromoethoxy)-4-chloroquinoline

Intermediate 130 was prepared following the procedure used for the synthesis of Intermediate 114 starting from 4-chloro-7-hydroxyquinoline (200 mg, 1.11 mmol) and 1,2-dibromoethane (0.59 mL, 6.85 mmol) to afford title compound (158 mg, y=50%).

LC-MS (ESI): m/z (M+1): 288.0 (Method 1)

Intermediate 131: Tert-butyl N-[3-({2-[(4-chloroquinolin-7-yl)oxy]ethyl}amino)propyl]-N-methylcarbamate In a vial, to a suspension of 7-(2-bromoethoxy)-4-chloroquinoline (Intermediate 130, 136 mg, 0.47 mmol), and $K_2CO_3$ (138 mg, 1 mmol) in MeCN (4 mL), N-(3-aminopropyl)-N-methylcarbamic acid tert-butylester (449 mg, 2.38 mmol) was added, the vial was sealed and stirred at 70° C. for 5 hrs. The reaction mixture was diluted with MeCN and filtered. The filtrate was concentrated under reduced pressure and the residue was dissolved in EtOAc. The organic solution was washed twice with water, brine, dried over $Na_2SO_4$, filtered, and the solvent removed by reduced pressure. The crude material was purified by flash chromatography on Biotage silica cartridge (from DCM to 4% MeOH) to afford tert-butyl N-[3-({2-[(4-chloroquinolin-7-yl)oxy]ethyl}amino)propyl]-N-methylcarbamate (152 mg, 0.39 mmol, y=81%) as colorless oil.

LC-MS (ESI): m/z (M+1): 394.2 (Method 1)

Intermediate 132: Tert-butyl N-(3-{[(tert-butoxy)carbonyl]({2-[(4-chloroquinolin-7-yl)oxy]ethyl})amino}propyl)-n-methylcarbamate To a stirred solution of tert-butyl N-[3-({2-[(4-chloroquinolin-7-yl)oxy]ethyl}amino)propyl]-N-methylcarbamate (Intermediate 131, 152 mg, 0.38 mmol) in DCM (2 mL), a solution of di-tert-butyl dicarbonate (103 mg, 0.47 mmol) in DCM (1 mL) was added portion-wise at RT, then the resulting mixture was left standing overnight. The mixture was diluted with DCM, the solution washed with a saturated solution of $NaHCO_3$, dried over $Na_2SO_4$, filtered, and the solvent removed under reduced pressure, the crude material was purified by flash chromatography on Biotage silica cartridge (from cHex to 50% EtOAc) to afford tert-butyl N-(3-{[(tert-butoxy)carbonyl]({2-[(4-chloroquinolin-7-yl)

oxy]ethyl})amino}propyl)-N-methylcarbamate (180 mg, 0.36 mmol, y=95%) as colourless thick oil.

LC-MS (ESI): m/z (M+1): 495.7 (Method 2)

Intermediate 133: Tert-butyl N-(3-{[(tert-butoxy)carbonyl]({2-[(4-{[6-(5-chloro-2-fluorophenyl)pyridazin-4-yl]amino}quinolin-7-yl)oxy]ethyl})amino}propyl)-N-methylcarbamate Intermediate 133 was prepared following the procedure used for the synthesis of Intermediate 112 starting from tert-butyl N-(3-{[(tert-butoxy)carbonyl]({2-[(4-chloroquinolin-7-yl)oxy]ethyl})amino}propyl)-N-methylcarbamate (Intermediate 132, 150 mg, 0.30 mmol) and 6-(5-chloro-2-fluorophenyl)pyridazin-4-amine (Intermediate 3, 82 mg, 0.37 mmol), to afford title compound (89 mg, 0.13 mmol, y=43%).

LC-MS (ESI): m/z (M+1): 681.5 (Method 2)

Intermediate 134: N-[6-(5-chloro-2-fluorophenyl)pyridazin-4-yl]-7-(2-{[3-(methylamino)propyl]amino}ethoxy)quinolin-4-amine Intermediate 134 was prepared following the procedure used for the synthesis of Intermediate 21 starting from tert-butyl N-(3-{[(tert-butoxy)carbonyl]({2-[(4-{[6-(5-chloro-2-fluorophenyl)pyridazin-4-yl]amino}quinolin-7-yl)oxy]ethyl})amino}propyl)-N-methylcarbamate (Intermediate 133, 89 mg, 0.13 mmol) to afford title compound (62 mg, recovery assumed quantitative).

LC-MS (ESI): m/z (M+1): 481.2 (Method 2)

Intermediate 135: Tert-butyl 4-{2-[(4-methylbenzenesulfonyl)oxy]ethyl}piperidine-1-carboxylate To an ice-cooled solution of 4-(2-hydroxyethyl)-1-piperidinecarboxylic acid tert-butyl ester (1 g, 4.36 mmol) in DCM (10.9 mL), TEA (1.22 mL, 8.72 mmol) and 4-methylbenzenesulfonyl chloride (1.08 mL, 5.67 mmol) were subsequently added. The mixture was stirred at RT overnight. The mixture was diluted with DCM, washed with saturated solution of NaHCO$_3$ (3×), filtered through a phase separator and evaporated under vacuum. The crude material was purified by flash chromatography on Biotage silica cartridge (from cHex to 40% EtOAc) to afford tert-butyl 4-{2-[(4-methylbenzenesulfonyl)oxy]ethyl}piperidine-1-carboxylate (1.60 g, 4.19 mmol, y=96%) as colourless oil.

LC-MS (ESI): m/z (M+1): 384.2 (Method 2)

Intermediate 136: benzyl 4-(2-{1-[(tert-butoxy)carbonyl]piperidin-4-yl}ethyl)piperazine-1-carboxylate A mixture of tert-butyl 4-{2-[(4-methylbenzenesulfonyl)oxy]ethyl}piperidine-1-carboxylate (Intermediate 135, 1.16 g, 2.72 mmol) and benzyl piperazine-1-carboxylate (500 mg, 2.27 mmol) was dissolved in dry MeCN (22.7 mL), TEA (3.16 mL, 22.7 mmol) was added and the reaction was stirred at 80° C. overnight. Volatiles were removed under vacuum and the crude material was purified by flash chromatography on Biotage silica cartridge (from DCM to 10% MeOH) to afford benzyl 4-(2-{1-[(tert-butoxy)carbonyl]piperidin-4-yl}ethyl)piperazine-1-carboxylate (580 mg, 1.34 mmol, y=59%).

LC-MS (ESI): m/z (M+1): 432.3 (Method 2)

Intermediate 137: benzyl 4-[2-(piperidin-4-yl)ethyl]piperazine-1-carboxylate

Intermediate 137 was prepared following the procedure used for the synthesis of Intermediate 21 starting from benzyl 4-(2-{1-[(tert-butoxy)carbonyl]piperidin-4-yl}ethyl)piperazine-1-carboxylate (Intermediate 136, 289 mg, 0.67 mmol) to afford title compound (130 mg, 0.39 mmol, y=59%).

$^1$H NMR (400 MHz, Chloroform-d) δ ppm 7.29-7.45 (m, 5H), 5.14 (s, 2H), 3.47-3.56 (m, 4H), 3.02-3.20 (m, 2H), 2.63 (td, J=12.27, 2.53 Hz, 2H), 2.30-2.50 (m, 6H), 1.64-1.77 (m, 2H), 1.33-1.60 (m, 3H), 1.10-1.32 (m, 2H)

Intermediate 138: benzyl 4-[2-(1-methylpiperidin-4-yl)ethyl]piperazine-1-carboxylate Intermediate 138 was prepared following the procedure used for the synthesis of Intermediate 22 starting from benzyl 4-[2-(piperidin-4-yl)ethyl]piperazine-1-carboxylate (Intermediate 137, 250 mg, 0.75 mmol) and formaldehyde 37% w/w in water (0.41 mL, 9.65 mmol) to afford title compound (258 mg, 0.75 mmol, recovery assumed quantitative).

$^1$H NMR (400 MHz, Chloroform-d) δ ppm 7.28-7.51 (m, 5H), 5.14 (s, 2H), 3.46-3.56 (m, 4H), 2.71-2.91 (m, 2H), 2.30-2.43 (m, 6H), 2.25 (s, 3H), 1.80-1.96 (m, 2H), 1.63-1.70 (m, 2H), 1.38-1.47 (m, 2H), 1.20-1.33 (m, 3H)

Intermediate 139: 1-[2-(1-methylpiperidin-4-yl)ethyl]piperazine

Ammonium formate (282.9 mg, 4.49 mmol) was added to a stirred mixture of benzyl 4-[2-(1-methylpiperidin-4-yl)ethyl]piperazine-1-carboxylate (Intermediate 138, 310 mg, 0.90 mmol) and Pd 5% over carbon (191 mg, 0.09 mmol) in isopropanol (10 mL) at RT under N$_2$. The reaction was warmed at 80° C. for 1 hr. After cooling the mixture was filtered on Celite® pad and the organic solvent was removed by reduced pressure. The residue was treated with water and NaHCO$_3$ was added until pH 8. The water was evaporated. The residue was treated with DCM/MeOH and the solid was discarded, organic solvents were removed by reduced pressure to afford 1-[2-(1-methylpiperidin-4-yl)ethyl]piperazine (170 mg, 0.80 mmol, y=90%) that was used without further purification.

$^1$H NMR (400 MHz, DMSO-d$_6$) δ ppm 2.71 (d, J=3.08 Hz, 1H), 2.62-2.70 (m, 5H), 2.22 (dd, J=8.72, 6.39 Hz, 5H), 2.11 (s, 3H), 1.78 (td, J=11.20, 2.35 Hz, 2H), 1.54-1.63 (m, 2H), 1.27-1.37 (m, 2H), 1.15 (d, J=2.75 Hz, 1H), 1.04-1.14 (m, 2H).

Intermediate 140: N-(4-bromopyridin-2-yl)-4-(4-methylpiperazin-1-yl)butanamide

A solution of N-(4-bromopyridin-2-yl)-4-chlorobutanamide (Intermediate 41, 100 mg, 0.35 mmol), TEA (0.15 mL, 1.05 mmol) and 1-methylpiperazine (0.38 mL, 3.49 mmol) in THF (5.5 mL) was stirred at 70° C. for 24 hrs. Volatiles were removed under vacuum, and the crude material was purified by reverse flash chromatography on Biotage C18 cartridge (from H$_2$O+0.1% NH$_4$OH to 50% MeCN) to afford N-(4-bromopyridin-2-yl)-4-(4-methylpiperazin-1-yl)butanamide (100 mg, 0.29 mmol, y=84%) as pale yellow oil.

LC-MS (ESI): m/z (M+1): 343.1 (Method 1)

Intermediate 141: Tert-butyl N-[2-(4-{2-[(4-{[6-(5-chloro-2-fluorophenyl)pyridazin-4-yl]amino}quinolin-7-yl)oxy]ethyl}piperazin-1-yl)ethyl]carbamate A mixture of 2-(Boc-amino)ethyl bromide (54 mg, 0.24 mmol), N-[6-(5-chloro-2-fluorophenyl)pyridazin-4-yl]-7-

[2-(piperazin-1-yl)ethoxy]quinolin-4-amine (Example 9, 110 mg, 0.23 mmol) and K$_2$CO$_3$ (48 mg, 0.34 mmol) in dry DMF (3 mL) was stirred at 55° C. for 24 hrs. The mixture was treated with saturated NH$_4$Cl solution, then diluted with brine. The aqueous phase was extracted with EtOAc, then the combined organic phases were washed with brine, dried over Na$_2$SO$_4$, and filtered. The solvent was evaporated to afford an orange oil which was purified by flash chromatography on Biotage silica cartridge (from DCM to 2% MeOH) to afford tert-butyl N-[2-(4-{2-[(4-{[6-(5-chloro-2-fluorophenyl)pyridazin-4-yl]amino}quinolin-7-yl)oxy]ethyl}piperazin-1-yl)ethyl]carbamate (100 mg, 0.16 mmol, y=70%) as a red oil.

LC-MS (ESI): m/z (M+1): 622.9 (Method 2)

Intermediate 142: Tert-butyl 4-[2-(4-methylpiperazin-1-yl)ethyl]piperidine-1-carboxylate 1-methylpiperazine (163 mg, 1.63 mmol) and a catalytic amount of NaI were added to a stirred solution of K$_2$CO$_3$ (346 mg, 2.5 mmol) and tert-butyl 4-{2-[(4-methylbenzenesulfonyl)oxy]ethyl}piperidine-1-carboxylate (Intermediate 135, 480 mg, 1.25 mmol) in dry MeCN (16 mL) at RT. The reaction was stirred at 70° C. for 10 hrs. After cooling the mixture was poured in cold water and extracted with EtOAc. Organic layer was separated, dried over Na$_2$SO$_4$, filtered, and evaporated. The residue was purified by flash chromatography on Biotage silica cartridge (from DCM to 5% MeOH) to afford tert-butyl 4-[2-(4-methylpiperazin-1-yl)ethyl]piperidine-1-carboxylate (290 mg, 0.93 mmol, y=74%).

LC-MS (ESI): m/z (M+1): 312.3 (Method 1)

Intermediate 143: 1-methyl-4-[2-(piperidin-4-yl)ethyl]piperazine

Intermediate 143 was prepared following the procedure used for the synthesis of Intermediate 49 starting from tert-butyl 4-[2-(4-methylpiperazin-1-yl)ethyl]piperidine-1-carboxylate (Intermediate 142, 290 mg, 0.93 mmol) to afford title compound (190 mg, 0.9 mmol, y=96%).

LC-MS (ESI): m/z (M+1): 212.2 (Method 1)

Intermediate 144: Tert-butyl 4-[(4-chloroquinolin-7-yl)oxy]piperidine-1-carboxylate Title compound was prepared following the procedure used for the synthesis of Intermediate 17 starting from 4-chloro-7-hydroxyquinoline (250 mg, 1.39 mmol) and 4-hydroxy-1-piperidinecarboxylic acid tert-butyl ester (308 mg, 1.53 mmol) to afford title compound (430 mg, 1.19 mmol, y=85%).

LC-MS (ESI): m/z (M+1): 363.3 (Method 1)

Intermediate 145: Tert-butyl 4-[(4-{[6-(5-chloro-2-fluorophenyl)pyridazin-4-yl]amino}quinolin-7-yl)oxy]piperidine-1-carboxylate Intermediate 145 was prepared following the procedure used for the synthesis of Intermediate 9 starting from tert-butyl 4-[(4-chloroquinolin-7-yl)oxy]piperidine-1-carboxylate (Intermediate 144, 316 mg, 0.67 mmol) and 6-(5-chloro-2-fluorophenyl)pyridazin-4-amine (Intermediate 3, 150 mg, 0.67 mmol) to afford title compound (230 mg, 0.42 mmol, 62% yield).

LC-MS (ESI): m/z (M+1): 550.3 (Method 1)

Intermediate 146: N-[6-(5-chloro-2-fluorophenyl)pyridazin-4-yl]-7-(piperidin-4-yloxy)quinolin-4-amine Intermediate 146 was prepared following the procedure used for the synthesis of Intermediate 49 starting from tert-butyl 4-[(4-{[6-(5-chloro-2-fluorophenyl)pyridazin-4-yl]amino}quinolin-7-yl)oxy]piperidine-1-carboxylate (Intermediate 145, 230 mg, 0.42 mmol) to afford title compound (129 mg, 0.29 mmol, y=69%).

LC-MS (ESI): m/z (M+1): 450.2 (Method 2)

Intermediate 147: Tert-butyl 4-{2-[(4-{[6-(5-chloro-2-fluorophenyl)-3-methylpyridazin-4-yl]amino}pyridin-2-yl)carbamoyl]ethyl}piperazine-1-carboxylate Intermediate 147 was prepared following the procedure used for the synthesis of Intermediate 31 starting from tert-butyl 4-{2-[(4-bromopyridin-2-yl)carbamoyl]ethyl}piperazine-1-carboxylate (Intermediate 30, 96 mg, 0.23 mmol) and 6-(5-chloro-2-fluorophenyl)-3-methylpyridazin-4-amine (Intermediate 90, 50 mg, 0.21 mmol) to afford title compound (90 mg, 0.16 mmol, 75% yield).

LC-MS (ESI): m/z (M+1): 5760.3 (Method 2)

Intermediate 148: Tert-butyl N-[2-(4-{2-[(4-{[6-(5-chloro-2-fluorophenyl)-3-methylpyridazin-4-yl]amino}pyridin-2-yl)carbamoyl]ethyl}piperazin-1-yl)ethyl]carbamate A solution of N-(4-{[6-(5-chloro-2-fluorophenyl)-3-methylpyridazin-4-yl]amino}pyridin-2-yl)-3-(piperazin-1-yl)propanamide (Example 74, 54 mg, 0.11 mmol) in DMF (0.57 mL) was treated with tert-butyl N-(2-bromoethyl)carbamate (77 mg, 0.34 mmol) and TEA (0.09 mL, 0.69 mmol) at RT. The mixture was stirred for 60 hrs at RT. The reaction was quenched with saturated NaHCO$_3$ solution and diluted with brine. The mixture was extracted with EtOAc (×3), filtered using a phase separator and concentrated under reduced pressure. The crude product was purified by flash chromatography on Biotage silica NH (from DCM to 2% MeOH) and then by flash chromatography on Biotage silica (from EtOAc to 50% MeOH) to afford tert-butyl N-[2-(4-{2-[(4-{[6-(5-chloro-2-fluorophenyl)-3-methylpyridazin-4-yl]amino}pyridin-2-yl)carbamoyl]ethyl}piperazin-1-yl)ethyl]carbamate (49 mg, mmol, 69% yield) as an off-white solid.

LC-MS (ESI): m/z (M+1): 613.5 (Method 2)

Intermediate 149: N-(4-bromopyridin-2-yl)-3-[3-ethoxy-3-(hydroxymethyl)azetidin-1-yl]propanamide Intermediate 149 was prepared following the procedure used for the synthesis of Intermediate 30 starting from N-(4-bromopyridin-2-yl)prop-2-enamide (Intermediate 29, 233 mg, 1.03 mmol), (3-ethoxyazetidin-3-yl)methanol hydrochloride (206 mg, 1.23 mmol) and TEA (0.29 mL, 2.05 mmol) to afford title compound (325 mg, 0.91 mmol, 88% yield).

LC-MS (ESI): m/z (M+1): 358.1 (Method 1)

Intermediate 150: N-[6-(5-chloro-2-fluorophenyl)-3-methylpyridazin-4-yl]-7-methoxyquinolin-4-amine Intermediate 150 was prepared following the procedure used for the synthesis of Intermediate 13 starting from 4-chloro-7-methoxyquinoline (139 mg, 0.72 mmol) and 6-(5-chloro-2-fluorophenyl)-3-methylpyridazin-4-amine (Intermediate 90, 150 mg, 0.6 mmol) to afford title compound (170 mg, 0.43 mmol, 72% yield).

LC-MS (ESI): m/z (M+1): 395.1 (Method 1)

Intermediate 151: 4-{[6-(5-chloro-2-fluorophenyl)-3-methylpyridazin-4yl]amino}quinolin-7-ol-hydrobromide Intermediate 151 was prepared following the procedure used for the synthesis of Intermediate 101 starting from N-[6-(5-chloro-2-fluorophenyl)-3-methylpyridazin-4-yl]-7-methoxyquinolin-4-amine (Intermediate 150, 140 mg, 0.35 mmol) to afford title compound (170 mg, recovery assumed quantitative).

LC-MS (ESI): m/z (M+1): 381.1 (Method 2)

Intermediate 152: N-(4-bromopyridin-2-yl)-3-[4-(2-methanesulfonylethyl)piperazin-1-yl]propanamide Intermediate 152 was prepared following the procedure used for the synthesis of Intermediate 30 starting from N-(4-bromopyridin-2-yl)prop-2-enamide (Intermediate 29, 200 mg, 0.88 mmol), 1-(2-methanesulfonylethyl)piperazine dihydrochloride (350 mg, 1.5 mmol) and TEA (0.49 mL, 4 mmol) to afford title compound (316 mg, 0.65 mmol, 86% yield).

LC-MS (ESI): m/z (M+1): 421.0 (Method 2)

Intermediate 153: N-(4-bromopyridin-2-yl)-2,2,2-trichloroacetamide

A solution of 4-bromo-2-pyridinamine (780 mg, 4.51 mmol) and TEA (0.69 mL, 4.96 mmol) in THF (23.1 mL) was treated with 2,2,2-trichloroacetyl chloride (0.48 mL, 4.28 mmol) at 0° C. The mixture was stirred at the same temperature for minutes and then at RT for 4 hrs. The mixture was cooled to 0° C. and carefully quenched with water and then saturated NaHCO₃ solution. The mixture was extracted with EtOAc, dried with Na₂SO₄, filtered, and concentrated under reduced pressure. The crude product was purified by flash chromatography on Biotage silica NH (from cHex to 100% EtOAc) to afford N-(4-bromopyridin-2-yl)-2,2,2-trichloroacetamide (1.10 g, 3.45 mmol, 77% yield) as a white solid.

LC-MS (ESI): m/z (M+1): 318.8 (Method 1)

Intermediate 154: N-(4-bromopyridin-2-yl)-2-methyl-2,7-diazaspiro[3.5]nonane-7-carboxamide A mixture of N-(4-bromopyridin-2-yl)-2,2,2-trichloroacetamide (Intermediate 153, 200 mg, 0.63 mmol), commercially available 2-methyl-2,7-diazaspiro[3.5]nonane dihydrochloride (147 mg, 0.69 mmol) in DMSO (4.2 mL), and Na₂CO₃ (233 mg, 2.2 mmol) was stirred at 100° C. for 2.5 hrs. The mixture was treated with saturated NaHCO₃ solution and extracted with DCM. The organic phase was dried with Na₂SO₄, filtered, and concentrated under reduced pressure. The crude product was purified by flash chromatography on Biotage silica NH (from DCM to 5% MeOH) to afford N-(4-bromopyridin-2-yl)-2-methyl-2,7-diazaspiro[3.5]nonane-7-carboxamide (90 mg, 0.265 mmol, 42% yield) as a colourless oil.

LC-MS (ESI): m/z (M+1): 341.1 (Method 2)

Intermediate 155: Tert-butyl N-(4-{[6-(5-chloro-2-fluorophenyl)-3-methylpyridazin-4-yl]amino}pyridin-2-yl)carbamate Intermediate 155 was prepared following the procedure used for the synthesis of Intermediate 31 starting from tert-butyl 4-bromopyridin-2-ylcarbamate (125 mg, mmol) and 6-(5-chloro-2-fluorophenyl)-3-methylpyridazin-4-amine (Intermediate 90, 100 mg, 0.42 mmol) to afford title compound (89 mg, 0.21 mmol, 50% yield).

LC-MS (ESI): m/z (M+1): 430.2 (Method 1)

Intermediate 156: N4-[6-(5-chloro-2-fluorophenyl)-3-methylpyridazin-4-yl]pyridine-2,4-diamine Intermediate 156 was prepared following the procedure used for the synthesis of Intermediate 21 starting from tert-butyl N-(4-{[6-(5-chloro-2-fluorophenyl)-3-methylpyridazin-4-yl]amino}pyridin-2-yl)carbamate (Intermediate 155, 89 mg, 0.21 mmol) to afford title compound (42 mg, 0.13 mmol, y=62%).

LC-MS (ESI): m/z (M+1): 330.1 (Method 1)

Intermediate 157: 1,5-dimethyl 3-(4-{2-[(4-{[6-(5-chloro-2-fluorophenyl)pyridazin-4-yl]amino}quinolin-7-yl)oxy]ethyl}piperazin-1-yl)pentanedioate In a vial, to a solution of N-[6-(5-chloro-2-fluorophenyl)pyridazin-4-yl]-7-[2-(piperazin-1-yl)ethoxy]quinolin-4-amine (Example 9, 150 mg, 0.31 mmol) in MeOH (1.8 mL), dimethyl (E)-pent-2-enedioate (0.32 mL, 2.26 mmol) was added, the vial was sealed and stirred overnight at 70° C. The mixture was concentrated under reduced pressure, and the crude material was purified by flash chromatography on Biotage silica NH cartridge (from DCM to 2% MeOH) to afford 1,5-dimethyl 3-(4-{2-[(4-{[6-(5-chloro-2-fluorophenyl)pyridazin-4-yl]amino}quinolin-7-yl)oxy]ethyl}piperazin-1-yl)pentanedioate (85 mg, 0.13 mmol, y=42%) as pale yellow solid.

LC-MS (ESI): m/z (M+1): 637.8 (Method 2)

Intermediate 158: 4-chloro-6-methoxy-7-[2-(4-methylpiperazin-1-yl)ethoxy]quinoline Intermediate 158 was prepared following the procedure used for the synthesis of Intermediate 20 starting from 4-chloro-6-methoxyquinolin-7-ol (500 mg, 2.39 mmol) and 1-(2-hydroxyethyl)-4-methylpiperazine (447 mg, 3.1 mmol) to afford title compound (198 mg, 0.58 mmol, 25% yield).

LC-MS (ESI): m/z (M+1): 336.2 (Method 1)

Intermediate 159: N-(4-bromopyridin-2-yl)-2-chloroacetamide 2-chloroacetyl chloride (0.25 mL, 3.18 mmol) was added dropwise to a solution of 4-bromo-2-pyridinamine (500 mg, 2.89 mmol) and TEA (1.21 mL, 8.67 mmol) in dry DCM (14.45 mL) at 0° C. The mixture was stirred at RT for 3 hrs. The mixture was diluted with DCM, washed with a saturated solution of NaHCO₃ and with brine. The organic phase was filtered through a phase separator and evaporated under vacuum. The crude material was purified by flash chromatography on Biotage silica cartridge (from DCM to 10%

EtOAc) to afford N-(4-bromopyridin-2-yl)-2-chloroacetamide (470 mg, 1.88 mmol, y=65%) as an off-white solid.

LC-MS (ESI): m/z (M+1): 249.0 (Method 2)

Intermediate 160: Tert-butyl 4-{[(4-chloroquinolin-7-yl)oxy]methyl}piperidine-1-carboxylate Intermediate 160 was prepared following the procedure used for the synthesis of Intermediate 17 starting from 4-chloro-6-methoxyquinolin-7-ol (150 mg, 0.83 mmol) and tert-butyl 4-(hydroxymethyl)piperidine-1-carboxylate (198 mg, 0.92 mmol) to afford title compound (280 mg, 0.74 mmol, 89% yield).

LC-MS (ESI): m/z (M+1): 377.2 (Method 1)

Intermediate 161: Tert-butyl 4-{[(4-{[6-(5-chloro-2-fluorophenyl)pyridazin-4-yl]amino}quinolin-7-yl)oxy]methyl}piperidine-1-carboxylate Intermediate 161 was prepared following the procedure used for the synthesis of Intermediate 9 starting from tert-butyl 4-{[(4-chloroquinolin-7-yl)oxy]methyl}piperidine-1-carboxylate (Intermediate 161, 241 mg, 0.64 mmol) and 6-(5-chloro-2-fluorophenyl)pyridazin-4-amine (Intermediate 3, 130 mg, 0.58 mmol) to afford title compound (310 mg, 0.55 mmol, 95% yield).

LC-MS (ESI): m/z (M+1): 564.3 (Method 1)

Intermediate 162: N-[6-(5-chloro-2-fluorophenyl)pyridazin-4-yl]-7-[(piperidin-4-yl)methoxy]quinolin-4-amine Intermediate 162 was prepared following the procedure used for the synthesis of Intermediate 21 starting from tert-butyl 4-{[(4-{[6-(5-chloro-2-fluorophenyl)pyridazin-4-yl]amino}quinolin-7-yl)oxy]methyl}piperidine-1-carboxylate (Intermediate 161, 282 mg, 0.42 mmol) to afford title compound (190 mg, 0.41 mmol. y=96%).

LC-MS (ESI): m/z (M+1): 464.2 (Method 2)

Intermediate 163: Tert-butyl N-[2-({2-[(4-chloroquinolin-7-yl)oxy]ethyl}amino)ethyl]-N-methylcarbamate Intermediate 163 was prepared following the procedure used for the synthesis of Intermediate 131 starting from 7-(2-bromoethoxy)-4-chloroquinoline (Intermediate 130, 100 mg, 0.35 mmol) and N-(2-aminoethyl)-N-methyl carbamic acid tert-butyl ester (305 mg, 1.75 mmol) to afford title compound (140 mg, recovery assumed quantitative).

LC-MS (ESI): m/z (M+1): 380.2 (Method 1)

Intermediate 164: Tert-butyl N-(2-{[(tert-butoxy)carbonyl]({2-[(4-chloroquinolin-7-yl)oxy]ethyl})amino}ethyl)-N-methylcarbamate Intermediate 164 was prepared following the procedure used for the synthesis of Intermediate 132 starting from tert-butyl N-[2-({2-[(4-chloroquinolin-7-yl)oxy]ethyl}amino)ethyl]-N-methylcarbamate (Intermediate 163, 140 mg, 0.37 mmol) to afford title compound (18 mg, recovery assumed quantitative).

LC-MS (ESI): m/z (M+1): 681.5 (Method 2)

Intermediate 165: Tert-butyl N-(2-{[(tert-butoxy)carbonyl]({2-[(4-{[6-(5-chloro-2-fluorophenyl)pyridazin-4-yl]amino}quinolin-7-yl)oxy]ethyl})amino}ethyl)-N-methylcarbamate Intermediate 165 was prepared following the procedure used for the synthesis of Intermediate 112 starting from tert-butyl N-(2-{[(tert-butoxy)carbonyl]({2-[(4-chloroquinolin-7-yl)oxy]ethyl})amino}ethyl)-N-methylcarbamate (Intermediate 164, 176 mg, 0.31 mmol) and 6-(5-chloro-2-fluorophenyl)pyridazin-4-amine (Intermediate 3, 67 mg, 0.30 mmol), to afford title compound (135 mg, 0.20 mmol, y=68%).

LC-MS (ESI): m/z (M+1): 667.5 (Method 2)

Intermediate 166: N-[6-(5-chloro-2-fluorophenyl)pyridazin-4-yl]-7-(2-{[2-(methylamino)ethyl]amino}ethoxy)quinolin-4-amine Intermediate 166 was prepared following the procedure used for the synthesis of Intermediate 21 starting from tert-butyl N-(2-{[(tert-butoxy)carbonyl]({2-[(4-{[6-(5-chloro-2-fluorophenyl)pyridazin-4-yl]amino}quinolin-7-yl)oxy]ethyl})amino}ethyl)-N-methylcarbamate (Intermediate 165, 135 mg, 0.20 mmol) to afford title compound (100 mg, recovery assumed quantitative).

LC-MS (ESI): m/z (M+1): 467.3 (Method 2)

Intermediate 167: 1-tert-butyl 2-methyl 4-{2-[(4-bromopyridin-2-yl)carbamoyl]ethyl}piperazine-1,2-dicarboxylate Intermediate 167 was prepared following the procedure used for the synthesis of Intermediate 30 starting from N-(4-bromopyridin-2-yl)prop-2-enamide (Intermediate 29, 150 mg, 0.65 mmol), and 1-tert-butyl 2-methylpiperazine-1,2-dicarboxylate (288 mg, 1.18 mmol) to afford title compound (248 mg, 0.53 mmol, 80% yield).

LC-MS (ESI): m/z (M+1): 471.1 (Method 1)

Intermediate 168: 1-tert-butyl 2-methyl 4-{2-[(4-{[6-(5-chloro-2-fluorophenyl)-3-methylpyridazin-4-yl]amino}pyridin-2-yl)carbamoyl]ethyl}piperazine-1,2-dicarboxylate Intermediate 168 was prepared following the procedure used for the synthesis of Intermediate 31 starting from 1-tert-butyl 2-methyl 4-{2-[(4-bromopyridin-2-yl)carbamoyl]ethyl}piperazine-1,2-dicarboxylate (Intermediate 167, 109 mg, 0.23 mmol) and 6-(5-chloro-2-fluorophenyl)-3-methylpyridazin-4-amine (Intermediate 50 mg, 0.21 mmol) to afford title compound (110 mg, 0.17 mmol, 83% yield).

LC-MS (ESI): m/z (M+1): 628.4 (Method 2)

Intermediate 169: Tert-butyl N-[2-({2-[(4-bromopyridin-2-yl)carbamoyl]ethyl}amino)ethyl]-N-methylcarbamate Intermediate 169 was prepared following the procedure used for the synthesis of Intermediate 30 starting from N-(4-bromopyridin-2-yl)prop-2-enamide (Intermediate 29, 150 mg, 0.66 mmol), and N-(2-aminoethyl)-N-methyl carbamic acid tert-butylester (288 mg, 1.65 mmol) to afford title compound (240 mg, 0.6 mmol, 90% yield).

LC-MS (ESI): m/z (M+1): 403.1 (Method 1)

Intermediate 170: Tert-butyl N-[2-({2-[(4-bromopyridin-2-yl)carbamoyl]ethyl}[(tert-butoxy)carbonyl]amino)ethyl]-N-methylcarbamate Intermediate 170 was prepared following the procedure used for the synthesis of Intermediate 59 starting from tert-butyl N-[2-({2-[(4-bromopyridin-2-yl)carbamoyl]ethyl}amino)ethyl]-N-methylcarbamate (Intermediate 169, 240 mg, mmol) to afford title compound (238 mg, 0.47 mmol, y=79%).

LC-MS (ESI): m/z (M+1): 503.2 (Method 1)

Intermediate 171: Tert-butyl N-(2-{[(tert-butoxy)carbonyl]({2-[(4-{[6-(5-chloro-2-fluorophenyl)-3-methylpyridazin-4-yl]amino}pyridin-2-yl)carbamoyl]ethyl})amino}ethyl)-N-methylcarbamate Intermediate 171 was prepared following the procedure used for the synthesis of Intermediate 31 starting from tert-butyl N-[2-({2-[(4-bromopyridin-2-yl)carbamoyl]ethyl}[(tert-butoxy)carbonyl]amino)ethyl]-N-methylcarbamate (Intermediate 170, 130 mg, 0.26 mmol) and 6-(5-chloro-2-fluorophenyl)-3-methylpyridazin-4-amine (Intermediate 90, 56 mg, 0.24 mmol) to afford title compound (114 mg, 0.17 mmol, 73% yield).

LC-MS (ESI): m/z (M+1): 658.4 (Method 1)

Intermediate 172: 1-tert-butyl 3-methyl 4-methylpiperazine-1,3-dicarboxylate

Intermediate 172 was prepared following the procedure used for the synthesis of Intermediate 22 starting from methyl-4-boc-piperazine-2-carboxylate (150 mg, mmol) and formaldehyde 37% w/w in water (0.23 mL, 3.07 mmol) to afford title compound (124 mg, 0.48 mmol, y=78%).

LC-MS (ESI): m/z (M+1): 293.1 (Method 1)

Intermediate 173: Methyl 1-methylpiperazine-2-carboxylate hydrochloride

A solution of 1-tert-butyl 3-methyl 4-methylpiperazine-1,3-dicarboxylate (Intermediate 172 (124 mg, 0.48 mmol) in HCl solution, 4 M in dioxane (1.2 mL, 4.8 mmol) and MeOH (1.2 mL) was stirred at RT for 2 hrs. Volatiles were removed under vacuum, to afford methyl 1-methylpiperazine-2-carboxylate hydrochloride (Intermediate 173, 160 mg, 0.82 mmol, recovery assumed quantitative) that was used in the next step without further purification.

LC-MS (ESI): m/z (M+1): 159.1 (Method 2)

Intermediate 174: Methyl 4-{2-[(4-bromopyridin-2-yl)carbamoyl]ethyl}-1-methylpiperazine-2-carboxylate Intermediate 174 was prepared following the procedure used for the synthesis of Intermediate 30 starting from N-(4-bromopyridin-2-yl)prop-2-enamide (Intermediate 29, 83 mg, 0.37 mmol), methyl 1-methylpiperazine-2-carboxylate hydrochloride (Intermediate 173, 0.47 mmol) and TEA (0.1 mL, 0.73 mmol) to afford title compound (135 mg, 0.35 mmol, 96% yield).

LC-MS (ESI): m/z (M+1): 383.1 (Method 1)

Intermediate 175: N-(4-bromopyridin-2-yl)-2-(4-methyl-1,4-diazepan-1-yl)acetamide N-(4-bromopyridin-2-yl)-2-chloroacetamide (Intermediate 159, 200 mg, 0.79 mmol) was added to a stirred solution of 1-methyl-1,4-diazepane (181 mg, 1.59 mmol) in dry DMF (3 mL) at RT. After 3 hours the mixture was treated with H₂O and extracted with EtOAc. Organic layer was separated, washed with water, dried over Na₂SO₄, filtered, and evaporated to afford N-(4-bromopyridin-2-yl)-2-(4-methyl-1,4-diazepan-1-yl)acetamide (180 mg, 0.55 mmol, 69% yield).

LC-MS (ESI): m/z (M+1): 327.4 (Method 2)

Intermediate 176: Tert-butyl 4-{[(4-bromopyridin-2-yl)carbamoyl]methyl}piperazine-1-carboxylate A mixture of N-(4-bromopyridin-2-yl)-2-chloroacetamide (Intermediate 159, 150 mg, 0.60 mmol), 1-piperazinecarboxylic acid tert-butyl ester (224 mg, 1.2 mmol) and K₂CO₃ (249 mg, 1.8 mmol) in dry DMF (6 mL) was stirred under nitrogen at RT for 18 hrs. Water and EtOAc were added, the organic phase was separated and the aqueous phase was extracted with EtOAc The combined organic layers were washed several times with brine, dried over Na₂SO₄ and filtered. The solvent was evaporated, the crude material was purified by flash chromatography on Biotage silica NH cartridge (from cHex to 45% EtOAc) to afford tert-butyl 4-{[(4-bromopyridin-2-yl)carbamoyl]methyl}piperazine-1-carboxylate (150 mg, 0.38 mmol, y=62%) as a white sticky solid.

LC-MS (ESI): m/z (M+1): 399.2 (Method 1)

Intermediate 177: N-(4-bromopyridin-2-yl)-2-(piperazin-1-yl)acetamide

Intermediate 177 was prepared following the procedure used for the synthesis of Intermediate 21 starting from tert-butyl 4-{[(4-bromopyridin-2-yl)carbamoyl]methyl}piperazine-1-carboxylate (Intermediate 176, 140 mg, 0.35 mmol) to afford title compound (104 mg, 0.35 mmol, y=99%).

LC-MS (ESI): m/z (M+1): 299.1 (Method 2)

Intermediate 178: Methyl 2-(4-{[(4-bromopyridin-2-yl)carbamoyl]methyl}piperazin-1-yl)acetate To a solution of N-(4-bromopyridin-2-yl)-2-(piperazin-1-yl)acetamide (Intermediate 177, 104 mg, 0.35 mmol) in DMF (3.5 mL), K₂CO₃ (96 mg, 0.700 mmol) was added followed by the addition of 2-bromoacetic acid methyl ester (0.04 mL, 0.38 mmol). The mixture was stirred at RT for 1.5 hrs. The mixture was poured into saturated NaHCO₃ aqueous solution and extracted with EtOAc. The organic phase was separated, filtered through a hydrophobic phase separator, and concentrated at reduced pressure. The crude was purified by flash chromatography on Biotage silica cartridge (from DCM to 15% MeOH). Proper fractions were evaporated at reduced pressure to provide methyl 2-(4-{[(4-bromopyridin-2-yl)carbamoyl]methyl}piperazin-1-yl)acetate (190 mg, recovery assumed quantitative) as a white solid.

LC-MS (ESI): m/z (M+1): 371.1 (Method 1)

Intermediate 179: Ethyl(2E/Z)-4-[benzyl({2-[(triphenylmethyl)amino]ethyl})amino]but-2-enoate To a solution of N-benzyl-N'-tritylethane-1,2-diamine (1.4 g, 3.57 mmol) in MeCN (10 mL) K₂CO₃ (0.99 g, 7.13 mmol), and ethyl (2E/Z)-4-bromo-2-butenoate (0.49 mL, 3.57 mmol) were added. The mixture was heated at 50° C. for 90 min. EtOAc and water were added, the product was extracted with EtOAc (2×), organic phases were collected, dried, and evaporated, The crude material was purified by flash chromatography on Biotage silica cartridge (from cHex to 10% EtOAc) to afford ethyl (E/Z)-4-[benzyl[2-(tritylamino)ethyl]amino]but-2-enoate (1.57 g, 3.11 mmol, y=87%) as white wax.

LC-MS (ESI): m/z (M+1): 505.1 (Method 1)

Intermediate 180: Methyl 2-(4-benzylpiperazin-2-yl)acetate

HCl 4M in dioxane (3.89 mL, 15.6 mmol) was added to a solution of ethyl (2E/Z)-4-[benzyl({2-[(triphenylmethyl)amino]ethyl})amino]but-2-enoate (Intermediate 179, 1.57 g, 3.11 mmol) in MeOH (6 mL) and the mixture was refluxed for 1 hr. Volatiles were removed under vacuum, the residual material was charged in SCX washed with MeOH and eluted with 1 N NH$_3$ in MeOH. Evaporation of basic fractions afforded methyl 2-(4-benzylpiperazin-2-yl)acetate (560 mg, 2.25 mmol, y=72%) used as such in the next step.

LC-MS (ESI): m/z (M+1): 248.7 (Method 2)

Intermediate 181: Tert-butyl 4-benzyl-2-(2-methoxy-2-oxo ethyl)piperazine-1-carboxylate Di-tert-butyl dicarbonate (591 mg, 2.71 mmol) was added to a solution of methyl 2-(4-benzylpiperazin-2-yl)acetate (Intermediate 180, 560 mg, 2.26 mmol) in DCM (6 mL). The solution was stirred at RT for 1 hr. Volatiles were removed under vacuum. The crude material was purified by flash chromatography on Biotage silica cartridge (from cHex to 15% EtOAc) to afford tert-butyl 4-benzyl-2-(2-methoxy-2-oxoethyl)piperazine-1-carboxylate (410 mg, 1.2 mmol, y=52%) as colorless oil.

LC-MS (ESI): m/z (M+1): 349.2 (Method 1)

Intermediate 182: Tert-butyl 2-(2-methoxy-2-oxoethyl)piperazine-1-carboxylate

A solution of tert-butyl 4-benzyl-2-(2-methoxy-2-oxoethyl)piperazine-1-carboxylate (Intermediate 181, 410 mg, 1.18 mmol) in MeOH (8 mL) was bubbled with N2, then 10% Pd/C (118 mg, 1.18 mmol) was added, the resulting suspension was stirred overnight at RT under H$_2$ atmosphere. The day after catalyst was filtered over Celite® pad, rinsing with MeOH, the solvent was dried under vacuum to afford tert-butyl 2-(2-methoxy-2-oxoethyl)piperazine-1-carboxylate (280 mg, 1.08 mmol, y=92%) as colorless oil.

LC-MS (ESI): m/z (M+1): 259.1 (Method 1)

Intermediate 183: Tert-butyl 4-{2-[(4-bromopyridin-2-yl)carbamoyl]ethyl}-2-(2-methoxy-2-oxoethyl)piperazine-1-carboxylate Intermediate 183 was prepared as described for Intermediate 30, starting from of N-(4-bromopyridin-2-yl)prop-2-enamide (Intermediate 29, 200 mg, 0.88 mmol) and tert-butyl 2-(2-methoxy-2-oxoethyl)piperazine-1-carboxylate (Intermediate 182, 278 mg, 1.07 mmol) to afford title compound (320 mg, 0.53 mmol, 75% yield).

LC-MS (ESI): m/z (M+1): 487.1 (Method 1)

Intermediate 184: Tert-butyl 4-{2-[(4-{[6-(5-chloro-2-fluorophenyl)-3-methylpyridazin-4-yl]amino}pyridin-2-yl)carbamoyl]ethyl}-2-(2-methoxy-2-oxoethyl)piperazine-1-carboxylate Intermediate 184 was prepared following the procedure used for the synthesis of Intermediate 31 starting from tert-butyl 4-{2-[(4-bromopyridin-2-yl)carbamoyl]ethyl}-2-(2-methoxy-2-oxoethyl)piperazine-1-carboxylate (Intermediate 183, 157 mg, 0.32 mmol) and 6-(5-chloro-2-fluorophenyl)-3-methylpyridazin-4-amine (Intermediate 90, 70 mg, 0.29 mmol) to afford title compound (106 mg, 0.16 mmol, 56% yield).

LC-MS (ESI): m/z (M+1): 642.3 (Method 2)

Intermediate 185: Methyl 2-(4-{2-[(4-bromopyridin-2-yl)carbamoyl]ethyl}piperazin-2-yl)acetate Intermediate 185 was prepared following the procedure used for the synthesis of Intermediate 21 starting from tert-butyl 4-{2-[(4-bromopyridin-2-yl)carbamoyl]ethyl}-2-(2-methoxy-2-oxoethyl)piperazine-1-carboxylate (Intermediate 183, 100 mg, 0.20 mmol) to afford title compound (100 mg, recovery assumed quantitative).

LC-MS (ESI): m/z (M+1): 387.1 (Method 2)

Intermediate 186: Methyl 2-(4-{2-[(4-bromopyridin-2-yl)carbamoyl]ethyl}-1-methylpiperazin-2-yl)acetate Intermediate 186 was prepared as described for Intermediate 22, starting from methyl 2-(4-{2-[(4-bromopyridin-2-yl)carbamoyl]ethyl}piperazin-2-yl)acetate (Intermediate 185, 100 mg, 0.20 mmol) and formaldehyde 37% w/w in water (0.03 mL, 0.39 mmol) to afford title compound (100 mg, 0.25 mmol, 97% yield).

LC-MS (ESI): m/z (M+1): 399.1 (Method 1)

Intermediate 187: 1-tert-butyl 2-methyl 4-methylpiperazine-1,2-dicarboxylate

Intermediate 187 was prepared following the procedure used for the synthesis of Intermediate 22 starting from 1-tert-butyl 2-methylpiperazine-1,2-dicarboxylate (200 mg, 0.82 mmol) and formaldehyde 37% w/w in water (0.31 mL, 4.09 mmol) to afford title compound (173 mg, 0.7 mmol, 82% yield).

LC-MS (ESI): m/z (M+1): 259.2 (Method 2)

Intermediate 188: Methyl 4-methylpiperazine-2-carboxylate hydrochloride

Intermediate 188 was prepared following the procedure used for the synthesis of Intermediate 173 starting from 1-tert-butyl 2-methyl 4-methylpiperazine-1,2-dicarboxylate (Intermediate 187, 170 mg, 0.66 mmol) to afford title compound (170 mg, recovery assumed quantitative).

LC-MS (ESI): m/z (M+1): 159.1 (Method 2)

Intermediate 189: Methyl 1-{2-[(4-bromopyridin-2-yl)carbamoyl]ethyl}-4-methylpiperazine-2-carboxylate Intermediate 189 was prepared as described for Intermediate 30, starting from of N-(4-bromopyridin-2-yl)prop-2- enamide (Intermediate 29, 110 mg, 0.48 mmol), methyl 4-methylpiperazine-2-carboxylate hydrochloride (Intermediate 188, 123 mg, mmol), and TEA (0.14 mL, 0.97 mmol) to afford title compound (82 mg, 0.21 mmol, 44% yield).
LC-MS (ESI): m/z (M+1): 385.1 (Method 1)

Intermediate 190: Tert-butyl 4-{2-[(4-bromopyridin-2-yl)carbamoyl]ethyl}-3-(2-methoxy-2-oxoethyl)piperazine-1-carboxylate Intermediate 190 was prepared as described for Intermediate 30, starting from of N-(4-bromopyridin-2-yl)prop-2-enamide (Intermediate 29, 110 mg, 0.48 mmol), commercially available N-4-Boc-2-piperazineacetic acid methyl ester (150 mg, 0.58 mmol), and TEA (0.07 mL, 0.48 mmol) to afford title compound (180 mg, 0.37 mmol, 78% yield).
LC-MS (ESI): m/z (M+1): 485.0 (Method 2)

Intermediate 191: Methyl 2-(1-{2-[(4-bromopyridin-2-yl)carbamoyl]ethyl}piperazin-2-yl)acetate Intermediate 191 was prepared as described for Intermediate 173, starting from tert-butyl 4-{[2-[(4-bromopyridin-2-yl)carbamoyl]ethyl}-3-(2-methoxy-2-oxoethyl)piperazine-1-carboxylate (Intermediate 190, 180 mg, 0.37 mmol) to afford title compound (133 mg, 0.34 mmol, 93% yield).
LC-MS (ESI): m/z (M+1): 384.8 (Method 2)

Intermediate 192: Methyl 2-(1-{2-[(4-bromopyridin-2-yl)carbamoyl]ethyl}-4-methylpiperazin-2-yl)acetate Intermediate 192 was prepared as described for Intermediate 22, starting from methyl 2-(1-{2-[(4-bromopyridin-2-yl)carbamoyl]ethyl}piperazin-2-yl)acetate (Intermediate 191, 130 mg, 0.34 mmol) and formaldehyde 37% w/w in water (0.04 mL, 0.5 mmol) to afford title compound (135 mg, 0.34 mmol, 99% yield).
LC-MS (ESI): m/z (M+1): 399.6 (Method 2)

Intermediate 193: Tert-butyl 4-{2-[(4-{[6-(5-chloro-2-fluorophenyl)-3-methylpyridazin-4-yl]amino}pyridin-2-yl)carbamoyl]ethyl}-3-(2-methoxy-2-oxoethyl)piperazine-1-carboxylate Intermediate 193 was prepared following the procedure used for the synthesis of Intermediate 31 starting from tert-butyl 4-{2[(4-bromopyridin-2-yl)carbamoyl]ethyl}-3-(2-methoxy-2-oxoethyl)piperazine-1-carboxylate (Intermediate 190, 101 mg, 0.21 mmol) and 6-(5-chloro-2-fluorophenyl)-3-methylpyridazin-4-amine (Intermediate 90, 45 mg, 0.19 mmol) to afford title compound (79 mg, 0.12 mmol, 65% yield).
LC-MS (ESI): m/z (M+1): 642.2 (Method 2)

Intermediate 194: N-(4-bromopyridin-2-yl)-3-Piperazin-1-ylpropanamide

Intermediate 194 was prepared following the procedure used for the synthesis of Intermediate 21 starting from tert-butyl 4-{2-[(4-bromopyridin-2-yl)carbamoyl]ethyl}piperazine-1-carboxylate (Intermediate 30, 650 mg, 1.41 mmol) to afford title compound (488 mg, recovery assumed quantitative).
LC-MS (ESI): m/z (M+1): 315.0 (Method 2)

Intermediate 195: Tert-butyl N-[2-(4-{2-[(4-bromopyridin-2-yl)carbamoyl]ethyl}piperazin-1-yl)ethyl]-N-methylcarbamate Intermediate 195 was prepared following the procedure used for the synthesis of Intermediate 22 starting from 1 N-(4-bromopyridin-2-yl)-3-piperazin-1-ylpropanamide (Intermediate 194, 150 mg, 0.48 mmol) and N-boc-(methylamino)acetaldehyde (124 mg, 0.72 mmol) to afford title compound (160 mg, 0.34 mmol, 71% yield).
LC-MS (ESI): m/z (M+1): 470.4 (Method 2)

Intermediate 196: Tert-butyl N-[2-(4-{2-[(4-{[6-(5-chloro-2-fluorophenyl)-3-methylpyridazin-4-yl]amino}pyridin-2-yl)carbamoyl]ethyl}piperazin-1-yl)ethyl]-N-methylcarbamate Intermediate 196 was prepared following the procedure used for the synthesis of Intermediate 31 starting from tert-butyl N-[2-(4-{2-[(4-bromopyridin-2-yl)carbamoyl]ethyl}piperazin-1-yl)ethyl]-N-methylcarbamate (Intermediate 195, 129 mg, 0.27 mmol) and 6-(5-chloro-2-fluorophenyl)-3-methylpyridazin-4-amine (Intermediate 90, 60 mg, 0.25 mmol) to afford title compound (103 mg, 0.16 mmol, 66% yield).
LC-MS (ESI): m/z (M+1): 627.1 (Method 2)

Intermediate 197: Tert-butyl N-[2-(4-{[(4-bromopyridin-2-yl)carbamoyl]methyl}piperazin-1-yl)ethyl]-N-methylcarbamate Intermediate 197 was prepared following the procedure used for the synthesis of Intermediate 22 starting from N-(4-bromopyridin-2-yl)-2-(piperazin-1-yl)acetamide (Intermediate 177, 156 mg, 0.53 mmol) and N-Boc-(methylamino)acetaldehyde (138 mg, 0.8 mmol) to afford title compound (176 mg, 0.38 mmol, 72% yield).
LC-MS (ESI): m/z (M+1): 456.7 (Method 2)

Intermediate 198: Tert-butyl N-[2-(4-{[(4-{[6-(5-chloro-2-fluorophenyl)-3-methylpyridazin-4-yl]amino}pyridin-2-yl)carbamoyl]methyl}piperazin-1-yl)ethyl]-N-methylcarbamate Intermediate 198 was prepared following the procedure used for the synthesis of Intermediate 31 starting from tert-butyl N-[2-(4-{[(4-bromopyridin-2-yl)carbamoyl]methyl}piperazin-1-yl)ethyl]-N-methylcarbamate (Intermediate 197, 169 mg, 0.37 mmol) and 6-(5-chloro-2-fluorophenyl)-3-methylpyridazin-4-amine (Intermediate 90, 80 mg, 0.34 mmol) to afford title compound (110 mg, 0.18 mmol, 53% yield).
LC-MS (ESI): m/z (M+1): 627.1 (Method 2)

Intermediate 199: Tert-butyl N-[2-(4-{[(4-bromopyridin-2-yl)carbamoyl]methyl}piperazin-1-yl)ethyl]carbamate Intermediate 199 was prepared following the procedure used for the synthesis of Intermediate 22 starting from N-(4-bromopyridin-2-yl)-2-(piperazin-1-yl)acetamide (Intermediate 177, 234 mg, 0.78 mmol) and tert-butyl N-(2-oxoethyl)carbamate (372 mg, 2.34 mmol) to afford title compound (179 mg, 0.4 mmol, 52% yield).
LC-MS (ESI): m/z (M+1): 442.3 (Method 2)

Intermediate 200: Tert-butyl N-[2-(4-{[(4-{[6-(5-chloro-2-fluorophenyl)-3-methylpyridazin-4-yl]amino}pyridin-2-yl)carbamoyl]methyl}piperazin-1-yl)ethyl]carbamate Intermediate 200 was prepared following the procedure used for the synthesis of Intermediate 31 starting from tert-butyl N-[2-(4-{[(4-bromopyridin-2-yl)carbamoyl]methyl}piperazin-1-yl)ethyl]carbamate (Intermediate 199, 174 mg, mmol) and 6-(5-chloro-2-fluorophenyl)-3-methylpyridazin-4-amine (Intermediate 90, 85 mg, 0.36 mmol) to afford title compound (65 mg, 0.11 mmol, 30% yield).
LC-MS (ESI): m/z (M+1): 599.5 (Method 2)

Intermediate 201: N-(4-{[6-(5-chloro-2-fluorophenyl)-3-methylpyridazin-4-yl]amino}pyridin-2-yl) prop-2-Enamide A solution of N-(4-{[6-(5-chloro-2-fluorophenyl)-3-methylpyridazin-4-yl]amino}pyridin-2-yl)-3-(4-methylpiperazin-1-yl)propanamide (Example 16, 140 mg, 0.29 mmol) in MeOH (2.43 mL) and $H_2O$ (0.80 mL) was treated with Oxone® (195 mg, 0.64 mmol) and stirred at RT for 2 hrs. The mixture was diluted with water, extracted with EtOAc and washed with saturated $NaHCO_3$ solution. The organic phase was dried with $Na_2SO_4$, filtered, and concentrated under reduced pressure. The crude product was purified by flash chromatography on Biotage silica cartridge (from DCM to 60% MeOH) to afford N-(4-{[6-(5-chloro-2-fluorophenyl)-3-methylpyridazin-4-yl]amino}pyridin-2-yl) prop-2-enamide (21 mg, 0.05 mmol, 19% yield) as an off-white solid.
LC-MS (ESI): m/z (M+1): 384.7 (Method 2)

Intermediate 202: Tert-butyl (1S,4S)-5-{2-[(4-bromopyridin-2-yl)carbamoyl]ethyl}-2,5-diazabicyclo[2.2.1]heptane-2-carboxylate Intermediate 202 was prepared as described for Intermediate 30, starting from of N-(4-bromopyridin-2-yl) prop-2-enamide (Intermediate 29, 200 mg, 0.89 mmol), commercially available tert-butyl (1S,4S)-2,5-diazabicyclo[2.2.1]heptane-2-carboxylate (209 mg, 1.05 mmol), and TEA (0.12 mL, 0.99 mmol) to afford title compound (380 mg, 0.89 mmol, quantitative yield).
LC-MS (ESI): m/z (M+1): 425.3 (Method 2)

Intermediate 203: N-(4-bromopyridin-2-yl)-3-[(1S,4S)-2,5-diazabicyclo[2.2.1]heptan-2-yl]propanamide Intermediate 203 was prepared following the procedure used for the synthesis of Intermediate 173 starting from tert-butyl(1S,4S)-5-{2-[(4-bromopyridin-2-yl)carbamoyl]ethyl}-2,5-diazabicyclo[2.2.1]heptane-2-carboxylate (Intermediate 202, 380 mg, 0.89 mmol) to afford title compound (260 mg, 0.80 mmol, y=89%).
LC-MS (ESI): m/z (M+1): 325.3 (Method 2)

Intermediate 204: N-(4-bromopyridin-2-yl)-3-[(1S,4S)-5-methyl-2,5-diazabicyclo[2.2.1]heptan-2-yl]propanamide Intermediate 204 was prepared following the procedure used for the synthesis of Intermediate 22 starting from N-(4-bromopyridin-2-yl)-3-[(1S,4S)-2,5-diazabicyclo[2.2.1]heptan-2-yl]propanamide (Intermediate 203, 260 mg, 0.80 mmol) and formaldehyde 37% w/w in water (0.30 mL, 4 mmol) to afford title compound (215 mg, 0.63 mmol, y=79%).
LC-MS (ESI): m/z (M+1): 340.9 (Method 2)

Intermediate 205: 8-tert-butyl 2-(4-{[6-(5-chloro-2-fluorophenyl)pyridazin-4-yl]amino}quinolin-7-yl) 2,8-diazaspiro[4.5]decane-2,8-dicarboxylate DIPEA (0.15 mL, 0.87 mmol) was added to a stirred mixture of tert-butyl 2,8-diazaspiro[4.5]decane-8-carboxylate (105 mg, 0.44 mmol) and 4-{[6-(5-chloro-2-fluorophenyl)pyridazin-4-yl]amino}quinolin-7-ol hydrobromide (Intermediate 101, 150 mg, 0.29 mmol) in DCM (10 mL) and DMSO (1 mL) at RT. After 5 minutes the mixture was cooled at 5° C. and 4-nitrophenyl carbonochloridate (88 mg, 0.44 mmol) was added. After 30 minutes the reaction was warmed at RT. After 4 hrs the mixture was diluted with DCM, washed with water and $NaHCO_3$ aqueous solution. Organic layer was separated, dried over $Na_2SO_4$, filtered, and evaporated. The residue was purified by flash chromatography on Biotage silica NH cartridge (from DCM to 3% MeOH/0.3% $H_2O$) to afford 8-tert-butyl 2-(4-{[6-(5-chloro-2-fluorophenyl)pyridazin-4-yl]amino}quinolin-7-yl) 2,8-diazaspiro[4.5]decane-2,8-dicarboxylate (120 mg, 0.19 mmol, y=65%).
LC-MS (ESI): m/z (M+1): 633.4 (Method 2)

Intermediate 206: 1-tert-butyl 3-methyl 4-(Propan-2-yl)piperazine-1,3-dicarboxylate In a suitable vial, to a stirred suspension of methyl-4-Boc-piperazine-2-carboxylate (300 mg, 1.23 mmol) and $K_2CO_3$ (271 mg, 1.96 mmol) in MeCN (2 mL), 2-iodopropane (0.16 mL, 1.6 mmol) was added. The vial was capped and heated at ° C. (external temperature) overnight. Further $K_2CO_3$ (271 mg, 1.96 mmol) and 2-iodopropane (0.16 mL, 1.6 mmol) were added again and heated at the same temperature for additional 8 hrs. The mixture was diluted with DCM and solids were filtered off and washed with more DCM. The filtrate was evaporated under vacuum. The crude material was purified by flash chromatography on Biotage silica cartridge (from DCM to 5% MeOH) to afford 1-tert-butyl 3-methyl 4-(propan-2-yl)piperazine-1,3-dicarboxylate (292 mg, 1.02 mmol, y=83%) as pale yellow oil.
LC-MS (ESI): m/z (M+1): 287.6 (Method 2)

Intermediate 207: Methyl 1-(Propan-2-yl)piperazine-2-carboxylate dihydrochloride Intermediate 207 was prepared following the procedure used for the synthesis of Intermediate 173 starting from 1-tert-butyl 3-methyl 4-(propan-2-yl)piperazine-1,3-dicarboxylate (Intermediate 206, 290 mg, 1.01 mmol) to afford title compound (400 mg, recovery assumed quantitative).
LC-MS (ESI): m/z (M+1): 187.0 (Method 2)

Intermediate 208: Methyl 4-{2-[(4-bromopyridin-2-yl)carbamoyl]ethyl}-1-(propan-2-yl)piperazine-2-carboxylate Intermediate 208 was prepared as described for Intermediate 30, starting from of N-(4-bromopyridin-2-yl) prop-2-enamide (Intermediate 29, 200 mg, 0.89 mmol), methyl 1-(propan-2-yl)piperazine-2-carboxylate dihydrochloride (Intermediate 207, 1.06 mmol), and TEA (0.25 mL, 1.76 mmol) to afford title compound (211 mg, 0.51 mmol, y=58%).

LC-MS (ESI): m/z (M+1): 413.4 (Method 2)

Intermediate 209: Tert-butyl 2-methyl-2,7-diazaspiro[3.5]nonane-7-carboxylate

Intermediate 209 was prepared following the procedure used for the synthesis of Intermediate 22 starting from tert-butyl 2,7-diazaspiro[3.5]nonane-7-carboxylate (327 mg, 1.44 mmol) and formaldehyde 37% w/w in water (0.27 mL, 3.6 mmol) to afford title compound (244 mg, 1.02 mmol, 70% yield).

LC-MS (ESI): m/z (M+1): 241.2 (Method 1)

Intermediate 210: 2-methyl-2,7-diazaspiro[3.5]nonane dihydrochloride

Intermediate 210 was prepared following the procedure used for the synthesis of Intermediate 173 starting from tert-butyl 2-methyl-2,7-diazaspiro[3.5]nonane-7-carboxylate (Intermediate 209, 244 mg, 1.01 mmol) to afford title compound (202 mg, 0.95 mmol, y=94%).

$^1$H NMR (400 MHz, Methanol-d4) δ ppm 4.07 (s, 4H), 3.20 (t, J=5.9 Hz, 4H), 2.96 (s, 3H), 2.17-2.10 (m, 4H).

Intermediate 211: Tert-butyl 7-methyl-2,7-diazaspiro[3.5]nonane-2-carboxylate

Intermediate 211 was prepared following the procedure used for the synthesis of Intermediate 22 starting from tert-butyl 2,7-diazaspiro[3.5]nonane-2-carboxylate (1.05 g, 4.63 mmol) and formaldehyde 37% w/w in water (348 mL, 46.31 mmol) to afford title compound (718 mg, 2.99 mmol, y=64%).

LC-MS (ESI): m/z (M+1): 241.2 (Method 2)

Intermediate 212: 7-methyl-2,7-diazaspiro[3.5]nonane dihydrochloride

Intermediate 212 was prepared following the procedure used for the synthesis of Intermediate 173 starting from tert-butyl 7-methyl-2,7-diazaspiro[3.5]nonane-2-carboxylate (Intermediate 211, 718 mg, 2.99 mmol) to afford title compound (620 mg, 2.9 mmol, y=97%).

$^1$H NMR (500 MHz, Methanol-d4) δ ppm 3.82-4.10 (m, 4H), 3.48 (br. s, 2H), 3.05 (br. s, 2H), 2.86 (s, 3H), 2.32 (br. s, 2H), 2.04 (br. s, 2H).

Intermediate 213: N-(4-bromopyridin-2-yl)-2-(morpholin-4-yl)acetamide

Intermediate 213 was prepared following the procedure used for the synthesis of Intermediate 176 starting from N-(4-bromopyridin-2-yl)-2-chloroacetamide (Intermediate 159, 250 mg, 1 mmol) and morpholine (0.13 mL, 1.5 mmol) to afford title compound (200 mg, 0.67 mmol, y=66%).

LC-MS (ESI): m/z (M+1): 302.1 (Method 1)

Intermediate 214: N-(4-bromopyridin-2-yl)-3-(thiomorpholin-4-yl)propanamide

Intermediate 214 was prepared following the procedure used for the synthesis of Intermediate 30 starting from N-(4-bromopyridin-2-yl)prop-2-enamide (Intermediate 29, 150 mg, 0.66 mmol), and thiomorpholine (154 mg, 1.49 mmol) to afford title compound (174 mg, 0.53 mmol, 80% yield).

LC-MS (ESI): m/z (M+1): 332.0 (Method 1)

Intermediate 215: 2-methyl-2,5-diazabicyclo[2.2.1]heptane dihydrochloride 2-methyl-2,5-diazabicyclo[2.2.1]heptane dihydrobromide (500 mg, 1.82 mmol) was charged in a SCX and eluted with 1 N NH$_3$ in MeOH. The fractions were concentrated under reduced pressure and then treated with HCl (4 N in dioxane) (1.82 mL, 7.3 mmol). The mixture was concentrated under reduced pressure to afford 2-methyl-2,5-diazabicyclo[2.2.1]heptane dihydrochloride (140 mg, 0.76 mmol, y=41%) as white solid.

LC-MS (ESI): m/z (M+1): 113.0 (Method 1)

Intermediate 216: N-(4-bromopyridin-2-yl)-3-{5-methyl-2,5-diazabicyclo[2.2.1]heptan-2-yl}propanamide Intermediate 216 was prepared following the procedure used for the synthesis of Intermediate 30 starting from N-(4-bromopyridin-2-yl)prop-2-enamide (Intermediate 29, 60 mg, 0.26 mmol), 2-methyl-2,5-diazabicyclo[2.2.1]heptane dihydrochloride (Intermediate 215, 59 mg, 0.32 mmol) and TEA (0.11 mL, 0.79 mmol) to afford title compound (78 mg, 0.23 mmol, 87% yield).

LC-MS (ESI): m/z (M+1): 340.9 (Method 2)

Intermediate 217: (1R,4R)-2-(1H-imidazole-1-carbonyl)-5-methyl-2,5-diazabicyclo[2.2.1]heptane To a stirred suspension of (1R,4R)-2-methyl-2,5-diazabicyclo[2.2.1]heptane dihydrochloride (200 mg, 1.08 mmol) and 1,1'-carbonyldiimidazole (192.73 mg, 1.19 mmol) in DCM (5.4 mL), TEA (0.31 mL, 2.22 mmol) was added and the reaction was stirred at RT overnight. The mixture was diluted with water, the pH adjusted to ~9 using saturated Na$_2$CO$_3$ solution. The phases were separated, and the aqueous one was extracted with DCM (2×). The combined organic layers were filtered through a phase separator and concentrated under vacuum to afford (1R,4R)-2-(1H-imidazole-1-carbonyl)-5-methyl-2,5-diazabicyclo[2.2.1]heptane (225 mg, 1.08 mmol, quantitative yield) as pale yellow oil.

LC-MS (ESI): m/z (M+1): 207.0 (Method 2)

Intermediate 218: N-(4-bromopyridin-2-yl)-2-[4-(2,2,2-trifluoroethyl)piperazin-1-yl]acetamide Intermediate 218 was prepared following the procedure used for the synthesis of Intermediate 69 starting from N-(4-bromopyridin-2-yl)-2-(piperazin-1-yl)acetamide (Intermediate 177, 200 mg, 0.67 mmol), and TEA (0.14 mL, 1 mmol) at RT to afford title compound (204 mg, 0.53 mmol, 80% yield).

LC-MS (ESI): m/z (M+1): 381.3 (Method 2)

Intermediate 219: N-(4-bromopyridin-2-yl)-3-(1,1-dioxo-1λ$^6$-thiomorpholin-4-yl)propanamide Intermediate 219 was prepared following the procedure used for the synthesis of Intermediate 30 starting from N-(4-bromopyridin-2-yl)prop-2-enamide (Intermediate 29, 150 mg, 0.66 mmol), and thiomorpholine-1,1-dioxide (135 mg, 3.5 mmol) in MeCN at reflux to afford title compound (225 mg, 0.62 mmol, 94% yield).

LC-MS (ESI): m/z (M+1): 364.0 (Method 1)

Intermediate 220: 1-(azetidin-3-yl)pyrrolidine 1-(azetidin-3-yl)pyrrolidine dihydrochloride (150 mg, 0.75 mmol) was dissolved in MeOH and charged on SCX (2 g, washing with MeOH, and eluting with 1 N $NH_3$ in MeOH). Basic fractions were evaporated to afford 1-(azetidin-3-yl)pyrrolidine (:49 mg, 0.39 mmol, 51% yield) as pale yellow oil.

LC-MS (ESI): m/z (M+1): 127.0 (Method 2)

Intermediate 221: Tert-butyl 7-{2-[(4-bromopyridin-2-yl)carbamoyl]ethyl}-4,7-diazaspiro[2.5]octane-4-carboxylate Intermediate 221 was prepared following the procedure used for the synthesis of Intermediate 30 starting from N-(4-bromopyridin-2-yl)prop-2-enamide (Intermediate 29, 200 mg, 0.88 mmol), tert-butyl 4,7-diazaspiro[2.5]octane-4-carboxylate (243 mg, 1.15 mmol) and TEA (0.24 mL, 1.76 mmol) in MeOH to afford title compound (360 mg, 0.82 mmol, 93% yield).

LC-MS (ESI): m/z (M+1): 439.1 (Method 2)

Intermediate 222: N-(4-bromopyridin-2-yl)-3-{4,7-diazaspiro[2.5]octan-7-yl}propanamide Intermediate 222 was prepared following the procedure used for the synthesis of Intermediate 21 starting from tert-butyl 7-{2-[(4-bromopyridin-2-yl)carbamoyl]ethyl}-4,7-diazaspiro[2.5]octane-4-carboxylate (Intermediate 221, 360 mg, 0.82 mmol) to afford title compound (277 mg, quantitative yield).

LC-MS (ESI): m/z (M+1): 339.1 (Method 2)

Intermediate 223: N-(4-bromopyridin-2-yl)-3-{4-methyl-4,7-diazaspiro[2.5]octan-7-yl}propanamide Intermediate 223 was prepared following the procedure used for the synthesis of Intermediate 22 starting from N-(4-bromopyridin-2-yl)-3-{4,7-diazaspiro[2.5]octan-7-yl}propanamide (Intermediate 222, 277 mg, 0.82 mmol) and formaldehyde 37% w/w in water (0.09 mL, 1.22 mmol) to afford title compound (256 mg, 0.72 mmol, 89% yield).

LC-MS (ESI): m/z (M+1): 353.0 (Method 2)

Intermediate 224: N-(4-bromopyridin-2-yl)-3-{6-methyl-2,6-diazaspiro[3.3]heptan-2-yl}propanamide Intermediate 224 was prepared following the procedure used for the synthesis of Intermediate 30 starting from N-(4-bromopyridin-2-yl)prop-2-enamide (Intermediate 29, 150 mg, 0.66 mmol), 2-methyl-2,6-diazaspiro[3.3]heptane dihydrochloride (146 mg, 1.2 mmol) and TEA (0.32 mL, 2.31 mmol) in MeOH to afford title compound (100 mg, 0.29 mmol, 47% yield).

LC-MS (ESI): m/z (M+1): 339.1 (Method 2)

Intermediate 225: N-(4-bromopyridin-2-yl)-3-(4,4-difluoropiperidin-1-yl)propanamide Intermediate 225 was prepared following the procedure used for the synthesis of Intermediate 30 starting from N-(4-bromopyridin-2-yl)prop-2-enamide (Intermediate 29, 200 mg, 0.88 mmol), 4,4-difluoropiperidine hydrochloride (166 mg, 1.06 mmol) and TEA (0.24 mL, 1.76 mmol) in MeOH to afford title compound (288 mg, 0.83 mmol, 94% yield).

LC-MS (ESI): m/z (M+1): 348.0 (Method 2)

Intermediate 226: N-(4-bromopyridin-2-yl)-3-(4-hydroxypiperidin-1-yl)propanamide Intermediate 226 was prepared following the procedure used for the synthesis of Intermediate 30 starting from N-(4-bromopyridin-2-yl)prop-2-enamide (Intermediate 29, 100 mg, 0.44 mmol), 4-piperidinol (53 mg, 0.53 mmol) and TEA (0.12 mL, 0.88 mmol) in MeOH to afford title compound (110 mg, 0.33 mmol, 76% yield).

LC-MS (ESI): m/z (M+1): 328.0 (Method 2)

Intermediate 227: N-(4-bromopyridin-2-yl)-2-{6-methyl-2,6-diazaspiro[3.3]heptan-2-yl}acetamide TEA (0.87 mL, 6.25 mmol) was added to a stirred solution of 2-methyl-2,6-diazaspiro[3.3]heptane dihydrochloride (386 mg, 2.08 mmol) in dry MeCN (8 mL) at RT under $N_2$. After 10 minutes the reaction was cooled with an ice bath, and N-(4-bromopyridin-2-yl)-2-chloroacetamide (Intermediate 159, 350 mg, 1.39 mmol) was added followed by catalytic amount of potassium iodide. The reaction mixture was allowed to reach RT and stirred for 2 hrs at this temperature. Water and EtOAc were added, the organic phases were separated, and the aqueous phase was extracted with EtOAc. The combined organics were dried over $Na_2SO_4$ and filtered. The solvent was evaporated, and the crude material was purified by flash chromatography on Biotage silica NH cartridge (from cHex to 45% EtOAc) to afford N-(4-bromopyridin-2-yl)-2-{6-methyl-2,6-diazaspiro[3.3]heptan-2-yl}acetamide (330 mg, 1.01 mmol, y=73%).

LC-MS (ESI): m/z (M+1): 327.0 (Method 2)

Intermediate 228: Tert-butyl 7-{[(4-bromopyridin-2-yl)carbamoyl]methyl}-4,7-diazaspiro[2.5]octane-4-carboxylate A solution of N-(4-bromopyridin-2-yl)-2-chloroacetamide (Intermediate 159, 250 mg, 1 mmol), 4-boc-4,7-diazaspiro[2.5]octane (255 mg, 1.2 mmol) and DIPEA (0.35 mL, 2 mmol) in dry DCM (10 mL) was stirred at RT for 48 hrs. The conversion was almost complete, so the mixture was stirred at 40° C. for 16 hrs. The mixture was then washed with water and with brine. The organic solvent was separated, dried over $Na_2SO_4$, and filtered. The solvent was evaporated to afford tert-butyl 7-{[(4-bromopyridin-2-yl)carbamoyl]methyl}-4,7-diazaspiro[2.5]octane-4-carboxylate (450 mg, recovery assumed quantitative) as a yellow crude which was not purified any further.

LC-MS (ESI): m/z (M+1): 425.1 (Method 1)

Intermediate 229: N-(4-bromopyridin-2-yl)-2-{4,7-diazaspiro[2.5]octan-7-yl}acetamide Intermediate 229 was prepared following the procedure used for the synthesis of Intermediate 21 starting from tert-butyl 7-{[(4-bromopyridin-2-yl)carbamoyl]methyl}-4,7-diazaspiro[2.5]octane-4-carboxylate (Intermediate 228, 450 mg, 1 mmol) to afford title compound (322 mg, 0.99 mmol, y=94%).

LC-MS (ESI): m/z (M+1): 325.0 (Method 2)

Intermediate 230: N-(4-bromopyridin-2-yl)-2-{4-methyl-4,7-diazaspiro[2.5]octan-7-yl}acetamide Intermediate 230 was prepared following the procedure used for the synthesis of Intermediate 22 starting from N-(4-bromopyridin-2-yl)-2-{4,7-diazaspiro[2.5]octan-7-yl}acetamide (Intermediate 229, 322 mg, 0.99 mmol) and formaldehyde 37% w/w in water (0.11 mL, 1.48 mmol) to afford title compound (218 mg, 0.64 mmol, 65% yield).

LC-MS (ESI): m/z (M+1): 330.0 (Method 1)

Intermediate 231: N-(4-bromopyridin-2-yl)-3-(3,4-dimethylpiperazin-1-yl)propanamide Intermediate 231 was prepared following the procedure used for the synthesis of Intermediate 30 starting from N-(4-bromopyridin-2-yl)prop-2-enamide (Intermediate 29, 200 mg, 0.88 mmol), 1,2-dimethyl-piperazine (160 mg, 1.41 mmol) and TEA (0.18 mL, 1.32 mmol) to afford title compound (297 mg, 0.87 mmol, 99% yield).

LC-MS (ESI): m/z (M+1): 341.0 (Method 2)

Intermediate 232: Tert-butyl 3-{2-[(4-bromopyridin-2-yl)carbamoyl]ethyl}-3,6-diazabicyclo[3.1.1]heptane-6-carboxylate Intermediate 232 was prepared following the procedure used for the synthesis of Intermediate 30 starting from N-(4-bromopyridin-2-yl)prop-2-enamide (Intermediate 29, 200 mg, 0.88 mmol), tert-butyl 3,6-diazabicyclo[3.1.1]heptane-6-carboxylate (262 mg, 1.32 mmol) and TEA (0.24 mL, 1.76 mmol) to afford title compound (395 mg, recovery assumed quantitative).

LC-MS (ESI): m/z (M+1): 425.1 (Method 1)

Intermediate 233: N-(4-bromopyridin-2-yl)-3-{3,6-diazabicyclo[3.1.1]heptan-3-yl}propanamide HCl, 4 M in dioxane (1.18 mL, 4.7 mmol) and MeOH (0.392 mL) were added to tert-butyl 3-{2-[(4-bromopyridin-2-yl)carbamoyl]ethyl}-3,6-diazabicyclo[3.1.1]heptane-6-carboxylate (Intermediate 232, 200 mg, 0.47 mmol). The mixture was stirred at RT for 3 hrs. Volatiles were removed under vacuum. The residue was treated with s.s. of NaHCO₃ and extracted with DCM 3×. The aqueous phase was further extracted with EtOAc (3×). Combined organic layers were filtered through a phase separator and evaporated under vacuum to afford N-(4-bromopyridin-2-yl)-3-{3,6-diazabicyclo[3.1.1]heptan-3-yl}propanamide (140 mg, mmol, 92% yield) as white solid.

LC-MS (ESI): m/z (M+1): 325.0 (Method 1)

Intermediate 234: N-(4-bromopyridin-2-yl)-3-{6-methyl-3,6-diazabicyclo[3.1.1]heptan-3-yl}propanamide Intermediate 234 was prepared following the procedure used for the synthesis of Intermediate 22 starting from N-(4-bromopyridin-2-yl)-3-{3,6-diazabicyclo[3.1.1]heptan-3-yl}propanamide (Intermediate 233, 140 mg, 0.43 mmol) and formaldehyde 37% w/w in water (0.05 mL, 0.65 mmol) to afford title compound (121 mg, 0.36 mmol, 83% yield).

LC-MS (ESI): m/z (M+1): 339.0 (Method 2)

Intermediate 235: Tert-butyl 8-{2-[(4-bromopyridin-2-yl)carbamoyl]ethyl}-5-oxa-2,8-diazaspiro[3.5]nonane-2-carboxylate Intermediate 235 was prepared following the procedure used for the synthesis of Intermediate 30 starting from N-(4-bromopyridin-2-yl)prop-2-enamide (Intermediate 29, 150 mg, 0.66 mmol), tert-butyl 5-oxa-2,8-diazaspiro[3.5]nonane-2-carboxylate (196 mg, 0.86 mmol) and TEA (0.14 mL, 0.99 mmol) to afford title compound (364 mg, recovery assumed quantitative).

LC-MS (ESI): m/z (M+1): 455.1 (Method 2)

Intermediate 236: N-(4-bromopyridin-2-yl)-3-{5-oxa-2,8-diazaspiro[3.5]nonan-8-yl}propanamide Intermediate 236 was prepared following the procedure used for the synthesis of Intermediate 233 starting from tert-butyl 8-{2[(4-bromopyridin-2-yl)carbamoyl]ethyl}-5-oxa-2,8-diazaspiro[3.5]nonane-2-carboxylate (Intermediate 235, 364 mg, 0.66 mmol, former step recovery assumed quantitative) to afford title compound (215 mg, 0.60 mmol, 92% yield).

LC-MS (ESI): m/z (M+1): 355.0 (Method 2)

Intermediate 237: N-(4-bromopyridin-2-yl)-3-{2-methyl-5-oxa-2,8-diazaspiro[3.5]nonan-8-yl}propanamide Intermediate 237 was prepared following the procedure used for the synthesis of Intermediate 22 starting from N-(4-bromopyridin-2-yl)-3-{5-oxa-2,8-diazaspiro[3.5]nonan-8-yl}propanamide (Intermediate 236, 215 mg, 0.60 mmol) and formaldehyde 37% w/w in water (0.07 mL, 0.91 mmol) to afford title compound (106 mg, 0.29 mmol, 48% yield).

LC-MS (ESI): m/z (M+1): 368.6 (Method 2)

Intermediate 238: Tert-butyl 2-methyl-2,8-diazaspiro[4.5]decane-8-carboxylate

Intermediate 238 was prepared following the procedure used for the synthesis of Intermediate 22 starting from tert-butyl 2,8-diazaspiro[4.5]decane-8-carboxylate (3.16 g, 13.15 mmol) and formaldehyde 37% w/w in water (4.95 mL, 65.77 mmol) to afford title compound (1.37 g, 5.41 mmol, 41% yield).

LC-MS (ESI): m/z (M+1): 255.4 (Method 2)

Intermediate 239: 2-methyl-2,8-diazaspiro[4.5]decane dihydrochloride

Intermediate 239 was prepared following the procedure used for the synthesis of Intermediate 173 starting from tert-butyl 2-methyl-2,8-diazaspiro[4.5]decane-8-carboxylate (Intermediate 238, 1.37 g, 5.4 mmol) to afford title compound (912 mg, 4 mmol, 74% yield).

¹H NMR (500 MHz, Methanol-d₄) δ ppm 3.76 (ddd, J=11.7, 7.8, 3.9 Hz, 1H), 3.69 (d, J=12.1 Hz, 1H), 3.18-3.29 (m, 5H), 3.04 (d, J=12.1 Hz, 1H), 2.97 (s, 3H), 2.15-2.26 (m, 1H), 1.87-2.10 (m, 5H).

Intermediate 240: N-(4-bromopyridin-2-yl)-2-methyl-2,8-diazaspiro[4.5]decane-8-carboxamide Intermediate 240 was prepared following the procedure used for the synthesis of Intermediate 154 starting from N-(4-bromopyridin-2-yl)-2,2,2-trichloroacetamide (Intermediate 153, 200 mg, 0.63 mmol), and 2-methyl-2,8-diazaspiro[4.5]decane dihydrochloride (Intermediate 239, 157 mg, 0.69 mmol) to afford title compound (103 mg, 0.29 mmol, 46% yield).

LC-MS (ESI): m/z (M+1): 353.1 (Method 1)

Intermediate 241: N-{4-[(6-chloro-3-methylpyridazin-4-yl)amino]pyridin-2-yl}-3-(4-methylpiperazin-1-yl)propanamide N-(4-bromopyridin-2-yl)-3-(4-methylpiperazin-1-yl)propanamide (Intermediate 32, 752 mg, 2.3 mmol), $Cs_2CO_3$ (1.37 g, 4.18 mmol), Xantphos (145 mg, 0.25 mmol) 6-chloro-3-methylpyridazin-4-amine (300 mg, 2.09 mmol) were mixed in dioxane 4 mL and degassed 5 min with N2, then $Pd(OAc)_2$ (23.67 mg, 0.100 mmol) was added. The resulting reaction mixture heated at 100° C. for 2 hrs. Solids were filtered washing with EtOAc, volatiles were removed under vacuum and the residue was purified by flash chromatography on Biotage silica NH cartridge (from 20% cHex to 10% MeOH in EtOAc) to afford N-{4-[(6-chloro-3-methylpyridazin-4-yl)amino]pyridin-2-yl}-3-(4-methylpiperazin-1-yl)propanamide (610 mg, 1.56 mmol, 75% yield) as foam.

LC-MS (ESI): m/z (M+1): 390.9 (Method 2)

Intermediate 242: Tert-butyl 4-{[(4-bromopyridin-2-yl)carbamoyl]methyl}-1,4-diazepane-1-carboxylate Intermediate 242 was prepared following the procedure used for the synthesis of Intermediate 176 starting from N-(4-bromopyridin-2-yl)-2-chloroacetamide (Intermediate 159, 600 mg, 2.4 mmol) and tert-butyl 1,4-diazepane-1-carboxylate (722 mg, 3.6 mmol) to afford title compound (740 mg, 1.79 mmol, y=40%).

LC-MS (ESI): m/z (M+1): 414.3 (Method 2)

Intermediate 243: Tert-butyl 4-{[(4-{[6-(5-chloro-2-fluorophenyl)-3-methylpyridazin-4-yl]amino}pyridin-2-yl)carbamoyl]methyl}-1,4-diazepane-1-carboxylate Intermediate 243 was prepared following the procedure used for the synthesis of Intermediate 31 starting from tert-butyl 4-{[(4-bromopyridin-2-yl)carbamoyl]methyl}-1,4-diazepane-1-carboxylate (Intermediate 242, 140 mg, mmol) and 6-(5-chloro-2-fluorophenyl)-3-methylpyridazin-4-amine (Intermediate 90, 70 mg, 0.29 mmol) to afford title compound (80 mg, 0.14 mmol, 48% yield) as yellow solid.

LC-MS (ESI): m/z (M+1): 570.2 (Method 1)

Intermediate 244: Ethyl 1-(2-{[(tert-butoxy)carbonyl](methyl)amino}ethyl)-1H-pyrazole-4-carboxylate Diisopropyl azodicarboxylate (1.73 mL, 8.8 mmol) was added dropwise to a stirred mixture of tert-butyl N-(2-hydroxyethyl)-N-methylcarbamate (1.5 g, 8.56 mmol), ethyl 1H-pyrazole-4-carboxylate (800 mg, 5.61 mmol) and $PPh_3$ (2.32 g, 8.65 mmol) in THF (20 mL) at 0° C. then the reaction mixture was heated to 55° C. and stirred at this temperature for 2 hrs. The reaction mixture was concentrated under reduced pressure. The crude material was purified by flash chromatography on Biotage silica cartridge (from cHex to 45% EtOAc) to afford ethyl 1-(2-{[(tert-butoxy)carbonyl](methyl)amino}ethyl)-1H-pyrazole-4-carboxylate (1.42 g, 4.77 mmol, 84% yield) as pale yellow solid.

LC-MS (ESI): m/z (M+1): 298.2 (Method 1)

Intermediate 245: Tert-butyl N-(2-{4-[(4-bromopyridin-2-yl)carbamoyl]-1H-pyrazol-1-yl}ethyl)-N-methylcarbamate To a stirred solution of 4-bromopyridin-2-amine (585 mg, 3.38 mmol) in THF (13 mL), at −78° C. and under a $N_2$, N-Butyl lithium 1.6 N in hexanes (1.85 mL, 2.96 mmol) was added portion-wise over 10 min then the reaction mixture was stirred at −78° C. for 1 h. A solution of ethyl 1-(2-{[(tert-butoxy)carbonyl](methyl)amino}ethyl)-1H-pyrazole-4-carboxylate (Intermediate 244, 400 mg, 1.35 mmol) in THF (6 mL) was added portion-wise over 10 min at −78° C. After 5 min the cooling bath was removed, and the resulting reaction mixture was stirred overnight at RT. The mixture was diluted with MeOH and concentrated under reduced pressure. The crude material was purified by flash chromatography on Biotage silica cartridge (from cHex to 95% EtOAc), then it was further purified by flash chromatography on Biotage silica cartridge (from cHex to 90% EtOAc) to afford tert-butyl N-(2-{4-[(4-bromopyridin-2-yl)carbamoyl]-1H-pyrazol-1-yl}ethyl)-N-methylcarbamate (94 mg, 0.22 mmol, 16% yield) as pale yellow oil.

LC-MS (ESI): m/z (M+1): 425.5 (Method 2)

Intermediate 246: Tert-butyl N-(2-{4-[(4-{[6-(5-chloro-2-fluorophenyl)-3-methylpyridazin-4-yl]amino}pyridin-2-yl)carbamoyl]-1H-pyrazol-1-yl}ethyl)-N-methylcarbamate Intermediate 246 was prepared following the procedure used for the synthesis of Intermediate 31 starting from tert-butyl N-(2-{4-[(4-bromopyridin-2-yl)carbamoyl]-1H-pyrazol-1-yl}ethyl)-N-methylcarbamate (Intermediate 245, 94 mg, 0.22 mmol) and 6-(5-chloro-2-fluorophenyl)-3-methylpyridazin-4-amine (Intermediate 90, 64 mg, 0.27 mmol) to afford title compound (71 mg, 0.12 mmol, 55% yield).

LC-MS (ESI): m/z (M+1): 581.3 (Method 1)

Intermediate 247: N-(4-bromopyridin-2-yl)-2-(1-methylpiperidin-4-yl)acetamide

Intermediate 247 was prepared following the procedure used for the synthesis of Intermediate 245 starting from ethyl 2-(1-methylpiperidin-4-yl)acetate (150 mg, mmol) and of 4-bromopyridin-2-amine (350 mg, 2.02 mmol) to afford title compound (100 mg, 0.32 mmol, 40% yield).

LC-MS (ESI): m/z (M+1): 312.0 (Method 2)

Intermediate 248: Tert-butyl 4-{3-[(4-bromopyridin-2-yl)carbamoyl]propyl}-1,4-diazepane-1-carboxylate Intermediate 248 was prepared following the procedure used for the synthesis of Intermediate 140 starting from N-(4-bromopyridin-2-yl)-4-chlorobutanamide (Intermediate 41, 350 mg, 1.26 mmol), and tert-butyl 1,4-diazepane- 1-carboxylate (758 mg, 3.78 mmol) to afford title compound (260 mg, 0.59 mmol, y=47%).

LC-MS (ESI): m/z (M+1): 441.2 (Method 1)

Intermediate 249: Tert-butyl 4-{3-[(4-{[6-(5-chloro-2-fluorophenyl)-3-methylpyridazin-4-yl]amino}pyridin-2-yl)carbamoyl]propyl}-1,4-diazepane-1-carboxylate Intermediate 249 was prepared following the procedure used for the synthesis of Intermediate 112 at 120° C. starting from tert-butyl 4-{3-[(4-bromopyridin-2-yl)carbamoyl]propyl}-1,4-diazepane-1-carboxylate (Intermediate 248, 167 mg, 0.38 mmol) and 6-(5-chloro-2-fluorophenyl)-3-methylpyridazin-4-amine (Intermediate 75 mg, 0.32 mmol) to afford title compound (140 mg, 0.23 mmol, y=74%).

LC-MS (ESI): m/z (M+1): 598.2 (Method 1)

Intermediate 250: Tert-butyl 4-{2-[(4-bromopyridin-2-yl)carbamoyl]ethyl}-3-(hydroxymethyl)piperazine-1-carboxylate Intermediate 250 was prepared as described for Intermediate 30, starting from of N-(4-bromopyridin-2-yl)prop-2-enamide (Intermediate 29, 250 mg, 1.10 mmol), and commercially available tert-butyl 3-(hydroxymethyl)piperazine-1-carboxylate (310 mg, 1.4 mmol), to afford title compound (410 mg, 0.92 mmol, 84% yield).

LC-MS (ESI): m/z (M+1): 444.6 (Method 2)

Intermediate 251: Tert-butyl 4-{2-[(4-{[6-(5-chloro-2-fluorophenyl)-3-methylpyridazin-4-yl]amino}pyridin-2-yl)carbamoyl]ethyl}-3-(hydroxymethyl)piperazine-1-carboxylate Intermediate 251 was prepared following the procedure used for the synthesis of Intermediate 31 starting from tert-butyl 4-{2-[(4-bromopyridin-2-yl)carbamoyl]ethyl}-3-(hydroxymethyl)piperazine-1-carboxylate (Intermediate 250, 182 mg, 0.41 mmol) and 6-(5-chloro-2-fluorophenyl)-3-methylpyridazin-4-amine (Intermediate 90, 85 mg, 0.36 mmol) to afford title compound (70 mg, 0.12 mmol, 33% yield).

LC-MS (ESI): m/z (M+1): 600.3 (Method 2)

Intermediate 252: N-(4-{[6-(5-chloro-2-fluorophenyl)-3-methylpyridazin-4-yl]amino}pyridin-2-yl)-3-[2-(hydroxymethyl)piperazin-1-yl]propanamide Intermediate 252 was prepared following the procedure used for the synthesis of Intermediate 21 starting from tert-butyl 4-{2-[(4-{[6-(5-chloro-2-fluorophenyl)-3-methylpyridazin-4-yl]amino}pyridin-2-yl)carbamoyl]ethyl}-3-(hydroxymethyl)piperazine-1-carboxylate (Intermediate 251, 70 mg, 0.12 mmol) to afford title compound (40 mg, 0.08 mmol. y=67%).

LC-MS (ESI): m/z (M+1): 500.2 (Method 2)

Intermediate 253: Tert-butyl 4-{[(4-{[6-(5-chloro-2-fluorophenyl)-3-methylpyridazin-4-yl]amino}pyridin-2-yl)carbamoyl]methyl}piperazine-1-carboxylate Intermediate 253 was prepared following the procedure used for the synthesis of Intermediate 9 starting from tert-butyl 4-{[(4-bromopyridin-2-yl)carbamoyl]methyl}piperazine-1-carboxylate (Intermediate 176, 120 mg, 0.29 mmol) and 6-(5-chloro-2-fluorophenyl)-3-methylpyridazin-4-amine (Intermediate 60 mg, 0.25 mmol) in 1,2-dimethoxyethane/toluene (3/1 ratio) at 120° C. for 1 h min to afford title compound (55 mg, 0.10 mmol, 39% yield).

LC-MS (ESI): m/z (M+1): 556.2 (Method 2)

Intermediate 254: 1-methyl-4-[2-(3-nitro-1H-pyrazol-1-yl)ethyl]piperazine

A solution of 2-(4-methylpiperazin-1-yl)ethan-1-ol (765 mg, 5.31 mmol), PPh$_3$ (2.5 g, 9.55 mmol) and 3-nitro-1H-pyrazole (600 mg, 5.31 mmol) in THF (21 mL) was treated di-tert-butyl azodicarboxylate (2.07 g, 9.02 mmol) at RT. The mixture was stirred for 16 hrs, then it was concentrated under reduced pressure; the residual material was charged in SCX washed with MeOH and eluted with 1 N NH$_3$ in MeOH. Evaporation of basic fractions afforded a crude material that was purified by flash chromatography on Biotage silica cartridge (from DCM to 30% MeOH) to afford 1-methyl-4-[2-(3-nitro-1H-pyrazol-1-yl)ethyl]piperazine (355 mg, 1.48 mmol, 28% yield) as a pale yellow oil.

LC-MS (ESI): m/z (M+1): 239.7 (Method 2)

Intermediate 255: 1-[2-(4-methylpiperazin-1-yl)ethyl]-1H-pyrazol-3-amine

A solution of 1-methyl-4-[2-(3-nitro-1H-pyrazol-1-yl)ethyl]piperazine (Intermediate 254, 58 mg, 0.24 mmol) in ethanol (0.40 mL) was treated with 10% w/w Pd/C (5.03 mg) and stirred under H$_2$ atmosphere for 5 hrs at RT. The mixture was filtered over a pad of Celite® and then concentrated under reduced pressure to afford 1-[2-(4-methylpiperazin-1-yl)ethyl]-1H-pyrazol-3-amine (48 mg, 0.23 mmol, 97% yield) as a colourless oil.

LC-MS (ESI): m/z (M+1): 210.3 (Method 2)

Intermediate 256: 4-Chloro-N-{1-[2-(4-methylpiperazin-1-yl)ethyl]-1H-pyrazol-3-yl}Pyridin-2-amine In a closed vessel, Cs$_2$CO$_3$ (83 mg, 0.26 mmol), Xantphos (6 mg, 0.01 mmol), 1-[2-(4-methylpiperazin-1-yl)ethyl]-1H-pyrazol-3-amine (Intermediate 255, 28 mg, mmol), Pd$_2$(dba)$_3$ (6 mg, 0.01 mmol) and 2,4-dichloropyridine (18 mg, 0.12 mmol) were suspended in 1,2-dimethoxyethane (1.22 mL) under N$_2$. The suspension was degassed by several vacuum/nitrogen gas cycles, followed by N2 bubbling through the mixture (10 minutes) at RT. The mixture was then immediately warmed to 100° C. and stirred for 4 hrs. The mixture was filtered over a pad of Celite® washing with EtOAc. The crude material was purified by flash chromatography on Biotage silica NH cartridge (from cHex to 100% EtOAc) to afford 4-chloro-N-{1-[2-(4-methylpiperazin-1-yl)ethyl]-1H-pyrazol-3-yl}pyridin-2-amine (17 mg, 0.05 mmol, 44% yield) as a pale yellow oil.

LC-MS (ESI): m/z (M+1): 321.4 (Method 2)

Intermediate 257: 1-tert-butyl 3-methyl 4-[2-(1-methylpiperidin-4-yl)ethyl]piperazine-1,3-dicarboxylate Step 1: To a stirred solution of DMSO (1.19 mL, 16.76 mmol) in DCM (20 mL), at −78° C. and under a N2, oxalyl dichloride (0.72 mL, 8.38 mmol) was added portion-wise and the mixture was stirred for 10 min at −78° C., then a solution of 2-(1-methylpiperidin-4-yl)ethan-1-ol (1 g, 6.98 mmol) in DCM (5 mL) was added over 10 min and the resulting reaction mixture was stirred at −78° C. for 15 min. Subsequently TEA (4.9 mL, 35.18 mmol) was added portion-wise over 10 min, and the reaction mixture was stirred at −78° C. for 10 min. The cooling bath was removed, and the reaction mixture was allowed to reach RT and stirred 30 min at RT. The reaction mixture was filtered, DCM was added up to overall 45 mL and this solution containing aldehyde derivative (6.98 mmol, recovery assumed quantitative) was used as such.

Step 2: To a stirred solution of 2-(1-methylpiperidin-4-yl)acetaldehyde (from Step1, theoretical 6.98 mmol) in DCM (45 mL) at RT, 1-tert-butyl 3-methyl piperazine-1,3-dicarboxylate (1.23 g, 5.05 mmol) was added portion-wise. After 10 min, sodium triacetoxyborohydride (2.25 g, 10.61 mmol) was added portion-wise, and the resulting reaction mixture was stirred at RT for 3 hrs. The reaction mixture was washed with a saturated solution of $NaHCO_3$. The organic phase was dried over $Na_2SO_4$, filtered, and the solvent was removed under reduced pressure, and the crude material was purified by flash chromatography on Biotage silica NH cartridge (from cHex to 25% EtOAc) to afford 1-tert-butyl 3-methyl 4-[2-(1-methylpiperidin-4-yl)ethyl]piperazine-1,3-dicarboxylate (1.61 g, 4.36 mmol, 86% yield) as pale yellow oil.

LC-MS (ESI): m/z (M+1): 371.6 (Method 2)

Intermediate 258: Lithium 4-[(tert-butoxy)carbonyl]-1-[2-(1-methylpiperidin-4-yl)ethyl]piperazine-2-carboxylate To a solution of 1-tert-butyl 3-methyl 4-[2-(1-methylpiperidin-4-yl)ethyl]piperazine-1,3-dicarboxylate (Intermediate 257, 1.61 g, 4.36 mmol) in THF (14 mL) and MeOH (4 mL), a solution of lithium hydroxide hydrate (205 mg, 4.89 mmol) in $H_2O$ (5 mL) was added, the mixture was heated at 48° C. for 5 hrs. The reaction mixture was concentrated under reduced pressure to afford lithium 4-[(tert-butoxy) carbonyl]-1-[2-(1-methylpiperidin-4-yl)ethyl]piperazine-2-carboxylate (1.56 g, 4.36 mmol, recovery assumed quantitative) as white solid that was used as such.

LC-MS (ESI): m/z (M−1): 354.3 (Method 1)

Intermediate 259: 1-tert-butyl 3-Oxetan-3-yl 4-[2-(1-methylpiperidin-4-yl)ethyl]piperazine-1,3-dicarboxylate To a stirred mixture of lithium 4-[(tert-butoxy)carbonyl]-1-[2-(1-methylpiperidin-4-yl)ethyl]piperazine-2-carboxylate (Intermediate 258, 550 mg, 1.52 mmol) in MeCN (13 mL), at RT, HATU (814 mg, 2.14 mmol) and DIPEA (0.81 mL, 4.67 mmol) were subsequently added. After 10 min, 3-oxetanol (0.33 mL, 5.04 mmol) was added portion-wise to the solution then the resulting reaction mixture was stirred at 40° C. overnight. The mixture was concentrated under reduced pressure, the residue was taken up with DCM and a saturated solution of $NaHCO_3$, the aqueous phase was extracted with DCM, the organic phases were collected, and the solvent removed under reduced pressure. The crude material was purified by flash chromatography on Biotage silica NH cartridge (from cHex to 25% EtOAc) to afford 1-tert-butyl 3-oxetan-3-yl4-[2-(1-methylpiperidin-4-yl) ethyl]piperazine-1,3-dicarboxylate (371 mg, 0.90 mmol, 64% yield) as colourless oil.

LC-MS (ESI): m/z (M−1): 413.3 (Method 2)

Intermediate 260: Methyl 4-chloro-7-Hydroxyquinoline-6-carboxylate

Boron tribromide (5.96 mL, 5.96 mmol) was added drop wise to a stirred solution of methyl 4-chloro-7-methoxyquinoline-6-carboxylate (500 mg, 1.99 mmol) in DCM (20 mL) at 0° C. under $N_2$. The reaction was stirred at 0° C. for 1 hr, then at RT for further 1 hr. The reaction was cooled with an ice bath and MeOH was added drop wise. The solvents were removed by reduced pressure, the residue was treated with $NaHCO_3$ aqueous solution and extracted with DCM. Organic layer was separated, dried over $Na_2SO_4$, filtered, and evaporated to afford methyl 4-chloro-7-hydroxyquinoline-6-carboxylate (320 mg, 1.35 mmol, 68% yield).

LC-MS (ESI): m/z (M−1): 238.1 (Method 1)

Intermediate 261: Methyl 4-chloro-7-[2-(4-methylpiperazin-1-yl)ethoxy]quinoline-6-carboxylate Di-tert-butyl azodicarboxylate (581 mg, 2.52 mmol) was added portion wise to a stirred mixture of methyl 4-chloro-7-hydroxyquinoline-6-carboxylate (Intermediate 260, 300 mg, 1.26 mmol), 1-(2-hydroxyethyl)-4-methylpiperazine (225 mg, 1.56 mmol) and $PPh_3$ (662 mg, 2.52 mmol) in dry DCM (50 mL) at RT under $N_2$. After 3 hrs the mixture was washed with $H_2O$, organic layer was separated, dried over $Na_2SO_4$, filtered, and evaporated. The residue was treated with HCl 0,1 N, water phase was washed with EtOAc, treated with $NaHCO_3$ until pH 9 and extracted with DCM. Organic layer was separated, dried over $Na_2SO_4$ and evaporated to afford methyl 4-chloro-7-[2-(4-methylpiperazin-1-yl)ethoxy]quinoline-6-carboxylate (350 mg, 0.96 mmol, 76% yield).

LC-MS (ESI): m/z (M−1): 365.5 (Method 2)

Intermediate 262: Tert-butyl 3-(hydroxymethyl)-4-methylpiperazine-1-carboxylate

Intermediate 262 was prepared following the procedure used for the synthesis of Intermediate 22 starting from tert-butyl 3-(hydroxymethyl)piperazine-1-carboxylate (300 mg, 1.39 mmol) and formaldehyde 37% w/w in water (0.1 mL, 1.39 mmol) to afford title compound (270 mg, 1.17 mmol, 85% yield).

LC-MS (ESI): m/z (M−1): 231.3 (Method 2)

Intermediate 263: (1-methylpiperazin-2-yl)methanol dihydrochloride

3M HCl in cyclopentyl methyl ether (1.56 mL, 4.69 mmol) was added to a stirred solution of tert-butyl 3-(hydroxymethyl)-4-methylpiperazine-1-carboxylate (Intermediate 262, 270 mg, 1.17 mmol) in MeOH (4 mL). The reaction mixture was stirred over night, then volatiles were removed under vacuum to afford (1-methylpiperazin-2-yl) methanol dihydrochloride (250 mg, recovery assumed quantitative) as white solid.

LC-MS (ESI): m/z (M−1): 131.3 (Method 2)

Intermediate 264: N-(4-bromopyridin-2-yl)-3-[3-(hydroxymethyl)-4-methylpiperazin-1-yl]propanamide Intermediate 264 was prepared as described for Intermediate 30, starting from of N-(4-bromopyridin-2-yl)prop-2-enamide (Intermediate 29, 200 mg, 0.88 mmol), and (1-methylpiperazin-2-yl)methanol dihydrochloride (232 mg, 1.15 mmol), to afford title compound (170 mg, 0.48 mmol, 54% yield).

LC-MS (ESI): m/z (M+1): 358.6 (Method 2)

Intermediate 265: N-(4-bromopyridin-2-yl)-2-(4-methylpiperazin-1-yl)acetamide Intermediate 265 was prepared following the procedure used for the synthesis of Intermediate 176 starting from N-(4-bromopyridin-2-yl)-2-chloroacetamide (Intermediate 159, 150 mg, 0.6 mmol) and 1-methylpiperazine (120 mg, 1.2 mmol) to afford title compound (168 mg, 0.54 mmol, y=89%).

LC-MS (ESI): m/z (M+1): 313.3 (Method 2)

Intermediate 266: 6-chloro-3-Cyclopropylpyridazin-4-amine $K_3PO_4$ (328 mg, 1.52 mmol), 2-cyclopropyl-4,4,5,5-tetramethyl-1,3,2-dioxaborolane (0.11 mL, 0.610 mmol) and 3,6-dichloropyridazin-4-amine (100 mg, mmol) were mixed in 1,4-Dioxane (3 mL)/$H_2O$ (1 mL). The reaction mixture was degassed with $N_2$ for 2 min before adding Pd(dppf)$Cl_2$ DCM (25 mg, 0.03 mmol) then heated at 100° C. overnight. The mixture was cooled to RT, then further 2 eq of 2-cyclopropyl-4,4,5,5-tetramethyl-1,3,2-dioxaborolane, $K_3PO_4$ (328 mg, 1.52 mmol) and Pd(dppf)$Cl_2$ DCM (25 mg, 0.03 mmol) were added, then it was stirred at 100° C. for 6 hrs. After cooling down, the reaction was diluted with $H_2O$ and EtOAC, the organic phase was separated, dried, and evaporated under vacuum. The residue was purified by reverse phase flash chromatography on Biotage C18 cartridge (from $H_2O$+0.1% $NH_4OH$ to 20% MeCN) to afford 6-chloro-3-cyclopropylpyridazin-4-amine (57 mg, 0.34 mmol, 55% yield) as white off solid.

LC-MS (ESI): m/z (M+1): 170.0 (Method 2)

Intermediate 267: 6-(5-chloro-2-fluorophenyl)-3-Cyclopropylpyridazin-4-amine A mixture of 5-chloro-2-fluorobenzeneboronic acid (76 mg, 0.44 mmol), 6-chloro-3-cyclopropylpyridazin-4-amine (Intermediate 266, 57 mg, 0.34 mmol), and $Na_2CO_3$ (53 mg, 0.50 mmol) in toluene (0.80 ml), EtOH (0.80 ml) and $H_2O$ (0.80 ml) was degassed with $N_2$ for 2 minutes, $PdCl_2(PPh_3)_2$ (24 mg, 0.03 mmol) was added, and the mixture was irradiated with microwaves at 90° C. for 1 hr. Further 5-chloro-2-fluorobenzeneboronic acid (76 mg, 0.44 mmol), $Na_2CO_3$ (53 mg, 0.50 mmol) and $PdCl_2(PPh_3)_2$ (23.66 mg, 0.030 mmol) were added, and it was irradiated for 40 min at 90° C. After cooling to RT, the mixture was treated with $H_2O$ and extracted with EtOAc. Organic layer was separated, dried, and evaporated. The residue was purified by reverse phase flash chromatography on Biotage C18 cartridge (from $H_2O$+0.1% $NH_4OH$ to 80% MeCN) to afford 6-(5-chloro-2-fluorophenyl)-3-cyclopropylpyridazin-4-amine (58 mg, 0.22 mmol, 65% yield) as white solid.

LC-MS (ESI): m/z (M+1): 264.1 (Method 1)

Intermediate 268: Methyl 6-chloro-4-{[(2,4-dimethoxyphenyl)methyl]amino}pyridazine-3-carboxylate 1-(2,4-dimethoxyphenyl)methanamine (1.8 mL, 7.97 mmol) was added to a stirred solution of methyl 4,6-dichloropyridazine-3-carboxylate (1.5 g, 7.25 mmol) and DIPEA (3.27 mL, 14.49 mmol) in dry MeCN (20 mL) at RT under $N_2$, and the reaction was stirred for 3 hrs. Solvent was removed by reduced pressure, the residue was treated with EtOAC, and washed with aqueous $NH_4Cl$ solution. Organic phase was separated, dried over $Na_2SO_4$, filtered, and evaporated. The residue was treated with hot EtOAc, after cooling $Et_2O$ was added and the solid filtered to afford methyl 6-chloro-4-{[(2,4-dimethoxyphenyl)methyl]amino}pyridazine-3-carboxylate (1.2 g, 3.55 mmol, 49% yield).

LC-MS (ESI): m/z (M+1): 340.1 (Method 2)

Intermediate 269: Methyl 6-(5-chloro-2-fluorophenyl)-4-{[(2,4-dimethoxyphenyl)methyl]amino}pyridazine-3-carboxylate DIPEA (1.55 mL, 8.88 mmol) was added to a stirred mixture of methyl 6-chloro-4-{[(2,4-dimethoxyphenyl)methyl]amino}pyridazine-3-carboxylate (Intermediate 268, 1.0 g, 2.96 mmol), 5-chloro-2-fluorobenzeneboronic acid (1.55 g, 8.88 mmol) and Pd(PPh$_3$) 4 (239 mg, 0.21 mmol) in dry 1,4-Dioxane (15 mL). The reaction was flushed with N2, the vial was closed and irradiated at 110° C. with MW for 6 hrs. After cooling the solvent was removed by reduced pressure. The residue was treated with $H_2O$ and extracted with EtOAc, organic layer was separated, washed with aqueous $NH_4Cl$ solution, dried over $Na_2SO_4$, filtered, and evaporated. The residue was purified by flash chromatography on Biotage silica cartridge (from cHex to 30% EtOAc) as eluant to afford methyl 6-(5-chloro-2-fluorophenyl)-4-{[(2,4-dimethoxyphenyl)methyl]amino}pyridazine-3-carboxylate (710 mg, 1.64 mmol, 56% yield).

LC-MS (ESI): m/z (M+1): 432.2 (Method 1)

Intermediate 270: [6-(5-chloro-2-fluorophenyl)-4-{[(2,4-dimethoxyphenyl)methyl]amino}pyridazin-3-yl]methanol 2 M solution of lithium aluminum hydride in THF (0.7 mL, 1.4 mmol) was added drop wise to a stirred solution of methyl 6-(5-chloro-2-fluorophenyl)-4-{[(2,4-dimethoxyphenyl)methyl]amino}pyridazine-3-carboxylate (Intermediate 269, 600 mg, 1.15 mmol) in dry THF (10 mL) at 0° C. under $N_2$. After 1 hour the reaction was warmed at RT and stirred for 1 hr. The mixture was then cooled at 0° C. and, in sequence, were added 0.1 mL of $H_2O$ in THF, 0.1 mL of NaOH 15% and 0.3 mL of $H_2O$. The reaction was warmed at RT for 1 hr. The mixture was filtered on Celite® pad washing with THF. The solvent was removed by reduced pressure and the residue was purified by flash chromatography on Biotage silica cartridge (from cHex to 60% EtOAc) to afford[6-(5-chloro-2-fluorophenyl)-4-{[(2,4-dimethoxyphenyl)methyl]amino}pyridazin-3-yl]methanol (420 mg, 1.04 mmol, 90% yield).

LC-MS (ESI): m/z (M+1): 404.2 (Method 1)

Intermediate 271: [4-amino-6-(5-chloro-2-fluorophenyl)pyridazin-3-yl]methanol TFA (1.0 mL, 17.4 mmol) was added to a stirred solution of [6-(5-chloro-2-fluorophenyl)-4-{[(2,4-dimethoxyphenyl)methyl]amino}pyridazin-3-yl]methanol (Intermediate 270, 220 mg, 0.54 mmol) in DCM (4 mL) at RT under $N_2$. The reaction was stirred for 40 hrs. The solvents were removed by reduced pressure, and the residue was treated with aqueous $NaHCO_3$ solution and extracted with EtOAc. Organic layer was separated, dried over $Na_2SO_4$, filtered, and evaporated to afford [4-amino-6-(5-chloro-2-fluorophenyl)pyridazin-3-yl]methanol (150 mg, recovery assumed quantitative).

LC-MS (ESI): m/z (M+1): 254.1 (Method 1)

Intermediate 272: 3-{[(tert-butyldimethylsilyl)oxy]methyl}-6-(5-chloro-2-fluorophenyl)pyridazin-4-amine Tert-butyl(chloro)dimethylsilane (113.64 mg, 0.75 mmol) was added to a stirred solution of [4-amino-6-(5-chloro-2-fluorophenyl)pyridazin-3-yl]methanol (Intermediate 271, 150 mg, 0.50 mmol), TEA (0.14 mL, 1.01 mmol) and a catalytic amount of DMAP in dry DCM (12.26 mL) at RT under $N_2$. After 24 hrs the solvent was evaporated by reduced pressure, and the residue was purified by flash chromatography on Biotage silica cartridge (from cHex to 20% EtOAc) to afford 3-{[(tert-butyldimethylsilyl)oxy]methyl}-6-(5-chloro-2-fluorophenyl)pyridazin-4-amine (100 mg, 0.27 mmol, 54% yield).

LC-MS (ESI): m/z (M+1): 369.1 (Method 2)

Intermediate 273: N-{4-[(3-{[(tert-butyldimethylsilyl)oxy]methyl}-6-(5-chloro-2-fluorophenyl)pyridazin-4-yl)amino]pyridin-2-yl}-3-(4-methylpiperazin-1-yl)propanamide $Cs_2CO_3$ (157 mg, 0.48 mmol) was added to a stirred mixture of N-(4-bromopyridin-2-yl)-3-(4-methylpiperazin-1-yl)propanamide (Intermediate 32, 94 mg, 0.29 mmol), 3-{[(tert-butyldimethylsilyl)oxy]methyl}-6-(5-chloro-2-fluorophenyl)pyridazin-4-amine (Intermediate 272, 100 mg, 0.24 mmol), Pd(OAc)$_2$ (3 mg, 0.01 mmol) and Xantphos (14 mg, 0.02 mmol) in 1,4-Dioxane (6.77 mL) at RT. The mixture was degassed with N2, the vial was closed and irradiated with MW (120° C. for 2 hrs). After cooling to RT, the mixture was filtered over Celite® pad washing with EtOAc, the solvents were removed by reduced pressure and the residue was purified by flash chromatography on Biotage silica NH cartridge (from DCM to 2% MeOH/0.2% H$_2$O) to afford N-{4-[(3-{[(tert-butyldimethylsilyl)oxy]methyl}-6-(5-chloro-2-fluorophenyl)pyridazin-4-yl)amino]pyridin-2-yl}-3-(4-methylpiperazin-1-yl)propanamide (105 mg, 0.17 mmol, 71% yield).

LC-MS (ESI): m/z (M+1): 614.5 (Method 2)

Intermediate 274: N-(4-bromopyridin-2-yl)-2-{4-[2-(methylamino)ethyl]piperazin-1-yl}acetamide Intermediate 274 was prepared following the procedure used for the synthesis of Intermediate 21 starting from tert-butyl N-[2-(4-{[(4-bromopyridin-2-yl)carbamoyl]methyl}piperazin-1-yl)ethyl]-N-methylcarbamate (Intermediate 197, 150 mg, 0.33 mmol) to afford title compound (90 mg, 0.25 mmol, 77% yield).

LC-MS (ESI): m/z (M+1): 358.0 (Method 2)

Intermediate 275: Methyl N-[2-(4-{[(4-bromopyridin-2-yl)carbamoyl]methyl}piperazin-1-yl)ethyl]-N-methylcarbamat Intermediate 275 was prepared following the procedure used for the synthesis of Intermediate 102 starting from N-(4-bromopyridin-2-yl)-2-{4-[2-(methylamino)ethyl]piperazin-1-yl}acetamide (Intermediate 274, 90 mg, 0.25 mmol), and methyl chloroformate (0.021 mL, 0.28 mmol) to afford title compound (90 mg, 0.22 mmol, 86% yield).

LC-MS (ESI): m/z (M+1): 416.1 (Method 1)

Intermediate 276: Methyl N-[2-[4-[2-[[4-[[3-[[tert-butyl(dimethyl)silyl]oxymethyl]-6-(5-chloro-2-fluorophenyl)pyridazin-4-yl]amino]pyridin-2-yl]amino]-2-oxoethyl]piperazin-1-yl]ethyl]-N-methylcarbamate Intermediate 276 was prepared following the procedure used for the synthesis of Intermediate 31 starting from methyl N-[2-(4-{[(4-bromopyridin-2-yl)carbamoyl]methyl}piperazin-1-yl)ethyl]-N-methylcarbamate (Intermediate 275, mg, 0.22 mmol) and 3-{[(tert-butyldimethylsilyl)oxy]methyl}-6-(5-chloro-2-fluorophenyl)pyridazin-4-amine (Intermediate 272, 70 mg, 0.19 mmol) to afford title compound (20 mg, 0.03 mmol, 15% yield).

LC-MS (ESI): m/z (M+1): 701.4 (Method 1)

Intermediate 277: N-{4-[(3-{[(tert-butyldimethylsilyl)oxy]methyl}-6-(5-chloro-2-fluorophenyl)pyridazin-4-yl)amino]pyridin-2-yl}-2-(4-methylpiperazin-1-yl)acetamide Intermediate 277 was prepared following the procedure used for the synthesis of Intermediate 273 starting from N-(4-bromopyridin-2-yl)-2-(4-methylpiperazin-1-yl)acetamide (Intermediate 265, 71 mg, 0.23 mmol) and 3-{[(tert-butyl dimethyl silyl)oxy]methyl}-6-(5-chloro-2-fluorophenyl)pyridazin-4-amine (Intermediate 272, 70 mg, 0.19 mmol) to afford title compound (56 mg, 0.09 mmol, 49% yield).

LC-MS (ESI): m/z (M+1): 600.2 (Method 1)

Intermediate 278: 4-Bromo-7-[2-(4-methylpiperazin-1-yl)ethoxy]quinoline

HBr 33% in AcOH (0.63 mL, 2.53 mmol) was added to a stirred mixture of 4-chloro-7-[2-(4-methylpiperazin-1-yl)ethoxy]quinoline (Intermediate 23, 90 mg, mmol) and sodium; bromide (263 mg, 2.53 mmol) in MeCN (4 mL) at RT. The vial was closed, and the reaction was heated at 80° C. for 12 hrs. After cooling the mixture was poured in cold aqueous NaHCO$_3$ solution and extracted with EtOAc. Organic layer was separated, dried over Na$_2$SO$_4$ and evaporated to afford 4-bromo-7-[2-(4-methylpiperazin-1-yl)ethoxy]quinoline (80 mg, 0.23 mmol, 90% yield).

LC-MS (ESI): m/z (M+1): 352.0 (Method 2)

Intermediate 279: N-(3-{[(tert-butyldimethylsilyl)oxy]methyl}-6-(5-chloro-2-fluorophenyl)pyridazin-4-yl)-7-[2-(4-methylpiperazin-1-yl)ethoxy]quinolin-4-amine Intermediate 279 was prepared following the procedure used for the synthesis of Intermediate 273 starting from 4-bromo-7-[2-(4-methylpiperazin-1-yl)ethoxy]quinoline (Intermediate 278, 71 mg, 0.20 mmol) and 3-{[(tert-butyl dimethyl silyl)oxy]methyl}-6-(5-chloro-2-fluorophenyl)pyridazin-4-amine (Intermediate 272, 50 mg, 0.14 mmol) to afford title compound (70 mg, 0.11 mmol, 81% yield).

LC-MS (ESI): m/z (M+1): 637.5 (Method 2)

Intermediate 280: N-{4-[(3-{[(tert-butyldimethylsilyl)oxy]methyl}-6-(5-chloro-2-fluorophenyl)pyridazin-4-yl)amino]pyridin-2-yl}-2-(4-methyl-1,4-diazepan-1-yl)acetamide Intermediate 280 was prepared following the procedure used for the synthesis of Intermediate 273 starting from N-(4-bromopyridin-2-yl)-2-(4-methyl-1,4-diazepan-1-yl) acetamide (Intermediate 175, 124 mg, 0.38 mmol) and 3-{[(tert-butyl dimethyl silyl)oxy]methyl}-6-(5-chloro-2-fluorophenyl)pyridazin-4-amine (Intermediate 272, 100 mg, 0.25 mmol) to afford title compound (90 mg, 0.15 mmol, 56% yield).

LC-MS (ESI): m/z (M+1): 614.1 (Method 2)

Intermediate 281: N-(4-bromopyridin-2-yl)-2-{2-methyl-2,7-diazaspiro[3.5]nonan-7-yl}acetamide Intermediate 281 was prepared following the procedure used for the synthesis of Intermediate 176 starting from N-(4-bromopyridin-2-yl)-2-chloroacetamide (Intermediate 159, 100 mg, 0.4 mmol) and 2-methyl-2,7-diazaspiro[3.5]nonane dihydrochloride (Intermediate 210, 101 mg, 0.48 mmol) to afford title compound (80 mg, 0.23 mmol, y=57%).

LC-MS (ESI): m/z (M+1): 355.1 (Method 2)

Intermediate 282: N-{4-[(3-{[(tert-butyldimethylsilyl)oxy]methyl}-6-(5-chloro-2-fluorophenyl) pyridazin-4-yl)amino]pyridin-2-yl}-2-{2-methyl-2, 7-diazaspiro[3.5]nonan-7-yl}acetamide Intermediate 282 was prepared following the procedure used for the synthesis of Intermediate 273 starting from N-(4-bromopyridin-2-yl)-2-{2-methyl-2,7-diazaspiro[3.5] nonan-7-yl}acetamide (Intermediate 281, 48 mg, 0.14 mmol) and 3-{[(tert-butyldimethylsilyl)oxy]methyl}-6-(5-chloro-2-fluorophenyl)pyridazin-4-amine (Intermediate 272, 50 mg, 0.14 mmol) to afford title compound (45 mg, 0.07 mmol, 52% yield).

LC-MS (ESI): m/z (M+1): 640.5 (Method 2)

Intermediate 283: 2-[5-(Difluoromethyl)-2-Fluorophenyl]-4,4,5,5-Tetramethyl-1,3,2-Dioxaborolane In a vial, to a mixture of 1-bromo-5-difluoromethyl-2-fluorobenzene (0.5 g, 2.22 mmol), 4,4,5,5-tetramethyl-2-(4,4,5,5-tetramethyl-1,3,2-dioxaborolan-2-yl)-1,3,2-dioxaborolane (0.67 g, 2.64 mmol), Pd(dppf)Cl$_2$ DCM (91 mg, 0.11 mmol) and potassium acetate (661 mg, 6.67 mmol), 1,2-dimethoxyethane (9 mL) was added, the vial was sealed and stirred at 90° C. for 7 hrs. The reaction mixture was diluted with EtOAc and filtered over Celite® pad. The organic solvent was concentrated under reduced pressure, and the crude material was purified by flash chromatography on Biotage silica cartridge (from cHex to 55% EtOAc) to afford 2-[5-(difluoromethyl)-2-fluorophenyl]-4,4,5,5-tetramethyl-1,3,2-dioxaborolane (376 mg, 1.38 mmol, 62% yield) as whitish waxy solid.

$^1$H NMR (400 MHz, Chloroform-d) δ ppm 7.87-7.95 (m, 1H), 7.60-766 (m, 1H), 7.14 (t, J=8.69 Hz, 1H), 6.49-6.82 (m, 1H), 1.39 (s, 12H).

Intermediate 284: N-(4-bromopyridin-2-yl)-3-[4-(2-Hydroxyethyl)piperazin-1-yl]propanamide Intermediate 284 was prepared following the procedure used for the synthesis of Intermediate 30 starting from N-(4-bromopyridin-2-yl)prop-2-enamide (Intermediate 29, 200 mg, 0.88 mmol), and 2-(1-piperazinyl)ethanol (229 mg, 1.76 mmol) in MeOH to afford title compound (283 mg, 0.79 mmol, 90% yield).

LC-MS (ESI): m/z (M+1): 357.1 (Method 2)

Intermediate 285: N-(4-bromopyridin-2-yl)-3-(4-{2-[(tert-butyldimethylsilyl)oxy]ethyl}piperazin-1-yl) propanamide To a solution N-(4-bromopyridin-2-yl)-3-[4-(2-hydroxyethyl)piperazin-1-yl]propanamide (Intermediate 284, 283 mg, 0.79 mmol) and TEA (0.28 mL, 1.98 mmol) in DCM (5 mL), tert-butyl(chloro)dimethylsilane (239 mg, 1.58 mmol) was added and the mixture was stirred at RT overnight. The mixture was diluted with DCM and washed with saturated NaHCO$_3$ aqueous solution. The organic phase was separated, filtered through a hydrophobic phase separator, and concentrated at reduced pressure. The crude was purified by flash chromatography on Biotage silica NH cartridge (from DCM to 2% MeOH) to afford N-(4-bromopyridin-2-yl)-3-(4-{2-[(tert-butyldimethylsilyl)oxy]ethyl}piperazin-1-yl)propenamide (365 mg, 0.77 mmol, 98% yield).

LC-MS (ESI): m/z (M+1): 471.3 (Method 2)

Intermediate 286: 3-(4-{2-[(tert-butyldimethylsilyl) oxy]ethyl}piperazin-1-yl)-N-(4-{[6-(5-chloro-2-fluorophenyl)-3-(trifluoromethyl)pyridazin-4-yl] amino}pyridin-2-yl)propenamide Intermediate 286 was prepared following the procedure used for the synthesis of Intermediate 31 starting from N-(4-bromopyridin-2-yl)-3-(4-{2-[(tert-butyldimethylsilyl) oxy]ethyl}piperazin-1-yl)propenamide (Intermediate 285, 107 mg, 0.23 mmol) and 6-(5-chloro-2-fluorophenyl)-3-(trifluoromethyl)pyridazin-4-amine (Intermediate 293, 60 mg, 0.21 mmol) to afford title compound (116 mg, 0.17 mmol, 83% yield).

LC-MS (ESI): m/z (M+1): 682.5 (Method 2)

Intermediate 287: N-(4-bromopyridin-2-yl)-3-[4-(2-Cyanoethyl)piperazin-1-yl]propanamide Intermediate 287 was prepared following the procedure used for the synthesis of Intermediate 30 starting from N-(4-bromopyridin-2-yl)prop-2-enamide (Intermediate 29, 200 mg, 0.88 mmol), and 3-(1-piperazinyl)propanenitrile (245 mg, 1.76 mmol) in MeOH to afford title compound (277 mg, 0.76 mmol, 86% yield).

LC-MS (ESI): m/z (M+1): 366.1 (Method 2)

Intermediate 288: 2,5-Dioxopyrrolidin-1-yl (2-(4-methylpiperazin-1-yl)ethyl)carbamate Intermediate 288 was prepared following this procedure: to a solution of bis-(2,5-dioxopyrrolidin-1-yl) carbonate (537 mg, 2.094 mmol) in dry THF (10 mL), 2-(4-methylpiperazin-1-yl)ethan-1-amine (300 mg, 2.094 mmol) was added and the reaction was stirred at 80° C. for 1 h. Then, the resulted suspension was directly submitted to the next step.

Intermediate 289: 1-(4-bromopyridin-2-yl)-3-(2-(4-methylpiperazin-1-yl)ethyl)Urea To a solution of 4-bromopyridin-2-amine (434 mg, 2.51 mmol) in dry THF (10 ml), previously cooled to −78° C., LDA 2M in THF (3.14 mL, 6.28 mmol) was added dropwise. The reaction was stirred for 10 min and a solution of 2,5-dioxopyrrolidin-1-yl (2-(4-methylpiperazin-1-yl)ethyl) carbamate (Intermediate 288, 595 mg, 2.093 mmol) in THF (10 mL) was slowly added over 30 min. The reaction was stirred for 30 min at −78° C. and at RT for 12 h. Then, the reaction was poured into brine (20 mL) and extracted with DCM (3×30 mL). Combined organics were filtered through a phase separator cartridge and the solvent removed under reduced pressure. The crude was purified by NH flash chromatography (SNAP 50 g eluent DCM: EtOH from 100:0 to 95:5) in gradient eluition affording the title compound (120 mg, 0.351 mmol, 17% yield) as orange solid.

LC-MS (ESI): m/z (M+1): 342.2, rt=0.30 min (Method 1).

Intermediate 290: 2,5-Dioxopyrrolidin-1-yl ((1-methylpiperidin-4-yl)methyl)carbamate To a solution of bis-(2,5-dioxopyrrolidin-1-yl) carbonate (0.999 g, 3.90 mmol) in dry THF (10 mL), (1-methylpiperidin-4-yl)methanamine (0.5 g, 3.90 mmol) was added and the reaction was stirred at 80° C. for 1 h. Then, the resulted suspension was directly submitted to the next step.

Intermediate 291: 1-(4-bromopyridin-2-yl)-3-((1-methylpiperidin-4-yl)methyl)Urea Intermediate 291 was prepared following the procedure used for the synthesis of Intermediate 289, starting from 4-bromopyridin-2-amine (0.809 g, 4.68 mmol) and using 2,5-dioxopyrrolidin-1-yl ((1-methylpiperidin-4-yl)methyl) carbamate (Intermediate 290, 1.05 g, 3.90 mmol). The crude was purified by NH flash chromatography (SNAP 50 g eluent DCM: EtOH from 100:0 to 95:5) in gradient eluition affording the title compound (160 mg, 0.489 mmol, 12% yield) as orange solid.

LC-MS (ESI): m/z (M+1): 326.9, rt=0.45 min (Method 1).

Intermediate 292: 6-chloro-3-(trifluoromethyl)pyridazin-4-amine

To a solution of 6-chloropyridazin-4-amine (2 g, 15.44 mmol) in DCM (6 mL), water (2 mL) and zinc bis trifluoromethylsulfinate (7.68 g, 23.16 mmol) were added and the biphasic system was heated to 60° C. After 20 min, TFA (5.28 g, 46.3 mmol) and t-BuOOH (8.35 g, 93 mmol) were added and the reaction was stirred for 6 h. Additional zinc bis trifluoromethylsulfinate (7.68 g, 23.16 mmol), TFA (5.28 g, 46.3 mmol) and t-BuOOH (8.35 g, 93 mmol) were added. After completion, the reaction was diluted with DCM and saturated NaHCO$_3$ aqueous solution (20 mL) was added. The two phases were separated and the aqueous layer was extracted with DCM (50 mL×3). Combined organics were dried over Na$_2$SO$_4$, filtered and the solvent removed under reduced pressure. The crude was purified by C18 flash chromatography ((H$_2$O/MeCN)) 95:5+0.1% HCOOH}:{(MeCN/H$_2$O) 95:5+HCOOH 0.1%} from 100:0 to 70:30 affording a nearly 1:1 mixture (1.08 g) of the two regioisomer 6-chloro-5-(trifluoromethyl)pyridazin-4-amine and the title compound 6-chloro-3-(trifluoromethyl)pyridazin-4-amine.

LC-MS (ESI): m/z (M+1): 198.22, rt=0.60 min (Method 1).

Intermediate 293: 6-(5-chloro-2-fluorophenyl)-3-(trifluoromethyl)pyridazin-4-amine To a solution of the mixture 6-chloro-5-(trifluoromethyl) pyridazin-4-amine and 6-chloro-3-(trifluoromethyl) pyridazin-4-amine (Intermediate 292, 1.08 g, 5.26 mmol) in 1,4-dioxane (16 mL)/H$_2$O (4 mL), PdCl$_2$(dppf) (0.400 g, 0.547 mmol), K$_2$CO$_3$ (1.133 g, 8.20 mmol) and (2-chloro-5-fluorophenyl)boronic acid (0.715 g, 4.10 mmol) were added and the reaction was stirred for 3 h at 110° C. Then, 1,4 dioxane was removed under reduced pressure; the residue was diluted with DCM and saturated NaHCO$_3$ aqueous solution (20 mL) was added. The two phases were separated and the aquoeus layer was extracted with DCM (50 mL×3). Combined organics were dried over Na$_2$SO$_4$, filtered and the solvent removed under reduced pressure. The crude was purified by C18 flash chromatography ((H$_2$O/MeCN)) 95:5+0.1% HCOOH}:{(MeCN/H$_2$O) 95:5+HCOOH 0.1%} from 100:0 to 60:40 affording 6-(5-chloro-2-fluorophenyl)-3-(trifluoromethyl)pyridazin-4-amine (150 mg, 0.514 mmol, 19% yield) as first eluted regioisomer and 6-(5-chloro-2-fluorophenyl)-5-(trifluoromethyl)pyridazin-4-amine (150 mg, 0.514 mmol, 19% yield) as a second eluted regioisomer.

LC-MS (ESI): m/z (M+1): 292.23, rt=0.85 min (Method 1).

Intermediate 294: Methyl 3-(4-amino-6-(5-chloro-2-fluorophenyl)pyridazin-3-yl)propanoate To a solution of 4-methoxy-4-oxobutanoic acid (44.3 mg, 0.33 mmol), N-hydroxyphthalimide (54.7 mg, 0.33 mmol) and DMAP (1.4 mg, 0.01 mmol) in DMSO (1 mL), DIC (0.05 ml, 0.33 mmol) was added and the mixture was stirred at rt for 12 h. Then, a solution of 6-(5-chloro-2-fluorophenyl)pyridazin-4-amine (Intermediate 3, 50 mg, 0.22 mmol), (1S)-(+)-10-camphorsulfonic acid (104 mg, mmol) and 2,4,5,6-tetra(carbazol-9-yl)benzene-1,3-dicarbonitrile (17.4 mg, mmol) in DMSO (1 mL) was added. The resulting solution was vigorously bubbled with nitrogen, sealed, and placed between two blue Kessil LED Photoredox light PR160L lamps (390-456 nm, 352 mW/cm 2). The reaction was stirred at 50° C. for 3 h. The mixture was concentrated under reduced pressure and eluted through a 2 g SCX cartridge with 7N NH$_3$ in methanol. The resulting solution was concentrated under reduced pressure and purified by flash chromatography on a Biotage NH-Silica column (eluent: DCM: DCM/MeOH 9/1 from 100:0 to 0:100) to give the title compound (30 mg, 0.097 mmol, 43.3% yield).

LC-MS (ESI): m/z (M+1): 309.8, rt=0.43 min (Method 1).

Intermediate 295: Methyl 4-(4-amino-6-(5-chloro-2-fluorophenyl)pyridazin-3-yl)cyclohexane-1-carboxylate Intermediate 295 was prepared following the procedure used for the synthesis of Intermediate 294 starting from methyl 4-methoxycarbonylcyclohexane-1-carboxylic acid (125 mg, 0.61 mmol) and 6-(5-chloro-2-fluorophenyl) pyridazin-4-amine (Intermediate 3, 100 mg, 0.447 mmol) to afford methyl 4-(4-amino-6-(5-chloro-2-fluorophenyl) pyridazin-3-yl)cyclohexane-1-carboxylate (30 mg, 0.08 mmol, 18% yield) as a mixture of cis-trans stereoisomers.

LC-MS (ESI): m/z (M+1): 364.2, rt=0.57-0.60 min (Method 1).

Intermediate 296: Methyl 4-(4-amino-6-(5-chloro-2-fluorophenyl)pyridazin-3-yl)butanoate Intermediate 296 was prepared following the procedure used for the synthesis of Intermediate 294 starting from 5-methoxy-5-oxopentanoic acid (0.245 g, 1.676 mmol) and 6-(5-chloro-2-fluorophenyl)pyridazin-4-amine (intermediate 3, 250 mg, 1.118 mmol) to afford methyl 4-(4-amino-6-(5-chloro-2-fluorophenyl)pyridazin-3-yl)butanoate (37 mg, 0.114 mmol, 10% yield) as a yellowish solid.

LC-MS (ESI): m/z (M+1): 323.9, rt=0.47 min (Method 1).

Intermediate 297: cis ethyl 3-(4-methylpiperazin-1-yl)cyclobutane-1-carboxylate 1-methylpiperazine (0.55 mL, 5 mmol) and ethyl 3-oxo-cyclobutane-1-carboxylate (950 mg, 6.7 mmol) were mixed in DCM (30 mL) and stirred for 15 min at RT. Sodium triacetoxyborohydride (2.12 g, 10 mmol) was added portionwise and the resulting reaction mixture was stirred overnight at RT. MeOH (30 mL) was added carefully and the mixture was stirred for 30 min, then it was concentrated under reduced pressure. The crude material was dissolved in MeOH and the solution was charged on SCX, washed with MeOH, and eluted with 1 N NH 3 in MeOH. Evaporation of basic fractions afforded a crude material that was purified by flash chromatography on Biotage silica NH cartridge (from c-Hex to 30% EtOAc) to afford cis ethyl 3-(4-methylpiperazin-1-yl)cyclobutane-1-carboxylate (927 mg, 4.1 mmol, 82% yield) as colourless oil.

LC-MS (ESI): m/z (M+1): 227.3 (Method 2)

Intermediate 298: Cis N-(4-bromopyridin-2-yl)-3-(4-methylpiperazin-1-yl)cyclobutane-1-carboxamide Intermediate 298 was prepared following the procedure used for the synthesis of Intermediate 245 starting from cis ethyl 3-(4-methylpiperazin-1-yl)cyclobutane-1-carboxylate (Intermediate 297, 300 mg, 1.33 mmol) and of 4-bromopyridin-2-amine (577 mg, 3.34 mmol) to afford title compound (221 mg, 0.63 mmol, 47% yield).

LC-MS (ESI): m/z (M+1): 354.1 (Method 2)

Intermediate 299: Methyl 4-[(3-{[(tert-butyldimethylsilyl)oxy]methyl}-6-(5-chloro-2-fluorophenyl)pyridazin-4-yl)amino]-7-[2-(4-methylpiperazin-1-yl)ethoxy-]quinoline-6-carboxylate Intermediate 299 was prepared following the procedure used for the synthesis of Intermediate 273 starting from methyl 4-chloro-7-[2-(4-methylpiperazin-1-yl)ethoxy]quinoline-6-carboxylate (Intermediate 261, 93 mg, 0.26 mmol) and 3-{[(tert-butyldimethyl silyl)oxy]methyl}-6-(5-chloro-2-fluorophenyl)pyridazin-4-amine (Intermediate 272, 80 mg, 0.21 mmol) to afford title compound (50 mg, 0.07 mmol, 44% yield).

LC-MS (ESI): m/z (M+1): 695.5 (Method 2)

PREPARATIONS OF EXAMPLES

Example 1: N-(4-{[6-(5-chloro-2-fluorophenyl)pyridazin-4-yl]amino}pyridin-2-yl)-3-(morpholin-4-yl)propanamide

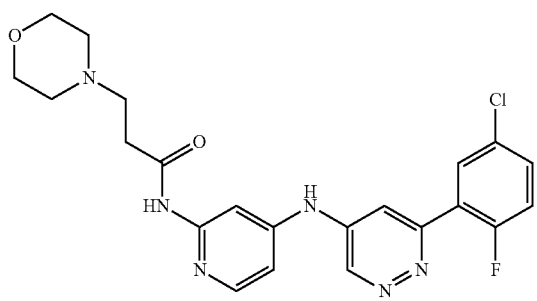 [SMILES: O=C(CCN1CCOCC1)Nc1cc(Nc2cnnc(-c3cc(Cl)ccc3F)c2)ccn1]

Intermediate 37 (57 mg, 0.18 mmol), Cs₂CO₃ (117 mg, 0.36 mmol), Xantphos (12 mg, 0.02 mmol) and Intermediate 3 (40 mg, 0.18 mmol) were mixed in 1,4 dioxane (3 mL) and degassed 5 min with N2, then Pd(OAc)₂ (2 mg, 0.01 mmol) was added. The resulting reaction mixture was heated at 100° C. for 12 hrs. Solids were filtered off, volatiles were removed under vacuum and the residue by flash chromatography on Biotage silica NH cartridge (from DCM to 5% MeOH), then further purified by flash chromatography on Biotage silica cartridge (from cHex to 100% EtOAC) to afford the title compound as white solid.

LC-MS (ESI): m/z (M+1): 458.1 (Method 1)

¹H NMR (400 MHz, Chloroform-d) δ ppm 11.22 (s, 1H), 9.03 (d, J=2.7 Hz, 1H), 8.23 (d, J=5.7 Hz, 1H), 8.19 (dd, J=6.7, 2.7 Hz, 1H), 8.05 (d, J=2.1 Hz, 1H), 7.70 (dd, 1.5 Hz, 1H), 7.42 (ddd, J=8.8, 4.2, 2.8 Hz, 1H), 7.15 (dd, J=10.5, 8.8 Hz, 1H), 6.97 (s, 1H), 6.95 (dd, J=5.7, 2.2 Hz, 1H), 3.88 (t, J=4.5 Hz, 4H), 2.73-2.81 (m, 2H), 2.64 (br s, 4H), 2.56-2.60 (m, 2H).

Example 2: N-(4-{[6-(5-chloro-2-fluorophenyl)pyridazin-4-yl]amino}pyridin-2-yl)-3-(piperazin-1-yl)propanamide

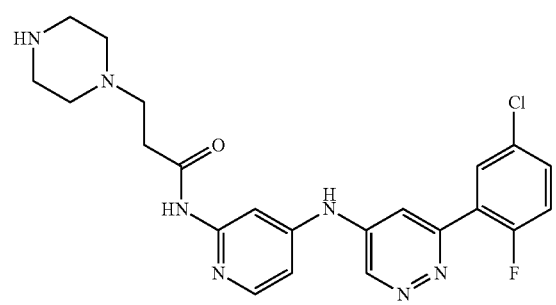 [SMILES: O=C(CCN1CCNCC1)Nc1cc(Nc2cnnc(-c3cc(Cl)ccc3F)c2)ccn1]

Intermediate 31 (70 mg, 0.13 mmol) was dissolved in DCM (4 mL) and TFA (0.05 mL, 0.63 mmol) was added. The reaction solution was stirred at RT for 1 h. Volatiles were removed under vacuum and the residue was charged on SCX washing with MeOH and eluting with 1 N NH₃ in MeOH. Basic fractions were collected and evaporated to afford title compound (56 mg, 0.12 mmol, 98% yield) as white solid.

LC-MS (ESI): m/z (M+1): 456.2 (Method 1)

¹H NMR (500 MHz, DMSO-d₆) δ ppm 10.75 (s, 1H), 9.88 (s, 1H), 9.06 (d, J=2.7 Hz, 1H), 8.18 (d, J=5.5 Hz, 1H), 8.06 (d, J=1.6 Hz, 1H), 8.00 (dd, 2.9 Hz, 1H), 7.67 (dd, J=2.5, 1.4 Hz, 1H), 7.62-7.66 (m, 1H), 7.47 (dd, J=10.6, 8.9 Hz, 1H), 7.01 (dd, J=5.8, 2.2 Hz, 1H), 4.04-5.96 (m, 1H), 2.80 (t, J=4.8 Hz, 4H), 2.59-2.66 (m, 2H), 2.52-2.57 (m, 2H), 2.42 (br s, 4H).

Example 3: N-[6-(5-chloro-2-fluorophenyl)pyridazin-4-yl]-7-[2-(morpholin-4-yl)ethoxy]quinolin-4-amine

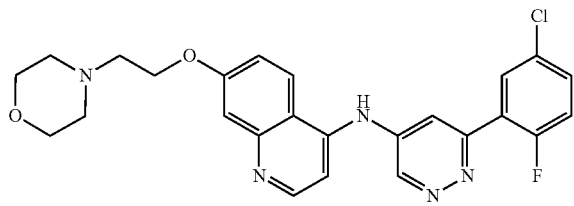

A mixture of Intermediate 3 (0.2 g, 0.89 mmol), Intermediate 17 (376 mg, 1.03 mmol) and $Cs_2CO_3$ (586 mg, 1.79 mmol) in dry 1,4-Dioxane (9 mL) was degassed with N2 for 2 min, then $Pd(OAc)_2$ (10 mg, 0.04 mmol) and Xantphos (52 mg, 0.09 mmol) were added. The mixture was irradiated with MW (110° C., 2 hrs). Little conversion was observed, so more $Pd(OAc)_2$ (10 mg, 0.04 mmol) and Xantphos (52 mg, 0.09 mmol) were added and the mixture was irradiated again at 120° C. for 1 h and 30 minutes. The suspension was partitioned between EtOAc and water and the whole mixture was filtered to remove some insolubles. The organic phase was separated and the aqueous phase was extracted with more EtOAc. The combined organics were washed with brine, dried over $Na_2SO_4$ and filtered. The solvent was evaporated to give a crude which was charged on SCX cartridge washing with MeOH and eluting with 1 N $NH_3$ in MeOH. Basic fraction were collected and evaporated, the residue was purified by reverse phase flash chromatography on Biotage C18 cartridge (from $H_2O$+0.1% $NH_4OH$ to 55% MeCN) and then by flash chromatography on Biotage silica NH cartridge (from DCM to 2% MeOH) to afford the title compound (92 mg, 0.19 mmol, 21% yield) as a yellow solid.

LC-MS (ESI): m/z (M+1): 480.3 (Method 1)

$^1$H NMR (500 MHz, DMSO-$d_6$) δ ppm 9.78 (br s, 1H), 9.19 (br s, 1H), 8.66 (br s, 1H), 8.18 (d, J=9.3 Hz, 1H), 8.00 (dd, J=6.6, 2.7 Hz, 1H), 7.70 (br s, 1H), 7.58-7.66 (m, 1H), 7.46 (dd, J=10.6, 8.9 Hz, 1H), 7.40 (br s, 2H), 7.30 (dd, J=9.1, 1.9 Hz, 1H), 4.27 (t, J=5.8 Hz, 2H), 3.51-3.71 (m, 4H), 2.77 (t, J=5.6 Hz, 2H), 2.46-2.55 (m, 4H).

Example 4: 4-{[6-(5-chloro-2-fluorophenyl)pyridazin-4-yl]amino}-N-[2-(morpholin-4-yl)ethyl]quinoline-7-carboxamide

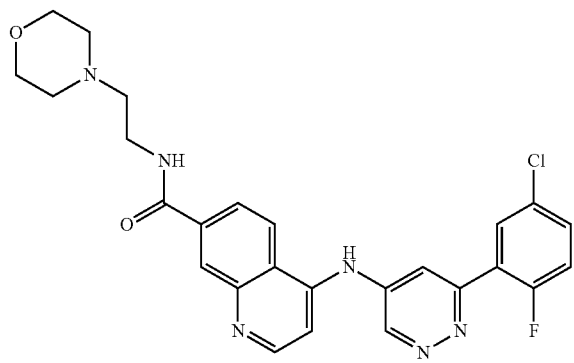 [SMILES: O=C(NCCN1CCOCC1)c1ccc2c(Nc3cnnc(-c4cc(Cl)ccc4F)c3)ccnc2c1]

Intermediate 14 (80 mg, 0.20 mmol) was dissolved in DMF (3 mL), then HATU (99 mg, 0.26 mmol) and DIPEA (0.14 mL, 0.80 mmol) were added, followed by 2-(4-morpholinyl)ethanamine (0.03 mL, 0.26 mmol) after 5 min of stirring. The mixture was stirred at RT overnight, then volatiles were removed under vacuum and the residue was dissolved in MeOH and charged on SCX cartridge washing with MeOH and eluting with 1N $NH_3$ in MeOH); basic fractions were collected and evaporated to afford a yellow oil that was purified by reverse phase flash chromatography on Biotage C18 cartridge (from $H_2O$+0.1% $NH_4OH$ to 50% MeCN) to afford the title compound (30 mg, 0.06 mmol, 30% yield).

LC-MS (ESI): m/z (M+1): 507.4 (Method 1)

$^1$H NMR (500 MHz, DMSO-$d_6$) δ ppm 9.87 (br s, 1H), 9.25 (br s, 1H), 8.68-8.91 (m, 2H), 8.50 (br s, 1H), 8.37 (d, J=8.8 Hz, 1H), 7.97-8.09 (m, 2H), 7.78 (br s, 1H), 7.64 (ddd, J=8.9, 4.2, 2.9 Hz, 2H), 7.46 (dd, J=10.6, 8.9 Hz, 1H), 3.58 (t, J=4.5 Hz, 4H), 3.46 (q, J=6.6 Hz, 2H), 2.51-2.55 (m, 2H), 2.45 (br s, 4H).

Example 5: 2-(morpholin-4-yl)ethyl 4-{[6-(5-chloro-2-fluorophenyl)pyridazin-4-yl]amino}quinoline-6-carboxylate

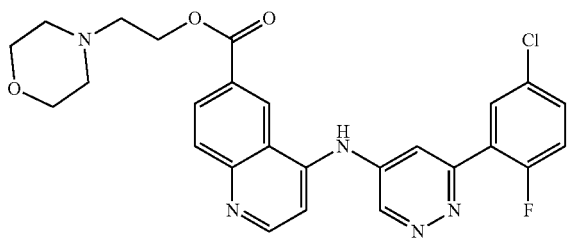

Intermediate 57 (50 mg, 0.125 mmol) was dissolved in DMF (3 mL), then HATU (62 mg, 0.16 mmol) and DIPEA (64 mg, 0.50 mmol) were added, followed by 4-(2-hydroxyethyl)morpholine (21 mg, 0.16 mmol) after 5 min of stirring. The mixture was stirred at RT 90 min, then volatiles were removed under vacuum and the residue was purified by reverse phase flash chromatography on Biotage C18 cartridge on basic condition, then it was further purified by flash chromatography on Biotage silica NH cartridge (from DCM to 35% EtOAc) to afford title compound (20 mg, 0.04 mmol, 31% yield).

LC-MS (ESI): m/z (M+1): 508.3 (Method 1)

$^1$H NMR (400 MHz, DMSO-$d_6$) δ ppm 9.71-10.60 (m, 1H), 9.24 (br s, 1H), 9.01 (d, J=1.5 Hz, 1H), 8.58-8.92 (m, 1H), 8.18-8.30 (m, 1H), 7.96-8.15 (m, 2H), 7.78 (br s, 1H), 7.37-7.70 (m, 3H), 4.48 (t, J=5.8 Hz, 2H), 3.50-3.62 (m, 4H), 2.73 (t, J=5.9 Hz, 2H), 2.42-2.53 (m, 4H).

Example 6: 2-(morpholin-4-yl)ethyl 4-{[6-(5-chloro-2-fluorophenyl)pyridazin-4-yl]amino}quinoline-7-carboxylate

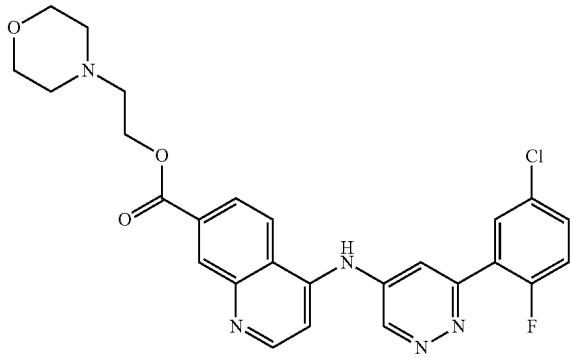 [SMILES: O=C(OCCN1CCOCC1)c1ccc2c(Nc3cnnc(-c4cc(Cl)ccc4F)c3)ccnc2c1]

Title compound (11 mg, 0.02 mmol, 17% yield) was prepared following the procedure used for the synthesis of Example 5 starting from Intermediate 14 (50 mg, 0.12 mmol) and 4-(2-hydroxyethyl)morpholine (21 mg, 0.16 mmol).

LC-MS (ESI): m/z (M+1): 508.4 (Method 1)

$^1$H NMR (400 MHz, DMSO-d$_6$) δ ppm 9.74-10.13 (m, 1H), 9.24 (d, J=1.1 Hz, 1H), 8.73-8.83 (m, 1H), 8.55 (br s, 1H), 8.44 (d, J=8.8 Hz, 1H), 8.09 (d, J=8.3 Hz, 1H), 8.01 (dd, J=6.6, 2.9 Hz, 1H), 7.77 (br s, 1H), 7.64 (ddd, J=8.9, 4.3, 2.9 Hz, 2H), 7.46 (dd, J=10.6, 8.9 Hz, 1H), 4.49 (t, J=5.7 Hz, 2H), 3.54-3.62 (m, 4H), 2.76 (t, J=5.7 Hz, 2H), 2.48-2.53 (m, 4H).

Example 7: N-(4-{[6-(5-chloro-2-fluorophenyl)pyridazin-4-yl]amino}pyridin-2-yl)cyclopropanecarboxamide

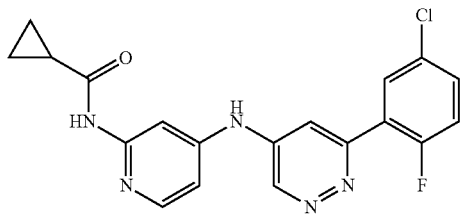 [SMILES: O=C(Nc1cc(Nc2cnnc(-c3cc(Cl)ccc3F)c2)ccn1)C1CC1]

Example 7 was prepared (35 mg, 0.09 mmol, 20% yield) following the procedure used for the synthesis of Example 1 starting from Intermediate 44 (130 mg, 0.54 mmol) and Intermediate 3 (100 mg, 0.45 mmol).

LC-MS (ESI): m/z (M+1): 384.2 (Method 1)

$^1$H NMR (400 MHz, DMSO-d$_6$) δ ppm 10.76 (s, 1H), 9.85 (s, 1H), 9.05 (d, J=2.6 Hz, 1H), 8.18 (d, J=5.7 Hz, 1H), 8.05 (d, J=2.0 Hz, 1H), 7.99 (dd, 2.9 Hz, 1H), 7.60-7.68 (m, 2H), 7.46 (dd, J=10.4, 8.9 Hz, 1H), 6.98 (dd, J=5.6, 2.1 Hz, 1H), 1.95-2.06 (m, 1H), 0.72-0.92 (m, 4H).

Example 8 N-(4-{[6-(5-chloro-2-fluorophenyl)pyridazin-4-yl]amino}pyridin-2-yl)-4-(morpholin-4-yl)butanamide

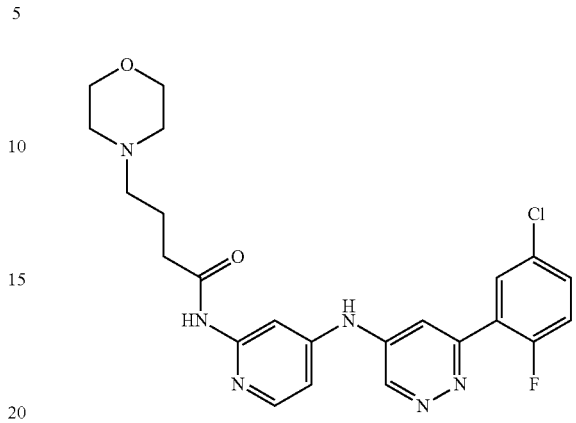

Example 8 was prepared following the procedure used for the synthesis of Example 3 starting from Intermediate 42 (56 mg, 0.17 mmol) and Intermediate 3 (35 mg, 0.16 mmol) to afford title compound (28 mg, 0.06 mmol, 38% yield).

LC-MS (ESI): m/z (M+1): 471.3 (Method 1)

$^1$H NMR (500 MHz, DMSO-d$_6$) δ ppm 10.43 (s, 1H), 9.88 (s, 1H), 9.05 (d, J=2.7 Hz, 1H), 8.17 (d, J=5.5 Hz, 1H), 8.07 (d, J=1.6 Hz, 1H), 8.00 (dd, 2.7 Hz, 1H), 7.68 (dd, J=2.7, 1.4 Hz, 1H), 7.61-7.66 (m, 1H), 7.46 (dd, J=10.4, 8.8 Hz, 1H), 7.00 (dd, J=5.8, 2.2 Hz, 1H), 3.52 (t, J=4.5 Hz, 4H), 2.40 (t, J=7.1 Hz, 2H), 2.25-2.37 (m, 6H), 1.74 (quin, J=7.2 Hz, 2H)

Example 9: N-[6-(5-chloro-2-fluorophenyl)pyridazin-4-yl]-7-[2-(piperazin-1-yl)ethoxy]quinolin-4-amine

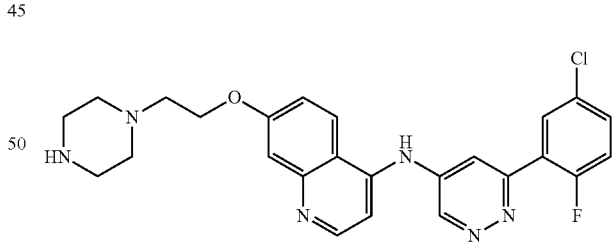

Example 9 was prepared following the procedure used for the synthesis of Example 2 starting from Intermediate 19 (30 mg, 0.05 mmol) to afford title compound (17 mg, 0.03 mmol, 69% yield).

LC-MS (ESI): m/z (M+1): 479.4 (Method 2)

$^1$H NMR (400 MHz, DMSO-d$_6$) δ ppm 9.65-9.90 (m, 1H), 9.19 (br s, 1H), 8.54-8.83 (m, 1H), 8.18 (d, J=9.2 Hz, 1H), 8.00 (dd, J=6.6, 2.8 Hz, 1H), 7.70 (br s, 1H), 7.60-7.67 (m, 1H), 7.45 (dd, J=10.6, 8.9 Hz, 1H), 7.39 (br s, 2H), 7.25-7.33 (m, 1H), 4.25 (t, J=5.7 Hz, 2H), 2.58-2.88 (m, 7H), 2.43 (br s, 4H).

Example 10: 4-{[6-(5-chloro-2-fluorophenyl)pyridazin-4-yl]amino}-N-[2-(piperazin-1-yl)ethyl]quinoline-7-carboxamide

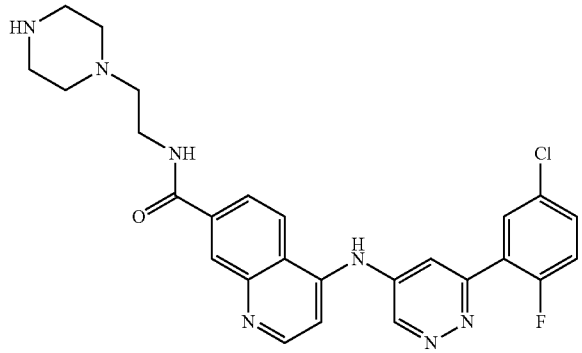 [SMILES: O=C(NCCN1CCNCC1)c1ccc2c(Nc3cnnc(-c4cc(Cl)ccc4F)c3)ccnc2c1]

Example 10 was prepared following the procedure used for the synthesis of Example 2 starting from Intermediate 16 (48 mg, 0.08 mmol) to afford title compound (15 mg, 0.03 mmol, 37% yield) as a yellow solid.

LC-MS (ESI): m/z (M+1): 506.4 (Method 1)

$^1$H NMR (400 MHz, Chloroform-d) δ ppm 9.22 (d, J=1.9 Hz, 1H), 8.91 (d, J=4.9 Hz, 1H), 8.41 (s, 1H), 8.17 (dd, J=6.6, 2.6 Hz, 1H), 8.11 (d, J=8.7 Hz, 1H), 8.00 (d, J=8.4 Hz, 1H), 7.74 (br s, 2H), 7.51 (d, J=4.8 Hz, 1H), 7.36-7.45 (m, 1H), 7.20 (t, J=4.3 Hz, 1H), 7.13 (dd, J=10.4, 9.0 Hz, 1H), 3.64 (q, J=5.3 Hz, 2H), 2.93 (t, J=4.7 Hz, 4H), 2.61-2.73 (m, 2H), 2.51 (br s, 4H).

Example 11: N-(4-{[6-(5-chloro-2-fluorophenyl)pyridazin-4-yl]amino}pyridin-2-yl)-3-(4-methylpiperazin-1-yl)propanamide

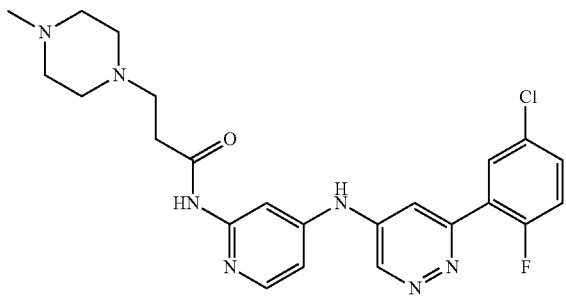 [SMILES: CN1CCN(CCC(=O)Nc2cc(Nc3cnnc(-c4cc(Cl)ccc4F)c3)ccn2)CC1]

Example 11 was prepared following the procedure used for the synthesis of Example 1 starting from Intermediate 32 (154 mg, 0.47 mmol), and Intermediate 3 (100 mg, 0.45 mmol) to afford title compound (114 mg, 0.24 mmol, 54% yield) as white solid.

LC-MS (ESI): m/z (M+1): 470.4 (Method 1)

$^1$H NMR (400 MHz, Chloroform-d) δ ppm 11.32 (s, 1H), 9.04 (d, J=2.6 Hz, 1H), 8.24 (d, J=5.5 Hz, 1H), 8.18 (dd, J=6.7, 2.7 Hz, 1H), 8.05 (d, J=2.0 Hz, 1H), 7.70 (dd, 1.5 Hz, 1H), 7.41 (ddd, J=8.8, 4.2, 2.9 Hz, 1H), 7.10-7.20 (m, 2H), 6.95 (dd, J=5.6, 2.1 Hz, 1H), 2.49-2.90 (m, 12H), 2.37 (s, 3H). 2.50-2.84 (m, 8H), 2.45 (q, J=7.26 Hz, 2H), 1.12 (t, J=7.26 Hz, 3H).

Example 12: N-[6-(5-chloro-2-fluorophenyl)pyridazin-4-yl]-7-[2-(4-methylpiperazin-1-yl)ethoxy]quinolin-4-amine

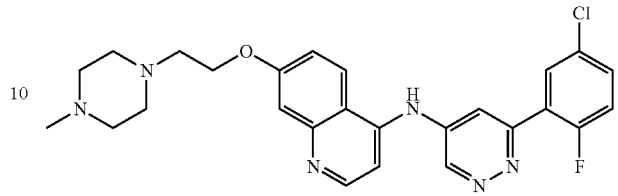

Example 12 was prepared following the procedure used for the synthesis of Example 3 starting from Intermediate 23 (159 mg, 0.52 mmol) and Intermediate 3 (100 mg, 0.43 mmol) to afford title compound (80 mg, 0.16 mmol, 37% yield).

LC-MS (ESI): m/z (M+1): 493.1 (Method 1)

$^1$H NMR (400 MHz, DMSO-$d_6$) δ ppm 9.76 (s, 1H), 9.19 (s, 2H), 8.67 (s, 1H), 8.18 (d, J=9.25 Hz, 2H), 8.00 (dd, J=6.58, 2.78 Hz, 2H), 7.69 (s, 2H), 7.63 (ddd, J=8.80, 4.25, 2.77 Hz, 2H), 7.45 (dd, J=10.63, 8.87 Hz, 3H), 7.39 (s, 3H), 7.29 (d, J=9.24 Hz, 2H), 4.25 (t, J=5.74 Hz, 4H), 2.76 (t, J=5.68 Hz, 4H), 2.52 (s, 13H), 2.33 (s, 4H), 2.15 (s, 6H), 1.23 (s, 1H).

Example 13: 4-{[6-(5-chloro-2-fluorophenyl)pyridazin-4-yl]amino}-N-[3-(4-methylpiperazin-1-yl)ethyl]quinoline-7-carboxamide

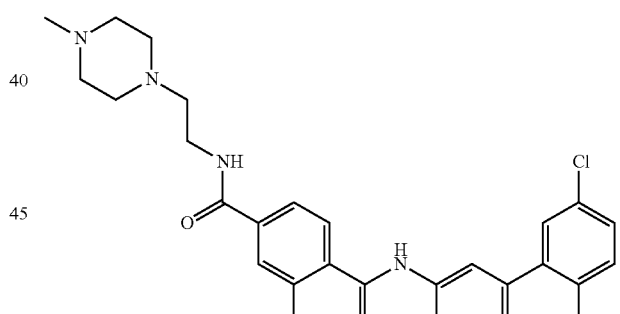

Example 13 was prepared following the procedure used for the synthesis of Example 4 starting from Intermediate 15 (74 mg, 0.19 mmol) and 1-(2-aminoethyl)-4-methylpiperazine (36 mg, 0.26 mmol) to afford title compound (23 mg, 0.04 mmol, 24% yield).

LC-MS (ESI): m/z (M+1): 520.3 (Method 2)

$^1$H NMR (400 MHz, Chloroform-d) δ ppm 9.26 (d, J=2.64 Hz, 1H), 8.87-8.97 (m, 1H), 8.39 (br.s, 1H), 8.09-8.21 (m, 2H), 7.92-7.99 (m, 2H), 7.77 (br.s, 1H), 7.49-7.58 (m, 1H), 7.39-7.46 (m, 1H), 7.08-7.21 (m, 2H), 3.65 (q, J=5.28 Hz, 2H), 2.68 (t, J=5.83 Hz, 2H), 2.45-2.66 (m, 7H), 2.33 (s, 3H).

Example 14: 4-{[6-(5-chloro-2-fluorophenyl)pyridazin-4-yl]amino}-N-[2-(1-methylpiperidin-4-yl)ethyl]quinoline-7-carboxamide

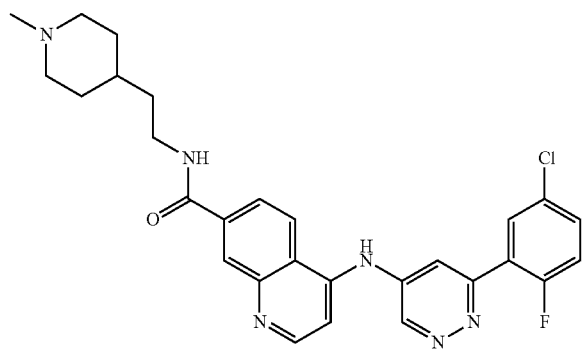 [SMILES: CN1CCC(CCNC(=O)c2ccc3c(Nc4cnnc(-c5cc(Cl)ccc5F)c4)ccnc3c2)CC1]

Example 14 was prepared following the procedure used for the synthesis of Example 4 starting from Intermediate 15 (49 mg, 0.12 mmol) and 2-(1-methylpiperidin-4-yl)ethanamine (25 mg, 0.18 mmol) to afford title compound (8.5 mg, 0.02 mmol, 13% yield).

LC-MS (ESI): m/z (M+1): 519.4 (Method 1)

$^1$H NMR (400 MHz, Chloroform-d) δ ppm 9.23 (d, J=2.53 Hz, 1H), 8.89 (d, J=4.51 Hz, 1H), 8.36 (br.s, 1H), 8.10-8.19 (m, 2H), 7.91-7.98 (m, 2H), 7.75 (br.s, 1H), 7.50 (d, J=4.40 Hz, 1H), 7.42 (ddd, J=8.80, 4.29, 2.75 Hz, 1H), 7.13 (dd, J=10.67, 8.80 Hz, 1H), 6.52 (t, J=5.50 Hz, 1H) 3.54-3.63 (m, 2H), 2.84-2.91 (m, 2H), 2.29 (s, 3H) 1.96 (t, J=11.17 Hz, 2H) 1.57-1.84 (m, 5H) 1.35-1.43 (m, 2H).

Example 15: N-(4-{[6-(5-chloro-2-fluorophenyl)-3-methylpyridazin-4-yl]amino}pyridin-2-yl)cyclopropanecarboxamide

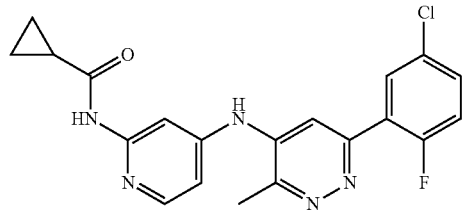 [SMILES: Cc1nnc(-c2cc(Cl)ccc2F)cc1Nc1ccnc(NC(=O)C2CC2)c1]

In a suitable vial, Intermediate 33 (65 mg, 0.25 mmol), Intermediate 47 (50 mg, 0.28 mmol), Xantphos (22 mg, 0.04 mmol) and K$_3$PO$_4$ (109 mg, 0.51 mmol) were mixed in 1,4-Dioxane (4 mL). N$_2$ was bubbled for 2 min before adding Pd$_2$(dba)$_3$ (24 mg, 0.03 mmol), then the vial was sealed and submitted to MW cycle at 100° C. for 5 hrs. The reaction mixture was diluted with EtOAc and filtered. The filtrate was concentrated under reduced pressure and the crude material was purified by flash chromatography on Biotage silica NH cartridge (from cHex to 60% EtOAc) to afford title compound (32 mg, 0.08 mmol, 32% yield).

LC-MS (ESI): m/z (M+1): 413.3 (Method 1)

$^1$H NMR (400 MHz, DMSO-d$_6$) δ ppm 10.72 (s, 1H), 8.83 (s, 1H) 8.15 (d, J=5.50 Hz, 1H), 8.07 (d, J=1.76 Hz, 1H), 7.97 (dd, J=6.49, 2.75 Hz, 1H), 7.71 (s, 1H), 7.61 (ddd, J=8.86, 4.24, 2.75 Hz, 1H), 7.43 (dd, J=10.56, 8.80 Hz, 1H), 6.96 (dd, J=5.50, 2.20 Hz, 1H), 2.67 (s, 3H), 1.93-2.10 (m, 1H), 0.76-0.87 (m, 4H).

Example 16: N-(4-{[6-(5-chloro-2-fluorophenyl)-3-methylpyridazin-4-yl]amino}pyridin-2-yl)-3-(4-methylpiperazin-1-yl)propanamide

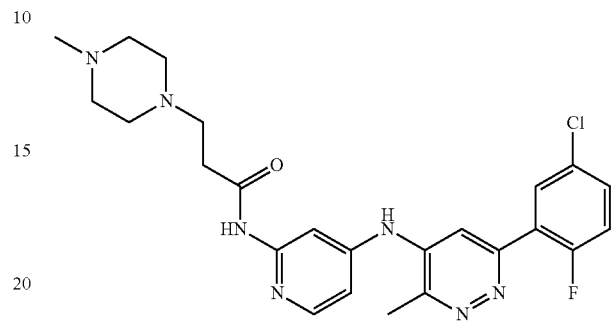

Example 16 was prepared following the procedure used for the synthesis of Example 15 starting from Intermediate 36 (113 mg, 0.43 mmol) and Intermediate 33 (100 mg, 0.39 mmol) to afford title compound (734 mg, 0.15 mmol, 39% yield).

LC-MS (ESI): m/z (M+1): 484.3 (Method 1)

$^1$H NMR (500 MHz, DMSO-d$_6$) δ ppm 10.63 (s, 1H), 8.85 (s, 1H), 8.14 (d, J=5.8 Hz, 1H), 8.08 (d, J=1.6 Hz, 1H), 7.98 (dd, J=6.5, 2.8 Hz, 1H), 7.71 (d, J=1.0 Hz, 1H), 7.60 (ddd, J=8.9, 4.2, 2.7 Hz, 1H), 7.42 (dd, J=10.5, 8.9 Hz, 1H), 6.97 (dd, J=5.7, 2.1 Hz, 1H), 2.68 (s, 3H), 2.58-2.62 (m, 2H), 2.51-2.54 (m, 2H), 2.17-2.54 (m, 8H), 2.14 (s, 3H).

Example 17: N-[6-(5-chloro-2-fluorophenyl)pyridazin-4-yl]-7-[2-(1-methylpiperidin-4-yl)ethoxy]quinolin-4-amine

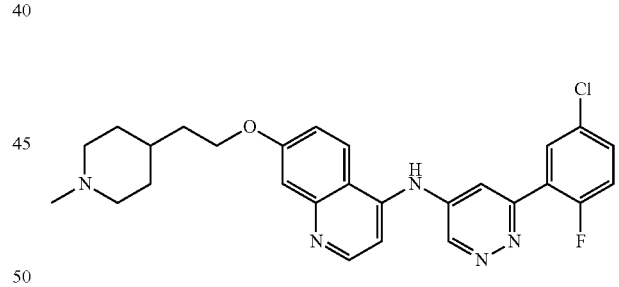

Sodium triacetoxyborohydride (70.5 mg, 0.33 mmol) was added to a mixture of Intermediate 26 (106 mg, 0.22 mmol) and paraformaldehyde (13 mg, 0.44 mmol) in DCM (10 mL)/MeOH (2 mL), then 1 drop of AcOH was added. The resulting mixture was stirred at RT overnight. The reaction was not complete, so more paraformaldehyde (13 mg, 0.44 mmol) and sodium triacetoxyborohydride (70.5 mg, were added. After further 2 hrs at RT the mixture was quenched with a s. s. of NaHCO$_3$, then it was diluted with DCM. The aqueous phase was extracted with more DCM, then the combined organics were washed with brine, dried over Na$_2$SO$_4$ and filtered. The solvent was evaporated to give a yellow crude which was purified by reverse phase flash chromatography on Biotage C18 cartridge (from H$_2$O+0.1% HCOOH to 30% MeCN+0.1% HCOOH). The opportune fractions were evaporated and the resulting product was purified again by SCX cartridge eluting with 1 N NH₃ in MeOH to afford title compound (55 mg, 0.11 mmol, 50% yield) as a yellow solid.

LC-MS (ESI): m/z (M+1): 492.4 (Method 1)

¹H NMR (400 MHz, DMSO-d₆) δ ppm 9.78 (br s, 1H), 9.18 (br d, J=1.5 Hz, 1H), 8.65 (br s, 1H), 8.17 (d, J=9.2 Hz, 1H), 8.00 (dd, J=6.6, 2.7 Hz, 1H), 7.69 (br s, 1H), 7.63 (ddd, J=8.9, 4.2, 2.8 Hz, 1H), 7.45 (dd, J=10.6, 8.9 Hz, 1H), 7.31-7.41 (m, 2H), 7.28 (dd, J=9.1, 2.1 Hz, 1H), 4.19 (t, J=6.5 Hz, 2H), 2.74 (br d, J=11.4 Hz, 2H), 2.13 (s, 3H), 1.82 (td, J=11.6, 2.0 Hz, 2H), 1.66-1.77 (m, 4H), 1.38-1.54 (m, 1H), 1.24 (qd, J=12.3, 3.5 Hz, 2H).

Example 18: N-(4-{[6-(5-chloro-2-fluorophenyl)pyridazin-4-yl]amino}pyridin-2-yl)-3-[Methyl(Oxetan-3-yl)amino]propanamide

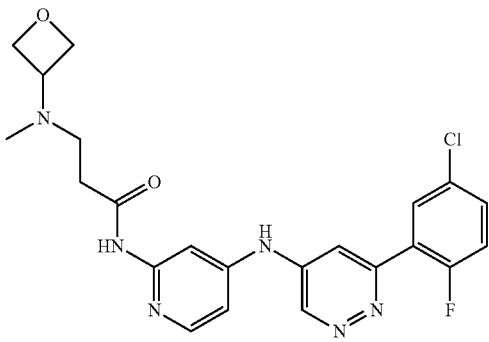 [SMILES: CN(CCC(=O)Nc1cc(Nc2cnnc(-c3cc(Cl)ccc3F)c2)ccn1)C1COC1]

Example 18 was prepared following the procedure used for the synthesis of Example 3 starting from Intermediate 40 (174 mg, 0.55 mmol) and Intermediate 3 (95 mg, 0.42 mmol)) to afford title compound (19 mg, 0.04 mmol, 10% yield).

LC-MS (ESI): m/z (M+1): 457.1 (Method 1)

¹H NMR (500 MHz, DMSO-d₆) δ ppm 10.56 (s, 1H), 9.90 (s, 1H), 9.05 (d, J=2.7 Hz, 1H), 8.18 (d, J=5.6 Hz, 1H), 8.07 (d, J=1.1 Hz, 1H), 8.00 (dd, 2.7 Hz, 1H), 7.68 (dd, J=2.5, 1.3 Hz, 1H), 7.64 (ddd, J=8.9, 4.2, 2.9 Hz, 1H), 7.46 (dd, J=10.5, 8.9 Hz, 1H), 7.02 (dd, J=5.6, 2.2 Hz, 1H), 4.31-4.54 (m, 4H), 3.51 (quin, J=6.5 Hz, 1H), 2.46-2.53 (m, 4H), 2.08 (s, 3H).

Example 19: N-(4-{[6-(5-chloro-2-fluorophenyl)pyridazin-4-yl]amino}pyridin-2-yl)-1-methylpiperidine-4-carboxamide

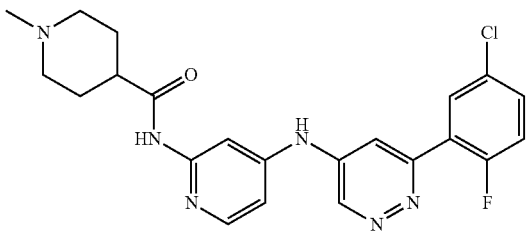 [SMILES: CN1CCC(C(=O)Nc2cc(Nc3cnnc(-c4cc(Cl)ccc4F)c3)ccn2)CC1]

Example 19 was prepared following the procedure used for the synthesis of Example 1 starting from Intermediate 45 (117 mg, 0.39 mmol) and Intermediate 3 (80 mg, 0.36 mmol) to afford title compound (47 mg, 0.11 mmol, 30% yield) as white solid.

LC-MS (ESI): m/z (M+1): 441.1 (Method 1)

¹H NMR (500 MHz, DMSO-d₆) δ ppm 10.41 (s, 1H), 9.85 (s, 1H), 9.06 (d, J=2.7 Hz, 1H), 8.17 (d, J=5.8 Hz, 1H), 8.07 (d, J=1.9 Hz, 1H), 8.00 (dd, 2.8 Hz, 1H), 7.67 (dd, J=2.6, 1.4 Hz, 1H), 7.64 (ddd, J=8.8, 4.2, 2.7 Hz, 1H), 7.47 (dd, J=10.6, 8.8 Hz, 1H), 6.99 (dd, J=5.6, 2.2 Hz, 1H), 2.74-2.84 (m, 2H), 2.44 (tt, J=11.5, 4.0 Hz, 1H), 2.14 (s, 3H), 1.83 (td, J=11.6, 2.4 Hz, 2H), 1.57-1.77 (m, 4H).

Example 20: 1-methylpiperidin-4-yl 4-{[6-(5-chloro-2-fluorophenyl)pyridazin-4-yl]amino}quinoline-7-carboxylate

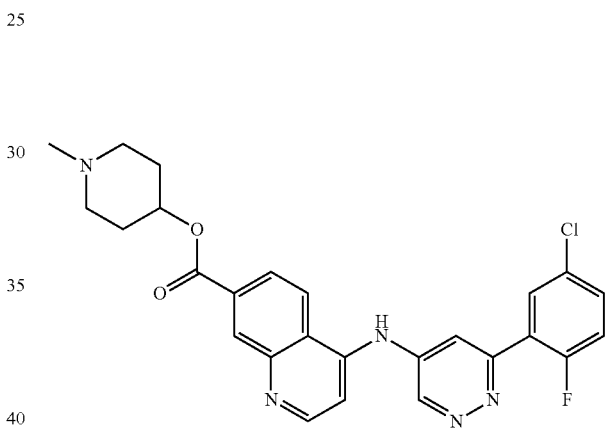

SOCl₂ (0.65 mL, 9.01 mmol) was added to Intermediate 15 (100 mg, 0.25 mmol) under N₂ at RT. The mixture was stirred and warmed at 80° C. for 30 min. SOCl₂ in excess was evaporated under reducing pressure. The residue was cooled at 5-10° C. and a solution of 1-methyl-4-piperidinol (286 mg, 2.48 mmol) and TEA (0.13 mL, 0.74 mmol) in DCM (6.5 mL) was added under stirring. The reaction was allowed to reach RT and stirred for 2 hrs. The mixture was treated with water. Organic layer was separated, dried over Na₂SO₄ and evaporated. The residue was purified by flash chromatography on Biotage silica cartridge (from DCM to 3% MeOH) to afford title compound (15 mg, 0.03 mmol, 12% yield).

LC-MS (ESI): m/z (M+1): 492 (Method 2)

¹H NMR (400 MHz, DMSO-d₆) δ ppm 9.93 (s, 1H), 9.25 (s, 2H), 8.83 (s, 1H), 8.56 (s, 2H), 8.43 (d, J=8.79 Hz, 2H), 8.10 (d, J=8.60 Hz, 2H), 8.01 (dd, J=6.56, 2.80 Hz, 2H), 7.78 (s, 2H), 7.63 (ddd, J=8.87, 4.27, 2.75 Hz, 4H), 7.46 (dd, J=8.84 Hz, 2H), 5.03 (dd, J=8.28, 4.17 Hz, 2H), 2.62 (s, 3H), 2.28 (t, J=9.68 Hz, 4H), 2.21 (s, 6H), 1.98 (s, 3H), 1.75-1.87 (m, 4H).

Example 21: 4-{[6-(5-chloro-2-fluorophenyl)pyridazin-4-yl]amino}-N-[2-(4-methylpiperazin-1-yl)ethyl]-1H-pyrrolo[2,3-b]pyridine-3-carboxamide

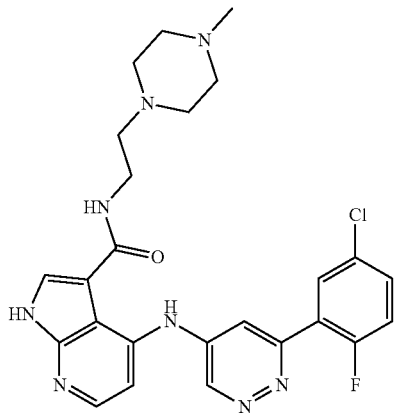 [SMILES: CN1CCN(CCNC(=O)c2c[nH]c3nccc(Nc4cnnc(-c5cc(Cl)ccc5F)c4)c23)CC1]

TFA (0.04 mL, 0.56 mmol) was added to a solution of Intermediate 8 (36 mg, mmol) in DCM (2 mL). The reaction mixture was stirred overnight, then volatiles were removed and the residue was dissolved in MeOH and charged on SCX cartridge washing with MeOH and eluting with 1 N NH$_3$ in MeOH. Basic fractions were collected, evaporated and purified by flash chromatography on Biotage silica NH cartridge (from EtOAc to 10% MeOH) to afford title compound (8.2 mg, 0.02 mmol, 29% yield) as pale orange solid.

LC-MS (ESI): m/z (M+1): 509.1 (Method 1)

$^1$H NMR (400 MHz, Chloroform-d) δ ppm 12.07 (s, 1H), 10.64 (br s, 1H), 9.22 (d, J=2.6 Hz, 1H), 8.29 (d, J=5.5 Hz, 1H), 8.19 (dd, J=6.5, 2.7 Hz, 1H), 7.86 (br s, 1H), 7.69 (s, 1H), 7.37-7.49 (m, 2H), 7.22 (d, J=5.5 Hz, 1H), 7.16 (dd, J=10.3, 8.9 Hz, 1H), 6.98 (br s, 1H), 3.59 (q, J=5.3 Hz, 2H), 2.67 (t, J=5.8 Hz, 2H), 2.36-2.71 (m, 8H), 2.32 (s, 3H).

Example 22: N-(4-{[6-(5-chloro-2-fluorophenyl)pyridazin-4-yl]amino}pyridin-2-yl)-3-(4-methyl-2-oxopiperazin-1-yl)propanamide

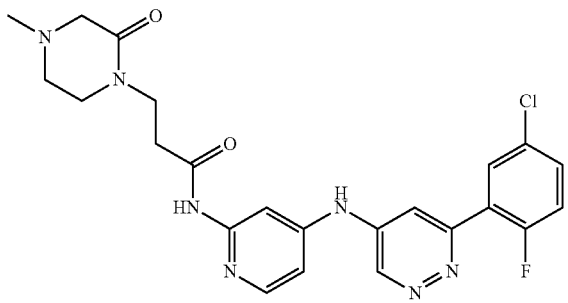 [SMILES: CN1CCN(CCC(=O)Nc2cc(Nc3cnnc(-c4cc(Cl)ccc4F)c3)ccn2)C(=O)C1]

Example 22 was prepared following the procedure used for the synthesis of Example 1 starting from Intermediate 43 (151 mg, 0.44 mmol) and Intermediate 3 (90 mg, 0.40 mmol) to afford title compound (27 mg, 0.06 mmol, 14% yield).

LC-MS (ESI): m/z (M+1): 484.1 (Method 2)

$^1$H NMR (400 MHz, DMSO-d$_6$) δ ppm 10.54 (s, 1H), 9.89 (s, 1H), 9.05 (d, J=2.4 Hz, 1H), 8.18 (d, J=5.7 Hz, 1H), 8.02 (br s, 1H), 8.00 (dd, J=6.6, 2.9 Hz, 1H), 7.68 (s, 1H), 7.60-7.66 (m, 1H), 7.47 (dd, J=10.4, 8.9 Hz, 1H), 7.02 (dd, J=5.7, 2.0 Hz, 1H), 3.55 (t, J=6.9 Hz, 2H), 3.27-3.35 (m, 2H), 2.89 (s, 2H), 2.63 (t, J=7.0 Hz, 2H), 2.52-2.57 (m, 2H), 2.18 (s, 3H).

Example 23: 4-{[6-(5-chloro-2-fluorophenyl)pyridazin-4-yl]amino}-N-(1-Methylazetidin-3-yl)-1,7-Naphthyridine-6-carboxamide

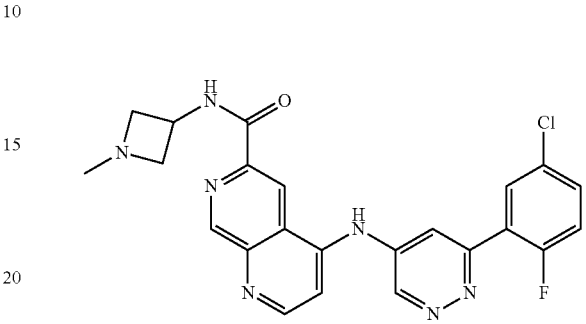

In a vial, to a mixture of Intermediate 54 (90.0 mg, 0.23 mmol), DIPEA (0.1 mL, 0.57 mmol) and T3P 50% solution in DMF (0.16 mL, 0.27 mmol), DMF (3.2 mL) was added followed by 1-methylazetidin-3-amine (29 mg, 0.34 mmol). The reaction was stirred at RT overnight. The mixture was purified by reverse phase flash chromatography on Biotage C18 cartridge (from H$_2$O+0.1% NH$_4$OH to 30% MeCN) to afford title compound (3.1 mg, 0.01 mmol, 3% yield) as pale yellow solid.

LC-MS (ESI): m/z (M+1): 464.2 (Method 1)

$^1$H NMR (400 MHz, Chloroform-d) ppm 9.33-9.42 (m, 2H), 9.11 (s, 1H), 8.97 (d, J=5.06 Hz, 2H), 8.61 (s, 1H), 8.18 (dd, J=6.71, 2.75 Hz, 1H), 7.90 (dd, J=2.64, 1.54 Hz, 1H), 7.67 (d, J=5.06 Hz, 1H), 7.38-7.47 (m, 1H), 7.14 (dd, J=10.56, 8.80 Hz, 1H), 4.86-5.02 (m, 1H), 4.05 (t, J=8.47 Hz, 2H), 3.69-3.83 (m, 2H), 2.66 (s, 3H).

Example 24: N-(4-{[6-(5-chloro-2-fluorophenyl)pyridazin-4-yl]amino}pyridin-2-yl)-3-(4-methyl-3-oxopiperazin-1-yl)propanamide

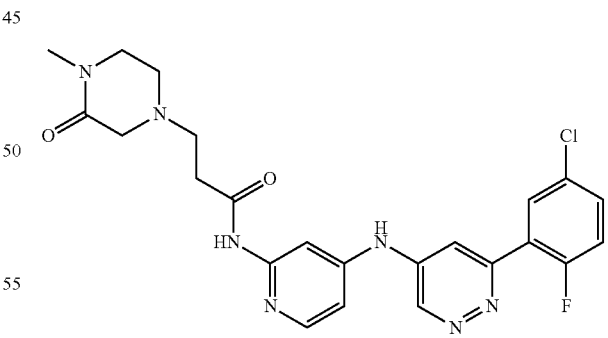

Example 24 was prepared following the procedure used for the synthesis of Example 3 starting from Intermediate 39 (147 mg, 0.43 mmol) and Intermediate 3 (80 mg, 0.36 mmol) to afford title compound (78 mg, 0.16 mmol, 45% yield).

LC-MS (ESI): m/z (M+1): 484.1 (Method 1)

$^1$H NMR (400 MHz, DMSO-d$_6$) δ ppm 9.87 (s, 1H), 10.54 (s, 1H), 9.05 (d, J=2.7 Hz, 1H), 8.18 (d, J=5.6 Hz, 1H), 8.06 (d, J=1.3 Hz, 1H), 8.00 (dd, 2.7 Hz, 1H), 7.67-7.69 (m, 1H), 7.64 (ddd, J=8.8, 4.2, 2.8 Hz, 1H), 7.47 (dd, J=10.5, 8.9 Hz, 1H), 7.01 (dd, J=5.6, 2.1 Hz, 1H), 3.24 (t, J=5.4 Hz, 2H), 3.03 (s, 2H), 2.80 (s, 3H), 2.64-2.72 (m, 4H), 2.54-2.60 (m, 2H).

Example 25: 4-{[6-(5-chloro-2-fluorophenyl)pyridazin-4-yl]amino}-N-[2-(4-methylpiperazin-1-yl)ethyl]-1H-pyrrolo[2,3-b]pyridine-2-carboxamide

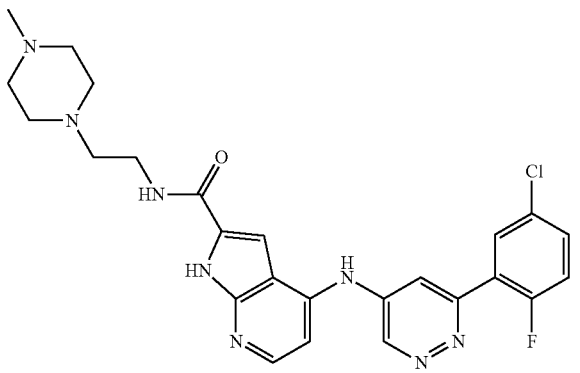 [SMILES: CN1CCN(CCNC(=O)c2cc3c(Nc4cnnc(-c5cc(Cl)ccc5F)c4)ccnc3[nH]2)CC1]

Example 25 was prepared following the procedure used for the synthesis of Example 21 starting from Intermediate 11 (25 mg, 0.04 mmol) to afford title compound (11 mg, 0.02 mmol, 55% yield).

LC-MS (ESI): m/z (M+1): 509.1 (Method 1)

$^1$H NMR (500 MHz, DMSO-d$_6$) δ ppm 11.87-12.35 (m, 1H), 9.60-10.10 (m, 1H), 9.13 (d, J=2.4 Hz, 1H), 8.30-8.39 (m, 1H), 8.23 (d, J=5.5 Hz, 1H), 8.00 (dd, J=6.5, 2.7 Hz, 1H), 7.57-7.68 (m, 2H), 7.44 (dd, J=10.6, 8.9 Hz, 1H), 7.17 (s, 1H), 7.09 (d, J=5.5 Hz, 1H), 3.39 (q, J=6.7 Hz, 2H), 2.19-2.49 (m, 10H), 2.13 (s, 3H).

Example 26: 4-{[6-(5-chloro-2-fluorophenyl)pyridazin-4-yl]amino}-N-(1-methylpiperidin-4-yl)-1,7-Naphthyridine-6-carboxamide

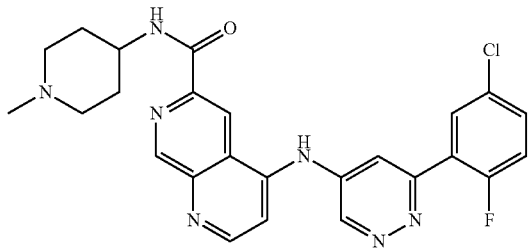 [SMILES: CN1CCC(NC(=O)c2cc3c(Nc4cnnc(-c5cc(Cl)ccc5F)c4)ccnc3cn2)CC1]

Example 26 was prepared following the procedure used for the synthesis of Example 23 starting from Intermediate 54 (90.0 mg, 0.23 mmol) and 1-methylpiperidin-4-amine (40 mg, 0.34 mmol) to afford title compound (5.5 mg, 0.01 mmol, 5% yield) as pale yellow solid.

LC-MS (ESI): m/z (M+1): 492.1 (Method 1)

$^1$H NMR (400 MHz, Chloroform-d) δ ppm 9.41 (s, 1H), 9.38 (d, J=2.4 Hz, 1H), 9.26 (br s, 1H), 9.16 (s, 1H), 9.00 (d, J=5.3 Hz, 1H), 8.29 (d, J=8.3 Hz, 1H), 8.19 (dd, J=6.8, 2.6 Hz, 1H), 7.91 (s, 1H), 7.71 (d, J=5.3 Hz, 1H), 7.42 (ddd, 4.1, 2.9 Hz, 1H), 7.13 (dd, J=10.5, 9.0 Hz, 1H), 3.81-3.99 (m, 1H), 2.76 (d, J=11.6 Hz, 2H), 2.26 (s, 3H), 2.02 (t, J=11.1 Hz, 2H), 1.90 (d, J=10.3 Hz, 2H), 1.56-1.69 (m, 2H).

Example 27: 4-{[6-(5-chloro-2-fluorophenyl)pyridazin-4-yl]amino}-N-[2-(1-methylpiperidin-4-yl)ethyl]-1H-pyrrolo[2,3-b]pyridine-2-carboxamide

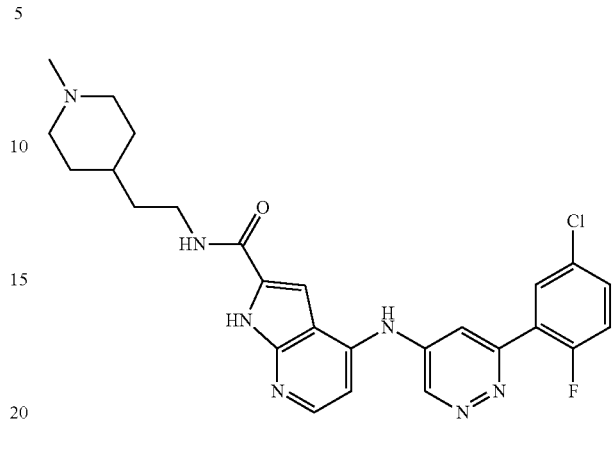

Example 27 was prepared following the procedure used for the synthesis of Example 21 starting from Intermediate 12 (22 mg, 0.03 mmol) to afford title compound (9 mg, 0.02 mmol, 51% yield).

LC-MS (ESI): m/z (M+1): 508.2 (Method 1)

$^1$H NMR (500 MHz, DMSO-d$_6$) δ ppm 11.91-12.28 (m, 1H), 9.68-10.01 (m, 1H), 9.12 (br s, 1H), 8.37 (t, J=5.4 Hz, 1H), 8.23 (d, J=5.3 Hz, 1H), 8.00 (dd, J=6.6, 2.9 Hz, 1H), 7.56-7.67 (m, 2H), 7.44 (dd, J=10.3, 9.0 Hz, 1H), 7.17 (s, 1H), 7.08 (d, J=5.3 Hz, 1H), 3.24-3.37 (m, 2H), 2.64-2.79 (m, 2H), 2.11 (s, 3H), 1.77 (t, J=10.6 Hz, 2H), 1.60-1.70 (m, 2H), 1.45 (q, J=6.9 Hz, 2H), 1.07-1.32 (m, 3H).

Example 28: 4-{[6-(5-chloro-2-fluorophenyl)pyridazin-4-yl]amino}quinolin-7-yl 4-methylpiperazine-1-carboxylate

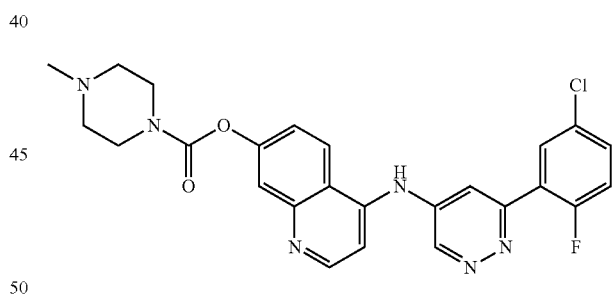

K$_2$CO$_3$ (48.23 mg, 0.35 mmol) was added to a stirred mixture of Intermediate 28 (80 mg, 0.17 mmol) in DMF (2 mL) at RT. After 30 minutes the mixture was cooled at 5-10° C. and 4-methyl-1-piperazinecarbonyl chloride hydrochloride (41.69 mg, 0.21 mmol) was added. The reaction was warmed at RT. After 1 h the reaction was treated with water and extracted with EtOAc. Organic layer was separated, dried over Na$_2$SO$_4$ and evaporated. The residue was purified by flash chromatography on Biotage silica cartridge (from DCM to 3% MeOH) to afford title compound (35 mg, mmol, 41% yield).

LC-MS (ESI): m/z (M+1): 493.0 (Method 1)

$^1$H NMR (500 MHz, DMSO-d$_6$) δ ppm 9.67-10.01 (m, 1H), 9.14-9.28 (m, 1H), 8.61-8.85 (m, 1H), 8.32 (d, J=9.1 Hz, 1H), 8.01 (dd, J=6.6, 2.7 Hz, 1H), 7.39-7.81 (m, 6H), 3.37-3.75 (m, 4H), 2.33-2.46 (m, 4H), 2.24 (s, 3H).

Example 29: N-[6-(5-chloro-2-fluorophenyl) pyridazin-4-yl]-7-[3-(4-methylpiperazin-1-yl) propoxy]quinolin-4-amine

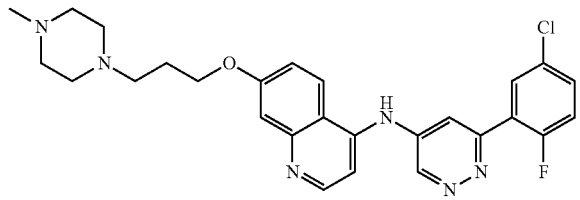 [SMILES: CN1CCN(CCCOc2ccc3c(Nc4cnnc(-c5cc(Cl)ccc5F)c4)ccnc3c2)CC1]

In a suitable MW vial, to a mixture of Intermediate 20 (90 mg, 0.28 mmol), Intermediate 3 (76 mg, 0.34 mmol), Cs$_2$CO$_3$ (185 mg, 0.56 mmol), Xantphos (23 mg, 0.04 mmol) and Pd$_2$(dba)$_3$ (27 mg, 0.03 mmol), 1,4-Dioxane (4 mL) was added, the vial was sealed and submitted to MW cycle at 130° C. for 50 min. The reaction mixture was concentrated under reduced pressure. The crude material was purified by flash chromatography on Biotage silica NH cartridge (from DCM to 4% MeOH) and then was further purified by reverse phase flash chromatography on Biotage C18 cartridge (from H$_2$O+0.1% NH$_4$OH to 32% MeCN) to afford title compound (15 mg, mmol, 11% yield) as pale yellow solid.

LC-MS (ESI): m/z (M+1): 507.2 (Method 1)

$^1$H NMR (500 MHz, Chloroform-d) δ ppm 9.09 (d, J=2.7 Hz, 1H), 8.78 (d, J=3.8 Hz, 1H), 8.15 (dd, J=6.6, 2.7 Hz, 1H), 7.88 (d, J=9.2 Hz, 1H), 7.62 (dd, J=2.5, 1.6 Hz, 1H), 7.46 (d, J=1.9 Hz, 1H), 7.40 (ddd, J=8.8, 4.3, 2.7 Hz, 1H), 7.28 (br d, J=5.2 Hz, 1H), 7.23 (dd, J=9.2, 2.5 Hz, 1H), 7.12 (dd, J=10.6, 8.8 Hz, 1H), 7.04-7.19 (m, 1H), 4.19 (t, J=6.3 Hz, 2H), 2.57-2.64 (m, 2H), 2.33 (s, 3H), 2.53 (br s, 8H), 2.02-2.13 (m, 2H).

Example 30: N-[6-(5-chloro-2-fluorophenyl) pyridazin-4-yl]-7-[2-(4-Ethylpiperazin-1-yl)ethoxy] quinolin-4-amine

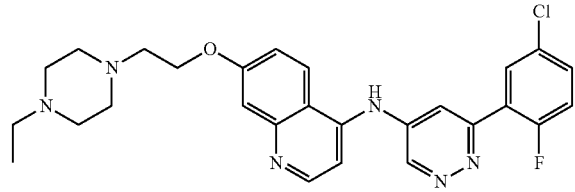 [SMILES: CCN1CCN(CCOc2ccc3c(Nc4cnnc(-c5cc(Cl)ccc5F)c4)ccnc3c2)CC1]

Example 30 was prepared following the procedure used for the synthesis of Example 29 starting from Intermediate 22 (74 mg, 0.23 mmol) and Intermediate 3 (63 mg, 0.28 mmol) to afford title compound (8 mg, 0.02 mmol, 7% yield) as pale yellow solid.

LC-MS (ESI): m/z (M+1): 507.3 (Method 1)

$^1$H NMR (400 MHz, Chloroform-d) δ ppm 9.09 (d, J=2.86 Hz, 1H), 8.80 (d, J=4.84 Hz, 1H), 8.18 (dd, J=6.60, 2.64 Hz, 1H), 7.88 (d, J=9.24 Hz, 1H), 7.60-7.64 (m, 1H), 7.48 (s, 1H), 7.42 (ddd, J=8.75, 4.24, 2.86 Hz, 1H), 7.24-7.35 (m, 2H), 7.14 (dd, J=10.56, 8.80 Hz, 1H), 7.00 (s, 1H), 4.31 (t, J=5.72 Hz, 2H), 2.94 (t, J=5.72 Hz, 2H).

Example 31: 3-(4-Acetylpiperazin-1-yl)-N-(4-{[6-(5-chloro-2-fluorophenyl)pyridazin-4-yl] amino}pyridin-2-yl)propanamide

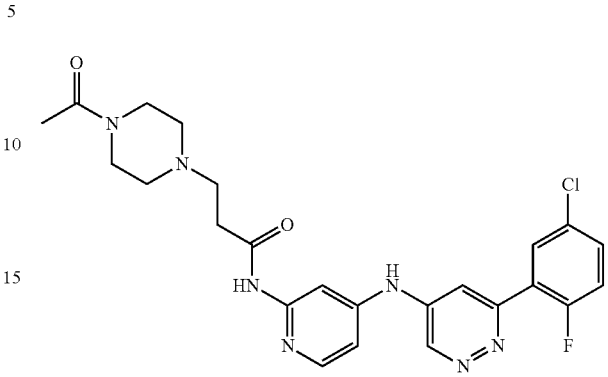

Example 31 was prepared following the procedure used for the synthesis of Example 1 starting from Intermediate 38 (175 mg, 0.49 mmol) and Intermediate 3 (100 mg, 0.45 mmol) to afford title compound (41 mg, 0.08 mmol, 18% yield).

LC-MS (ESI): m/z (M+1): 498.2 (Method 1)

$^1$H NMR (400 MHz, DMSO-d$_6$) δ ppm 10.66 (s, 1H), 9.87 (s, 1H), 9.05 (d, J=2.6 Hz, 1H), 8.17 (d, J=5.5 Hz, 1H), 8.06 (d, J=1.3 Hz, 1H), 8.00 (dd, 2.9 Hz, 1H), 7.60-7.70 (m, 2H), 7.46 (dd, J=10.5, 9.0 Hz, 1H), 7.01 (dd, 2.0 Hz, 1H), 3.37-3.47 (m, 4H), 2.53-2.70 (m, 4H), 2.30-2.46 (m, 4H), 1.98 (s, 3H).

Example 32: N-(4-{[6-(5-chloro-2-fluorophenyl) pyridazin-4-yl]amino}quinolin-7-yl)-3-(4-methylpiperazin-1-yl)propanamide

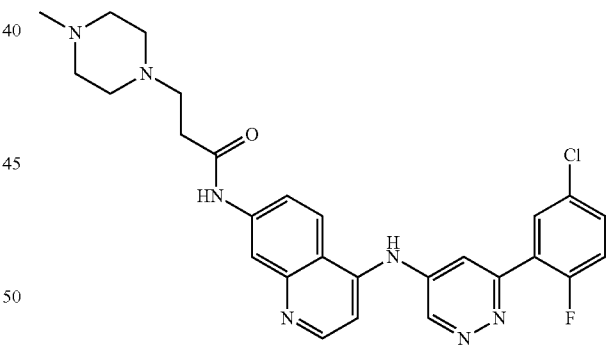

T3P 50% solution in DMF (34 mg, 0.11 mmol) was added to a stirred mixture of 3-(4-methylpiperazin-1-yl)propionic acid (18 mg, 0.11 mmol), Intermediate 49 (30 mg, 0.07 mmol), and DIPEA (0.04 mL, 0.21 mmol) at RT. The reaction was warmed at 90° C. for 8 hrs, then the solvent was removed under reduced pressure. The residue was purified by preparative HPLC, the product obtained was treated with NH$_4$OH and extracted with DCM. The organic phase was concentrated under vacuum to afford title compound (6 mg, 0.01 mmol, 16% yield).

LC-MS (ESI): m/z (M+1): 520.2 (Method 2)

$^1$H NMR (400 MHz, DMSO-d$_6$) δ ppm 10.47 (s, 1H), 9.59-9.94 (m, 1H), 9.19 (br s, 1H), 8.59-8.84 (m, 1H), 8.35 (br s, 1H), 8.21 (d, J=9.2 Hz, 1H), 8.00 (dd, J=6.6, 2.6 Hz, 1H), 7.70 (br s, 2H), 7.58-7.66 (m, 1H), 7.34-7.52 (m, 2H), 2.63-2.70 (m, 2H), 2.55 (t, J=7.1 Hz, 2H), 2.21-2.49 (m, 8H), 2.15 (s, 3H).

Example 33: N-(4-{[6-(5-chloro-2-fluorophenyl)pyridazin-4-yl]amino}pyridin-2-yl)-3-(3-methyl-1,3-Diazinan-1-yl)propanamide

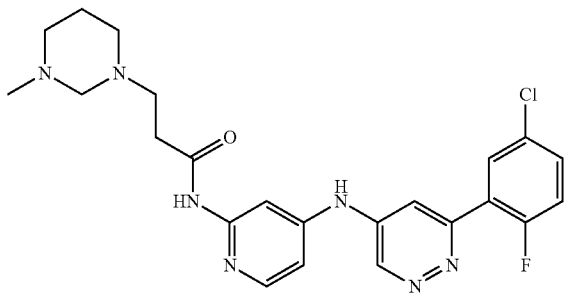 [SMILES: CN1CCCN(CCC(=O)Nc2cc(Nc3cnnc(-c4cc(Cl)ccc4F)c3)ccn2)C1]

Intermediate 61 (60 mg, 0.13 mmol) was suspended in Methanol (5 mL), formaldehyde 37% w/w in water (0.02 mL, 0.66 mmol) was added and the mixture was stirred at 50° C. for 1 h. Volatiles were removed and the residue was purified by flash chromatography on Biotage silica NH cartridge (from DCM to 5% MeOH) to afford title compound (15 mg, 0.03 mmol, 24% yield) as white solid.

LC-MS (ESI): m/z (M+1): 470.1 (Method 1)

$^1$H NMR (400 MHz, Methanol-$d_4$) δ ppm 8.99 (d, J=2.9 Hz, 1H), 8.19 (d, J=5.7 Hz, 1H), 8.12-8.15 (m, 1H), 7.95 (dd, J=6.5, 2.7 Hz, 1H), 7.77 (dd, J=2.4, 1.5 Hz, 1H), 7.51-7.59 (m, 1H), 7.32 (dd, J=10.2, 8.9 Hz, 1H), 6.98 (dd, 2.1 Hz, 1H), 3.20 (br s, 2H), 2.77-2.85 (m, 2H), 2.58-2.65 (m, 4H), 2.49 (br s, 2H), 2.25 (s, 3H), 1.75 (quin, J=5.4 Hz, 2H).

Example 34: N-(4-{[6-(5-chloro-2-fluorophenyl)pyridazin-4-yl]amino}pyridin-2-yl)-3-(4-Methanesulfonylpiperazin-1-yl)propanamide

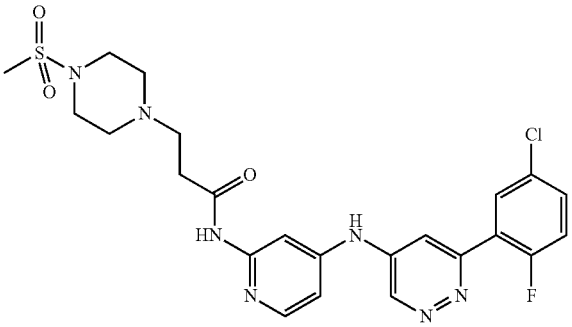 [SMILES: CS(=O)(=O)N1CCN(CCC(=O)Nc2cc(Nc3cnnc(-c4cc(Cl)ccc4F)c3)ccn2)CC1]

Example 34 was prepared following the procedure used for the synthesis of Example 1 starting from Intermediate 62 (164 mg, 0.42 mmol) and Intermediate 3 (85 mg, 0.38 mmol) to afford title compound (51 mg, 0.09 mmol, 25% yield).

LC-MS (ESI): m/z (M+1): 534.1 (Method 1)

$^1$H NMR (500 MHz, DMSO-$d_6$) δ ppm 10.58 (br s, 1H), 9.88 (s, 1H), 9.05 (br s, 1H), 8.17 (d, J=5.6 Hz, 1H), 8.06 (br s, 1H), 8.00 (dd, J=6.4, 2.6 Hz, 1H), 7.61-7.69 (m, 2H), 7.47 (t, J=9.7 Hz, 1H), 6.98-7.03 (m, 1H), 3.05-3.14 (m, 4H), 2.86 (s, 3H), 2.69 (t, J=7.0 Hz, 2H), 2.57 (t, J=7.0 Hz, 2H), 2.48-2.54 (m, 4H).

Example 35: 1-(4-{2-[(4-{[6-(5-chloro-2-fluorophenyl)pyridazin-4-yl]amino}quinolin-7-yl)oxy]ethyl}piperazin-1-yl)ethan-1-One

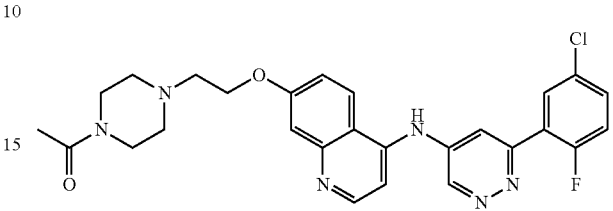

To a stirred solution of Example 9 (90 mg, 0.19 mmol) in DCM (1 mL), at RT, Acetic anhydride (0.02 mL, 0.23 mmol) was added portionwise then the resulting reaction mixture was stirred overnight. The mixture was concentrated under reduced pressure and the crude material was purified by reverse flash chromatography on Biotage C18 cartridge (from H$_2$O+0.1% NH$_4$OH to 40% MeCN) to afford title compound (46 mg, 0.09 mmol, 47% yield) as pale yellow solid.

LC-MS (ESI): m/z (M+1): 521.2 (Method 1)

$^1$H NMR (400 MHz, Chloroform-d) δ ppm 9.12 (d, J=2.9 Hz, 1H), 8.77 (d, J=4.6 Hz, 1H), 8.13 (dd, J=6.6, 2.6 Hz, 1H), 7.94 (d, J=9.2 Hz, 1H), 7.64 (m, J=2.0 Hz, 2H), 7.45 (d, J=2.4 Hz, 1H), 7.36-7.42 (m, 1H), 7.30 (d, J=5.0 Hz, 1H), 7.22 (dd, J=9.2, 2.4 Hz, 1H), 7.11 (dd, J=10.4, 8.9 Hz, 1H), 4.28 (t, J=5.5 Hz, 2H), 3.46-3.73 (m, 4H), 2.92 (t, J=5.4 Hz, 2H), 2.60 (dt, J=16.3, 5.1 Hz, 4H), 2.10 (s, 3H).

Example 36: N-[6-(5-chloro-2-fluorophenyl)pyridazin-4-yl]-7-[2-(4-Methanesulfonylpiperazin-1-yl)ethoxy]quinolin-4-amine

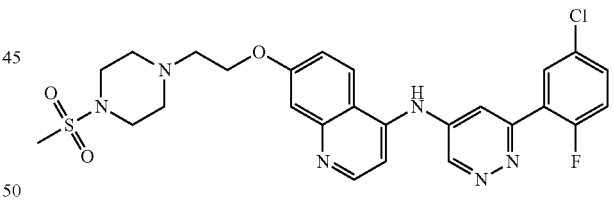

To a stirred solution of Example 9 (90 mg, 0.19 mmol) in DCM (2 mL), at RT, TEA (0.03 mL, 0.23 mmol) was added followed by methanesulfonyl chloride (0.02 mL, 0.20 mmol) and the resulting reaction mixture was stirred overnight at RT. The mixture was concentrated under reduced pressure. The residue was taken up with DCM and a concentrated NH$_4$Cl solution, the organic phase was washed with water, dried over Na$_2$SO$_4$ and the solvent removed under reduce pressure. The crude material was purified by reverse flash chromatography on Biotage C18 cartridge (from H$_2$O+0.1% NH$_4$OH to 40% MeCN) to afford title compound (28 mg, 0.05 mmol, 27% yield) as pale yellow solid.

LC-MS (ESI): m/z (M+1): 557.1 (Method 1)

$^1$H NMR (400 MHz, Chloroform-d) δ ppm 9.10 (d, J=2.64 Hz, 1H), 8.80 (d, J=4.84 Hz, 1H), 8.18 (dd, J=6.71, 2.75 Hz, 1H), 7.91 (d, J=9.24 Hz, 1H), 7.64 (dd, J=2.64, 1.76 Hz, 1H), 7.48 (d, J=2.42 Hz, 1H), 7.39-7.45 (m, 1H), 7.31 (d, J=5.06 Hz, 1H), 7.25-7.28 (m, 1H), 7.14 (dd, J=10.56, 8.80 Hz, 1H), 6.94-7.10 (m, 1H), 4.30 (t, J=5.50 Hz, 2H), 3.26-3.37 (m, 4H), 2.98 (t, J=5.39 Hz, 2H), 2.81 (s, 3H), 2.73-2.79 (m, 4H).

Example 37: N-{6-[2-fluoro-5-(Propan-2-yl)phenyl] pyridazin-4-yl}-7-[2-(4-methylpiperazin-1-yl) ethoxy]quinolin-4-amine

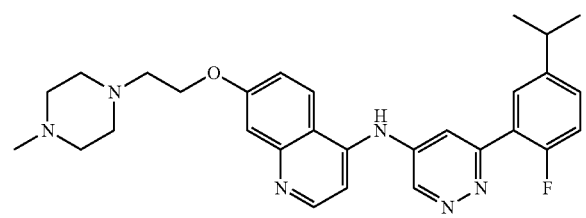 [SMILES: CC(C)c1ccc(F)c(-c2cc(Nc3ccnc4cc(OCCN5CCN(C)CC5)ccc34)cnn2)c1]

Example 37 was prepared following the procedure used for the synthesis of Example 3 starting from Intermediate 23 (198 mg, 0.65 mmol) and Intermediate 63 (100 mg, 0.43 mmol) to afford title compound (8 mg, 0.016 mmol, 4% yield).

LC-MS (ESI): m/z (M+1): 501.9 (Method 1)

$^1$H NMR (400 MHz, DMSO-d$_6$) δ ppm 9.48-10.06 (m, 1H), 9.06 (br s, 1H), 8.43-8.64 (m, 1H), 8.20 (d, J=9.0 Hz, 1H), 7.80 (dd, J=7.6, 2.3 Hz, 1H), 7.57 (d, J=2.6 Hz, 1H), 7.36-7.44 (m, 1H), 7.32 (br s, 1H), 7.15-7.30 (m, 3H), 4.23 (t, J=5.7 Hz, 2H), 3.00 (dt, J=13.8, 6.9 Hz, 1H), 2.76 (t, J=5.7 Hz, 2H), 2.44-2.56 (m, 4H), 2.21-2.45 (m, 4H), 2.15 (s, 3H), 1.24 (d, J=6.8 Hz, 6H).

Example 38: 6-(5-chloro-2-fluorophenyl)-N-[2-(4-methylpiperazine-1-Carbonyl)-1H-pyrrolo[2,3-b]pyridin-4-yl]pyridazin-4-amine

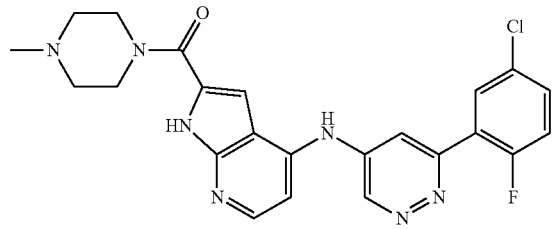 [SMILES: CN1CCN(C(=O)c2cc3c(Nc4cnnc(-c5cc(Cl)ccc5F)c4)ccnc3[nH]2)CC1]

Example 38 was prepared following the procedure used for the synthesis of Example 21 starting from Intermediate 64 (46 mg, 0.08 mmol) to afford title compound (31 mg, 0.07 mmol, 87% yield) as white solid.

LC-MS (ESI): m/z (M+1): 466.2 (Method 1)

$^1$H NMR (400 MHz, DMSO-d$_6$) δ ppm 12.16 (s, 1H), 9.72 (s, 1H), 9.17 (d, J=2.64 Hz, 1H), 8.23 (d, J=5.28 Hz, 1H), 8.02 (dd, J=6.60, 2.75 Hz, 1H), 7.73 (d, J=1.65 Hz, 1H), 7.60-7.69 (m, 1H), 7.47 (dd, J=10.67, 8.91 Hz, 1H), 7.14 (d, J=5.39 Hz, 1H), 6.89 (d, J=2.09 Hz, 1H), 3.67-3.75 (m, 4H), 2.31-2.39 (m, 4H), 2.22 (s, 3H).

Example 39: 2-[(4-{[6-(5-chloro-2-fluorophenyl) pyridazin-4-yl]amino}quinolin-7-yl)oxy]-1-(4-methylpiperazin-1-yl)ethan-1-One

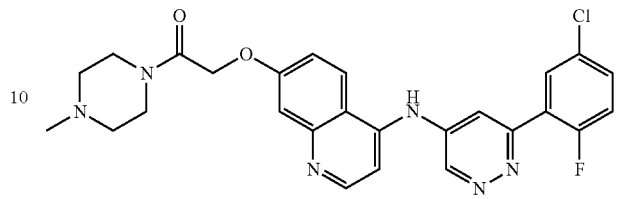

Example 39 was prepared following the procedure used for the synthesis of Example 29 starting from Intermediate 67 (100 mg, 0.31 mmol) and Intermediate 3 (86 mg, 0.38 mmol) to afford title compound (24 mg, 0.05 mmol, 15% yield) as pale yellow solid.

LC-MS (ESI): m/z (M+1): 507.2 (Method 1)

$^1$H NMR (400 MHz, Chloroform-d) δ ppm 9.11 (d, J=2.5 Hz, 1H), 8.73 (d, J=4.9 Hz, 1H), 8.11 (dd, J=6.6, 2.6 Hz, 1H), 8.02 (s, 1H), 7.84 (d, J=9.4 Hz, 1H), 7.61 (s, 1H), 7.35-7.43 (m, 1H), 7.32 (d, J=2.3 Hz, 1H), 7.25-7.29 (m, 1H), 7.03-7.13 (m, 2H), 4.86 (s, 2H), 3.46-3.82 (m, 4H), 2.39-2.55 (m, 4H), 2.34 (s, 3H).

Example 40: 4-{[6-(5-chloro-2-fluorophenyl) pyridazin-4-yl]amino}-N-methyl-N-[2-(4-methylpiperazin-1-yl)ethyl]-1H-pyrrolo[2,3-b]pyridine-2-Carboxamide

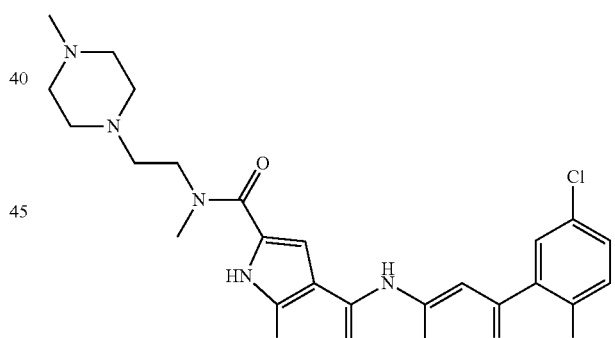

Example 40 was prepared following the procedure used for the synthesis of Example 21 starting from Intermediate 68 (60 mg, 0.09 mmol) to afford title compound (35 mg, 0.07 mmol, 72% yield) as pale yellow solid.

LC-MS (ESI): m/z (M+1): 532.2 (Method 1)

$^1$H NMR (600 MHz, DMSO-d$_6$) δ ppm 11.71-12.93 (m, 1H), 9.73 (s, 1H), 9.16 (d, J=2.5 Hz, 1H), 8.23 (d, J=5.4 Hz, 1H), 8.01 (dd, J=6.6, 2.8 Hz, 1H), 7.72 (br s, 1H), 7.58-7.67 (m, 1H), 7.46 (dd, J=10.5, 8.9 Hz, 1H), 7.12 (d, J=5.3 Hz, 1H), 6.96 (br s, 1H), 3.63 (br s, 2H), 2.87-3.41 (m, 3H), 2.53 (t, J=6.4 Hz, 2H), 2.18-2.48 (m, 8H), 2.12 (br s, 3H).

Example 41: N-[6-(5-chloro-2-fluorophenyl)pyridazin-4-yl]-7-{2-[4-(2,2,2-trifluoroethyl)piperazin-1-yl]ethoxy}quinolin-4-amine

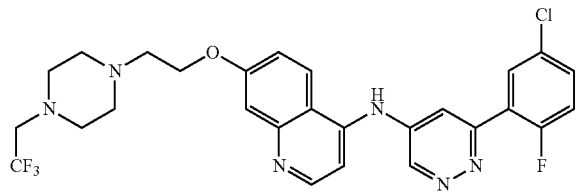 [SMILES: Fc1ccc(Cl)cc1-c1cc(Nc2ccnc3cc(OCCN4CCN(CC(F)(F)F)CC4)ccc23)cnn1]

Example 41 was prepared following the procedure used for the synthesis of Example 29 starting from Intermediate 69 (83 mg, 0.22 mmol) and Intermediate 3 (63 mg, 0.28 mmol) to afford title compound (50 mg, 0.09 mmol, 40% yield).

LC-MS (ESI): m/z (M+1): 561.1 (Method 1)

$^1$H NMR (400 MHz, Chloroform-d) δ ppm 9.08 (d, J=2.86 Hz, 1H), 8.81 (d, J=4.84 Hz, 1H), 8.20 (dd, J=6.71, 2.75 Hz, 1H), 7.88 (d, J=9.24 Hz, 1H), 7.61-7.66 (m, 1H), 7.49 (d, J=2.20 Hz, 1H), 7.43 (ddd, J=8.80, 4.29, 2.75 Hz, 1H), 7.29-7.34 (m, 2H), 7.15 (dd, J=10.67, 8.91 Hz, 1H), 6.81 (s, 1H), 4.30 (t, J=5.61 Hz, 2H), 3.00 (q, J=9.54 Hz, 2H), 2.93 (t, J=5.61 Hz, 2H), 2.74-2.80 (m, 4H), 2.66-2.72 (m, 4H).

Example 42: N-[6-(5-chloro-2-fluorophenyl)pyridazin-4-yl]-7-{2-[Methyl(Oxetan-3-yl)amino]ethoxy}quinolin-4-amine

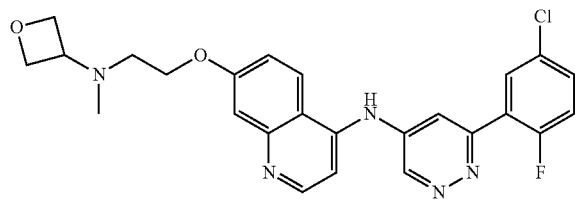 [SMILES: CN(CCOc1ccc2c(Nc3cnnc(-c4cc(Cl)ccc4F)c3)ccnc2c1)C1COC1]

Example 42 was prepared following the procedure used for the synthesis of Example 29 starting from Intermediate 72 (90 mg, 0.28 mmol) and Intermediate 3 (80 mg, 0.36 mmol) to afford title compound (40 mg, 0.08 mmol, 29% yield).

LC-MS (ESI): m/z (M+1): 480.0 (Method 2)

$^1$H NMR (400 MHz, DMSO-d$_6$) δ ppm 9.77 (br. s., 1H), 9.21 (br. s., 1H), 8.69 (br. s., 1H), 8.20 (d, J=9.24 Hz, 1H), 8.01 (dd, J=6.60, 2.64 Hz, 1H), 7.71 (br. s., 1H), 7.59-7.67 (m, 1H), 7.37-7.52 (m, 3H), 7.31 (d, J=9.24 Hz, 1H), 4.52-4.61 (m, 2H), 4.46 (t, J=6.27 Hz, 2H), 4.23 (t, J=5.61 Hz, 2H), 3.69 (t, J=6.49 Hz, 1H), 2.73 (t, J=5.50 Hz, 2H), 2.23 (s, 3H).

Example 43: 3-(3-Acetyl-1,3-Diazinan-1-yl)-N-(4-{[6-(5-chloro-2-fluorophenyl)pyridazin-4-yl]amino}pyridin-2-yl)propanamide

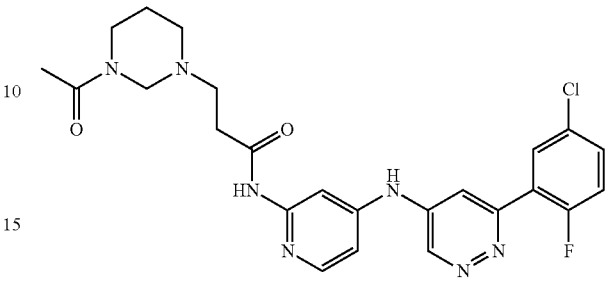

Example 43 was prepared following the procedure used for the synthesis of Example 33 starting from Intermediate 78 (40 mg, 0.08 mmol) to afford title compound (23 mg, 0.05 mmol, 57% yield).

LC-MS (ESI): m/z (M+1): 498.2 (Method 1)

$^1$H NMR (400 MHz, Methanol-d$_4$) δ ppm 8.99-9.04 (m, 1H), 8.20 (dd, J=5.61, 2.97 Hz, 1H), 8.16 (dd, J=4.62, 1.98 Hz, 1H), 7.97 (dd, J=6.49, 2.75 Hz, 1H), 7.79 (dd, J=2.64, 1.54 Hz, 1H), 7.57 (dt, J=8.80, 3.52 Hz, 1H), 7.29-7.38 (m, 1H), 7.00 (dd, J=5.72, 2.20 Hz, 1H), 4.21-4.40 (m, 2H), 3.60-3.66 (m, 2H), 2.83-2.96 (m, 4H), 2.63-2.68 (m, 2H), 2.14 (d, J=0.66 Hz, 3H), 1.64-1.82 (m, 2H).

Example 44: N-(4-{[6-(5-chloro-2-fluorophenyl)pyridazin-4-yl]amino}pyridin-2-yl)-3-(3-Methanesulfonyl-1,3-Diazinan-1-yl)propanamide

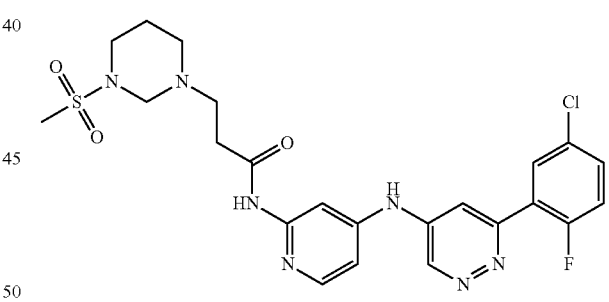

Example 44 was prepared following the procedure used for the synthesis of Example 33 starting from Intermediate 84 (80 mg, 0.15 mmol) to afford title compound (68 mg, 0.13 mmol, 83% yield).

LC-MS (ESI): m/z (M+1): 534.1 (Method 2)

$^1$H NMR (400 MHz, Methanol-d$_4$) δ ppm 9.01 (d, J=2.86 Hz, 1H), 8.20 (d, J=5.72 Hz, 1H), 8.16 (d, J=1.98 Hz, 1H), 7.97 (dd, J=6.49, 2.75 Hz, 1H), 7.80 (dd, J=2.64, 1.54 Hz, 1H), 7.57 (ddd, J=8.86, 4.24, 2.75 Hz, 1H), 7.34 (dd, J=10.45, 8.91 Hz, 1H), 7.00 (dd, J=5.72, 2.20 Hz, 1H), 4.15 (s, 2H), 3.43-3.48 (m, 2H), 2.90-2.96 (m, 5H), 2.84-2.89 (m, 2H), 2.63 (s, 2H), 1.73-1.82 (m, 2H).

Example 45: 4-{[6-(5-chloro-2-fluorophenyl)pyridazin-4-yl]amino}quinolin-7-yl N-methyl-N-[2-(4-methylpiperazin-1-yl)ethyl]carbamate

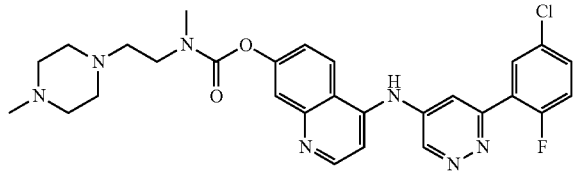 [SMILES: CN1CCN(CCN(C)C(=O)Oc2ccc3c(Nc4cnnc(-c5cc(Cl)ccc5F)c4)ccnc3c2)CC1]

N-methyl-2-(4-methylpiperazin-1-yl)ethanamine (100 mg, 0.64 mmol) in MTBE was added dropwise to a stirred mixture of triphosgene (190 mg, 0.64 mmol) in MTBE (4 mL) at 0° C. under $N_2$. After 1 h the solid was filtered. The solid recovered was quickly added to a mixture of Intermediate 28 (100 mg, 0.25 mmol) and $K_2CO_3$ (180 mg, 1.3 mmol) in dry DMF (3 mL) under stirring. The mixture was left stirring overnight. The day after it was poured in cold water and extracted with EtOAc. Organic layer was separated, dried over $Na_2SO_4$ and evaporated under reduced pressure. The residue was purified by flash chromatography on Biotage silica NH cartridge (from DCM to 3% MeOH) to afford title compound (80 mg, 0.14 mmol, 57% yield)

LC-MS (ESI): m/z (M+1): 550.2 (Method 2)

$^1$H NMR (400 MHz, Chloroform-d) δ ppm 9.10 (s, 1H), 8.65 (dd, J=13.3, 4.9 Hz, 1H), 8.18 (dd, J=6.6, 2.7 Hz, 1H), 7.67-7.81 (m, 2H), 7.65 (br s, 1H), 7.47-7.63 (m, 1H), 7.37-7.44 (m, 1H), 7.21-7.33 (m, 1H), 7.13 (dd, J=10.4, 8.9 Hz, 1H), 3.55-3.71 (m, 2H), 3.15-3.25 (m, 3H), 2.65-2.75 (m, 2H), 2.39-2.66 (m, 8H), 2.26-2.33 (m, 3H).

Example 46: $N_4$-[6-(5-chloro-2-fluorophenyl)pyridazin-4-yl]-$N_2$-[3-(4-methylpiperazin-1-yl)propyl]pyridine-2,4-Diamine

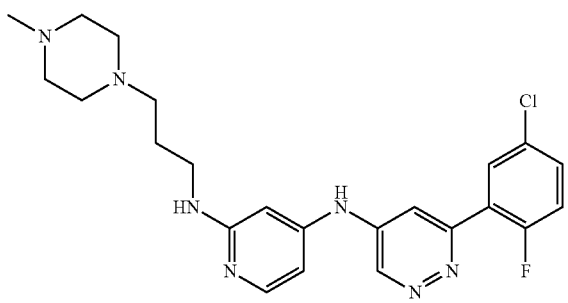 [SMILES: CN1CCN(CCCNc2cc(Nc3cnnc(-c4cc(Cl)ccc4F)c3)ccn2)CC1]

Example 46 was prepared following the procedure used for the synthesis of Example 2 starting from Intermediate 87 (58 mg, 0.10 mmol) to afford title compound (33 mg, 0.07 mmol, 69% yield) as a pale yellow solid.

LC-MS (ESI): m/z (M+1): 456.2 (Method 2)

$^1$H NMR (400 MHz, DMSO-$d_6$) δ ppm 9.44 (s, 1H), 8.98 (d, J=2.6 Hz, 1H), 7.99 (dd, J=6.6, 2.7 Hz, 1H), 7.87 (d, J=5.6 Hz, 1H), 7.60-7.68 (m, 1H), 7.57 (s, 1H), 7.46 (dd, J=10.6, 8.9 Hz, 1H), 6.50 (t, J=5.5 Hz, 1H), 6.37 (dd, J=5.7, 1.9 Hz, 1H), 6.31 (s, 1H), 3.18-3.25 (m, 2H), 2.13 (s, 3H), 2.06-2.46 (m, 10H), 1.65 (quin, J=6.9 Hz, 2H).

Example 47: N-(4-{[6-(5-chloro-2-fluorophenyl)pyridazin-4-yl]amino}pyridin-2-yl)-3-[4-(2,2,2-trifluoroethyl)piperazin-1-yl]propanamide

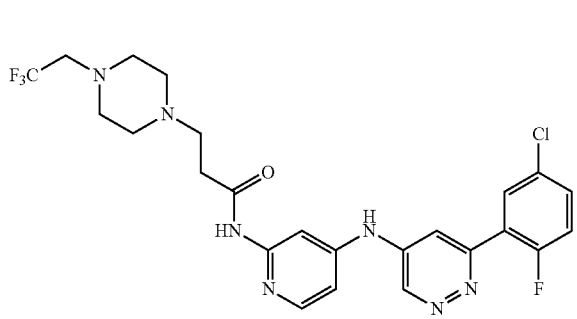 [SMILES: O=C(CCN1CCN(CC(F)(F)F)CC1)Nc1cc(Nc2cnnc(-c3cc(Cl)ccc3F)c2)ccn1]

Example 47 (97 mg, 0.18 mmol, 40% yield) was prepared following the procedure used for the synthesis of Example 1 starting from Intermediate 88 (194 mg, 0.49 mmol) and Intermediate 3 (100 mg, 0.45 mmol).

LC-MS (ESI): m/z (M+1): 538.2 (Method 1)

$^1$H NMR (400 MHz, DMSO-$d_6$) δ ppm 10.65 (s, 1H), 9.87 (s, 1H), 9.05 (d, J=2.6 Hz, 1H), 8.17 (d, J=5.6 Hz, 1H), 8.05 (d, J=1.2 Hz, 1H), 8.00 (dd, 2.7 Hz, 1H), 7.67 (s, 1H), 7.61-7.66 (m, 1H), 7.47 (dd, J=10.5, 8.9 Hz, 1H), 7.01 (dd, J=5.7, 2.0 Hz, 1H), 3.08-3.19 (m, 2H), 2.59-2.66 (m, 6H), 2.52-2.57 (m, 2H), 2.44 (br s, 4H).

Example 48: N-[6-(5-chloro-2-fluorophenyl)-3-methylpyridazin-4-yl]-7-[2-(4-methylpiperazin-1-yl)ethoxy]quinolin-4-amine

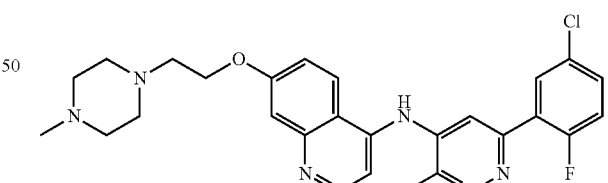

Example 48 (10 mg, 0.02 mmol, 5% yield) was prepared following the procedure used for the synthesis of Example 3 starting from Intermediate 23 (193 mg, 0.63 mmol) and Intermediate 90 (100 mg, 0.43 mmol).

LC-MS (ESI): m/z (M+1): 507.1 (Method 2)

$^1$H NMR (400 MHz, DMSO-$d_6$) δ ppm 8.79 (s, 1H), 8.05 (d, J=9.2 Hz, 1H), 7.87-8.00 (m, 1H), 7.51-7.63 (m, 1H), 7.50-8.74 (m, 1H), 7.30-7.46 (m, 2H), 6.83-7.29 (m, 3H), 4.13-4.34 (m, 2H), 2.44-2.82 (m, 5H), 2.24-2.62 (m, 8H), 2.15 (s, 3H).

Example 49: 4-{[6-(5-chloro-2-fluorophenyl)-3-methylpyridazin-4-yl]amino}-N-[2-(4-methylpiperazin-1-yl)ethyl]-M-pyrrolo[2,3-b]pyridine-2-Carboxamide

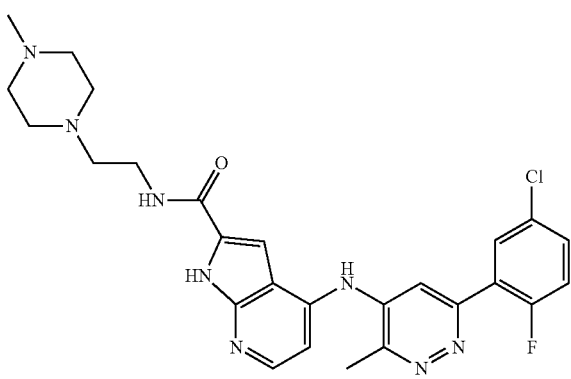 [SMILES: Cc1nnc(-c2cc(Cl)ccc2F)cc1Nc1ccnc2[nH]c(C(=O)NCCN3CCN(C)CC3)cc12]

Example 49 (18 mg, 0.03 mmol, 56% yield) was prepared following the procedure used for the synthesis of Example 21 starting from Intermediate 93 (40 mg, 0.06 mmol).

LC-MS (ESI): m/z (M+1): 523.2 (Method 1)

$^1$H NMR (500 MHz, Methanol-d$_4$) δ ppm 8.30 (d, J=5.4 Hz, 1H), 7.89 (dd, J=6.4, 2.7 Hz, 1H), 7.47 (ddd, J=8.8, 4.1, 2.7 Hz, 1H), 7.38 (d, J=1.2 Hz, 1H), 7.20 (dd, J=10.5, 8.9 Hz, 1H), 7.05 (d, J=5.4 Hz, 1H), 6.90 (s, 1H), 3.52 (t, J=6.7 Hz, 2H), 2.81 (s, 3H), 2.58 (t, J=6.7 Hz, 2H), 2.28-2.76 (m, 8H), 2.26 (s, 3H).

Example 50: 4-{[6-(5-chloro-2-fluorophenyl)-3-methylpyridazin-4-yl]amino}-N-methyl-N-[2-(4-methylpiperazin-1-yl)ethyl]-1H-pyrrolo[2,3-b]pyridine-2-carboxamide

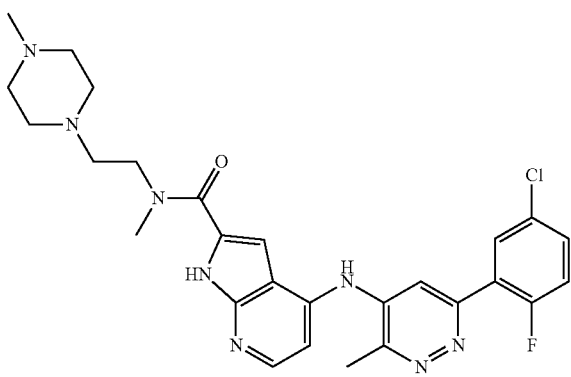 [SMILES: Cc1nnc(-c2cc(Cl)ccc2F)cc1Nc1ccnc2[nH]c(C(=O)N(C)CCN3CCN(C)CC3)cc12]

Example 50 (21 mg, 0.04 mmol, 43% yield) was prepared following the procedure used for the synthesis of Example 21 starting from Intermediate 94 (60 mg, 0.08 mmol).

LC-MS (ESI): m/z (M+1): 537.2 (Method 1)

$^1$H NMR (400 MHz, DMSO-d$_6$) δ ppm 12.25 (br s, 1H), 8.77 (s, 1H), 8.23 (d, J=5.3 Hz, 1H), 7.95 (dd, J=6.5, 2.8 Hz, 1H), 7.52-7.66 (m, 1H), 7.41 (br s, 1H), 7.36 (dd, J=10.6, 8.9 Hz, 1H), 6.97 (d, J=5.4 Hz, 1H), 6.70 (s, 1H), 3.48-3.65 (m, 2H), 3.06 (br s, 3H), 2.75 (s, 3H), 2.15-2.46 (m, 10H), 2.10 (s, 3H).

Example 51: 4-{[6-(5-chloro-2-fluorophenyl)pyridazin-4-yl]amino}quinolin-7-yl N-methyl-N-[2-(1-methylpiperidin-4-yl)ethyl]carbamate

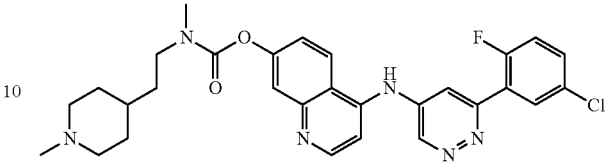

Example 51 was prepared following the procedure used for the synthesis of Example 45 starting from methyl[2-(1-methylpiperidin-4-yl)ethyl]amine (Intermediate 103, 85 mg, 0.55 mmol) and 4-{[6-(5-chloro-2-fluorophenyl)pyridazin-4-yl]amino}quinolin-7-ol (Intermediate 28, 80 mg, 0.22 mmol) to afford title compound (25 mg, 0.05 mmol, 21% yield) as a yellow solid.

LC-MS (ESI): m/z (M+1): 549.3 (Method 2)

$^1$H NMR (500 MHz, DMSO-d$_6$) δ ppm 9.84 (br. s, 1H), 9.22 (br. s, 1H), 8.75 (br. s, 1H), 8.32 (br. d, J=8.9 Hz, 1H), 8.01 (dd, J=6.4, 2.7 Hz, 1H), 7.75 (br. s, 1H), 7.66-7.71 (m, 1H), 7.60-7.65 (m, 1H), 7.53 (br. s, 1H), 7.41-7.49 (m, 2H), 3.34-3.52 (m, 2H), 2.91-3.11 (m, 3H), 2.72 (br. d, J=11.5 Hz, 2H), 2.12 (s, 3H), 1.75-1.87 (m, 2H), 1.63-1.74 (m, 2H), 1.45-1.62 (m, 2H), 1.09-1.33 (m, 3H).

Example 52: N-[6-(5-chloro-2-fluorophenyl)pyridazin-4-yl]-7-[3-(3-methyl-1,3-Diazinan-1-yl)propoxy]quinolin-4-amine

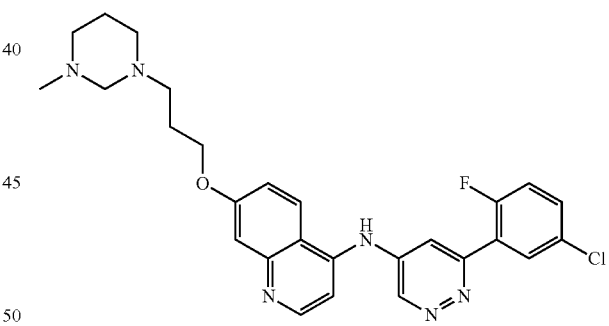

Example 52 was prepared following the procedure used for the synthesis of Example 33 starting from N-[6-(5-chloro-2-fluorophenyl)pyridazin-4-yl]-7-(3-{[3-(methylamino)propyl]amino}propoxy)quinolin-4-amine (Intermediate 109, 121 mg, mmol) to afford title compound (40 mg, 0.08 mmol, 37% yield) as a white solid.

LC-MS (ESI): m/z (M+1): 507.3 (Method 2)

$^1$H NMR (500 MHz, Methanol-d$_4$) δ ppm 9.12 (d, J=2.7 Hz, 1H), 8.66 (br. d, J=4.1 Hz, 1H), 8.14 (d, J=9.3 Hz, 1H), 7.95 (dd, J=6.4, 2.7 Hz, 1H), 7.67-7.80 (m, 1H), 7.49-7.60 (m, 1H), 7.43 (br. d, J=3.8 Hz, 1H), 7.38 (d, J=2.2 Hz, 1H), 7.25-7.35 (m, 2H), 4.24 (t, J=6.2 Hz, 2H), 3.13 (br. s, 2H), 2.64 (t, J=7.3 Hz, 2H), 2.37-2.60 (m, 4H), 2.23 (s, 3H), 2.07 (quin, J=6.7 Hz, 2H), 1.65-1.83 (m, 2H).

Example 53: 4-{[6-(5-chloro-2-fluorophenyl)pyridazin-4-yl]amino}quinolin-7-yl 4-(2-methanesulfonylethyl)piperazine-1-carboxylate

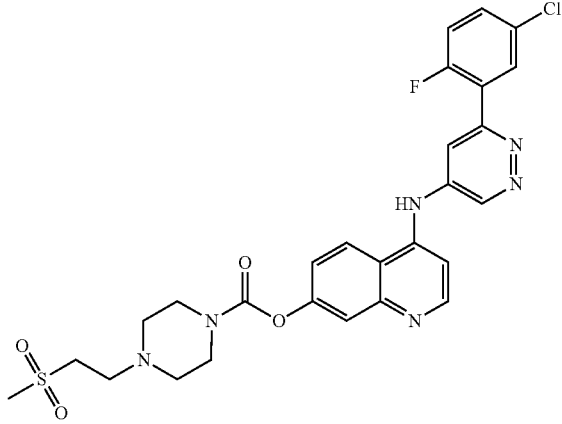 [SMILES: CS(=O)(=O)CCN1CCN(C(=O)Oc2ccc3c(Nc4cnnc(-c5cc(Cl)ccc5F)c4)ccnc3c2)CC1]

Example 53 was prepared following the procedure used for the synthesis of Example 45 starting from 4-{[6-(5-chloro-2-fluorophenyl)pyridazin-4-yl]amino}quinolin-7-ol hydrobromide (Intermediate 101, 78 mg, 0.17 mmol), and 1-(2-methanesulfonyl-ethyl)piperazine dihydrochloride (93 mg, 0.35 mmol) to afford title compound (30 mg, 0.05 mmol, 29% yield) as a yellow solid.

LC-MS (ESI): m/z (M+1): 585.2 (Method 2)

$^1$H NMR (400 MHz, DMSO-d$_6$) δ ppm 9.53-10.22 (m, 1H), 9.21 (br. s, 1H), 8.73 (br. s, 1H), 8.32 (d, J=9.2 Hz, 1H), 8.01 (dd, J=6.6, 2.6 Hz, 1H), 7.68-7.80 (m, 2H), 7.59-7.67 (m, 1H), 7.28-7.58 (m, 3H), 3.39-3.79 (m, 4H), 3.32-3.38 (m, 2H), 3.06 (s, 3H), 2.79 (t, J=6.8 Hz, 2H), 2.52-2.62 (m, 4H).

Example 54: (3R)-1-methylpyrrolidin-3-yl 4-{[6-(5-chloro-2-fluorophenyl)pyridazin-4-yl]amino}quinoline-7-carboxylate

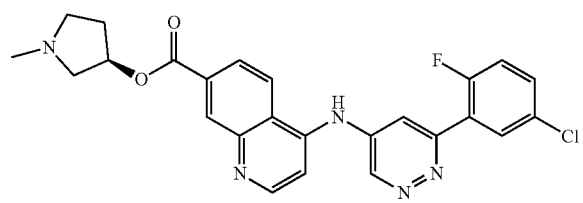

Example 54 was prepared following the procedure used for the synthesis of Example 20 starting from 4-{[6-(5-chloro-2-fluorophenyl)pyridazin-4-yl]amino}quinoline-7-carboxylic acid (Intermediate 15, 100 mg, 0.25 mmol), and (3R)-1-methylpyrrolidin-3-ol (128 mg, 1.27 mmol) to afford title compound (39 mg, mmol, 32% yield) as a yellow solid.

LC-MS (ESI): m/z (M+1): 478.2 (Method 2)

$^1$H NMR (500 MHz, DMSO-d$_6$) δ ppm 9.94 (br. s, 1H), 9.26 (br. s, 1H), 8.86 (br. s, 1H), 8.56 (br. s, 1H), 8.43 (d, J=8.8 Hz, 1H), 8.09 (br. d, J=8.4 Hz, 1H), 8.01 (dd, J=6.5, 2.8 Hz, 1H), 7.79 (br. s, 1H), 7.67 (br. s, 1H), 7.64 (ddd, J=8.8, 4.1, 2.9 Hz, 1H), 7.47 (dd, J=10.4, 8.9 Hz, 1H), 5.34-5.44 (m, 1H), 2.70-2.83 (m, 3H), 2.31-2.38 (m, 2H), 2.30 (s, 3H), 1.91-1.99 (m, 1H).

Example 55: cis N-[6-(5-chloro-2-fluorophenyl)pyridazin-4-yl]-7-(2-{5-methyl-octahydropyrrolo[3,4-c]pyrrol-2-yl}ethoxy)quinolin-4-amine

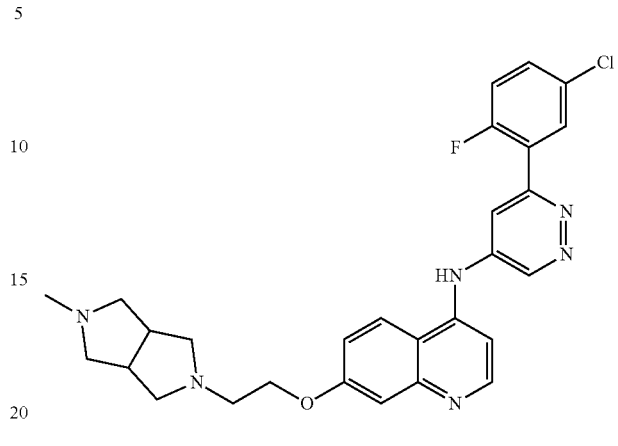

A solution of formaldehyde 37% w/w in water (0.09 mL, 0.89 mmol) was added to a stirred mixture of cis N-[6-(5-chloro-2-fluorophenyl)pyridazin-4-yl]-7-(2-{octahydropyrrolo[3,4-c]pyrrol-2-yl}ethoxy)quinolin-4-amine (Intermediate 113, 45 mg, 0.09 mmol) in MeOH (4 mL) and acetic acid (0.03 mL, 0.45 mmol). After 1 hr sodium cyanoborohydride (16.5 mg, 0.27 mmol) was added at RT and stirred for 1 hr. Volatiles were removed under vacuum and the residue was purified by reverse phase under basic condition, and then by flash chromatography on Biotage silica NH cartridge (from DCM to 3% MeOH). Opportune fractions were collected and evaporated, the solid obtained was further purified by preparative HPLC to afford cis N-[6-(5-chloro-2-fluorophenyl)pyridazin-4-yl]-7-(2-{5-methyl-octahydropyrrolo[3,4-c]pyrrol-2-yl}ethoxy)quinolin-4-amine (9 mg, 0.02 mmol, 19% yield) as a yellow solid.

LC-MS (ESI): m/z (M+1): 519.3 (Method 2)

$^1$H NMR (400 MHz, DMSO-d$_6$) δ ppm 9.77 (br. s, 1H), 9.20 (br. s, 1H), 8.68 (br. d, J=3.5 Hz, 1H), 8.18 (d, J=9.2 Hz, 1H), 8.00 (dd, J=6.4, 2.8 Hz, 1H), 7.70 (br. s, 1H), 7.58-7.66 (m, 1H), 7.46 (dd, J=10.6, 8.8 Hz, 1H), 7.40 (br. s, 2H), 7.30 (br. d, J=8.8 Hz, 1H), 4.24 (t, J=5.8 Hz, 2H), 2.73-2.88 (m, 4H), 2.55-2.65 (m, 2H), 2.35-2.44 (m, 2H), 2.23-2.32 (m, 4H), 2.18 (s, 3H).

Example 56: 1-(3-{2-[(4-{[6-(5-chloro-2-fluorophenyl)pyridazin-4-yl]amino}quinolin-7-yl)oxy]ethyl}-1,3-Diazinan-1-yl)ethan-1-One

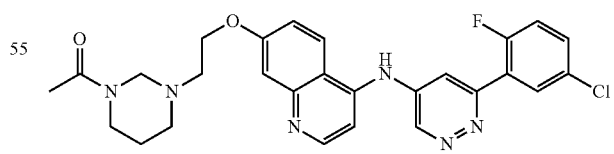

Example 56 was prepared following the procedure used for the synthesis of Example 35 starting from N-[6-(5-chloro-2-fluorophenyl)pyridazin-4-yl]-7-[2-(1,3-diazinan-1-yl)ethoxy]quinolin-4-amine (Intermediate 120, 22 mg, 0.04 mmol) to afford title compound (7.5 mg, 0.01 mmol, 31% yield) as a pale yellow solid.

LC-MS (ESI): m/z (M+1): 521.3 (Method 2)

¹H NMR (500 MHz, Chloroform-d) δ ppm 9.09-9.16 (m, 1H), 8.73-8.82 (m, 1H), 8.13-8.19 (m, 1H), 7.85-7.98 (m, 1H), 7.63-7.69 (m, 1H), 7.49-7.63 (m, 1H), 7.42-7.47 (m, 1H), 7.37-7.42 (m, 1H), 7.20-7.33 (m, 2H), 7.09-7.16 (m, 1H), 4.30-4.46 (m, 2H), 4.23-4.30 (m, 2H), 3.53-3.69 (m, 2H), 2.84-3.04 (m, 4H), 2.10-2.14 (m, 3H), 1.66-1.82 (m, 2H).

Example 57: 4-{[6-(5-chloro-2-fluorophenyl)pyridazin-4-yl]amino}quinolin-7-yl 4-(2-Hydroxyethyl)piperazine-1-carboxylate

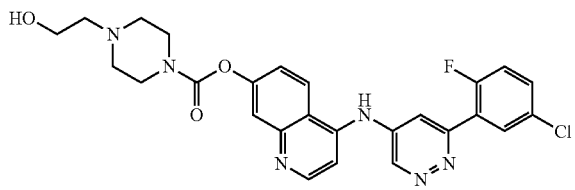 [SMILES: O=C(Oc1ccc2c(Nc3cnnc(-c4cc(Cl)ccc4F)c3)ccnc2c1)N1CCN(CCO)CC1]

Tetrabutylammonium fluoride 1M in THF (0.22 mL, 0.220 mmol) was added drop wise to a stirred solution 4-{[6-(5-chloro-2-fluorophenyl)pyridazin-4-yl]amino}quinolin-7-yl 4-{2-[(tert-butyldiphenylsilyl)oxy]ethyl}piperazine-1-carboxylate (Intermediate 122, 110 mg, 0.14 mmol) in THF (5 mL) at 0° C. The reaction was warmed at RT and stirred 1 hr. The solvent was removed by reduced pressure. The residue was purified by flash chromatography on Biotage silica NH cartridge (from DCM to 5% MeOH/0.5% H₂O) to afford [4-[[6-(5-chloro-2-fluorophenyl)pyridazin-4-yl]amino]quinolin-7-yl]4-(2-hydroxyethyl)piperazine-1-carboxylate (30 mg, 0.06 mmol, 40% yield) as a yellow solid.

LC-MS (ESI): m/z (M+1): 523.3 (Method 2)

¹H NMR (400 MHz, DMSO-d₆) δ ppm 9.88 (br. s, 1H), 9.16 (br. s, 1H), 8.68 (br. s, 1H), 8.32 (d, J=9.1 Hz, 1H), 8.00 (dd, J=6.6, 2.7 Hz, 1H), 7.66-7.78 (m, 2H), 7.58-7.66 (m, 1H), 7.33-7.53 (m, 3H), 4.46 (t, J=5.3 Hz, 1H), 3.65 (br. s, 2H), 3.54 (q, J=6.0 Hz, 2H), 3.46 (br. s, 2H), 2.47-2.59 (m, 4H), 2.42-2.48 (m, 2H).

Example 58: (3S)-1-methylpyrrolidin-3-yl 4-{[6-(5-chloro-2-fluorophenyl)pyridazin-4-yl]amino}quinoline-7-carboxylate

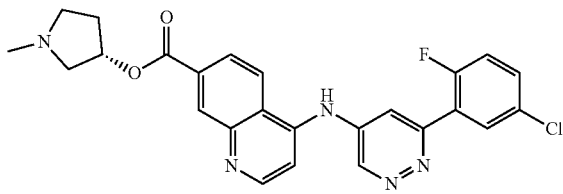 [SMILES: CN1CC[C@H](OC(=O)c2ccc3c(Nc4cnnc(-c5cc(Cl)ccc5F)c4)ccnc3c2)C1]

Example 58 was prepared following the procedure used for the synthesis of Example 20 starting from 4-{[6-(5-chloro-2-fluorophenyl)pyridazin-4-yl]amino}quinoline-7-carboxylic acid (Intermediate 15, 100 mg, 0.25 mmol) and (3S)-1-methylpyrrolidin-3-ol (128 mg, 1.27 mmol) to afford title compound (15 mg, 0.03 mmol, 12% yield) as a yellow solid.

LC-MS (ESI): m/z (M+1): 478.2 (Method 2)

¹H NMR (500 MHz, DMSO-d₆) δ ppm 9.93 (br. s, 1H), 9.26 (br. s, 1H), 8.85 (br. s, 1H), 8.56 (br. s, 1H), 8.43 (d, J=8.8 Hz, 1H), 8.09 (br. d, J=8.2 Hz, 1H), 8.01 (dd, J=6.4, 2.7 Hz, 1H), 7.79 (br. s, 1H), 7.56-7.72 (m, 2H), 7.47 (dd, J=10.4, 8.9 Hz, 1H), 5.33-5.44 (m, 1H), 2.68-2.83 (m, 3H), 2.31-2.37 (m, 2H), 2.30 (s, 3H), 1.91-2.01 (m, 1H).

Example 59

N-(4-{[6-(5-chloro-2-fluorophenyl)pyridazin-4-yl]amino}pyridin-2-yl)-3-[3-(2,2,2-trifluoroethyl)-1,3-diazinan-1-yl]propanamide

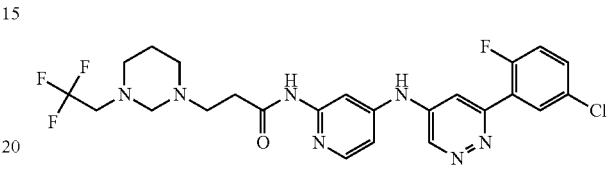

Example 59 was prepared following the procedure used for the synthesis of Example 33 starting from N-(4-{[6-(5-chloro-2-fluorophenyl)pyridazin-4-yl]amino}pyridin-2-yl)-3-(=3-[(2,2,2-trifluoroethyl)amino]propyl amino)propanamide (Intermediate 129, 40 mg, 0.08 mmol) to afford title compound (37 mg, 0.07 mmol, 90% yield) as a white solid.

LC-MS (ESI): m/z (M+1): 538.3 (Method 2)

¹H NMR (500 MHz, Chloroform-d) δ ppm 11.10 (s, 1H), 9.02 (d, J=2.7 Hz, 1H), 8.15-8.25 (m, 2H), 8.05 (d, J=2.1 Hz, 1H), 7.70 (dd, J=2.7, 1.5 Hz, 1H), 7.42 (ddd, J=8.8, 4.3, 2.7 Hz, 1H), 7.16 (dd, J=10.5, 8.9 Hz, 1H), 6.93 (dd, J=5.6, 2.2 Hz, 1H), 6.79 (s, 1H), 3.59 (s, 2H), 3.46 (q, J=9.6 Hz, 2H), 2.96 (t, J=5.6 Hz, 2H), 2.79 (br. s, 2H), 2.68-2.73 (m, 2H), 2.51-2.59 (m, 2H), 1.73-1.86 (m, 2H).

Example 60: Methyl 3-(4-{2-[(4-{[6-(5-chloro-2-fluorophenyl)pyridazin-4-yl]amino}quinolin-7-yl)oxy]ethyl}piperazin-1-yl)propanoate

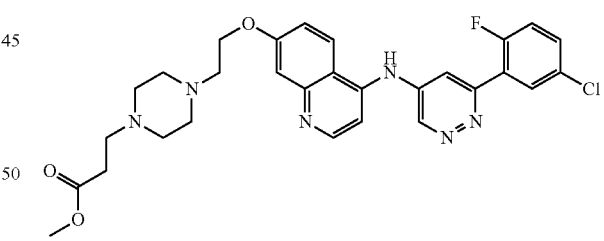

To a solution of N-[6-(5-chloro-2-fluorophenyl)pyridazin-4-yl]-7-[2-(piperazin-1-yl)ethoxy]quinolin-4-amine (Example 9, 70 mg, 0.15 mmol) in MeOH (0.20 mL), at RT, 2-propenoic acid methyl ester (0.02 mL, 0.17 mmol) was added and the resulting reaction mixture was stirred at RT for 2.5 hrs. The mixture was concentrated under reduced pressure, and the crude material was purified by flash chromatography on Biotage silica NH cartridge (from DCM to 2% MeOH) to afford methyl 3-(4-{2-[(4-{[6-(5-chloro-2-fluorophenyl)pyridazin-4-yl]amino}quinolin-7-yl)oxy]ethyl}piperazin-1-yl)propanoate (6 mg, 0.01 mmol, 7% yield) as a pale yellow solid.

LC-MS (ESI): m/z (M+1): 565.3 (Method 2)

¹H NMR (400 MHz, Chloroform-d) δ ppm 9.09 (d, J=2.64 Hz, 1H), 8.80 (d, J=4.84 Hz, 1H), 8.19 (dd, J=6.71, 2.75 Hz, 1H), 7.88 (d, J=9.24 Hz, 1H), 7.63 (dd, J=2.64, 1.54 Hz, 1H), 7.39-7.52 (m, 2H), 7.31 (d, J=5.06 Hz, 1H), 7.26 (d, J=2.42 Hz, 1H), 7.14 (dd, J=10.56, 8.80 Hz, 1H), 7.00 (s, 1H), 4.30 (t, J=5.61 Hz, 2H), 3.71 (s, 3H), 2.92 (t, J=5.61 Hz, 2H), 2.71-2.79 (m, 2H), 2.66 (br. s, 4H), 2.49-2.60 (m, 6H).

Example 61: 4-{[6-(5-chloro-2-fluorophenyl)pyridazin-4-yl]amino}quinolin-7-yl 4-[2-(Dimethylamino)ethyl]piperazine-1-carboxylate

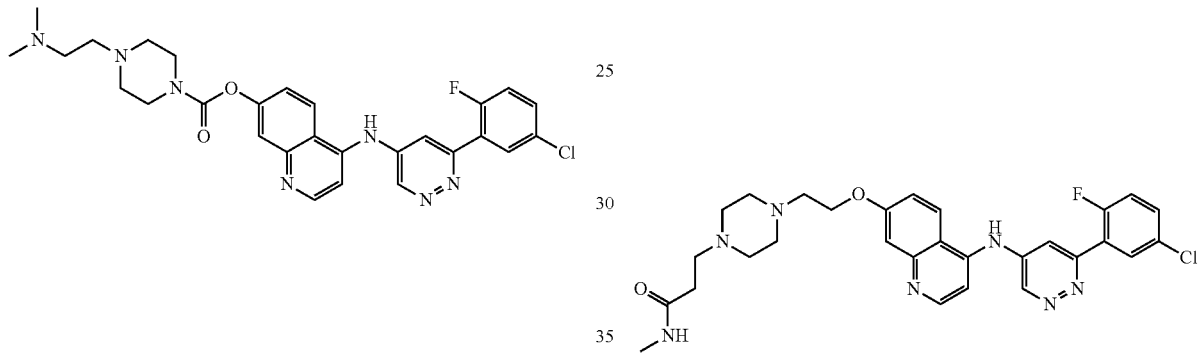

Example 61 was prepared following the procedure used for the synthesis of Example 45 starting from 4-{[6-(5-chloro-2-fluorophenyl)pyridazin-4-yl]amino}quinolin-7-ol hydrobromide (Intermediate 101, 140 mg, 0.31 mmol) and dimethyl[2-(piperazin-1-yl)ethyl]amine (98 mg, 0.62 mmol) to afford title compound (35 mg, 0.06 mmol, 20% yield) as a yellow solid.

LC-MS (ESI): m/z (M+1): 550.3 (Method 2)

¹H NMR (400 MHz, DMSO-d₆) δ ppm 9.85 (br. s, 1H), 9.20 (br. s, 1H), 8.72 (br. s, 1H), 8.32 (d, J=9.1 Hz, 1H), 8.01 (dd, J=6.5, 2.7 Hz, 1H), 7.73 (br. s, 1H), 7.69 (br. s, 1H), 7.59-7.66 (m, 1H), 7.38-7.56 (m, 3H), 3.64 (br. s, 2H), 3.46 (br. s, 2H), 2.47-2.60 (m, 4H), 2.43-2.49 (m, 2H), 2.34-2.40 (m, 2H), 2.15 (s, 6H).

Example 62: N-[6-(5-chloro-2-fluorophenyl)pyridazin-4-yl]-7-[2-(3-methyl-1,3-Diazinan-1-yl)ethoxy]quinolin-4-amine

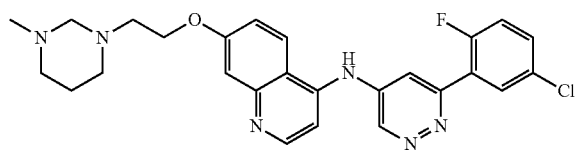 [SMILES: CN1CCCN(CCOc2ccc3c(Nc4cnnc(-c5cc(Cl)ccc5F)c4)ccnc3c2)C1]

Example 62 was prepared following the procedure used for the synthesis of Example 33 starting from N-[6-(5-chloro-2-fluorophenyl)pyridazin-4-yl]-7-(2-{[3-(methylamino)propyl]amino}ethoxy)quinolin-4-amine (Intermediate 134, 62 mg, mmol) to afford title compound (39 mg, 0.08 mmol, 61% yield) as a pale yellow solid.

LC-MS (ESI): m/z (M+1): 493.3 (Method 2)

¹H NMR (500 MHz, DMSO-d₆) δ ppm 9.76 (s, 1H), 9.21 (d, J=2.64 Hz, 1H), 8.69 (d, J=5.06 Hz, 1H), 8.19 (d, J=9.46 Hz, 1H), 8.01 (dd, J=6.60, 2.86 Hz, 1H), 7.72 (s, 1H), 7.64 (ddd, J=8.80, 4.18, 2.86 Hz, 1H), 7.39-7.51 (m, 3H), 7.31 (dd, J=9.24, 2.64 Hz, 1H), 4.24 (t, J=5.72 Hz, 2H), 3.15 (br. s, 2H), 2.87 (t, J=5.72 Hz, 2H), 2.60 (br. s, 2H), 2.31-2.45 (m, 2H), 2.12 (s, 3H), 1.54-1.66 (m, 2H).

Example 63: 3-(4-{2-[(4-{[6-(5-chloro-2-fluorophenyl)pyridazin-4-yl]amino}quinolin-7-yl)oxy]ethyl}piperazin-1-yl)-N-Methylpropanamide A solution of methyl 3-(4-{2-[(4-{[6-(5-chloro-2-fluorophenyl)pyridazin-4-yl]amino}quinolin-7-yl)oxy]ethyl}piperazin-1-yl)propanoate (Example 60, 49 mg, mmol) and methyl amine 2 M in MeOH (1.73 mL, 3.47 mmol) was stirred 36 hrs at RT. The reaction mixture was concentrated under reduced pressure and the crude material was purified by flash chromatography on Biotage silica NH cartridge (from DCM to 3% MeOH). Opportune fractions were collected and evaporated, the material was dissolved in DCM and the solution was washed with a concentrated solution of NH₄Cl. The organic phase was washed with water, dried over Na₂SO₄, filtered, and the solvent was removed under reduced pressure to afford 3-(4-{2-[(4-{[6-(5-chloro-2-fluorophenyl)pyridazin-4-yl]amino}quinolin-7-yl)oxy]ethyl}piperazin-1-yl)-N-methylpropanamide (8 mg, 0.014 mmol, 16% yield) as a pale yellow solid.

LC-MS (ESI): m/z (M+1): 564.7 (Method 2)

¹H NMR (400 MHz, Chloroform-d) δ ppm 9.11 (d, J=2.64 Hz, 1H), 8.80 (d, J=5.06 Hz, 1H), 8.18 (dd, J=6.60, 2.64 Hz, 1H), 8.02-8.10 (m, 1H), 7.94 (d, J=9.24 Hz, 1H), 7.63-7.68 (m, 1H), 7.48 (d, J=2.20 Hz, 1H), 7.36-7.45 (m, 2H), 7.32 (d, J=5.06 Hz, 1H), 7.25 (dd, J=9.24, 2.42 Hz, 1H), 7.14 (dd, J=10.56, 8.80 Hz, 1H), 4.31 (t, J=5.61 Hz, 2H), 2.94 (t, J=5.61 Hz, 2H), 2.81 (d, J=4.62 Hz, 3H), 2.51-2.75 (m, 10H), 2.37-2.45 (m, 2H).

Example 64: 4-{[6-(5-chloro-2-fluorophenyl) pyridazin-4-yl]amino}quinolin-7-yl 4-[2-(1-methylpiperidin-4-yl)ethyl]piperazine-1-carboxylate

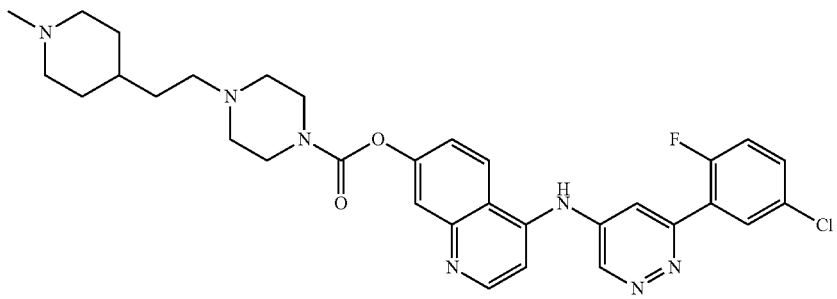 [SMILES: CN1CCC(CCN2CCN(C(=O)Oc3ccc4c(Nc5cnnc(-c6cc(Cl)ccc6F)c5)ccnc4c3)CC2)CC1]

Example 64 was prepared following the procedure used for the synthesis of Example 45 starting from 4-{[6-(5-chloro-2-fluorophenyl)pyridazin-4-yl]amino}quinolin-7-ol hydrobromide (Intermediate 101, 180 mg, 0.40 mmol) and 1-[2-(1-methylpiperidin-4-yl)ethyl]piperazine (Intermediate 139, 170 mg, 0.8 mmol) to afford title compound (70 mg, 0.12 mmol, 28% yield) as a yellow solid.

LC-MS (ESI): m/z (M+1): 604.4 (Method 2)

$^1$H NMR (400 MHz, DMSO-$d_6$) δ ppm 9.85 (br. s, 1H), 9.21 (br. s, 1H), 8.60-8.84 (m, 1H), 8.32 (d, J=9.2 Hz, 1H), 8.01 (dd, J=6.5, 2.7 Hz, 1H), 7.74 (br. s, 1 H), 7.70 (br. s, 1H), 7.60-7.66 (m, 1H), 7.37-7.58 (m, 3H), 3.58-3.74 (m, 2H), 3.39-3.54 (m, 2H), 2.71 (br. d, J=11.4 Hz, 2H), 2.39-2.48 (m, 4H), 2.29-2.40 (m, 2H), 2.12 (s, 3H), 1.75-1.85 (m, 2H), 1.62 (br. d, J=11.2 Hz, 2H), 1.34-1.47 (m, 2H), 1.06-1.31 (m, 3H).

Example 65: N-(4-{[6-(5-chloro-2-fluorophenyl)-3-methylpyridazin-4-yl]amino}pyridin-2-yl)-4-(4-methylpiperazin-1-yl)butanamide

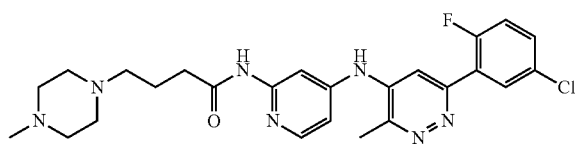 [SMILES: Cc1nnc(-c2cc(Cl)ccc2F)cc1Nc1ccnc(NC(=O)CCCN2CCN(C)CC2)c1]

Example 65 was prepared following the procedure used for the synthesis of Example 1 starting from N-(4-bromopyridin-2-yl)-4-(4-methylpiperazin-1-yl)butanamide (Intermediate 140, 98 mg, 0.25 mmol) and 6-(5-chloro-2-fluorophenyl)-3-methylpyridazin-4-amine (Intermediate 90, 58 mg, 0.23 mmol) to afford title compound (31 mg, 0.06 mmol, 28% yield) as a pale yellow solid.

LC-MS (ESI): m/z (M+1): 498.7 (Method 2)

$^1$H NMR (500 MHz, Chloroform-d) δ ppm 9.29 (s, 1H), 8.20 (d, J=5.6 Hz, 1H), 8.17 (dd, J=6.7, 2.7 Hz, 1H), 8.04 (d, J=1.7 Hz, 1H), 7.80 (s, 1H), 7.33-7.45 (m, 1H), 7.12 (dd, J=10.2, 9.0 Hz, 1H), 6.94 (dd, J=5.6, 2.0 Hz, 1H), 6.18 (s, 1H), 2.75 (s, 3H), 2.31 (s, 3H), 2.26-2.71 (m, 12H), 1.92 (quin, J=6.7 Hz, 2H).

Example 66: 7-{2-[4-(2-aminoethyl)piperazin-1-yl]ethoxy}-N-[6-(5-chloro-2-fluorophenyl)pyridazin-4-yl]quinolin-4-amine

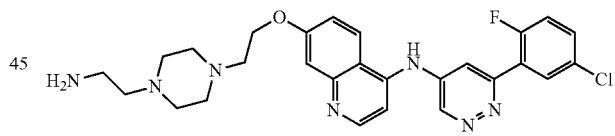

Example 66 was prepared following the procedure used for the synthesis of Example 2 starting from tert-butyl N-[2-(4-{2-[(4-{[6-(5-chloro-2-fluorophenyl)pyridazin-4-yl]amino}quinolin-7-yl)oxy]ethyl}piperazin-1-yl)ethyl]carbamate (Intermediate 141, 100 mg, 0.16 mmol) to afford title compound (78 mg, 0.15 mmol, 93% yield) as a yellow wax.

LC-MS (ESI): m/z (M+1): 522.7 (Method 2)

$^1$H NMR (400 MHz, DMSO-$d_6$) δ ppm 9.18 (d, J=2.5 Hz, 1H), 8.64 (br. d, J=4.6 Hz, 1H), 8.18 (d, J=9.3 Hz, 1H), 8.00 (dd, J=6.6, 2.7 Hz, 1H), 7.69 (s, 1H), 7.58-7.66 (m, 1H), 7.45 (dd, J=10.6, 8.9 Hz, 1H), 7.39 (d, J=2.2 Hz, 1H), 7.36 (br. d, J=2.9 Hz, 1H), 7.29 (dd, J=9.2, 2.4 Hz, 1H), 4.25 (t, J=5.6 Hz, 2H), 2.76 (t, J=5.6 Hz, 2H), 2.60 (t, J=6.5 Hz, 2H), 2.35-2.60 (m, 8H), 2.28 (t, J=6.5 Hz, 2H).

Example 67: N-[2-(4-{2-[(4-{[6-(5-chloro-2-fluoro-phenyl)pyridazin-4-yl]amino}quinolin-7-yl)oxy]ethyl}piperazin-1-yl)ethyl]methanesulfonamide

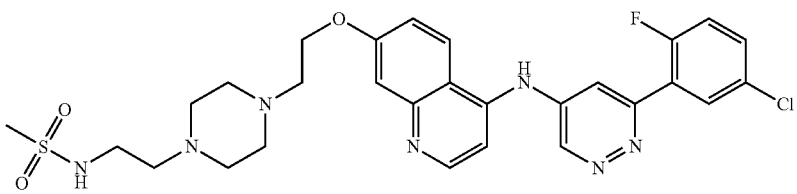 [SMILES: CS(=O)(=O)NCCN1CCN(CCOc2ccc3c(Nc4cnnc(-c5cc(Cl)ccc5F)c4)ccnc3c2)CC1]

Example 67 was prepared following the procedure used for the synthesis of Example 36 starting from 7-{2-[4-(2-aminoethyl)piperazin-1-yl]ethoxy}-N-[6-(5-chloro-2-fluo-rophenyl)pyridazin-4-yl]quinolin-4-amine (Example 66, 78 mg, 0.15 mmol) to afford title compound (22 mg, 0.04 mmol, 25% yield) as a yellow solid.

LC-MS (ESI): m/z (M+1): 600.7 (Method 2)

$^1$H NMR (500 MHz, Chloroform-d) δ ppm 9.07 (d, J=2.9 Hz, 1H), 8.79 (br. d, J=4.6 Hz, 1H), 8.18 (dd, J=6.7, 2.7 Hz, 1H), 7.88 (d, J=9.2 Hz, 1H), 7.63 (br. d, J=1.5 Hz, 1H), 7.47 (br. s, 1H), 7.41 (ddd, J=8.8, 4.2, 2.9 Hz, 1H), 7.21-7.33 (m, 2H), 7.13 (dd, J=10.6, 8.9 Hz, 1H), 6.91 (br. s, 1H), 4.70-5.20 (m, 1H), 4.29 (t, J=5.5 Hz, 2H), 3.21 (br t, J=5.5 Hz, 2H), 2.98 (s, 3H), 2.92 (t, J=5.5 Hz, 2H), 2.60-2.72 (m, 4H), 2.48-2.59 (m, 6H).

Example 68: N-[6-(5-chloro-2-fluorophenyl)pyridazin-4-yl]-7-[2-[4-[2-(Dim Ethylamino)ethyl]piperazin-1-yl]ethoxy]quinolin-4-amine

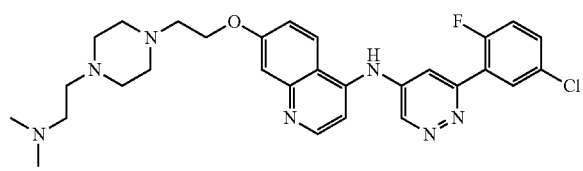 [SMILES: CN(C)CCN1CCN(CCOc2ccc3c(Nc4cnnc(-c5cc(Cl)ccc5F)c4)ccnc3c2)CC1]

Example 68 was prepared following the procedure used for the synthesis of Example 55 starting from 7-{2-[4-(2-aminoethyl)piperazin-1-yl]ethoxy}-N-[6-(5-chloro-2-fluo-rophenyl)pyridazin-4-yl]quinolin-4-amine (Example 66, 110 mg, 0.21 mmol) to afford title compound (25 mg, 0.04 mmol, 22% yield) as a pale yellow solid.

LC-MS (ESI): m/z (M+1): 550.7 (Method 2)

$^1$H NMR (500 MHz, Chloroform-d) δ ppm 9.09 (d, J=2.86 Hz, 1H), 8.80 (d, J=4.84 Hz, 1H), 8.16 (dd, J=6.60, 2.86 Hz, 1H), 7.90 (d, J=9.24 Hz, 1H), 7.63 (dd, J=2.53, 1.65 Hz, 1H), 7.47 (s, 1H), 7.41 (ddd, J=8.80, 4.29, 2.75 Hz, 1H), 7.21-7.34 (m, 3H), 7.13 (dd, J=10.56, 8.80 Hz, 1H), 4.29 (t, J=5.72 Hz, 2H), 2.92 (t, J=5.61 Hz, 2H), 2.62-2.74 (m, 4H), 2.42-2.62 (m, 8H), 2.27 (s, 6H).

Example 69: N-[2-(4-{2-[(4-{[6-(5-chloro-2-fluoro-phenyl)pyridazin-4-yl]amino}quinolin-7-yl)oxy]ethyl}piperazin-1-yl)ethyl]acetamide

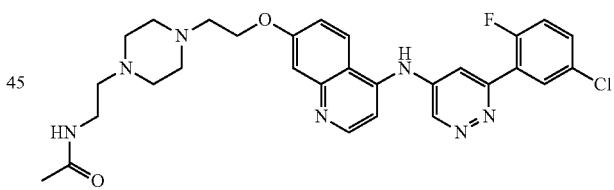

Example 69 was prepared following the procedure used for the synthesis of Example 35 starting from 7-{2-[4-(2-aminoethyl)piperazin-1-yl]ethoxy}-N-[6-(5-chloro-2-fluo-rophenyl)pyridazin-4-yl]quinolin-4-amine (Example 66, 50 mg, 0.1 mmol) to afford title compound (24 mg, 0.04 mmol, 44% yield) as a yellow solid.

LC-MS (ESI): m/z (M+1): 564.7 (Method 2)

$^1$H NMR (400 MHz, Chloroform-d) δ ppm 9.12 (d, J=2.64 Hz, 1H), 8.79 (d, J=5.06 Hz, 1H), 8.16 (dd, J=6.71, 2.75 Hz, 1H), 7.94 (d, J=9.02 Hz, 1H), 7.65 (dd, J=2.53, 1.65 Hz, 1H), 7.55 (s, 1H), 7.47 (d, J=2.42 Hz, 1H), 7.41 (ddd, J=8.80, 4.18, 2.86 Hz, 1H), 7.31 (d, J=5.06 Hz, 1H), 7.24 (dd, J=9.24, 2.42 Hz, 1H), 7.13 (dd, J=10.56, 8.80 Hz, 1H), 6.06 (br. s, 1H), 4.29 (t, J=5.61 Hz, 2H), 3.36 (q, J=5.58 Hz, 2H), 2.93 (t, J=5.61 Hz, 2H), 2.66 (br. s, 4H), 2.45-2.59 (m, 6H), 2.45-2.60 (m, 6H), 2.01 (s, 3H).

Example 4-{[6-(5-chloro-2-fluorophenyl)pyridazin-4-yl]amino}quinolin-7-yl 4-[2-(4-methylpiperazin-1-yl)ethyl]piperidine-1-carboxylate

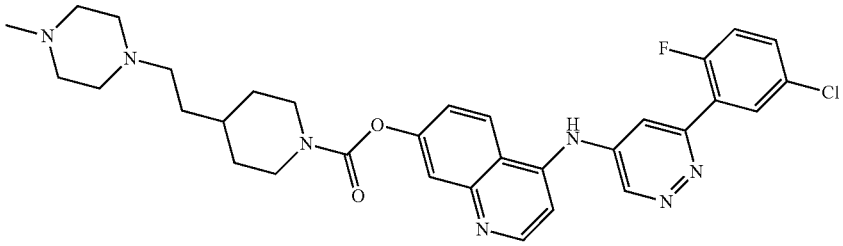 [SMILES: CN1CCN(CCC2CCN(C(=O)Oc3ccc4c(Nc5cnnc(-c6cc(Cl)ccc6F)c5)ccnc4c3)CC2)CC1]

Example 70 was prepared following the procedure used for the synthesis of Example 45 starting from 4-{[6-(5-chloro-2-fluorophenyl)pyridazin-4-yl]amino}quinolin-7-ol hydrobromide (Intermediate 101, 200 mg, 0.45 mmol) and 1-methyl-4-[2-(piperidin-4-yl)ethyl]piperazine (Intermediate 143, 140 mg, 0.66 mmol) to afford title compound (70 mg, 0.12 mmol, 26% yield) as a yellow solid.

LC-MS (ESI): m/z (M+1): 604.8 (Method 2)

$^1$H NMR (500 MHz, DMSO-$d_6$) δ ppm 9.84 (br. s, 1H), 9.23 (br. s, 1H), 8.75 (br. s, 1H), 8.31 (d, J=9.2 Hz, 1H), 8.01 (dd, J=6.6, 2.7 Hz, 1H), 7.75 (br. s, 1H), 7.70 (br. s, 1H), 7.61-7.66 (m, 1H), 7.53 (br. s, 1H), 7.46 (dd, J=10.5, 8.9 Hz, 2H), 3.96-4.28 (m, 2H), 2.83-3.15 (m, 2H), 2.16-2.47 (m, 10H), 2.14 (s, 3H), 1.67-1.81 (m, 2H), 1.50-1.62 (m, 1H), 1.41 (q, J=7.0 Hz, 2H), 1.05-1.32 (m, 2H).

Example 71: 3-(4-{2-[(4-{[6-(5-chloro-2-fluorophenyl)pyridazin-4-yl]amino}quinolin-7-yl)oxy]ethyl}piperazin-1-yl)propanenitrile

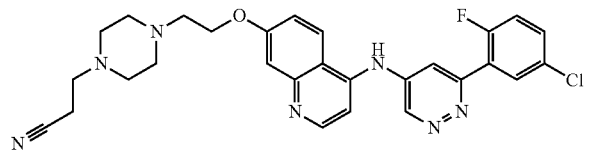 [SMILES: N#CCCN1CCN(CCOc2ccc3c(Nc4cnnc(-c5cc(Cl)ccc5F)c4)ccnc3c2)CC1]

A mixture of 3-bromopropanenitrile (30 mg, 0.22 mmol), N-[6-(5-chloro-2-fluorophenyl)pyridazin-4-yl]-7-[2-(piperazin-1-yl)ethoxy]quinolin-4-amine (Example 9, 80 mg, 0.17 mmol) and K$_2$CO$_3$ (47 mg, 0.34 mmol) in dry DMF (0.68 mL) was stirred at 50° C. overnight. The reaction mixture was diluted with EtOAc and filtered. The solution was washed with water, dried over Na$_2$SO$_4$, filtered, and concentrated under reduced pressure. The crude material was purified by reverse flash chromatography on Biotage C18 cartridge (from H$_2$O+0.1% NH$_4$OH to 50% MeCN). Opportune fractions were combined and the material so obtained was further purified by flash chromatography on Biotage silica NH cartridge (from DCM to 1.5% MeOH) to afford 3-(4-{2-[(4-{[6-(5-chloro-2-fluorophenyl)pyridazin-4-yl]amino}quinolin-7-yl)oxy]ethyl}piperazin-1-yl)propanenitrile (10 mg, 0.02 mmol, 11% yield) as a pale yellow solid.

LC-MS (ESI): m/z (M+1): 532.3 (Method 2)

$^1$H NMR (400 MHz, Chloroform-d) δ ppm 9.07 (d, J=2.5 Hz, 1H), 8.79 (d, J=4.9 Hz, 1H), 8.17 (dd, J=6.6, 2.7 Hz, 1H), 7.87 (d, J=9.2 Hz, 1H), 7.58-7.68 (m, 1H), 7.47 (d, J=1.7 Hz, 1H), 7.41 (dt, J=8.7, 3.5 Hz, 1H), 7.25-7.33 (m, 2H), 7.13 (dd, J=10.4, 8.9 Hz, 1H), 6.94 (s, 1H), 4.28 (t, J=5.6 Hz, 2H), 2.92 (t, J=5.6 Hz, 2H), 2.70-2.77 (m, 2H), 2.55-2.70 (m, 8H), 2.49-2.55 (m, 2H).

Example 72: 2-(4-{2-[(4-{[6-(5-chloro-2-fluorophenyl)pyridazin-4-yl]amino}quinolin-7-yl)oxy]ethyl}piperazin-1-yl)ethan-1-ol

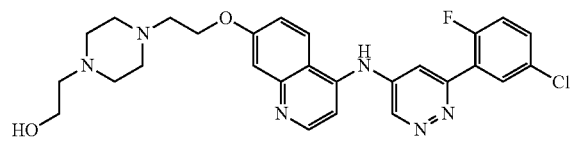 [SMILES: OCCN1CCN(CCOc2ccc3c(Nc4cnnc(-c5cc(Cl)ccc5F)c4)ccnc3c2)CC1]

To a mixture of N-[6-(5-chloro-2-fluorophenyl)pyridazin-4-yl]-7-[2-(piperazin-1-yl)ethoxy]quinolin-4-amine (Example 9, 20 mg, 0.04 mmol) in MeCN (0.50 mL), TEA (0.12 mL, 0.84 mmol), and 2-bromoethanol (0.02 mL, 0.33 mmol) were added subsequently and the resulting reaction mixture was stirred at RT for 36 hrs. The mixture was concentrated under reduced pressure, and the crude material was purified by reverse flash chromatography on Biotage C18 cartridge (from H$_2$O+0.2% NH$_4$OH to 100% MeCN) to afford 2-(4-{2-[(4-{[6-(5-chloro-2-fluorophenyl)pyridazin-4-yl]amino}quinolin-7-yl)oxy]ethyl}piperazin-1-yl)ethan-1-o1 (6 mg, 0.01 mmol, 27% yield) as a pale yellow solid.

LC-MS (ESI): m/z (M+1): 523.3 (Method 2)

$^1$H NMR (400 MHz, Chloroform-d) δ ppm 9.09 (d, J=2.4 Hz, 1H), 8.78 (d, J=4.9 Hz, 1H), 8.15 (dd, J=6.7, 2.6 Hz, 1H), 7.90 (d, J=9.2 Hz, 1H), 7.62 (s, 1H), 7.46 (d, J=1.4 Hz, 1H), 7.40 (dt, J=3.5 Hz, 1H), 7.30 (br. d, J=4.9 Hz, 1H), 7.22-7.26 (m, 1H), 7.18-7.28 (m, 1H), 7.12 (dd, J=10.4, 9.0 Hz, 1H), 4.29 (t, J=5.6 Hz, 2H), 3.63 (br t, J=5.1 Hz, 2H), 2.92 (t, J=5.6 Hz, 2H), 2.80 (br. s, 1H), 2.50-2.75 (m, 10H).

Example 73: N-[6-(5-chloro-2-fluorophenyl)pyridazin-4-yl]-7-[(1-methylpiperidin-4-yl)oxy]quinolin-4-amine

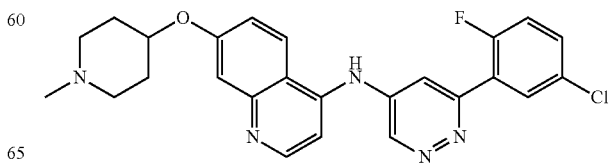

A mixture of N-[6-(5-chloro-2-fluorophenyl)pyridazin-4-yl]-7-(piperidin-4-yloxy)quinolin-4-amine (Intermediate 146, 129 mg, 0.29 mmol), a solution of formaldehyde 37% w/w in water (0.11 mL, 1.43 mmol), and a drop of acetic acid was stirred at 0° C. for 2 min, then sodium triacetoxyborohydride (91 mg, 0.43 mmol) was added and the resulting mixture was stirred at RT overnight. The mixture was concentrated, and the resulting crude was dissolved in DCM. The organic phase was washed with water (pH corrected with NaHCO₃) and brine. The organic phase was dried over Na₂SO₄, filtered and evaporated. The resulting crude was purified by reverse flash chromatography on Biotage C18 cartridge (from H₂O to 100% MeCN, then 100% MeOH) to afford N-[6-(5-chloro-2-fluorophenyl)pyridazin-4-yl]-7-[(1-methylpiperidin-4-yl)oxy]quinolin-4-amine (62 mg, 0.13 mmol, 47% yield) as a yellow solid.

LC-MS (ESI): m/z (M+1): 464.3 (Method 2)

¹H NMR (400 MHz, DMSO-d₆) δ ppm 9.81 (br. s, 1H), 9.15 (br. d, J=1.9 Hz, 1H), 8.60 (br. d, J=4.4 Hz, 1H), 8.19 (d, J=9.2 Hz, 1H), 7.99 (dd, J=6.6, 2.7 Hz, 1H), 7.66 (br. s, 1H), 7.62 (ddd, J=8.8, 4.2, 2.8 Hz, 1H), 7.45 (dd, J=10.6, 8.9 Hz, 1H), 7.37 (d, J=2.0 Hz, 1H), 7.32 (br. d, J=2.9 Hz, 1H), 7.26 (dd, J=9.2, 2.2 Hz, 1H), 4.61 (tt, J=7.9, 3.8 Hz, 1H), 2.57-2.73 (m, 2H), 2.21-2.30 (m, 2H), 2.20 (s, 3H), 1.93-2.08 (m, 2H), 1.65-1.78 (m, 2H).

Example 74: N-(4-{[6-(5-chloro-2-fluorophenyl)-3-methylpyridazin-4-yl]amino}pyridin-2-yl)-3-(piperazin-1-yl)propanamide

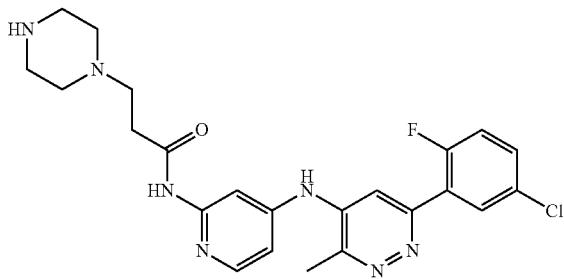 [SMILES: Cc1nnc(-c2cc(Cl)ccc2F)cc1Nc1ccnc(NC(=O)CCN2CCNCC2)c1]

Example 74 was prepared following the procedure used for the synthesis of Example 2 starting from tert-butyl 4-{2-[(4-{[6-(5-chloro-2-fluorophenyl)-3-methylpyridazin-4-yl]amino}pyridin-2-yl)carbamoyl]ethyl}piperazine-1-carboxylate (Intermediate 147, 90 mg, 0.16 mmol) to afford title compound (55 mg, mmol, 74% yield) as a white solid.

LC-MS (ESI): m/z (M+1): 470.3 (Method 2)

¹H NMR (400 MHz, Chloroform-d) δ ppm 11.37 (br. s, 1H), 8.22 (d, J=5.6 Hz, 1H), 8.16 (dd, J=6.6, 2.6 Hz, 1H), 8.02 (d, J=1.9 Hz, 1H), 7.79 (s, 1H), 7.34-7.45 (m, 1H), 7.12 (dd, J=10.3, 9.0 Hz, 1H), 6.93 (dd, J=5.6, 2.1 Hz, 1H), 6.20 (s, 1H), 3.08 (t, J=4.8 Hz, 4H), 2.76 (s, 3H), 2.73-2.79 (m, 2H), 2.64 (br. s, 4H), 2.54-2.58 (m, 2H).

Example 75: 2-{[2-(4-{2-[(4-{[6-(5-chloro-2-fluorophenyl)pyridazin-4-yl]amino}quinolin-7-yl)oxy]ethyl}piperazin-1-yl)ethyl](2-Hydroxyethyl)amino}ethan-1-ol

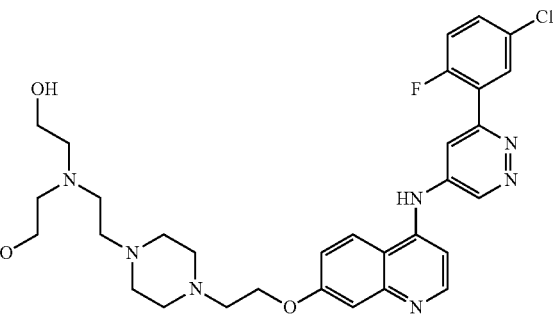

To a mixture 7-{2-[4-(2-aminoethyl)piperazin-1-yl]ethoxy}-N-[6-(5-chloro-2-fluorophenyl)pyridazin-4-yl]quinolin-4-amine (Example 66, 70 mg, 0.13 mmol) in MeCN (1.5 mL) and MeOH (0.15 mL), TEA (0.37 mL, 2.68 mmol), and 2-bromoethanol (0.11 mL, 1.61 mmol) were added subsequently and the resulting reaction mixture was stirred at RT for 24 hrs. The mixture was concentrated under reduced pressure, and the crude material was purified by flash chromatography on Biotage silica NH cartridge (from DCM to 3% MeOH), proper fractions were collected and further purified by reverse phase flash chromatography on Biotage C18 cartridge (from H₂O+0.2% NH₄OH to 30% MeCN) to afford 2-{[2-(4-{2-[(4-{[6-(5-chloro-2-fluorophenyl)pyridazin-4-yl]amino}quinolin-7-yl)oxy]ethyl}piperazin-1-yl)ethyl](2-hydroxyethyl)amino}ethan-1-ol (6 mg, 0.01 mmol, 7% yield) as a pale yellow glassy solid.

LC-MS (ESI): m/z (M+1): 610.4 (Method 2)

¹H NMR (500 MHz, Chloroform-d) δ ppm 9.11 (d, J=2.7 Hz, 1H), 8.75 (br. d, J=3.4 Hz, 1H), 8.13 (dd, J=6.7, 2.7 Hz, 1H), 7.90 (d, J=9.2 Hz, 1H), 7.64 (dd, J=2.5, 1.7 Hz, 1H), 7.60 (br. s, 1H), 7.42 (d, J=2.2 Hz, 1H), 7.39 (ddd, J=8.8, 4.3, 2.7 Hz, 1H), 7.28 (br. s, 1H), 7.21 (dd, J=9.2, 2.5 Hz, 1H), 7.11 (dd, J=10.6, 8.8 Hz, 1H), 4.24 (t, J=5.5 Hz, 2H), 3.59 (t, J=5.1 Hz, 4H), 2.87 (t, J=5.5 Hz, 2H), 2.73 (t, J=5.1 Hz, 4H), 2.67-2.71 (m, 2H), 2.47-2.52 (m, 2H), 2.43-2.77 (m, 8H).

Example 76: 3-[4-(2-aminoethyl)piperazin-1-yl]-N-(4-{[6-(5-chloro-2-fluorophenyl)-3-methylpyridazin-4-yl]amino}pyridin-2-yl)propanamide

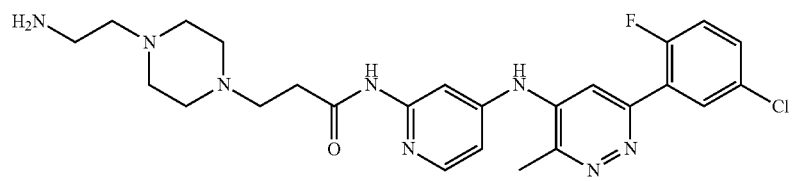 [SMILES: Cc1nnc(-c2cc(Cl)ccc2F)cc1Nc1ccnc(NC(=O)CCN2CCN(CCN)CC2)c1]

Example 76 was prepared following the procedure used for the synthesis of Example 2 starting from tert-butyl N-[2-(4-{2-[(4-{[6-(5-chloro-2-fluorophenyl)-3-methylpyridazin-4-yl]amino}pyridin-2-yl)carbamoyl]ethyl}piperazin-1-yl)ethyl]carbamate (Intermediate 148, 49 mg, 0.08 mmol) to afford title compound (34 mg, 0.07 mmol, 83% yield) as a yellow glassy solid.

LC-MS (ESI): m/z (M+1): 513.4 (Method 2)

¹H NMR (400 MHz, DMSO-d₆) δ ppm 10.63 (s, 1H), 8.14 (d, J=5.7 Hz, 1H), 8.07 (d, J=2.1 Hz, 1H), 7.98 (dd, J=6.6, 2.8 Hz, 1H), 7.71 (d, J=1.4 Hz, 1H), 7.60 (ddd, J=8.8, 4.2, 2.8 Hz, 1H), 7.42 (dd, J=10.6, 8.8 Hz, 1H), 6.96 (dd, J=5.7, 2.1 Hz, 1H), 2.68 (s, 3H), 2.59 (t, J=6.9 Hz, 4H), 2.54-2.50 (m, 2H), 2.45-2.33 (m, 8H), 2.26 (t, J=6.5 Hz, 2H).

Example 77: Methyl N-[2-(4-{2-[(4-{[6-(5-chloro-2-fluorophenyl)pyridazin-4-yl]amino}quinolin-7-yl)oxy]ethyl}piperazin-1-yl)ethyl]carbamate

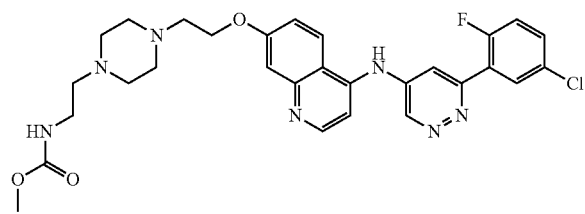 [SMILES: COC(=O)NCCN1CCN(CCOc2ccc3c(Nc4cnnc(-c5cc(Cl)ccc5F)c4)ccnc3c2)CC1]

To a stirred solution of 7-{2-[4-(2-aminoethyl)piperazin-1-yl]ethoxy}-N-[6-(5-chloro-2-fluorophenyl)pyridazin-4-yl]quinolin-4-amine (Example 66, 96 mg, mmol) and TEA (0.05 mL, 0.37 mmol) in DCM (1 mL), at 0° C. and under a N₂, methyl chloroformate (0.02 mL, 0.20 mmol) was added, the resulting reaction mixture was stirred 5 min at 0° C., then the ice-bath was removed and the reaction mixture was stirred at RT for 1 hr. The reaction mixture was diluted with DCM, washed with a saturated solution of NaHCO₃, dried over Na₂SO₄, filtered, and the solvent removed under reduced pressure. The crude material was purified by flash chromatography on Biotage silica NH cartridge (from DCM to 3% MeOH), to afford methyl N-[2-(4-{2-[(4-{[6-(5-chloro-2-fluorophenyl)pyridazin-4-yl]amino}quinolin-7-yl)oxy]ethyl}piperazin-1-yl)ethyl]carbamate (32 mg, 0.05 mmol, 30% yield) as a white solid.

LC-MS (ESI): m/z (M+1): 580.4 (Method 2)

¹H NMR (400 MHz, Chloroform-d) δ ppm 9.08 (d, J=2.6 Hz, 1H), 8.79 (d, J=5.0 Hz, 1H), 8.15 (dd, J=6.6, 2.6 Hz, 1H), 7.89 (d, J=9.2 Hz, 1H), 7.62 (s, 1H), 7.46 (d, J=1.8 Hz, 1H), 7.40 (ddd, J=8.8, 4.2, 2.9 Hz, 1H), 7.30 (d, J=5.0 Hz, 1H), 7.23-7.27 (m, 1H), 7.05-7.20 (m, 2H), 4.90-5.39 (m, 1H), 4.28 (t, J=5.6 Hz, 2H), 3.68 (s, 3H), 3.29 (br. d, J=5.0 Hz, 2H), 2.91 (t, J=5.6 Hz, 2H), 2.34-2.76 (m, 10H).

Example 78: N-(4-{[6-(5-chloro-2-fluorophenyl)-3-methylpyridazin-4-yl]amino}pyridin-2-yl)-3-(morpholin-4-yl)propanamide

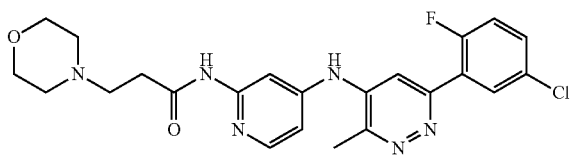 [SMILES: Cc1nnc(-c2cc(Cl)ccc2F)cc1Nc1ccnc(NC(=O)CCN2CCOCC2)c1]

Example 78 was prepared following the procedure used for the synthesis of Example 3 starting from N-(4-bromopyridin-2-yl)-3-(morpholin-4-yl)propanamide (Intermediate 37, 120 mg, 0.38 mmol), and 6-(5-chloro-2-fluorophenyl)-3-methylpyridazin-4-amine (Intermediate 90, 70 mg, 0.29 mmol) to afford title compound (43 mg, 0.09 mmol, 31% yield) as a pale yellow solid.

LC-MS (ESI): m/z (M+1): 471.3 (Method 1)

¹H NMR (400 MHz, DMSO-d₆) δ ppm 10.60 (s, 1H), 8.85 (s, 1H), 8.13 (d, J=5.5 Hz, 1H), 8.07 (s, 1H), 7.98 (dd, J=6.6, 2.6 Hz, 1H), 7.68-7.73 (m, 1H), 7.57-7.64 (m, 1H), 7.42 (dd, J=10.4, 8.9 Hz, 1H), 6.96 (dd, J=5.7, 2.0 Hz, 1H), 3.56 (t, J=4.5 Hz, 4H), 2.67 (s, 3H), 2.59-2.64 (m, 2H), 2.52-2.57 (m, 2H), 2.37-2.44 (m, 4H).

Example 79: N-(4-{[6-(5-chloro-2-fluorophenyl)-3-methylpyridazin-4-yl]amino}pyridin-2-yl)-3-[3-ethoxy-3-(hydroxymethyl)azetidin-1-yl]propanamide

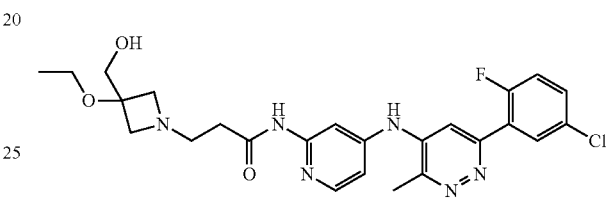

Example 79 was prepared following the procedure used for the synthesis of Example 1 starting from N-(4-bromopyridin-2-yl)-3-[3-ethoxy-3-(hydroxymethyl)azetidin-1-yl]propanamide (Intermediate 149, 126 mg, 0.35 mmol) and 6-(5-chloro-2-fluorophenyl)-3-methylpyridazin-4-amine (Intermediate 90, 70 mg, 0.29 mmol) to afford title compound (102 mg, 0.2 mmol, 67% yield) as a pale yellow solid.

LC-MS (ESI): m/z (M+1): 515.6 (Method 2)

¹H NMR (400 MHz, Chloroform-d) δ ppm 11.40 (s, 1H), 8.19 (d, J=5.6 Hz, 1H), 8.16 (dd, J=6.6, 2.7 Hz, 1H), 7.99 (d, J=1.9 Hz, 1H), 7.78 (s, 1H), 7.39 (ddd, J=8.8, 4.2, 2.8 Hz, 1H), 7.13 (dd, J=10.4, 8.9 Hz, 1H), 6.92 (dd, J=5.7, 2.1 Hz, 1H), 6.23 (s, 1H), 3.97 (s, 2H), 3.59 (d, J=8.2 Hz, 2H), 3.52 (q, J=6.9 Hz, 2H), 3.15 (d, J=8.1 Hz, 2H), 2.91 (t, J=5.8 Hz, 2H), 2.75 (s, 3H), 2.44 (t, J=5.8 Hz, 2H), 1.24 (t, J=7.0 Hz, 3H).

Example 80: N-(4-{[6-(5-chloro-2-fluorophenyl)-3-methylpyridazin-4-yl]amino}pyridin-2-yl)-3-[4-(2-Hydroxyethyl)piperazin-1-yl]propanamide

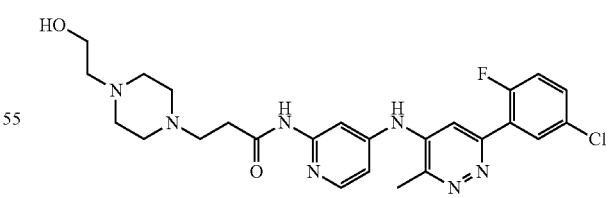

Example 80 was prepared following the procedure used for the synthesis of Example 72 starting from N-(4-{[6-(5-chloro-2-fluorophenyl)-3-methylpyridazin-4-yl]amino}pyridin-2-yl)-3-(piperazin-1-yl)propanamide (Example 74, 37 mg, 0.08 mmol) in DMF (0.4 mL) to afford title compound (20 mg, 0.04 mmol, 50% yield) as an off-white solid.

LC-MS (ESI): m/z (M+1): 514.3 (Method 2)

¹H NMR (400 MHz, Chloroform-d) δ ppm 11.21 (br. s, 1H), 8.21 (d, J=5.7 Hz, 1H), 8.16 (dd, J=6.7, 2.8 Hz, 1H), 8.02 (d, J=2.0 Hz, 1H), 7.78 (d, J=1.3 Hz, 1H), 7.38 (ddd, J=8.7, 4.2, 2.9 Hz, 1H), 7.12 (dd, J=10.6, 8.8 Hz, 1H), 6.93 (dd, J=5.5, 2.2 Hz, 1H), 6.27 (s, 1H), 3.66 (t, J=5.4 Hz, 2H), 2.75 (s, 3H), 2.60-2.82 (m, 12H), 2.53-2.59 (m, 2H).

Example 81: 4-{[6-(5-chloro-2-fluorophenyl)-3-methylpyridazin-4-yl]amino}quinolin-7-yl 4-[2-(1-methylpiperidin-4-yl)ethyl]piperazine-1-carboxylate

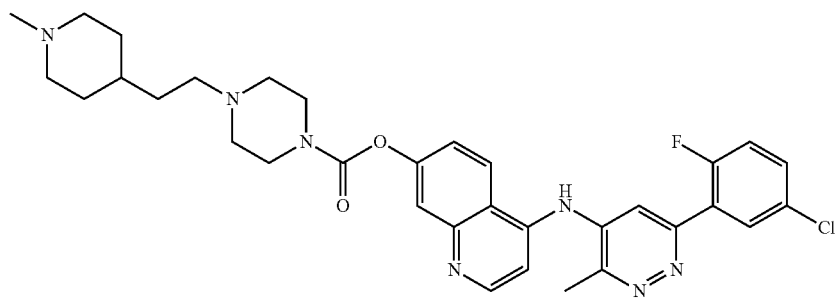 [SMILES: Cc1nnc(-c2cc(Cl)ccc2F)cc1Nc1ccnc2cc(OC(=O)N3CCN(CCC4CCN(C)CC4)CC3)ccc12]

Example 81 was prepared following the procedure used for the synthesis of Example 45 starting from 4-{[6-(5-chloro-2-fluorophenyl)-3-methylpyridazin-4-yl]amino}quinolin-7-ol hydrobromide (Intermediate 151, 150 mg, 0.32 mmol) and 1-[2-(1-methylpiperidin-4-yl)ethyl]piperazine (Intermediate 139, 137 mg, 0.65 mmol) to afford title compound (50 mg, 0.08 mmol, 25% yield) as a yellow solid.

LC-MS (ESI): m/z (M+1): 620.5 (Method 2)

¹H NMR (400 MHz, Chloroform-d) δ ppm 8.84 (d, J=5.1 Hz, 1H), 8.15 (dd, J=6.7, 2.7 Hz, 1H), 7.90 (d, J=9.2 Hz, 1H), 7.86 (d, J=2.3 Hz, 1H), 7.62 (d, J=1.4 Hz, 1H), 7.44 (dd, J=9.1, 2.4 Hz, 1H), 7.38 (ddd, J=8.8, 4.3, 2.6 Hz, 1H), 7.30 (d, J=5.1 Hz, 1H), 7.09 (dd, J=10.6, 8.8 Hz, 1H), 6.52 (s, 1H), 3.52-3.90 (m, 4H), 2.74-2.95 (m, 5H), 2.54 (br. d, J=2.2 Hz, 4H), 2.39-2.48 (m, 2H), 2.28 (s, 3H), 1.83-2.01 (m, 2H), 1.68-1.77 (m, 2H), 1.42-1.55 (m, 3H), 1.23-1.40 (m, 2H).

Example 82: Methyl N-[2-(4-{2-[(4-{[6-(5-chloro-2-fluorophenyl)-3-methylpyridazin-4-yl]amino}pyridin-2-yl)carbamoyl]ethyl}piperazin-1-yl)ethyl]carbamate

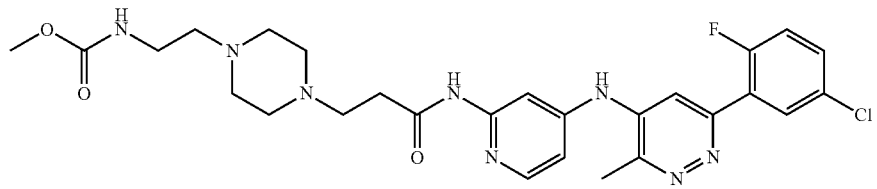

Example 82 was prepared following the procedure used for the synthesis of Example 77 starting from 3-[4-(2-aminoethyl)piperazin-1-yl]-N-(4-{[6-(5-chloro-2-fluorophenyl)-3-methylpyridazin-4-yl]amino}pyridin-2-yl)propanamide (Example 76, 57 mg, 0.11 mmol) to afford title compound (40 mg, 0.07 mmol, 63% yield) as a pale yellow solid.

LC-MS (ESI): m/z (M+1): 571.7 (Method 2)

$^1$H NMR (400 MHz, Chloroform-d) δ 11.25 (s, 1H), 8.22 (d, J=5.7 Hz, 1H), 8.17 (dd, J=6.7, 2.7 Hz, 1H), 8.01 (d, J=2.0 Hz, 1H), 7.79 (d, J=1.2 Hz, 1H), 7.39 (ddd, J=8.8, 4.2, 2.9 Hz, 1H), 7.12 (dd, J=10.5, 8.9 Hz, 1H), 6.93 (dd, J=5.6, 2.1 Hz, 1H), 6.18 (s, 1H), 5.18 (br. s, 1H), 3.69 (s, 3H), 3.22-3.39 (m, 2H), 2.73-2.81 (m, 5H), 2.65 (br. s, 8H), 2.52-2.60 (m, 4H).

Example 83: N-(4-{[6-(5-chloro-2-fluorophenyl)-3-methylpyridazin-4-yl]amino}pyridin-2-yl)-3-[4-(2-methanesulfonylethyl)piperazin-1-yl]propanamide

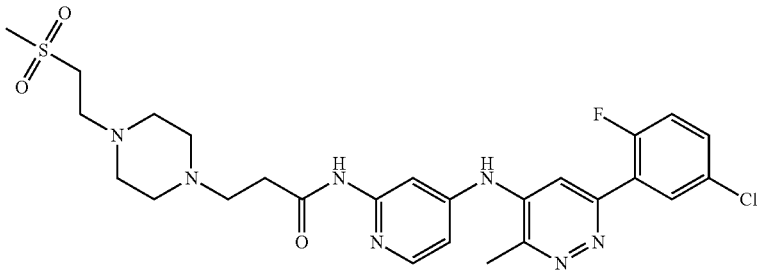 [SMILES: Cc1nnc(-c2cc(Cl)ccc2F)cc1Nc1ccnc(NC(=O)CCN2CCN(CCS(C)(=O)=O)CC2)c1]

Example 83 was prepared following the procedure used for the synthesis of Example 1 starting from N-(4-bromopyridin-2-yl)-3-[4-(2-methanesulfonylethyl)piperazin-1-yl]propanamide (Intermediate 152, 116 mg, 0.28 mmol) and 6-(5-chloro-2-fluorophenyl)-3-methylpyridazin-4-amine (Intermediate 60 mg, 0.25 mmol) to afford title compound (65 mg, 0.11 mmol, 45% yield) as an off-white solid.

LC-MS (ESI): m/z (M+1): 577.1 (Method 2)

$^1$H NMR (600 MHz, Chloroform-d) δ ppm 11.10 (s, 1H), 8.22 (d, J=5.6 Hz, 1H), 8.17 (dd, J=6.7, 2.7 Hz, 1H), 8.01 (d, J=2.0 Hz, 1H), 7.79 (d, J=1.2 Hz, 1H), 7.39 (ddd, J=8.8, 4.2, 2.7 Hz, 1H), 7.12 (dd, J=10.5, 8.7 Hz, 1H), 6.93 (dd, J=5.6, 2.1 Hz, 1H), 6.19 (s, 1H), 3.19 (t, J=6.4 Hz, 2H), 3.05 (s, 3H), 2.98 (t, J=6.4 Hz, 2H), 2.76 (s, 3H), 2.75-2.79 (m, 2H), 2.58-2.80 (m, 8H), 2.51-2.59 (m, 2H).

Example 84: N-(4-{[6-(5-chloro-2-fluorophenyl)-3-methylpyridazin-4-yl]amino}pyridin-2-yl)-3-[4-(2-Cyanoethyl)piperazin-1-yl]propanamide

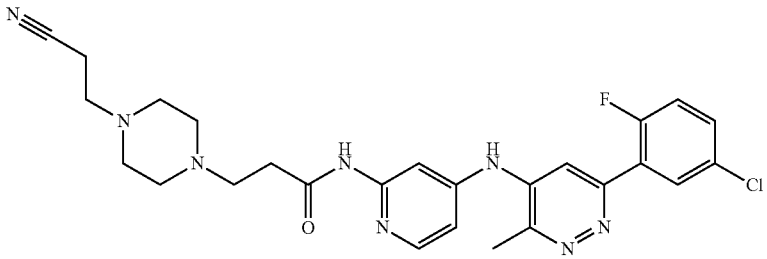 [SMILES: Cc1nnc(-c2cc(Cl)ccc2F)cc1Nc1ccnc(NC(=O)CCN2CCN(CCC#N)CC2)c1]

Example 84 was prepared following the procedure used for the synthesis of Example 72 starting from N-(4-{[6-(5-chloro-2-fluorophenyl)-3-methylpyridazin-4-yl]amino}pyridin-2-yl)-3-(piperazin-1-yl)propanamide (Example 74, 64 mg, 0.14 mmol) and 3-bromopropanenitrile (28 mg, 0.21 mmol) in DMF (0.69 mL) to afford title compound (44 mg, 0.08 mmol, 61% yield) as a white solid.

LC-MS (ESI): m/z (M+1): 525.1 (Method 2)

$^1$H NMR (400 MHz, Chloroform-d) δ ppm 11.19 (s, 1H), 8.21 (d, J=5.7 Hz, 1H), 8.16 (dd, J=6.7, 2.7 Hz, 1H), 8.01 (d, J=2.0 Hz, 1H), 7.79 (d, J=1.2 Hz, 1H), 7.39 (ddd, J=8.7, 4.2, 2.7 Hz, 1H), 7.12 (dd, J=10.6, 8.8 Hz, 1H), 6.93 (dd, J=5.7, 2.2 Hz, 1H), 6.24 (s, 1H), 2.76-2.82 (m, 4H), 2.75 (s, 3H), 2.61-2.74 (m, 8H), 2.52-2.61 (m, 4H).

Example 85: N-(4-{[6-(5-chloro-2-fluorophenyl)-3-methylpyridazin-4-yl]amino}pyridin-2-yl)-4-methylpiperazine-1-carboxamide

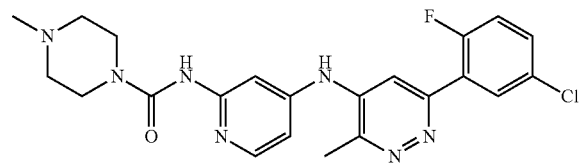

A solution of N-4-[6-(5-chloro-2-fluorophenyl)-3-methylpyridazin-4-yl]pyridine-2,4-diamine (Intermediate 156, 42 mg, 0.11 mmol) and DIPEA (0.06 mL, 0.33 mmol) in pyridine (0.56 mL) was treated with 4-methyl-1-piperazinecarbonyl chloride hydrochloride (33.5 mg, 0.17 mmol) and stirred at RT for 4 hrs. The reaction was quenched by adding some drops of water, then diluted with toluene and concentrated under reduced pressure. The crude product was purified by flash chromatography on Biotage silica cartridge (from DCM to 2% MeOH), proper fractions were collected and submitted to HPLC purification in acid conditions to afford the corresponding formic salt. This material was treated with a PL-HCO₃ cartridge to afford N-(4-{[6-(5-chloro-2-fluorophenyl)-3-methylpyridazin-4-yl]amino}pyridin-2-yl)-4-methylpiperazine-1-carboxamide (16 mg, 0.03 mmol, 31% yield) as an off-white solid.

LC-MS (ESI): m/z (M+1): 456.4 (Method 2)

¹H NMR (400 MHz, Chloroform-d) δ ppm 8.08-8.22 (m, 2H), 7.86 (d, J=1.8 Hz, 1H), 7.79 (d, J=1.0 Hz, 1H), 7.39 (ddd, J=8.8, 4.2, 2.9 Hz, 1H), 7.26 (br. s, 1H), 7.12 (dd, J=10.5, 8.9 Hz, 1H), 6.89 (dd, J=5.6, 2.0 Hz, 1H), 6.21 (s, 1H), 3.46-3.60 (m, 4H), 2.73 (s, 3H), 2.42-2.52 (m, 4H), 2.34 (s, 3H).

Example 86: 3-(4-{2-[(4-{[6-(5-chloro-2-fluorophenyl)pyridazin-4-yl]amino}quinolin-7-yl)oxy]ethyl}piperazin-1-yl)pentane-1,5-diol

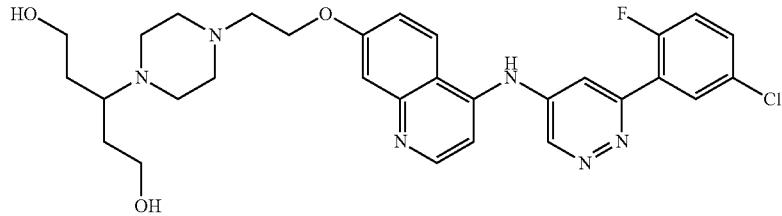 [SMILES: OCCC(CCO)N1CCN(CCOc2ccc3c(Nc4cnnc(-c5cc(Cl)ccc5F)c4)ccnc3c2)CC1]

To a stirred solution 1,5-dim ethyl 3-(4-{2-[(4-{[6-(5-chloro-2-fluorophenyl)pyridazin-4-yl]amino}quinolin-7-yl)oxy]ethyl}piperazin-1-yl)pentanedioate (Intermediate 157, 85 mg, 0.13 mmol) in THF (4 mL), at 0° C. and under N₂ atmosphere, LiAlH₄ 2M solution in THF (0.27 mL, 0.54 mmol) was added drop-wise. The reaction mixture was stirred 5 min at 0° C. then the ice-bath was removed, and the reaction mixture was allowed to reach RT and stirred for 40 min. The mixture was cooled to 0° C. and quenched with Na₂SO₄·10H₂O until gas evolution ceased. The mixture was concentrated under reduced pressure and the residue was taken up with DCM. The mixture was filtered washing with DCM and the solvent removed under reduced pressure. The crude material was purified by reverse phase flash chromatography on Biotage C18 cartridge (from H₂O+0.2% NH₄OH to 65% MeCN) to afford 3-(4-{2-[(4-{[6-(5-chloro-2-fluorophenyl)pyridazin-4-yl]amino}quinolin-7-yl)oxy]ethyl}piperazin-1-yl)pentane-1,5-diol (25 mg, 0.04 mmol, 32% yield) as a pale yellow solid.

LC-MS (ESI): m/z (M+1): 581.8 (Method 2)

¹H NMR (500 MHz, DMSO-d₆) δ ppm 9.47-10.14 (m, 1H), 9.09-9.23 (m, 1H), 8.57-8.73 (m, 1H), 8.18 (d, J=9.2 Hz, 1H), 8.00 (dd, J=6.6, 2.7 Hz, 1H), 7.68 (s, 1H), 7.60-7.65 (m, 1H), 7.45 (dd, J=10.6, 8.9 Hz, 1H), 7.31-7.41 (m, 2H), 7.28 (dd, J=9.2, 2.3 Hz, 1H), 4.57 (br. s, 2H), 4.24 (t, J=5.7 Hz, 2H), 3.38-3.56 (m, 4H), 2.75 (t, J=5.6 Hz, 2H), 2.64-2.71 (m, 1H), 2.45-2.56 (m, 8H), 1.66 (dq, J=13.8, 7.0 Hz, 2H), 1.24-1.42 (m, 2H).

Example 87: N-[6-(5-chloro-2-fluorophenyl)pyridazin-4-yl]-6-methoxy-7-[2-(4-methylpiperazin-1-yl)ethoxy]quinolin-4-amine

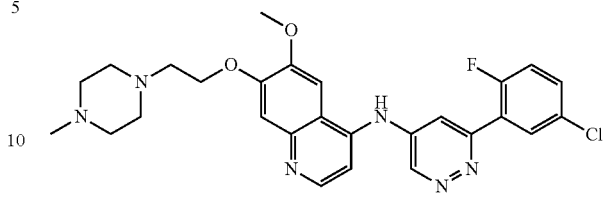

Example 87 was prepared following the procedure used for the synthesis of Example 3 starting from 4-chloro-6-methoxy-7-[2-(4-methylpiperazin-1-yl)ethoxy]quinoline (Intermediate 158, 99 mg, 0.29 mmol) and 6-(5-chloro-2-fluorophenyl)pyridazin-4-amine (Intermediate 3, 60 mg, 0.27 mmol) to afford title compound (68 mg, 0.13 mmol, 48% yield) as a yellow solid.

LC-MS (ESI): m/z (M+1): 523.3 (Method 2)

¹H NMR (400 MHz, Chloroform-d) δ ppm 9.06 (d, J=2.6 Hz, 1H), 8.68 (d, J=4.9 Hz, 1H), 8.06 (dd, J=6.6, 2.7 Hz, 1H), 7.49-7.58 (m, 2H), 7.45 (s, 1H), 7.36 (ddd, J=8.7, 4.2, 2.8 Hz, 1H), 7.29 (d, J=4.9 Hz, 1H), 7.19 (s, 1H), 7.08 (dd, J=10.4, 8.9 Hz, 1H), 4.32 (t, J=6.0 Hz, 2H), 3.89 (s, 3H), 2.96 (t, J=5.9 Hz, 2H), 2.66 (br. s, 4H), 2.47 (br. s, 4H), 2.28 (s, 3H).

Example 88: N-(4-{[6-(5-chloro-2-fluorophenyl)-3-methylpyridazin-4-yl]amino}pyridin-2-yl)-1-methylpiperidine-4-carboxamide

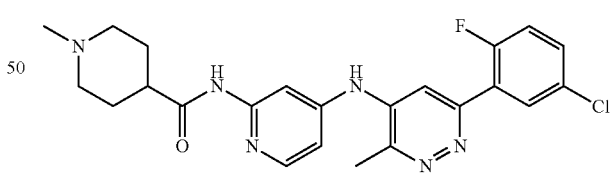

Example 88 was prepared following the procedure used for the synthesis of Example 3 starting from N-(4-bromopyridin-2-yl)-1-methylpiperidine-4-carboxamide (Intermediate 45, 69 mg, 0.23 mmol) and 6-(5-chloro-2-fluorophenyl)-3-methylpyridazin-4-amine (Intermediate 90, 50 mg, 0.21 mmol) to afford title compound (41 mg, 0.09 mmol, 43% yield) as a white solid.

LC-MS (ESI): m/z (M+1): 455.3 (Method 2)

¹H NMR (400 MHz, Chloroform-d) δ ppm 8.20 (d, J=5.7 Hz, 1H), 8.17 (dd, J=6.7, 2.7 Hz, 1H), 8.07 (d, J=2.0 Hz, 1H), 7.97 (s, 1H), 7.80 (d, J=1.2 Hz, 1H), 7.39 (ddd, J=8.8, 4.3, 2.8 Hz, 1H), 7.12 (dd, J=10.6, 8.8 Hz, 1H), 6.97 (dd, 2.2 Hz, 1H), 6.19 (s, 1H), 2.95 (br. d, J=11.5 Hz, 2H), 2.74 (s, 3H), 2.31 (s, 3H), 2.21-2.33 (m, 1H), 1.82-2.08 (m, 6H).

Example 89: N-[6-(5-chloro-2-fluorophenyl)pyridazin-4-yl]-7-[(1-methylpiperidin-4-yl)methoxy]quinolin-4-amine

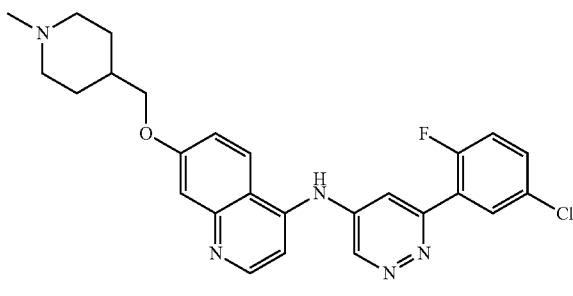

Example 89 was prepared following the procedure used for the synthesis of Example 73 starting from N-[6-(5-chloro-2-fluorophenyl)pyridazin-4-yl]-7-[(piperidin-4-yl)methoxy]quinolin-4-amine (Intermediate 162, 180 mg, 0.33 mmol) to afford title compound (75 mg, 0.16 mmol, 47% yield) as a yellow solid.

LC-MS (ESI): m/z (M+1): 478.3 (Method 2)

$^1$H NMR (400 MHz, DMSO-d$_6$) δ ppm 9.78 (br. s, 1H), 9.18 (br. d, J=1.6 Hz, 1H), 8.65 (br. s, 1H), 8.18 (d, J=9.2 Hz, 1H), 8.00 (dd, J=6.6, 2.7 Hz, 1H), 7.69 (br. s, 1H), 7.59-7.66 (m, 1H), 7.45 (dd, J=10.5, 8.9 Hz, 1H), 7.32-7.41 (m, 2H), 7.28 (dd, J=9.2, 2.0 Hz, 1H), 4.01 (d, J=5.8 Hz, 2H), 2.80 (br. d, J=11.2 Hz, 2H), 2.16 (s, 3H), 1.83-1.94 (m, 2H), 1.66-1.82 (m, 3H), 1.28-1.49 (m, 2H).

Example 90: N-[6-(5-chloro-2-fluorophenyl)pyridazin-4-yl]-7-[2-(3-Methylimidazolidin-1-yl)ethoxy]quinolin-4-amine

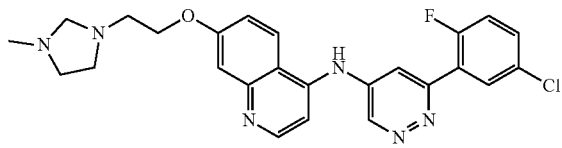

Example 90 was prepared following the procedure used for the synthesis of Example 33 starting from N-[6-(5-chloro-2-fluorophenyl)pyridazin-4-yl]-7-(2-{[2-(methylamino)ethyl]amino}ethoxy)quinolin-4-amine (Intermediate 166, 43 mg, mmol) to afford title compound (24 mg, 0.05 mmol, 54% yield) as a yellow solid.

LC-MS (ESI): m/z (M+1): 479.3 (Method 2)

$^1$H NMR (400 MHz, Chloroform-d) δ ppm 9.08 (br. d, J=2.3 Hz, 1H), 8.79 (br. d, J=4.4 Hz, 1H), 8.18 (dd, J=6.6, 2.7 Hz, 1H), 7.87 (br. d, J=9.2 Hz, 1H), 7.62 (dd, J=2.4, 1.6 Hz, 1H), 7.44-7.52 (m, 1H), 7.41 (ddd, J=8.8, 4.3, 2.8 Hz, 1H), 7.23-7.34 (m, 2H), 7.13 (dd, J=10.6, 8.9 Hz, 1H), 6.91 (br. s, 1H), 4.25 (t, J=5.6 Hz, 2H), 3.53 (s, 2H), 3.09 (t, J=5.6 Hz, 2H), 2.97-3.04 (m, 2H), 2.76-2.86 (m, 2H), 2.42 (s, 3H).

Example 91: Methyl 4-{2-[(4-{[6-(5-chloro-2-fluorophenyl)-3-methylpyridazin-4-yl]amino}pyridin-2-yl)carbamoyl]ethyl}piperazine-2-carboxylate

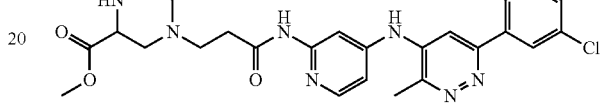

A solution 1-tert-butyl 2-methyl 4-{2-[(4-{[6-(5-chloro-2-fluorophenyl)-3-methylpyridazin-4-yl]amino}pyridin-2-yl)carbamoyl]ethyl}piperazine-1,2-dicarboxylate (Intermediate 168, 110 mg, 0.18 mmol) in HCl, 4 M solution in 1,4-dioxane (0.66 mL, 2.63 mmol) and MeOH (0.60 mL) was stirred at RT for 2 hrs. Volatiles were removed under vacuum. The residue was taken up with H$_2$O/EtOAc, and the mixture was partitioned between saturated NaHCO$_3$ solution and EtOAc. Aqueous phase was extracted with EtOAc (2×), the combined organic layers were filtered through a phase separator and evaporated under vacuum. The crude material was purified by phase flash chromatography on Biotage silica NH cartridge (from DCM to 2% MeOH) affording methyl 4-{2-[(4-{[6-(5-chloro-2-fluorophenyl)-3-methylpyridazin-4-yl]amino}pyridin-2-yl)carbamoyl]ethyl}piperazine-2-carboxylate (50 mg, 0.09 mmol, 54% yield) as a white glassy solid.

LC-MS (ESI): m/z (M+1): 528.3 (Method 2)

$^1$H NMR (500 MHz, Chloroform-d) δ ppm 10.96 (br. s, 1H), 8.20 (d, J=5.6 Hz, 1H), 8.17 (dd, J=6.7, 2.7 Hz, 1H), 8.01 (d, J=2.1 Hz, 1H), 7.79 (d, J=1.4 Hz, 1H), 7.39 (ddd, J=8.8, 4.3, 2.7 Hz, 1H), 7.13 (dd, J=10.6, 8.8 Hz, 1H), 6.93 (dd, J=5.6, 2.2 Hz, 1H), 6.17 (s, 1H), 3.77 (dd, J=7.7, 3.2 Hz, 1H), 3.74 (s, 3H), 3.19 (ddd, J=12.0, 5.2, 3.1 Hz, 1H), 2.96-3.09 (m, 2H), 2.77-2.82 (m, 2H), 2.76 (s, 3H), 2.51-2.85 (m, 4H), 2.46 (br t, J=8.1 Hz, 1H), 2.15 (br. s, 1H).

Example 92: Lithium 4-{2-[(4-{[6-(5-chloro-2-fluorophenyl)-3-methylpyridazin-4-yl]amino}pyridin-2-yl)carbamoyl]ethyl}piperazine-2-carboxylate

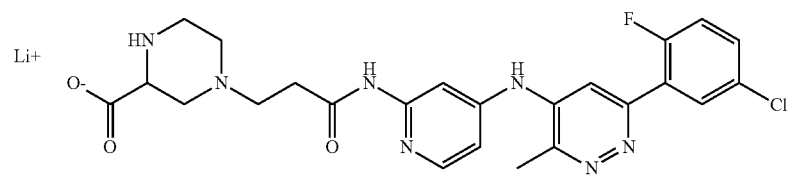 [SMILES: [Li+] ; Cc1nnc(-c2cc(Cl)ccc2F)cc1Nc1ccnc(NC(=O)CCN2CCNC(C(=O)[O-])C2)c1]

To a solution methyl 4-{2-[(4-{[6-(5-chloro-2-fluorophenyl)-3-methylpyridazin-4-yl]amino}pyridin-2-yl)carbamoyl]ethyl}piperazine-2-carboxylate (Example 91, 10.8 mg, 0.02 mmol) in THF (0.14 mL) and H₂O (0.05 mL) lithium hydroxide hydrate (0.92 mg, 0.02 mmol) was added. The mixture was stirred at RT for 3 hrs. Volatiles were removed under vacuum. The product was dissolved in MeOH and water, then evaporated in order to remove the residual solvents and dried overnight in oven at 50° C. to afford lithium 4-{2-[(4-{[6-(5-chloro-2-fluorophenyl)-3-methylpyridazin-4-yl]amino}pyridin-2 yl)carbamoyl]ethyl}piperazine-2-carboxylate (10.5 mg, 0.02 mmol, 99% yield) as a yellow solid.

LC-MS (ESI): m/z (M+1): 528.3 (Method 2)

¹H NMR (500 MHz, Methanol-d₄) δ ppm 8.17 (d, J=5.6 Hz, 1H), 8.09 (d, J=1.5 Hz, 1H), 7.88-7.99 (m, 1H), 7.82 (d, J=1.0 Hz, 1H), 7.51 (ddd, J=8.7, 4.1, 2.8 Hz, 1H), 7.28 (dd, J=10.3, 8.9 Hz, 1H), 7.01 (dd, J=5.6, 2.1 Hz, 1H), 3.34-3.42 (m, 1H), 3.25 (br. d, J=11.9 Hz, 1H), 2.96-3.05 (m, 1H), 2.66-2.94 (m, 7H), 2.54-2.65 (m, 2H), 1.97-2.19 (m, 2H).

Example 93: N-(4-{[6-(5-chloro-2-fluorophenyl)-3-methylpyridazin-4-yl]amino}pyridin-2-yl)-3-{[2-(methylamino)ethyl]amino}propanamide

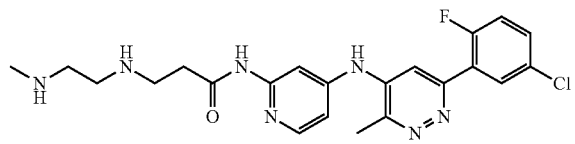 [SMILES: CNCCNCCC(=O)Nc1cc(Nc2cc(-c3cc(Cl)ccc3F)nnc2C)ccn1]

Example 93 was prepared following the procedure used for the synthesis of Example 2 starting from tert-butyl N-(2-{[(tert-butoxy)carbonyl]({2-[(4-{[6-(5-chloro-2-fluorophenyl)-3-methylpyridazin-4-yl]amino}pyridin-2-yl)carbamoyl]ethyl})amino}ethyl)-N-methylcarbamate (Intermediate 171, 114 mg, mmol) to afford title compound (68 mg, 0.15 mmol, 88% yield) as an off-white solid.

LC-MS (ESI): m/z (M+1): 458.2 (Method 2)

¹H NMR (500 MHz, Chloroform-d) δ ppm 11.21 (br. s, 1H), 8.20 (d, J=5.6 Hz, 1H), 8.16 (dd, J=6.6, 2.7 Hz, 1H), 8.02 (d, J=2.1 Hz, 1H), 7.79 (d, J=1.4 Hz, 1H), 7.38 (ddd, J=8.7, 4.2, 2.8 Hz, 1H), 7.12 (dd, J=10.5, 8.9 Hz, 1H), 6.93 (dd, J=5.6, 2.2 Hz, 1H), 6.31 (s, 1H), 2.98-3.12 (m, 2H), 2.85-2.91 (m, 2H), 2.78-2.84 (m, 2H), 2.76 (s, 3H), 2.52-2.59 (m, 2H), 2.49 (s, 3H).

Example 94: Methyl 4-{2-[(4-{[6-(5-chloro-2-fluorophenyl)-3-methylpyridazin-4-yl]amino}pyridin-2-yl)carbamoyl]ethyl}-1-methylpiperazine-2-carboxylate

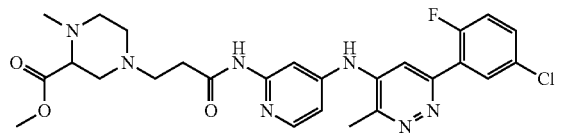

Example 94 was prepared following the procedure used for the synthesis of Example 1 starting from methyl 4-{2-[(4-bromopyridin-2-yl)carbamoyl]ethyl}-1-methylpiperazine-2-carboxylate (Intermediate 174, 89 mg, 0.23 mmol) and 6-(5-chloro-2-fluorophenyl)-3-methylpyridazin-4-amine (Intermediate 90, 50 mg, 0.21 mmol) to afford title compound (80 mg, 0.15 mmol, 70% yield) as an off white solid.

LC-MS (ESI): m/z (M+1): 542.3 (Method 2)

¹H NMR (500 MHz, Chloroform-d) δ ppm 10.72 (br. s, 1H), 8.23 (d, J=5.6 Hz, 1H), 8.17 (dd, J=6.7, 2.7 Hz, 1H), 8.01 (d, J=1.9 Hz, 1H), 7.79 (d, J=1.5 Hz, 1H), 7.39 (ddd, J=8.8, 4.3, 2.7 Hz, 1H), 7.13 (dd, J=10.6, 8.8 Hz, 1H), 6.94 (dd, J=5.6, 2.2 Hz, 1H), 6.17 (s, 1H), 3.76 (s, 3H), 3.22 (dd, J=9.0, 2.8 Hz, 1H), 2.82-3.11 (m, 3H), 2.76-2.80 (m, 2H), 2.76 (s, 3H), 2.49-2.64 (m, 5H), 2.42 (s, 3H).

Example 95: 4-{2-[(4-{[6-(5-chloro-2-fluorophenyl)-3-methylpyridazin-4-yl]amino}pyridin-2-yl)carbamoyl]ethyl}-1-methylpiperazine-2-carboxylic acid

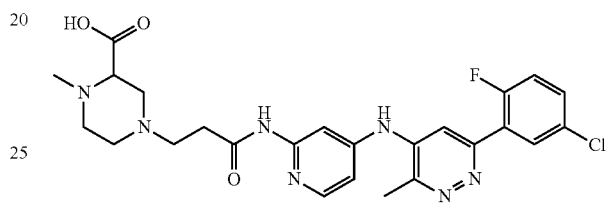

To a solution methyl 4-{2-[(4-{[6-(5-chloro-2-fluorophenyl)-3-methylpyridazin-4-yl]amino}pyridin-2-yl)carbamoyl]ethyl}-1-methylpiperazine-2-carboxylate (Example 94, 15 mg, 0.03 mmol) in THF (0.21 mL) and H₂O (0.07 mL), lithium hydroxide hydrate (1.25 mg, 0.03 mmol) was added. The mixture was stirred at RT for 6 hrs. Then further lithium hydroxide hydrate (1.19 mg, 0.03 mmol) was added again, and the mixture was stirred overnight. Volatiles were removed under vacuum. The crude material was purified by reverse flash chromatography on Biotage C18 cartridge (from H₂O to 30% MeCN) to give 4-{2-[(4-{[6-(5-chloro-2-fluorophenyl)-3-methylpyridazin-4-yl]amino}pyridin-2-yl)carbamoyl]ethyl}-1-methylpiperazine-2-carboxylic acid (11 mg, 0.02 mmol, 75% yield) as a white solid.

LC-MS (ESI): m/z (M+1): 528.3 (Method 2)

¹H NMR (500 MHz, DMSO-d₆) δ ppm 11.99 (br. s, 1H), 10.59 (s, 1H), 8.87 (s, 1H), 8.14 (d, J=5.6 Hz, 1H), 8.08 (s, 1H), 7.98 (dd, J=6.6, 2.7 Hz, 1H), 7.72 (s, 1H), 7.53-7.62 (m, 1H), 7.43 (dd, J=10.4, 9.0 Hz, 1H), 6.97 (br. dd, J=5.7, 2.0 Hz, 1H), 2.83-2.99 (m, 2H), 2.70-2.83 (m, 2H), 2.68 (s, 3H), 2.58-2.65 (m, 2H), 2.51-2.55 (m, 2H), 2.27-2.46 (m, 4H), 2.05-2.27 (m, 2H).

Example 96: Methyl 2-(4-{[(4-{[6-(5-chloro-2-fluorophenyl)-3-methylpyridazin-4-yl]amino}pyridin-2-yl)carbamoyl]methyl}piperazin-1-yl)acetate

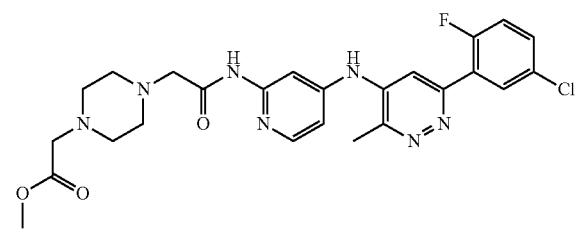

Example 96 was prepared following the procedure used for the synthesis of Example 1 starting from methyl 2-(4-{[(4-bromopyridin-2-yl)carbamoyl]methyl}piperazin-1-yl)acetate (Intermediate 178, 60 mg, 0.16 mmol) and 6-(5-chloro-2-fluorophenyl)-3-methylpyridazin-4-amine (Intermediate 90, 35 mg, 0.15 mmol) to afford title compound (59 mg, 0.11 mmol, 76% yield) as a pale yellow solid.

LC-MS (ESI): m/z (M+1): 528.3 (Method 2)

¹H NMR (400 MHz, Chloroform-d) δ ppm 9.60 (s, 1H), 8.25 (d, J=5.7 Hz, 1H), 8.17 (dd, J=6.6, 2.6 Hz, 1H), 8.07 (d, J=2.0 Hz, 1H), 7.81 (s, 1H), 7.39 (ddd, J=8.8, 4.2, 2.7 Hz, 1H), 7.13 (dd, J=10.5, 8.8 Hz, 1H), 6.97 (dd, J=5.7, 2.0 Hz, 1H), 6.25 (s, 1H), 3.75 (s, 3H), 3.28 (s, 2H), 3.20 (s, 2H), 2.76 (s, 3H), 2.66-2.75 (m, 8H).

Example 97: Methyl 2-(4-{2-[(4-{[6-(5-chloro-2-fluorophenyl)-3-methylpyridazin-4-yl]amino}pyridin-2-yl)carbamoyl]ethyl}piperazin-2-yl)acetate

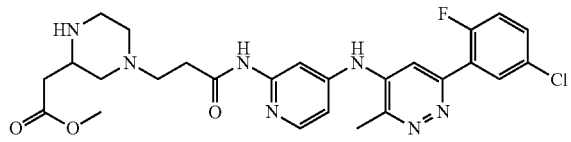 [SMILES: COC(=O)CC1CN(CCC(=O)Nc2cc(Nc3cc(-c4cc(Cl)ccc4F)nnc3C)ccn2)CCN1]

Example 97 was prepared following the procedure used for the synthesis of

Example 2 starting from tert-butyl 4-{2-[(4-{[6-(5-chloro-2-fluorophenyl)-3-methylpyridazin-4-yl]amino}pyridin-2-yl)carbamoyl]ethyl}-2-(2-methoxy-2-oxoethyl)piperazine-1-carboxylate (Intermediate 184, 106 mg, 0.16 mmol) to afford title compound (81 mg, 0.15 mmol, 90% yield) as a white foam.

LC-MS (ESI): m/z (M+1): 542.2 (Method 1)

¹H NMR (400 MHz, Chloroform-d) δ ppm 11.22 (s, 1H), 8.24 (d, J=5.61 Hz, 1H), 8.18 (dd, J=6.71, 2.75 Hz, 1H), 8.02 (d, J=1.98 Hz, 1H), 7.81 (d, J=1.32 Hz, 1H), 7.40 (ddd, J=8.78, 4.21, 2.75 Hz, 1H), 7.14 (dd, J=10.45, 8.80 Hz, 1H), 6.94 (dd, J=5.67, 2.15 Hz, 1H), 6.18 (s, 1H), 3.72 (s, 3H), 3.39 (dt, J=9.66, 3.20 Hz, 1H), 3.06-3.20 (m, 2H), 2.94 (d, J=10.78 Hz, 2H), 2.73-2.81 (m, 5H), 2.53-2.61 (m, 2H), 2.50 (d, J=6.49 Hz, 2H), 2.28 (t, J=10.40 Hz, 1H), 2.04 (t, J=10.18 Hz, 1H).

Example 98: Methyl 2-(4-{2-[(4-{[6-(5-chloro-2-fluorophenyl)-3-methylpyridazin-4-yl]amino}pyridin-2-yl)carbamoyl]ethyl}-1-methylpiperazin-2-yl)acetate Example 98 was prepared following the procedure used for the synthesis of Example 1 starting from methyl 2-(4-{2-[(4-bromopyridin-2-yl)carbamoyl]ethyl}-1-methylpiperazin-2-yl)acetate (Intermediate 186, 92 mg, 0.23 mmol) and 6-(5-chloro-2-fluorophenyl)-3-methylpyridazin-4-amine (Intermediate 90, 50 mg, 0.21 mmol) to afford title compound (20 mg, 0.04 mmol, 17% yield) as a white solid.

LC-MS (ESI): m/z (M+1): 556.2 (Method 1)

¹H NMR (400 MHz, Chloroform-d) δ ppm 11.05 (s, 1H), 8.23 (d, J=5.6 Hz, 1H), 8.17 (dd, J=6.7, 2.7 Hz, 1H), 8.01 (d, J=2.0 Hz, 1H), 7.79 (s, 1H), 7.39 (ddd, J=8.6, 4.1, 2.9 Hz, 1H), 7.13 (dd, J=10.4, 8.9 Hz, 1H), 6.89-6.94 (m, 1H), 6.19 (s, 1H), 3.68 (s, 3H), 2.76 (s, 3H), 2.38 (s, 3H), 2.27-3.02 (m, 13H).

Example 99: Methyl 1-{2-[(4-{[6-(5-chloro-2-fluorophenyl)-3-methylpyridazin-4-yl]amino}pyridin-2-yl)carbamoyl]ethyl}-4-methylpiperazine-2-carboxylate

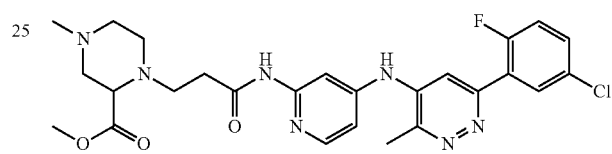

Example 99 was prepared following the procedure used for the synthesis of Example 1 starting from methyl 1-{2-[(4-bromopyridin-2-yl)carbamoyl]ethyl}-4-methylpiperazine-2-carboxylate (Intermediate 189, 92 mg, 0.23 mmol) and 6-(5-chloro-2-fluorophenyl)-3-methylpyridazin-4-amine (Intermediate 90, 50 mg, 0.21 mmol) to afford title compound (62 mg, 0.11 mmol, 60% yield) as a white solid.

LC-MS (ESI): m/z (M+1): 542.2 (Method 2)

¹H NMR (400 MHz, Chloroform-d) δ ppm 10.56 (s, 1H), 8.24 (d, J=5.7 Hz, 1H), 8.17 (dd, J=6.7, 2.7 Hz, 1H), 8.02 (d, J=1.8 Hz, 1H), 7.80 (s, 1H), 7.39 (ddd, J=8.8, 4.2, 2.9 Hz, 1H), 7.12 (dd, J=10.4, 8.9 Hz, 1H), 6.94 (dd, J=5.6, 2.1 Hz, 1H), 6.18 (s, 1H), 3.75 (s, 3H), 3.51 (br t, J=3.9 Hz, 1H), 3.24-3.34 (m, 1H), 3.15-3.24 (m, 1H), 2.81-2.99 (m, 2H), 2.76 (s, 4H), 2.59-2.70 (m, 2H), 2.44-2.59 (m, 3H), 2.33 (s, 3H).

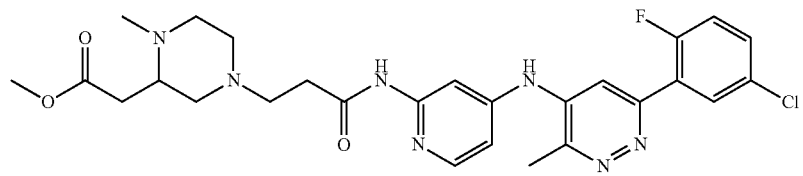 [SMILES: COC(=O)CC1CN(CCC(=O)Nc2cc(Nc3cc(-c4cc(Cl)ccc4F)nnc3C)ccn2)CCN1C]

Example 100: 4-{[6-(5-chloro-2-fluorophenyl)pyridazin-4-yl]amino}quinolin-7-yl 4-[(1-methylpiperidin-4-yl)methyl]piperazine-1-Carboxylatate

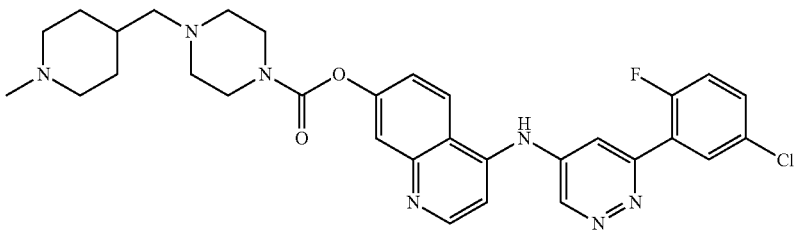

Example 100 was prepared following the procedure used for the synthesis of Example 45 starting from 4-{[6-(5-chloro-2-fluorophenyl)pyridazin-4-yl]amino}quinolin-7-ol hydrobromide (Intermediate 101, 300 mg, 0.67 mmol) and 1-[(1-methylpiperidin-4-yl)methyl]piperazine (198 mg, 1 mmol) to afford title compound (100 mg, 0.17 mmol, 25% yield) as a yellow solid.

LC-MS (ESI): m/z (M+1): 590.4 (Method 2)

$^1$H NMR (500 MHz, DMSO-$d_6$) δ ppm 9.53-10.01 (m, 1H), 9.22 (br. s, 1H), 8.65-8.86 (m, 1H), 8.31 (d, J=9.2 Hz, 1H), 8.01 (dd, J=6.6, 2.9 Hz, 1H), 7.75 (br. s, 1H), 7.71 (br. s, 1H), 7.62-7.67 (m, 1H), 7.41-7.57 (m, 3H), 3.38-3.79 (m, 4H), 2.73 (br. d, J=11.3 Hz, 2H), 2.42 (br. s, 4H), 2.18 (d, J=7.3 Hz, 2H), 2.13 (s, 3H), 1.81 (td, J=11.6, 2.1 Hz, 2H), 1.67 (br. d, J=11.3 Hz, 2H), 1.46 (ttt, J=11.1, 7.4, 3.6 Hz, 1H), 1.11 (qd, J=12.1, 3.6 Hz, 2H).

Example 101: Methyl 2-(1-{2-[(4-{[6-(5-chloro-2-fluorophenyl)-3-methylpyridazin-4-yl]amino}pyridin-2-yl)carbamoyl]ethyl}-4-methylpiperazin-2-yl)acetate

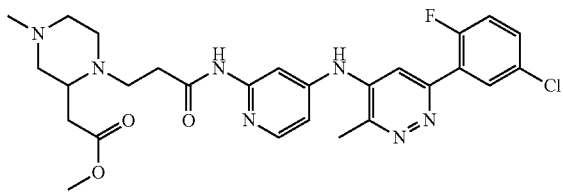 [SMILES: COC(=O)CC1CN(C)CCN1CCC(=O)Nc1cc(Nc2cc(-c3cc(Cl)ccc3F)nnc2C)ccn1]

Example 101 was prepared following the procedure used for the synthesis of Example 1 starting from methyl 2-(1-{2-[(4-bromopyridin-2-yl)carbamoyl]ethyl}-4-methylpiperazin-2-yl)acetate (Intermediate 192, 128 mg, 0.32 mmol) and 6-(5-chloro-2-fluorophenyl)-3-methylpyridazin-4-amine (Intermediate 90, 70 mg, 0.29 mmol) to afford title compound (20 mg, 0.04 mmol, 13% yield) as a white solid.

LC-MS (ESI): m/z (M+1): 556.5 (Method 2)

$^1$H NMR (500 MHz, Chloroform-d) δ ppm 10.83 (br. s, 1H), 8.23 (d, J=5.6 Hz, 1H), 8.16 (dd, J=6.6, 2.6 Hz, 1H), 8.00 (d, J=1.9 Hz, 1H), 7.79 (s, 1H), 7.39 (ddd, J=8.6, 3.9, 3.0 Hz, 1H), 7.13 (dd, J=10.3, 8.9 Hz, 1H), 6.93 (dd, J=5.6, 2.0 Hz, 1H), 6.18 (s, 1H), 3.69 (s, 3H), 3.30 (br. s, 1H), 2.95 (br. d, J=6.6 Hz, 1H), 2.81-2.90 (m, 1H), 2.69-2.81 (m, 5H), 2.41-2.69 (m, 8H), 2.31 (s, 3H).

Example 102: Methyl 2-(1-{2-[(4-{[6-(5-chloro-2-fluorophenyl)-3-methylpyridazin-4-yl]amino}pyridin-2-yl)carbamoyl]ethyl}piperazin-2-yl)acetate

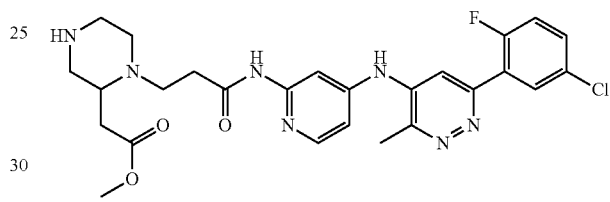

Example 102 was prepared following the procedure used for the synthesis of Example 2 starting from tert-butyl 4-{2-[(4-{[6-(5-chloro-2-fluorophenyl)-3-methylpyridazin-4-yl]amino}pyridin-2-yl)carbamoyl]ethyl}-3-(2-methoxy-2-oxoethyl)piperazine-1-carboxylate (Intermediate 193, 79 mg, 0.12 mmol) to afford title compound (41 mg, 0.08 mmol, 61% yield) as a white solid.

LC-MS (ESI): m/z (M+1): 542.4 (Method 2)

$^1$H NMR (400 MHz, Chloroform-d) δ ppm 11.02 (s, 1H), 8.22 (d, J=5.6 Hz, 1H), 8.17 (dd, J=6.6, 2.7 Hz, 1H), 8.01 (d, J=2.1 Hz, 1H), 7.79 (s, 1H), 7.34-7.43 (m, 1H), 7.13 (dd, J=10.4, 8.9 Hz, 1H), 6.93 (dd, J=5.6, 2.0 Hz, 1H), 6.16 (s, 1H), 3.69 (s, 3H), 3.17-3.28 (m, 1H), 2.76 (s, 3H), 2.44-3.34 (m, 12H).

Example 103: 4-{[6-(5-chloro-2-fluorophenyl)pyridazin-4-yl]amino}quinolin-7-yl 4-(1-methylpiperidin-4-yl)piperazine-1-carboxylate

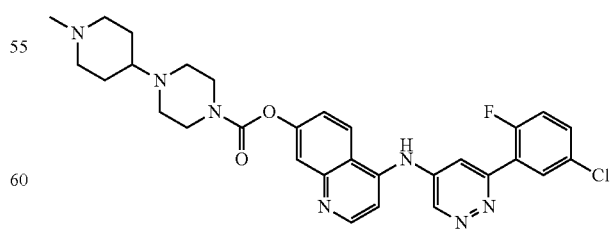

Example 103 was prepared following the procedure used for the synthesis of Example 45 starting from 4-{[6-(5-chloro-2-fluorophenyl)pyridazin-4-yl]amino}quinolin-7-ol hydrobromide (Intermediate 101, 300 mg, 0.58 mmol) and 1-(1-methylpiperidin-4-yl)piperazine (160 mg, 0.87 mmol) to afford title compound (110 mg, 0.19 mmol, 33% yield) as a yellow solid.

LC-MS (ESI): m/z (M+1): 576.4 (Method 2)

$^1$H NMR (500 MHz, DMSO-d$_6$) δ ppm 9.84 (s, 1H), 9.24 (br. d, J=0.7 Hz, 1H), 8.76 (br. d, J=4.7 Hz, 1H), 8.31 (d, J=9.1 Hz, 1H), 8.01 (dd, J=6.4, 2.6 Hz, 1H), 7.69-7.81 (m, 2H), 7.60-7.67 (m, 1H), 7.39-7.59 (m, 3H), 3.37-3.76 (m, 4H), 2.81 (br. d, J=10.7 Hz, 2H), 2.56 (br. s, 4H), 2.18-2.26 (m, 1H), 2.15 (s, 3H), 1.86 (br t, J=10.7 Hz, 2H), 1.73 (br. d, J=11.7 Hz, 2H), 1.36-1.54 (m, 2H).

Example 104: N-(4-{[6-(5-chloro-2-fluorophenyl)-3-methylpyridazin-4-yl]amino}pyridin-2-yl)-3-{4-[2-(methylamino)ethyl]piperazin-1-yl}propanamide

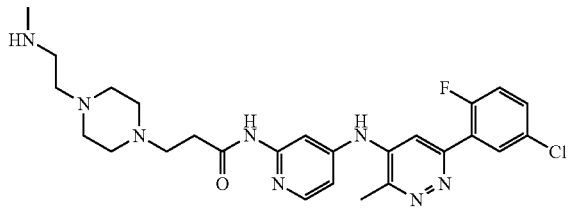 [SMILES: CNCCN1CCN(CCC(=O)Nc2cc(Nc3cc(-c4cc(Cl)ccc4F)nnc3C)ccn2)CC1]

Example 104 was prepared following the procedure used for the synthesis of Example 2 starting from tert-butyl N-[2-(4-{2-[(4-{[6-(5-chloro-2-fluorophenyl)-3-methylpyridazin-4-yl]amino}pyridin-2-yl)carbamoyl]ethyl}piperazin-1-yl)ethyl]-N-methylcarbamate (Intermediate 196, 103 mg, 0.16 mmol) to afford title compound (20 mg, 0.11 mmol, 69% yield) as a white solid.

LC-MS (ESI): m/z (M+1): 527.5 (Method 2)

$^1$H NMR (500 MHz, Chloroform-d) δ ppm 11.32 (br. s, 1H), 8.23 (d, J=5.6 Hz, 1H), 8.17 (dd, J=6.6, 2.6 Hz, 1H), 8.02 (d, J=1.8 Hz, 1H), 7.79 (s, 1H), 7.39 (ddd, J=8.8, 4.2, 2.8 Hz, 1H), 7.12 (dd, J=10.5, 8.9 Hz, 1H), 6.93 (dd, J=5.6, 2.1 Hz, 1H), 6.16 (s, 1H), 2.53-2.92 (m, 19H), 2.47 (s, 3H).

Example 105: Methyl N-[2-(4-{2-[(4-{[6-(5-chloro-2-fluorophenyl)-3-methylpyridazin-4-yl]amino}pyridin-2-yl)carbamoyl]ethyl}piperazin-1-yl)ethyl]-N-methylcarbamate Example 105 was prepared following the procedure used for the synthesis of Example 77 starting from N-(4-{[6-(5-chloro-2-fluorophenyl)-3-methylpyridazin-4-yl]amino}pyridin-2-yl)-3-{4-[2-(methylamino)ethyl]piperazin-1-yl}propanamide (Example 104, 60 mg, 0.11 mmol) to afford title compound (33 mg, 0.06 mmol, 50% yield) as a yellow solid.

LC-MS (ESI): m/z (M+1): 585.5 (Method 2)

$^1$H NMR (500 MHz, Chloroform-d) δ 11.21-11.38 (m, 1H), 8.23 (d, J=5.6 Hz, 1H), 8.17 (dd, J=6.7, 2.7 Hz, 1H), 8.01 (s, 1H), 7.79 (d, J=1.1 Hz, 1H), 7.35-7.44 (m, 1H), 7.13 (dd, J=10.5, 8.9 Hz, 1H), 6.93 (dd, J=5.6, 2.1 Hz, 1H), 6.16 (s, 1H), 3.71 (s, 3H), 3.34-3.49 (m, 2H), 2.90-3.02 (m, 3H), 2.76 (s, 3H), 2.73-2.77 (m, 2H), 2.53-2.57 (m, 2H), 2.51-2.80 (m, 10H).

Example 106: N-(4-{[6-(5-chloro-2-fluorophenyl)-3-methylpyridazin-4-yl]amino}pyridin-2-yl)-2-{4-[2-(methylamino)ethyl]piperazin-1-yl}acetamide

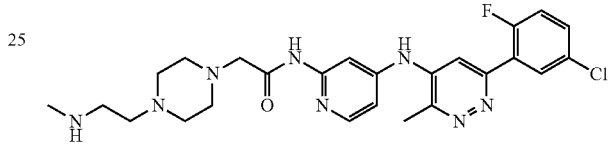

Example 106 was prepared following the procedure used for the synthesis of Example 2 starting from tert-butyl N-[2-(4-{[(4-{[6-(5-chloro-2-fluorophenyl)-3-methylpyridazin-4-yl]amino}pyridin-2-yl)carbamoyl]methyl}piperazin-1-yl)ethyl]-N-methylcarbamate (Intermediate 198, 110 mg, 0.18 mmol) to afford title compound (80 mg, 0.16 mmol, 80% yield) as a white solid.

LC-MS (ESI): m/z (M+1): 513.5 (Method 2)

$^1$H NMR (500 MHz, Chloroform-d) δ ppm 9.64 (s, 1H), 8.25 (d, J=5.6 Hz, 1H), 8.17 (dd, J=6.7, 2.7 Hz, 1H), 8.08 (d, J=2.1 Hz, 1H), 7.81 (d, J=1.4 Hz, 1H), 7.39 (ddd, J=8.8, 4.3, 2.7 Hz, 1H), 7.13 (dd, J=10.6, 8.8 Hz, 1H), 6.97 (dd, J=5.6, 2.2 Hz, 1H), 6.22 (s, 1H), 3.18 (s, 2H), 2.77 (s, 3H), 2.68-2.72 (m, 2H), 2.52-2.57 (m, 2H), 2.50-2.74 (m, 8H), 2.47 (s, 3H).

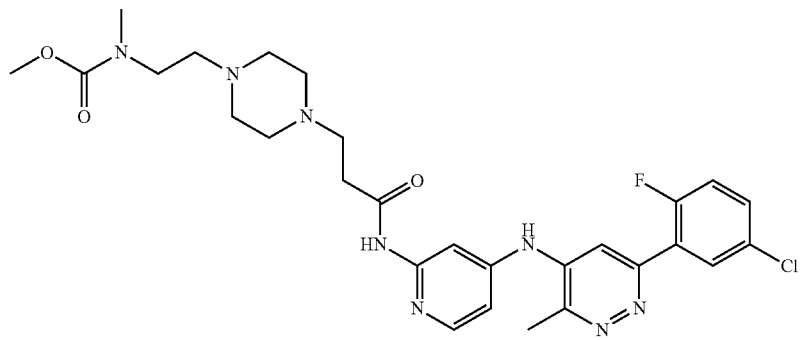 [SMILES: COC(=O)N(C)CCN1CCN(CCC(=O)Nc2cc(Nc3cc(-c4cc(Cl)ccc4F)nnc3C)ccn2)CC1]

Example 107: Methyl N-[2-(4-{[(4-{[6-(5-chloro-2-fluorophenyl)-3-methylpyridazin-4-yl]amino}pyridin-2-yl)carbamoyl]methyl}piperazin-1-yl)ethyl]-N-methylcarbamate

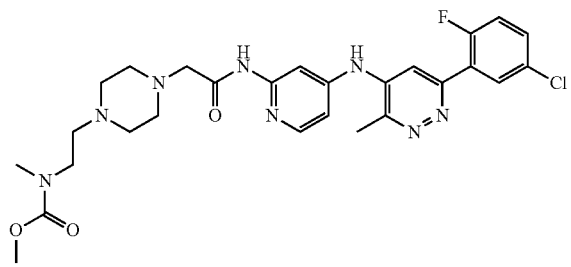

Example 107 was prepared following the procedure used for the synthesis of Example 77 starting from N-(4-{[6-(5-chloro-2-fluorophenyl)-3-methylpyridazin-4-yl]amino}pyridin-2-yl)-2-{4-[2-(methylamino)ethyl]piperazin-1-yl}acetamide (Example 106, 65 mg, 0.13 mmol) to afford title compound (59 mg, 0.1 mmol, 82% yield) pale yellow solid.

LC-MS (ESI): m/z (M+1): 571.4 (Method 2)

$^1$H NMR (500 MHz, Chloroform-d) δ ppm 9.63 (s, 1H), 8.25 (d, J=5.8 Hz, 1H), 8.17 (dd, J=6.7, 2.7 Hz, 1H), 8.07 (d, J=1.9 Hz, 1H), 7.81 (d, J=1.2 Hz, 1H), 7.39 (ddd, J=8.8, 4.3, 2.7 Hz, 1H), 7.13 (dd, J=10.6, 8.8 Hz, 1H), 6.98 (dd, J=5.6, 2.2 Hz, 1H), 6.21 (s, 1H), 3.70 (s, 3H), 3.30-3.49 (m, 2H), 3.18 (s, 2H), 2.89-3.01 (m, 3H), 2.77 (s, 3H), 2.47-2.73 (m, 10H).

Example 108: 2-[4-(2-aminoethyl)piperazin-1-yl]-N-(4-{[6-(5-chloro-2-fluorophenyl)-3-methylpyridazin-4-yl]amino}pyridin-2-yl)acetamide

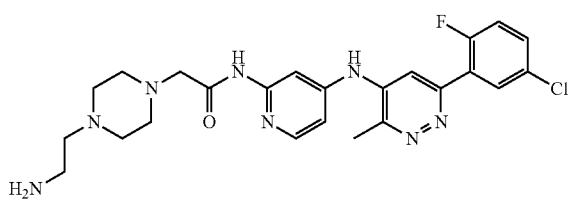 [SMILES: Cc1nnc(-c2cc(Cl)ccc2F)cc1Nc1ccnc(NC(=O)CN2CCN(CCN)CC2)c1]

Example 108 was prepared following the procedure used for the synthesis of Example 2 starting from tert-butyl N-[2-(4-{[(4-{[6-(5-chloro-2-fluorophenyl)-3-methylpyridazin-4-yl]amino}pyridin-2-yl)carbamoyl]methyl}piperazin-1-yl)ethyl]carbamate (Intermediate 200, 65 mg, 0.11 mmol) to afford title compound (50 mg, 0.10 mmol, 92% yield) pale yellow solid.

LC-MS (ESI): m/z (M+1): 499.4 (Method 2)

$^1$H NMR (400 MHz, DMSO-d$_6$) δ ppm 9.80 (br. s, 1H), 8.91 (br. s, 1H), 8.14 (d, J=5.50 Hz, 1H), 8.06 (s, 1H), 7.98 (dd, J=6.60, 2.75 Hz, 1H), 7.73 (br. s, 1H), 7.61 (dt, J=7.29, 4.33 Hz, 1H), 7.40-7.46 (m, 1H), 7.01 (d, J=4.29 Hz, 1H), 3.16 (s, 2H), 2.68 (s, 3H), 2.61 (t, J=6.44 Hz, 2H), 2.39-2.58 (m, 8H), 2.28-2.33 (m, 2H).

Example 109: Methyl N-[2-(4-{[(4-{[6-(5-chloro-2-fluorophenyl)-3-methylpyridazin-4-yl]amino}pyridin-2-yl)carbamoyl]methyl}piperazin-1-yl)ethyl]carbamate

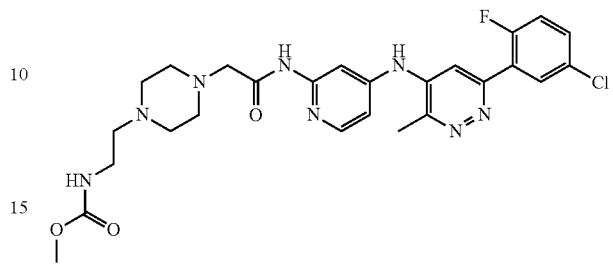

Example 109 was prepared following the procedure used for the synthesis of Example 77 starting from 2-[4-(2-aminoethyl)piperazin-1-yl]-N-(4-{[6-(5-chloro-2-fluorophenyl)-3-methylpyridazin-4-yl]amino}pyridin-2-yl)acetamide (Example 108, 40 mg, 0.08 mmol) to afford title compound (21 mg, 0.04 mmol, 48% yield) pale yellow solid.

LC-MS (ESI): m/z (M+1): 557.4 (Method 2)

$^1$H NMR (500 MHz, DMSO-d$_6$) δ ppm 9.81 (s, 1H), 8.91 (s, 1H), 8.14 (d, J=5.8 Hz, 1H), 8.06 (s, 1H), 7.97 (dd, J=6.6, 2.7 Hz, 1H), 7.73 (s, 1H), 7.56-7.65 (m, 1H), 7.43 (dd, J=10.6, 8.9 Hz, 1H), 6.95-7.05 (m, 2H), 3.51 (s, 3H), 3.15 (s, 2H), 3.08 (q, J=6.5 Hz, 2H), 2.68 (s, 3H), 2.39-2.61 (m, 8H), 2.32-2.38 (m, 2H).

Example 110: 4-{2[(4-{[6-(5-chloro-2-fluorophenyl)-3-Methylpyridazin-4-yl]amino}pyridin-2-yl)carbamoyl]ethyl}-1,1-dimethylpiperazin-1-Ium Hydrochloride Chloride

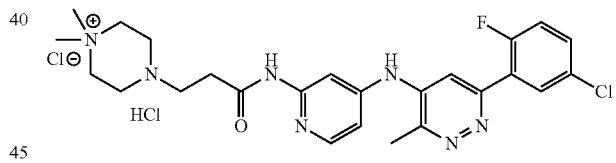

A solution of N-(4-{[6-(5-chloro-2-fluorophenyl)-3-methylpyridazin-4-yl]amino}pyridin-2-yl)prop-2-enamide (Intermediate 201, 21 mg, 0.05 mmol) in MeOH (0.41 mL) was treated with 1,1-dimethylpiperazin-1-ium chloride (33 mg, mmol) and stirred at 50° C. for 5 hrs. The mixture was concentrated under reduced pressure to give crude material as an off-white solid. This material was purified by preparative HPLC to give a residue which was diluted with MeCN/ 0.1% HCl in H$_2$O to removed formic acid. The solution was concentrated under reduced pressure to give N$_4$-{2-[(4-{[6-(5-chloro-2-fluorophenyl)-3-methylpyridazin-4-yl]amino}pyridin-2-yl)carbamoyl]ethyl}-1,1-dimethylpiperazin-1-ium hydrochloride chloride (9.8 mg, 0.017 mmol, 31% yield) as a pale yellow solid.

LC-MS (ESI): m/z (M+1): 498.4 (Method 2)

$^1$H NMR (500 MHz, Methanol-d$_4$) δ ppm 8.28 (d, J=6.7 Hz, 1H), 8.18 (s, 1H), 8.02 (dd, J=6.3, 2.7 Hz, 1H), 7.69 (ddd, J=8.9, 4.4, 2.7 Hz, 1H), 7.53 (s, 1H), 7.42 (dd, J=10.2, 9.1 Hz, 1H), 7.38 (dd, J=6.7, 2.3 Hz, 1H), 3.82 (br. s, 4H), 3.40-3.68 (m, 6H), 3.33 (s, 6H), 3.09 (br t, J=6.5 Hz, 2H), 2.84 (s, 3H).

Example 111: N-(4-{[6-(5-chloro-2-fluorophenyl)-3-methylpyridazin-4-yl]amino}pyridin-2-yl)-3-[(1S,4S)-5-methyl-2,5-diazabicyclo[2.2.1]heptan-2-yl]propanamide

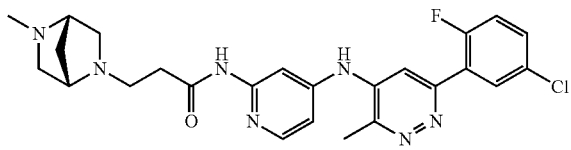 [SMILES: Cc1nnc(-c2cc(Cl)ccc2F)cc1Nc1ccnc(NC(=O)CCN2C[C@@H]3C[C@H]2CN3C)c1]

Example 111 was prepared following the procedure used for the synthesis of Example 1 starting from N-(4-bromopyridin-2-yl)-3-[(1S,4S)-5-methyl-2,5-diazabicyclo[2.2.1]heptan-2-yl]propanamide (Intermediate 204, 63 mg, 0.18 mmol) and 6-(5-chloro-2-fluorophenyl)-3-methylpyridazin-4-amine (Intermediate 90, 40 mg, 0.17 mmol) to afford title compound (26 mg, 0.05 mmol, 31% yield) as a white solid.

LC-MS (ESI): m/z (M+1): 496.4 (Method 2)

$^1$H NMR (500 MHz, Chloroform-d) δ ppm 11.82 (br. s, 1H), 8.22 (d, J=5.6 Hz, 1H), 8.16 (dd, J=6.7, 2.7 Hz, 1H), 8.02 (d, J=2.1 Hz, 1H), 7.79 (d, J=1.5 Hz, 1H), 7.38 (ddd, J=8.8, 4.3, 2.7 Hz, 1H), 7.12 (dd, J=10.6, 8.8 Hz, 1H), 6.92 (dd, J=5.6, 2.2 Hz, 1H), 6.19 (s, 1H), 3.46 (s, 1H), 3.32 (s, 1H), 2.94-3.05 (m, 3H), 2.86 (ddd, J=12.4, 7.9, 4.1 Hz, 1H), 2.74-2.79 (m, 4H), 2.69 (dd, J=10.2, 2.5 Hz, 1H), 2.46-2.52 (m, 2H), 2.45 (s, 3H), 1.79-1.88 (m, 2H).

Example 112: 4-{[6-(5-chloro-2-fluorophenyl)pyridazin-4-yl]amino}quinolin-7-yl 2,8-diazaspiro[4.5]decane-2-carboxylate

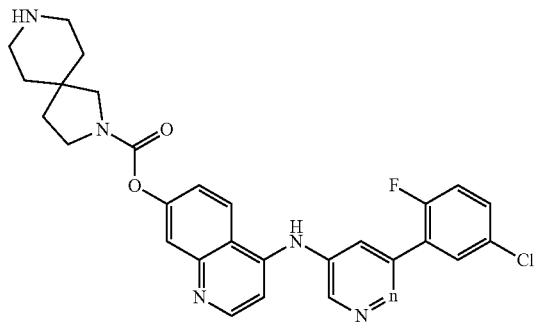

Example 112 was prepared following the procedure used for the synthesis of Example 2 keeping the temperature at 0° C., starting from 8-tert-butyl 2-(4-{[6-(5-chloro-2-fluorophenyl)pyridazin-4-yl]amino}quinolin-7-yl) 2,8-diazaspiro[4.5]decane-2,8-dicarboxylate (Intermediate 205, 110 mg, 0.14 mmol) to afford title compound (30 mg, 0.06 mmol, 40% yield) as a yellow solid.

LC-MS (ESI): m/z (M+1): 533.3 (Method 2)

$^1$H NMR (400 MHz, DMSO-$d_6$) δ ppm 9.43-10.21 (m, 1H), 9.22 (d, J=2.4 Hz, 1H), 8.72 (br. d, J=4.4 Hz, 1H), 8.31 (d, J=9.1 Hz, 1H), 8.01 (dd, J=6.5, 2.8 Hz, 1H), 7.69-7.79 (m, 2H), 7.59-7.68 (m, 1H), 7.39-7.55 (m, 3H), 3.44-3.70 (m, 2H), 3.21-3.44 (m, 2H), 2.58-2.79 (m, 4H), 1.80 (dt, J=15.6, 7.2 Hz, 2H), 1.42-1.56 (m, 4H).

Example 113: Methyl 4-{2-[(4-{[6-(5-chloro-2-fluorophenyl)-3-methylpyridazin-4-yl]amino}pyridin-2-yl)carbamoyl]ethyl}-1-(Propan-2-yl)piperazine-2-carboxylate

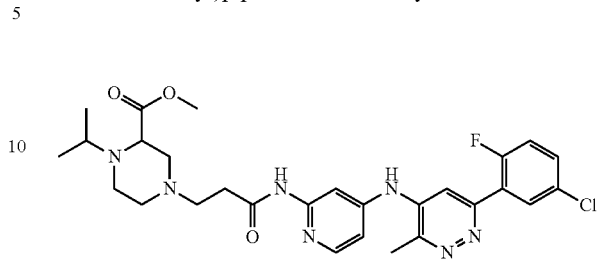

Example 113 was prepared following the procedure used for the synthesis of Example 1 starting from methyl 4-{2-[(4-bromopyridin-2-yl)carbamoyl]ethyl}-1-(propan-2-yl)piperazine-2-carboxylate (Intermediate 208, 76 mg, 0.19 mmol) and 6-(5-chloro-2-fluorophenyl)-3-methylpyridazin-4-amine (Intermediate 90, 40 mg, mmol) to afford title compound (55 mg, 0.01 mmol, 57% yield) as a white solid.

LC-MS (ESI): m/z (M+1): 570.4 (Method 2)

$^1$H NMR (500 MHz, Chloroform-d) δ ppm 10.80 (br. s, 1H), 8.22 (d, J=5.6 Hz, 1H), 8.17 (dd, J=6.7, 2.7 Hz, 1H), 7.99 (d, J=1.9 Hz, 1H), 7.79 (d, J=1.5 Hz, 1H), 7.39 (ddd, J=8.8, 4.3, 2.7 Hz, 1H), 7.13 (dd, J=10.5, 8.9 Hz, 1H), 6.93 (dd, J=5.6, 2.1 Hz, 1H), 6.15 (s, 1H), 3.67-3.77 (m, 4H), 2.99-3.12 (m, 2H), 2.79-2.88 (m, 2H), 2.68-2.79 (m, 7H), 2.50-2.67 (m, 3H), 1.16 (d, J=6.4 Hz, 3H), 1.04 (d, J=6.6 Hz, 3H).

Example 114: 4-{[6-(5-chloro-2-fluorophenyl)pyridazin-4-yl]amino}quinolin-7-yl 2-methyl-2,7-diazaspiro[3.5]nonane-7-carboxylate

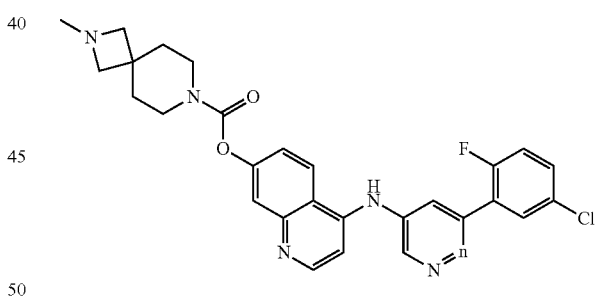

2-methyl-2,7-diazaspiro[3.5]nonane dihydrochloride (Intermediate 210, 75 mg, 0.35 mmol) was added to a stirred mixture of DIPEA (0.33 mL, 1.88 mmol) and 4-{[6-(5-chloro-2-fluorophenyl)pyridazin-4-yl]amino}quinolin-7-ol hydrobromide (Intermediate 101, 105 mg, 0.23 mmol) in DCM (6.79 mL) and DMSO (0.68 mL) at RT. After 5 minutes the mixture was cooled at 5° C. and 4-nitrophenyl carbonochloridate (71 mg, 0.35 mmol) was added. After 30 minutes the reaction was warmed at RT. After 4 hrs the mixture was diluted with DCM, washed with water and NaHCO$_3$ aqueous solution. Organic layer was separated, dried over Na$_2$SO$_4$ and evaporated. The residue was purified by flash chromatography on Biotage silica NH cartridge (from DCM to 3% MeOH/0.3% H$_2$O). Proper fractions were collected and further purified by HPLC preparative to afford 4-{[6-(5-chloro-2-fluorophenyl)pyridazin-4-yl]

amino}quinolin-7-yl 2-methyl-2,7-diazaspiro[3.5]nonane-7-carboxylate (7 mg, 0.013 mmol, 5.6% yield) as a yellow solid.

LC-MS (ESI): m/z (M+1): 533.2 (Method 2)
¹H NMR (500 MHz, Chloroform-d) δ ppm 9.08 (d, J=2.6 Hz, 1H), 8.65 (d, J=4.8 Hz, 1H), 8.19 (dd, J=6.7, 2.7 Hz, 1H), 7.77 (d, J=9.2 Hz, 1H), 7.70 (d, J=1.8 Hz, 1H), 7.65 (s, 1H), 7.47 (br. s, 1H), 7.39-7.44 (m, 1H), 7.22-7.26 (m, 2H), 7.13 (dd, J=10.5, 8.9 Hz, 1H), 3.54-3.79 (m, 4H), 3.06-3.34 (m, 4H), 2.43 (s, 3H), 1.84-1.99 (m, 4H).

Example 115: 4-{[6-(5-chloro-2-fluorophenyl)pyridazin-4-yl]amino}quinolin-7-yl 7-methyl-2,7-diazaspiro[3.5]nonane-2-carboxylate

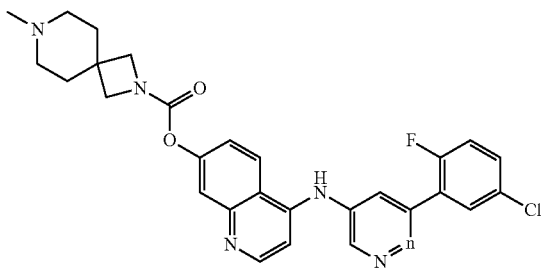

Example 115 was prepared following the procedure used for the synthesis of Example 45 starting from 4-{[6-(5-chloro-2-fluorophenyl)pyridazin-4-yl]amino}quinolin-7-ol hydrobromide (Intermediate 101, 50 mg, 0.10 mmol) and 7-methyl-2,7-diazaspiro[3.5]nonane dihydrochloride (Intermediate 212, 41.4 mg, 0.19 mmol) to afford title compound (7 mg, 0.01 mmol, 14% yield) as a yellow solid.

LC-MS (ESI): m/z (M+1): 533.2 (Method 2)
¹H NMR (400 MHz, Chloroform-d) δ ppm 9.12 (d, J=2.3 Hz, 1H), 8.55 (d, J=4.9 Hz, 1H), 8.18 (br. s, 1H), 8.14 (dd, J=6.6, 2.6 Hz, 1H), 7.70 (d, J=9.1 Hz, 1H), 7.66 (br. s, 1H), 7.63 (d, J=1.8 Hz, 1H), 7.35-7.46 (m, 1H), 7.21 (d, J=4.9 Hz, 1H), 7.16 (dd, J=9.2, 2.0 Hz, 1H), 7.11 (dd, J=10.4, 9.0 Hz, 1H), 3.80-4.12 (m, 4H), 2.30 (s, 3H), 2.17-2.60 (m, 4H), 1.92 (br t, J=5.0 Hz, 4H).

Example 116: 2-(4-{2-[(4-{[6-(5-chloro-2-fluorophenyl)-3-methylpyridazin-4-yl]amino}pyridin-2-yl)carbamoyl]ethyl}piperazin-2-yl)acetic acid

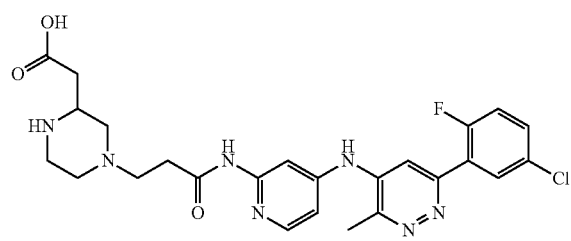 [SMILES: Cc1nnc(-c2cc(Cl)ccc2F)cc1Nc1ccnc(NC(=O)CCN2CCNC(CC(=O)O)C2)c1]

Example 116 was prepared following the procedure used for the synthesis of Example 95 starting from methyl 2-(4-{2-[(4-{[6-(5-chloro-2-fluorophenyl)-3-methylpyridazin-4-yl]amino}pyridin-2-yl)carbamoyl]ethyl}piperazin-2-yl)acetate (Example 97, 113 mg, 0.21 mmol) to afford title compound (100 mg, 0.19 mmol, 90% yield) as a white solid.

LC-MS (ESI): m/z (M+1): 528.2 (Method 1)
¹H NMR (500 MHz, DMSO-d₆) δ ppm 10.75 (s, 1H), 8.92 (br. s, 1H), 8.14 (d, J=5.8 Hz, 1H), 8.07 (d, J=1.5 Hz, 1H), 7.98 (dd, J=6.4, 2.7 Hz, 1H), 7.71 (s, 1H), 7.55-7.63 (m, 1H), 7.43 (dd, J=10.4, 8.9 Hz, 1H), 6.97 (dd, J=5.6, 2.1 Hz, 1H), 2.83-2.94 (m, 2H), 2.69-2.76 (m, 3H), 2.68 (s, 3H), 2.56-2.62 (m, 2H), 2.51-2.54 (m, 2H), 1.92-2.08 (m, 3H), 1.66-1.83 (m, 1H).

Example 117: N-(4-{[6-(5-chloro-2-fluorophenyl)-3-methylpyridazin-4-yl]amino}pyridin-2-yl)-2-(morpholin-4-yl)acetamide

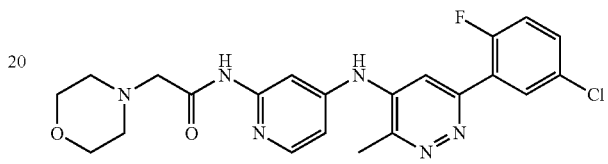

Example 117 was prepared following the procedure used for the synthesis of Example 1 starting from N-(4-bromopyridin-2-yl)-2-(morpholin-4-yl)acetamide (Intermediate 213, 140 mg, 0.45 mmol) and 6-(5-chloro-2-fluorophenyl)-3-methylpyridazin-4-amine (Intermediate 90, 90 mg, 0.38 mmol) to afford title compound (25 mg, 0.05 mmol, 14% yield).

LC-MS (ESI): m/z (M+1): 457.2 (Method 1)
¹H NMR (400 MHz, Chloroform-d) δ ppm 9.59 (s, 1H), 8.26 (d, J=5.72 Hz, 1H), 8.19 (dd, J=6.60, 2.75 Hz, 1H), 8.09 (d, J=1.98 Hz, 1H), 7.82 (d, J=1.43 Hz, 1H), 7.41 (ddd, J=8.80, 4.29, 2.75 Hz, 1H), 7.14 (dd, J=10.56, 8.80 Hz, 1H), 6.99 (dd, J=5.72, 2.20 Hz, 1H), 6.24 (s, 1H), 3.79-3.88 (m, 4H), 3.21 (s, 2H), 2.78 (s, 3H), 2.61-2.72 (m, 4H).

Example 118: 4-{[6-(5-chloro-2-fluorophenyl)pyridazin-4-yl]amino}quinolin-7-yl 8-methyl-2,8-diazaspiro[4.5]decane-2-carboxylate

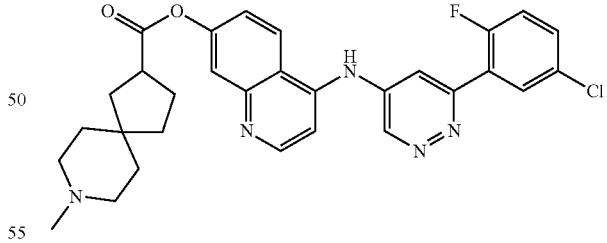

Example 118 was prepared following the procedure used for the synthesis of Example 45 starting from 4-{[6-(5-chloro-2-fluorophenyl)pyridazin-4-yl]amino}quinolin-7-ol hydrobromide (Intermediate 101, 80 mg, 0.18 mmol) and 8-methyl-2,8-diazaspiro[4.5]decane (44 mg, 0.28 mmol) to afford title compound (28 mg, 0.05 mmol, 29% yield) as a yellow solid.

LC-MS (ESI): m/z (M+1): 547.2 (Method 2)
¹H NMR (400 MHz, Chloroform-d) δ ppm 9.12 (t, J=2.2 Hz, 1H), 8.61 (t, J=4.9 Hz, 1H), 8.19 (dd, J=6.7, 2.7 Hz, 1H), 7.63-7.80 (m, 4H), 7.38-7.46 (m, 1H), 7.22-7.26 (m, 2H), 7.13 (dd, J=10.5, 8.8 Hz, 1H), 3.64-3.81 (m, 2H), 3.43-3.56 (m, 2H), 2.26-2.68 (m, 7H), 1.91 (dt, J=11.0, 7.2 Hz, 2H), 1.67-1.79 (m, 4H).

Example 119: 4-{[6-(5-chloro-2-fluorophenyl)pyridazin-4-yl]amino}quinolin-7-yl 2-methyl-2,6-diazaspiro[3.4]octane-6-carboxylate

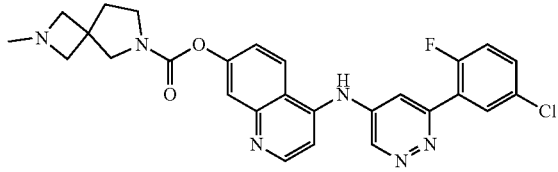 [SMILES: CN1CC2(CCN(C(=O)Oc3ccc4c(Nc5cnnc(-c6cc(Cl)ccc6F)c5)ccnc4c3)C2)C1]

Example 119 was prepared following the procedure used for the synthesis of Example 114 starting from 4-{[6-(5-chloro-2-fluorophenyl)pyridazin-4-yl]amino}quinolin-7-ol hydrobromide (Intermediate 101, 100 mg, 0.22 mmol) and 2-methyl-2,7-diazaspiro[3.4]octane (42 mg, 0.33 mmol) to afford title compound (12 mg, 0.02 mmol, 10% yield) as a yellow solid.

LC-MS (ESI): m/z (M+1): 519.2 (Method 2)

$^1$H NMR (400 MHz, Chloroform-d) δ ppm 9.12 (d, J=2.2 Hz, 1H), 8.58 (br. d, J=4.2 Hz, 1H), 8.17 (dd, J=6.8, 2.6 Hz, 1H), 7.85 (br. s, 1H), 7.71 (br. d, J=9.0 Hz, 1H), 7.66 (br. s, 2H), 7.37-7.47 (m, 1H), 7.18-7.25 (m, 2H), 7.08-7.17 (m, 1H), 3.60-3.89 (m, 4H), 3.22-3.43 (m, 4H), 2.42 (s, 3H), 2.17-2.34 (m, 2H).

Example 120: N-(4-{[6-(5-chloro-2-fluorophenyl)-3-methylpyridazin-4-yl]amino}pyridin-2-yl)-3-(Thiomorpholin-4-yl)propanamide

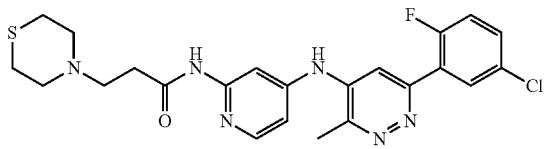 [SMILES: Cc1nnc(-c2cc(Cl)ccc2F)cc1Nc1ccnc(NC(=O)CCN2CCSCC2)c1]

Example 120 was prepared following the procedure used for the synthesis of Example 1 starting from N-(4-bromopyridin-2-yl)-3-(thiomorpholin-4-yl)propanamide (Intermediate 214, 100 mg, 0.30 mmol) and 6-(5-chloro-2-fluorophenyl)-3-methylpyridazin-4-amine (Intermediate 90, 60 mg, 0.25 mmol) to afford title compound (67 mg, 0.13 mmol, 54% yield).

LC-MS (ESI): m/z (M+1): 487.2 (Method 1)

$^1$H NMR (400 MHz, Chloroform-d) δ ppm 11.16 (s, 1H), 8.19 (d, J=5.7 Hz, 1H), 8.14 (dd, J=6.7, 2.7 Hz, 1H), 7.97 (d, J=2.0 Hz, 1H), 7.76 (d, J=1.1 Hz, 1H), 7.29-7.44 (m, 1H), 7.10 (dd, J=10.5, 8.8 Hz, 1H), 6.90 (dd, J=5.6, 2.1 Hz, 1H), 6.18 (s, 1H), 2.81-2.97 (m, 8H), 2.67-2.78 (m, 5H), 2.45-2.56 (m, 2H).

Example 121: N-(4-{[6-(5-chloro-2-fluorophenyl)-3-methylpyridazin-4-yl]amino}pyridin-2-yl)-3-{5-methyl-2,5-diazabicyclo[2.2.1]heptan-2-yl}propanamide

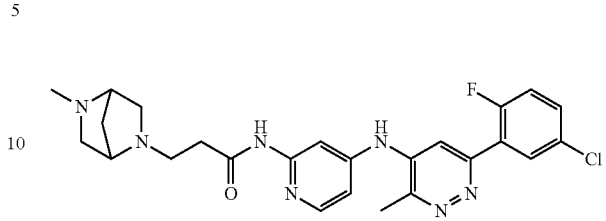

Example 121 was prepared following the procedure used for the synthesis of Example 1 starting from N-(4-bromopyridin-2-yl)-3-{5-methyl-2,5-diazabicyclo[2.2.1]heptan-2-yl}propanamide (Intermediate 216, 63 mg, 0.18 mmol) and 6-(5-chloro-2-fluorophenyl)-3-methylpyridazin-4-amine (Intermediate 90, 40 mg, 0.17 mmol) to afford title compound (30 mg, 0.06 mmol, 36% yield) as an off-white solid.

LC-MS (ESI): m/z (M+1): 496.2 (Method 2)

$^1$H NMR (500 MHz, Chloroform-d) δ ppm 11.85 (s, 1H), 8.21 (d, J=5.6 Hz, 1H), 8.16 (dd, J=6.7, 2.7 Hz, 1H), 8.02 (d, J=1.9 Hz, 1H), 7.78 (d, J=1.0 Hz, 1H), 7.38 (ddd, J=8.8, 4.3, 2.7 Hz, 1H), 7.12 (dd, J=10.5, 8.9 Hz, 1H), 6.92 (dd, J=2.1 Hz, 1H), 6.26 (s, 1H), 3.46 (s, 1H), 3.32 (s, 1H), 2.93-3.05 (m, 3H), 2.85 (ddd, J=12.4, 8.1, 4.1 Hz, 1H), 2.71-2.79 (m, 4H), 2.66 (dd, J=10.0, 2.3 Hz, 1H), 2.48 (td, J=8.0, 4.0 Hz, 2H), 2.44 (s, 3H), 1.78-1.87 (m, 2H).

Example 122: Ethyl 4-{2-[(4-{[6-(5-chloro-2-fluorophenyl)-3-methylpyridazin-4-yl]amino}pyridin-2-yl)carbamoyl]ethyl}-1-methylpiperazine-2-carboxylate

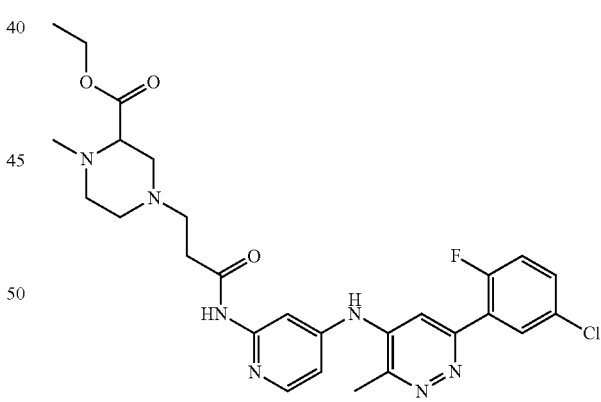

A solution of 4-{2-[(4-{[6-(5-chloro-2-fluorophenyl)-3-methylpyridazin-4-yl]amino}pyridin-2-yl)carbamoyl]ethyl}-1-methylpiperazine-2-carboxylic acid (Example 95, 40 mg, 0.08 mmol) and HATU (40.3 mg, 0.11 mmol) in DMF (0.76 mL) was treated with DIPEA (0.04 mL, 0.23 mmol) and stirred for 5 minutes at RT. Afterwards, EtOH (0.01 mL, 0.23 mmol) was added and the mixture stirred at 40° C. overnight. The mixture was quenched by adding sat. aq. NaHCO$_3$ and extracted with DCM. The organic phase was separated and washed with sat. aq. NaHCO$_3$ and brine. The organic phase was dried with Na$_2$SO$_4$, filtered, and concentrated under reduced pressure. The crude product was purified by flash chromatography on Biotage silica NH cartridge (from cHex to 100% EtOAc) to afford ethyl 4-{2-[(4-{[6-(5-chloro-2-fluorophenyl)-3-methylpyridazin-4-yl]amino}pyridin-2-yl)carbamoyl]ethyl}-1-methylpiperazine-2-carboxylate (28 mg, 0.05 mmol, 66% yield) as a white solid.

LC-MS (ESI): m/z (M+1): 556.3 (Method 2)

¹H NMR (400 MHz, Chloroform-d) δ ppm 10.74 (br. s, 1H), 8.23 (d, J=5.3 Hz, 1H), 8.17 (dd, J=6.6, 2.6 Hz, 1H), 8.01 (d, J=2.2 Hz, 1H), 7.79 (s, 1H), 7.35-7.42 (m, 1H), 7.13 (dd, J=10.3, 9.0 Hz, 1H), 6.94 (dd, J=5.5, 2.0 Hz, 1H), 6.19 (s, 1H), 4.17-4.30 (m, 2H), 3.18 (dd, J=9.2, 2.6 Hz, 1H), 3.03 (br t, J=10.7 Hz, 2H), 2.82-2.94 (m, 1H), 2.72-2.82 (m, 5H), 2.47-2.64 (m, 5H), 2.42 (s, 3H), 1.30 (t, J=7.0 Hz, 3H).

Example 123: 4-{[(4-{[6-(5-chloro-2-fluorophenyl)-3-methylpyridazin-4-yl]amino}pyridin-2-yl)carbamoyl]methyl}Morpholin-4-Ium-4-olate

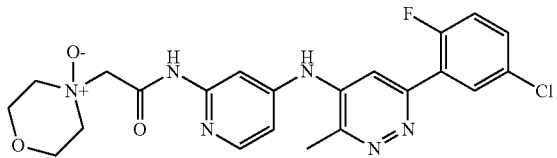 [SMILES: Cc1nnc(-c2cc(Cl)ccc2F)cc1Nc1ccnc(NC(=O)C[N+]2([O-])CCOCC2)c1]

3-chlorobenzenecarboperoxoic acid (11 mg, 0.070 mmol) was added to a solution of N-(4-{[6-(5-chloro-2-fluorophenyl)-3-methylpyridazin-4-yl]amino}pyridin-2-yl)-2-(morpholin-4-yl)acetamide (Example 117, 30 mg, 0.07 mmol) in DCM (3 mL) at RT for 20 min. NaHCO₃ sat solution was added, the product was extracted with DCM, the organic phase was dried and evaporated. The crude material was purified by reverse flash chromatography on Biotage C18 cartridge (from H₂O+0.1% NH₄OH to 35% MeCN) to afford 4-{[(4-{[6-(5-chloro-2-fluorophenyl)-3-methylpyridazin-4-yl]amino}pyridin-2-yl)carbamoyl]methyl}morpholin-4-ium-4-olate (20.5 mg, 0.04 mmol, 66% yield) as a pale yellow solid.

LC-MS (ESI): m/z (M+1): 473.1 (Method 2)

¹H NMR (400 MHz, Chloroform-d) δ ppm 13.81 (br. s, 1H), 8.28 (d, J=5.7 Hz, 1H), 8.16 (dd, J=6.6, 2.7 Hz, 1H), 7.95 (d, J=2.0 Hz, 1H), 7.80 (s, 1H), 7.39 (ddd, J=8.7, 4.1, 2.9 Hz, 1H), 7.13 (dd, J=10.4, 8.9 Hz, 1H), 6.95 (dd, J=5.6, 2.0 Hz, 1H), 6.19 (s, 1H), 4.45-4.62 (m, 2H), 3.96 (s, 2H), 3.84 (br. d, J=12.4 Hz, 2H), 3.28-3.50 (m, 4H), 2.76 (s, 3H).

Example 124: N-(4-{[6-(5-chloro-2-fluorophenyl)-3-methylpyridazin-4-yl]amino}pyridin-2-yl)-3-[4-(2,2,2-trifluoroethyl)piperazin-1-yl]propanamide

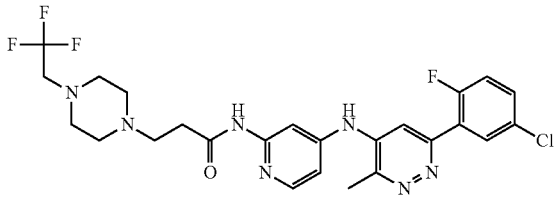 [SMILES: Cc1nnc(-c2cc(Cl)ccc2F)cc1Nc1ccnc(NC(=O)CCN2CCN(CC(F)(F)F)CC2)c1]

Example 124 was prepared following the procedure used for the synthesis of Example 1 starting from N-(4-bromopyridin-2-yl)-3-[4-(2,2,2-trifluoroethyl)piperazin-1-yl] propanamide (Intermediate 88, 91 mg, 0.23 mmol), and 6-(5-chloro-2-fluorophenyl)-3-methylpyridazin-4-amine (Intermediate 90, 50 mg, 0.21 mmol) to afford title compound (89 mg, 0.16 mmol, 77% yield) as a white solid.

LC-MS (ESI): m/z (M+1): 552.2 (Method 2)

¹H NMR (400 MHz, Chloroform-d) δ ppm 11.19 (s, 1H), 8.22 (d, J=5.6 Hz, 1H), 8.17 (dd, J=6.7, 2.7 Hz, 1H), 8.01 (d, J=1.9 Hz, 1H), 7.79 (s, 1H), 7.39 (ddd, J=8.7, 4.1, 2.9 Hz, 1H), 7.12 (dd, J=10.5, 8.8 Hz, 1H), 6.93 (dd, J=5.7, 2.1 Hz, 1H), 6.17 (s, 1H), 3.05 (q, J=9.5 Hz, 2H), 2.86 (br t, J=4.5 Hz, 4H), 2.73-2.81 (m, 5H), 2.68 (br. s, 4H), 2.50-2.60 (m, 2H).

Example 125: 4-{[6-(5-chloro-2-fluorophenyl) pyridazin-4-yl]amino}quinolin-7-yl (1R,4R)-5-methyl-2,5-diazabicyclo[2.2.1]heptane-2-carboxylate

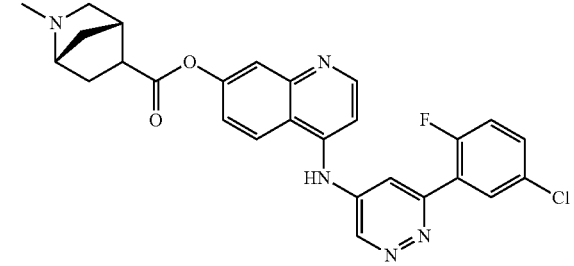 [SMILES: CN1C[C@H]2C[C@@H]1CC2C(=O)Oc1ccc2c(Nc3cnnc(-c4cc(Cl)ccc4F)c3)ccnc2c1]

A mixture of DIPEA (0.14 mL, 0.82 mmol), (1R,4R)-2-(1H-imidazole-1-carbonyl)-5-methyl-2,5-diazabicyclo [2.2.1]heptane (Intermediate 217, 98 mg, 0.41 mmol) and 4-{[6-(5-chloro-2-fluorophenyl)pyridazin-4-yl] amino}quinolin-7-ol hydrobromide (Intermediate 101, 100 mg, 0.22 mmol) in DMF (2.7 mL) was heated at 120° C. for 24 hrs. The mixture was diluted with EtOAc and washed with s.s. of NaHCO₃ (3×) and brine (1×). The organic phase was filtered through a phase separator and concentrated under vacuum. The crude material was purified by flash chromatography on Biotage silica NH cartridge (from DCM to 3% MeOH), then it was further purified by preparative HPLC in acid conditions. The fractions containing the desired product were basified using NaHCO₃ and extracted with DCM (5×). The combined organic layers were filtered through a phase separator and concentrated under vacuum, to afford 4-{[6-(5-chloro-2-fluorophenyl)pyridazin-4-yl] amino}quinolin-7-yl (1R,4R)-5-methyl-2,5-diazabicyclo [2.2.1]heptane-2-carboxylate (5 mg, 0.01 mmol, 4% yield) as a yellow solid.

LC-MS (ESI): m/z (M+1): 505.2 (Method 2)

¹H NMR (400 MHz, Chloroform-d) δ ppm 9.10 (s, 1H), 8.62 (br. d, J=4.7 Hz, 1H), 8.18 (dd, J=6.7, 2.7 Hz, 1H), 7.59-7.81 (m, 4H), 7.41 (ddd, J=8.7, 4.2, 2.7 Hz, 1H), 7.21-7.31 (m, 2H), 7.13 (dd, J=10.6, 8.8 Hz, 1H), 4.53-4.82 (m, 1H), 3.74-3.95 (m, 1H), 3.33-3.64 (m, 2H), 2.77-3.11 (m, 2H), 2.50-2.58 (m, 3H), 1.99-2.14 (m, 1H), 1.84-1.98 (m, 1H).

Example 126: Propan-2-yl 4-{2-[(4-{[6-(5-chloro-2-fluorophenyl)-3-methylpyridazin-4-yl]amino}pyridin-2-yl)carbamoyl]ethyl}-1-methylpiperazine-2-carboxylate

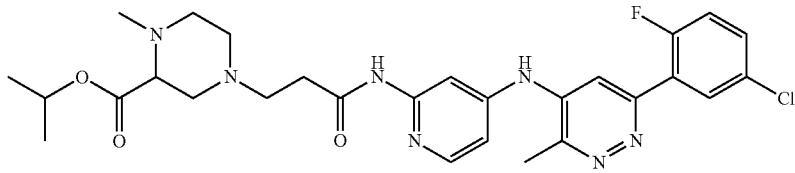 [SMILES: Cc1nnc(-c2cc(Cl)ccc2F)cc1Nc1ccnc(NC(=O)CCN2CCN(C)C(C(=O)OC(C)C)C2)c1]

Example 126 was prepared following the procedure used for the synthesis of Example 122 starting from 4-{2-[(4-{[6-(5-chloro-2-fluorophenyl)-3-methylpyridazin-4-yl]amino}pyridin-2-yl)carbamoyl]ethyl}-1-methylpiperazine-2-carboxylic acid (Example 95, 87 mg, 0.16 mmol), and propan-2-ol (0.06 mL, 0.82 mmol) to afford title compound (38 mg, 0.07 mmol, 41% yield) as a glassy solid.

LC-MS (ESI): m/z (M+1): 570.3 (Method 2)

$^1$H NMR (400 MHz, Chloroform-d) δ ppm 10.75 (br. s, 1H), 8.23 (d, J=5.7 Hz, 1H), 8.16 (dd, J=6.7, 2.7 Hz, 1H), 8.01 (d, J=2.0 Hz, 1H), 7.79 (s, 1H), 7.35-7.45 (m, 1H), 7.12 (dd, J=10.4, 8.9 Hz, 1H), 6.94 (dd, J=5.7, 2.0 Hz, 1H), 6.22 (s, 1H), 5.11 (spt, J=6.3 Hz, 1H), 3.12 (dd, J=9.4, 2.9 Hz, 1H), 2.95-3.06 (m, 2H), 2.89 (br. d, J=8.8 Hz, 1H), 2.71-2.81 (m, 5H), 2.43-2.63 (m, 5H), 2.40 (s, 3H), 1.29 (d, J=6.4 Hz, 3H), 1.26 (d, J=6.4 Hz, 3H).

Example 127: Cyclopropyl 4-{2-[(4-{[6-(5-chloro-2-fluorophenyl)-3-methylpyridazin-4-yl]amino}pyridin-2-yl)carbamoyl]ethyl}-1-methylpiperazine-2-carboxylate

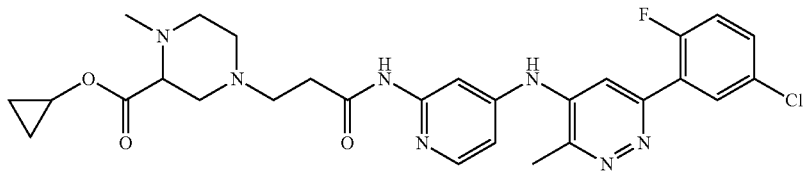 [SMILES: Cc1nnc(-c2cc(Cl)ccc2F)cc1Nc1ccnc(NC(=O)CCN2CCN(C)C(C(=O)OC3CC3)C2)c1]

Example 127 was prepared following the procedure used for the synthesis of Example 122 starting from 4-{2-[(4-{[6-(5-chloro-2-fluorophenyl)-3-methylpyridazin-4-yl]amino}pyridin-2-yl)carbamoyl]ethyl}-1-methylpiperazine-2-carboxylic acid (Example 95, 90 mg, 0.17 mmol), and cyclopropanol (0.03 mL, 0.51 mmol) to afford title compound (33 mg, 0.06 mmol, 34% yield) as a white solid.

LC-MS (ESI): m/z (M+1): 568.2 (Method 2)

$^1$H NMR (400 MHz, Chloroform-d) δ ppm 10.69 (br. s, 1H), 8.23 (d, J=5.6 Hz, 1H), 8.17 (dd, J=6.7, 2.7 Hz, 1H), 8.00 (d, J=1.9 Hz, 1H), 7.79 (s, 1H), 7.33-7.46 (m, 1H), 7.13 (dd, J=10.5, 8.9 Hz, 1H), 6.94 (dd, J=5.6, 2.1 Hz, 1H), 6.17 (s, 1H), 4.22 (quin, J=4.8 Hz, 1H), 3.14 (dd, J=9.3, 2.7 Hz, 1H), 2.94-3.06 (m, 2H), 2.83-2.93 (m, 1H), 2.76-2.80 (m, 2H), 2.76 (s, 3H), 2.44-2.64 (m, 5H), 2.39 (s, 3H), 0.62-0.89 (m, 4H).

Example 128: 4-{[6-(5-chloro-2-fluorophenyl)-3-methylpyridazin-4-yl]amino}quinolin-7-yl 5-methyl-2,5-diazabicyclo[2.2.1]heptane-2-carboxylate

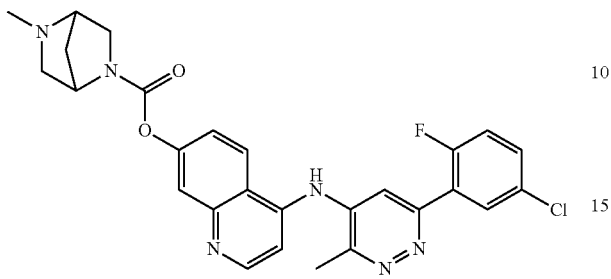

Example 128 was prepared following the procedure used for the synthesis of Example 114 starting from 4-{[6-(5-chloro-2-fluorophenyl)-3-methylpyridazin-4-yl]amino}quinolin-7-ol hydrobromide (Intermediate 151, 120 mg, 0.26 mmol), and 2-methyl-2,5-diazabicyclo[2.2.1]heptane dihydrochloride (Intermediate 215, 182 mg, 3.78 mmol) to afford title compound (24 mg, 0.04 mmol, 17% yield) as a yellow solid.

LC-MS (ESI): m/z (M+1): 519.2 (Method 2)

$^1$H NMR (500 MHz, Chloroform-d) δ ppm 8.80 (d, J=4.9 Hz, 1H), 8.10-8.17 (m, 1H), 7.81-7.88 (m, 2H), 7.58 (s, 1H), 7.41 (dt, J=9.1, 2.2 Hz, 1H), 7.37 (ddd, J=8.8, 4.2, 2.7 Hz, 1H), 7.24 (d, J=4.9 Hz, 1H), 7.08 (dd, J=10.5, 8.9 Hz, 1H), 6.58-6.72 (m, 1H), 4.43-4.67 (m, 1H), 3.69-3.87 (m, 1H), 3.52 (br. s, 1H), 3.33-3.51 (m, 1H), 2.89-3.08 (m, 1H), 2.77-2.89 (m, 4H), 2.47-2.54 (m, 3H), 2.00 (br. dd, J=17.4, 9.9 Hz, 1H), 1.81-1.92 (m, 1H).

Example 129: oxetan-3-yl 4-{2-[(4-{[6-(5-chloro-2-fluorophenyl)-3-methylpyridazin-4-yl]amino}pyridin-2-yl)carbamoyl]ethyl}-1-methylpiperazine-2-carboxylate

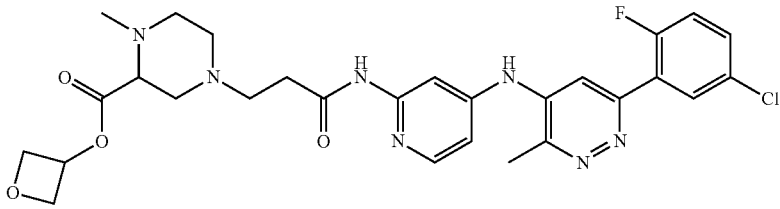 [SMILES: Cc1nnc(-c2cc(Cl)ccc2F)cc1Nc1ccnc(NC(=O)CCN2CCN(C)C(C(=O)OC3COC3)C2)c1]

Example 129 was prepared following the procedure used for the synthesis of Example 122 starting from 4-{2-[(4-{[6-(5-chloro-2-fluorophenyl)-3-methylpyridazin-4-yl]amino}pyridin-2-yl)carbamoyl]ethyl}-1-methylpiperazine-2-carboxylic acid (Example 95, 96 mg, 0.18 mmol), and 3-oxetanol (0.03 mL, 0.55 mmol) to afford title compound (30 mg, 0.05 mmol, 28% yield) as a glassy solid.

LC-MS (ESI): m/z (M+1): 584.2 (Method 2)

$^1$H NMR (400 MHz, Chloroform-d) δ ppm 10.44 (br. s, 1H), 8.23 (d, J=5.6 Hz, 1H), 8.17 (dd, J=6.7, 2.6 Hz, 1H), 8.02 (d, J=2.0 Hz, 1H), 7.79 (s, 1H), 7.39 (ddd, J=8.7, 4.0, 2.9 Hz, 1H), 7.13 (dd, J=10.4, 8.9 Hz, 1H), 6.95 (dd, J=5.6, 2.0 Hz, 1H), 6.26 (s, 1H), 5.51 (quin, J=5.8 Hz, 1H), 4.79-5.06 (m, 2H), 4.56-4.78 (m, 2H), 3.29 (br. dd, J=7.9, 2.6 Hz, 1H), 3.04-3.14 (m, 1H), 2.89-2.99 (m, 1H), 2.76-2.85 (m, 3H), 2.76 (s, 3H), 2.63-2.73 (m, 1H), 2.52-2.66 (m, 4H), 2.46 (s, 3H).

Example 130: N-(4-{[6-(5-chloro-2-fluorophenyl)-3-methylpyridazin-4-yl]amino}pyridin-2-yl)-3-(1-oxo-1V-thiomorpholin-4-yl)propanamide

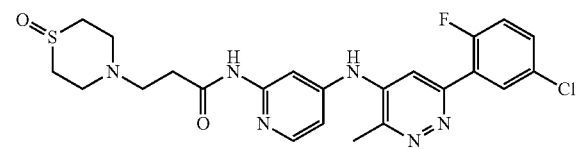 [SMILES: Cc1nnc(-c2cc(Cl)ccc2F)cc1Nc1ccnc(NC(=O)CCN2CCS(=O)CC2)c1]

To a stirred solution of N-(4-{[6-(5-chloro-2-fluorophenyl)-3-methylpyridazin-4-yl]amino}pyridin-2-yl)-3-(thiomorpholin-4-yl)propanamide (Example 120, 101 mg, 0.21 mmol) in DCM (9.5 mL), at 0° C. and under a nitrogen atmosphere, a solution of 3-chlorobenzenecarboperoxoic acid (47 mg, 0.21 mmol) in DCM (2.5 mL) was added portion-wise and the resulting reaction mixture was stirred at 0° C. for 1 h. The reaction was quenched by addition of a saturated solution of NaHCO$_3$, the organic phase was washed with water, dried over Na$_2$SO$_4$, filtered, and the solvent removed under reduced pressure. The crude material was purified by reverse flash chromatography on Biotage C18 cartridge (from H$_2$O+0.2% NH$_4$OH to 55% MeCN). Proper fractions were collected and further purified by flash chromatography on Biotage silica NH cartridge (from DCM to 4% MeOH) to afford N-(4-{[6-(5-chloro-2-fluorophenyl)-3-methylpyridazin-4-yl]amino}pyridin-2-yl)-3-(1-oxo-1λ$^4$-thiomorpholin-4-yl)propanamide (5 mg, 0.01 mmol, 5% yield) as a white solid.

Example 131: N-(4-{[6-(5-chloro-2-fluorophenyl)-3-methylpyridazin-4-yl]amino}pyridin-2-yl)-2-[4-(2,2,2-trifluoroethyl)piperazin-1-yl]acetamide

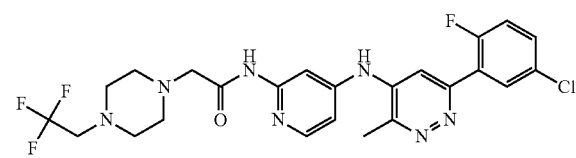 [SMILES: Cc1nnc(-c2cc(Cl)ccc2F)cc1Nc1ccnc(NC(=O)CN2CCN(CC(F)(F)F)CC2)c1]

Example 131 was prepared following the procedure used for the synthesis of Example 1 starting from N-(4-bromopyridin-2-yl)-2-[4-(2,2,2-trifluoroethyl)piperazin-1-yl]acetamide (Intermediate 218, 71 mg, 0.18 mmol), and 6-(5-chloro-2-fluorophenyl)-3-methylpyridazin-4-amine (Intermediate 90, 40 mg, 0.17 mmol) to afford title compound (56 mg, 0.10 mmol, 62% yield) as a white solid.

LC-MS (ESI): m/z (M+1): 538.1 (Method 2)

$^1$H NMR (500 MHz, Chloroform-d) δ ppm 9.58 (s, 1H), 8.25 (d, J=5.6 Hz, 1H), 8.17 (dd, J=6.7, 2.7 Hz, 1H), 8.07 (d, J=2.1 Hz, 1H), 7.81 (d, J=1.4 Hz, 1H), 7.39 (ddd, J=8.8, 4.3, 2.9 Hz, 1H), 7.13 (dd, J=10.6, 8.9 Hz, 1H), 6.98 (dd, J=5.6, 2.2 Hz, 1H), 6.22 (s, 1H), 3.19 (s, 2H), 3.02 (q, J=9.5 Hz, 2H), 2.79-2.86 (m, 4H), 2.77 (s, 3H), 2.62-2.72 (m, 4H).

Example 132: N-(4-{[6-(5-chloro-2-fluorophenyl)-3-methylpyridazin-4-yl]amino}pyridin-2-yl)-3-(1,1-dioxo-1λ$^6$-Thiomorpholin-4-yl)propanamide

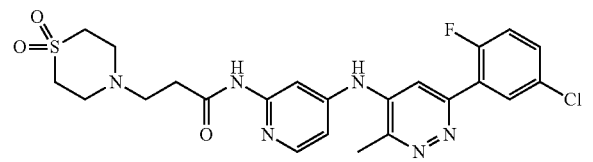 [SMILES: Cc1nnc(-c2cc(Cl)ccc2F)cc1Nc1ccnc(NC(=O)CCN2CCS(=O)(=O)CC2)c1]

Example 132 was prepared following the procedure used for the synthesis of Example 1 starting from N-(4-bromopyridin-2-yl)-3-(1,1-dioxo-1λ$^6$-thiomorpholin-4-yl)propanamide (Intermediate 219, 130 mg, 0.36 mmol), and 6-(5-chloro-2-fluorophenyl)-3-methylpyridazin-4-amine (Intermediate 90, 70 mg, 0.29 mmol) to afford title compound (39 mg, 0.07 mmol, 25% yield) as a white solid.

LC-MS (ESI): m/z (M+1): 519.1 (Method 2)

$^1$H NMR (400 MHz, Chloroform-d) δ ppm 10.13 (s, 1H), 8.20 (d, J=5.7 Hz, 1H), 8.17 (dd, J=6.7, 2.7 Hz, 1H), 7.98 (d, J=1.8 Hz, 1H), 7.80 (s, 1H), 7.39 (ddd, J=8.7, 4.2, 2.9 Hz, 1H), 7.13 (dd, J=10.6, 8.9 Hz, 1H), 6.94 (dd, J=5.7, 2.0 Hz, 1H), 6.24 (s, 1H), 3.10-3.28 (m, 8H), 2.96 (t, J=6.0 Hz, 2H), 2.76 (s, 3H), 2.57 (t, J=6.0 Hz, 2H).

Example 133: 4-{[6-(5-chloro-2-fluorophenyl)pyridazin-4-yl]amino}quinolin-7-yl 3-(pyrrolidin-1-yl)azetidine-1-carboxylate

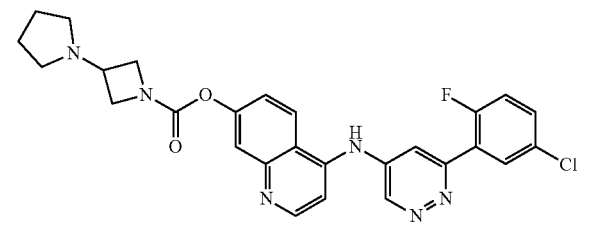 [SMILES: O=C(Oc1ccc2c(Nc3cnnc(-c4cc(Cl)ccc4F)c3)ccnc2c1)N1CC(N2CCCC2)C1]

Example 133 was prepared following the procedure used for the synthesis of Example 45 starting from 4-{[6-(5-chloro-2-fluorophenyl)pyridazin-4-yl]amino}quinolin-7-ol hydrobromide (Intermediate 101, 90 mg, 0.20 mmol) and 1-(azetidin-3-yl)pyrrolidine (Intermediate 220, 43 mg, 0.34 mmol) to afford title compound (17 mg, 0.03 mmol, 16% yield) as a yellow solid.

LC-MS (ESI): m/z (M+1): 519.2 (Method 2)

$^1$H NMR (500 MHz, Chloroform-d) δ ppm 9.11 (d, J=2.7 Hz, 1H), 8.68 (d, J=4.9 Hz, 1H), 8.19 (dd, J=6.7, 2.7 Hz, 1H), 7.78 (d, J=9.2 Hz, 1H), 7.74 (d, J=2.2 Hz, 1H), 7.61-7.69 (m, 1H), 7.39-7.44 (m, 1H), 7.37 (s, 1H), 7.28-7.32 (m, 2H), 7.14 (dd, J=10.6, 8.8 Hz, 1H), 4.04-4.44 (m, 4H), 3.36-3.49 (m, 1H), 2.58 (br t, J=5.8 Hz, 4H), 1.90 (br t, J=3.2 Hz, 4H).

Example 134: 4-{[6-(5-chloro-2-fluorophenyl)pyridazin-4-yl]amino}quinolin-7-yl 4-(azetidin-1-yl)piperidine-1-carboxylate

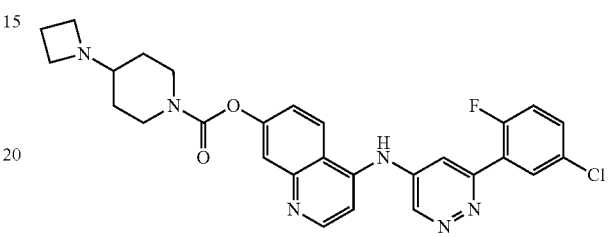

Example 134 was prepared following the procedure used for the synthesis of Example 114 starting from 4-{[6-(5-chloro-2-fluorophenyl)pyridazin-4-yl]amino}quinolin-7-ol hydrobromide (Intermediate 101, 100 mg, 0.22 mmol) and 4-(azetidin-1-yl)piperidine dihydrochloride (71 mg, 0.33 mmol) to afford title compound (20 mg, 0.04 mmol, 17% yield) as a yellow solid.

LC-MS (ESI): m/z (M+1): 533.2 (Method 2)

$^1$H NMR (400 MHz, Chloroform-d) δ ppm 9.09 (d, J=2.6 Hz, 1H), 8.63 (d, J=5.0 Hz, 1H), 8.19 (dd, J=6.6, 2.7 Hz, 1H), 7.74 (d, J=9.1 Hz, 1H), 7.69 (d, J=2.2 Hz, 1H), 7.65 (s, 1H), 7.56 (s, 1H), 7.37-7.47 (m, 1H), 7.21-7.26 (m, 2H), 7.14 (dd, J=10.5, 8.9 Hz, 1H), 3.97-4.36 (m, 2H), 3.25 (t, J=7.0 Hz, 4H), 3.11-3.41 (m, 2H), 2.25-2.40 (m, 1H), 2.11 (quin, J=6.9 Hz, 2H), 1.82 (br. dd, J=9.3, 4.1 Hz, 2H), 1.35-1.50 (m, 2H).

Example 135: N-(4-{[6-(5-chloro-2-fluorophenyl)-3-methylpyridazin-4-yl]amino}pyridin-2-yl)-3-{4-methyl-4,7-diazaspiro[2.5]octan-7-yl}propanamide

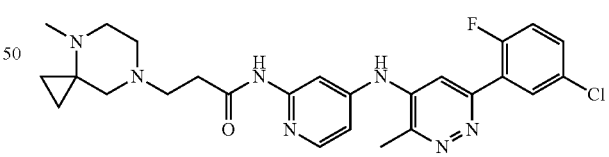

Example 135 was prepared following the procedure used for the synthesis of Example 1 starting from N-(4-bromopyridin-2-yl)-3-{4-methyl-4,7-diazaspiro[2.5]octan-7-yl}propanamide (Intermediate 223, 82 mg, 0.23 mmol), and 6-(5-chloro-2-fluorophenyl)-3-methylpyridazin-4-amine (Intermediate 90, 50 mg, mmol) to afford title compound (45 mg, 0.09 mmol, 42% yield) as a pale yellow glassy solid.

LC-MS (ESI): m/z (M+1): 510.3 (Method 2)

$^1$H NMR (400 MHz, Chloroform-d) δ ppm 11.53 (s, 1H), 8.24 (d, J=5.7 Hz, 1H), 8.17 (dd, J=6.6, 2.6 Hz, 1H), 8.01 (d, J=1.8 Hz, 1H), 7.79 (d, J=0.9 Hz, 1H), 7.35-7.42 (m, 1H), 7.12 (dd, J=10.3, 9.0 Hz, 1H), 6.93 (dd, J=5.7, 2.2 Hz, 1H), 6.15 (s, 1H), 3.07 (br. s, 2H), 2.70-2.80 (m, 5H), 2.66 (br t, J=4.8 Hz, 2H), 2.51-2.58 (m, 2H), 2.29-2.50 (m, 5H), 0.50-0.86 (m, 4H).

Example 136: N-(4-{[6-(5-chloro-2-fluorophenyl)-3-methylpyridazin-4-yl]amino}pyridin-2-yl)-3-[4-(2-Methanesulfonamidoethyl)piperazin-1-yl]propanamide

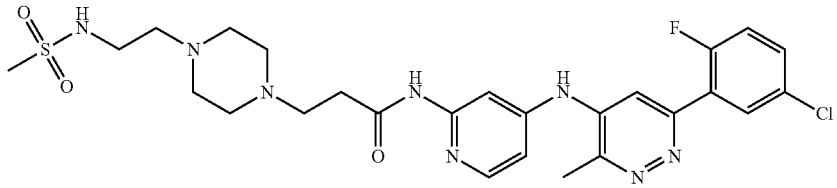 [SMILES: Cc1nnc(-c2cc(Cl)ccc2F)cc1Nc1ccnc(NC(=O)CCN2CCN(CCNS(C)(=O)=O)CC2)c1]

A solution of 3-[4-(2-aminoethyl)piperazin-1-yl]-N-(4-{[6-(5-chloro-2-fluorophenyl)-3-methylpyridazin-4-yl]amino}pyridin-2-yl)propanamide (Example 76, 34 mg, 0.07 mmol) in anhydr. DMF (0.66 mL) was treated with TEA (0.01 mL, mmol) and then with methanesulfonyl chloride (7.6 mg, 0.07 mmol) at 0° C. The mixture was stirred at RT for 30 min and then quenched by adding sat. aq. NaHCO₃. The mixture was extracted with EtOAc (×3), the combined organic phases filtered using a phase separator and concentrated under reduced pressure. The crude product was purified by flash chromatography on Biotage silica NH cartridge (from DCM to 90% MeOH) to give N-(4-{[6-(5-chloro-2-fluorophenyl)-3-methylpyridazin-4-yl]amino}pyridin-2-yl)-3-[4-(2-methanesulfonamidoethyl)piperazin-1-yl]propanamide (20 mg, 0.03 mmol, 51% yield) as an off-white solid.

LC-MS (ESI): m/z (M+1): 591.4 (Method 2)

¹H NMR (400 MHz, Chloroform-d) δ ppm 11.15 (s, 1H), 8.21 (d, J=5.6 Hz, 1H), 8.16 (dd, J=6.7, 2.7 Hz, 1H), 8.01 (d, J=2.0 Hz, 1H), 7.79 (d, J=1.2 Hz, 1H), 7.39 (ddd, J=8.8, 4.2, 2.8 Hz, 1H), 7.12 (dd, J=10.5, 8.9 Hz, 1H), 6.93 (dd, J=5.6, 2.1 Hz, 1H), 6.23 (s, 1H), 4.99 (br. s, 1H), 3.24 (br. s, 2H), 3.00 (s, 3H), 2.74-2.82 (m, 5H), 2.59-2.73 (m, 10H), 2.50-2.58 (m, 2H).

Example 137: 4-{[6-(5-chloro-2-fluorophenyl)pyridazin-4-yl]amino}quinolin-7-yl 5-methyl-2,5-diazabicyclo[2.2.1]heptane-2-carboxylate

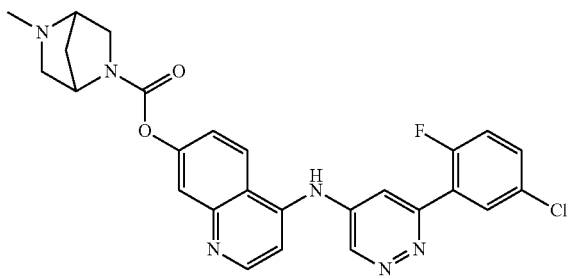 [SMILES: CN1CC2CC1CN2C(=O)Oc1ccc2c(Nc3cnnc(-c4cc(Cl)ccc4F)c3)ccnc2c1]

Example 137 was prepared following the procedure used for the synthesis of Example 114 starting from 4-{[6-(5-chloro-2-fluorophenyl)pyridazin-4-yl]amino}quinolin-7-ol hydrobromide (Intermediate 101, 90 mg, 0.17 mmol) and 2-methyl-2,5-diazabicyclo[2.2.1]heptane dihydrochloride (Intermediate 215, 118 mg, mmol) to afford title compound (18 mg, 0.04 mmol, 20% yield) as a yellow solid.

LC-MS (ESI): m/z (M+1): 505.1 (Method 2)

¹H NMR (400 MHz, Chloroform-d) δ ppm 9.11 (d, J=1.8 Hz, 1H), 8.53 (br. d, J=4.8 Hz, 1H), 7.95-8.22 (m, 2H), 7.55-7.78 (m, 3H), 7.39 (ddd, J=8.8, 3.9, 3.1 Hz, 1H), 7.05-7.24 (m, 3H), 4.53-4.72 (m, 1H), 3.73-3.93 (m, 1H), 3.58 (br. s, 1H), 3.41-3.56 (m, 1H), 2.84-3.09 (m, 2H), 2.55 (s, 3H), 1.79-2.24 (m, 2H).

Example 138: N-(4-{[6-(5-chloro-2-fluorophenyl)-3-methylpyridazin-4-yl]amino}pyridin-2-yl)-3-{6-methyl-2,6-diazaspiro[3.3]heptan-2-yl}propanamide

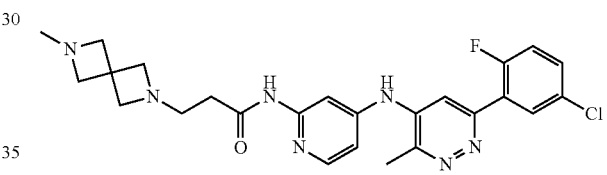

Example 138 was prepared following the procedure used for the synthesis of Example 1 starting from N-(4-bromopyridin-2-yl)-3-{6-methyl-2,6-diazaspiro[3.3]heptan-2-yl}propanamide (Intermediate 224, 94 mg, 0.28 mmol), and 6-(5-chloro-2-fluorophenyl)-3-methylpyridazin-4-amine (Intermediate 90, 60 mg, mmol) to afford title compound (25 mg, 0.05 mmol, 20% yield) as a pale yellow solid.

LC-MS (ESI): m/z (M+1): 496.2 (Method 2)

¹H NMR (400 MHz, Chloroform-d) δ ppm 10.76 (s, 1H), 8.23 (d, J=5.6 Hz, 1H), 8.17 (dd, J=6.6, 2.7 Hz, 1H), 8.02 (d, J=2.0 Hz, 1H), 7.79 (s, 1H), 7.39 (ddd, J=8.7, 4.1, 2.9 Hz, 1H), 7.13 (dd, J=10.4, 8.9 Hz, 1H), 6.93 (dd, J=5.7, 2.1 Hz, 1H), 6.17 (s, 1H), 3.41 (s, 4H), 3.33 (s, 4H), 2.76-2.82 (m, 2H), 2.75 (s, 3H), 2.40 (t, J=5.9 Hz, 2H), 2.30 (s, 3H).

Example 139: N-(4-{[6-(5-chloro-2-fluorophenyl)-3-methylpyridazin-4-yl]amino}pyridin-2-yl)-3-(4,4-difluoropiperidin-1-yl)propanamide

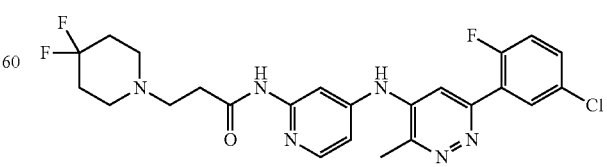

Example 139 was prepared following the procedure used for the synthesis of Example 1 starting from N-(4-bromopyridin-2-yl)-3-(4,4-difluoropiperidin-1-yl)propanamide (Intermediate 225, 81 mg, 0.23 mmol), and 6-(5-chloro-2-fluorophenyl)-3-methylpyridazin-4-amine (Intermediate 90, 50 mg, 0.21 mmol) to afford title compound (86 mg, 0.17 mmol, 81% yield) as a pale yellow solid.

LC-MS (ESI): m/z (M+1): 505.2 (Method 2)

$^1$H NMR (400 MHz, Chloroform-d) δ ppm 11.04 (s, 1H), 8.21 (d, J=5.5 Hz, 1H), 8.17 (dd, J=6.7, 2.7 Hz, 1H), 8.00 (d, J=2.2 Hz, 1H), 7.80 (d, J=0.9 Hz, 1H), 7.39 (ddd, J=8.7, 4.1, 3.0 Hz, 1H), 7.13 (dd, J=10.4, 8.9 Hz, 1H), 6.93 (dd, J=5.6, 2.1 Hz, 1H), 6.17 (s, 1H), 2.82 (t, J=5.9 Hz, 2H), 2.76 (s, 7H), 2.51-2.61 (m, 2H), 2.12-2.28 (m, 4H).

Example 140: N-(4-{[6-(5-chloro-2-fluorophenyl)-3-methylpyridazin-4-yl]amino}pyridin-2-yl)-3-(4-hydroxypiperidin-1-yl)propanamide

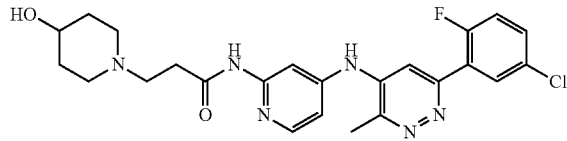 [SMILES: Cc1nnc(-c2cc(Cl)ccc2F)cc1Nc1ccnc(NC(=O)CCN2CCC(O)CC2)c1]

Example 140 was prepared following the procedure used for the synthesis of Example 1 starting from N-(4-bromopyridin-2-yl)-3-(4-hydroxypiperidin-1-yl)propanamide (Intermediate 226, 61 mg, 0.19 mmol), and 6-(5-chloro-2-fluorophenyl)-3-methylpyridazin-4-amine (Intermediate 90, 40 mg, 0.17 mmol) to afford title compound (51 mg, 0.10 mmol, 63% yield) as a white solid.

LC-MS (ESI): m/z (M+1): 485.1 (Method 2)

$^1$H NMR (400 MHz, DMSO-d$_6$) δ ppm 10.76 (s, 1H), 8.84 (s, 1H), 8.14 (d, J=5.7 Hz, 1H), 8.08 (d, J=1.8 Hz, 1H), 7.98 (dd, J=6.6, 2.9 Hz, 1H), 7.71 (s, 1H), 7.57-7.64 (m, 1H), 7.42 (dd, J=10.5, 9.0 Hz, 1H), 6.97 (dd, J=5.6, 2.1 Hz, 1H), 4.54 (d, J=4.2 Hz, 1H), 3.39-3.52 (m, 1H), 2.70-2.81 (m, 2H), 2.68 (s, 3H), 2.54-2.63 (m, 2H), 2.41-2.53 (m, 2H), 2.06 (br t, J=10.1 Hz, 2H), 1.61-1.80 (m, 2H), 1.31-1.47 (m, 2H).

Example 141: 1-(4-{[6-(5-chloro-2-fluorophenyl)-3-methylpyridazin-4-yl]amino}pyridin-2-yl)-3-[2-(4-methylpiperazin-1-yl)ethyl]urea

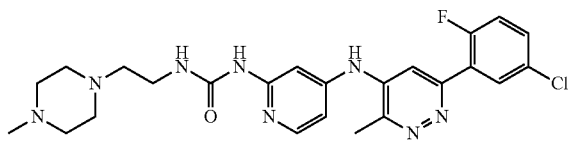 [SMILES: Cc1nnc(-c2cc(Cl)ccc2F)cc1Nc1ccnc(NC(=O)NCCN2CCN(C)CC2)c1]

To a solution of 6-(5-chloro-2-fluorophenyl)-3-methylpyridazin-4-amine (Intermediate 90, 60 mg, 0.252 mmol) in dry 1,4-dioxane (5 mL), Cs$_2$CO$_3$ (165 mg, 0.505 mmol), xantphos (14.61 mg, 0.025 mmol), Pd(OAc)$_2$ (2.83 mg, 0.013 mmol) and 1-(4-bromopyridin-2-yl)-3-(2-(4-methylpiperazin-1-yl)ethyl)urea (Intermediate 289, 112 mg, 0.328 mmol) were added and the suspension was heated to 120° C. overnight. Volatiles were removed under reduced pressure and the crude was purified by C18 flash chromatography ((H$_2$O/MeCN)) 95:5+0.1% HCOOH}:{(MeCN/H$_2$O) 95:5+HCOOH 0.1%} from 100:0 to 50:50 affording 1-(4-((6-(5-chloro-2-fluorophenyl)-3-methylpyridazin-4-yl) amino)pyridin-2-yl)-3-(2-(4-methylpiperazin-1-yl)ethyl) urea (20 mg, 0.040 mmol, 16% yield) as yellowish solid.

LC-MS (ESI): m/z (M+1) 499.1, rt=0.37 min (Method 1).

$^1$H NMR (400 MHz, DMSO-d$_6$) δ ppm 2.15 (s, 3H) 2.33 (br s, 4H) 2.40 (br t, J=6.25 Hz, 5H) 2.67 (s, 3H) 3.23-3.29 (m, 3H) 6.82 (dd, J=5.70, 1.32 Hz, 1H) 7.21 (s, 1H) 7.43 (t, J=9.65 Hz, 1H) 7.58-7.63 (m, 1H) 7.68 (s, 1H) 7.98 (dd, J=6.36, 2.63 Hz, 1H) 8.02 (d, J=5.70 Hz, 1H) 8.28-8.50 (m, 1H) 8.75 (s, 1H) 9.18 (s, 1H).

Example 142

1-(4-{[6-(5-chloro-2-fluorophenyl)-3-methylpyridazin-4-yl]amino}pyridin-2-yl)-3-[(1-methylpiperidin-4-yl)methyl]urea

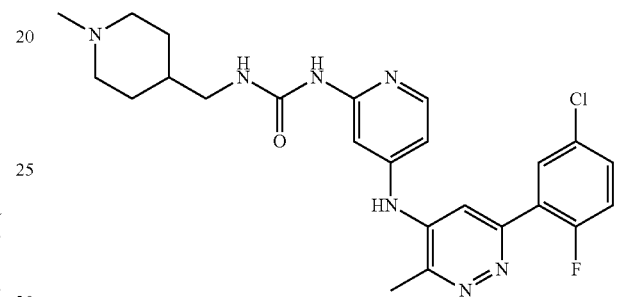

Example 142 was prepared following the procedure used for the synthesis of Example 141 starting from 6-(5-chloro-2-fluorophenyl)-3-methylpyridazin-4-amine (Intermediate 90, 60 mg, 0.252 mmol) 1-(4-bromopyridin-2-yl)-3-((1-methylpiperidin-4-yl)methyl)urea (Intermediate 291, 99 mg, 0.303 mmol). Purification by C18 flash chromatography ((H$_2$O/MeCN)) 95:5+0.1% HCOOH}:{(MeCN/H$_2$O) 95:5+ HCOOH 0.1%} from 100:0 to 50:50 yielded the title compound (10 mg, 0.021 mmol, 8% yield) as yellowish solid.

LC-MS (ESI): m/z (M+1) 483.9, rt=0.40 min (Method 1).

$^1$H NMR (400 MHz, DMSO-d$_6$) δ ppm 1.11-1.21 (m, 2H) 1.28-1.43 (m, 1H) 1.59 (br d, J=11.40 Hz, 2H) 1.79 (br t, J=10.74 Hz, 2H) 2.12 (s, 3H) 2.67 (s, 3H) 2.73 (br d, J=11.40 Hz, 2H) 3.06 (br t, J=6.14 Hz, 2H) 6.81 (br dd, J=5.70, 1.32 Hz, 1H) 7.24 (s, 1H) 7.40-7.48 (m, 1H) 7.55-7.66 (m, 1H) 7.69 (s, 1H) 7.98 (dd, J=6.47, 2.74 Hz, 1H) 8.03 (d, J=5.70 Hz, 1H) 8.29 (br s, 1H) 8.76 (s, 1H) 9.08 (s, 1H).

Example 143: N-(4-{[6-(5-chloro-2-fluorophenyl)-3-methylpyridazin-4-yl]amino}pyridin-2-yl)-2-{6-methyl-2,6-diazaspiro[3.3]heptan-2-yl}acetamide

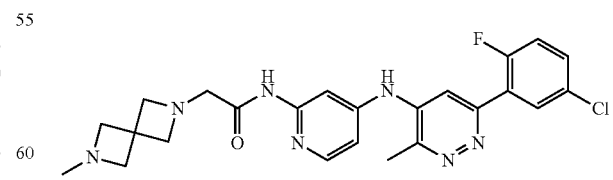

Example 143 was prepared following the procedure used for the synthesis of Example 3 starting from N-(4-bromopyridin-2-yl)-2-{6-methyl-2,6-diazaspiro[3.3]heptan-2-yl}acetamide (Intermediate 227, 350 mg, 0.71 mmol) and 6-(5-chloro-2-fluorophenyl)-3-methylpyridazin-4-amine (Intermediate 90, 200 mg, mmol) to afford title compound (70 mg, 0.14 mmol, 18% yield) as an amorphous solid.

LC-MS (ESI): m/z (M+1): 482.2 (Method 1)

$^1$H NMR (500 MHz, DMSO-d$_6$) δ ppm 9.82 (s, 1H), 8.89 (s, 1H), 8.13 (d, J=5.8 Hz, 1H), 8.02 (d, J=1.8 Hz, 1H), 7.97 (dd, J=6.5, 2.8 Hz, 1H), 7.72 (s, 1H), 7.55-7.66 (m, 1H), 7.43 (dd, J=10.6, 8.9 Hz, 1H), 7.00 (dd, J=5.7, 2.1 Hz, 1H), 3.35 (s, 4H), 3.21 (s, 2H), 3.15 (s, 4H), 2.68 (s, 3H), 2.14 (s, 3H).

Example 144: N-(4-{[6-(5-chloro-2-fluorophenyl)-3-methylpyridazin-4-yl]amino}pyridin-2-yl)-2-{4-methyl-4,7-diazaspiro[2.5]octan-7-yl}acetamide

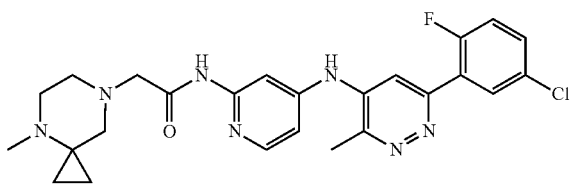 [SMILES: Cc1nnc(-c2cc(Cl)ccc2F)cc1Nc1ccnc(NC(=O)CN2CCN(C)C3(CC3)C2)c1]

Example 144 was prepared following the procedure used for the synthesis of Example 3 starting from N-(4-bromopyridin-2-yl)-2-{4-methyl-4,7-diazaspiro[2.5]octan-7-yl}acetamide (Intermediate 230, 118 mg, 0.35 mmol) and 6-(5-chloro-2-fluorophenyl)-3-methylpyridazin-4-amine (Intermediate 90, 75 mg, mmol) to afford title compound (42 mg, 0.08 mmol, 29% yield) as a white solid.

LC-MS (ESI): m/z (M+1): 496.1 (Method 1)

$^1$H NMR (500 MHz, Chloroform-d) δ ppm 9.76 (s, 1H), 8.26 (d, J=5.8 Hz, 1H), 8.17 (dd, J=6.7, 2.7 Hz, 1H), 8.06 (d, J=1.9 Hz, 1H), 7.81 (d, J=1.2 Hz, 1H), 7.39 (ddd, J=8.8, 4.3, 2.7 Hz, 1H), 7.13 (dd, J=10.6, 8.8 Hz, 1H), 6.97 (dd, J=5.7, 2.1 Hz, 1H), 6.20 (s, 1H), 3.16 (s, 2H), 3.02 (br. s, 2H), 2.76 (s, 3H), 2.68 (t, J=5.0 Hz, 2H), 2.37 (s, 3H), 2.40 (br. s, 2H), 0.75-0.85 (m, 2H), 0.47-0.55 (m, 2H).

Example 145: N-(4-{[6-(5-chloro-2-fluorophenyl)-3-methylpyridazin-4-yl]amino}pyridin-2-yl)-3-(3,4-dimethylpiperazin-1-yl)propanamide

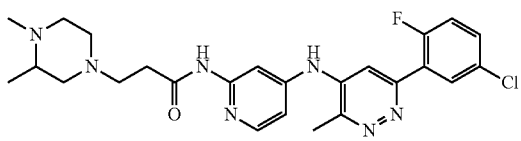 [SMILES: Cc1nnc(-c2cc(Cl)ccc2F)cc1Nc1ccnc(NC(=O)CCN2CCN(C)C(C)C2)c1]

Example 145 was prepared following the procedure used for the synthesis of Example 1 starting from N-(4-bromopyridin-2-yl)-3-(3,4-dimethylpiperazin-1-yl)propanamide (Intermediate 231, 79 mg, 0.23 mmol) and 6-(5-chloro-2-fluorophenyl)-3-methylpyridazin-4-amine (Intermediate 90, 50 mg, 0.21 mmol) to afford title compound (73 mg, 0.15 mmol, 70% yield) as a pale yellow solid.

LC-MS (ESI): m/z (M+1): 498.2 (Method 2)

$^1$H NMR (400 MHz, Chloroform-d) δ ppm 11.30 (s, 1H), 8.23 (d, J=5.6 Hz, 1H), 8.17 (dd, J=6.6, 2.7 Hz, 1H), 8.02 (d, J=1.9 Hz, 1H), 7.79 (s, 1H), 7.34-7.46 (m, 1H), 7.12 (dd, J=10.5, 8.9 Hz, 1H), 6.93 (dd, J=5.6, 2.0 Hz, 1H), 6.17 (s, 1H), 2.97 (br. d, J=10.4 Hz, 1H), 2.83-2.92 (m, 2H), 2.76 (s, 3H), 2.71-2.75 (m, 2H), 2.54-2.61 (m, 2H), 2.49-2.56 (m, 1H), 2.36 (s, 3H), 2.32-2.44 (m, 2H), 2.03 (br t, J=10.5 Hz, 1H), 1.12 (d, J=6.2 Hz, 3H).

Example 146: N-(4-{[6-(5-chloro-2-fluorophenyl)-3-methylpyridazin-4-yl]amino}pyridin-2-yl)-3-{6-methyl-3,6-diazabicyclo[3.1.1]heptan-3-yl}propanamide

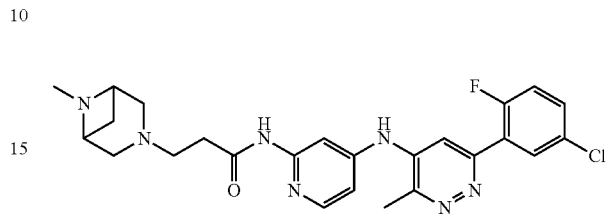

Example 146 was prepared following the procedure used for the synthesis of Example 1 starting from N-(4-bromopyridin-2-yl)-3-{6-methyl-3,6-diazabicyclo[3.1.1]heptan-3-yl}propanamide (Intermediate 234, 78 mg, 0.23 mmol) and 6-(5-chloro-2-fluorophenyl)-3-methylpyridazin-4-amine (Intermediate 90, 50 mg, 0.21 mmol) to afford title compound (60 mg, 0.12 mmol, 57% yield) as a yellow solid.

LC-MS (ESI): m/z (M+1): 496.2 (Method 2)

$^1$H NMR (400 MHz, Chloroform-d) δ ppm 11.40 (s, 1H), 8.20 (d, J=5.5 Hz, 1H), 8.17 (dd, J=6.7, 2.8 Hz, 1H), 8.04 (d, J=2.2 Hz, 1H), 7.79 (d, J=1.3 Hz, 1H), 7.34-7.45 (m, 1H), 7.12 (dd, J=10.6, 8.8 Hz, 1H), 6.91 (dd, J=5.6, 2.1 Hz, 1H), 6.16 (s, 1H), 3.57 (br. d, J=4.8 Hz, 2H), 3.08-3.17 (m, 2H), 2.96-3.07 (m, 4H), 2.76 (s, 3H), 2.55-2.64 (m, 3H), 2.37 (d, J=8.6 Hz, 1H), 2.20 (s, 3H).

Example 147: N-(4-{[6-(5-chloro-2-fluorophenyl)-3-methylpyridazin-4-yl]amino}pyridin-2-yl)-3-{2-methyl-5-oxa-2,8-diazaspiro[3.5]nonan-8-yl}propanamide

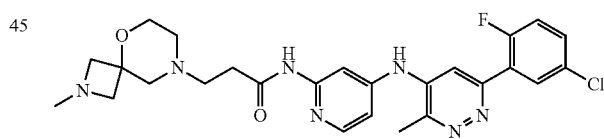

Example 147 was prepared following the procedure used for the synthesis of Example 1 starting from N-(4-bromopyridin-2-yl)-3-{2-methyl-5-oxa-2,8-diazaspiro[3.5]nonan-8-yl}propanamide (Intermediate 237, 85 mg, 0.23 mmol) and 6-(5-chloro-2-fluorophenyl)-3-methylpyridazin-4-amine (Intermediate 90, 50 mg, mmol) to afford title compound (54 mg, 0.10 mmol, 49% yield) as a white solid.

LC-MS (ESI): m/z (M+1): 526.2 (Method 2)

$^1$H NMR (400 MHz, Chloroform-d) δ ppm 11.14 (s, 1H), 8.20 (d, J=5.7 Hz, 1H), 8.17 (dd, J=6.7, 2.7 Hz, 1H), 8.02 (d, J=2.0 Hz, 1H), 7.79 (d, J=0.9 Hz, 1H), 7.39 (ddd, J=8.7, 4.2, 2.7 Hz, 1H), 7.13 (dd, J=10.4, 8.9 Hz, 1H), 6.93 (dd, J=5.6, 2.1 Hz, 1H), 6.17 (s, 1H), 3.79 (t, J=4.6 Hz, 2H), 3.64 (br. d, J=7.2 Hz, 2H), 2.96 (d, J=7.9 Hz, 2H), 2.71-2.84 (m, 7H), 2.54-2.65 (m, 4H), 2.40 (s, 3H).

Example 148: 4-{[6-(5-chloro-2-fluorophenyl)pyridazin-4-yl]amino}-7-[2-(4-methylpiperazin-1-yl)ethoxy]quinolin-6-ol

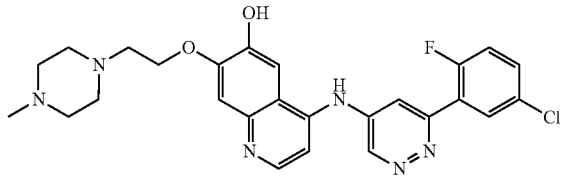 [SMILES: CN1CCN(CCOc2cc3nccc(Nc4cnnc(-c5cc(Cl)ccc5F)c4)c3cc2O)CC1]

N-[6-(5-chloro-2-fluorophenyl)pyridazin-4-yl]-6-methoxy-7-[2-(4-methylpiperazin-1-yl)ethoxy]quinolin-4-amine (Example 87, 200 mg, 0.38 mmol) was added to HBr 48% in water (3 mL, 0.38 mmol). The vial was close, and the mixture was warmed at 130° C. for 3 hrs. The solvent was removed by reduced pressure. The residue was treated with water, NH₄OH was added until pH 9 and the mixture was extracted with DCM. Organic layer was separated, dried over Na₂SO₄, filtered, and evaporated. The residue was purified by flash chromatography on Biotage silica NH cartridge (from DCM to 3% MeOH/0.3% H₂O) to afford 4-{[6-(5-chloro-2-fluorophenyl)pyridazin-4-yl]amino}-7-[2-(4-methylpiperazin-1-yl)ethoxy]quinolin-6-ol (120 mg, 0.24 mmol, 62% yield) as a white solid.

LC-MS (ESI): m/z (M+1): 509.3 (Method 2)

¹H NMR (500 MHz, DMSO-d₆) δ ppm 10.07 (br. s, 1H), 9.59 (br. s, 1H), 9.11 (d, J=2.2 Hz, 1H), 8.53 (br. d, J=4.5 Hz, 1H), 7.99 (dd, J=6.6, 2.7 Hz, 1H), 7.58-7.66 (m, 1H), 7.55 (s, 1H), 7.40-7.47 (m, 3H), 7.33 (br. d, J=4.3 Hz, 1H), 4.26 (t, J=5.8 Hz, 2H), 2.77 (t, J=5.8 Hz, 2H), 2.21-2.67 (m, 8H), 2.15 (s, 3H).

Example 149: N-(4-{[6-(5-chloro-2-fluorophenyl)-3-methylpyridazin-4-yl]amino}pyridin-2-yl)-2-methyl-2,7-diazaspiro[3.5]nonane-7-carboxamide

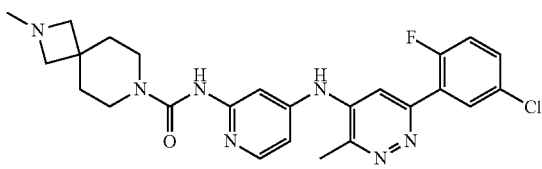 [SMILES: Cc1nnc(-c2cc(Cl)ccc2F)cc1Nc1ccnc(NC(=O)N2CCC3(CC2)CN(C)C3)c1]

Example 149 was prepared following the procedure used for the synthesis of Example 1 starting from N-(4-bromopyridin-2-yl)-2-methyl-2,7-diazaspiro[3.5]nonane-7-carboxamide (Intermediate 154, 45 mg, 0.13 mmol) and 6-(5-chloro-2-fluorophenyl)-3-methylpyridazin-4-amine (Intermediate 90, 25 mg, mmol) to afford title compound (21 mg, 0.04 mmol, 40% yield) as a white solid.

LC-MS (ESI): m/z (M+1): 496.3 (Method 2)

¹H NMR (400 MHz, Chloroform-d) δ ppm 8.10-8.21 (m, 2H), 7.84 (d, J=1.8 Hz, 1H), 7.78 (s, 1H), 7.35-7.43 (m, 1H), 7.25 (br. s, 1H), 7.12 (dd, J=10.4, 8.9 Hz, 1H), 6.88 (dd, J=5.5, 2.0 Hz, 1H), 6.18 (s, 1H), 3.42-3.50 (m, 4H), 3.07 (s, 4H), 2.73 (s, 3H), 2.36 (s, 3H), 1.77-1.85 (m, 4H).

Example 150: N-(4-{[6-(5-chloro-2-fluorophenyl)-3-methylpyridazin-4-yl]amino}pyridin-2-yl)-2-methyl-2,8-diazaspiro[4.5]decane-8-carboxamide

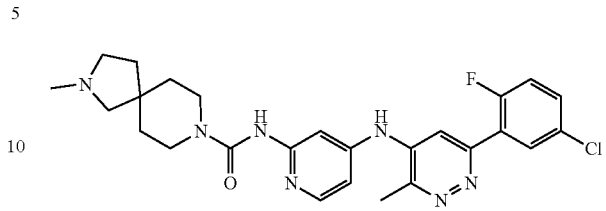

Example 150 was prepared following the procedure used for the synthesis of Example 1 starting from N-(4-bromopyridin-2-yl)-2-methyl-2,8-diazaspiro[4.5]decane-8-carboxamide (Intermediate 240, 80 mg, 0.23 mmol) and 6-(5-chloro-2-fluorophenyl)-3-methylpyridazin-4-amine (Intermediate 90, 45 mg, 0.19 mmol) to afford title compound (62 mg, 0.12 mmol, 64% yield) as an off-white solid.

LC-MS (ESI): m/z (M+1): 510.3 (Method 2)

¹H NMR (400 MHz, Chloroform-d) δ ppm 8.10-8.21 (m, 2H), 7.86 (d, J=1.8 Hz, 1H), 7.78 (s, 1H), 7.34-7.42 (m, 1H), 7.26 (br. s, 1H), 7.12 (dd, J=10.4, 8.9 Hz, 1H), 6.88 (dd, J=5.6, 1.9 Hz, 1H), 6.23 (s, 1H), 3.40-3.58 (m, 4H), 2.72 (s, 3H), 2.59 (t, J=6.9 Hz, 2H), 2.41 (s, 2H), 2.34 (s, 3H), 1.57-1.72 (m, 6H).

Example 151

N-(4-{[6-(5-chloro-2,4-difluorophenyl)-3-methylpyridazin-4-yl]amino}pyridin-2-yl)-3-(4-methylpiperazin-1-yl)propanamide

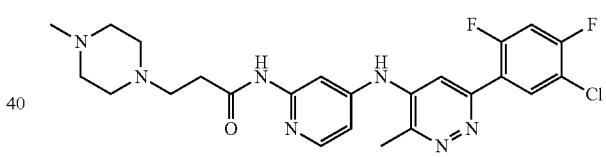

In a suitable vial, a mixture of N-{4-[(6-chloro-3-methylpyridazin-4-yl)amino]pyridin-2-yl}-3-(4-methylpiperazin-1-yl)propanamide (Intermediate 241, mg, 0.15 mmol), 2-(5-chloro-2,4-difluorophenyl)-4,4,5,5-tetramethyl-1,3,2-dioxaborolane (51 mg, 0.18 mmol), K₂CO₃ (64 mg, 0.46 mmol) and Pd(dppf)Cl₂ DCM (23 mg, 0.03 mmol) was dissolved in 1,4-Dioxane (1.28 mL)/H₂O (0.38 mL). The vial was sealed, evacuated, and backfilled with N₂ (3×), then heated at 100° C. for 1 hr. The mixture was diluted with EtOAc, filtered through a Celite® pad, washing with EtOAc. The organic phase was washed with brine, separated, filtered through a phase separator, and evaporated under vacuum. The crude material was purified by flash chromatography on Biotage silica NH cartridge (from cHex to 100% EtOAc) to afford N-(4-{[6-(5-chloro-2,4-difluorophenyl)-3-methylpyridazin-4-yl]amino}pyridin-2-yl)-3-(4-methylpiperazin-1-yl)propanamide (26 mg, 0.052 mmol, 34% yield) as a pale yellow solid.

LC-MS (ESI): m/z (M+1): 502.3 (Method 2)

¹H NMR (400 MHz, Chloroform-d) δ ppm 11.30 (s, 1H), 8.30 (t, J=8.1 Hz, 1H), 8.24 (d, J=5.5 Hz, 1H), 8.04 (d, J=2.0 Hz, 1H), 7.77 (s, 1H), 7.00-7.09 (m, 1H), 6.91 (dd, J=5.6, 2.1 Hz, 1H), 6.16 (s, 1H), 2.73-2.81 (m, 5H), 2.49-2.72 (m, 10H), 2.37 (s, 3H).

Example 152: 4-{[6-(5-chloro-2-fluorophenyl)-3-methylpyridazin-4-yl]amino}quinolin-7-yl 3-(pyrrolidin-1-yl)azetidine-1-carboxylate

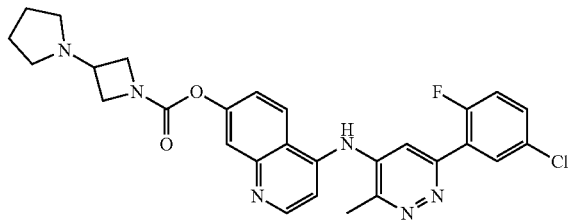 [SMILES: Cc1nnc(-c2cc(Cl)ccc2F)cc1Nc1ccnc2cc(OC(=O)N3CC(N4CCCC4)C3)ccc12]

Example 51 was prepared following the procedure used for the synthesis of Example 45 starting from 1-(azetidin-3-yl)pyrrolidine (52 mg, 0.42 mmol) and 4-{[6-(5-chloro-2-fluorophenyl)-3-methylpyridazin-4-yl]amino}quinolin-7-ol hydrobromide (Intermediate 151, 120 mg, 0.26 mmol) to afford title compound (83 mg, 0.16 mmol, 60% yield) as a yellow solid.

LC-MS (ESI): m/z (M+1): 533.2 (Method 2)

$^1$H NMR (500 MHz, Chloroform-d) δ ppm 8.84 (d, J=4.9 Hz, 1H), 8.15 (dd, J=6.7, 2.7 Hz, 1H), 7.90 (d, J=9.2 Hz, 1H), 7.87 (d, J=2.3 Hz, 1H), 7.62 (d, J=1.5 Hz, 1H), 7.45 (dd, J=9.2, 2.3 Hz, 1H), 7.38 (ddd, J=8.8, 4.3, 2.7 Hz, 1H), 7.30 (d, J=4.9 Hz, 1H), 7.09 (dd, J=10.6, 8.8 Hz, 1H), 6.50 (s, 1H), 4.02-4.43 (m, 4H), 3.39 (tt, J=7.0, 4.9 Hz, 1H), 2.86 (s, 3H), 2.53-2.60 (m, 4H), 1.88 (dt, J=6.7, 3.2 Hz, 4H).

Example 153: 4-{[6-(5-chloro-2-fluorophenyl)-3-methylpyridazin-4-yl]amino}quinolin-7-yl 4-(azetidin-1-yl)piperidine-1-carboxylate

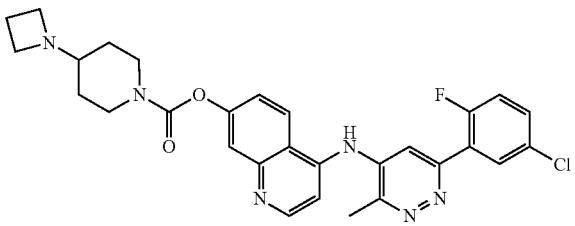 [SMILES: Cc1nnc(-c2cc(Cl)ccc2F)cc1Nc1ccnc2cc(OC(=O)N3CCC(N4CCC4)CC3)ccc12]

Example 153 was prepared following the procedure used for the synthesis of Example 114 starting from 4-{[6-(5-chloro-2-fluorophenyl)-3-methylpyridazin-4-yl]amino}quinolin-7-ol hydrobromide (Intermediate 151, 100 mg, 0.22 mmol) and 4-(azetidin-1-yl)piperidine dihydrochloride (69 mg, 0.33 mmol) to afford title compound (8 mg, 0.015 mmol, 7% yield) as a yellow solid.

LC-MS (ESI): m/z (M+1): 547.3 (Method 2)

$^1$H NMR (500 MHz, Chloroform-d) δ ppm 8.85 (d, J=4.9 Hz, 1H), 8.15 (dd, J=6.6, 2.7 Hz, 1H), 7.90 (d, J=9.2 Hz, 1H), 7.85 (d, J=2.3 Hz, 1H), 7.63 (d, J=1.1 Hz, 1H), 7.44 (dd, J=9.1, 2.3 Hz, 1H), 7.38 (ddd, J=8.7, 4.2, 2.7 Hz, 1H), 7.31 (d, J=4.9 Hz, 1H), 7.04-7.14 (m, 1H), 6.49 (s, 1H), 4.01-4.26 (m, 2H), 3.25 (br t, J=6.8 Hz, 5H), 3.10 (br t, J=10.8 Hz, 1H), 2.87 (s, 3H), 2.28 (br t, J=9.1 Hz, 1H), 2.11 (quin, J=6.9 Hz, 2H), 1.73-1.86 (m, 2H), 1.33-1.47 (m, 2H).

Example 154: N-(4-{[6-(5-chloro-2-fluorophenyl)-3-methylpyridazin-4-yl]amino}pyridin-2-yl)-2-(1,4-diazepan-1-yl)acetamide

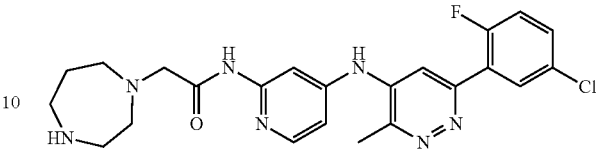

Example 154 was prepared following the procedure used for the synthesis of Example 2 starting from tert-butyl 4-{[(4-{[6-(5-chloro-2-fluorophenyl)-3-methylpyridazin-4-yl]amino}pyridin-2-yl)carbamoyl]methyl}-1,4-di azepane-1-carboxylate (Intermediate 243, 80 mg, 0.14 mmol) to afford title compound (53 mg, mmol, 80% yield).

LC-MS (ESI): m/z (M+1): 470.2 (Method 1)

$^1$H NMR (600 MHz, Chloroform-d) δ ppm 9.83 (s, 1H), 8.25 (d, J=5.6 Hz, 1H), 8.17 (dd, J=6.7, 2.7 Hz, 1H), 8.08 (d, J=2.0 Hz, 1H), 7.81 (d, J=1.2 Hz, 1H), 7.39 (ddd, J=8.8, 4.2, 2.7 Hz, 1H), 7.13 (dd, J=10.5, 8.9 Hz, 1H), 6.97 (dd, J=5.6, 2.1 Hz, 1H), 6.24 (s, 1H), 3.35 (s, 2H), 3.03 (t, J=6.2 Hz, 2H), 2.97-3.01 (m, 2H), 2.87-2.91 (m, 2H), 2.83-2.87 (m, 2H), 2.77 (s, 3H), 1.87 (quin, J=6.0 Hz, 2H).

Example 155: N-(4-{[6-(5-chloro-2-fluorophenyl)-3-methylpyridazin-4-yl]amino}pyridin-2-yl)-1-[2-(methylamino)ethyl]-1H-pyrazole-4-carboxamide

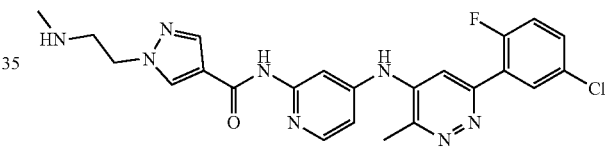

Example 155 was prepared following the procedure used for the synthesis of Example 2 starting from tert-butyl N-(2-{4-[(4-{[6-(5-chloro-2-fluorophenyl)-3-methylpyridazin-4-yl]amino}pyridin-2-yl)carbamoyl]-1H-pyrazol-1-yl}ethyl)-N-methylcarbamate (Intermediate 246, 71 mg, 0.12 mmol) to afford title compound (31 mg, 0.06 mmol, 53% yield) as a white solid.

LC-MS (ESI): m/z (M+1): 481.1 (Method 2)

$^1$H NMR (500 MHz, Chloroform-d) δ ppm 8.36 (br. s, 1H), 8.22 (d, J=5.6 Hz, 1H), 8.17 (dd, J=6.6, 2.7 Hz, 1H), 8.15 (d, J=2.1 Hz, 1H), 8.07 (s, 1H), 7.96 (s, 1H), 7.82 (d, J=1.4 Hz, 1H), 7.39 (ddd, J=8.8, 4.3, 2.7 Hz, 1H), 7.13 (dd, J=10.5, 8.9 Hz, 1H), 6.97 (dd, J=5.6, 2.2 Hz, 1H), 6.35 (s, 1H), 4.26-4.34 (m, 2H), 3.05-3.12 (m, 2H), 2.77 (s, 3H), 2.46 (s, 3H).

Example 156: N-(4-{[6-(5-chloro-2-fluorophenyl)-3-methylpyridazin-4-yl]amino}pyridin-2-yl)-1-[2-(Dimethylamino)ethyl]-1H-pyrazole-4-Carboxamide

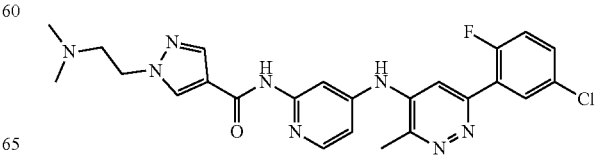

Example 156 was prepared following the procedure used for the synthesis of Example 55 starting from N-(4-{[6-(5-chloro-2-fluorophenyl)-3-methylpyridazin-4-yl]amino}pyridin-2-yl)-1-[2-(methylamino)ethyl]-1H-pyrazole-4-carb oxamide (Example 155, 20 mg, 0.04 mmol) to afford title compound (7 mg, 0.014 mmol, 34% yield) as a white solid.

LC-MS (ESI): m/z (M+1): 495.1 (Method 2)

$^1$H NMR (500 MHz, Chloroform-d) δ ppm 8.25 (s, 1H), 8.22 (d, J=5.6 Hz, 1H), 8.18 (dd, J=6.7, 2.7 Hz, 1H), 8.15 (d, J=1.9 Hz, 1H), 8.09 (s, 1H), 7.93 (s, 1H), 7.83 (d, J=1.4 Hz, 1H), 7.39 (ddd, J=8.8, 4.3, 2.7 Hz, 1H), 7.13 (dd, J=10.6, 8.8 Hz, 1H), 6.97 (dd, J=5.7, 2.1 Hz, 1H), 6.30 (s, 1H), 4.26 (t, J=6.2 Hz, 2H), 2.74-2.80 (m, 5H), 2.29 (s, 6H).

Example 157: N-(4-{[6-(5-chloro-2-fluorophenyl)-3-methylpyridazin-4-yl]amino}pyridin-2-yl)-2-(1-methylpiperidin-4-yl)acetamide

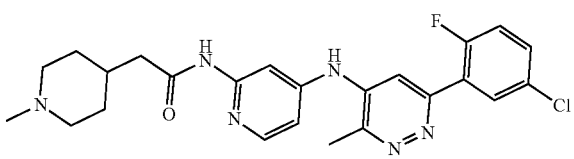 [SMILES: Cc1nnc(-c2cc(Cl)ccc2F)cc1Nc1ccnc(NC(=O)CC2CCN(C)CC2)c1]

Example 157 was prepared following the procedure used for the synthesis of Example 1 starting from N-(4-bromopyridin-2-yl)-2-(1-methylpiperidin-4-yl)acetamide (Intermediate 247, 98 mg, 0.31 mmol) and 6-(5-chloro-2-fluorophenyl)-3-methylpyridazin-4-amine (Intermediate 90, 65 mg, 0.27 mmol) to afford title compound (76 mg, 0.16 mmol, 59% yield) as an off-white solid.

LC-MS (ESI): m/z (M+1): 469.3 (Method 2)

$^1$H NMR (400 MHz, Chloroform-d) δ ppm 8.17-8.25 (m, 2H), 8.08 (d, J=1.98 Hz, 1H), 7.92 (s, 1H), 7.82 (d, J=1.32 Hz, 1H), 7.41 (ddd, J=8.75, 4.24, 2.86 Hz, 1H), 7.14 (dd, J=10.56, 8.80 Hz, 1H), 7.08-7.09 (m, 1H), 6.97 (dd, J=5.72, 2.20 Hz, 1H), 6.19 (s, 1H), 2.82-2.90 (m, 2H), 2.77 (s, 3H), 2.34 (d, J=7.04 Hz, 2H), 2.29 (s, 3H), 1.98 (d, J=2.42 Hz, 3H), 1.76-1.84 (m, 2H), 1.42 (d, J=3.30 Hz, 2H).

Example 158: N-(4-{[6-(5-chloro-2-fluorophenyl)-3-methylpyridazin-4-yl]amino}pyridin-2-yl)-4-(1,4-diazepan-1-yl)butanamide

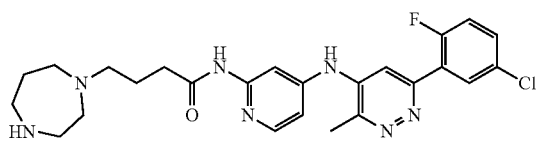 [SMILES: Cc1nnc(-c2cc(Cl)ccc2F)cc1Nc1ccnc(NC(=O)CCCN2CCCNCC2)c1]

Example 158 was prepared following the procedure used for the synthesis of Example 2 starting from tert-butyl 4-{3-[(4-{[6-(5-chloro-2-fluorophenyl)-3-methylpyridazin-4-yl]amino}pyridin-2-yl)carbamoyl]propyl}-1,4-diazepane-1-carboxylate (Intermediate 249, 70 mg, 0.12 mmol) to afford title compound (47 mg, 0.09 mmol, 81% yield) as a pale yellow solid.

LC-MS (ESI): m/z (M+1): 498.2 (Method 2)

$^1$H NMR (500 MHz, DMSO-d$_6$) δ ppm 10.33-10.47 (m, 1H), 8.75-8.92 (m, 1H), 8.13 (d, J=5.6 Hz, 1H), 8.09 (d, J=1.4 Hz, 1H), 7.98 (dd, J=6.5, 2.8 Hz, 1H), 7.71 (s, 1H), 7.58-7.63 (m, 1H), 7.42 (dd, J=10.6, 8.9 Hz, 1H), 6.96 (dd, J=5.7, 2.1 Hz, 1H), 2.76 (t, J=6.1 Hz, 2H), 2.70-2.74 (m, 2H), 2.68 (s, 3H), 2.57-2.62 (m, 2H), 2.52-2.57 (m, 2H), 2.44 (t, J=7.1 Hz, 2H), 2.38 (t, J=7.2 Hz, 2H), 1.70 (quin, J=7.1 Hz, 2H), 1.63 (quin, J=6.0 Hz, 2H).

Example 159: 4-{[6-(5-chloro-2-fluorophenyl)-3-methylpyridazin-4-yl]amino}quinolin-7-yl (1R,4R)-5-methyl-2,5-diazabicyclo[2.2.1]heptane-2-carboxylate

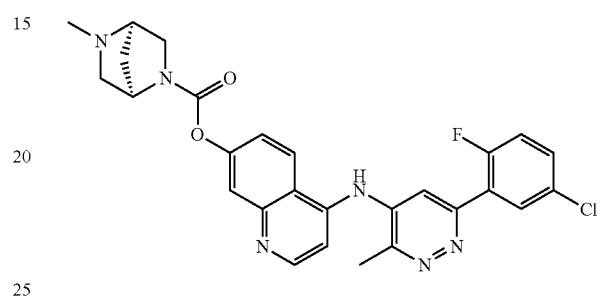

Example 159 was prepared following the procedure used for the synthesis of Example 114 starting from 4-{[6-(5-chloro-2-fluorophenyl)-3-methylpyridazin-4-yl]amino}quinolin-7-ol hydrobromide (Intermediate 151, 200 mg, 0.43 mmol) and (1R,4R)-2-methyl-2,5-diazabicyclo[2.2.1]heptane dihydrochloride (120 mg, 0.65 mmol) to afford title compound (43 mg, 0.08 mmol, 19% yield) as a yellow solid.

LC-MS (ESI): m/z (M+1): 519.2 (Method 2)

$^1$H NMR (500 MHz, Chloroform-d) δ ppm 8.80 (d, J=4.8 Hz, 1H), 8.13 (dd, J=6.3, 2.2 Hz, 1H), 7.78-7.91 (m, 2H), 7.58 (s, 1H), 7.40 (dt, J=9.1, 2.0 Hz, 1H), 7.37 (ddd, J=8.7, 4.2, 2.7 Hz, 1H), 7.24 (d, J=4.9 Hz, 1H), 7.08 (dd, J=10.5, 8.9 Hz, 1H), 6.67 (br. d, J=8.6 Hz, 1H), 4.46-4.67 (m, 1H), 3.67-3.90 (m, 1H), 3.32-3.55 (m, 2H), 2.76-3.08 (m, 5H), 2.46-2.54 (m, 3H), 1.94-2.06 (m, 1H), 1.81-1.93 (m, 1H).

Example 160: 4-{[6-(5-chloro-2-fluorophenyl)-3-methylpyridazin-4-yl]amino}quinolin-7-yl (1S,4S)-5-methyl-2,5-diazabicyclo[2.2.1]heptane-2-carboxylate

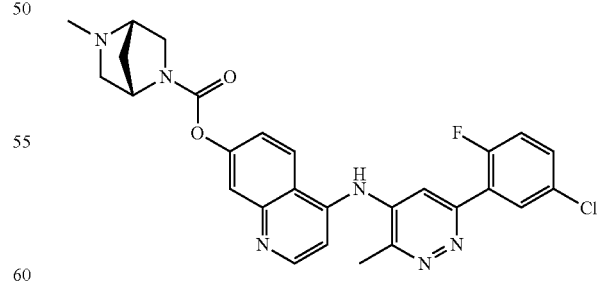

Example 160 was prepared following the procedure used for the synthesis of Example 114 starting from 4-{[6-(5-chloro-2-fluorophenyl)-3-methylpyridazin-4-yl]amino}quinolin-7-ol hydrobromide (Intermediate 151, 224 mg, 0.46 mmol) and (1S,4S)-2-methyl-2,5-diazabicyclo[2.2.1]heptane dihydrobromide (192 mg, 0.70 mmol) to afford title compound (42 mg, 0.08 mmol, 17% yield) as a yellow solid.

LC-MS (ESI): m/z (M+1): 519.2 (Method 2)

$^1$H NMR (500 MHz, Chloroform-d) δ ppm 8.81 (d, J=4.9 Hz, 1H), 8.14 (dd, J=6.4, 2.4 Hz, 1H), 7.79-7.91 (m, 2H), 7.59 (s, 1H), 7.39-7.45 (m, 1H), 7.37 (ddd, J=8.8, 4.2, 2.8 Hz, 1H), 7.26 (d, J=5.1 Hz, 1H), 7.08 (dd, J=10.5, 8.9 Hz, 1H), 6.58-6.69 (m, 1H), 4.47-4.67 (m, 1H), 3.69-3.87 (m, 1H), 3.32-3.56 (m, 2H), 2.74-3.09 (m, 5H), 2.45-2.54 (m, 3H), 1.80-2.05 (m, 2H).

Example 161: N-(4-{[6-(5-chloro-2-fluorophenyl)-3-methylpyridazin-4-yl]amino}pyridin-2-yl)-4-(4-methyl-1,4-diazepan-1-yl)butanamide

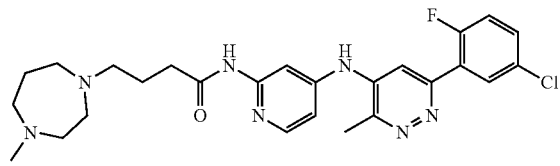 [SMILES: Cc1nnc(-c2cc(Cl)ccc2F)cc1Nc1ccnc(NC(=O)CCCN2CCCN(C)CC2)c1]

Example 161 was prepared following the procedure used for the synthesis of Example 55 starting from N-(4-{[6-(5-chloro-2-fluorophenyl)-3-methylpyridazin-4-yl]amino}pyridin-2-yl)-4-(1,4-diazepan-1-yl)butanamide (Example 158, 30 mg, mmol) to afford title compound (7 mg, 0.014 mmol, 23% yield) as a yellow solid.

LC-MS (ESI): m/z (M+1): 512.0 (Method 2)

$^1$H NMR (500 MHz, DMSO-d$_6$) δ ppm 10.39 (s, 1H), 8.83 (s, 1H), 8.13 (d, J=5.6 Hz, 1H), 8.09 (d, J=1.5 Hz, 1H), 7.98 (dd, J=6.6, 2.7 Hz, 1H), 7.71 (s, 1H), 7.56-7.65 (m, 1H), 7.42 (dd, J=10.5, 8.9 Hz, 1H), 6.96 (dd, J=5.6, 2.1 Hz, 1H), 2.68 (s, 3H), 2.55-2.61 (m, 4H), 2.44-2.48 (m, 4H), 2.41 (t, J=7.1 Hz, 2H), 2.34-2.39 (m, 2H), 2.19 (s, 3H), 1.60-1.76 (m, 4H).

Example 162: Cis N-(4-{[6-(5-chloro-2-fluorophenyl)-3-Methylpyridazin-4-yl]amino}pyridin-2-yl)-3-(4-methylpiperazin-1-yl)cyclobutane-1-Carboxamide

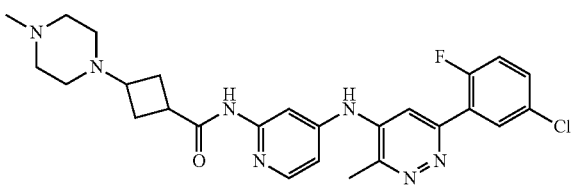 [SMILES: Cc1nnc(-c2cc(Cl)ccc2F)cc1Nc1ccnc(NC(=O)C2CC(N3CCN(C)CC3)C2)c1]

Example 162 was prepared following the procedure used for the synthesis of Example 1 starting from cis N-(4-bromopyridin-2-yl)-3-(4-methylpiperazin-1-yl)cyclobutane-1-carboxamide (Intermediate 298, 219 mg, 0.62 mmol), and 6-(5-chloro-2-fluorophenyl)-3-methylpyridazin-4-amine (Intermediate 90, 122 mg, 0.51 mmol) to afford title compound (96 mg, 0.19 mmol, 37% yield) as a white solid.

LC-MS (ESI): m/z (M+1): 510.3 (Method 1)

$^1$H NMR (500 MHz, Chloroform-d) δ ppm 8.93 (br s, 1H), 8.19 (d, J=5.6 Hz, 1H), 8.16 (dd, J=6.6, 2.7 Hz, 1H), 8.03 (d, J=1.9 Hz, 1H), 7.79 (d, J=1.4 Hz, 1H), 7.36-7.42 (m, 1H), 7.12 (dd, J=10.4, 8.8 Hz, 1H), 6.95 (dd, J=5.7, 2.1 Hz, 1H), 6.31 (s, 1H), 2.91 (quin, J=8.3 Hz, 1H), 2.81 (quin, J=7.2 Hz, 1H), 2.76 (s, 3H), 2.41-2.50 (m, 2H), 2.35-2.72 (m, 8H), 2.31-2.36 (m, 3H), 2.19-2.29 (m, 2H).

Example 163: N-(4-{[6-(5-chloro-2-fluorophenyl)-3-methylpyridazin-4-yl]amino}pyridin-2-yl)-3-[2-(hydroxymethyl)-4-methylpiperazin-1-yl]propanamide

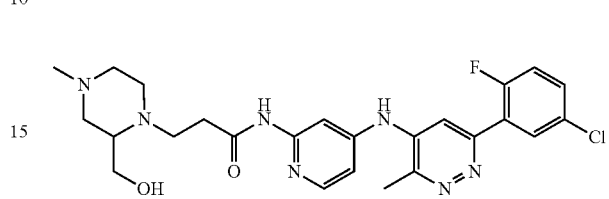

Example 163 was prepared following the procedure used for the synthesis of Example 55 starting from N-(4-{[6-(5-chloro-2-fluorophenyl)-3-methylpyridazin-4-yl]amino}pyridin-2-yl)-3-[2-(hydroxymethyl)piperazin-1-yl]propanamide (Intermediate 252, 30 mg, 0.06 mmol) to afford title compound (27 mg, 0.05 mmol, 67% yield) as a white solid.

LC-MS (ESI): m/z (M+1): 514.2 (Method 1)

$^1$H NMR (400 MHz, DMSO-d$_6$) δ ppm 10.59 (s, 1H), 8.85 (s, 1H), 8.14 (d, J=5.6 Hz, 1H), 8.07 (d, J=1.1 Hz, 1H), 7.98 (dd, J=6.6, 2.7 Hz, 1H), 7.71 (s, 1H), 7.57-7.64 (m, 1H), 7.42 (dd, J=10.5, 8.9 Hz, 1H), 6.97 (dd, J=5.6, 2.0 Hz, 1H), 4.41 (br t, J=5.0 Hz, 1H), 3.55-3.64 (m, 1H), 3.38 (dt, J=10.5, 5.3 Hz, 1H), 3.01-3.12 (m, 1H), 2.74-2.82 (m, 1H), 2.68 (s, 3H), 2.53-2.64 (m, 3H), 2.46 (br. d, J=6.9 Hz, 2H), 2.35-2.41 (m, 1H), 2.27-2.34 (m, 1H), 2.12 (s, 3H), 2.02-2.10 (m, 1H), 1.91-2.00 (m, 1H).

Example 164: N-(4-{[6-(5-chloro-2-fluorophenyl)-3-methylpyridazin-4-yl]amino}pyridin-2-yl)-2-(piperazin-1-yl)acetamide

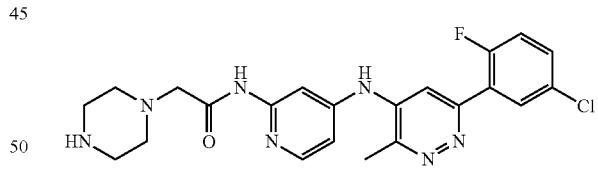

Example 164 was prepared following the procedure used for the synthesis of Example 2 starting from tert-butyl 4-{[(4-{[6-(5-chloro-2-fluorophenyl)-3-methylpyridazin-4-yl]amino}pyridin-2-yl)carbamoyl]methyl}piperazine-1-carboxylate (Intermediate 253, 55 mg, 0.10 mmol) to afford title compound (23 mg, mmol, 52% yield) as a pale yellow solid.

LC-MS (ESI): m/z (M+1): 456.1 (Method 2)

$^1$H NMR (500 MHz, DMSO-d$_6$) δ ppm 9.84 (s, 1H), 8.91 (s, 1H), 8.15 (d, J=5.6 Hz, 1H), 8.06 (d, J=1.9 Hz, 1H), 7.98 (dd, J=6.6, 2.7 Hz, 1H), 7.73 (s, 1H), 7.55-7.67 (m, 1H), 7.43 (dd, J=10.6, 8.9 Hz, 1H), 7.01 (dd, J=5.6, 2.1 Hz, 1H), 3.14 (s, 2H), 2.79 (t, J=4.8 Hz, 4H), 2.68 (s, 3H), 2.45-2.56 (m, 4H).

Example 165: Methyl 4-{[6-(5-chloro-2-fluorophenyl)-3-(hydroxymethyl)pyridazin-4-yl]amino}-7-[2-(4-methylpiperazin-1-yl)ethoxy]quinoline-6-carboxylate

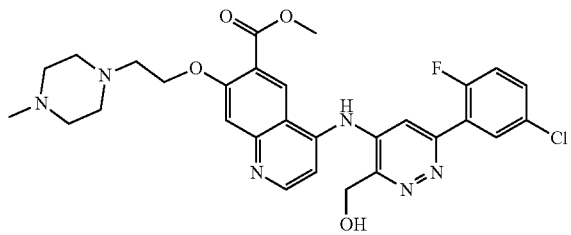 [SMILES: COC(=O)c1cc2c(Nc3cc(-c4cc(Cl)ccc4F)nnc3CO)ccnc2cc1OCCN1CCN(C)CC1]

Example 165 was prepared following the procedure used for the synthesis of Example 174 starting from methyl 4-[(3-{[(tert-butyldimethylsilyl)oxy]methyl}-6-(5-chloro-2-fluorophenyl)pyridazin-4-yl)amino]-7-[2-(4-methylpiperazin-1-yl)ethoxy]quinoline-6-carboxylate (Intermediate 299, 40 mg, 0.06 mmol) to afford title compound (10 mg, 0.02 mmol, 30% yield) as a pale yellow solid.

LC-MS (ESI): m/z (M+1): 581.3 (Method 2)

$^1$H NMR (500 MHz, Chloroform-d) δ ppm 9.16 (s, 1H), 8.69 (d, J=5.1 Hz, 1H), 8.30 (s, 1H), 8.20 (dd, J=6.7, 2.7 Hz, 1H), 8.07 (d, J=1.0 Hz, 1H), 7.43 (ddd, J=8.8, 4.3, 2.7 Hz, 1H), 7.29 (s, 1H), 7.26 (d, J=5.2 Hz, 1H), 7.16 (dd, J=10.5, 8.9 Hz, 1H), 5.33 (s, 2H), 5.08 (br s, 1H), 4.21 (t, J=5.4 Hz, 2H), 3.90 (s, 3H), 2.96 (t, J=5.3 Hz, 2H), 2.39-2.90 (m, 8H), 2.34 (s, 3H).

Example 166: N-(4-{[6-(5-chloro-2-fluorophenyl)-3-methylpyridazin-4-yl]amino}pyridin-2-yl)-2-(4-methyl-1,4-diazepan-1-yl)acetamide

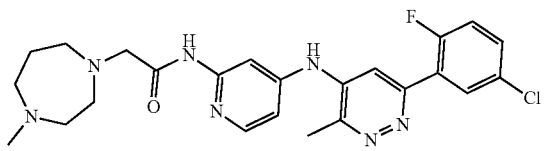 [SMILES: Cc1nnc(-c2cc(Cl)ccc2F)cc1Nc1ccnc(NC(=O)CN2CCCN(C)CC2)c1]

Example 166 was prepared following the procedure used for the synthesis of Example 55 starting from N-(4-{[6-(5-chloro-2-fluorophenyl)-3-methylpyridazin-4-yl]amino}pyridin-2-yl)-2-(1,4-diazepan-1-yl)acetamide (Example 154, 30 mg, 0.06 mmol) to afford title compound (13 mg, 0.03 mmol, 42% yield) as a white solid.

LC-MS (ESI): m/z (M+1): 484.3 (Method 1)

$^1$H NMR (600 MHz, Chloroform-d) δ ppm 9.77 (s, 1H), 8.25 (d, J=5.6 Hz, 1H), 8.17 (dd, J=6.6, 2.6 Hz, 1H), 8.08 (d, J=2.0 Hz, 1H), 7.81 (d, J=1.3 Hz, 1H), 7.39 (ddd, J=8.7, 4.3, 2.8 Hz, 1H), 7.13 (dd, J=10.5, 8.9 Hz, 1H), 6.97 (dd, J=5.8, 2.1 Hz, 1H), 6.21 (s, 1H), 3.32 (s, 2H), 2.85-2.94 (m, 4H), 2.76 (s, 3H), 2.66-2.75 (m, 4H), 2.42 (s, 3H), 1.91 (quin, J=5.9 Hz, 2H).

Example 167: N-4-[6-(5-chloro-2-fluorophenyl)-3-methylpyridazin-4-yl]-N-2-{1-[2-(4-methylpiperazin-1-yl)ethyl]-1H-pyrazol-3-yl}Pyridine-2,4-Diamine

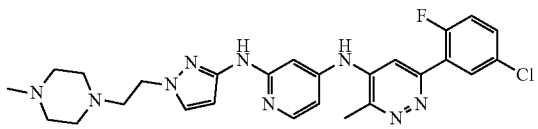 [SMILES: Cc1nnc(-c2cc(Cl)ccc2F)cc1Nc1ccnc(Nc2ccn(CCN3CCN(C)CC3)n2)c1]

Example 167 was prepared following the procedure used for the synthesis of Example 3 starting from 4-chloro-N-{1-[2-(4-methylpiperazin-1-yl)ethyl]-1H-pyrazol-3-yl}pyridin-2-amine (Intermediate 256, 16 mg, 0.05 mmol) and 6-(5-chloro-2-fluorophenyl)-3-methylpyridazin-4-amine (Intermediate 90, 12 mg, 0.05 mmol) in 1,2-dimethoxyethane at 140° C. for 5 hrs, then at 150° C. for 3 hrs to afford title compound (4.5 mg, 0.01 mmol, 17% yield) as a white solid.

LC-MS (ESI): m/z (M+1): 522.3 (Method 2)

$^1$H NMR (400 MHz, Chloroform-d) δ ppm 8.06-8.21 (m, 2H), 7.80 (s, 1H), 7.39 (ddd, J=8.7, 4.1, 3.0 Hz, 1H), 7.36 (d, J=2.4 Hz, 1H), 7.25 (d, J=1.5 Hz, 1H), 7.11 (dd, J=10.3, 9.0 Hz, 1H), 6.90 (br. s, 1H), 6.59 (dd, J=5.7, 1.8 Hz, 1H), 6.10 (br. s, 1H), 6.05 (d, J=2.2 Hz, 1H), 4.05 (t, J=6.6 Hz, 2H), 2.66-2.81 (m, 5H), 2.31-2.66 (m, 8H), 2.29 (s, 3H).

Example 168: 1-(4-{[6-(5-chloro-2-fluorophenyl)-3-methylpyridazin-4-yl]amino}quinolin-7-yl 3-Oxetan-3-yl) 3-Oxetan-3-yl 4-[2-(1-methylpyridazin-4-yl)ethyl]piperazine-1,3-dicarboxylate

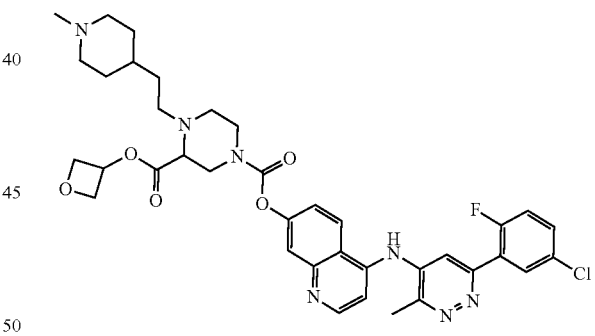

Step 1: To a stirred solution of 1-tert-butyl 3-oxetan-3-yl 4-[2-(1-methylpiperidin-4-yl)ethyl]piperazine-1,3-dicarboxylate (Intermediate 259, 368 mg, 0.89 mmol) in DCM (3.5 mL), at RT, TFA (1.7 mL, 22.2 mmol) was added portion-wise and the resulting reaction mixture was stirred at RT for 2 hrs. The mixture was concentrated under reduced pressure to afford 4-[2-(1-methylpiperidin-1-ium-4-yl)ethyl]-3-[(oxetan-3-yloxy)carbonyl]piperazine-1,4-diium trifluoroacetate (584 mg) that was used as such.

Step 2: To a stirred mixture of 4-[2-(1-methylpiperidin-1-ium-4-yl)ethyl]-3-[(oxetan-3-yloxy)carbonyl]piperazine-1,4-diium trifluoroacetate (from Step 1, 276 mg, 0.42 mmol), 4-{[6-(5-chloro-2-fluorophenyl)-3-methylpyridazin-4-yl]amino}quinolin-7-ol hydrobromide (Intermediate 151, 130 mg, 0.28 mmol), DIPEA (0.54 mL, 3.1 mmol) in DCM (7 mL) and DMSO (0.700 mL) at 0° C. and under a N₂, 4-nitrophenyl carbonochloridate (85 mg, 0.42 mmol) was added portion-wise. The ice-bath was removed, and the resulting reaction mixture was stirred at RT. After 6 hrs the reaction mixture was cooled to 0° C., further 4-[2-(1-methylpiperidin-1-ium-4-yl)ethyl]-3-[(oxetan-3-yloxy) carbonyl]piperazine-1,4-diium trifluoroacetate (280 mg) and 4-nitrophenyl carbonochloridate (85 mg) were subsequently added, the ice-bath was removed and the reaction mixture was stirred at RT overnight. The reaction mixture was diluted with DCM and washed with a saturated solution of NaHCO₃ and water. The organic phase was dried over Na₂SO₄, filtered, and the solvent removed under reduced pressure. The crude material was purified by flash chromatography on Biotage silica NH cartridge (from DCM to 3% MeOH); proper fraction were collected and purified by basic HPLC preparative, then further purified by flash chromatography on Biotage silica NH cartridge (from DCM to 3% MeOH) to afford 1-(4-{[6-(5-chloro-2-fluorophenyl)-3-methylpyridazin-4-yl]amino}quinolin-7-yl) 3-oxetan-3-yl 4-[2-(1-methylpiperidin-4-yl)ethyl]piperazine-1,3-dicarboxylate (19 mg, 0.03 mmol, 9% yield) as a yellow solid.

LC-MS (ESI): m/z (M+1): 718.4 (Method 2)

¹H NMR (400 MHz, Chloroform-d) δ ppm 8.84 (d, J=5.0 Hz, 1H), 8.15 (dd, J=6.7, 2.7 Hz, 1H), 7.90 (d, J=9.0 Hz, 1H), 7.85 (br. d, J=3.5 Hz, 1H), 7.62 (s, 1H), 7.34-7.46 (m, 2H), 7.30 (d, J=4.8 Hz, 1H), 7.09 (dd, J=10.4, 8.9 Hz, 1H), 6.54 (br. s, 1H), 5.39-5.60 (m, 1H), 4.77-4.96 (m, 2H), 4.54-4.74 (m, 2H), 4.15-4.41 (m, 1H), 3.87-4.13 (m, 1H), 3.49-3.54 (m, 1H), 3.09-3.80 (m, 3H), 2.79-2.91 (m, 5H), 2.66-2.77 (m, 1H), 2.53-2.65 (m, 2H), 2.27 (s, 3H), 1.92 (br t, J=10.6 Hz, 2H), 1.54-1.77 (m, 2H), 1.40-1.52 (m, 2H), 1.30 (br. s, 3H).

Example 169: Methyl 4-{[6-(5-chloro-2-fluorophenyl)-3-methylpyridazin-4-yl]amino}-7-[2-(4-methylpiperazin-1-yl)ethoxy]quinoline-6-carboxylate

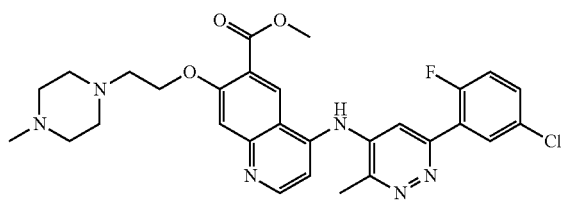 [SMILES: COC(=O)c1cc2c(Nc3cc(-c4cc(Cl)ccc4F)nnc3C)ccnc2cc1OCCN1CCN(C)CC1]

Example 169 was prepared following the procedure used for the synthesis of Example 3 starting from methyl 4-chloro-7-[2-(4-methylpiperazin-1-yl)ethoxy]quinoline-6-carboxylate (Intermediate 261, 92 mg, 0.25 mmol) and 6-(5-chloro-2-fluorophenyl)-3-methylpyridazin-4-amine (Intermediate 90, 50 mg, 0.21 mmol) in 1,2-dimethoxyethane at 120° C. for 4 hrs, to afford title compound (50 mg, mmol, 42% yield) as a yellow solid.

LC-MS (ESI): m/z (M+1): 567.2 (Method 2)

¹H NMR (500 MHz, Chloroform-d) δ ppm 8.80 (br. d, J=4.9 Hz, 1H), 8.40 (s, 1H), 8.16 (dd, J=6.7, 2.7 Hz, 1H), 7.70 (s, 1H), 7.53 (s, 1H), 7.35-7.41 (m, 1H), 7.21 (br. d, J=4.9 Hz, 1H), 7.10 (dd, J=10.5, 8.9 Hz, 1H), 6.56-6.68 (m, 1H), 4.34 (br t, J=5.4 Hz, 2H), 3.95 (s, 3H), 2.96 (br t, J=5.4 Hz, 2H), 2.87 (s, 3H), 2.36-2.82 (m, 8H), 2.31 (s, 3H).

Example 170

N-(4-{[6-(5-chloro-2-fluorophenyl)-3-methylpyridazin-4-yl]amino}pyridin-2-yl)-3-[3-(hydroxymethyl)-4-ylpiperazin-1-yl]propanamide

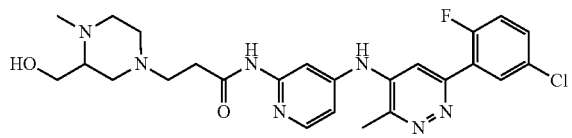 [SMILES: Cc1nnc(-c2cc(Cl)ccc2F)cc1Nc1ccnc(NC(=O)CCN2CCN(C)C(CO)C2)c1]

Example 170 was prepared following the procedure used for the synthesis of Example 1 starting from N-(4-bromopyridin-2-yl)-3-[3-(hydroxymethyl)-4-methylpiperazin-1-yl]propanamide (Intermediate 264, 169 mg, 0.47 mmol) and 6-(5-chloro-2-fluorophenyl)-3-methylpyridazin-4-amine (Intermediate 90, 90 mg, 0.38 mmol) in 1,2-dimethoxyethane to afford title compound (62 mg, 0.12 mmol, 32% yield) as a white foam.

LC-MS (ESI): m/z (M+1): 514.1 (Method 1)

¹H NMR (400 MHz, DMSO-d₆) δ ppm 10.65 (s, 1H), 8.85 (s, 1H), 8.14 (d, J=5.7 Hz, 1H), 8.08 (d, J=1.3 Hz, 1H), 7.98 (dd, J=6.6, 2.6 Hz, 1H), 7.71 (s, 1H), 7.57-7.64 (m, 1H), 7.42 (dd, J=10.4, 8.9 Hz, 1H), 6.97 (dd, J=5.6, 2.1 Hz, 1H), 4.44 (br. s, 1H), 3.51-3.61 (m, 1H), 3.26 (dt, J=10.4, 5.5 Hz, 1H), 2.88 (br. d, J=10.7 Hz, 1H), 2.68 (s, 3H), 2.62-2.77 (m, 2H), 2.51-2.62 (m, 4H), 2.18 (s, 3H), 2.02-2.17 (m, 2H), 1.96-2.03 (m, 1H), 1.79-1.90 (m, 1H).

Example 171: Methyl 4-{[6-(5-chloro-2-fluorophenyl)pyridazin-4-yl]amino}-7-[2-(4-methylpiperazin-1-yl)ethoxy]quinoline-6-carboxylate

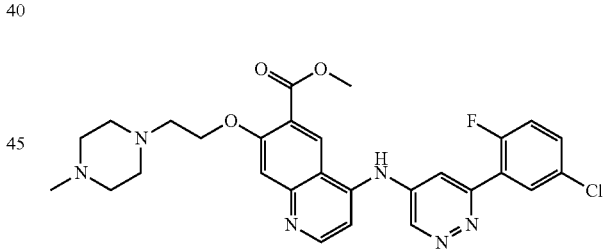

Example 171 was prepared following the procedure used for the synthesis of Example 3 starting from methyl 4-chloro-7-[2-(4-methylpiperazin-1-yl)ethoxy]quinoline-6-carboxylate (Intermediate 261, 156 mg, 0.43 mmol) and 6-(5-chloro-2-fluorophenyl)pyridazin-4-amine (Intermediate 3, 80 mg, 0.36 mmol) in 1,2-dimethoxyethane at 120° C. for 4 hrs, to afford title compound (140 mg, 0.25 mmol, 71% yield) as yellow solid.

LC-MS (ESI): m/z (M+1): 551.2 (Method 2)

¹H NMR (600 MHz, Chloroform-d) δ ppm 9.18 (d, J=2.6 Hz, 1H), 8.81 (d, J=4.9 Hz, 1H), 8.48 (s, 1H), 8.20 (dd, J=6.7, 2.7 Hz, 1H), 7.74 (s, 1H), 7.51 (s, 1H), 7.42 (ddd, J=8.7, 4.1, 2.8 Hz, 1H), 7.33 (d, J=5.1 Hz, 1H), 7.25 (br. s, 1H), 7.15 (dd, J=10.5, 8.9 Hz, 1H), 4.34 (t, J=5.5 Hz, 2H), 3.95 (s, 3H), 2.96 (t, J=5.6 Hz, 2H), 2.70 (br. s, 4H), 2.50 (br. s, 4H), 2.31 (s, 3H).

Example 172: N-(4-{[6-(5-chloro-2-fluorophenyl)-3-methylpyridazin-4-yl]amino}pyridin-2-yl)-2-(4-methylpiperazin-1-yl)acetamide

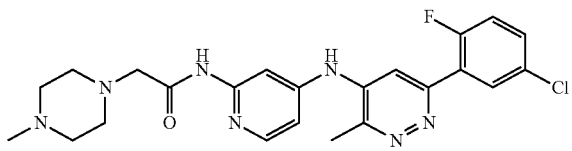 [SMILES: Cc1nnc(-c2cc(Cl)ccc2F)cc1Nc1ccnc(NC(=O)CN2CCN(C)CC2)c1]

Example 172 was prepared following the procedure used for the synthesis of Example 1 starting from N-(4-bromopyridin-2-yl)-2-(4-methylpiperazin-1-yl)acetamide (Intermediate 265, 87 mg, 0.28 mmol) and 6-(5-chloro-2-fluorophenyl)-3-methylpyridazin-4-amine (Intermediate 90, 60 mg, 0.25 mmol) to afford title compound (52 mg, 0.11 mmol, 44% yield) as an off-white solid.

LC-MS (ESI): m/z (M+1): 470.4 (Method 2)

$^1$H NMR (400 MHz, Chloroform-d) δ ppm 9.64 (s, 1H), 8.25 (d, J=5.7 Hz, 1H), 8.17 (dd, J=6.7, 2.7 Hz, 1H), 8.08 (d, J=2.1 Hz, 1H), 7.81 (d, J=1.3 Hz, 1H), 7.39 (ddd, J=8.8, 4.2, 2.7 Hz, 1H), 7.13 (dd, J=10.6, 8.8 Hz, 1H), 6.98 (dd, J=5.7, 2.2 Hz, 1H), 6.23 (s, 1H), 3.19 (s, 2H), 2.77 (s, 3H), 2.68 (br. s, 4H), 2.56 (br. s, 4H), 2.34 (s, 3H).

Example 173

N-(4-{[6-(5-chloro-2-fluorophenyl)-3-cyclopropylpyridazin-4-yl]amino}pyridin-2-yl)-3-(4-methylpiperazin-1-yl)propanamide

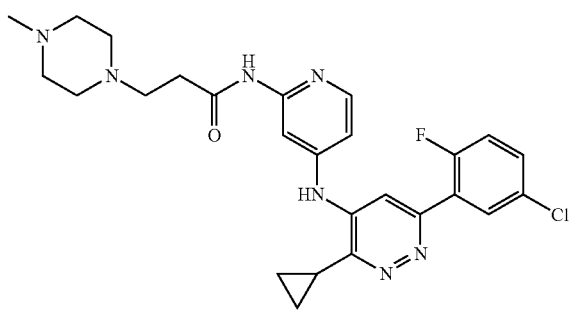 [SMILES: CN1CCN(CCC(=O)Nc2cc(Nc3cc(-c4cc(Cl)ccc4F)nnc3C3CC3)ccn2)CC1]

Example 173 was prepared following the procedure used for the synthesis of Example 1 starting from N-(4-bromopyridin-2-yl)-3-(4-methylpiperazin-1-yl)propanamide (Intermediate 32, 75 mg, 0.23 mmol) and 6-(5-chloro-2-fluorophenyl)-3-cyclopropylpyridazin-4-amine (Intermediate 267, 55 mg, 0.21 mmol) to afford title compound (40 mg, 0.08 mmol, 37% yield) as a white foam.

LC-MS (ESI): m/z (M+1): 510.2 (Method 1)

$^1$H NMR (500 MHz, Chloroform-d) δ ppm 11.23 (s, 1H), 8.23 (d, J=5.6 Hz, 1H), 8.19 (dd, J=6.7, 2.7 Hz, 1H), 8.03 (d, J=2.1 Hz, 1H), 7.80 (d, J=1.4 Hz, 1H), 7.34-7.42 (m, 1H), 7.12 (dd, J=10.6, 8.8 Hz, 1H), 6.95 (dd, J=5.6, 2.2 Hz, 1H), 6.65 (s, 1H), 2.73-2.81 (m, 2H), 2.54-2.59 (m, 2H), 2.44-2.92 (m, 8H), 2.37 (s, 3H), 2.00-2.08 (m, 1H), 1.33-1.40 (m, 2H), 1.17-1.24 (m, 2H).

Example 174

N-(4-{[6-(5-chloro-2-fluorophenyl)-3-(hydroxymethyl)pyridazin-4-yl]amino}pyridin-2-yl)-3-(4-methylpiperazin-1-yl)propanamide

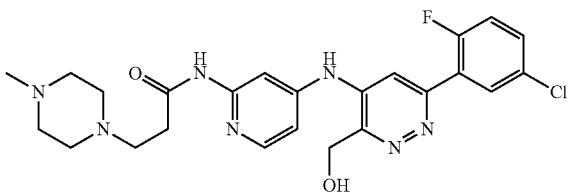 [SMILES: CN1CCN(CCC(=O)Nc2cc(Nc3cc(-c4cc(Cl)ccc4F)nnc3CO)ccn2)CC1]

Tetrabutylammonium fluoride (0.23 mL, 0.23 mmol) was added to a stirred solution of N-{4-[(3-{[(tert-butyldimethylsilyl)oxy]methyl}-6-(5-chloro-2-fluorophenyl)pyridazin-4-yl)amino]pyridin-2-yl}-3-(4-methylpiperazin-1-yl)propanamide (Intermediate 273, 100 mg, 0.15 mmol) in THF (5 mL) at RT under N$_2$. After 1 hr the solvent was removed by reduced pressure, the residue was purified by flash chromatography on Biotage silica NH cartridge (from DCM to 5% MeOH/0.5% H$_2$O). Proper fractions were collected and evaporated to obtain a solid that was treated with H$_2$O and extracted with DCM, organic layer was washed with H$_2$O, separated, dried over Na$_2$SO$_4$, filtered, and evaporated to afford N-(4-{[6-(5-chloro-2-fluorophenyl)-3-(hydroxymethyl)pyridazin-4-yl]amino}pyridin-2-yl)-3-(4-methylpiperazin-1-yl)propanamide (40 mg, 0.08 mmol, 52% yield) as a white solid.

LC-MS (ESI): m/z (M+1): 500.4 (Method 2)

$^1$H NMR (400 MHz, DMSO-d$_6$) δ ppm 10.66 (s, 1H), 8.62-9.03 (m, 1H), 8.17 (d, J=5.7 Hz, 1H), 8.07 (d, J=1.5 Hz, 1H), 7.99 (dd, J=6.5, 2.7 Hz, 1H), 7.79 (s, 1H), 7.57-7.68 (m, 1H), 7.44 (dd, J=10.4, 8.9 Hz, 1H), 7.02 (dd, J=5.6, 2.1 Hz, 1H), 5.79 (s, 1H), 4.95 (s, 2H), 2.60 (br. d, J=6.1 Hz, 2H), 2.53 (br. d, J=6.2 Hz, 2H), 2.18-2.49 (m, 8H), 2.14 (s, 3H).

Example 175: Methyl N-[2-(4-{[(4-{[6-(5-chloro-2-fluorophenyl)-3-(hydroxymethyl)pyridazin-4-yl]amino}pyridin-2-yl)carbamoyl]methyl}piperazin-1-yl)ethyl]-N-methylcarbamate

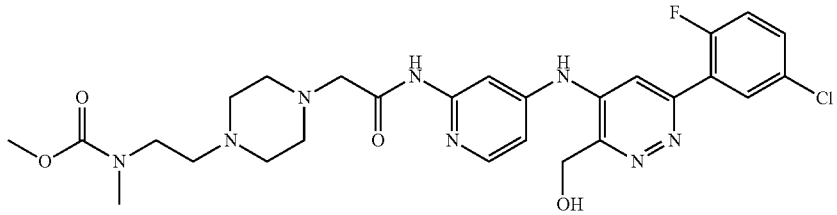 [SMILES: COC(=O)N(C)CCN1CCN(CC(=O)Nc2cc(Nc3cc(-c4cc(Cl)ccc4F)nnc3CO)ccn2)CC1]

Example 175 was prepared following the procedure used for the synthesis of Example 174 starting from methyl N-[2-[4-[2-[[4-[[3-[[tert-butyl (dimethyl)silyl]oxymethyl]-6-(5-chloro-2-fluorophenyl)pyridazin-4-yl]amino]pyridin-2-yl]amino]-2-oxoethyl]piperazin-1-yl]ethyl]-N-methylcarbamate (Intermediate 276, 20 mg, 0.03 mmol) to afford title compound (16 mg, 0.03 mmol, 96% yield) as a white solid.

LC-MS (ESI): m/z (M+1): 587.3 (Method 1)

$^1$H NMR (400 MHz, Chloroform-d) δ ppm 9.61 (s, 1H), 8.23 (d, J=5.7 Hz, 1H), 8.12 (dd, J=6.6, 2.9 Hz, 1H), 8.09 (d, J=2.0 Hz, 2H), 7.89 (s, 1H), 7.40 (ddd, J=8.7, 4.2, 2.9 Hz, 1H), 7.14 (dd, J=10.4, 8.9 Hz, 1H), 6.94 (dd, J=5.7, 2.0 Hz, 1H), 5.20 (s, 2H), 3.70 (s, 3H), 3.24-3.57 (m, 3H), 3.17 (s, 2H), 2.84-3.03 (m, 3H), 2.43-2.75 (m, 10H).

Example 176: N-(4-{[6-(5-chloro-2-fluorophenyl)-3-(hydroxymethyl)pyridazin-4-yl]amino}pyridin-2-yl)-2-(4-methylpiperazin-1-yl)acetamide

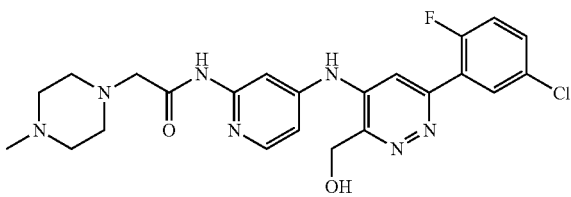 [SMILES: CN1CCN(CC(=O)Nc2cc(Nc3cc(-c4cc(Cl)ccc4F)nnc3CO)ccn2)CC1]

Example 176 was prepared following the procedure used for the synthesis of Example 174 starting from N-{4-[(3-{[(tert-butyldimethylsilyl)oxy]methyl}-6-(5-chloro-2-fluorophenyl)pyridazin-4-yl)amino]pyridin-2-yl}-2-(4-methylpiperazin-1-yl)acetamide (Intermediate 277, 56 mg, 0.09 mmol) to afford title compound (18 mg, 0.04 mmol, 40% yield) as a pale yellow solid.

LC-MS (ESI): m/z (M+1): 486.2 (Method 1)

$^1$H NMR (500 MHz, DMSO-d$_6$) δ ppm 9.86 (s, 1H), 8.90 (s, 1H), 8.17 (d, J=5.6 Hz, 1H), 8.05 (d, J=2.1 Hz, 1H), 7.98 (dd, J=6.6, 2.7 Hz, 1H), 7.81 (s, 1H), 7.59-7.66 (m, 1H), 7.44 (dd, J=10.5, 8.9 Hz, 1H), 7.06 (dd, J=5.7, 2.1 Hz, 1H), −5.97 (m, 1H), 4.95 (s, 2H), 3.16 (s, 2H), 2.52-2.61 (m, 4H), 2.27-2.45 (m, 4H), 2.18 (s, 3H).

Example 177: [6-(5-chloro-2-fluorophenyl)-4-({7-[2-(4-methylpiperazin-1-yl)ethoxy]quinolin-4-yl}amino)pyridazin-3-yl]methanol

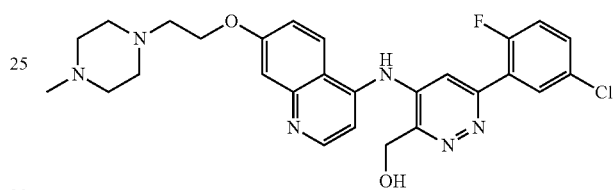

Example 177 was prepared following the procedure used for the synthesis of Example 174 starting from N-(3-{[(tert-butyldimethylsilyl)oxy]methyl}-6-(5-chloro-2-fluorophenyl)pyridazin-4-yl)-7-[2-(4-methylpiperazin-1-yl)ethoxy]quinolin-4-amine (Intermediate 279, 70 mg, 0.07 mmol) to afford title compound (30 mg, 0.06 mmol, 80% yield) as a pale yellow solid.

LC-MS (ESI): m/z (M+1): 523.3 (Method 2)

$^1$H NMR (400 MHz, DMSO-d$_6$) δ ppm 9.24 (br. s, 1H), 7.96 (dd, J=6.6, 2.6 Hz, 1H), 7.91 (br. d, J=8.6 Hz, 1H), 7.67 (br. s, 1H), 7.64-8.88 (m, 1H), 7.61 (dt, J=8.8, 3.6 Hz, 1H), 6.33 (br. s, 1H), 5.74-7.50 (m, 4H), 5.09 (br. s, 2H), 4.25 (br. s, 2H), 2.76 (t, J=5.6 Hz, 2H), 2.23-2.62 (m, 8H), 2.15 (s, 3H).

Example 178: N-(4-{[6-(5-chloro-2-fluorophenyl)-3-(hydroxymethyl)pyridazin-4-yl]amino}pyridin-2-yl)-2-(4-methyl-1,4-diazepan-1-yl)acetamide

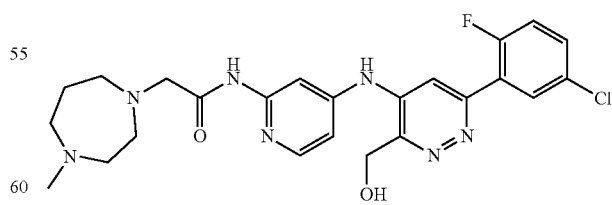

Example 178 was prepared following the procedure used for the synthesis of Example 174 starting from N-{4-[(3-{[(tert-butyldimethylsilyl)oxy]methyl}-6-(5-chloro-2-fluorophenyl)pyridazin-4-yl)amino]pyridin-2-yl}-2-(4-methyl-1,4-diazepan-1-yl)acetamide (Intermediate 280, 80 mg, 0.09 mmol) to afford title compound (20 mg, 0.04 mmol, 44% yield) as a white solid.

LC-MS (ESI): m/z (M+1): 500.2 (Method 2)

$^1$H NMR (400 MHz, Chloroform-d) δ ppm 9.77 (br. s, 1H), 8.22 (d, J=5.7 Hz, 1H), 8.15 (s, 1H), 8.12 (dd, J=6.7, 2.5 Hz, 1H), 8.07 (d, J=1.5 Hz, 1H), 7.88 (s, 1H), 7.36-7.44 (m, 1H), 7.14 (dd, J=10.3, 9.0 Hz, 1H), 6.93 (dd, J=5.5, 1.8 Hz, 1H), 5.20 (s, 2H), 3.31 (s, 2H), 2.83-2.95 (m, 4H), 2.63-2.78 (m, 4H), 2.41 (s, 3H), 1.89 (quin, J=5.8 Hz, 2H).

Example 179: N-(4-{[6-(5-chloro-2-fluorophenyl)-3-(hydroxymethyl)pyridazin-4-yl]amino}pyridin-2-yl)-2-{2-methyl-2,7-diazaspiro[3.5]nonan-7-yl}acetamide

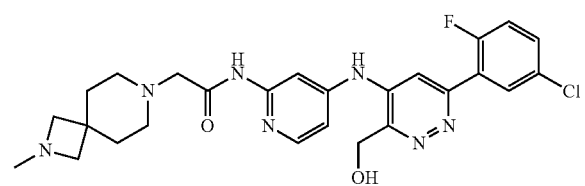 [SMILES: CN1CC2(CCN(CC(=O)Nc3cc(Nc4cc(-c5cc(Cl)ccc5F)nnc4CO)ccn3)CC2)C1]

Example 179 was prepared following the procedure used for the synthesis of Example 174 starting from N-{4-[(3-{[(tert-butyldimethylsilyl)oxy]methyl}-6-(5-chloro-2-fluorophenyl)pyridazin-4-yl)amino]pyridin-2-yl}-2-{2-methyl-2,7-diazaspiro[3.5]nonan-7-yl}acetamide (Intermediate 282, 40 mg, 0.06 mmol) to afford title compound (28 mg, 0.05 mmol, 85% yield) as a white solid.

LC-MS (ESI): m/z (M+1): 526.3 (Method 2)

$^1$H NMR (400 MHz, DMSO-d$_6$) δ ppm 9.84 (s, 1H), 8.58-9.17 (m, 1H), 8.17 (d, J=5.7 Hz, 1H), 8.05 (d, J=1.8 Hz, 1H), 7.98 (dd, J=6.6, 2.6 Hz, 1H), 7.81 (s, 1H), 7.62 (ddd, J=8.7, 4.1, 3.0 Hz, 1H), 7.44 (dd, J=10.4, 9.1 Hz, 1H), 7.06 (dd, J=5.7, 2.0 Hz, 1H), 5.50-6.04 (m, 1H), 4.95 (s, 2H), 3.11 (s, 2H), 2.88 (s, 4H), 2.36-2.47 (m, 4H), 2.20 (s, 3H), 1.69 (br t, J=5.3 Hz, 4H).

Example 180: N$_4$-[6-(5-chloro-2-fluorophenyl)-3-(trifluoromethyl)pyridazin-4-yl]pyridine-2,4-Diamine

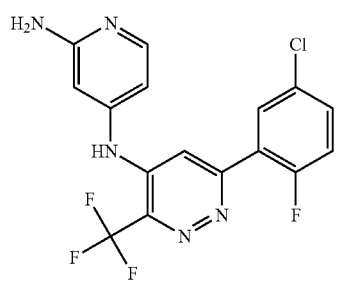 [SMILES: Nc1cc(Nc2cc(-c3cc(Cl)ccc3F)nnc2C(F)(F)F)ccn1]

To a solution of 6-(5-chloro-2-fluorophenyl)-3-(trifluoromethyl)pyridazin-4-amine (Intermediate 293, 100 mg, 0.34 mmol) in 1,4-dioxane (5 ml), Cs$_2$CO$_3$ (335 mg, 1.03 mmol), Xantphos (39.7 mg, 0.07 mmol), Pd(OAc) 2 (7.7 mg, 0.03 mmol) and tert-butyl-(4-bromopyridin-2-yl)carbamate (94 mg, 0.34 mmol) were added and the reaction was stirred at reflux for 3 h.

The mixture was partitioned between EtOAc and water and the organic phase dried over Na$_2$SO$_4$, filtered and concentrated under reduced pressure. The crude was dissolved in 2 mL of MeOH and 2 mL of 2M aq. HCl and heated at 70° C. for 2 h. The reaction was concentrated under reduced pressure and the crude purified by flash chromatography on a Biotage C18 column (eluent=water/MeCN 9/1+0.1% of formic acid: MeCN:water 9/1+0.1% of formic acid from 100:0 to 50:50) to give N-4-(6-(5-chloro-2-fluorophenyl)-3-(trifluoromethyl)pyridazin-4-yl)pyridine-2,4-diamine (6 mg, 0.016 mmol, 5% yield) as a yellow solid.

LC-MS (ESI): m/z (M+1): 384.2, rt=0.71 min (Method 1).

$^1$H NMR (400 MHz, DMSO-d$_6$) δ ppm 8.04 (dd, J=6.61, 2.65 Hz, 1H) 7.86 (br d, J=4.85 Hz, 1H) 7.75 (br s, 1H) 7.61-7.72 (m, 1H) 7.46 (dd, J=10.69, 8.93 Hz, 1H) 6.50 (br d, J=4.63 Hz, 1H) 6.36 (br s, 1H) 6.00 (br s, 2H).

Example 181: 6-(5-chloro-2-fluorophenyl)-N-(Pyridin-4-yl)-3-Trifluoromethyl)pyridazin-4-amine

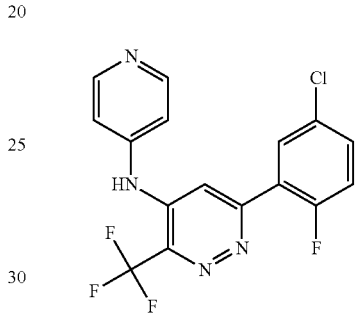

Example 181 was prepared following the procedure used for the synthesis of Example 180, starting from 6-(5-chloro-2-fluorophenyl)-3-(trifluoromethyl)pyridazin-4-amine (Intermediate 293, 70 mg, 0.240 mmol) and 4-bromopyridine hydrobromide (86 mg, 0.360 mmol) to afford the title compound (25 mg, 0.068 mmol, 28.2% yield) as yellowish solid.

LC-MS (ESI): m/z (M+1): 369.3, rt=0.65 min (Method 1).

Example 182: N-(4-{[6-(5-chloro-2-fluorophenyl)-3-(trifluoromethyl) pyridazin-4-yl]amino}pyridin-2-yl)-3-(4-methylpiperazin-1-yl)propanamide

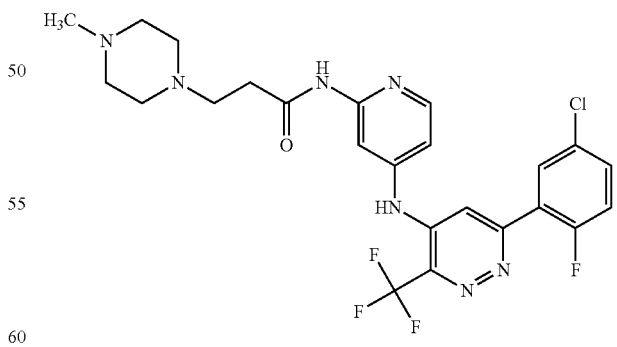

Example 182 was prepared following the procedure used for the synthesis of Example 1 starting from 6-(5-chloro-2-fluorophenyl)-3-(trifluoromethyl)pyridazin-4-amine (Intermediate 293, 100 mg, 0.34 mmol) and N-(4-bromopyridin-2-yl)-3-(4-methylpiperazin-1-yl)propanamide (Intermediate 32, 112 mg, 0.343 mmol).

The resulting crude was purified by Biotage NH-Silica column (eluent=DCM:DCM/MeOH 9/1 from 100:0 to 0:100) and by flash chromatography on a Biotage C18 column (eleunt=water/acetonitrile 9/1+0.1% of formic acid: acetonitrile:water 9/1+0.1% of formic acid from 100:0 to 40:60).

The residue was partitioned between DCM and a saturated aqueous NaHCO₃ solution, the organic phase filtered through a phase separator tube and concentrated under reduced pressure to give the title compound (32.4 mg, 0.060 mmol, 17% yield) as a pale yellow solid.

LC-MS (ESI): m/z (M+1): 538.3, rt=0.58 min (Method 1)

Example 183: N-[6-(5-chloro-2-fluorophenyl)-3-(trifluoromethyl)pyridazin-4-yl]-7-[2-(4-methylpiperazin-1-yl)ethoxy]quinolin-4-amine

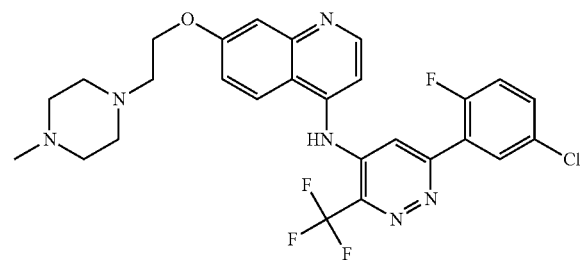 [SMILES: CN1CCN(CCOc2ccc3c(Nc4cc(-c5cc(Cl)ccc5F)nnc4C(F)(F)F)ccnc3c2)CC1]

Example 183 was prepared following the procedure used for the synthesis of Example 29 starting from 4-chloro-7-[2-(4-methylpiperazin-1-yl)ethoxy]quinoline (Intermediate 23, 75 mg, 0.25 mmol) and 6-(5-chloro-2-fluorophenyl)-3-(trifluoromethyl)pyridazin-4-amine (Intermediate 293, 60 mg, 0.21 mmol) to afford title compound (29 mg, 0.05 mmol, 25% yield) as a yellow solid.

LC-MS (ESI): m/z (M+1): 561.3 (Method 2)

$^1$H NMR (400 MHz, DMSO-d$_6$) δ ppm 11.84 (br. s, 1H), 8.24 (br. d, J=9.2 Hz, 1H), 8.02 (dd, J=6.5, 2.7 Hz, 1H), 7.74-7.94 (m, 1H), 7.53-7.71 (m, 2H), 7.41-7.52 (m, 1H), 7.07 (br. d, J=9.4 Hz, 1H), 6.98 (br. s, 1H), 6.16-6.44 (m, 1 H), 4.19 (t, J=5.8 Hz, 2H), 2.75 (t, J=5.7 Hz, 2H), 2.18-2.44 (m, 8H), 2.16 (s, 3H).

Example 184

N-(4-{[6-(5-chloro-2-fluorophenyl)-3-(trifluoromethyl)pyridazin-4-yl]amino}pyridin-2-yl)-3-[4-(2-hydroxyethyl)piperazin-1-yl]propanamide

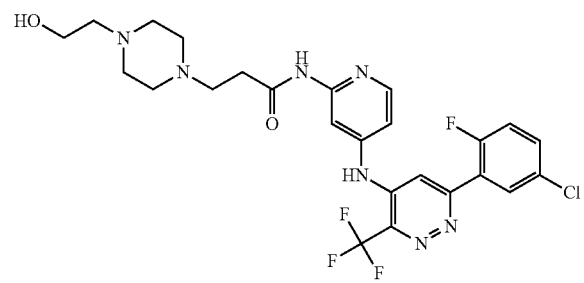 [SMILES: O=C(CCN1CCN(CCO)CC1)Nc1cc(Nc2cc(-c3cc(Cl)ccc3F)nnc2C(F)(F)F)ccn1]

Example 184 was prepared following the procedure used for the synthesis of Example 174 starting from 3-(4-{2-[(tert-butyldimethylsilyl)oxy]ethyl}piperazin-1-yl)-N-(4-{[6-(5-chloro-2-fluorophenyl)-3-(trifluoromethyl)pyridazin-4-yl]amino}pyridin-2-yl)propanamide (Intermediate 286, 116 mg, 0.17 mmol) to afford title compound (44 mg, 0.08 mmol, 46% yield) as a yellow solid.

LC-MS (ESI): m/z (M+1): 568.3 (Method 1)

$^1$H NMR (500 MHz, Chloroform-d) δ ppm 11.39 (br. s, 1H), 8.29 (d, J=5.6 Hz, 1H), 8.24 (dd, J=6.6, 2.7 Hz, 1H), 8.12 (d, J=1.9 Hz, 1H), 7.98 (s, 1H), 7.40-7.49 (m, 1H), 7.15 (dd, J=10.6, 8.8 Hz, 1H), 6.92 (dd, J=5.5, 2.1 Hz, 1H), 6.77 (br. s, 1H), 3.62-3.71 (m, 2H), 2.75-2.80 (m, 2H), 2.63-2.67 (m, 2H), 2.55-2.59 (m, 2H), 2.54-2.75 (m, 9H).

Example 185

N-(4-{[6-(5-chloro-2-fluorophenyl)-3-(trifluoromethyl)pyridazin-4-yl]amino}pyridin-2-yl)-3-[4-(2-methanesulfonylethyl)piperazin-1-yl]propanamide

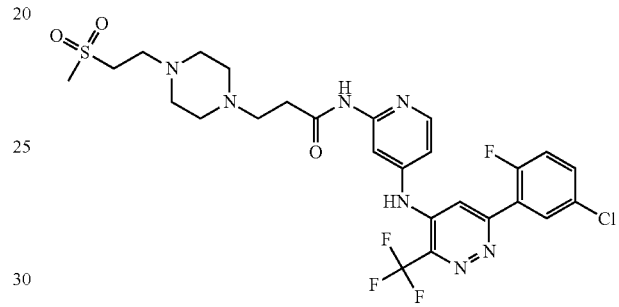

Example 185 was prepared following the procedure used for the synthesis of Example 31 starting from N-(4-bromopyridin-2-yl)-3-[4-(2-methanesulfonylethyl)piperazin-1-yl]propanamide (Intermediate 152, 95 mg, 0.23 mmol) and 6-(5-chloro-2-fluorophenyl)-3-(trifluoromethyl)pyridazin-4-amine (Intermediate 293, 60 mg, 0.21 mmol) to afford title compound (46 mg, 0.07 mmol, 35% yield) as a yellow solid.

LC-MS (ESI): m/z (M+1): 630.3 (Method 2)

$^1$H NMR (400 MHz, Chloroform-d) δ ppm 11.22 (s, 1H), 8.28 (d, J=5.5 Hz, 1H), 8.25 (dd, J=6.6, 2.6 Hz, 1H), 8.11 (d, J=2.0 Hz, 1H), 7.98 (s, 1H), 7.45 (ddd, J=6.5, 4.3, 2.1 Hz, 1H), 7.15 (dd, J=10.6, 8.8 Hz, 1H), 6.93 (dd, J=5.6, 2.1 Hz, 1H), 6.76 (br. s, 1H), 3.12-3.26 (m, 2H), 3.05 (s, 3H), 2.94-3.02 (m, 2H), 2.75-2.81 (m, 2H), 2.71 (br. s, 8H), 2.52-2.61 (m, 3H).

Example 186

N-(4-{[6-(5-chloro-2-fluorophenyl)-3-(trifluoromethyl)pyridazin-4-yl]amino}pyridin-2-yl)-3-[4-(2-cyanoethyl)piperazin-1-yl]propanamide

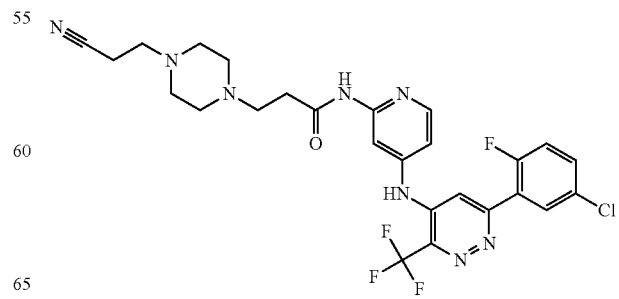

Example 186 was prepared following the procedure used for the synthesis of Example 31 starting from N-(4-bromopyridin-2-yl)-3-[4-(2-cyanoethyl)piperazin-1-yl]propanamide (Intermediate 287, 96 mg, 0.26 mmol) and 6-(5-chloro-2-fluorophenyl)-3-(trifluoromethyl)pyridazin-4-amine (Intermediate 293, 40 mg, 0.23 mmol) to afford title compound (36 mg, 0.06 mmol, 26% yield) as a yellow solid.

LC-MS (ESI): m/z (M+1): 577.2 (Method 1)

$^1$H NMR (400 MHz, Chloroform-d) δ ppm 11.31 (s, 1H), 8.28 (d, J=5.5 Hz, 1H), 8.25 (dd, J=6.7, 2.8 Hz, 1H), 8.11 (d, J=2.0 Hz, 1H), 7.98 (s, 1H), 7.45 (ddd, J=6.6, 4.3, 2.1 Hz, 1H), 7.15 (dd, J=10.6, 9.0 Hz, 1H), 6.92 (dd, J=5.6, 2.1 Hz, 1H), 6.75 (br. s, 1H), 2.75-2.83 (m, 4H), 2.70 (br. s, 8H), 2.51-2.59 (m, 4H).

Example 187: Methyl 3-[6-(5-chloro-2-fluorophenyl)-4-({2-[3-(4-methylpiperazin-1-yl)propanamido]pyridin-4-yl}amino)pyridazin-3-yl]propanoate

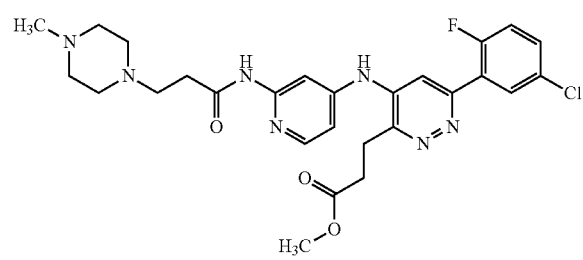 [SMILES: COC(=O)CCc1nnc(-c2cc(Cl)ccc2F)cc1Nc1ccnc(NC(=O)CCN2CCN(C)CC2)c1]

To a solution of methyl 3-(4-amino-6-(5-chloro-2-fluorophenyl)pyridazin-3-yl)propanoate (Intermediate 294, 30 mg, 0.09 mmol) in 1,4-Dioxane (1 mL), Cs$_2$CO$_3$ (95 mg, 0.29 mmol), Xantphos (11.21 mg, 0.02 mmol), Pd(OAc)2 (2 mg, 9.69 μmop and N-(4-bromopyridin-2-yl)-3-(4-methylpiperazin-1-yl)propanamide (Intermediate 32, 31.7 mg, 0.09 mmol) were added and the reaction was stirred at reflux for 4 h. The mixture was partitioned between DCM and water, the organic phase filtered through a phase separator and concentrated under reduced pressure. The crude was purified by flash chromatography on Biotage NH-silica cartridge (eluent: DCM: DCM/MeOH 9/1 from 100:0 to 90:10) and in prepHPLC (column XSelect® CSHTM Prep C18 51 μm OBDTM 19×100 mm; 5-95% ACN/H$_2$O (0.1% HCOOH), 20 ml/min. RT) to give the title compound (2.8 mg, 5.04 μmol, 6% yield) as white solid.

LC-MS (ESI): m/z (M+1): 556.3, rt=0.45 (Method 1).

Example 188 and 189: Methyl cis-4-(6-(5-chloro-2-fluorophenyl)-4-(2-(3-(4-methylpiperazin-1-yl)propanamido)pyridin-4-yl)amino)pyridazin-3-yl)cyclohexane-1-carboxylate and methyl trans-4-(6-(5-chloro-2-fluorophenyl)-4-(2-(3-(4-methylpiperazin-1-yl)propanamido)pyridin-4-yl)amino)pyridazin-3-yl)cyclohexane-1-carboxylate

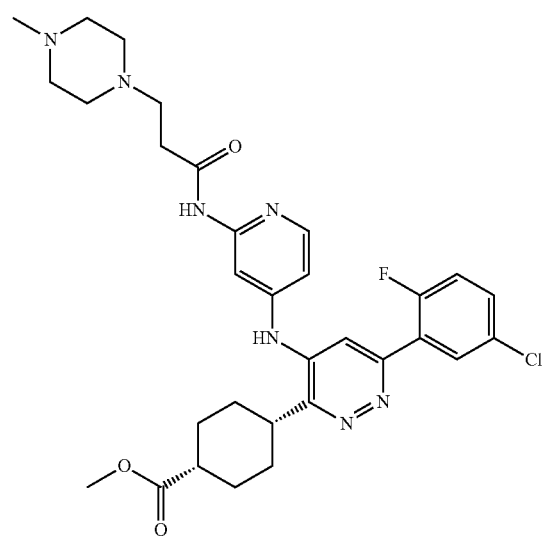

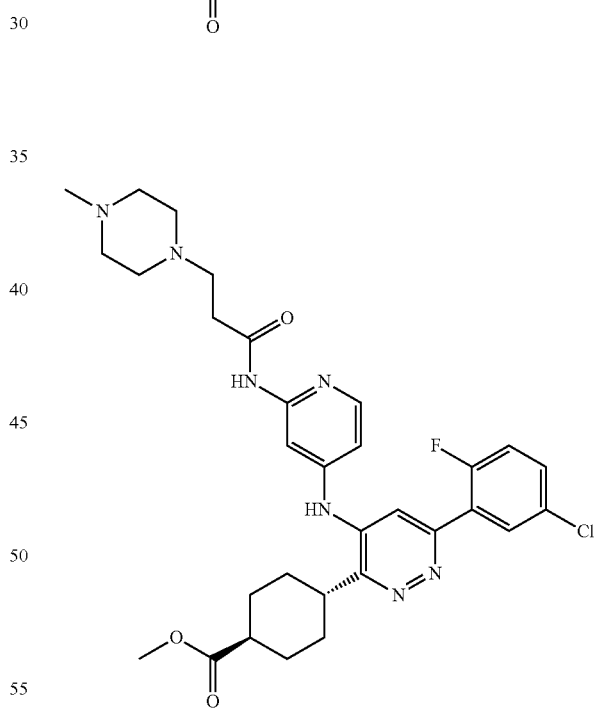

Example 188 and 189 were prepared following the procedure used for the synthesis of Example 187 starting from methyl 4-(4-amino-6-(5-chloro-2-fluorophenyl)pyridazin-3-yl)cyclohexane-1-carboxylate (Intermediate 295, 30 mg, 0.082 mmol) and N-(4-bromopyridin-2-yl)-3-(4-methylpiperazin-1-yl)propanamide (Intermediate 32, 27.0 mg, 0.082 mmol). The resulting crude was purified in prepHPLC (column XSelect® CSHTM Prep C18 5 μm OBDTM 19×100 mm; 5-95% MeCN/H$_2$O (0.1% HCOOH), 20 ml/min, RT) to give methyl cis-4-(6-(5-chloro-2-fluorophenyl)-4-((2-(3-(4-methylpiperazin-1-yl)propanamido)pyridin-4-yl)amino)pyridazin-3-yl)cyclohexane-1-carboxylate (1.3 mg, 2.13 μmol, 3% yield) as white solid and methyl trans-4-(6-(5-chloro-2-fluorophenyl)-4-((2-(3-(4-methylpiperazin-1-yl)propanamido)pyridin-4-yl)amino) pyridazin-3-yl)cyclohexane-1-carboxylate (1.3 mg, 2.131 mol, 3% yield) as white solid.

Methyl cis-4-(6-(5-chloro-2-fluorophenyl)-4-(2-(3-(4-methylpiperazin-1-yl)propanamido) pyridin-4-yl)amino) pyridazin-3-yl)cyclohexane-1-carboxylate LC-MS (ESI): m/z (M+1): 610.5, rt=0.54 min (Method 1).
$^1$H NMR (600 MHz, DMSO-$d_6$) δ ppm 10.63 (s, 1H) 8.92 (s, 1H) 8.13 (d, J=5.64 Hz, 1H) 8.06 (br s, 1H) 8.01 (dd, J=6.54, 2.82 Hz, 1H) 7.71 (s, 1H) 7.59-7.63 (m, 1H) 7.39-7.46 (m, 1H) 6.95 (dd, J=5.58, 2.12 Hz, 1H) 3.68 (s, 3H) 3.35-3.36 (m, 1H) 2.79-2.83 (m, 1H) 2.61 (t, J=6.35 Hz, 2H) 2.52-2.52 (m, 2H) 2.23-2.49 (m, 8H) 2.17-2.22 (m, 2H) 2.14 (s, 3H) 1.82-1.89 (m, 2H) 1.77-1.81 (m, 2H) 1.68-1.75 (m, 1H).

Methyl trans-4-(6-(5-chloro-2-fluorophenyl)-4-((2-(3-(4-methylpiperazin-1-yl)propanamido)pyridin-4-yl)amino)pyridazin-3-yl)cyclohexane-1-carboxylate LC-MS (ESI): m/z (M+1): 610.5, rt=0.58 min (Method 1).
$^1$H NMR (600 MHz, DMSO-$d_6$) δ ppm 10.64 (s, 1H) 8.90 (s, 1H) 8.13 (d, J=5.64 Hz, 1H) 8.07 (s, 1H) 8.00 (dd, J=6.54, 2.69 Hz, 1H) 7.71 (s, 1H) 7.59-7.63 (m, 1H) 7.43 (dd, J=10.39, 8.85 Hz, 1H) 6.96 (dd, J=5.64, 2.05 Hz, 1H) 3.63 (s, 3H) 3.35-3.35 (m, 1H) 2.61 (t, J=6.92 Hz, 3H) 2.52-2.54 (m, 2H) 2.46 (dt, J=12.18, 3.59 Hz, 1H) 2.14 (s, 3H) 2.05 (br dd, J=13.08, 2.69 Hz, 2H) 1.91-2.01 (m, 2H) 1.75-1.83 (m, 2H) 1.61 (qd, J=12.87, 3.08 Hz, 2H).

Example 190

N-[4-({6-[5-(difluoromethyl)-2-fluorophenyl]-3-methylpyridazin-4-yl}amino)pyridin-2-yl]-3-(4-methylpiperazin-1-yl)propanamide

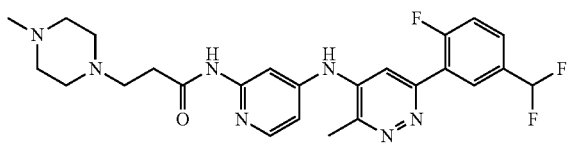 [SMILES: Cc1nnc(-c2cc(C(F)F)ccc2F)cc1Nc1ccnc(NC(=O)CCN2CCN(C)CC2)c1]

Example 190 was prepared following the procedure used for the synthesis of Example 151 starting from N-{4-[(6-chloro-3-methylpyridazin-4-yl)amino]pyridin-2-yl}-3-(4-methylpiperazin-1-yl)propanamide (Intermediate 241, 100 mg, 0.26 mmol) and 2-[5-(difluoromethyl)-2-fluorophenyl]-4,4,5,5-tetramethyl-1,3,2-dioxaborolane (Intermediate 283, 87 mg, 0.35 mmol) in 1,2-dimethoxyethane (2.8 mL)/H$_2$O (0.83 mL) to afford title compound (14 mg, 0.03 mmol, 16% yield).

LC-MS (ESI): m/z (M+1): 500.6 (Method 2)
$^1$H NMR (400 MHz, Chloroform-d) δ ppm 11.28 (s, 1H), 8.33 (br. d, J=6.6 Hz, 1H), 8.24 (d, J=5.5 Hz, 1H), 8.04 (d, J=2.0 Hz, 1H), 7.82 (s, 1H), 7.58-7.69 (m, 1H), 7.22-7.32 (m, 1H), 6.93 (dd, J=5.6, 2.1 Hz, 1H), 6.72 (t, J=56.5 Hz, 1H), 6.22 (s, 1H), 2.76 (s, 3H), 2.74-2.79 (m, 2H), 2.53-2.59 (m, 2H), 2.48-2.91 (m, 8H), 2.37 (s, 3H).

Example 191: Methyl 4-(6-(5-chloro-2-fluorophenyl)-4-((2-(3-(4-methylpiperazin-1-yl)propanamido) pyridin-4-yl)amino)pyridazin-3-yl)

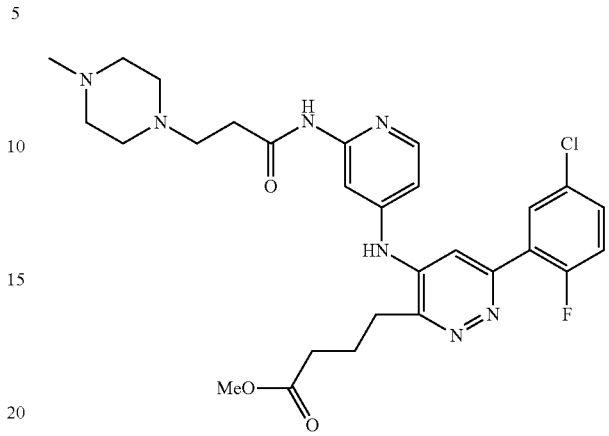

Example 191 were prepared following the procedure used for the synthesis of Example 187 starting from to a solution of methyl 4-(4-amino-6-(5-chloro-2-fluorophenyl) pyridazin-3-yl)butanoate (Intermediate 296, 37 mg, 0.114 mmol) and using N-(4-bromopyridin-2-yl)-3-(4-methylpiperazin-1-yl)propanamide (Intermediate 32, 37.4 mg, 0.114 mmol) to afford the title compound (3 mg, 5.26 μmol, 4.60% yield).

LC-MS (ESI): m/z (M+1): 570.5, rt=0.73 min (Method 1)
$^1$H NMR (400 MHz, DMSO-$d_6$) δ ppm 10.62 (s, 1H) 8.82 (s, 1H) 8.14 (d, J=5.48 Hz, 1H) 8.06-8.08 (m, 1H) 8.00 (dd, J=6.58, 2.63 Hz, 1H) 7.70-7.74 (m, 1H) 7.58-7.63 (m, 1H) 7.42 (dd, J=10.52, 8.77 Hz, 1H) 6.96 (dd, J=5.70, 1.97 Hz, 1H) 3.59 (s, 3H) 3.06 (t, J=7.45 Hz, 2H) 2.57-2.64 (m, 4H) 2.52-2.55 (m, 2H) 2.27-2.40 (m, 8H) 2.14 (s, 3H) 2.07 (quin, J=7.40 Hz, 2H).

Comparative newly synthesised compounds lacking a pyridinyl or a pyridinyl condensed group linked to the amino group bearing the pyridazine ring (C1 and C2) or bearing on the pyridinyl ring a substituent not included in formula (I) of the present invention (C3)

Example C1

6-(5-chloro-2-fluorophenyl)-N-{3H-imidazo[4,5-b]pyridin-2-yl}pyridazin-4-amine

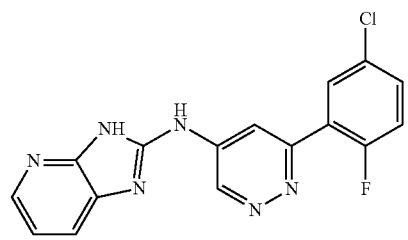 [SMILES: Fc1ccc(Cl)cc1-c1cc(Nc2nc3cccnc3[nH]2)cnn1]

Title compound was prepared (25 mg, 0.07 mmol, 99% yield) following the procedure used for the synthesis of Example 21 starting from Intermediate 98 (35 mg, 0.07 mmol).

LC-MS (ESI): m/z (M+1): 341.2 (Method 1)

$^1$H NMR (400 MHz, DMSO-$d_6$) δ ppm 11.02-11.86 (m, 1H), 10.30-10.72 (m, 1H), 9.54 (br. s., 1H), 8.63 (br. s., 1H), 8.14 (br. s., 1H), 8.02 (dd, J=6.60, 2.75 Hz, 1H), 7.76 (br. s., 1H), 7.58-7.69 (m, 1H), 7.49 (dd, J=10.56, 8.91 Hz, 1H), 7.11 (dd, J=7.65, 5.01 Hz, 1H).

Example C2

N$_4$-[6-(5-chloro-2-fluorophenyl)pyridazin-4-yl]pyrimidine-2,4-diamine

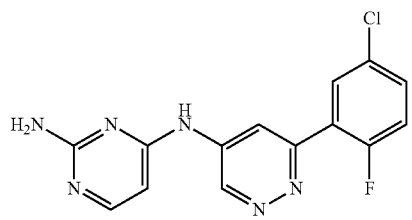 [SMILES: Nc1nccc(Nc2cnnc(-c3cc(Cl)ccc3F)c2)n1]

Title compound was prepared (15 mg, 0.05 mmol, 83% yield) following the procedure used for the synthesis of Example 2 starting from Intermediate 96 (30 mg, 0.06 mmol).

LC-MS (ESI): m/z (M+1): 317.2 (Method 1)

$^1$H NMR (400 MHz, Methanol-$d_4$) δ ppm 9.60 (d, J=2.6 Hz, 1H), 8.52 (dd, J=2.5, 1.9 Hz, 1H), 7.98 (d, J=5.7 Hz, 1H), 7.92 (dd, J=6.4, 2.6 Hz, 1H), 7.55 (ddd, J=8.9, 4.3, 2.9 Hz, 1H), 7.33 (dd, J=10.4, 8.9 Hz, 1H), 6.22 (d, J=5.9 Hz, 1H).

Example C3

Methyl 3-{5-[(2-{[(tert-butoxy)carbonyl]amino}pyridin-4-yl)amino]pyridazin-3-yl}-2-fluorobenzoate

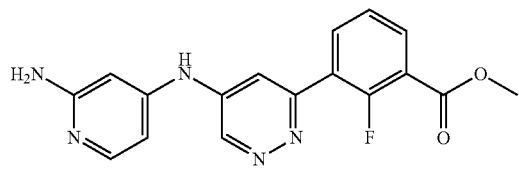 [SMILES: COC(=O)c1cccc(-c2cc(Nc3ccnc(N)c3)cnn2)c1F]

4 N HCl in dioxane (0.62 mL, 2.48 mmol) was added to a stirred solution of Intermediate 100 (25 mg, 0.06 mmol) in MeOH at RT. After 3 hrs the solvents were removed under reduced pressure. The residue was treated with H$_2$O and extracted with EtOAc. Water phase was treated with NH$_4$OH and extracted with DCM. Organic layer was separated, dried and evaporated. The residue was purified by flash chromatography on Biotage silica cartridge (from DCM to 3% MeOH+0.3% NH$_4$OH) to afford title compound (10 mg, 0.03 mmol, 52% yield).

LC-MS (ESI): m/z (M+1): 340.1 (Method 2)

$^1$H NMR (400 MHz, DMSO-$d_6$) δ ppm 9.47 (s, 1H), 9.00 (d, J=2.6 Hz, 1H), 8.13 (td, J=7.3, 1.9 Hz, 1H), 7.97-8.05 (m, 1H), 7.82 (d, J=5.9 Hz, 1H), 7.56 (t, J=2.1 Hz, 1H), 7.50 (t, J=7.8 Hz, 1H), 6.41 (dd, J=5.7, 2.0 Hz, 1H), 6.34 (d, J=1.8 Hz, 1H), 5.96 (s, 2H), 3.89 (s, 3H).

Pharmacological Activity of the Compounds of the Invention

In vitro Assay

The enzymatic activity of compounds of the present invention was monitored measuring the formation of ADP using the ADP-GLO Kinases assay. Following the incubation of the purified enzyme, a substrate and ATP, the produced ADP was converted into ATP, which in turn was converted into light by Ultra-Glo Luciferase. The luminescent signal positively correlated with ADP amount and kinase activity. Briefly, the kinase reaction was performed by incubating 2.6 nM of the purified, commercially available human ALK5 (recombinant TGF β(1 N-term GST-tagged, 80-end), a final concentration of TGFβ1 peptide 94.5 μM (Promega, T36-58) and ultra-pure ATP (Promega V915B). The ATP concentration was set at the Km value (concentration of substrate which permits the enzyme to achieve half maximal velocity (Vmax)) of ALK5 (5 μM). All reactions/incubations were performed at 25° C. Compound and ALK5 kinase were mixed and incubated for 15 mins. Reactions were initiated by addition of ATP at a final concentration in the assay of 0.8301 After an incubation of 150 min, the reaction was stopped, and ADP production detected with ADP-Glo kit according to manufacturer's indications. The assay was performed in 384-well format and was validated using a selection of reference compounds that was tested in 11 point concentration-response curve.

The results for individual compounds are provided below in Table 4 wherein the compounds are classified in term of potency (nM) with respect to their inhibitory activity on ALK5 receptor.

TABLE 4

| Example No | ALK5 IC50 (nM) |
|---|---|
| Compounds of formula (I) wherein A corresponds to A1: 2, 7, 8, 11, 15, 16, 18, 31, 33, 44, 65, 74, 76, 78, 79, 80, 82, 83, 84, 85, 91, 92, 93, 94, 95, 96, 97, 98, 99, 101, 102, 104, 105, 106, 107, 108, 109, 110, 111, 113, 116, 117, 120, 121, 122, 123, 124, 126, 127, 129, 130, 131, 132, 135, 136, 138, 139, 140, 141, 142, 143, 144, 145, 146, 147, 149, 150, 151, 154, 155, 156, 157, 158, 161, 162, 163, 164, 166, 167, 170, 172, 173, 174, 175, 176, 178, 179, 180, 181, 182, 184, 185, 186, 187, 189, 190, 191 | <1 |

TABLE 4-continued

| Example No | ALK5 IC50 (nM) |
|---|---|
| Compounds of formula (I) wherein A corresponds to A2: | |
| 3, 4, 6, 9, 10, 12, 13, 14, 17, 20, 29, 30, 32, 35, 36, 37, 41, 42, 48, 52, 55, 56, 60, 61, 62, 63, 64, 66, 67, 68, 69, 71, 72, 73, 75, 77, 81, 86, 87, 89, 90, 112, 114, 115, 118, 128, 133, 134, 137, 148, 152, 153, 159, 160, 165, 171, 177, 183 | |
| Compounds of formula (I) wherein A corresponds to A3: | |
| 25, 27, 40, 49, 50 | |
| 1, 19, 21, 22, 24, 26, 28, 34, 38, 39, 43, 45, 47, 51, 53, 54, 57, 58, 59, 70, 88, 100, 103, 119,, 168, 188 | 1-5 |
| 5, 23, 46 | 5-10 |

As it can be appreciated, all the compounds of Table 4 show a good activity as antagonists of ALK5 receptor.

Comparative Examples

Compounds of the examples C1, C2 and C3 were tested in the same in vitro assay described above.

TABLE 5

| Example No | ALK5 IC50 (nM) |
|---|---|
| C1 | 6286 |
| C2 | 482 |
| C3 | 10000 |

The compounds of the present invention, as shown in Table 4, have a potency even lower than 1 nM, whereas comparative examples C1 and C2 have a potency higher than 480 nM and even largely higher. Comparative example C3 even shows a potency of 10000 nM.

These data demonstrate that, conversely to the compounds C1, and C2 characterized by lacking a pyridinyl or a pyridinyl condensed group linked to the amino group bearing the pyridazine ring, the presence of a pyridinyl or a pyridinyl condensed group linked to the amino group bearing the pyridazine ring in the present invention compounds unexpectedly and remarkably determines a relevant increase in the inhibitory activity on the ALK5 receptor.

Moreover, even more remarkably, these data demonstrate that, conversely to the compound C3 characterized by a $NH_2$ group on the pyridine ring and falling within the scope of Amgen's general formula, the presence of the specific substituents on the pyridine ring described in the present invention unexpectedly and exceptionally determines a relevant increase in the inhibitory activity on the ALK5 receptor.

The invention claimed is:
1. A compound of formula (I)

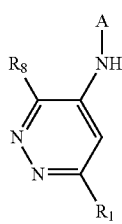

(I)

wherein
$R_1$ is aryl optionally substituted by one or more groups selected from the group consisting of halogen atoms, —$(C_1$-$C_6)$alkyl and —$(C_1$-$C_6)$haloalkyl;
A is selected from the group consisting of A1, A2 and A3

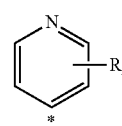

A1

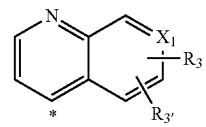

A2

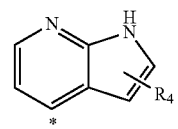

A3

$R^2$ is selected from the group consisting of —$NR_5C(O)R_6$ and —$NR_5R_6$;
$X_1$ is C, CH or N;
$R^3$ is selected from the group consisting of —$C(O)NR_5R_7$, —$C(O)OR_7$, —$OC(O)R_7$, —$OR_7$, —$NR_5C(O)R_7$ and —$OC(O)NR_5R_7$;
$R_3'$ is H or is selected from the group consisting of —$(C_1$-$C_6)$alkoxy, —OH, —$C(O)O$—$(C_1$-$C_6)$alkyl and —C(O)NH-heterocycloalkyl, wherein said heterocycloalkyl is substituted by one —$(C_1$-$C_6)$alkyl;
$R_4$ is selected from the group consisting of —$C(O)NR_5R_7$ and —C(O)heterocycloalkyl, wherein said heterocycloalkyl is optionally substituted by one or more —$(C_1$-$C_6)$alkyl;
$R_5$ is H or —$(C_1$-$C_6)$alkyl;
$R^6$ is selected from the group consisting of —$(C_1$-$C_6)$alkylene-$NR_AR_B$; —NH—$(C_1$-$C_6)$alkylene-heterocycloalkyl, wherein said heterocycloalkyl is optionally substituted by one or more —$(C_1$-$C_6)$alkyl; heteroaryl optionally substituted by one or more groups selected from the group consisting of —$(C_1$-$C_6)$alkylene-$NR_AR_C$ and —$(C_1$-$C_6)$alkylene-heterocycloalkyl, wherein said heterocycloalkyl is optionally substituted by one or more —$(C_1$-$C_6)$alkyl; —$(C_1$-$C_6)$alkylene-$NR_C$—$(C_1$-$C_6)$alkylene-$NR_AR_C$; —$(C_1$-$C_6)$alkylene-$NR_A$—$C(O)O$—$(C_1$-$C_6)$alkyl;

cycloalkyl optionally substituted by a heterocycloalkyl, wherein said heterocycloalkyl is optionally substituted by one or more —($C_1$-$C_6$)alkyl; heterocycloalkyl optionally substituted by one or more —($C_1$-$C_6$)alkyl; —($C_1$-$C_6$)alkylene-N-oxide-heterocycloalkyl; and —($C_1$-$C_6$)alkylene-heterocycloalkyl, wherein said heterocycloalkyl is optionally substituted by one or more groups selected from the group consisting of —OH, halogen, —($C_1$-$C_6$)alkyl, —($C_1$-$C_6$)alkoxy, —($C_1$-$C_6$)alkylene-OH, —($C_1$-$C_6$)alkylene-CN, —($C_1$-$C_6$)haloalkyl, —C(O)—($C_1$-$C_6$)alkyl, —C(O)OH, —C(O)O($C_1$-$C_6$)alkyl, —C(O)O-cycloalkyl, —C(O)O-heterocycloalkyl, —($C_1$-$C_6$)alkylene-C(O)O—$R_C$, —($C_1$-$C_6$)alkylene-$NR_C$—C(O)O—($C_1$-$C_6$)alkyl, —$SO_2$—($C_1$-$C_6$)alkyl, —($C_1$-$C_6$)alkylene-$NH_2$, —($C_1$-$C_6$)alkylene-$NR_AR_C$, —($C_1$-$C_6$)alkylene-$SO_2$—($C_1$-$C_6$)alkyl, —($C_1$-$C_6$)alkylene-$NHSO_2$—($C_1$-$C_6$)alkyl, —$SO_2$—($C_1$-$C_6$)alkyl and oxo;

$R^7$ is selected from the group consisting of:
($C_1$-$C_6$)alkylene-$NR_AR_B$;
heterocycloalkyl optionally substituted by one or more groups selected from the group consisting of —($C_1$-$C_6$)alkyl, —($C_1$-$C_6$)alkylene-$SO_2$—($C_1$-$C_6$)alkyl, —($C_1$-$C_6$)alkylene-OH, —($C_1$-$C_6$)alkylene-$NR_AR_C$, heterocycloalkyl, —C(O)O-heterocycloalkyl, —($C_1$-$C_6$)alkylene-heterocycloalkyl, wherein each of said heterocycloalkyl is optionally substituted by one or more —($C_1$-$C_6$)alkyl;
—($C_1$-$C_6$)alkylene-C(O)-heterocycloalkyl, wherein said heterocycloalkyl is optionally substituted by one or more —($C_1$-$C_6$)alkyl; and
—($C_1$-$C_6$)alkylene-heterocycloalkyl, wherein said heterocycloalkyl is optionally substituted by one or more groups selected from the group consisting of —($C_1$-$C_6$)alkyl, —($C_1$-$C_6$)alkoxy, —($C_1$-$C_6$)alkylene-OH, —($C_1$-$C_6$)alkylene-CN, —($C_1$-$C_6$)haloalkyl, —C(O)—($C_1$-$C_6$)alkyl, —($C_1$-$C_6$)alkylene-C(O)O—($C_1$-$C_6$)alkyl, —C(O)O—($C_1$-$C_6$)alkyl, —($C_1$-$C_6$)alkylene-$NH_2$, —($C_1$-$C_6$)alkylene-$NR_AR_C$, —($C_1$-$C_6$)alkylene-$CONR_AR_C$, —($C_1$-$C_6$)alkylene-$NR_C$—CO—($C_1$-$C_6$)alkyl, —($C_1$-$C_6$)alkylene-$NR_C$—C(O)O—($C_1$-$C_6$)alkyl, —($C_1$-$C_6$)alkylene-$NHSO_2$—($C_1$-$C_6$)alkyl, —$SO_2$—($C_1$-$C_6$)alkyl and —($C_1$-$C_6$)alkylene-$SO_2$—($C_1$-$C_6$)alkyl;

$R_A$ is selected from the group consisting of —($C_1$-$C_6$)alkyl and —($C_1$-$C_6$)alkylene-OH;
$R_B$ is heterocycloalkyl;
$R_c$ is H or selected from the group consisting of —($C_1$-$C_6$)alkyl and —($C_1$-$C_6$)alkylene-OH;
$R_8$ is H or is selected from the group consisting of —($C_1$-$C_6$)alkyl, cycloalkyl, —($C_1$-$C_6$)alkylene-OH, —($C_1$-$C_6$)alkylene-C(O)O—($C_1$-$C_6$)alkyl, -cycloalkyl-C(O)O—($C_1$-$C_6$)alkyl and —($C_1$-$C_6$)haloalkyl;
and pharmaceutically acceptable salts thereof.

2. The compound or salt thereof according to claim 1, wherein A is group A1

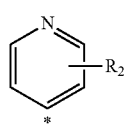

A1 represented by the formula (Ia)

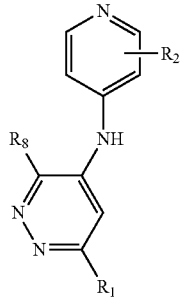

(Ia)

$R_1$ is aryl optionally substituted by one or more groups selected from the group consisting of halogen atoms, —($C_1$-$C_6$)alkyl and —($C_1$-$C_6$)haloalkyl;
$R_2$ is selected from the group consisting of —$NR_5$C(O)$R_6$ and —$NR_5R_6$;
$R_5$ is H or —($C_1$-$C_6$)alkyl;
$R^6$ is selected from the group consisting of —($C_1$-$C_6$)alkylene-$NR_AR_B$; —NH—($C_1$-$C_6$)alkylene-heterocycloalkyl, wherein said heterocycloalkyl is optionally substituted by one or more —($C_1$-$C_6$)alkyl; heteroaryl optionally substituted by one or more groups selected from —($C_1$-$C_6$)alkylene-$NR_AR_C$ and —($C_1$-$C_6$)alkylene-heterocycloalkyl, wherein said heterocycloalkyl is optionally substituted by one or more —($C_1$-$C_6$)alkyl; —($C_1$-$C_6$)alkylene-$NR_C$—($C_1$-$C_6$)alkylene-$NR_AR_C$; —($C_1$-$C_6$)alkylene-$NR_A$—C(O)O—($C_1$-$C_6$)alkyl; cycloalkyl optionally substituted by a heterocycloalkyl, wherein said heterocycloalkyl is optionally substituted by one or more —($C_1$-$C_6$)alkyl; heterocycloalkyl optionally substituted by one or more —($C_1$-$C_6$)alkyl; —($C_1$-$C_6$)alkylene-N-oxide-heterocycloalkyl; and —($C_1$-$C_6$)alkylene-heterocycloalkyl, wherein said heterocycloalkyl is optionally substituted by one or more groups selected from —OH, halogen, —($C_1$-$C_6$)alkyl, —($C_1$-$C_6$)alkoxy, —($C_1$-$C_6$)alkylene-OH, —($C_1$-$C_6$)alkylene-CN, —($C_1$-$C_6$)haloalkyl, —C(O)—($C_1$-$C_6$)alkyl, —C(O)OH, —C(O)O($C_1$-$C_6$)alkyl, —C(O)O-cycloalkyl, —C(O)O-heterocycloalkyl, —($C_1$-$C_6$)alkylene-C(O)O—$R_C$, —($C_1$-$C_6$)alkylene-$NR_C$—C(O)O—($C_1$-$C_6$)alkyl, —$SO_2$—($C_1$-$C_6$)alkyl, —($C_1$-$C_6$)alkylene-$NH_2$, —($C_1$-$C_6$)alkylene-$NR_AR_C$, —($C_1$-$C_6$)alkylene-$SO_2$—($C_1$-$C_6$)alkyl, —($C_1$-$C_6$)alkylene-$NHSO_2$—($C_1$-$C_6$)alkyl, —$SO_2$—($C_1$-$C_6$)alkyl and oxo;

$R_A$ is —($C_1$-$C_6$)alkyl;
$R_B$ is heterocycloalkyl;
$R_c$ is H or selected from the group consisting of —($C_1$-$C_6$)alkyl and —($C_1$-$C_6$)alkylene-OH; and
$R_8$ is H or is selected from the group consisting of —($C_1$-$C_6$)alkyl, cycloalkyl, —($C_1$-$C_6$)alkylene-OH, —($C_1$-$C_6$)alkylene-C(O)O—($C_1$-$C_6$)alkyl, -cycloalkyl-C(O)O—($C_1$-$C_6$)alkyl and —($C_1$-$C_6$)haloalkyl.

3. The compound or salt thereof according to claim 2, wherein the compound is selected from the group consisting of:
N-(4-{[6-(5-chloro-2-fluorophenyl)pyridazin-4-yl]amino}pyridin-2-yl)-3-(morpholin-4-yl)propanamide;
N-(4-{[6-(5-chloro-2-fluorophenyl)pyridazin-4-yl]amino}pyridin-2-yl)-3-(piperazin-1-yl)propanamide;

N-(4-{[6-(5-chloro-2-fluorophenyl)pyridazin-4-yl]amino}pyridin-2-yl)cyclopropanecarboxamide;
N-(4-{[6-(5-chloro-2-fluorophenyl)pyridazin-4-yl]amino}pyridin-2-yl)-4-(morpholin-4-yl)butanamide;
N-(4-{[6-(5-chloro-2-fluorophenyl)pyridazin-4-yl]amino}pyridin-2-yl)-3-(4-methylpiperazin-1-yl)propanamide;
N-(4-{[6-(5-chloro-2-fluorophenyl)-3-methylpyridazin-4-yl]amino}pyridin-2-yl)cyclopropanecarboxamide;
N-(4-{[6-(5-chloro-2-fluorophenyl)-3-methylpyridazin-4-yl]amino}pyridin-2-yl)-3-(4-methylpiperazin-1-yl)propanamide;
N-(4-{[6-(5-chloro-2-fluorophenyl)pyridazin-4-yl]amino}pyridin-2-yl)-3-[methyl(oxetan-3-yl)amino]propanamide;
N-(4-{[6-(5-chloro-2-fluorophenyl)pyridazin-4-yl]amino}pyridin-2-yl)-1-methylpiperidine-4-carboxamide;
N-(4-{[6-(5-chloro-2-fluorophenyl)pyridazin-4-yl]amino}pyridin-2-yl)-3-(4-methyl-2-oxopiperazin-1-yl)propanamide;
N-(4-{[6-(5-chloro-2-fluorophenyl)pyridazin-4-yl]amino}pyridin-2-yl)-3-(4-methyl-3-oxopiperazin-1-yl)propanamide;
3-(4-acetylpiperazin-1-yl)-N-(4-{[6-(5-chloro-2-fluorophenyl)pyridazin-4-yl]amino}pyridin-2-yl)propanamide;
N-(4-{[6-(5-chloro-2-fluorophenyl)pyridazin-4-yl]amino}pyridin-2-yl)-3-(3-methyl-1,3-diazinan-1-yl)propanamide;
N-(4-{[6-(5-chloro-2-fluorophenyl)pyridazin-4-yl]amino}pyridin-2-yl)-3-(4-methanesulfonylpiperazin-1-yl)propanamide;
3-(3-acetyl-1,3-diazinan-1-yl)-N-(4-{[6-(5-chloro-2-fluorophenyl)pyridazin-4-yl]amino}pyridin-2-yl)propanamide;
N-(4-{[6-(5-chloro-2-fluorophenyl)pyridazin-4-yl]amino}pyridin-2-yl)-3-(3-methanesulfonyl-1,3-diazinan-1-yl)propanamide;
N-4-[6-(5-chloro-2-fluorophenyl)pyridazin-4-yl]-$N_2$-[3-(4-methylpiperazin-1-yl)propyl]pyridine-2,4-diamine;
N-(4-{[6-(5-chloro-2-fluorophenyl)pyridazin-4-yl]amino}pyridin-2-yl)-3-[4-(2,2,2-trifluoroethyl)piperazin-1-yl]propanamide;
N-(4-{[6-(5-chloro-2-fluorophenyl)pyridazin-4-yl]amino}pyridin-2-yl)-3-[3-(2,2,2-trifluoroethyl)-1,3-diazinan-1-yl]propanamide;
N-(4-{[6-(5-chloro-2-fluorophenyl)-3-methylpyridazin-4-yl]amino}pyridin-2-yl)-4-(4-methylpiperazin-1-yl)butanamide;
N-(4-{[6-(5-chloro-2-fluorophenyl)-3-methylpyridazin-4-yl]amino}pyridin-2-yl)-3-(piperazin-1-yl)propanamide;
3-[4-(2-aminoethyl)piperazin-1-yl]-N-(4-{[6-(5-chloro-2-fluorophenyl)-3-methylpyridazin-4-yl]amino}pyridin-2-yl)propanamide;
N-(4-{[6-(5-chloro-2-fluorophenyl)-3-methylpyridazin-4-yl]amino}pyridin-2-yl)-3-(morpholin-4-yl)propanamide;
N-(4-{[6-(5-chloro-2-fluorophenyl)-3-methylpyridazin-4-yl]amino}pyridin-2-yl)-3-[3-ethoxy-3-(hydroxymethyl)azetidin-1-yl]propanamide;
N-(4-{[6-(5-chloro-2-fluorophenyl)-3-methylpyridazin-4-yl]amino}pyridin-2-yl)-3-[4-(2-hydroxyethyl)piperazin-1-yl]propanamide;
methyl N-[2-(4-{2-[(4-{[6-(5-chloro-2-fluorophenyl)-3-methylpyridazin-4-yl]amino}pyridin-2-yl)carbamoyl]ethyl}piperazin-1-yl)ethyl]carbamate;
N-(4-{[6-(5-chloro-2-fluorophenyl)-3-methylpyridazin-4-yl]amino}pyridin-2-yl)-3-[4-(2-methanesulfonylethyl)piperazin-1-yl]propanamide;
N-(4-{[6-(5-chloro-2-fluorophenyl)-3-methylpyridazin-4-yl]amino}pyridin-2-yl)-3-[4-(2-cyanoethyl)piperazin-1-yl]propanamide;
N-(4-{[6-(5-chloro-2-fluorophenyl)-3-methylpyridazin-4-yl]amino}pyridin-2-yl)-4-methylpiperazine-1-carboxamide;
N-(4-{[6-(5-chloro-2-fluorophenyl)-3-methylpyridazin-4-yl]amino}pyridin-2-yl)-1-methylpiperidine-4-carboxamide;
methyl 4-{2-[(4-{[6-(5-chloro-2-fluorophenyl)-3-methylpyridazin-4-yl]amino}pyridin-2-yl)carbamoyl]ethyl}piperazine-2-carboxylate;
4-(3-((4-((6-(5-chloro-2-fluorophenyl)-3-methylpyridazin-4-yl)amino)pyridin-2-yl)amino)-3-oxopropyl)piperazine-2-carboxylic acid;
N-(4-{[6-(5-chloro-2-fluorophenyl)-3-methylpyridazin-4-yl]amino}pyridin-2-yl)-3-{[2-(methylamino)ethyl]amino}propanamide;
methyl 4-{2-[(4-{[6-(5-chloro-2-fluorophenyl)-3-methylpyridazin-4-yl]amino}pyridin-2-yl)carbamoyl]ethyl}-1-methylpiperazine-2-carboxylate;
4-{2-[(4-{[6-(5-chloro-2-fluorophenyl)-3-methylpyridazin-4-yl]amino}pyridin-2-yl)carbamoyl]ethyl}-1-methylpiperazine-2-carboxylic acid;
methyl 2-(4-{[(4-{[6-(5-chloro-2-fluorophenyl)-3-methylpyridazin-4-yl]amino}pyridin-2-yl)carbamoyl]methyl}piperazin-1-yl)acetate;
methyl 2-(4-{2-[(4-{[6-(5-chloro-2-fluorophenyl)-3-methylpyridazin-4-yl]amino}pyridin-2-yl)carbamoyl]ethyl}piperazin-2-yl)acetate;
methyl 2-(4-{2-[(4-{[6-(5-chloro-2-fluorophenyl)-3-methylpyridazin-4-yl]amino}pyridin-2-yl)carbamoyl]ethyl}-1-methylpiperazin-2-yl)acetate;
methyl 1-{2-[(4-{[6-(5-chloro-2-fluorophenyl)-3-methylpyridazin-4-yl]amino}pyridin-2-yl)carbamoyl]ethyl}-4-methylpiperazine-2-carboxylate;
methyl 2-(1-{2-[(4-{[6-(5-chloro-2-fluorophenyl)-3-methylpyridazin-4-yl]amino}pyridin-2-yl)carbamoyl]ethyl}-4-methylpiperazin-2-yl)acetate;
methyl 2-(1-{2-[(4-{[6-(5-chloro-2-fluorophenyl)-3-methylpyridazin-4-yl]amino}pyridin-2-yl)carbamoyl]ethyl}piperazin-2-yl)acetate;
N-(4-{[6-(5-chloro-2-fluorophenyl)-3-methylpyridazin-4-yl]amino}pyridin-2-yl)-3-{4-[2-(methylamino)ethyl]piperazin-1-yl}propanamide;
methyl N-[2-(4-{2-[(4-{[6-(5-chloro-2-fluorophenyl)-3-methylpyridazin-4-yl]amino}pyridin-2-yl)carbamoyl]ethyl}piperazin-1-yl)ethyl]-N-methylcarbamate;
N-(4-{[6-(5-chloro-2-fluorophenyl)-3-methylpyridazin-4-yl]amino}pyridin-2-yl)-2-{4-[2-(methylamino)ethyl]piperazin-1-yl}acetamide;
methyl N-[2-(4-{[(4-{[6-(5-chloro-2-fluorophenyl)-3-methylpyridazin-4-yl]amino}pyridin-2-yl)carbamoyl]methyl}piperazin-1-yl)ethyl]-N-methylcarbamate;
2-[4-(2-aminoethyl)piperazin-1-yl]-N-(4-{[6-(5-chloro-2-fluorophenyl)-3-methylpyridazin-4-yl]amino}pyridin-2-yl)acetamide;
methyl N-[2-(4-{[(4-{[6-(5-chloro-2-fluorophenyl)-3-methylpyridazin-4-yl]amino}pyridin-2-yl)carbamoyl]methyl}piperazin-1-yl)ethyl]carbamate;

4-{2-[(4-{[6-(5-chloro-2-fluorophenyl)-3-methylpyridazin-4-yl]amino}pyridin-2-yl)carbamoyl]ethyl}-1,1-dimethylpiperazin-1-ium hydrochloride chloride;

N-(4-{[6-(5-chloro-2-fluorophenyl)-3-methylpyridazin-4-yl]amino}pyridin-2-yl)-3-[(1S,4S)-5-methyl-2,5-diazabicyclo[2.2.1]heptan-2-yl]propanamide;

methyl 4-{2-[(4-{[6-(5-chloro-2-fluorophenyl)-3-methylpyridazin-4-yl]amino}pyridin-2-yl)carbamoyl]ethyl}-1-(propan-2-yl)piperazine-2-carboxylate;

2-(4-{2-[(4-{[6-(5-chloro-2-fluorophenyl)-3-methylpyridazin-4-yl]amino}pyridin-2-yl)carbamoyl]ethyl}piperazin-2-yl)acetic acid;

N-(4-{[6-(5-chloro-2-fluorophenyl)-3-methylpyridazin-4-yl]amino}pyridin-2-yl)-2-(morpholin-4-yl)acetamide;

N-(4-{[6-(5-chloro-2-fluorophenyl)-3-methylpyridazin-4-yl]amino}pyridin-2-yl)-3-(thiomorpholin-4-yl)propanamide;

N-(4-{[6-(5-chloro-2-fluorophenyl)-3-methylpyridazin-4-yl]amino}pyridin-2-yl)-3-{5-methyl-2,5-diazabicyclo[2.2.1]heptan-2-yl}propanamide hydrochloride;

ethyl 4-{2-[(4-{[6-(5-chloro-2-fluorophenyl)-3-methylpyridazin-4-yl]amino}pyridin-2-yl)carbamoyl]ethyl}-1-methylpiperazine-2-carboxylate;

4-{[(4-{[6-(5-chloro-2-fluorophenyl)-3-methylpyridazin-4-yl]amino}pyridin-2-yl)carbamoyl]methyl}morpholin-4-ium-4-olate;

N-(4-{[6-(5-chloro-2-fluorophenyl)-3-methylpyridazin-4-yl]amino}pyridin-2-yl)-3-[4-(2,2,2-trifluoroethyl)piperazin-1-yl]propanamide;

propan-2-yl 4-{2-[(4-{[6-(5-chloro-2-fluorophenyl)-3-methylpyridazin-4-yl]amino}pyridin-2-yl)carbamoyl]ethyl}-1-methylpiperazine-2-carboxylate;

cyclopropyl 4-{2-[(4-{[6-(5-chloro-2-fluorophenyl)-3-methylpyridazin-4-yl]amino}pyridin-2-yl)carbamoyl]ethyl}-1-methylpiperazine-2-carboxylate;

oxetan-3-yl 4-{2-[(4-{[6-(5-chloro-2-fluorophenyl)-3-methylpyridazin-4-yl]amino}pyridin-2-yl)carbamoyl]ethyl}-1-methylpiperazine-2-carboxylate;

N-(4-{[6-(5-chloro-2-fluorophenyl)-3-methylpyridazin-4-yl]amino}pyridin-2-yl)-3-(1-oxo-1λ4-thiomorpholin-4-yl)propanamide;

N-(4-{[6-(5-chloro-2-fluorophenyl)-3-methylpyridazin-4-yl]amino}pyridin-2-yl)-2-[4-(2,2,2-trifluoroethyl)piperazin-1-yl]acetamide;

N-(4-{[6-(5-chloro-2-fluorophenyl)-3-methylpyridazin-4-yl]amino}pyridin-2-yl)-3-(1,1-dioxo-1λ$^6$-thiomorpholin-4-yl)propanamide;

N-(4-{[6-(5-chloro-2-fluorophenyl)-3-methylpyridazin-4-yl]amino}pyridin-2-yl)-3-{4-methyl-4,7-diazaspiro[2.5]octan-7-yl}propanamide;

N-(4-{[6-(5-chloro-2-fluorophenyl)-3-methylpyridazin-4-yl]amino}pyridin-2-yl)-3-[4-(2-methanesulfonamidoethyl)piperazin-1-yl]propanamide;

N-(4-{[6-(5-chloro-2-fluorophenyl)-3-methylpyridazin-4-yl]amino}pyridin-2-yl)-3-{6-methyl-2,6-diazaspiro[3.3]heptan-2-yl}propanamide;

N-(4-{[6-(5-chloro-2-fluorophenyl)-3-methylpyridazin-4-yl]amino}pyridin-2-yl)-3-(4,4-difluoropiperidin-1-yl)propanamide;

N-(4-{[6-(5-chloro-2-fluorophenyl)-3-methylpyridazin-4-yl]amino}pyridin-2-yl)-3-(4-hydroxypiperidin-1-yl)propanamide;

1-(4-{[6-(5-chloro-2-fluorophenyl)-3-methylpyridazin-4-yl]amino}pyridin-2-yl)-3-[2-(4-methylpiperazin-1-yl)ethyl]urea;

1-(4-((6-(5-chloro-2-fluorophenyl)-3-methylpyridazin-4-yl)amino)pyridin-2-yl)-3-((1-methylpiperidin-4-yl)methyl)urea;

N-(4-{[6-(5-chloro-2-fluorophenyl)-3-methylpyridazin-4-yl]amino}pyridin-2-yl)-2-{6-methyl-2,6-diazaspiro[3.3]heptan-2-yl}acetamide;

N-(4-{[6-(5-chloro-2-fluorophenyl)-3-methylpyridazin-4-yl]amino}pyridin-2-yl)-2-{4-methyl-4,7-diazaspiro[2.5]octan-7-yl}acetamide;

N-(4-{[6-(5-chloro-2-fluorophenyl)-3-methylpyridazin-4-yl]amino}pyridin-2-yl)-3-{6-methyl-3,6-diazabicyclo[3.1.1]heptan-3-yl}propanamide;

N-(4-{[6-(5-chloro-2-fluorophenyl)-3-methylpyridazin-4-yl]amino}pyridin-2-yl)-3-{2-methyl-5-oxa-2,8-diazaspiro[3.5]nonan-8-yl}propanamide;

N-(4-{[6-(5-chloro-2-fluorophenyl)-3-methylpyridazin-4-yl]amino}pyridin-2-yl)-2-methyl-2,7-diazaspiro[3.5]nonane-7-carboxamide;

N-(4-{[6-(5-chloro-2-fluorophenyl)-3-methylpyridazin-4-yl]amino}pyridin-2-yl)-2-methyl-2,8-diazaspiro[4.5]decane-8-carboxamide;

N-(4-{[6-(5-chloro-2,4-difluorophenyl)-3-methylpyridazin-4-yl]amino}pyridin-2-yl)-3-(4-methylpiperazin-1-yl)propanamide;

N-(4-{[6-(5-chloro-2-fluorophenyl)-3-methylpyridazin-4-yl]amino}pyridin-2-yl)-2-(1,4-diazepan-1-yl)acetamide;

N-(4-{[6-(5-chloro-2-fluorophenyl)-3-methylpyridazin-4-yl]amino}pyridin-2-yl)-1-[2-(methylamino)ethyl]-1H-pyrazole-4-carboxamide;

N-(4-{[6-(5-chloro-2-fluorophenyl)-3-methylpyridazin-4-yl]amino}pyridin-2-yl)-1-[2-(dimethylamino)ethyl]-1H-pyrazole-4-carboxamide;

N-(4-{[6-(5-chloro-2-fluorophenyl)-3-methylpyridazin-4-yl]amino}pyridin-2-yl)-2-(1-methylpiperidin-4-yl)acetamide;

N-(4-{[6-(5-chloro-2-fluorophenyl)-3-methylpyridazin-4-yl]amino}pyridin-2-yl)-4-(1,4-diazepan-1-yl)butanamide;

N-(4-{[6-(5-chloro-2-fluorophenyl)-3-methylpyridazin-4-yl]amino}pyridin-2-yl)-4-(4-methyl-1,4-diazepan-1-yl)butanamide;

cis N-(4-{[6-(5-chloro-2-fluorophenyl)-3-methylpyridazin-4-yl]amino}pyridin-2-yl)-3-(4-methylpiperazin-1-yl)cyclobutane-1-carboxamide;

N-(4-{[6-(5-chloro-2-fluorophenyl)-3-methylpyridazin-4-yl]amino}pyridin-2-yl)-3-[2-(hydroxymethyl)-4-methylpiperazin-1-yl]propanamide;

N-(4-{[6-(5-chloro-2-fluorophenyl)-3-methylpyridazin-4-yl]amino}pyridin-2-yl)-2-(piperazin-1-yl)acetamide;

N-(4-{[6-(5-chloro-2-fluorophenyl)-3-methylpyridazin-4-yl]amino}pyridin-2-yl)-2-(4-methyl-1,4-diazepan-1-yl)acetamide;

N-4-[6-(5-chloro-2-fluorophenyl)-3-methylpyridazin-4-yl]-N-2-{1-[2-(4-methylpiperazin-1-yl)ethyl]-1H-pyrazol-3-yl}pyridine-2,4-diamine;

N-(4-{[6-(5-chloro-2-fluorophenyl)-3-methylpyridazin-4-yl]amino}pyridin-2-yl)-3-[3-(hydroxymethyl)-4-methylpiperazin-1-yl]propanamide;

N-(4-{[6-(5-chloro-2-fluorophenyl)-3-methylpyridazin-4-yl]amino}pyridin-2-yl)-2-(4-methylpiperazin-1-yl)acetamide;

N-(4-{[6-(5-chloro-2-fluorophenyl)-3-cyclopropylpyridazin-4-yl]amino}pyridin-2-yl)-3-(4-methylpiperazin-1-yl)propanamide;

N-(4-{[6-(5-chloro-2-fluorophenyl)-3-(hydroxymethyl) pyridazin-4-yl]amino}pyridin-2-yl)-3-(4-methylpiperazin-1-yl)propanamide;

methyl N-[2-(4-{[(4-{[6-(5-chloro-2-fluorophenyl)-3-(hydroxymethyl)pyridazin-4-yl]amino}pyridin-2-yl) carbamoyl]methyl}piperazin-1-yl)ethyl]-N-methylcarbamate;

N-(4-{[6-(5-chloro-2-fluorophenyl)-3-(hydroxymethyl) pyridazin-4-yl]amino}pyridin-2-yl)-2-(4-methylpiperazin-1-yl)acetamide;

N-(4-{[6-(5-chloro-2-fluorophenyl)-3-(hydroxymethyl) pyridazin-4-yl]amino}pyridin-2-yl)-2-(4-methyl-1,4-diazepan-1-yl)acetamide;

N-(4-{[6-(5-chloro-2-fluorophenyl)-3-(hydroxymethyl) pyridazin-4-yl]amino}pyridin-2-yl)-2-{2-methyl-2,7-diazaspiro[3.5]nonan-7-yl}acetamide;

N-(4-((6-(5-chloro-2-fluorophenyl)-3-(trifluoromethyl) pyridazin-4-yl)amino)pyridin-2-yl)-3-(4-methylpiperazin-1-yl)propanamide;

N-(4-{[6-(5-chloro-2-fluorophenyl)-3-(trifluoromethyl) pyridazin-4-yl]amino}pyridin-2-yl)-3-[4-(2-hydroxyethyl)piperazin-1-yl]propanamide;

N-(4-{[6-(5-chloro-2-fluorophenyl)-3-(trifluoromethyl) pyridazin-4-yl]amino}pyridin-2-yl)-3-[4-(2-methanesulfonylethyl)piperazin-1-yl]propanamide;

N-(4-{[6-(5-chloro-2-fluorophenyl)-3-(trifluoromethyl) pyridazin-4-yl]amino}pyridin-2-yl)-3-[4-(2-cyanoethyl)piperazin-1-yl]propanamide;

methyl 3-[6-(5-chloro-2-fluorophenyl)-4-({2-[3-(4-methylpiperazin-1-yl)propanamido]pyridin-4-yl}amino) pyridazin-3-yl]propanoate;

methyl (1s,4s)-4-(6-(5-chloro-2-fluorophenyl)-4-((2-(3-(4-methylpiperazin-1-yl)propanamido)pyridin-4-yl) amino)pyridazin-3-yl)cyclohexane-1-carboxylate;

methyl (1r,4r)-4-(6-(5-chloro-2-fluorophenyl)-4-((2-(3-(4-methylpiperazin-1-yl)propanamido)pyridin-4-yl) amino)pyridazin-3-yl)cyclohexane-1-carboxylate;

N-[4-({6-[5-(difluoromethyl)-2-fluorophenyl]-3-methylpyridazin-4-yl}amino)pyridin-2-yl]-3-(4-methylpiperazin-1-yl)propanamide; and methyl 4-(6-(5-chloro-2-fluorophenyl)-4-((2-(3-(4-methylpiperazin-1-yl)propanamido)pyridin-4-yl)amino) pyridazin-3-yl)butanoate.

4. The compound or salt thereof according to claim 1, wherein A is group A2

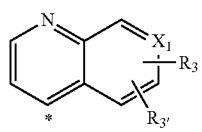

A2 represented by the formula (Ib)

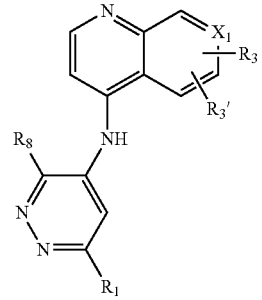

(Ib)

$R_1$ is aryl optionally substituted by one or more groups selected from the group consisting of halogen atoms and —$(C_1-C_6)$alkyl;

$X_1$ is C, CH or N;

$R^3$ is selected from the group consisting of —C(O) $NR_5R_7$, —C(O)O$R_7$, —OC(O)$R_7$, —O$R_7$, —$NR_5$C(O) $R_7$ and —OC(O)$NR_5R_7$;

$R_{3'}$ is H or is selected from the group consisting of —$(C_1-C_6)$alkoxy, —OH, —C(O)O—$(C_1-C_6)$alkyl and —C(O)NH-heterocycloalkyl, wherein said heterocycloalkyl is substituted by one —$(C_1-C_6)$alkyl;

$R_5$ is H or —$(C_1-C_6)$alkyl;

$R_7$ is selected from the group consisting of:

$(C_1-C_6)$alkylene-$NR_AR_B$;

heterocycloalkyl optionally substituted by one or more groups selected from the group consisting of —$(C_1-C_6)$alkyl, —$(C_1-C_6)$alkylene-$SO_2$—$(C_1-C_6)$alkyl, —$(C_1-C_6)$alkylene-OH, —$(C_1-C_6)$alkylene-$NR_AR_C$, heterocycloalkyl, —C(O)O-heterocycloalkyl, —$(C_1-C_6)$alkylene-heterocycloalkyl, wherein each of said heterocycloalkyl is optionally substituted by one or more —$(C_1-C_6)$alkyl;

—$(C_1-C_6)$alkylene-C(O)-heterocycloalkyl, wherein said heterocycloalkyl is optionally substituted by one or more —$(C_1-C_6)$alkyl; and —$(C_1-C_6)$alkylene-heterocycloalkyl, wherein said heterocycloalkyl is optionally substituted by one or more groups selected from the group consisting of —$(C_1-C_6)$alkyl, —$(C_1-C_6)$alkoxy, —$(C_1-C_6)$alkylene-OH, —$(C_1-C_6)$alkylene-CN, —$(C_1-C_6)$haloalkyl, —C(O)—$(C_1-C_6)$alkyl, —C(O)O—$(C_1-C_6)$ alkyl, —$(C_1-C_6)$alkylene-C(O)O—$(C_1-C_6)$alkyl, —$(C_1-C_6)$alkylene-$NH_2$, —$(C_1-C_6)$alkylene-$NR_AR_C$, —$(C_1-C_6)$alkylene-$CONR_AR_C$, —$(C_1-C_6)$ alkylene-$NR_CCO$—$(C_1-C_6)$alkyl, —$(C_1-C_6)$alkylene-$NR_C$—C(O)O—$(C_1-C_6)$alkyl, —$(C_1-C_6)$ alkylene-$NHSO_2$—$(C_1-C_6)$alkyl, —$SO_2$—$(C_1-C_6)$ alkyl and —$(C_1-C_6)$alkylene-$SO_2$—$(C_1-C_6)$alkyl;

$R_A$ is selected from the group consisting of —$(C_1-C_6)$ alkyl and —$(C_1-C_6)$alkylene-OH;

$R_B$ is heterocycloalkyl;

$R_C$ is H or selected from the group consisting of —$(C_1-C_6)$alkyl and —$(C_1-C_6)$alkylene-OH; and $R_8$ is H or selected from the group consisting of —$(C_1-C_6)$alkyl, —$(C_1-C_6)$alkylene-OH and —$(C_1-C_6)$haloalkyl.

5. The compound or salt thereof according to claim 4, wherein the compound is selected from the group consisting of:

N-[6-(5-chloro-2-fluorophenyl)pyridazin-4-yl]-7-[2-(morpholin-4-yl)ethoxy]quinolin-4-amine;
4-{[6-(5-chloro-2-fluorophenyl)pyridazin-4-yl]amino}-N-[2-(morpholin-4-yl)ethyl]quinoline-7-carboxamide;
2-(morpholin-4-yl)ethyl 4-{[6-(5-chloro-2-fluorophenyl)pyridazin-4-yl]amino}quinoline-6-carboxylate;
2-(morpholin-4-yl)ethyl 4-{[6-(5-chloro-2-fluorophenyl)pyridazin-4-yl]amino}quinoline-7-carboxylate;
N-[6-(5-chloro-2-fluorophenyl)pyridazin-4-yl]-7-[2-(piperazin-1-yl)ethoxy]quinolin-4-amine;
4-{[6-(5-chloro-2-fluorophenyl)pyridazin-4-yl]amino}-N-[2-(piperazin-1-yl)ethyl]quinoline-7-carboxamide;
N-[6-(5-chloro-2-fluorophenyl)pyridazin-4-yl]-7-[2-(4-methylpiperazin-1-yl)ethoxy]quinolin-4-amine;
4-{[6-(5-chloro-2-fluorophenyl)pyridazin-4-yl]amino}-N-[2-(4-methylpiperazin-1-yl)ethyl]quinoline-7-carboxamide;
4-{[6-(5-chloro-2-fluorophenyl)pyridazin-4-yl]amino}-N-[2-(1-methylpiperidin-4-yl)ethyl]quinoline-7-carboxamide;
N-[6-(5-chloro-2-fluorophenyl)pyridazin-4-yl]-7-[2-(1-methylpiperidin-4-yl)ethoxy]quinolin-4-amine;
1-methylpiperidin-4-yl 4-{[6-(5-chloro-2-fluorophenyl)pyridazin-4-yl]amino}quinoline-7-carboxylate;
4-{[6-(5-chloro-2-fluorophenyl)pyridazin-4-yl]amino}-N-(1-methylazetidin-3-yl)-1,7-naphthyridine-6-carboxamide;
4-{[6-(5-chloro-2-fluorophenyl)pyridazin-4-yl]amino}-N-(1-methylpiperidin-4-yl)-1,7-naphthyridine-6-carboxamide;
4-{[6-(5-chloro-2-fluorophenyl)pyridazin-4-yl]amino}quinolin-7-yl 4-methylpiperazine-1-carboxylate;
N-[6-(5-chloro-2-fluorophenyl)pyridazin-4-yl]-7-[3-(4-methylpiperazin-1-yl)propoxy]quinolin-4-amine;
N-[6-(5-chloro-2-fluorophenyl)pyridazin-4-yl]-7-[2-(4-ethylpiperazin-1-yl)ethoxy]quinolin-4-amine;
N-(4-{[6-(5-chloro-2-fluorophenyl)pyridazin-4-yl]amino}quinolin-7-yl)-3-(4-methylpiperazin-1-yl)propanamide;
1-(4-{2-[(4-{[6-(5-chloro-2-fluorophenyl)pyridazin-4-yl]amino}quinolin-7-yl)oxy]ethyl}piperazin-1-yl)ethan-1-one;
N-[6-(5-chloro-2-fluorophenyl)pyridazin-4-yl]-7-[2-(4-methanesulfonylpiperazin-1-yl)ethoxy]quinolin-4-amine;
N-{6-[2-fluoro-5-(propan-2-yl)phenyl]pyridazin-4-yl}-7-[2-(4-methylpiperazin-1-yl)ethoxy]quinolin-4-amine;
2-[(4-{[6-(5-chloro-2-fluorophenyl)pyridazin-4-yl]amino}quinolin-7-yl)oxy]-1-(4-methylpiperazin-1-yl)ethan-1-one;
N-[6-(5-chloro-2-fluorophenyl)pyridazin-4-yl]-7-{2-[4-(2,2,2-trifluoroethyl)piperazin-1-yl]ethoxy}quinolin-4-amine;
N-[6-(5-chloro-2-fluorophenyl)pyridazin-4-yl]-7-{2-[methyl(oxetan-3-yl)amino]ethoxy}quinolin-4-amine;
4-{[6-(5-chloro-2-fluorophenyl)pyridazin-4-yl]amino}quinolin-7-yl N-methyl-N-[2-(4-methylpiperazin-1-yl)ethyl]carbamate;
N-[6-(5-chloro-2-fluorophenyl)-3-methylpyridazin-4-yl]-7-[2-(4-methylpiperazin-1-yl)ethoxy]quinolin-4-amine;
4-{[6-(5-chloro-2-fluorophenyl)pyridazin-4-yl]amino}quinolin-7-yl N-methyl-N-[2-(1-methylpiperidin-4-yl)ethyl]carbamate;
N-[6-(5-chloro-2-fluorophenyl)pyridazin-4-yl]-7-[3-(3-methyl-1,3-diazinan-1-yl)propoxy]quinolin-4-amine;
4-{[6-(5-chloro-2-fluorophenyl)pyridazin-4-yl]amino}quinolin-7-yl 4-(2-methanesulfonylethyl)piperazine-1-carboxylate;
(3R)-1-methylpyrrolidin-3-yl 4-{[6-(5-chloro-2-fluorophenyl)pyridazin-4-yl]amino}quinoline-7-carboxylate;
N-[6-(5-chloro-2-fluorophenyl)pyridazin-4-yl]-7-(2-{5-methyl-octahydropyrrolo[3,4-c]pyrrol-2-yl}ethoxy)quinolin-4-amine;
1-(3-{2-[(4-{[6-(5-chloro-2-fluorophenyl)pyridazin-4-yl]amino}quinolin-7-yl)oxy]ethyl}-1,3-diazinan-1-yl)ethan-1-one;
4-{[6-(5-chloro-2-fluorophenyl)pyridazin-4-yl]amino}quinolin-7-yl 4-(2-hydroxyethyl)piperazine-1-carboxylate;
(3S)-1-methylpyrrolidin-3-yl 4-{[6-(5-chloro-2-fluorophenyl)pyridazin-4-yl]amino}quinoline-7-carboxylate;
methyl 3-(4-{2-[(4-{[6-(5-chloro-2-fluorophenyl)pyridazin-4-yl]amino}quinolin-7-yl)oxy]ethyl}piperazin-1-yl)propanoate;
4-{[6-(5-chloro-2-fluorophenyl)pyridazin-4-yl]amino}quinolin-7-yl 4-[2-(dimethylamino)ethyl]piperazine-1-carboxylate;
N-[6-(5-chloro-2-fluorophenyl)pyridazin-4-yl]-7-[2-(3-methyl-1,3-diazinan-1-yl)ethoxy]quinolin-4-amine;
3-(4-{2-[(4-{[6-(5-chloro-2-fluorophenyl)pyridazin-4-yl]amino}quinolin-7-yl)oxy]ethyl}piperazin-1-yl)-N-methylpropanamide;
4-{[6-(5-chloro-2-fluorophenyl)pyridazin-4-yl]amino}quinolin-7-yl 4-[2-(1-methylpiperidin-4-yl)ethyl]piperazine-1-carboxylate;
7-{2-[4-(2-aminoethyl)piperazin-1-yl]ethoxy}-N-[6-(5-chloro-2-fluorophenyl)pyridazin-4-yl]quinolin-4-amine;
N-[2-(4-{2-[(4-{[6-(5-chloro-2-fluorophenyl)pyridazin-4-yl]amino}quinolin-7-yl)oxy]ethyl}piperazin-1-yl)ethyl]methanesulfonamide;
N-[6-(5-chloro-2-fluorophenyl)pyridazin-4-yl]-7-(2-{4-[2-(dimethylamino)ethyl]piperazin-1-yl}ethoxy)quinolin-4-amine;
N-[2-(4-{2-[(4-{[6-(5-chloro-2-fluorophenyl)pyridazin-4-yl]amino}quinolin-7-yl)oxy]ethyl}piperazin-1-yl)ethyl]acetamide;
4-{[6-(5-chloro-2-fluorophenyl)pyridazin-4-yl]amino}quinolin-7-yl 4-[2-(4-methylpiperazin-1-yl)ethyl]piperidine-1-carboxylate;
3-(4-{2-[(4-{[6-(5-chloro-2-fluorophenyl)pyridazin-4-yl]amino}quinolin-7-yl)oxy]ethyl}piperazin-1-yl)propanenitrile;
2-(4-{2-[(4-{[6-(5-chloro-2-fluorophenyl)pyridazin-4-yl]amino}quinolin-7-yl)oxy]ethyl}piperazin-1-yl)ethan-1-ol;
N-[6-(5-chloro-2-fluorophenyl)pyridazin-4-yl]-7-[(1-methylpiperidin-4-yl)oxy]quinolin-4-amine;
2-{[2-(4-{2-[(4-{[6-(5-chloro-2-fluorophenyl)pyridazin-4-yl]amino}quinolin-7-yl)oxy]ethyl}piperazin-1-yl)ethyl](2-hydroxyethyl)amino}ethan-1-ol;
methyl N-[2-(4-{2-[(4-{[6-(5-chloro-2-fluorophenyl)pyridazin-4-yl]amino}quinolin-7-yl)oxy]ethyl}piperazin-1-yl)ethyl]carbamate;
4-{[6-(5-chloro-2-fluorophenyl)-3-methylpyridazin-4-yl]amino}quinolin-7-yl 4-[2-(1-methylpiperidin-4-yl)ethyl]piperazine-1-carboxylate;

3-(4-{2-[(4-{[6-(5-chloro-2-fluorophenyl)pyridazin-4-yl]amino}quinolin-7-yl)oxy]ethyl}piperazin-1-yl)pentane-1,5-diol;

N-[6-(5-chloro-2-fluorophenyl)pyridazin-4-yl]-6-methoxy-7-[2-(4-methylpiperazin-1-yl)ethoxy]quinolin-4-amine;

N-[6-(5-chloro-2-fluorophenyl)pyridazin-4-yl]-7-[(1-methylpiperidin-4-yl)methoxy]quinolin-4-amine;

N-[6-(5-chloro-2-fluorophenyl)pyridazin-4-yl]-7-[2-(3-methylimidazolidin-1-yl)ethoxy]quinolin-4-amine;

4-{[6-(5-chloro-2-fluorophenyl)pyridazin-4-yl]amino}quinolin-7-yl 4-[(1-methylpiperidin-4-yl)methyl]piperazine-1-carboxylate;

4-{[6-(5-chloro-2-fluorophenyl)pyridazin-4-yl]amino}quinolin-7-yl 4-(1-methylpiperidin-4-yl)piperazine-1-carboxylate;

4-{[6-(5-chloro-2-fluorophenyl)pyridazin-4-yl]amino}quinolin-7-yl 2,8-diazaspiro[4.5]decane-2-carboxylate;

4-{[6-(5-chloro-2-fluorophenyl)pyridazin-4-yl]amino}quinolin-7-yl 2-methyl-2,7-diazaspiro[3.5]nonane-7-carboxylate;

4-{[6-(5-chloro-2-fluorophenyl)pyridazin-4-yl]amino}quinolin-7-yl 7-methyl-2,7-diazaspiro[3.5]nonane-2-carboxylate;

4-{[6-(5-chloro-2-fluorophenyl)pyridazin-4-yl]amino}quinolin-7-yl 8-methyl-2,8-diazaspiro[4.5]decane-2-carboxylate;

4-{[6-(5-chloro-2-fluorophenyl)pyridazin-4-yl]amino}quinolin-7-yl 2-methyl-2,6-diazaspiro[3.4]octane-6-carboxylate;

4-{[6-(5-chloro-2-fluorophenyl)pyridazin-4-yl]amino}quinolin-7-yl (1R,4R)-5-methyl-2,5-diazabicyclo[2.2.1]heptane-2-carboxylate;

4-{[6-(5-chloro-2-fluorophenyl)-3-methylpyridazin-4-yl]amino}quinolin-7-yl 5-methyl-2,5-diazabicyclo[2.2.1]heptane-2-carboxylate;

4-{[6-(5-chloro-2-fluorophenyl)pyridazin-4-yl]amino}quinolin-7-yl 3-(pyrrolidin-1-yl)azetidine-1-carboxylate;

4-{[6-(5-chloro-2-fluorophenyl)pyridazin-4-yl]amino}quinolin-7-yl 4-(azetidin-1-yl)piperidine-1-carboxylate;

4-{[6-(5-chloro-2-fluorophenyl)pyridazin-4-yl]amino}quinolin-7-yl 5-methyl-2,5-diazabicyclo[2.2.1]heptane-2-carboxylate;

4-{[6-(5-chloro-2-fluorophenyl)pyridazin-4-yl]amino}-7-[2-(4-methylpiperazin-1-yl)ethoxy]quinolin-6-ol;

4-{[6-(5-chloro-2-fluorophenyl)-3-methylpyridazin-4-yl]amino}quinolin-7-yl 3-(pyrrolidin-1-yl)azetidine-1-carboxylate;

4-{[6-(5-chloro-2-fluorophenyl)-3-methylpyridazin-4-yl]amino}quinolin-7-yl 4-(azetidin-1-yl)piperidine-1-carboxylate;

4-{[6-(5-chloro-2-fluorophenyl)-3-methylpyridazin-4-yl]amino}quinolin-7-yl (1R,4R)-5-methyl-2,5-diazabicyclo[2.2.1]heptane-2-carboxylate;

4-{[6-(5-chloro-2-fluorophenyl)-3-methylpyridazin-4-yl]amino}quinolin-7-yl (1S,4S)-5-methyl-2,5-diazabicyclo[2.2.1]heptane-2-carboxylate;

methyl 4-{[6-(5-chloro-2-fluorophenyl)-3-(hydroxymethyl)pyridazin-4-yl]amino}-7-[2-(4-methylpiperazin-1-yl)ethoxy]quinoline-6-carboxylate;

1-(4-{[6-(5-chloro-2-fluorophenyl)-3-methylpyridazin-4-yl]amino}quinolin-7-yl) 3-oxetan-3-yl 4-[2-(1-methylpiperidin-4-yl)ethyl]piperazine-1,3-dicarboxylate;

methyl 4-{[6-(5-chloro-2-fluorophenyl)-3-methylpyridazin-4-yl]amino}-7-[2-(4-methylpiperazin-1-yl)ethoxy]quinoline-6-carboxylate;

methyl 4-{[6-(5-chloro-2-fluorophenyl)pyridazin-4-yl]amino}-7-[2-(4-methylpiperazin-1-yl)ethoxy]quinoline-6-carboxylate;

[6-(5-chloro-2-fluorophenyl)-4-({7-[2-(4-methylpiperazin-1-yl)ethoxy]quinolin-4-yl}amino)pyridazin-3-yl]methanol; and N-[6-(5-chloro-2-fluorophenyl)-3-(trifluoromethyl)pyridazin-4-yl]-7-[2-(4-methylpiperazin-1-yl)ethoxy]quinolin-4-amine.

6. The compound or salt thereof according to claim 4, wherein $R_3$ is —$OR_7$; $R_7$ is selected from the group consisting of -2-(morpholin-4-yl)ethyl, -2-(piperazin-1-yl)ethyl, -2-(4-methylpiperazin-1-yl)ethyl, 2-(1-methylpiperidin-4-yl)ethyl, -3-(4-methylpiperazin-1-yl)propyl, -2-(4-ethylpiperazin-1-yl)ethyl, -4-ethyl-1-(piperazin-1-yl)ethan-1-one, -2-(4-methanesulfonylpiperazin-1-yl)ethyl, -1-(4-methylpiperazin-1-yl)ethan-1-one, -2-[4-(2,2,2-trifluoroethyl)piperazin-1-yl]ethyl, -2-[methyl(oxetan-3-yl)amino]ethyl, -3-(3-methyl-1,3-diazinan-1-yl)propyl, -2-{5-methyl-octahydropyrrolo[3,4-c]pyrrol-2-yl}ethyl, -1-(3-ethyltetrahydropyrimidin-1(2H)-yl)ethan-1-one, methyl-[4-ethyl-(piperazin-1-yl)]propanoate, -2-(3-methyl-1,3-diazinan-1-yl)ethyl, -3-(4-ethylpiperazin-1-yl)-N-methylpropanamide, -2-[4-(2-aminoethyl)piperazin-1-yl]ethyl, -4-ethyl-[(piperazin-1-yl)ethyl]methanesulfonamide, -4-[2-(dimethylamino)ethyl]piperazin-1-yl-ethyl, N-(2-(4-ethylpiperazin-1-yl)ethyl)acetamide, -3-(4-ethylpiperazin-1-yl)propanenitrile, -2-(4-ethylpiperazin-1-yl)ethan-1-ol, 1-methylpiperidin-4-yl, -2,2'-((2-(4-ethylpiperazin-1-yl)ethyl)azanediyl)bis(ethan-1-ol), methyl (2-(4-ethylpiperazin-1-yl)ethyl)carbamate, -3-(4-ethylpiperazin-1-yl)pentane-1,5-diol, -(1-methylpiperidin-4-yl)methyl and -2-(3-methylimidazolidin-1-yl)ethyl.

7. The compound or salt thereof according to claim 1, wherein A is group A3

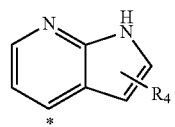

represented by the formula (Ic)

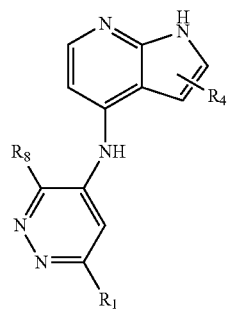

$R_1$ is aryl optionally substituted by one or more halogen atoms;

$R_4$ is selected from the group consisting of —C(O)NR$_5$R$_7$ and —C(O)heterocycloalkyl, wherein said heterocycloalkyl is optionally substituted by one or more —(C$_1$-C$_6$)alkyl;

$R_5$ is H or —(C$_1$-C$_6$)alkyl; and $R_7$ is selected from the group consisting of heterocycloalkyl substituted by one or more —(C$_1$-C$_6$)alkyl and —(C$_1$-C$_6$)alkylene-heterocycloalkyl, wherein said heterocycloalkyl is optionally substituted by one or more —(C$_1$-C$_6$)alkyl.

8. The compound or salt thereof according to claim 7, wherein the compound is selected from the group consisting of:

4-{[6-(5-chloro-2-fluorophenyl)pyridazin-4-yl]amino}-N-[2-(4-methylpiperazin-1-yl)ethyl]-1H-pyrrolo[2,3-b]pyridine-3-carboxamide;

4-{[6-(5-chloro-2-fluorophenyl)pyridazin-4-yl]amino}-N-[2-(4-methylpiperazin-1-yl)ethyl]-1H-pyrrolo[2,3-b]pyridine-2-carboxamide;

4-{[6-(5-chloro-2-fluorophenyl)pyridazin-4-yl]amino}-N-[2-(1-methylpiperidin-4-yl)ethyl]-1H-pyrrolo[2,3-b]pyridine-2-carboxamide;

6-(5-chloro-2-fluorophenyl)-N-[2-(4-methylpiperazine-1-carbonyl)-1H-pyrrolo[2,3-b]pyridin-4-yl]pyridazin-4-amine;

4-{[6-(5-chloro-2-fluorophenyl)pyridazin-4-yl]amino}-N-methyl-N-[2-(4-methylpiperazin-1-yl)ethyl]-1H-pyrrolo[2,3-b]pyridine-2-carboxamide, 4-{[6-(5-chloro-2-fluorophenyl)-3-methylpyridazin-4-yl]amino}-N-[2-(4-methylpiperazin-1-yl)ethyl]-1H-pyrrolo[2,3-b]pyridine-2-carboxamide; and 4-{[6-(5-chloro-2-fluorophenyl)-3-methylpyridazin-4-yl]amino}-N-methyl-N-[2-(4-methylpiperazin-1-yl)ethyl]-1H-pyrrolo[2,3-b]pyridine-2-carboxamide.

9. A pharmaceutical composition comprising the compound or salt thereof according to claim 1, in admixture with one or more pharmaceutically acceptable carriers or excipients.

10. The pharmaceutical composition according to claim 9, adapted for administration by inhalation.

11. A method for treating a disease, disorder or condition mediated by ALK5 signaling pathway in mammals, comprising administering to a subject in need thereof the pharmaceutical composition according to claim 9.

12. The method according to claim 11, wherein the disease, disorder or condition comprises fibrosis and/or a disease, disorder or condition that involves fibrosis.

13. The method according to claim 12, wherein the fibrosis or disease, disorder or condition that involves fibrosis comprises pulmonary fibrosis, idiopathic pulmonary fibrosis (IPF), hepatic fibrosis, renal fibrosis, ocular fibrosis, cardiac fibrosis, arterial fibrosis or systemic sclerosis.

14. The method according to claim 13, wherein the fibrosis comprises idiopathic pulmonary fibrosis (IPF).

* * * * *